US010672371B2

(12) United States Patent
Silverstein

(10) Patent No.: US 10,672,371 B2
(45) **Date of Patent: *Jun. 2, 2020**

(54) METHOD OF AND SYSTEM FOR SPOTTING DIGITAL MEDIA OBJECTS AND EVENT MARKERS USING MUSICAL EXPERIENCE DESCRIPTORS TO CHARACTERIZE DIGITAL MUSIC TO BE AUTOMATICALLY COMPOSED AND GENERATED BY AN AUTOMATED MUSIC COMPOSITION AND GENERATION ENGINE

(71) Applicant: Amper Music, Inc., New York, NY (US)

(72) Inventor: Andrew H. Silverstein, New York, NY (US)

(73) Assignee: AMPER MUSIC, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,299

(22) Filed: Dec. 13, 2018

(65) Prior Publication Data

US 2019/0279606 A1 Sep. 12, 2019

Related U.S. Application Data

(63) Continuation of application No. 15/489,707, filed on Apr. 17, 2017, now Pat. No. 10,163,429, which is a (Continued)

(51) Int. Cl.
*G10H 1/00* (2006.01)
*G06N 20/00* (2019.01)

(Continued)

(52) U.S. Cl.
CPC ........... *G10H 1/0025* (2013.01); *G06N 7/005* (2013.01); *G06N 20/00* (2019.01); *G10H 1/00* (2013.01);

(Continued)

(58) Field of Classification Search
CPC .............................. G10H 1/0025; G10H 1/00

(Continued)

(56) References Cited

U.S. PATENT DOCUMENTS 4,108,035 A 8/1978 Alonso
4,178,822 A 12/1979 Alonso (Continued)

FOREIGN PATENT DOCUMENTS

CA 2894332 A1 12/2015
CA 2894332 C 12/2015

(Continued)

OTHER PUBLICATIONS

US 10,126,932 B1, 11/2018, Trncic (withdrawn)

(Continued)

*Primary Examiner* — David S Warren
(74) *Attorney, Agent, or Firm* — Thomas J. Perkowski, Esq., PC

(57) ABSTRACT

An automated music composition and generation system and process for scoring a selected media object or event marker, with one or more pieces of digital music, by spotting the selected media object or event marker with musical experience descriptors selected and applied to the selected media object or event marker by the system user during a scoring process, and using said selected musical experience descriptors to drive an automated music composition and generation engine to automatically compose and generate the one or more pieces of digital music.

20 Claims, 223 Drawing Sheets

Related U.S. Application Data continuation of application No. 14/869,911, filed on Sep. 29, 2015, now Pat. No. 9,721,551.

(51) Int. Cl.
*G10H 1/36* (2006.01)
*G06N 7/00* (2006.01)
*G10L 25/15* (2013.01)

(52) U.S. Cl.
CPC ............ *G10H 1/368* (2013.01); *G10L 25/15* (2013.01); *G10H 2210/021* (2013.01); *G10H 2210/066* (2013.01); *G10H 2210/105* (2013.01); *G10H 2210/111* (2013.01); *G10H 2210/115* (2013.01); *G10H 2210/341* (2013.01); *G10H 2220/101* (2013.01); *G10H 2240/081* (2013.01); *G10H 2240/085* (2013.01); *G10H 2240/131* (2013.01); *G10H 2240/305* (2013.01); *G10H 2250/311* (2013.01)

(58) Field of Classification Search
USPC .................................................. 84/609, 600
See application file for complete search history.

(56) References Cited

U.S. PATENT DOCUMENTS 4,279,185 A 7/1981 Alonso
4,345,500 A 8/1982 Alonso
4,399,731 A 8/1983 Aoki
4,554,855 A 11/1985 Alonso
4,680,479 A 7/1987 Alonso
4,704,933 A 11/1987 Kurakake
4,731,847 A 3/1988 Lybrook
4,745,836 A 5/1988 Dannenberg
4,771,671 A 9/1988 Hoff
4,926,737 A * 5/1990 Minamitaka ......... G10H 1/0025 84/611
4,982,643 A * 1/1991 Minamitaka ......... G10H 1/0025 706/902
5,099,740 A 3/1992 Minamitaka
5,208,416 A 5/1993 Hayakawa
5,315,057 A 5/1994 Land
5,375,501 A * 12/1994 Okuda ................. G10H 1/0025 84/611
5,393,926 A 2/1995 Johnson
5,451,709 A * 9/1995 Minamitaka ......... G10H 1/0025 84/609
5,453,569 A 9/1995 Saito
5,492,049 A 2/1996 Aoki
5,496,962 A 3/1996 Meier
5,510,573 A 4/1996 Cho
5,521,324 A 5/1996 Dannenberg
5,679,913 A * 10/1997 Bruti ....................... G10H 1/36 84/609
5,696,343 A * 12/1997 Nakata ..................... G10H 1/40 84/609
5,723,802 A 3/1998 Johnson
5,736,663 A * 4/1998 Aoki .................... G10H 1/0025 84/609
5,736,666 A * 4/1998 Goodman ............ G10H 1/0025 84/634
5,753,843 A 5/1998 Fay
5,877,445 A 3/1999 Hufford
5,883,326 A * 3/1999 Goodman ............ G10H 1/0025 84/634
5,913,259 A 6/1999 Grubb
5,958,005 A 9/1999 Thorne
6,006,018 A 12/1999 Burnett
6,012,088 A 1/2000 Li
6,028,262 A 2/2000 Minamitaka
6,051,770 A 4/2000 Milburn
6,072,480 A 6/2000 Gorbet
6,075,193 A * 6/2000 Aoki .................... G10H 1/0025 84/609
6,084,169 A 7/2000 Hasegawa
6,103,964 A 8/2000 Kay
6,122,666 A 9/2000 Beurket
6,162,982 A * 12/2000 Aoki .................... G10H 1/0025 84/609
6,175,072 B1 * 1/2001 Aoki .................... G10H 1/0025 84/636
6,252,152 B1 * 6/2001 Aoki .................... G10H 1/0025 84/609
6,291,756 B1 9/2001 Urbanek
6,319,130 B1 11/2001 Ooseki
6,337,433 B1 * 1/2002 Nishimoto .............. A63J 17/00 84/464 A
6,363,350 B1 3/2002 Lafe
6,385,581 B1 5/2002 Stephenson
6,388,183 B1 5/2002 Leh
6,392,133 B1 * 5/2002 Georges ............... G10H 1/0025 352/1
6,395,970 B2 5/2002 Aoki
6,462,264 B1 10/2002 Elam
6,506,969 B1 1/2003 Baron
6,545,209 B1 4/2003 Flannery
6,576,828 B2 6/2003 Aoki
6,606,596 B1 8/2003 Zirngibl
6,633,908 B1 10/2003 Leymann
6,636,247 B1 10/2003 Hamzy
6,636,855 B2 10/2003 Holloway
6,637,020 B1 10/2003 Hammond
6,654,794 B1 11/2003 French
6,684,238 B1 1/2004 Dutta
6,700,048 B1 3/2004 Terada
6,746,246 B2 * 6/2004 Cliff ....................... G09B 19/00 434/219
6,747,201 B2 * 6/2004 Birmingham ........ G10H 1/0041 84/609
6,756,533 B2 6/2004 Aoki
6,765,997 B1 7/2004 Zirngibl
6,822,153 B2 11/2004 Comair
6,865,533 B2 3/2005 Addison
6,888,999 B2 5/2005 Herberger
6,897,367 B2 5/2005 Leach
6,963,839 B1 11/2005 Ostermann
6,969,796 B2 11/2005 Sasaki
7,003,515 B1 2/2006 Glaser
7,022,907 B2 4/2006 Lu
7,058,428 B2 6/2006 Yamaki
7,075,000 B2 7/2006 Gang
7,102,067 B2 9/2006 Gang
7,105,734 B2 9/2006 Tucmandl
7,115,808 B2 10/2006 Lu
7,133,900 B1 11/2006 Szeto
7,188,143 B2 3/2007 Szeto
7,250,567 B2 * 7/2007 Gayama ................... G10H 1/00 84/609
7,268,791 B1 9/2007 Jannink
7,310,629 B1 12/2007 Mendelson
7,356,556 B2 4/2008 Brydon
7,356,572 B2 4/2008 Jiang
7,396,990 B2 7/2008 Lu
7,424,682 B1 9/2008 Pupius
RE40,543 E 10/2008 Aoki
7,454,472 B2 11/2008 Szeto
7,454,480 B2 11/2008 Labio
7,478,132 B2 1/2009 Chen
7,491,878 B2 2/2009 Orr
7,498,504 B2 3/2009 Bourgeois
7,542,996 B2 6/2009 Fanning
7,552,183 B2 6/2009 Coletrane
7,568,010 B2 7/2009 Lyle
7,582,823 B2 9/2009 Kim
7,583,793 B2 9/2009 Jacovi
7,605,323 B2 10/2009 Ishii
7,672,873 B2 3/2010 Kindig
7,693,746 B2 4/2010 Wachi
7,703,022 B2 4/2010 Arthurs
7,711,838 B1 5/2010 Boulter

(56) References Cited

U.S. PATENT DOCUMENTS 7,720,910 B2 5/2010 Goodman
7,720,914 B2 5/2010 Goodman
7,720,934 B2 5/2010 Yanase
7,729,481 B2 6/2010 Thompson
7,730,178 B2 6/2010 Labio
7,737,853 B2 6/2010 Moskowitz
7,754,955 B2 7/2010 Egan
7,754,959 B2 7/2010 Herberger
7,774,420 B2 8/2010 Keohane
7,790,974 B2 9/2010 Sherwani
7,792,782 B2 * 9/2010 Yun ........................ G06Q 50/10
715/716
7,792,834 B2 9/2010 Sorensen
7,818,397 B2 10/2010 Jiang
7,822,830 B2 10/2010 Junghuber
7,831,670 B2 11/2010 Goodman
7,840,838 B2 11/2010 Stewart
7,844,673 B2 11/2010 Bostick
7,884,274 B1 2/2011 Wieder
7,902,447 B1 * 3/2011 Abrego ................ G10H 1/0025
704/257
7,917,148 B2 3/2011 Rosenberg
7,919,707 B2 4/2011 Harvey
7,948,357 B2 5/2011 Bodin
7,949,649 B2 5/2011 Whitman
7,958,156 B2 6/2011 Shriwas
7,962,558 B2 6/2011 Nelson
7,974,838 B1 7/2011 Lukin
8,022,287 B2 9/2011 Yamashita
8,026,436 B2 9/2011 Hufford
8,035,490 B2 10/2011 Hunt
8,042,118 B2 10/2011 Gilfix
8,053,659 B2 11/2011 Ricard
8,073,854 B2 12/2011 Whitman
8,143,509 B1 3/2012 Robertson
8,161,115 B2 4/2012 Yamamoto
8,166,111 B2 4/2012 Bhakta
8,184,783 B2 5/2012 Thompson
8,229,935 B2 7/2012 Lee
8,259,192 B2 9/2012 Nair
8,271,354 B2 9/2012 Deguchi
8,280,889 B2 10/2012 Whitman
8,316,146 B2 11/2012 Ehn
8,352,331 B2 1/2013 Dunning
8,354,579 B2 1/2013 Park
8,357,847 B2 * 1/2013 Huet .................... G10H 1/0025
84/609
8,359,382 B1 1/2013 Gailloux
8,402,097 B2 3/2013 Szeto
8,428,453 B1 4/2013 Spiegel
8,475,173 B2 7/2013 Mears
8,489,606 B2 7/2013 Lee
8,527,905 B2 9/2013 Chen
8,554,868 B2 10/2013 Skyrm
8,586,847 B2 11/2013 Ellis
8,595,301 B2 11/2013 Banks
8,627,308 B2 1/2014 Deluca
8,631,358 B2 1/2014 Louch
8,644,971 B2 2/2014 Weinstein
8,660,849 B2 2/2014 Gruber
8,670,979 B2 3/2014 Gruber
8,706,503 B2 4/2014 Cheyer
8,710,343 B2 * 4/2014 Kellett ..................... G10H 1/38
700/94
8,726,167 B2 5/2014 Arthurs
8,762,435 B1 6/2014 Rosenberg
8,775,972 B2 7/2014 Spiegel
8,798,438 B1 8/2014 Yagnik
8,799,000 B2 8/2014 Guzzoni
8,826,453 B2 9/2014 Arrelid
8,866,846 B2 10/2014 Kim
8,868,744 B2 10/2014 Levell
8,874,026 B2 10/2014 Anstandig
8,874,147 B2 10/2014 Chu
8,880,615 B2 11/2014 Tummalapenta
8,892,446 B2 11/2014 Cheyer
8,892,660 B2 11/2014 Chen
8,898,766 B2 11/2014 Garmark
8,903,716 B2 12/2014 Chen
8,909,725 B1 12/2014 Sehn
8,914,752 B1 12/2014 Spiegel
8,921,677 B1 12/2014 Severino
8,927,846 B2 1/2015 Matusiak
8,930,191 B2 1/2015 Gruber
8,938,507 B2 1/2015 Bostick
8,942,986 B2 1/2015 Cheyer
8,949,525 B2 2/2015 Niemela
8,969,699 B2 3/2015 Tabata
8,996,538 B1 3/2015 Cremer
9,015,285 B1 4/2015 Ebsen
9,021,038 B2 4/2015 Banks
9,026,943 B1 5/2015 Spiegel
9,031,243 B2 5/2015 Leboeuf
9,032,543 B2 5/2015 Arrelid
9,042,921 B2 5/2015 Karmarkar
9,043,412 B2 5/2015 Chen
9,043,850 B2 5/2015 Hoffert
9,063,640 B2 6/2015 Hoffert
9,066,048 B2 6/2015 Hoffert
9,069,868 B2 6/2015 Chen
9,071,562 B2 6/2015 Chung
9,071,798 B2 6/2015 Hoffert
9,076,264 B1 7/2015 Gillespie
9,076,423 B2 7/2015 Matusiak
9,083,770 B1 7/2015 Dröse
9,092,759 B2 7/2015 Hammer
9,094,137 B1 7/2015 Sehn
9,094,806 B2 7/2015 Chu
9,099,064 B2 8/2015 Sheffer
9,100,618 B2 8/2015 Hoffert
9,110,955 B1 8/2015 Bernhardsson
9,111,164 B1 8/2015 Anderton
9,112,849 B1 8/2015 Werkelin Ahlin
9,113,301 B1 8/2015 Spiegel
9,117,447 B2 8/2015 Gruber
9,143,681 B1 9/2015 Ebsen
9,148,424 B1 9/2015 Yang
9,158,754 B2 10/2015 Whitman
9,165,255 B1 10/2015 Shetty
9,195,383 B2 11/2015 Garmark
9,213,747 B2 12/2015 Cremer
9,225,310 B1 12/2015 Lukin
9,225,674 B2 12/2015 Fioretti
9,225,897 B1 12/2015 Sehn
9,230,218 B2 1/2016 González
9,237,202 B1 1/2016 Sehn
9,246,967 B2 1/2016 Garmark
9,276,886 B1 3/2016 Samaranayake
9,277,126 B2 3/2016 Marlin
9,288,200 B1 3/2016 Werkelin Ahlin
9,294,425 B1 3/2016 Son
9,299,104 B2 3/2016 Boulter
9,313,154 B1 4/2016 Son
9,318,108 B2 4/2016 Gruber
9,319,445 B2 4/2016 Garmark
9,342,613 B2 5/2016 Arthurs
9,350,312 B1 5/2016 Wishnick
9,354,868 B2 5/2016 Deluca
9,361,645 B2 6/2016 Boulter
9,361,869 B2 6/2016 Rex
9,367,587 B2 6/2016 Bieschke
9,369,514 B2 6/2016 Bernhardsson
9,380,059 B2 6/2016 Aslund
9,385,983 B1 7/2016 Sehn
9,396,354 B1 7/2016 Murphy
9,402,093 B2 7/2016 Lieu
9,406,072 B2 8/2016 Whitman
9,407,712 B1 8/2016 Sehn
9,407,816 B1 8/2016 Sehn
9,423,998 B2 8/2016 Dziuk
9,424,604 B2 8/2016 Boulter
9,430,783 B1 8/2016 Sehn
9,432,428 B2 8/2016 Werkelin Ahlin
D766,967 S 9/2016 Giovanni

(56) References Cited

U.S. PATENT DOCUMENTS 9,436,962 B2 9/2016 Boulter
9,438,582 B2 9/2016 Garmark
9,443,266 B2 9/2016 Boulter
9,448,763 B1 9/2016 Dziuk
9,449,341 B2 9/2016 Boulter
9,451,329 B2 9/2016 Whitman
D768,674 S 10/2016 Hanover
9,473,432 B2 10/2016 Chung
9,482,882 B1 11/2016 Hanover
9,482,883 B1 11/2016 Meisenholder
9,483,166 B2 11/2016 Dziuk
9,489,113 B2 11/2016 Dziuk
9,489,527 B2 11/2016 Arrelid
9,503,500 B2 11/2016 Bernhardsson
9,503,780 B2 11/2016 Hoffert
9,509,269 B1 11/2016 Rosenberg
9,510,024 B2 11/2016 Öman
9,510,131 B2 11/2016 Zhu
9,514,476 B2 12/2016 Kay
9,515,630 B2 12/2016 Wallander
9,516,082 B2 12/2016 Hoffert
9,529,888 B2 12/2016 Hoffert
9,531,989 B1 12/2016 Jehan
9,532,171 B2 12/2016 Allen
9,536,560 B2 1/2017 Jehan
9,542,917 B2 1/2017 Sheffer
9,542,918 B2 1/2017 Matusiak
9,547,679 B2 1/2017 Whitman
9,554,186 B2 1/2017 Tsiridis
9,563,268 B2 2/2017 Smith
9,563,700 B2 2/2017 Garmark
9,565,456 B2 2/2017 Helferty
9,568,994 B2 2/2017 Jehan
9,570,059 B2 2/2017 Garmark
D781,906 S 3/2017 Yu
D782,520 S 3/2017 Yu
D782,533 S 3/2017 Yu
9,589,237 B1 3/2017 Qamar
9,600,466 B2 3/2017 Whitman
9,606,620 B2 3/2017 Dziuk
9,609,448 B2 3/2017 Bentley
9,613,118 B2 4/2017 Whitman
9,613,654 B2 4/2017 Cameron
9,626,436 B2 4/2017 Rodger
9,635,068 B2 4/2017 Garmark
9,635,416 B2 4/2017 Hoffert
9,635,556 B2 4/2017 Afzelius
9,641,891 B2 5/2017 Hoffert
9,654,531 B2 5/2017 Hoffert
9,654,532 B2 5/2017 Strigeus
9,654,822 B2 5/2017 Hoffert
9,659,068 B1 5/2017 Mattsson
9,661,379 B2 5/2017 Hoffert
9,668,217 B1 5/2017 Bamberger
9,679,305 B1 6/2017 Bhat
9,716,733 B2 7/2017 Strigeus
9,721,551 B2 * 8/2017 Silverstein ............ G10H 1/368
9,729,816 B1 8/2017 Jehan
9,740,023 B1 8/2017 Ashwood
9,742,871 B1 8/2017 Gibson
9,746,692 B1 8/2017 Streets
9,749,378 B2 8/2017 Olenfalk
9,753,925 B2 9/2017 Cremer
9,766,854 B2 9/2017 Medaghri Alaoui
9,787,687 B2 10/2017 Lof
9,792,010 B2 10/2017 Hoffert
9,794,309 B2 10/2017 Persson
9,794,827 B2 10/2017 Zhu
9,798,514 B2 10/2017 Silva
9,798,823 B2 10/2017 Cody
9,799,312 B1 10/2017 Cabral
9,800,631 B2 10/2017 Persson
9,825,801 B1 11/2017 Bakken
9,843,764 B1 12/2017 Jehan
9,875,010 B2 1/2018 Persson
9,881,596 B2 1/2018 Matusiak
9,883,284 B2 1/2018 Bohrarper
9,904,506 B1 2/2018 Jehan
9,917,869 B2 3/2018 Hoffert
D814,186 S 4/2018 Spiegel
D814,493 S 4/2018 Brody
D815,127 S 4/2018 Phillips
D815,128 S 4/2018 Phillips
D815,129 S 4/2018 Phillips
D815,130 S 4/2018 Phillips
9,933,993 B2 4/2018 Garmark
9,934,467 B2 4/2018 Jacobson
9,934,785 B1 4/2018 Hulaud
9,935,943 B2 4/2018 Werkelin Ahlin
9,935,944 B2 4/2018 Garmark
9,942,283 B2 4/2018 Garmark
9,942,356 B1 4/2018 Gibson
9,948,736 B1 4/2018 Mengistu
9,973,635 B1 5/2018 Edling
9,973,806 B2 5/2018 Tsiridis
9,978,426 B2 5/2018 Smith
9,979,768 B2 5/2018 Hoffert
D820,298 S 6/2018 Yu
10,002,123 B2 6/2018 Whitman
10,003,840 B2 6/2018 Richman
10,021,156 B2 7/2018 Conway
10,025,786 B2 7/2018 Jehan
10,033,474 B1 7/2018 Gibson
10,034,064 B2 7/2018 Hoffert
10,038,962 B2 7/2018 Bentley
D824,924 S 8/2018 Phillips
D825,581 S 8/2018 Phillips
D825,582 S 8/2018 Phillips
10,055,413 B2 8/2018 Jehan
10,063,600 B1 8/2018 Marsh
10,063,608 B2 8/2018 Oskarsson
10,066,954 B1 9/2018 Swanson
10,075,496 B2 9/2018 Garmark
10,082,939 B2 9/2018 Medaghri Alaoui
D829,742 S 10/2018 Phillips
D829,743 S 10/2018 Phillips
D829,750 S 10/2018 Phillips
D830,375 S 10/2018 Phillips
D830,395 S 10/2018 Phillips
D831,691 S 10/2018 Brody
10,089,309 B2 10/2018 Polacek
10,089,578 B2 10/2018 Jehan
10,097,604 B2 10/2018 Hoffert
10,101,960 B2 10/2018 Jehan
10,102,680 B2 10/2018 Jurgenson
10,108,708 B2 10/2018 O'Driscoll
10,110,649 B2 10/2018 Hoffert
10,110,947 B2 10/2018 Hoffert
10,115,435 B2 10/2018 Lee
10,133,545 B2 11/2018 Gibson
10,133,918 B1 11/2018 Chang
10,133,974 B2 11/2018 Cassidy
10,134,059 B2 11/2018 Mishra
10,148,789 B2 12/2018 Gibson
10,163,429 B2 * 12/2018 Silverstein ............... G10H 1/00
10,165,357 B2 12/2018 Bohrarper
10,165,402 B1 12/2018 Davis
10,171,055 B2 1/2019 Bailey
10,185,538 B2 1/2019 Oskarsson
10,185,539 B2 1/2019 Bailey
10,185,767 B2 1/2019 Bernhardsson
10,187,676 B2 1/2019 Lieu
10,209,950 B2 2/2019 Smith
10,223,063 B2 3/2019 Gibson
10,235,127 B2 3/2019 Jehan
10,248,380 B2 4/2019 Bailey
10,250,933 B2 4/2019 Whitman
10,262,641 B2 * 4/2019 Silverstein ............ G06N 20/00
D847,788 S 5/2019 Baker
10,282,163 B2 5/2019 Jehan
10,298,636 B2 5/2019 Krawczyk
10,311,842 B2 * 6/2019 Silverstein ............. G10L 25/15
10,334,073 B2 6/2019 Gibson
10,360,260 B2 7/2019 Zhu

(56) References Cited

U.S. PATENT DOCUMENTS

| | | | | |
|---|---|---|---|---|
| 10,366,334 | B2 | 7/2019 | Jacobson | |
| 10,372,757 | B2 | 8/2019 | Jehan | |
| 10,380,649 | B2 | 8/2019 | Johnson | |
| 10,387,478 | B2 | 8/2019 | Cao | |
| 10,387,481 | B2 | 8/2019 | Jehan | |
| 10,387,489 | B1 | 8/2019 | Reiley, Jr. | |
| 10,396,744 | B2 | 8/2019 | McClellan | |
| 10,412,183 | B2 | 9/2019 | Gibson | |
| 10,423,943 | B2 | 9/2019 | Wood | |
| 10,445,809 | B2 | 10/2019 | Dunning | |
| 10,459,904 | B2 | 10/2019 | Whitman | |
| 10,460,248 | B2 | 10/2019 | Stowell | |
| 10,467,998 | B2 * | 11/2019 | Silverstein | G10H 1/00 |
| 2001/0007960 | A1 * | 7/2001 | Yoshihara | G10H 1/0025 700/94 |
| 2001/0025561 | A1 | 10/2001 | Milbum | |
| 2001/0047717 | A1 * | 12/2001 | Aoki | H04M 19/041 84/611 |
| 2002/0000156 | A1 * | 1/2002 | Nishimoto | G10H 1/0058 84/609 |
| 2002/0002899 | A1 | 1/2002 | Gjerdingen | |
| 2002/0007720 | A1 * | 1/2002 | Aoki | G10H 1/0025 84/609 |
| 2002/0007721 | A1 * | 1/2002 | Aoki | G10H 1/0025 84/613 |
| 2002/0007722 | A1 * | 1/2002 | Aoki | G10H 1/0025 84/635 |
| 2002/0011145 | A1 * | 1/2002 | Aoki | G10H 1/0025 84/609 |
| 2002/0017188 | A1 * | 2/2002 | Aoki | G10H 1/36 84/611 |
| 2002/0023529 | A1 * | 2/2002 | Kurakake | G10H 1/0025 84/610 |
| 2002/0029685 | A1 * | 3/2002 | Aoki | G10H 1/38 84/613 |
| 2002/0035915 | A1 * | 3/2002 | Tolonen | G10G 3/04 84/616 |
| 2002/0129023 | A1 | 9/2002 | Holloway | |
| 2002/0134219 | A1 * | 9/2002 | Aoki | G10H 1/0025 84/609 |
| 2002/0177186 | A1 | 11/2002 | Sternheimer | |
| 2002/0184128 | A1 | 12/2002 | Holtsinger | |
| 2002/0193996 | A1 | 12/2002 | Squibbs | |
| 2003/0013497 | A1 | 1/2003 | Yamaki | |
| 2003/0018727 | A1 | 1/2003 | Yamamoto | |
| 2003/0037664 | A1 | 2/2003 | Comair | |
| 2003/0089216 | A1 * | 5/2003 | Birmingham | G10H 1/0041 84/609 |
| 2003/0131715 | A1 | 7/2003 | Georges | |
| 2003/0160944 | A1 | 8/2003 | Foote | |
| 2003/0183065 | A1 | 10/2003 | Leach | |
| 2003/0205124 | A1 | 11/2003 | Foote | |
| 2004/0019645 | A1 | 1/2004 | Goodman | |
| 2004/0024822 | A1 | 2/2004 | Werndorfer | |
| 2004/0025668 | A1 | 2/2004 | Jarrett | |
| 2004/0027369 | A1 | 2/2004 | Kellock | |
| 2004/0089140 | A1 | 5/2004 | Georges | |
| 2004/0089141 | A1 | 5/2004 | Georges | |
| 2004/0159213 | A1 * | 8/2004 | Eruera | G10H 1/0025 84/609 |
| 2004/0215731 | A1 | 10/2004 | Tzann-En Szeto | |
| 2005/0076772 | A1 * | 4/2005 | Gartland-Jones | G10H 1/0025 84/615 |
| 2005/0091278 | A1 * | 4/2005 | Wang | G10H 1/0008 |
| 2005/0102351 | A1 | 5/2005 | Jiang | |
| 2005/0109194 | A1 * | 5/2005 | Gayama | G10H 1/00 84/613 |
| 2005/0180462 | A1 | 8/2005 | Yi | |
| 2005/0223071 | A1 | 10/2005 | Hosono | |
| 2005/0267896 | A1 | 12/2005 | Goodman | |
| 2005/0273499 | A1 | 12/2005 | Goodman | |
| 2006/0011044 | A1 | 1/2006 | Chew | |
| 2006/0015560 | A1 | 1/2006 | MacAuley | |
| 2006/0018447 | A1 | 1/2006 | Jacovi | |
| 2006/0059236 | A1 | 3/2006 | Sheppard | |
| 2006/0122840 | A1 | 6/2006 | Anderson | |
| 2006/0130635 | A1 | 6/2006 | Rubang, Jr. | |
| 2006/0168346 | A1 | 7/2006 | Chen | |
| 2006/0212818 | A1 | 9/2006 | Lee | |
| 2006/0230909 | A1 | 10/2006 | Song | |
| 2006/0230910 | A1 | 10/2006 | Song | |
| 2006/0236848 | A1 | 10/2006 | Stone | |
| 2006/0243119 | A1 | 11/2006 | Rubang, Jr. | |
| 2007/0005719 | A1 | 1/2007 | Szeto | |
| 2007/0094341 | A1 | 4/2007 | Bostick | |
| 2007/0106731 | A1 | 5/2007 | Bhakta | |
| 2007/0112919 | A1 | 5/2007 | Lyle | |
| 2007/0116195 | A1 | 5/2007 | Thompson | |
| 2007/0137463 | A1 * | 6/2007 | Lumsden | G10H 1/0025 84/603 |
| 2007/0174401 | A1 | 7/2007 | Chu | |
| 2007/0208990 | A1 | 9/2007 | Kim | |
| 2007/0209006 | A1 | 9/2007 | Arthurs | |
| 2007/0221044 | A1 * | 9/2007 | Orr | G10H 1/0025 84/609 |
| 2007/0261535 | A1 | 11/2007 | Sherwani | |
| 2007/0285250 | A1 | 12/2007 | Moskowitz | |
| 2007/0288589 | A1 | 12/2007 | Chen | |
| 2007/0300101 | A1 | 12/2007 | Stewart | |
| 2008/0010372 | A1 | 1/2008 | Khedouri | |
| 2008/0136605 | A1 | 6/2008 | Hunt | |
| 2008/0139177 | A1 | 6/2008 | Jiang | |
| 2008/0141850 | A1 * | 6/2008 | Cope | G10H 1/0025 84/609 |
| 2008/0147774 | A1 | 6/2008 | Tummalapenta | |
| 2008/0156178 | A1 | 7/2008 | Georges | |
| 2008/0168154 | A1 | 7/2008 | Skyrm | |
| 2008/0189171 | A1 | 8/2008 | Wasserblat | |
| 2008/0195742 | A1 | 8/2008 | Gilfix | |
| 2008/0212947 | A1 | 9/2008 | Nesvadba | |
| 2008/0222264 | A1 | 9/2008 | Bostick | |
| 2008/0230598 | A1 | 9/2008 | Bodin | |
| 2008/0235285 | A1 | 9/2008 | Della Pasqua | |
| 2008/0256208 | A1 | 10/2008 | Keohane | |
| 2008/0288095 | A1 * | 11/2008 | Miyajima | G10H 1/0025 700/94 |
| 2009/0019174 | A1 | 1/2009 | Ehn | |
| 2009/0031000 | A1 | 1/2009 | Szeto | |
| 2009/0069914 | A1 | 3/2009 | Kemp | |
| 2009/0071315 | A1 * | 3/2009 | Fortuna | G10H 1/0025 84/609 |
| 2009/0089389 | A1 | 4/2009 | Chen | |
| 2009/0114079 | A1 | 5/2009 | Egan | |
| 2009/0132668 | A1 | 5/2009 | Coletrane | |
| 2009/0164598 | A1 | 6/2009 | Nelson | |
| 2009/0193090 | A1 | 7/2009 | Banks | |
| 2009/0216744 | A1 | 8/2009 | Shriwas | |
| 2009/0217805 | A1 | 9/2009 | Lee | |
| 2009/0222536 | A1 | 9/2009 | Junghuber | |
| 2009/0238538 | A1 | 9/2009 | Fink | |
| 2009/0244000 | A1 | 10/2009 | Thompson | |
| 2009/0249945 | A1 | 10/2009 | Yamashita | |
| 2009/0291707 | A1 | 11/2009 | Choi | |
| 2009/0316862 | A1 | 12/2009 | Sugimoto | |
| 2010/0043625 | A1 | 2/2010 | Van Geenen | |
| 2010/0050854 | A1 * | 3/2010 | Huet | G10H 1/0025 84/611 |
| 2010/0115432 | A1 | 5/2010 | Arthurs | |
| 2010/0131895 | A1 | 5/2010 | Wohlert | |
| 2010/0212478 | A1 | 8/2010 | Taub | |
| 2010/0224051 | A1 * | 9/2010 | Kurebayashi | G10H 1/22 84/637 |
| 2010/0250510 | A1 | 9/2010 | Herberger | |
| 2010/0250585 | A1 | 9/2010 | Hagg | |
| 2010/0257995 | A1 * | 10/2010 | Kamiya | G10H 1/0025 84/645 |
| 2010/0305732 | A1 | 12/2010 | Serletic | |
| 2010/0307320 | A1 * | 12/2010 | Hoeberechts | G10H 1/0025 84/600 |
| 2010/0307321 | A1 | 12/2010 | Mann | |

(56) References Cited

U.S. PATENT DOCUMENTS

2011/0010321 A1* 1/2011 Pachet ................ G10H 1/0025 706/12
2011/0075851 A1 3/2011 Leboeuf
2011/0142420 A1 6/2011 Singer
2011/0184542 A1 7/2011 Tsoneva
2011/0224969 A1 9/2011 Mulligan
2011/0258383 A1 10/2011 Niemela
2011/0273455 A1 11/2011 Powar
2011/0276396 A1 11/2011 Rathod
2011/0316793 A1 12/2011 Fushiki
2011/0320545 A1 12/2011 Hammer
2012/0005667 A1 1/2012 Deluca
2012/0007605 A1 1/2012 Benedikt
2012/0007884 A1 1/2012 Kim
2012/0084373 A1 4/2012 Chen
2012/0131115 A1 5/2012 Levell
2012/0185778 A1 7/2012 Arthurs
2012/0210212 A1 8/2012 Chen
2012/0259240 A1 10/2012 Llewellynn
2012/0312145 A1* 12/2012 Kellett .................... G10H 1/38 84/613
2013/0005346 A1 1/2013 Chu
2013/0006627 A1 1/2013 Guthery
2013/0110505 A1 5/2013 Gruber
2013/0110519 A1 5/2013 Cheyer
2013/0124658 A1 5/2013 Fioretti
2013/0139271 A1 5/2013 Arrelid
2013/0185081 A1 7/2013 Cheyer
2013/0283150 A1 10/2013 Chen
2013/0287227 A1 10/2013 Wallander
2013/0332400 A1 12/2013 Gonzalez
2013/0332532 A1 12/2013 Bernhardsson
2013/0332842 A1 12/2013 Bernhardsson
2014/0000440 A1 1/2014 Georges
2014/0006483 A1 1/2014 Garmark
2014/0006947 A1 1/2014 Garmark
2014/0040401 A1 2/2014 Banks
2014/0052282 A1 2/2014 Balassanian
2014/0055633 A1 2/2014 Marlin
2014/0058735 A1 2/2014 Sharp
2014/0069263 A1 3/2014 Chen
2014/0089897 A1 3/2014 Deluca
2014/0108929 A1 4/2014 Garmark
2014/0115114 A1 4/2014 Garmark
2014/0129953 A1 5/2014 Spiegel
2014/0139555 A1 5/2014 Levy
2014/0164361 A1 6/2014 Chung
2014/0164524 A1 6/2014 Chung
2014/0174279 A1* 6/2014 Wong .................. G10H 1/0025 84/609
2014/0214927 A1 7/2014 Garmark
2014/0215334 A1 7/2014 Garmark
2014/0279817 A1 9/2014 Whitman
2014/0289241 A1 9/2014 Anderson
2014/0301573 A1 10/2014 Kiely
2014/0310779 A1 10/2014 Lof
2014/0331332 A1 11/2014 Arrelid
2014/0337959 A1 11/2014 Garmark
2014/0344718 A1 11/2014 Rapaport
2014/0355789 A1 12/2014 Bohrarper
2014/0359024 A1 12/2014 Spiegel
2014/0359032 A1 12/2014 Spiegel
2014/0368734 A1 12/2014 Hoffert
2014/0368735 A1 12/2014 Hoffert
2014/0368737 A1 12/2014 Hoffert
2014/0368738 A1 12/2014 Hoffert
2014/0372888 A1 12/2014 Hoffert
2014/0373057 A1 12/2014 Hoffert
2015/0017915 A1 1/2015 Hennequin
2015/0026578 A1 1/2015 Rav-Acha
2015/0039726 A1 2/2015 Hoffert
2015/0039780 A1 2/2015 Hoffert
2015/0039781 A1 2/2015 Hoffert
2015/0040169 A1 2/2015 Hoffert
2015/0058733 A1 2/2015 Novikoff
2015/0059558 A1* 3/2015 Morell ................ G10H 1/0025 84/609
2015/0088828 A1 3/2015 Strigeus
2015/0088890 A1 3/2015 Hoffert
2015/0088899 A1 3/2015 Hoffert
2015/0089075 A1 3/2015 Strigeus
2015/0106887 A1 4/2015 Aslund
2015/0113407 A1 4/2015 Hoffert
2015/0154979 A1 6/2015 Uemura
2015/0179157 A1 6/2015 Chon
2015/0194185 A1 7/2015 Eronen
2015/0199122 A1 7/2015 Garmark
2015/0206523 A1 7/2015 Song
2015/0229684 A1 8/2015 Olenfalk
2015/0234833 A1 8/2015 Cremer
2015/0248618 A1 9/2015 Johnson
2015/0255052 A1 9/2015 Rex
2015/0277707 A1 10/2015 Dziuk
2015/0289023 A1 10/2015 Richman
2015/0289025 A1 10/2015 McLeod
2015/0293925 A1 10/2015 Greenzeiger
2015/0317391 A1* 11/2015 Harrison .............. G06F 16/639 715/716
2015/0317680 A1 11/2015 Richman
2015/0317690 A1 11/2015 Mishra
2015/0317691 A1 11/2015 Mishra
2015/0319479 A1 11/2015 Mishra
2015/0324594 A1 11/2015 Arrelid
2015/0331943 A1 11/2015 Luo
2015/0334455 A1 11/2015 Hoffert
2015/0340021 A1 11/2015 Sheffer
2015/0365719 A1 12/2015 Hoffert
2015/0365720 A1 12/2015 Hoffert
2015/0365795 A1 12/2015 Allen
2015/0370466 A1 12/2015 Hoffert
2016/0006927 A1 1/2016 Sehn
2016/0007077 A1 1/2016 Hoffert
2016/0055838 A1 2/2016 Serletic, II
2016/0066004 A1 3/2016 Lieu
2016/0071549 A1 3/2016 Von Sneidern
2016/0080780 A1 3/2016 Öman
2016/0080835 A1 3/2016 Von Sneidern
2016/0085773 A1 3/2016 Chang
2016/0085863 A1 3/2016 Allen
2016/0094863 A1 3/2016 Helferty
2016/0099901 A1 4/2016 Allen
2016/0103589 A1 4/2016 Dziuk
2016/0103595 A1 4/2016 Dziuk
2016/0103656 A1 4/2016 Dziuk
2016/0124953 A1 5/2016 Cremer
2016/0124969 A1 5/2016 Rashad
2016/0125078 A1 5/2016 Rashad
2016/0125860 A1 5/2016 Rashad
2016/0127772 A1 5/2016 Tsiridis
2016/0132594 A1 5/2016 Rashad
2016/0133241 A1 5/2016 Rashad
2016/0133242 A1* 5/2016 Morell ................ G10H 1/0025 84/618
2016/0147435 A1 5/2016 Brody
2016/0148605 A1* 5/2016 Minamitaka ............ G10H 1/38 84/609
2016/0148606 A1* 5/2016 Minamitaka ........ G10H 1/0025 84/609
2016/0173763 A1 6/2016 Marlin
2016/0180887 A1 6/2016 Sehn
2016/0182422 A1 6/2016 Sehn
2016/0182590 A1 6/2016 Afzelius
2016/0182875 A1 6/2016 Sehn
2016/0189222 A1 6/2016 Richman
2016/0189223 A1 6/2016 McLeod
2016/0189232 A1 6/2016 Meyer
2016/0189249 A1 6/2016 Meyer
2016/0191574 A1 6/2016 Garmark
2016/0191590 A1 6/2016 Werkelin Ahlin
2016/0191599 A1 6/2016 Stridsman
2016/0191997 A1 6/2016 Eklund
2016/0192096 A1 6/2016 Bentley
2016/0196812 A1 7/2016 Rashad
2016/0203586 A1 7/2016 Chang

(56) References Cited

U.S. PATENT DOCUMENTS

| | | | |
|---|---|---|---|
| 2016/0210545 A1 | 7/2016 | Anderton | |
| 2016/0226941 A1 | 8/2016 | Esún | |
| 2016/0234151 A1 | 8/2016 | Son | |
| 2016/0239248 A1 | 8/2016 | Sehn | |
| 2016/0247189 A1 | 8/2016 | Shirley | |
| 2016/0249091 A1 | 8/2016 | Lennon | |
| 2016/0260123 A1 | 9/2016 | Mishra | |
| 2016/0260140 A1 | 9/2016 | Shirley | |
| 2016/0267944 A1 | 9/2016 | Lammers | |
| 2016/0285937 A1 | 9/2016 | Whitman | |
| 2016/0292269 A1 | 10/2016 | O'Driscoll | |
| 2016/0292272 A1 | 10/2016 | O'Driscoll | |
| 2016/0292771 A1 | 10/2016 | Afzelius | |
| 2016/0294896 A1 | 10/2016 | O'Driscoll | |
| 2016/0309209 A1 | 10/2016 | Lieu | |
| 2016/0313872 A1 | 10/2016 | Garmark | |
| 2016/0321708 A1 | 11/2016 | Sehn | |
| 2016/0323691 A1 | 11/2016 | Zhu | |
| 2016/0328360 A1 | 11/2016 | Pavlovskaia | |
| 2016/0328409 A1 | 11/2016 | Ogle | |
| 2016/0334945 A1 | 11/2016 | Medaghri Alaoui | |
| 2016/0334978 A1 | 11/2016 | Persson | |
| 2016/0334979 A1 | 11/2016 | Persson | |
| 2016/0334980 A1 | 11/2016 | Persson | |
| 2016/0335045 A1 | 11/2016 | Medaghri Alaoui | |
| 2016/0335046 A1 | 11/2016 | Medaghri Alaoui | |
| 2016/0335047 A1 | 11/2016 | Medaghri Alaoui | |
| 2016/0335048 A1 | 11/2016 | Medaghri Alaoui | |
| 2016/0335049 A1 | 11/2016 | Persson | |
| 2016/0335266 A1 | 11/2016 | Ogle | |
| 2016/0337260 A1 | 11/2016 | Persson | |
| 2016/0337419 A1 | 11/2016 | Persson | |
| 2016/0337425 A1 | 11/2016 | Medaghri Alaoui | |
| 2016/0337429 A1 | 11/2016 | Persson | |
| 2016/0337432 A1 | 11/2016 | Persson | |
| 2016/0337434 A1 | 11/2016 | Bajraktari | |
| 2016/0337854 A1 | 11/2016 | Afzelius | |
| 2016/0342199 A1 | 11/2016 | Smith | |
| 2016/0342200 A1 | 11/2016 | Dziuk | |
| 2016/0342201 A1 | 11/2016 | Jehan | |
| 2016/0342295 A1 | 11/2016 | Jehan | |
| 2016/0342382 A1 | 11/2016 | Jehan | |
| 2016/0342594 A1 | 11/2016 | Jehan | |
| 2016/0342598 A1 | 11/2016 | Jehan | |
| 2016/0342686 A1 | 11/2016 | Garmark | |
| 2016/0342687 A1 | 11/2016 | Garmark | |
| 2016/0343363 A1 | 11/2016 | Garmark | |
| 2016/0343399 A1 | 11/2016 | Jehan | |
| 2016/0343410 A1 | 11/2016 | Smith | |
| 2016/0366458 A1 | 12/2016 | Whitman | |
| 2016/0378269 A1 | 12/2016 | Conway | |
| 2016/0379274 A1 | 12/2016 | Irwin | |
| 2016/0381106 A1 | 12/2016 | Conway | |
| 2017/0010796 A1 | 1/2017 | Dziuk | |
| 2017/0017993 A1 | 1/2017 | Shirley | |
| 2017/0019441 A1 | 1/2017 | Garmark | |
| 2017/0019446 A1 | 1/2017 | Son | |
| 2017/0024092 A1 | 1/2017 | Dziuk | |
| 2017/0024093 A1 | 1/2017 | Dziuk | |
| 2017/0024399 A1 | 1/2017 | Boyle | |
| 2017/0024486 A1 | 1/2017 | Jacobson | |
| 2017/0024650 A1 | 1/2017 | Jacobson | |
| 2017/0024655 A1 | 1/2017 | Stowell | |
| 2017/0039027 A1 | 2/2017 | Dziuk | |
| 2017/0048563 A1 | 2/2017 | Öman | |
| 2017/0048750 A1 | 2/2017 | Zhu | |
| 2017/0075468 A1 | 3/2017 | Dziuk | |
| 2017/0083505 A1 | 3/2017 | Whitman | |
| 2017/0085552 A1 | 3/2017 | Werkelin Ahlin | |
| 2017/0085929 A1 | 3/2017 | Arpteg | |
| 2017/0092247 A1* | 3/2017 | Silverstein | G10H 1/00 |
| 2017/0092324 A1 | 3/2017 | Leonard | |
| 2017/0102837 A1 | 4/2017 | Toumpelis | |
| 2017/0103075 A1 | 4/2017 | Toumpelis | |
| 2017/0103740 A1 | 4/2017 | Hwang | |
| 2017/0116533 A1 | 4/2017 | Jehan | |
| 2017/0118192 A1 | 4/2017 | Garmark | |
| 2017/0124713 A1 | 5/2017 | Jurgenson | |
| 2017/0134795 A1 | 5/2017 | Tsiridis | |
| 2017/0139912 A1 | 5/2017 | Whitman | |
| 2017/0140060 A1 | 5/2017 | Cody | |
| 2017/0140261 A1 | 5/2017 | Qamar | |
| 2017/0149717 A1 | 5/2017 | Sehn | |
| 2017/0150211 A1 | 5/2017 | Helferty | |
| 2017/0154109 A1 | 6/2017 | Lynch | |
| 2017/0161119 A1 | 6/2017 | Boyle | |
| 2017/0161382 A1 | 6/2017 | Ouimet | |
| 2017/0169107 A1 | 6/2017 | Bernhardsson | |
| 2017/0169858 A1 | 6/2017 | Lee | |
| 2017/0177297 A1 | 6/2017 | Jehan | |
| 2017/0177585 A1 | 6/2017 | Rodger | |
| 2017/0177605 A1 | 6/2017 | Hoffert | |
| 2017/0180438 A1 | 6/2017 | Persson | |
| 2017/0180826 A1 | 6/2017 | Hoffert | |
| 2017/0187672 A1 | 6/2017 | Banks | |
| 2017/0187771 A1 | 6/2017 | Falcon | |
| 2017/0188102 A1 | 6/2017 | Zhang | |
| 2017/0192649 A1 | 7/2017 | Bakken | |
| 2017/0195813 A1 | 7/2017 | Bentley | |
| 2017/0220316 A1 | 8/2017 | Garmark | |
| 2017/0229030 A1 | 8/2017 | Aguayo, Jr. | |
| 2017/0230295 A1 | 8/2017 | Polacek | |
| 2017/0230354 A1 | 8/2017 | Afzelius | |
| 2017/0230429 A1 | 8/2017 | Garmark | |
| 2017/0230438 A1 | 8/2017 | Turkoglu | |
| 2017/0235540 A1 | 8/2017 | Jehan | |
| 2017/0235541 A1 | 8/2017 | Smith | |
| 2017/0235826 A1 | 8/2017 | Garmark | |
| 2017/0244770 A1 | 8/2017 | Eckerdal | |
| 2017/0248799 A1 | 8/2017 | Streets | |
| 2017/0248801 A1 | 8/2017 | Ashwood | |
| 2017/0249306 A1 | 8/2017 | Allen | |
| 2017/0251039 A1 | 8/2017 | Hoffert | |
| 2017/0262139 A1 | 9/2017 | Patel | |
| 2017/0262253 A1 | 9/2017 | Silva | |
| 2017/0262994 A1 | 9/2017 | Kudriashov | |
| 2017/0263029 A1 | 9/2017 | Yan | |
| 2017/0263030 A1 | 9/2017 | Allen | |
| 2017/0263225 A1* | 9/2017 | Silverstein | G10H 1/368 |
| 2017/0263226 A1* | 9/2017 | Silverstein | G10H 1/00 |
| 2017/0263227 A1* | 9/2017 | Silverstein | G10L 25/15 |
| 2017/0263228 A1* | 9/2017 | Silverstein | G10H 1/00 |
| 2017/0264578 A1 | 9/2017 | Allen | |
| 2017/0264660 A1 | 9/2017 | Eckerdal | |
| 2017/0264817 A1 | 9/2017 | Yan | |
| 2017/0270125 A1 | 9/2017 | Mattsson | |
| 2017/0286536 A1 | 10/2017 | Rando | |
| 2017/0286752 A1 | 10/2017 | Gusarov | |
| 2017/0289234 A1 | 10/2017 | Andreou | |
| 2017/0289489 A1 | 10/2017 | Hoffert | |
| 2017/0295250 A1 | 10/2017 | Samaranayake | |
| 2017/0300567 A1 | 10/2017 | Jehan | |
| 2017/0301372 A1 | 10/2017 | Jehan | |
| 2017/0308794 A1 | 10/2017 | Fischerström | |
| 2017/0344246 A1 | 11/2017 | Burfitt | |
| 2017/0344539 A1 | 11/2017 | Zvoncek | |
| 2017/0346867 A1 | 11/2017 | Olenfalk | |
| 2017/0353405 A1 | 12/2017 | O'Driscoll | |
| 2017/0358285 A1 | 12/2017 | Cabral | |
| 2017/0358320 A1 | 12/2017 | Cameron | |
| 2017/0366780 A1 | 12/2017 | Jehan | |
| 2017/0372364 A1 | 12/2017 | Andreou | |
| 2017/0374003 A1 | 12/2017 | Allen | |
| 2017/0374508 A1 | 12/2017 | Davis | |
| 2018/0004480 A1 | 1/2018 | Medaghri Alaoui | |
| 2018/0005026 A1 | 1/2018 | Shaburov | |
| 2018/0005420 A1 | 1/2018 | Bondich | |
| 2018/0007286 A1 | 1/2018 | Li | |
| 2018/0007444 A1 | 1/2018 | Li | |
| 2018/0018079 A1 | 1/2018 | Monastyrshyn | |
| 2018/0018397 A1 | 1/2018 | Cody | |
| 2018/0018948 A1* | 1/2018 | Silverstein | G06N 7/005 |
| 2018/0025004 A1 | 1/2018 | Koenig | |
| 2018/0025372 A1 | 1/2018 | Ahmed | |

(56) References Cited

U.S. PATENT DOCUMENTS

| | | | | |
|---|---|---|---|---|
| 2018/0041517 | A1 | 2/2018 | Lof | |
| 2018/0052921 | A1 | 2/2018 | Deglopper | |
| 2018/0054592 | A1 | 2/2018 | Jehan | |
| 2018/0054704 | A1 | 2/2018 | Toumpelis | |
| 2018/0069743 | A1 | 3/2018 | Bakken | |
| 2018/0076913 | A1 | 3/2018 | Kiely | |
| 2018/0089904 | A1 | 3/2018 | Jurgenson | |
| 2018/0095715 | A1 | 4/2018 | Jehan | |
| 2018/0096064 | A1 | 4/2018 | Lennon | |
| 2018/0103002 | A1 | 4/2018 | Sehn | |
| 2018/0109820 | A1 | 4/2018 | Pompa | |
| 2018/0129659 | A1 | 5/2018 | Jehan | |
| 2018/0129745 | A1 | 5/2018 | Jehan | |
| 2018/0136612 | A1 | 5/2018 | Zayets-Volshin | |
| 2018/0139333 | A1 | 5/2018 | Edling | |
| 2018/0150276 | A1 | 5/2018 | Vacek | |
| 2018/0157746 | A1 | 6/2018 | Zhu | |
| 2018/0164986 | A1 | 6/2018 | Al Majid | |
| 2018/0167726 | A1 | 6/2018 | Bohrarper | |
| 2018/0181849 | A1 | 6/2018 | Cassidy | |
| 2018/0182394 | A1 | 6/2018 | Hulaud | |
| 2018/0188054 | A1 | 7/2018 | Kennedy | |
| 2018/0188945 | A1 | 7/2018 | Garmark | |
| 2018/0189020 | A1 | 7/2018 | Oskarsson | |
| 2018/0189021 | A1 | 7/2018 | Oskarsson | |
| 2018/0189023 | A1 | 7/2018 | Garmark | |
| 2018/0189226 | A1 | 7/2018 | Hofverberg | |
| 2018/0189278 | A1 | 7/2018 | Garmark | |
| 2018/0189306 | A1 | 7/2018 | Lamere | |
| 2018/0189408 | A1 | 7/2018 | O'Driscoll | |
| 2018/0190253 | A1 | 7/2018 | O'Driscoll | |
| 2018/0191654 | A1 | 7/2018 | O'Driscoll | |
| 2018/0191795 | A1 | 7/2018 | Oskarsson | |
| 2018/0192082 | A1 | 7/2018 | O'Driscoll | |
| 2018/0192108 | A1 | 7/2018 | Lyons | |
| 2018/0192239 | A1 | 7/2018 | Liusaari | |
| 2018/0192240 | A1 | 7/2018 | Liusaari | |
| 2018/0192285 | A1 | 7/2018 | Schmidt | |
| 2018/0233119 | A1 | 8/2018 | Patti | |
| 2018/0239580 | A1 | 8/2018 | Garmark | |
| 2018/0246694 | A1 | 8/2018 | Gibson | |
| 2018/0246961 | A1 | 8/2018 | Gibson | |
| 2018/0248965 | A1 | 8/2018 | Gibson | |
| 2018/0248976 | A1 | 8/2018 | Gibson | |
| 2018/0248978 | A1 | 8/2018 | Gibson | |
| 2018/0300331 | A1 | 10/2018 | Jehan | |
| 2018/0321904 | A1 | 11/2018 | Bailey | |
| 2018/0321908 | A1 | 11/2018 | Bailey | |
| 2018/0323763 | A1 | 11/2018 | Bailey | |
| 2018/0332024 | A1 | 11/2018 | Garmark | |
| 2018/0351937 | A1 | 12/2018 | Ahlin | |
| 2018/0358053 | A1 | 12/2018 | Smith | |
| 2018/0367229 | A1 | 12/2018 | Gibson | |
| 2018/0367580 | A1 | 12/2018 | Marsh | |
| 2019/0018557 | A1 | 1/2019 | O'Driscoll | |
| 2019/0018645 | A1 | 1/2019 | McClellan | |
| 2019/0018702 | A1 | 1/2019 | O'Driscoll | |
| 2019/0026817 | A1 | 1/2019 | Helferty | |
| 2019/0073191 | A1 | 3/2019 | Bailey | |
| 2019/0074807 | A1 | 3/2019 | Bailey | |
| 2019/0237051 | A1* | 8/2019 | Silverstein | G10H 1/368 |
| 2019/0279606 | A1* | 9/2019 | Silverstein | G06N 7/005 |
| 2019/0304418 | A1* | 10/2019 | Silverstein | G10H 1/00 |
| 2019/0340245 | A1 | 11/2019 | Zhu | |
| 2019/0341898 | A1 | 11/2019 | McClellan | |

FOREIGN PATENT DOCUMENTS

| | | | |
|---|---|---|---|
| CA | 2895728 | A1 | 1/2016 |
| CA | 2910158 | A1 | 4/2016 |
| CN | 106663264 | A | 5/2017 |
| CN | 106688031 | A | 5/2017 |
| CN | 107004225 | A | 8/2017 |
| CN | 107111430 | A | 8/2017 |
| CN | 107111828 | A | 8/2017 |
| CN | 107251006 | A | 10/2017 |
| CN | 107430697 | A | 12/2017 |
| CN | 107430767 | A | 12/2017 |
| CN | 107431632 | A | 12/2017 |
| CN | 107710188 | A | 2/2018 |
| CN | 107924590 | A | 4/2018 |
| CN | 108604378 | A | 9/2018 |
| DE | 10047266 | A1 | 4/2001 |
| DE | 10047266 | B4 | 4/2001 |
| DE | 112011103172 | T5 | 7/2013 |
| DE | 112011103081 | T5 | 9/2013 |
| EP | 1683034 | B1 | 7/2006 |
| EP | 2015542 | A1 | 1/2009 |
| EP | 2015542 | B1 | 1/2009 |
| EP | 2096324 | A1 | 9/2009 |
| EP | 2248311 | B1 | 11/2010 |
| EP | 2378435 | A1 | 10/2011 |
| EP | 2388954 | A1 | 11/2011 |
| EP | 2663899 | | 11/2013 |
| EP | 2808870 | A1 | 12/2014 |
| EP | 2808870 | B1 | 12/2014 |
| EP | 2868060 | B1 | 5/2015 |
| EP | 2868061 | B1 | 5/2015 |
| EP | 2925008 | A1 | 9/2015 |
| EP | 2999191 | A1 | 3/2016 |
| EP | 2999191 | B1 | 3/2016 |
| EP | 3035273 | A1 | 6/2016 |
| EP | 3035273 | B1 | 6/2016 |
| EP | 3041245 | A1 | 7/2016 |
| EP | 3041245 | B1 | 7/2016 |
| EP | 3055790 | B1 | 8/2016 |
| EP | 3059973 | A1 | 8/2016 |
| EP | 3061245 | B1 | 8/2016 |
| EP | 3076353 | A1 | 10/2016 |
| EP | 3093786 | A1 | 11/2016 |
| EP | 3093786 | B1 | 11/2016 |
| EP | 3094098 | A1 | 11/2016 |
| EP | 3094099 | A1 | 11/2016 |
| EP | 3096323 | A1 | 11/2016 |
| EP | 3151576 | A1 | 4/2017 |
| EP | 3196782 | A1 | 7/2017 |
| EP | 3215962 | B1 | 9/2017 |
| EP | 3255862 | A1 | 12/2017 |
| EP | 3255862 | B1 | 12/2017 |
| EP | 3255889 | A1 | 12/2017 |
| EP | 3255889 | B1 | 12/2017 |
| EP | 3258394 | A1 | 12/2017 |
| EP | 3258436 | A1 | 12/2017 |
| EP | 3268876 | B1 | 1/2018 |
| EP | 3285453 | A1 | 2/2018 |
| EP | 3285453 | B1 | 2/2018 |
| EP | 3287913 | A1 | 2/2018 |
| EP | 3306892 | A1 | 4/2018 |
| EP | 3306892 | B1 | 4/2018 |
| EP | 3310066 | A1 | 4/2018 |
| EP | 3321827 | A1 | 5/2018 |
| EP | 3324356 | A1 | 5/2018 |
| EP | 3328090 | A1 | 5/2018 |
| EP | 3330872 | A1 | 6/2018 |
| EP | 3343448 | A1 | 7/2018 |
| EP | 3343448 | B1 | 7/2018 |
| EP | 3343483 | A1 | 7/2018 |
| EP | 3343484 | A1 | 7/2018 |
| EP | 3343844 | A1 | 7/2018 |
| EP | 3343880 | A1 | 7/2018 |
| EP | 3367269 | A1 | 8/2018 |
| EP | 3367639 | A1 | 8/2018 |
| EP | 3404893 | A1 | 11/2018 |
| EP | 3425919 | A1 | 1/2019 |
| IN | 419KOLNP2006 | A | 9/2007 |
| IN | 298031 | A1 | 7/2011 |
| IN | 1369MUM2011 | A | 8/2011 |
| JP | 5941065 | B2 | 2/2014 |
| KR | 1020160013213 | A | 2/2016 |
| SE | 535612 | C2 | 10/2012 |
| WO | 9324645 | | 12/1993 |
| WO | 1997021210 | A1 | 6/1997 |
| WO | 0108134 | | 2/2001 |
| WO | 0135667 | | 5/2001 |

(56) References Cited

FOREIGN PATENT DOCUMENTS

| | | | |
|---|---|---|---|
| WO | 0184353 | | 11/2001 |
| WO | 0186624 | | 11/2001 |
| WO | 0186624 | A3 | 11/2001 |
| WO | 05057821 | | 6/2005 |
| WO | 2006071876 | A2 | 7/2006 |
| WO | 2002355066 | B2 | 3/2007 |
| WO | 2007106371 | A2 | 9/2007 |
| WO | 12096617 | | 7/2012 |
| WO | 2012136599 | A1 | 10/2012 |
| WO | 2012150602 | A1 | 11/2012 |
| WO | 2013003854 | A2 | 1/2013 |
| WO | 2013080048 | A1 | 6/2013 |
| WO | 2013153449 | A2 | 10/2013 |
| WO | 2013153449 | A3 | 10/2013 |
| WO | 2013181662 | A2 | 12/2013 |
| WO | 2013181662 | A3 | 12/2013 |
| WO | 2013184957 | A1 | 12/2013 |
| WO | 2013185107 | A1 | 12/2013 |
| WO | 2012150602 | A8 | 1/2014 |
| WO | 2014001912 | A2 | 1/2014 |
| WO | 2014001912 | A3 | 1/2014 |
| WO | 2014001913 | A2 | 1/2014 |
| WO | 2014001913 | A3 | 1/2014 |
| WO | 2014001914 | A2 | 1/2014 |
| WO | 2014001914 | A3 | 1/2014 |
| WO | 2014057356 | A2 | 4/2014 |
| WO | 2014057356 | A3 | 4/2014 |
| WO | 2013003854 | A3 | 5/2014 |
| WO | 2014064531 | A1 | 5/2014 |
| WO | 2014068309 | A1 | 5/2014 |
| WO | 14144833 | | 9/2014 |
| WO | 14153133 | | 9/2014 |
| WO | 2014166953 | A1 | 10/2014 |
| WO | 2014194262 | A2 | 12/2014 |
| WO | 2014194262 | A3 | 12/2014 |
| WO | 2014204863 | A2 | 12/2014 |
| WO | 2014204863 | A3 | 12/2014 |
| WO | 2015040494 | A2 | 3/2015 |
| WO | 2015040494 | A3 | 3/2015 |
| WO | 2015056099 | A1 | 4/2015 |
| WO | 2015056102 | A1 | 4/2015 |
| WO | 15170126 | | 11/2015 |
| WO | 2015192026 | A1 | 12/2015 |
| WO | 2016007285 | A1 | 1/2016 |
| WO | 2016044424 | A1 | 3/2016 |
| WO | 2016054562 | A1 | 4/2016 |
| WO | 2016065131 | A1 | 4/2016 |
| WO | 2016085936 | A1 | 6/2016 |
| WO | 2016100318 | A2 | 6/2016 |
| WO | 2016100318 | A3 | 6/2016 |
| WO | 2016100342 | A1 | 6/2016 |
| WO | 2016107799 | A1 | 7/2016 |
| WO | 2016108086 | A1 | 7/2016 |
| WO | 2016108087 | A1 | 7/2016 |
| WO | 2016112299 | A1 | 7/2016 |
| WO | 2016118338 | A1 | 7/2016 |
| WO | 2016156553 | A1 | 10/2016 |
| WO | 2016156554 | A1 | 10/2016 |
| WO | 2016156555 | A1 | 10/2016 |
| WO | 2016156555 | A9 | 10/2016 |
| WO | 2016179166 | A1 | 11/2016 |
| WO | 2016179235 | A1 | 11/2016 |
| WO | 2016184866 | A1 | 11/2016 |
| WO | 2016184867 | A1 | 11/2016 |
| WO | 2016184868 | A1 | 11/2016 |
| WO | 2016184869 | A1 | 11/2016 |
| WO | 2016184871 | A1 | 11/2016 |
| WO | 2016186881 | A1 | 11/2016 |
| WO | 16209685 | | 12/2016 |
| WO | 2017015218 | A1 | 1/2017 |
| WO | 2017015224 | A1 | 1/2017 |
| WO | 2017019457 | A1 | 2/2017 |
| WO | 2017019458 | A1 | 2/2017 |
| WO | 2017019460 | A1 | 2/2017 |
| WO | 17048450 | | 3/2017 |
| WO | 2017040633 | A1 | 3/2017 |
| WO | 2017048450 | A1 | 3/2017 |
| WO | 2017058844 | A1 | 4/2017 |
| WO | 2017070427 | A1 | 4/2017 |
| WO | 2017075476 | A1 | 5/2017 |
| WO | 2017095800 | A1 | 6/2017 |
| WO | 2017095807 | A1 | 6/2017 |
| WO | 2017103675 | A1 | 6/2017 |
| WO | 2017106529 | A1 | 6/2017 |
| WO | 2017109570 | A1 | 6/2017 |
| WO | 2017140786 | A1 | 8/2017 |
| WO | 2017147305 | A1 | 8/2017 |
| WO | 2017151519 | A1 | 9/2017 |
| WO | 2017153435 | A1 | 9/2017 |
| WO | 2017153437 | A1 | 9/2017 |
| WO | 2017175061 | A1 | 10/2017 |
| WO | 2017182304 | A1 | 10/2017 |
| WO | 2017210129 | A1 | 12/2017 |
| WO | 2017218033 | A1 | 12/2017 |
| WO | 2018006053 | A1 | 1/2018 |
| WO | 2018015122 | A1 | 1/2018 |
| WO | 2018017592 | A1 | 1/2018 |
| WO | 2018022626 | A1 | 2/2018 |
| WO | 2018033789 | A1 | 2/2018 |
| WO | 18226418 | | 12/2018 |
| WO | 18226419 | A8 | 12/2018 |

OTHER PUBLICATIONS

"Affective Key Characteristics", from Christian Schubart's "Ideen zu einer Aesthetik der Tonkunst" (1806), translated by Rita Steblin in a History of Key Characteristics in the 18th and Early 19th Centuries, UMI Research Press (1983), and republished at http://www.wmich.edu/mus-theo/courses/keys.html, 3 Pages.

"Characteristics of Musical Keys," a selection of information from the Internet about the emotion or moodassociated with musical keys, published at http://biteyourownelbow.com/keychar.htm, on Oct. 14,2009, 6 Pages.

Joel Douek, "Music and Emotion—A Composer's Perspective", vol. 7, Article 82, Frontiers in Systems Neuroscience, Nov. 2013,4 Pages.

Kris Goffin, "Music Feels Like Moods Feel", vol. 5, Article 327, Frontiers in Psychology, Apr. 2014, 4 Pages.

Patrik N. Juslin, Daniel Vastfjall, Emotional Responses to Music: The Need to Consider Underlying Mechanisms, Behavioral and Brain Sciences, 2008, pp. 559-621, vol. 31, Cambridge University Press.

Paul Nelson, "Talking About Music—A Dictionary" (Version Sep. 1, 2005), published at http://www.composertools.com/ Dictionary/, 50 Pages.

Website Pages from Audio Network Limited, covering the directory structure of its Production Music Database Prganized by Musical Styles, Mood/Emotion, Instrumentation, Production Genre, Album Listing and Artists & Composers, https://www.audionetwork.com, 7 Pages.

Alex Rodriguez Lopez, Antonio Pedro Oliveira, and Amilcar Cardosa, "Real-Time Emotion-Driven Music Engine", Centre for Informatics and Systems, University of Coimbra, Portugal, Conference Paper, Jan. 2010, published in ResearchGate on Jun. 2015, 6 Pages.

Alper Gungormusler, Natasa Paterson-Paulberg, and Mads Haahr, "barelyMusician: An Adaptive Music Engine for /Video Games", AES 56th International Conference, London, UK, Feb. 11-13, 2015, published in ResearchGate Feb. 2015, 9 Pages.

International Search Report and Written Opinion of the International Searching Authority, dated Feb. 7, 2017 PCT/US2016/054066, 37 Pages.

Maia Hoeberechts, Ryan Demopoulos and Michael Katchabaw, "A Flexible Music Composition Engine", Department of Computer Science, Middlesex College, The University of Western Ontario, London, Ontario, Canada, published in Audio Mostly 2007, 2nd Conference on Interaction with Sound, Conference Proceedings, Sep. 27-28, 2007, Rontgenbau, Ilmenau, Germany, Fraunhofer Institute for Digital Media Technology IDMT, 6 Pages.

(56) References Cited

OTHER PUBLICATIONS

Ryan Demopoulos and Michael Katchabaw, "MUSIDO: A Framework for Musical Data Organization to Support Automatic Music Composition", Department of Computer Science, The University of Western Ontario, London, Ontario Canada, published in Audio Mostly 2007, 2nd Conference on Interaction with Sound, Conference Proceedings, Sep. 27-28, 2007, Rontgenbau, Ilmenau, Germany, Fraunhofer Institute for Digital Media Technology IDMT, 6 Pages.
Alexis John Kirke, and Eduardo Reck Miranda, Artificial Social Composition: A Multi-Agent system for Composing Music Performances by emotional Communication, 2009, Interdisciplinary Center for Computer Music Research, University of Plymouth, UK, 19 Pages.
Alison Mattek, Computational Methods for Portraying Emotion in Generative Music Composition, May 2010, Undergraduate Thesis, Department of Music Engineering, University of Miami, Miami, Florida, 62 Pages.
Anthony Prechtl, Robin Laney, Alistair Willis, Robert Samuels, Algorithmic Music as Intelligent Game Music, Apr. 2014, published in AISB50: The 50th Annual Convention of the AISB, 11 Apr. 2014, London, UK, Pages.
Bernard A. Hutchins Jr., Walter H. Ku, A Simple Hardware Pitch Extractor, JAES, Mar. 1, 1982,vol. 30 issue 3, pp. 135-139, Audio Engineering Society Inc., Ithaca, New York, 5 Pages.
Bill Manaris, Dana Hughes, Yiorgos Vassilandonakis, Monterey Mirror: Combining Markov Models, Genetic Algorithms, and Power Laws, Computer Science Department, College of Charleston, SC, USA, appearred in Proceedings of 1st Workshop in Evolutionary Music, 2011 IEEE Congress on Evolutionary Computation (CEC 2011), New Orleans, LA, USA, Jun. 5, 2011, pp. 33-40, 8 Pages total.
Bongjun Kim, Woon Seung Yeo, Probabilistic Prediction of Rhythmic Characteristics in Markov Chain-Based Melodic Sequences, 2013 Graduate School of Culture Technology, Korea Republic, published in 2013 ICMC Idea, pp. 29-432, 4 Pages total.
Brit Cruise, Real Time Control of Emotional Affect in Algorithmic Music, May 31, 2010, 20 pages, britcruise.com.
Cambridge Innovation Capital Press Release, "Cambridge Innovation Capital Leads Follow-On Funding Round for Digital Music Creator Jukedeck", Dec. 7, 2015, Cambridge University, Cambridge England, 3 Pages.
Caroline Palmer, Sean Hutchins, What is Musical Prosody, Psychology of Learning and Motivation, 2005, 63 Pages, vol. 46, Elsevier Press, Montreal, Canada.
Cheng Long, Raymond Chi-Wing Wong, Raymond Ka Wai Sze, A Melody Composer Based on Frequent Pattern Mining, 2013, 4 pages, The Hong Kong University of Science and Technology, Hong Kong.
Chih-Fang Huang, Wei-Gang Hong, Min-Hsuan Li, A Research of Automatic Composition and Singing Voice Synthesis System for Taiwanese Popular Songs, published in Proceedings ICMC, 2014, Sep. 4-20, 2014, Athens, Greece, 6 Pages.
Chih-Fang Huang, En-Ju Lin, An Emotion-Based Method to Perform Algorithmic Composition, Jun. 2013, 4 Pages, Department of Information Communications, Kainan University, Taiwan.
Christopher Ariza, An Open Design for Computer-Aided Algorithmic Music Composition: athenaCL, 2005, New York University, NY, NY, published on Dissertation.com, Boca Raton, Florida, 2005 (ISBN 1-58112-292-6), 25 Pages.
Christopher Ariza, Navigating the Landscape of Computer Aided Algorithmic Composition Systems: a Definition, Seven Descriptors, and a Lexicon of Systems and Research, New York University, New York, New York, published as MIT Open Course Ware, 21M.380 Music and Technology: Algorithmic and Generative MusicSpring, 2010, 8 Pages total.
Chunyang Song, Marcus Pearce, Christopher Harte, Synpy: A Python Toolkit for Syncopation Modelling, 2015, Queen Mary, University of London, London UK, 6 Pages.
Claudio Galmonte, Dimitrij Hmeljak, Study for a Real-Time Voice-to-Synthesized-Sound Converter, 1996, 6 Pages, University of Trieste, Italy.
Dave Phillips, Finlay, Ohio, USA, Review of Henrich K. Taube: Notes from the Metalevel: Introduction to Algorithmic Music Composition (2004), published in Computer Music Journal (CMJ), vol. 26, Issue 3,2005 Fall, The MIT Press, Cambridge, MA, at http://www.computermusicjournal.org/reviews/29-3/phillips-taube.html, 3 Pages.
David Cope, Experiments in Music Intelligence (EMI), University of California, Santa Cruz, 1987, ICMC Proceedings, pp. 174-181, 8 Pages.
David Cope, Techniques of the Contempory Composer, Schirmer Thomson Learning, 1997, two-page scanned, 123 Pages Total.
Donya Quick, Kulitta: A Framework for Automated Music Composition, Dec. 2014, 229 pages, Yale University, US.
Donya Quick, Paul Hudak, Grammar-Based Automated Music Composition in Haskell, 2013,12 pages, Yale University, USA.
Donya Quick, Paul Hudak, Grammar-Based Automated Music Composition in Haskell, 2013, 20 pages, Department of Computer Science, Yale University, USA.
G. Scott Vercoe, Moodtrack: Practical Methods for Assembling Emotion-Driven Music, 2006, 86 pages, Massachusetts Institute of Technology, Massachusetts.
George Sioros, Carlos Guedes, Automatic Rhythmic Performance in Max/MSP: the kin.rythmicator, published in 2011 International Conference on New Interfaces for Musical Expression, Oslo, Norway, May 30-Jun. 1, 2011, 4 Pages total.
Guilherme Ludwig, Topics in Statistics: Extracting Patterns in Music for Composition via Markov Chains, May 11, 2012, 18 pages, University of Wisconsin, US.
Gustavo Diaz-Jerez, Algorithmic Music: Using mathematical Models in Music Composition, Aug. 2000, 284 Pages, The Manhattan School of Music, New York.
Hanna Jarvelainen, Algorithmic Musical Composition, Apr. 7, 2000, 12 pages, Helsinki University of Technology, Finland.
Heinrich Konrad Taube, Notes from the Metalevel: An Introduction to Computer Composition, first published online by Swets Zeitlinger Publishing on Oct. 5, 2003 at http://www.moz.ac.at/sem/lehre/lib/bib/software/cm/ Notes from the Metalevel/intro.html, then later by Routledge (Taylor & Francis) in 2005 (ISBN 10: 9026519575 ISBN 13: 9789026519574 Hardcover), 313 Pages.
Heinrich Taube, An Introduction to Common Music, Computer Music Journal, Spring 1997, vol. 21, MIT Press, USA, pp. 29-34.
Horacio Alberto Garcia Salaa, Alexander Gelbukh, Hiram Calvo, Fernando Gal In Do Soria, Automatic Music Compositon with Simple Probabilistic Generative Grammars, Polibits, 2011 ,vol. 44, pp. 57-63, Center for Technological Design and Development in Computer Science, Mexico City, Mexico.
Horacio Alberto Garcia Salas, Alexander Gelbukh, Musical Composer Based on Detection of Typical Patterns in a Human Composer's Style, 2006, 6 pages, Mexico.
Iannis Xenakis, Formalized Music: Thought and Mathematics in Composition, Pendragon Press, 1992, 201 scanned pages.
Jacob M. Peck, Explorations in Algorithmic Composition: Systems of Composition and Examination of Several Original Works, Oct. 2011, 63 pages.
James Harkins, A Practical Guide to Patterns, 2009, 72 pages, Supercollider.
Joel L. Carbonera, Joao L. T. Silva, An Emergent Markovian Model to Stochastic Music Composition, 2008, 10 Pages, University of Caxias do Sul, Brazil.
John Brownlee, Can Computers Write Music That Has a Soul?, Aug. 2013, 11 pages, FastCompany.
John J. Dubnowski, Ronald W. Schafer, Lawrence R. Rabiner, Real-Time Digital Hardware Pitch Detector, vol. 24, IEEE IEEE Transactions on Acoustics, Speech, and Signal Processing, Feb. 1976, 7 pages.
Jon Sneyers, Danny De Schreye, APOPCALEAPS: Automatic Music Generation with CHRiSM, 2010, 8 pages, K.U. Leuven, Belgium.

(56) References Cited

OTHER PUBLICATIONS

Kento Watanabe et al, Modeling Structural Topic Transitions for Automatic Lyrics Generation, PACLIC 28,2014, pp. 422-431, Graduate School of Information Sciences Tohoku University, Japan, 10 Pages.
Kristine Monteith, Tony Martinez and Dan Ventura, "Automatic Generation of Melodic Accompaniments for Lyrics", 2012, Proceedings of the Third International Conference on Computational Creativity, pp. 87-94, 15 Pages.
Kristine Monteith, Virginia Francisco, Tony Martinez, Pablo Gervas Dan Ventura, Automatic Generation of Music for Inducing Emotive Response, Computer Science Department, Brigham Young University, Proceedings of the First International Conference on Computational Creativity, 2010, pp. 140-149, 10 Pages.
Kristine Monteith, Virginia Francisco, Tony Martinez, Pablo Gervas and Dan Ventura, Automatic Generation of Emotionally-Targeted Soundtracks, 2011 Proceedings of the Second International Conference on Computational Creativity, pp. 60-62, 3 Pages.
Kurt Kleiner, Is that Mozart or a Machine? Software can Compose Music in Classical, Pop, or Jazz Styles, Dec. 16, 2011, 1 page, Phys.org.
Leon Harkleroad, The Math Behind Music, Aug. 2006, 139 pages, Cambridge University Press, UK.
Lorenzo J. Tardon, Carles Roig, Isabel Barbancho, Ana M Barbancho, Automatic Melody Composition Based on a Probabilistic Model of Music Style and Harmonic Rules, Aug. 2014, Knowledge Based Systems.
M D Plumbley, S A Abdallah, Automatic Music Transcription ans Audio Source Separation, 2001,20 pages, Dept of Electronic Engineering, University of London, London.
Marco Scirea, Mark J. Nelson, and Julian Togelius, "Moody Music Generator: Characterizing Control Parameters Using Crowsourcing", published in 2015 Proceedings of the 4th Conference on Evolutionary and Biologically Inspired Music, Sound, Art and Design, and republished at http://julian.togelius.com/Scirea2015Moody.pdf, 12 Pages.
Michael C. Mozer, Todd Soukup, Connectionist Music Composition Based on Melodic and Stylistic Constraints, 1990, 8 pages, Department of Computer Science and Institute of Cognitive Science, University of Colorado, Boulder Colorado.
Michael Chan, John Potter, Emery Shubert, Improving Algorithmic Music Composition with Machine Learning, 9th International Conference on Music Perception and Cognition, Aug. 2006, pp. 1848-1854, University of New South Wales, Sydney, Australia.
Michael Kamp, Andrei Manea, Stones: Stochastic Technique for Generating Songs, Jan. 2013, 6 pages, Fraunhofer Institute for Intelligent Analysis Information Systems, Germany.
Miguel Febrer et al, Aneto: A Tool for Prosody Analysis of Speech, 1998,4 pages, Polytechnic University of Catalunya, Barcelona, Spain.
Miguel Haruki Yaimaguchi, An Extensible Tool for Automated Music Generation, May 2011,108 pages, Department of Computer Science, Lafayette College, Pennsylvania.
Owen Dafydd Jones, Transition Probabilities for the Simple Random Walk on Seirpinski Graph, Stochastic Processes and Their Applications, 1996, pp. 45-69, Elsevier.
Patricio Da Silva, David Cope and Experiments in Musical Intelligence, 2003, Spectrum Press, 86 Pages.
Paul Doornbusch, Gerhard Nierhaus: Algorithmic Composition: Paradigms of Automated Music Generation (Review), CMJ Reviews, 2012, 5 pages, vol. 34 Issue 3 Reviews, Computer Music Journal, Melbourne, Australia.
Philippe Martin, A Tool for Text to Speech Alignment and Prosodic Analysis, 2004,4 pages, Paris University, Paris, France.
Pop Music Automation, Mar. 8,2016,4 Pages, on Wikipedia, at https://en.wikipedia.org/wiki/Pop_music_automation Last modified on Dec. 27, 2015, at 14:34.
Rebecca Dias, A Mathematical Melody: An Introduction to Fractals and Music, Dec. 10, 2012, 26 pages, Trinity University.
Ricardo Miguel Moreira Da Cruz, Emotion-Based Music Composition for Virtual Environments, Apr. 2008, 121 pages, Technical University of Lisbon, Lisbon, Portugal.
Robert Cookson, "Jukedeck's computer composes music at the touch of a button", published in The Financial Times Ltd, on Dec. 7, 2015, 3 Pages.
Robert Plutchik, Plutchik Wheel of Emotions, 1980.
Roger B. Danneberg, Course Outline for "Week 5—Music Generation and Algorithmic Composition", Carnegie Mellon University (CMU), Spring 2014, 29 Pages.
Roger Dannenberg, Music Generation and Algorithmic Composition, Spring 2014, Carnegie Mellon University, Pennsylvania, 29 Pages.
Ruoha Zhou, Feature Extraction of Musical Content, for Automatic Music Transcription, Oct. 2006, 169 pages, Federal Institute of Technology, Lausanne.
Satoru Fukayama et al, Automatic Song Composition from the Lyrics Exploiting Prosody of Japanese Language, 2010, 4 pages, The University of Tokyo, Nagoya Institute of Technology, Japan.
Simone Hill, Markov Melody Generator, Computer Science Department, University of Massachusetts Lowell, Published on Dec. 11,2011, at http://www.cs.uml.edu/ecg/pub/uploads/AIfall11/SimoneHill.FinalPaper. MarkovMelodyGenerator.pdf, 4 Pages.
Siwei Qin et al, Lexical Tones Learning with Automatic Music Composition System Considering Prosody of Mandarin Chinese, 2010, 4 pages, Graduate School of Information Science and Technology, The University of Tokyo, Japan.
Steve Engels, Fabian Chan, and Tiffany Tong, Automatic Real-Time Music Generation for Games, 2015, 3 Pages, Department of Computer Science, Department of Engineering Science, and Department of Mechanical and ndustrial Engineering, Toronto, Ontario, Canada.
Steve Rubin, Maneesh Agrawala, Generating Emotionally Relevant Musical Scores for Audio Stories, UIST 2014, Oct. 2014, pp. 439-448.
Thomas M. Fiore, Music and Mathematics, University of Michigan, 2004, published on http://www-personal.umd. Umich.edu/~tmfiore/1/musictotal.pdf, 36 Pages.
Virginia Francisco, Raquel Hervas, EmoTag: Automated Mark Up of Affective Information in Texts, Department of Software Engineering and Artificial intelligence, Complutense University, Madrid, Spain, published at http://nil.fdi.ucm.es/sites/default/files/FranciscoHervasDCEUROLAN2007.pdf, 2007, 8 Pages.
Yu-Hao Chin, Chang-Hong Lin, Ernestasia Siahaan, Jia-Ching Wang, Music Emotion Detection Using Hierarchical Sparse Kernel Machines, 2014, 8 pages, Hindawi Publishing Corporation, Taiwan.
Supplemental Notice of Allowability dated May 2, 2017 for U.S. Appl. No. 14/869,911; (pp. 1-4).
Office Action dated Aug. 30, 2018 for U.S. Appl. No. 15/489,672 (pp. 1-6).
Office Action dated Jan. 12, 2018 for U.S. Appl. No. 15/489,707; (pp. 1-6).
Notice of Allowanace dated May 23, 2018 for U.S. Appl. No. 15/489,693 (pp. 1-8).
Notice of Allowance dated Aug. 7, 2018 for U.S. Appl. No. 15/489,707 (pp. 1-8).
Office Action dated Nov. 30, 2018 for U.S. Appl. No. 15/489,672 (pp. 1-5).
Office Action dated Dec. 3, 2018 for U.S. Appl. No. 15/489,709 (pp. 1-5).
Notice of Allowance dated Jan. 24, 2019 for U.S. Appl. No. 15/489,672 (pp. 1-7).
Notice of Allowance dated Mar. 27, 2019 for U.S. Appl. No. 15/489,709 (pp. 1-5).
Image Line Software, "FL Studio: Getting Started Manual", Jan. 2017, (pp. 1-89).
Score Cast Online, "ESP and Music", Jun. 2009, (pp. 1-6).
Score Cast Online, Deane Ogden, "'Roadmapping' a Score", Jul. 2009, (pp. 1-9).
Score Cast Online, James Olszewski, "Your First Spotting Experience", Mar. 2010, (pp. 1-5).
Score Cast Online, Lee Sanders, "Everything *BUT* Spotting", Mar. 2010, (pp. 1-10).

(56) References Cited

OTHER PUBLICATIONS

Score Cast Online, Heather Fenoughty, "Staying in Sync", Mar. 2010, (pp. 1-7).
Score Cast Online, Lee Sanders, "Spotting Content", Mar. 2010, (pp. 1-6).
Score Cast Online, Leon Willett, "Spotting for Video Games", Mar. 2010, (pp. 1-7).
Score Cast Online David E. Fluhr, "Spotting With the Composer and Sound Designer", Apr. 2012, (pp. 1-11).
Score Cast Online, Deane Ogden, "Tools for Studio Organization", Oct. 2010, (pp. 1-8).
Simpsons Music 500, "Music Editing 101—Music Spotting Notes", Aug. 2011, (pp. 1-6).
Propellerhead Software, "Reason Essentials Operation Manual", Jan. 2011, (pp. 1-742).
Score Cast Online, Nikola Jeremie, "Scoring With PreSonus Studio One—Setting Up", Nov. 2011, (pp. 1-6).
Score Cast Online, Yaiza Varona, "Scoring to Picture in Logic 9 (Part 1)", Jan. 2013, (pp. 1-8).
Score Cast Online, Yaiza Varona, "Scoring to Picture in Logic 9 (Part 2)", Feb. 2013, (pp. 1-7).
Behind the Audio, Michael Levine, "Why Hans Zimmer got the Job You Wanted (And You Didn't)", Jul. 2013, (pp. 1-3).
Native Instruments, "Session Horns Pro Manual", May 2014, (pp. 1-68).
Mixonline, Michael Cooper, "Sonicsmiths the Foundary: Virtual Instrument Takes Fresh Approach to Sound Design", Apr. 2016, (pp. 1-3).
Ripple Training, "Music Scoring for Video in Logic Pro X", Jan. 2016, (pp. 1-6).
Bitwig, Dave Linnenbank, "Bitwig Studio User Guide", Feb. 2017, (pp. 1-383).
Jon Brantingham, "How to Spot a Film", Aug. 2017, (pp. 1-12).
Isabel Lacatus, "Composing Music to Picture", Nov. 2017, (pp. 1-8).
Isabel Lacatus, "How to Compose Like Hans Zimmer", Dec. 2017, (pp. 1-5).
Steinberg Media Technologies, "Cubase Pro 10 Operation Manual", Nov. 2018, (pp. 1-1156).
Avid Technology Inc., "Pro Tools Reference Guide", Dec. 2018, (pp. 1-1489).
Ableton AG, "Ableton Reference manual Version 10", Jan. 2018, (pp. 1-759).
Score Cast Online, Jai Meghan, "Spotting From the Cheap Seats", Mar. 2010.
Motu, "Digital Performer 10 User Guide", Jan. 2019, (pp. 1-1036).
Presonus, "Studio One 4 Reference Manual", Jan. 2019, (pp. 1-336).
Cockos Inc, "Up and Running: A REAPER User Guide", Apr. 2019, (pp. 1-464).
Motu, "Digital Performer 8 Screenshots", Sep. 2012, (pp. 1-6).
Sonicsmiths, "The Foundary", Aug. 2015, (pp. 1).
Sound on Sound, "A Touch of Logic", Jun. 2014, (pp. 1-4).
Xsample, "Xsample Acoustic Intruments Library", Jan. 2015, (pp. 1-40).
Xsample, "Xsample AI Library: Notation Guide Part I", Jan. 2015, (pp. 1-8).
Xsample, "Xsample AI Library: Notation Guide Part II", Jan. 2015, (pp. 1-49).
Xsample, "Xsample Player Edition", Jan. 2016, (pp. 1-16).
IEEE Access, Luca Turchet, "Smart Musical Instruments: Vision, design Principles, and Future Directions", Oct. 2018, (pp. 1-20).
Nonetwork LLC, Rob Hardy, "The Process of Scoring Your Own Films Just Became Insanely Simple", Nov. 2014, (pp. 1-3).
Musictech, Andy Jones, "The Essen tial Guide to DAWs", Jun. 2017, (pp. 1-8).
Evening Standard, Samuel Fischwick, "Robot rock: how AI singstars use machine learning to write harmonies", Mar. 2018, (pp. 1-3).
LBB Online, "Music Machines: Jukedeck is Using AI to Compose Music", Sep. 2017, (pp. 1-5).
Francois Pachet, Pierre Roy, Julian Moreira, Mark D'Inverno, "Reflexive Loopers for Solo Musical Improvisation", Apr. 2013, (pp. 1-5).
Flow Machines, "'Happy' With the Reflexive Looper", Jun. 2016, (pp. 1).
Marco Marchini, Francois Pachet, Benoit Carre, "Reflexive Looper for Structured Pop Music", May 2017, (pp. 1-6).
Sound on Sound, Jayne Drake, "What Does Artificial Intelligence Mean for Musicians and Producers?", Sep. 2018, (pp. 1-13).
IBM, "IBM Watson Beat", Nov. 2011, (pp. 1-9).
Sweetwater, "Spotting Session", Dec. 1999, (pp. 1-2).
Notice of Allowance dated May 28, 2019 for U.S. Appl. No. 15/489,701 (pp. 1-8)N.
"NotePerformer 3 User Guide", Wallander Instruments AB, updated Sep. 12, 2019, (64 Pages).
"NotePerformer 3.2 Version History", Wallander Instruments AB, updated Sep. 2, 2019, (33 Pages).
"User Guide for Note Performer 3", Wallander Instruments AB, Sep. 12, 2019, (64 Pages).
"User Manual for Omnisphere Power Synth Version 2.6", Spectrasonics.net, Jan. 2020, (944 Pages).
"User Manual for Synclavier V, Version 2.0", Arturia SA, published Oct. 15, 2018, (133 Pages).
"WIVI Documentation", Wallendar Instruments AB, Dec. 18, 2014, (85 Pages).
Adam Berenzweig, Beth Logan, Daniel P. W. Ellis, and Brian Whitman, "A Large-Scale Evaluation of Acoustic and Subjective Music Similarity Measures", Computer Music Journal, vol. 28(2), Nov. 2003, (7 Pages).
Allen and Dannenberg, "Tracking Musical Beats in Real Time," in 1990 International Computer Music Conference, International Computer Music Association, Sep. 1990, pp. 140-143, (4 Pages).
Allen and Dannenberg, "Tracking Musical Beats in Real Time," in Proceedings of the International Computer Music Conference, Glasgow, Scotland, Sep. 1990. International Computer Music Association, 1990. pp. 140-143, (12 Pages).
Amazon.com, Inc., Webpages from Amazon Web Services, Inc., for the AWS DEEPCOMPOSER, published and accessed by https://aws.amazon.com/deepcomposer/. on Dec. 8, 2019, (9 Pages).
Anne Trafton, "Why We Like the Music We Do", MIT News Office, Jul. 13, 2016, (4 Pages).
Avid Corporation, Screenshots from Avid Website entitled "Music Creation Solutions: Overview; Meeting the Challenge; Integrated Hardware & Software; and Notation and Scoring," published and accessed from https://www.avid.com/solutions/music-creation on Dec. 8, 2019, (3 Pages).
Barry L. Vercoe , "Computer Systems and Languages for Audio Research," The New World of Digital Audio (Audio Engineering Society Special Edition), 1983, pp. 245-250 (6 Pages).
Barry L. Vercoe, "The Synthetic Performer in the Context of Live Performance," in Proceedings, International Computer Music Conference, 1984, Paris, pp. 199-200, (2 Pages).
Barry L. Vercoe, and D.P.W Ellis, "Real-time Csound: Software Synthesis with Sensing and Control," in Proceedings, ICMC, 1990, Glasgow, pp. 209-211. (3 Pages).
Barry L. Vercoe, ., "Computational Auditory Pathways to Music Understanding," in Deliege I. and Sloboda J (Eds.), 1997, Perception and Cognition of Music , East Sussex, UK: Psychology Press, pp. 307-326, (20 Pages).
Barry L. Vercoe, "Extended Csound," in Proceedings, 1996, ICMC, Hong Kong, pp. 141-142, (2 Pages).
Barry L. Vercoe, "Hearing Polyphonic Music with the Connection Machine," in Proceedings, First Workshop on Artificial Intelligence and Music, 1988, AAA-88, St. Paul, MN, pp. 183-194, (12 Pages).
Barry L. Vercoe, "New Dimensions in Computer Music," Trends and Perspectives in Signal Processing II/2, Apr. 1982, pp. 15-23 (9 Pages).
Barry L. Vercoe, and Puckette, M.S. (1985) "Synthetic Rehearsal: Training the Synthetic Performer," in Proceedings, ICMC, Burnaby, BC, Canada, 1985, pp. 275-278, (4 Pages).

(56) References Cited

OTHER PUBLICATIONS

Barry L. Vercoe,"Synthetic Listeners and Synthetic Performers," Proceedings, International Symposium on Multimedia Technology and Artificial Intelligence (Computerworld 90), Kobe Japan, Nov. 1990, pp. 136-141, (6 Pages).
Barry Vercoe, "Audio-Pro with Multiple DSPs and Dynamic Load Distribution," BT Technology Journal, vol. 22, No. 4, Oct. 2004, (7 Pages).
Ben Popper, "TASTEMAKER: How Spotify's Discover Weekly cracked human curation at internet scale", published in The Verge, at https://www.theverge.com/2015/9/30/9416579/spotify-discover-weekly-online-music- curation-interview , Sep. 30, 2015, (18 Pages).
Bloch and Dannenberg, "Real-Time Accompaniment of Polyphonic Keyboard Performance," Proceedings of the 1985 International Computer Music Conference, Vancouver, BC Canada, Aug. 19-22, 1985, San Francisco: International Computer Music Association, 1985. pp. 279-290, (11 Pages).
Bloch, J. B. and Dannenberg, R.B., "Real-Time Computer Accompaniment of Keyboard Performances", In Proceedings of the 1985 International Computer Music Conference, 1985, International Computer Music Association, 279-289. http://www.cs.cmu.edu/~rbd/bib-accomp.html#icmc85, (11 Pages).
Boomy Corporation, "Boomy Talks AI Music: We Want to Make Music That's Meaningful", published at https://musically.com/2019/07/31/boomy-talks-ai-music-we-want-to-make-music-that s-meaningful/ on 0Jul. 31, 2019, (13 Pages).
Brian A. Whitman, "Learning the Meaning of Music", Apr. 14, 2005, MIT, (65 Pages).
Brian A. Whitman, "Learning the Meaning of Music", Jun. 2005, Phd., Doctoral dissertation, MIT, (104 Pages).
Brian Whitman and Steve Lawrence, "Inferring Descriptions and Similarity for Music from Community Metadata", Proceedings of the 2002 International Computer Music Conference, Jan. 2002, (8 Pages).
Brian Whitman and Daniel P. W. Ellis, "Automatic Record Reviews," In Proceedings of ISMIR 2004—5th International Conference on Music Information Retrieval. (8 Pages).
Brian Whitman and Paris Smaragdis, "Combining Musical and Cultural Features for Intelligent Style Detection", ISMIR 2002, 3rd International Conference on Music Information Retrieval, Paris, France, Oct. 13-17, 2002, Proceedings, (6 Pages).
Brian Whitman and Ryan Rifkin, "Musical Query-by-Description as a Multiclass Learning Problem", Jan. 1, 2003, 2002 IEEE Workshop onMultimedia Signal Processing, (4 Pages).
Brian Whitman, Deb Roy and Barry Vercoe, "Learning Word Meanings and Descriptive Parameter Spaces from Music", Computer SciencePublished in HLT-NAACL 2003, (8 Pages).
Brian Whitman, Gary Flake and Steve Lawrence, "Artist Detection in Music with Minnowmatch," Computer Science NEC Research Institute, Princeton NJ, NNSP—Sep. 2001, (17 Pages).
Buxton, Dannenberg, and Vercoe, "The Computer as Accompanist," in Human Factors in Computing Systems: CHI '86 Conference Proceedings, Boston, MA, Apr. 13-17, 1986. Eds. M. Mantei, P Orbeton. New York: Association for Computing Machinery, 1986. pp. 41-43, (3 Pages).
Byeong-jun Han, Seungmin Rho Roger B. Dannenberg Eenjun Hwang, "SMERS: Music Emotion Recognition Using Support Vector Regression", 10th International Society for Music Information Retrieval Conference (ISMIR), 2009, (6 Pages).
Daniel P. W. Ellis, Brian Whitman, Adam Berenzweig, and Steve Lawrence, "The Quest for Ground Truth in Musical Artist Similarity", ISMIR 2002, 3rd International Conference on Music Information Retrieval, Paris, France, Oct. 13-17, 2002, Proceedings, (8 Pages).
Dannenberg and Hu. "Pattern Discovery Techniques for Music Audio" in ISMIR 2002 Conference Proceedings, Paris, France, IRCAM, 2002, pp. 63-70, appears in Journal of New Music Research, Jun. 2003, pp. 153-164, (14 Pages).
Dannenberg and Mukaino, "New Techniques for Enhanced Quality of Computer Accompaniment," in Proceedings of the International Computer Music Conference, Computer Music Association, Sep. 1988, pp. 243-249, (7 Pages).
Dannenberg, Roger B. and Ning Hu, "Polyphonic Audio Matching for Score Following and Intelligent Audio Editors." Proceedings of the 2003 International Computer Music Conference, San Francisco: International Computer Music Association, pp. 27-33, (7 Pages).
Eric Drott, "Why the Next Song Matters: Streaming, Recommendation, Scarcity", Twentieth-Century Music 15/3, 325-357, Cambridge University Press, 2018, (33 Pages).
Eric Nichols, Dan Morris, Sumit Basu and Christopher Raphael, "Relationsips Between Lyrics and Melody in Popular Music", Proceedings of the 11th International Society for Music Information Retrieval Conference, Oct. 2009, (6 Pages).
Form F-1 Registration Statement Under the Securities Act of 1933, United States Securities and Exchange Commission, by Spotify Technology S.A, Feb. 28, 2018, (265 Pages).
Francois Panchet, "The Continuator: Musical Interaction With Style", In Proceedings of International Computer Music Conference, Gotheborg (Sweden), ICMA, Sep. 2002, (10 Pages).
Francois Panchet, Pierre Roy and Gabriele Barbieri, "Finite-Length Markov Processes with Constraints", Proceedings of the Twenty-Second International Joint Conference on Artificial Intelligence, 2011, (8 Pages).
Grubb and Dannenberg, "Automated Accompaniment of Musical Ensembles," in Proceedings of the Twelfth National Conference on Artificial Intelligence, AAAI, 1994, pp. 94-99, (6 Pages).
Grubb and Dannenberg, "Automating Ensemble Performance," in Proceedings of the 1994 International Computer Music Conference, Aarhus and Aalborg, Denmark, Sep. 1994. International Computer Music Association, 1994. pp. 63-69, (7 Pages).
Grubb and Dannenberg, "Computer Performance in an Ensemble," in 3rd International Conference for Music Perception and Cognition Proceedings, Liege, Belgium. Jul. 23-27, 1994. Ed. Irene Deliege. Liege: European Society for the Cognitive Sciences of Music Centre de Recherche et de Formation Musicales de Wallonie, 1994. pp. 57-60, (2 Pages).
Grubb and Dannenberg, "Computer Performance in an Ensemble," in 3rd International Conference for Music Perception and Cognition Proceedings, Liege, Belgium. Jul. 23-27, 1994. Ed. Irene Deliege. Liege: European Society for the Cognitive Sciences of Music Centre de Recherche et de Formation Musicales de Wallonie, 1994. pp. 57-60, 1994, ( 2 Pages).
Grubb and Dannenberg, "Enhanced Vocal Performance Tracking Using Multiple Information Sources," in Proceedings of the International Computer Music Conference, San Francisco: International Computer Music Association, 1998) pp. 37-44, (8 Sheets).
Grubb, L. and Dannenberg, R.B., "A Stochastic Method of Tracking a Vocal Performer", in 1997 International Computer Music Conference, 1997, International Computer Music Association. http://www.cs.cmu.edu/~rbd/bib-accomp.html# icmc97, (8 Pages).
Guangyu Xia, Mao Kawai, Kei Matsuki, Mutian Fu, Sarah Cosentino, Gabriele Trovato, Roger Dannenberg, Salvatore Sessa, Atsuo Takanishi, "Expressive Humanoid Robot for Automatic Accompaniment", Carnegie Mellon Univserity, https://www.cs.cmu.edu/~rbd/papers/robot-smc-2016.pdf , 2016, (6 Pages).
Guangyu Xia, Yun Wang, Roger Dannenberg, Geoffrey Gordon. "Spectral Learning for Expressive Interactive Ensemble Performance", 16th International Society for Music Information Retrieval Conference, 2015, (7 Pages).
Gus G. Xia and Roger B. Dannenberg, "Improvised Duet Interaction: Learning Improvisation Techniques for Automatic Accompaniment," in Copenhagen, May 2017, pp. 110-114, (5 Pages).
IBM, "IBM Watson Beat: Cutting a track for the Red Bull Racing with a music-making machine", published and accessed at https://www.ibm.com/case-studies/ibm-watson-beat, on Feb. 4, 2019, (9 Pages).
Ipshita Sen, "How AI helps Spotify win in the music streaming world," published in outsideinsight.com, https://outsideinsight.com/insights/how-ai-helps-spotify-win-in-the-music-streaming-world/ , May 22, 2018 (12 Pages).

(56) References Cited

OTHER PUBLICATIONS

Johan Sundberg, et al, "Rules for Automated Performance of Ensemble Music", Contemporary Music Review, 1989, vol. 3, pp. 89-109, Harwood Academic Publishers GmbH, (12 Pages).
Jonathan Cabreira, "A Music Taste Analysis Using Spotify API and Python: Exploring Audio Features and building a Machine Learning Approach," published on Toward Data Science at https://towardsdatascience.com/a-music-taste-analysis-using-spotify-api-and-pyth on-e52d186db5fc , Aug. 17, 2019, (7 Pages).
Josh McDermott and March Hauser, "The Origins of Music: Innateness, Uniqueness, and Evolution", published in Music Perception vol. 23, Issue 1, Mar. 2005, pp. 29-59, (32 Pages).
Josh McDermott, "The evolution of music", published in Nature, vol. 453, No. 15, May 2008, pp. 287-288, (2 Pages).
Lorin Grubb and Roger B. Dannenberg, "Automated Accompaniment of Musical Ensembles", AAAI-94 Proceedings, 1994, pp. 94-99, (6 Pages).
Lorin Grubb and Roger B. Dannenberg, "Automating Ensemble Performance", Machine Recognition of Music, ICMC Proceedings 1994, pp. 63-69, (7 Pages).
Lorin Grubb and Roger B. Dannenberg, "Enhanced Vocal Performance Tracking Using Multiple Information Sources," Proceedings of the 1998 International Computer Music Conference, San Francisco, International Computer Music Association, pp. 37-44, (8 Pages).
Marius Kaminskas and Francesco Ricci, "Contextual music information retrieval and recommendation: Stateof the Art and Challenges," Computer Science Review, vol. 6, Issues 2-3, May 2012, pp. 89-119, (31 Pages).
Masataka Goto and Roger B. Dannenberg, "Music Interfaces Based on Automatic Music Signal Analysis: New Ways to Create and Listen to Music", IEEE Signal Processing Magazine, Jan. 2019, pp. 74-81, Date of Publication Dec. 24, 2018, (8 Pages).
Masataka Goto, "An Audio-based Real-time Beat Tracking System for Music With or Without Drum-sounds", Journal of New Music Research, 2001, vol. 30, No. 2, pp. 159-171,(14 Pages).
Mazzoni and Dannenberg, "Melody Matching Directly from Audio," in ISMIR 2001 2nd Annual International Symposium on Music Information Retrieval, Bloomington: Indiana University, 2001, pp. 73-82, (2 Pages).
Mitsuyo Hashida, et al., Rencon: Performance Rendering Contest for Automated Music Systems, Proceedings of the 10th International Conference on Music Perception and Cognition (ICMPC 10), Sapporo, Japan, Aug. 25, 2008, (5 Pages).
Musical.ly Inc., "2018 Music AI: The Music-Ally Guide", published on Nov. 22, 2018, and downloaded from https://musically.com/wp-content/uploads/2018/11/Music-Ally-AI-Music-Guide.pdf , (24 Pages).
Mutian Fu, Guangyu Xia, Roger Dannenberg, Larry Wasserman, "A Statistical View on the Expressi 0.0Timing of Piano Rolled Chords", 16th International Society for Music Information Retrieval Conference, 2015, (6 Pages).
Nicholas E. Gold and Roger B. Dannenberg, "A Reference Architecture and Score Representation for Popular Music Human-Computer Music Performance System," Proceedings of the International Conference on New Interfaces for Musical Expression, May 30-Jun. 1, 2011, Oslo, Norway, (4 Pages).
Ning Hu and Roger B. Dannenberg, "A Bootstrap Method for Training an Accurate Audio Segmenter", in Proceedings of the Sixth International Conference on Music Information Retrieval, London UK, Sep. 2005, London, Queen Mary, University of London & Goldsmiths College, University of London, 2005, pp. 223-229 (7 Pages).
Ning Hu and Roger B. Dannenberg, "Bootstrap learning for accurate onset detection", Machine Learning, May 6, 2006, vol. 65, pp. 457-471 (15 Pages).
Ning Hu and Roger B. Dannenberg, "A Comparison of Melodic Database Retrieval Techniques Using Sung Queries," in Joint Conference on Digital Libraries, 2002, New York: ACM Press, pp. 301-307, (7 Pages).
Ning Hu, Roger B. Dannenberg and George Tzanetakis, "Polyphonic Audio Matching and Alignment for Music Retrieval", 2003 IEEE Workshop on Applications of Signal Processing to Audio and Acoustics, Oct. 19-22, 2003, New Paltz, NY, (4 Pages).
Ning Hu, Roger B. Dannenberg, and Ann L. Lewis, "A Probabilistic Model of Melodic Similarity," In Proceedings of the International Computer Music Conference. San Francisco, International Computer Music Association, 2002, (4 Pages).
One Page Love, "Jukedeck, Interactive Landing Page—Beta" built by Qip Creative, Reviewed by Rob Hope on Jan. 6, 2014, (4 Pages).
Özgür izmirli and Roger B. Dannenberg, "Understanding Features and Distance Functions for Music Sequence Alignment", 11th International Society for Music Information Retrieval Conference (ISMIR 2010), (6 Pages).
Press Release by Aiva Technologies, "Composing the music of the future", Nov. 2016, (7 Pages).
R. B. Dannenberg, "An On-Line Algorithm for Real-Time Accompaniment", Proceedings of the 1984 International Computer Music Conference, 1985 International Computer Music Association, p. 193-198, http://www.cs.cmu.edu/~rbd/bib-accomp.html#icmc84, (6 Pages).
Ramon Lopez de Mantaras and Josep Lluis Arcos, "AI and Music: From Composition to Expressive Performance", American Association for Artificial Intelligence, Fall 2002, pp. 43-57 (16 Pages).
Richard Portelli, "Getting Started with ORB Composer S V 1.5", Hexachords Entertainment, updated Dec. 8, 2019, (21 Pages).
Richard Portelli, "Getting Started with ORB Composer S V 1.0", Hexachords Entertainment, updated Mar. 3, 2019, (15 Pages).
Richard Portelli, "ORB Composer Dashboard—Screenshot", Hexachords Entertainment, updated Aug. 17, 2019, (1 Page).
Richard Portelli, "ORB Composer Documentation 1.0.0", Hexachords Entertainment, updated Apr. 2, 2018, (36 Pages).
Richard Portelli, "ORB Composer Getting Started 1.0.0", Hexachords Entertainment, updated Apr. 1, 2018, (33 Pages).
Roberto Bresin and Anders Friberg, "Emotion Rendering in Music: Range and Characteristics Values of Seven Musical Variables", May 17, 2011, c Co rt e x vol. 4 7 ( 2 0 1 1 ), pp. 1 0 6 8-1 0 8 1, (14 Pages).
Roberto Bresin, "Articulation Rules for Automatic Music Performance", Proceedings of the 2001 International Computer Music Conference : Sep. 17-22, 2001, Havana, Cuba, pp. 294-297, (4 Pages).
Roberto Bresin, "Articulation Rules for Automatic Music Performance", Department of Speech, Music and Hearing, Royal Institute of Technology, Stockholm, Jan. 2002, (4 Pages).
Roberto Bresin, "Artificial Neural Networks Based Models for Automatic Performance of Musical Scores," Journal of New Music Research, 1998, vol. 27, No. 3, pp. 239-270, (32 Pages).
Roger B. Danneberg and Andrew Russell, "Arrangements: Flexibly Adapting Music Data for Live Performance", Proceedings of the International Conference on New Interfaces for Musical Expression, Baton Rouge, LA, USA, May 31-Jun. 3, 2015, (2 Pages).
Roger B. Dannenberg and Andrew Russell, "Arrangements: Flexibly Adapting Music Data for Live Performance," Proceedings of the International Conference on New Interfaces for Musical Expression, Baton Rouge, LA, USA, May 31-Jun. 3, 2015, (2 Pages).
Roger B. Dannenberg and Bernard Mont-Reynaud, "Following an Improvisation in Real Time," in 1987 ICMC Proceedings, International Computer Music Association, Aug. 1987, pp. 241-248, (8 Pages).
Roger B. Dannenberg and Masataka Goto, "Music Structure Analysis from Acoustic Signals", in Handbook of Signal Processing in Acoustics, pp. 305-331, Apr. 16, 2005, (19 Pages).
Roger B. Dannenberg and Mukaino, "New Techniques for Enhanced Quality of Computer Accompaniment," in Proceedings of the International Computer Music Conference, Computer Music Association, Sep. 1988, pp. 243-249, (7 Pages).
Roger B. Dannenberg and Ning Hu, "Discovering Musical Structure in Audio Recordings" in Anagnostopoulou, Ferrand, and Smaill, eds., Music and Artificial Intelligence: Second International Conference, ICMAI 2002, Edinburgh, Scotland, UK. Berlin: Springer, 2002. pp. 43-57, (11 Pages).

(56) References Cited

OTHER PUBLICATIONS

Roger B. Dannenberg and Ning Hu, "Pattern Discovery Techniques for Music Audio," In ISMIR 2002 Conference Proceedings: Third International Conference on Music Information Retrieval, M. Fingerhut, ed., Paris, IRCAM, 2002, pp. 63-70, (8 Pages).
Roger B. Dannenberg, William P. Birmingham, George Tzanetakis, Colin Meek, Ning Hu, and Bryan Pardo, The MUSART Testbed for Query-by-Humming Evaluation, Computer Music Journal, 28:2, pp. 34-48, Summer 2004, (15 Pages).
Roger B. Dannenberg, Zeyu Jin, Nicolas E. Gold, Octav-Emilian Sandu, Praneeth N. Palliyaguru, Andrew Robertson, Adam Stark, Rebecca Kleinberger, "Human-Computer Music Performance: From Synchronized Accompaniment to Musical Partner", Proceedings of the Sound and Music Computing Conference 2013, SMC 2013, Stockholm, Sweden, (7 Pages).
Roger B. Dannenberg, "A Virtual Orchestra for Human-Computer Music Performance," Proceedings of the International Computer Music Conference 2011, University of Huddersfield, UK, Jul. 31-Aug. 5, 2011, (4 Pages).
Roger B. Dannenberg, "A Vision of Creative Computation in Music Performance", Proceedings of the Second International Conference on Computational Creativity, published at https://www.cs.cmu.edu/~rbd/papers/dannenberg_1_iccc11.pdf , Jan. 2011, (6 Pages).
Roger B. Dannenberg, "An On-Line Algorithm for Real-Time Accompaniment", In Proceedings of the 1984 International Computer Music Conference, (1985), International Computer Music Association, 193-198. http://www.cs.cmu.edu/~rbd/bib-accomp.html#icmc84, (6 Pages).
Roger B. Dannenberg, "Style in Music", published in the Structure of Style: Algorithmic Approaches to Understanding Manner and Meaning, Shlomo Argamon, Kevin Burns, and Shlomo Dubnov (Eds.), Berlin, Springer-Verlag, 2010, pp. 45-58, (12 Pages).
Roger B. Dannenberg, "An On-Line Algorithm for Real-Time Accompaniment," in Proceedings of the 1984 International Computer Music Conference, Computer Music Association, Jun. 1985,193-198, (6 Pages).
Roger B. Dannenberg, "Computer Coordination With Popular Music: A New Research Agenda," in Proceedings of the Eleventh Biennial Arts and Technology Symposium at Connecticut College, Mar. 2008, (6 Pages).
Roger B. Dannenberg, "Listening to 'Naima': An Automated Structural Analysis of Music from Recorded Audio," In Proceedings of the International Computer Music Conference, 2002, San Francisco, International Computer Music Association, (7 Pages).
Roger B. Dannenberg, "Music Information Retrieval as Music Understanding," in ISMIR 2001 2nd Annual International Symposium on Music Information Retrieval, Bloomington: Indiana University, 2001, pp. 139-142, (4 Pages).
Roger B. Dannenberg, "New Interfaces for Popular Music Performance," in Seventh International Conference on New Interfaces for Musical Expression: NIME 2007 New York, New York, NY: New York University, Jun. 2007, pp. 130-135. (6 Pages).
Roger B. Dannenberg, "Real-Time Scheduling and Computer Accompaniment," in Current Research in Computer Music, edited by Max Mathews and John Pierce, MIT Press, 1989, (37 Pages).
Roger B. Dannenberg, "Time-Flow Concepts and Architectures for Music and Media Synchronization," in Proceedings of the 43rd International Computer Music Conference, International Computer Music Association, 2017, pp. 104-109, (6 Pages).
Roger B. Dannenberg, "Toward Automated Holistic Beat Tracking, Music Analysis, and Understanding," in ISMIR 2005 6th International Conference on Music Information Retrieval Proceedings, London: Queen Mary, University of London, 2005, pp. 366-373, (8 Pages).
Roger B. Dannenberg, Belinda Thom, and David Watson, "A Machine Learning Approach to Musical Style Recognition", School of Computer Science, Carnegie Mellon University, 1997, (4 Pages).
Roger B. Dannenberg, Ben Brown, Garth Zeglin, Ron Lupish, "McBlare: A Robotic Bagpipe Player," in Proceedings of the International Conference on New Interfaces for Musical Expression, Vancouver: University of British Columbia, (2005), pp. 80-84.
Roger B. Dannenberg, Nicolas E. Gold, Dawen Liang and Guangyu Xia, "Active Scores: Representation and Synchronization in Human—Computer Performance of Popular Music," Computer Music Journal, 38:2, pp. 51-62, Summer 2014,(12 Pages).
Roger B. Dannenberg, Nicolas E. Gold, Dawen Liang, and Guangyu Xia, "Methods and Prospects for Human—Computer Performance of Popular Music," Computer Music Journal, 38:2, pp. 36-50, Summer 2014, (15 Pages).
Roger B. Dannenberg. "An Intelligent Multi-Track Audio Editor." in Proceedings of the 2007, International Computer Music Conference, vol. II. San Francisco: The International Computer Music Association, Aug. 2007, pp. II-89-II-94, (7 Pages).
Roger Dannenberg, and Sukrit Mohan,"Characterizing Tempo Change in Musical Performances", Proceedings of the International Computer Music Conference 2011, University of Huddersfield, UK, Jul. 31-Aug. 5, 2011, (7 Pages).
The Lilypond Development Team, "LilyPond Learning Manual (2015) Version 2.19.83", downloaded from http://www.lilypond.com on Dec. 8, 2019, (216 Pages).
The Lilypond Development Team, "LilyPond Music Glossary (2015) Version 2.19.83", downloaded from http://www.lilypond.com on Dec. 8, 2019, (98 Pages).
The Lilypond Development Team, "LilyPond Music Notation for Everyone: Text Input," published and accessed at http://lilypond.org/text-input.html, on Dec. 8, 2019, (4 Pages).
The Lilypond Development Team, "LilyPond Notation Reference (2015) Version 2.19.83", downloaded from http://www.lilypond.com, Dec. 8, 2019, (882 Pages).
The Lilypond Development Team, "LilyPond Usage (2015) Version 2.19.83", downloaded from http://www.lilypond.com on Dec. 8, 2019, (69 Pages).
The Lilypond Development Team, "Wikipedia Summary of LilyPond Music Engraving Software", published and accessed at https://en.wikipedia.org/wiki/LilyPond, on Dec. 8, 2019, (8 Pages).
Tongbo Huang, Guangyu Xia, Yifei Ma, Roger Dannenberg, Christos Faloutsos, "MidiFind: Fast and Effective Similarity Searching in Large MIDI Databases", Proc. of the 10th International Symposium on Computer Music Multidisciplinary Research, Marseille, France, Oct. 15-18, 2013, (16 Pages).
Tristan Jehan and Bernd Schoner, "An Audio-Driven, Spectral Analysis-Based, Perceptual Synthesis Engine", Audio Engineering Society Convention Paper Presented at the 110th Convention, May 12-15, 2001 Amsterdam, The Netherlands, (10 Pages).
Tristan Jehan, "Creating Music by Listening", Sep. 2005, Phd. Doctoral dissertation, MIT (137 Pages).
Tristan Jehan, "Downbeat Prediction by Listening Tristan Jehan," Downbeat Prediction by Listening and Learning, 2005 IEEE Workshop on Applications of Signal Processing to Audio and Acoustics, Oct. 16-19, 2005, New Paltz, NY, (4 Pages).
Tristan Jehan, "Perceptual Segment Clustering for Music Description and Time-Axis Redundancy Cancellation", ISMIR 2004, 5th International Conference on Music Information Retrieval, Barcelona, Spain, Oct. 10-14, 2004, Proceedings, (4 Pages).
William Birmingham, Roger Dannenberg, and Bryan Pardo, "Query by Humming With the Vocalsearch System", Communications of the ACM, Aug. 2006, vol. 49, No. 8, pp. 49-52, (4 Pages).
William D. Haines, Jesse R. Vernon, Roger B. Dannenberg, and Peter F. Driessen, "Placement of Sound Sources in the Stereo Field Using Measured Room Impulse Responses," in Proceedings of the 2007 International Computer Music Conference, vol. I. San Francisco: The International Computer Music Association, Aug. 2007, pp. I-496-I-499, (5 Pages).
Youngmoo E. Kim et al, "Music Emotion Recognition: State of the Art Review", 11th International Society for Music Information Retrieval Conference (ISMIR 2010), (12 Pages).
Ethan Hein, "Scales and Emotions" from the Ethan Hein Blog, Posted Mar. 2, 2010, (31 Pages).
Anastasia Voitinskaia, "Scales, Genres, Intervals, Melodies, Music Theory", published on www.musical-u.com , at https://www.musical-u.com/learn/the-many-moods-of-musical-modes/ , on Feb. 6, 2020, (5 Pages).

(56) References Cited

OTHER PUBLICATIONS

Score Music Interactive, Sampled Workflow of 2018-Version of XHail Automatic Loop-Based Music Composing System, Dec. 2018, (25 Pages).
Banshee in Avalon, "Xhail, Innovative Automatic Composing Solution: Score Music Interactive is a AE3 in Boston where they are introducing a new system for multimedia music composers," published by AudioFanZine at https://en.audiofanzine.com/misc-music-software/score-music-interactive/xhail/medias/videos#id:35534 on Sep. 24, 2014 (1 Page).
Captured Screenshots from the "Xhail Preview" by Score Music Interactive Ltd., published on AudioFanZine at https://en.audiofanzine.com/misc-music-software/score-music-interactive/xhail/medias/videos/#id:35534 on Sep. 24, 2014 (35 Pages).
Captured Screenshots from the "Xhail Preview" by Score Music Interactive Ltd., published on Vimeo.com on Sep. 24, 2014 (34 Pages).
Communication Pursuant to Rules 70(2) ane 70a(2) EPC dated Jan. 10, 2019 issued in EP Application No. 16852438.7 (1 Page).
Crunchbase Profile on Score Music Interactive Ltd., summarized as "Score Music Interactive: A Music Publishing Software Platform That Creates Original, Copyrighted Music from a Centralized Database of Tagged Musical Stems," published by Crunchbase at https://www.crunchbase.com/organization/score-music-interactive on Dec. 2, 2019 (1 Page).
Extended European Search Report dated Dec. 9, 2019 issued in EP Application No. 16852438.7 (20 Pages).
Jacqui Cheng, "Virtual Composer Makes Beautiful Music—and Stirs Controversy: Can a Computer Program Really Generate Musical Compositions that Are Good . . . ", published by Arstechnia at https://arstechnica.com/science/2009/09/virtual-composer-makes-beautiful-musicand-stirs-controversy/ on Sep. 29, 2009 (3 Pages).
Linkedin Profile on Score Music Interactive Ltd, summarized as "Xhail is the most advanced music creation platform in the world. Unique one-ofa-kind tracks created instantly with incredible flexibility. Real performances by real musicians, combining for the very first time, creating the perfect music solution. Xhail's platform gives editors, music supervisors and other professionals extreme creative control in a most intuitive way without the requirement of music skill. Our patented technology creates desired music in a fraction of the time it would take to search for a suitable standard track from a traditional music library", published at Linkedin.com on Dec. 2, 2019 (1 Page).
Music Marcom, "Are You a Professional Muscian or Talented Composer? Help Xhail Find You" published by Prosound Network at https://www.prosoundnetwork.com/the-wire/are-you-a-professional-musician-or-talented-composer-help-xhail-find-you on May 19, 2015 (2 Pages).
Office Action dated Sep. 26, 2019 for U.S. Appl. No. 16/253,854 (pp. 1-9).
Prosoundnework Editorial Staff, "Xhail Recruiting Music Talent" published by Prosound Network at https://www.prosoundnetwork.com/business/xhail-recruiting-music-talent on May 21, 2015 (1 Page).
Screenshots taken from the Xhail WWW Site by Score Music Interactive Ltd., captioned "The Evolution of Music Creation & Licensing" and published at https://www.xhail.com/#whatis on Dec. 2, 2019 (10 Pages).

* cited by examiner

GENERALIZED SYSTEM ARCHITECTURE OF THE AUTOMATED MUSIC COMPOSITION AND GENERATION SYSTEM (I.E. MACHINE) OF THE PRESENT INVENTION SUPPORTING THE USE OF SAMPLED-INSTRUMENT SYNTHESIS DRIVEN BY LINGUISTIC AND/OR GRAPHICAL ICON BASED MUSICAL EXPERIENCE DESCRIPTORS

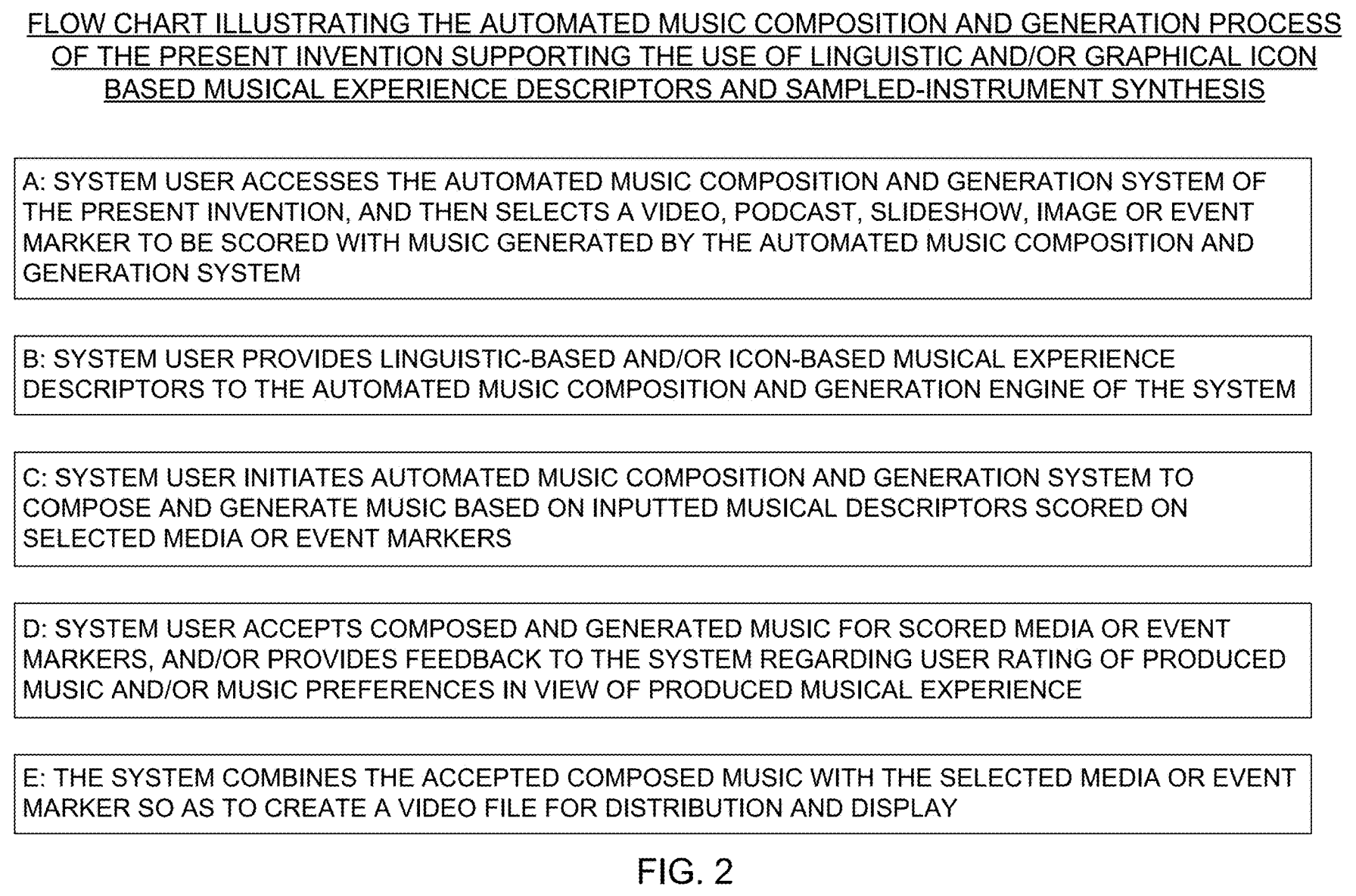

FLOW CHART ILLUSTRATING THE AUTOMATED MUSIC COMPOSITION AND GENERATION PROCESS OF THE PRESENT INVENTION SUPPORTING THE USE OF LINGUISTIC AND/OR GRAPHICAL ICON BASED MUSICAL EXPERIENCE DESCRIPTORS AND SAMPLED-INSTRUMENT SYNTHESIS

A: SYSTEM USER ACCESSES THE AUTOMATED MUSIC COMPOSITION AND GENERATION SYSTEM OF THE PRESENT INVENTION, AND THEN SELECTS A VIDEO, PODCAST, SLIDESHOW, IMAGE OR EVENT MARKER TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION ENGINE OF THE SYSTEM

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS SCORED ON SELECTED MEDIA OR EVENT MARKERS

D: SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE

E: THE SYSTEM COMBINES THE ACCEPTED COMPOSED MUSIC WITH THE SELECTED MEDIA OR EVENT MARKER SO AS TO CREATE A VIDEO FILE FOR DISTRIBUTION AND DISPLAY

FIG. 2

AUTOMATED MUSIC COMPOSITION AND GENERATION INSTRUMENT SYSTEM SUPPORTING SAMPLED-INSTRUMENT SYNTHESIS AND THE USE OF LINGUISTIC-BASED MUSICAL EXPERIENCE DESCRIPTORS PRODUCED USING A TEXT KEYBOARD AND/OR A SPEECH RECOGNITION INTERFACE

AUTOMATED MUSIC COMPOSITION AND GENERATION INSTRUMENT SYSTEM SUPPORTING SAMPLED-INSTRUMENT SYNTHESIS AND THE USE OF LINGUISTIC-BASED MUSICAL EXPERIENCE DESCRIPTORS PRODUCED USING A TEXT KEYBOARD AND/OR A SPEECH RECOGNITION INTERFACE

AUTOMATED MUSIC COMPOSITION AND GENERATION INSTRUMENT SYSTEM SUPPORTING SAMPLED-INSTRUMENT SYNTHESIS DRIVEN BY LINGUISTIC-BASED MUSICAL EXPERIENCE DESCRIPTORS PRODUCED USING A TEXT KEYBOARD AND/OR A SPEECH RECOGNITION INTERFACE

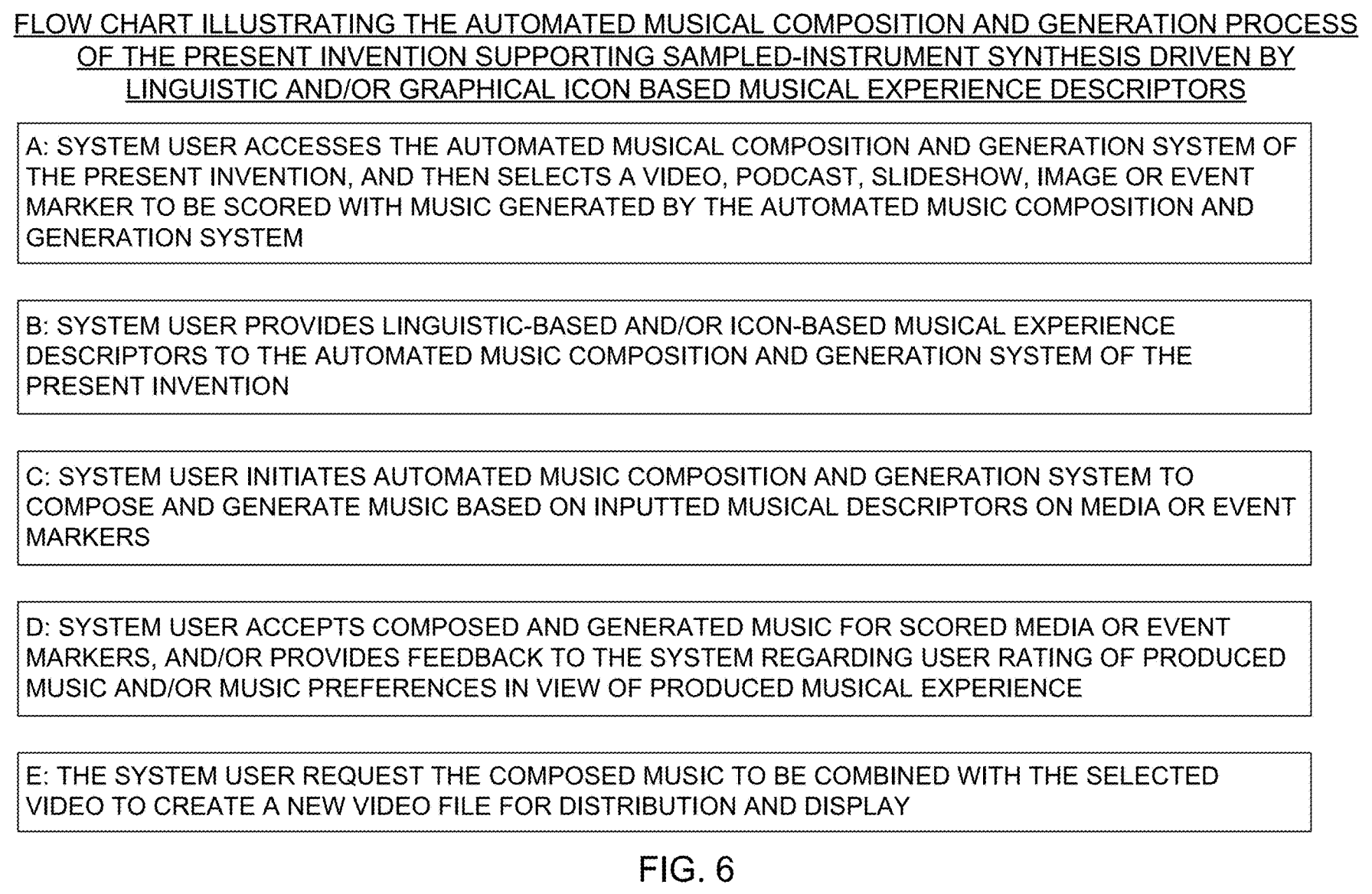

FLOW CHART ILLUSTRATING THE AUTOMATED MUSICAL COMPOSITION AND GENERATION PROCESS OF THE PRESENT INVENTION SUPPORTING SAMPLED-INSTRUMENT SYNTHESIS DRIVEN BY LINGUISTIC AND/OR GRAPHICAL ICON BASED MUSICAL EXPERIENCE DESCRIPTORS

A: SYSTEM USER ACCESSES THE AUTOMATED MUSICAL COMPOSITION AND GENERATION SYSTEM OF THE PRESENT INVENTION, AND THEN SELECTS A VIDEO, PODCAST, SLIDESHOW, IMAGE OR EVENT MARKER TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION SYSTEM OF THE PRESENT INVENTION

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE

E: THE SYSTEM USER REQUEST THE COMPOSED MUSIC TO BE COMBINED WITH THE SELECTED VIDEO TO CREATE A NEW VIDEO FILE FOR DISTRIBUTION AND DISPLAY

FIG. 6

A TOY INSTRUMENT SUPPORTING AUTOMATED MUSIC COMPOSITION AND GENERATION USING SAMPLED-INSTRUMENT SYNTHESIS AND ICON-BASED MUSICAL EXPERIENCE DESCRIPTORS

AUTOMATED TOY MUSIC COMPOSITION AND GENERATION INSTRUMENT SYSTEM SUPPORTING SAMPLED-INSTRUMENT SYNTHESIS AND THE USE OF GRAPHICAL ICON BASED MUSICAL EXPERIENCE DESCRIPTORS SELECTED USING A KEYBOARD

AUTOMATED TOY MUSIC COMPOSITION AND GENERATION INSTRUMENT SYSTEM SUPPORTING SAMPLED-INSTRUMENT SYNTHESIS DRIVEN BY GRAPHICAL-ICON BASED MUSICAL EXPERIENCE DESCRIPTORS PRODUCED USING A KEYBOARD

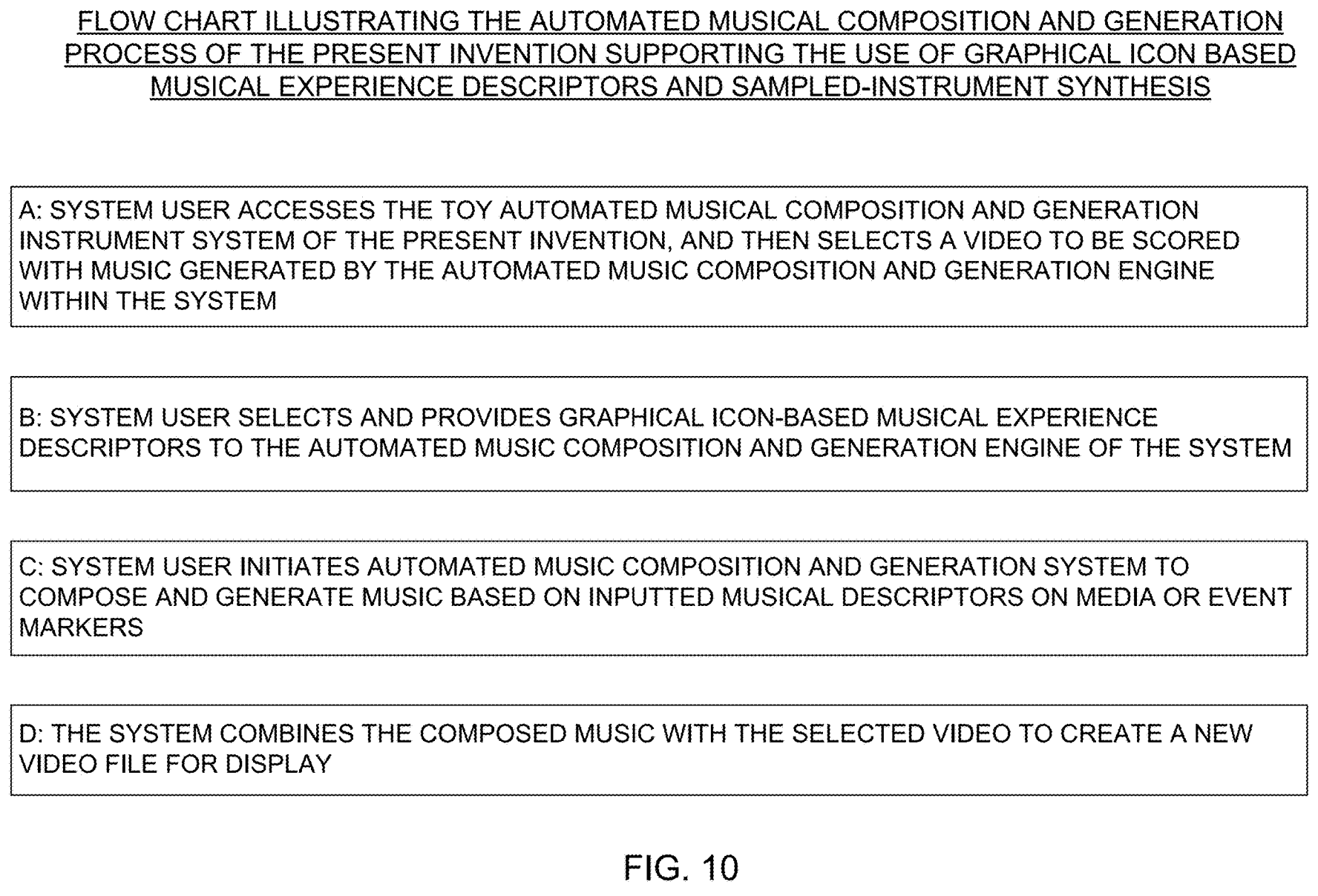

FLOW CHART ILLUSTRATING THE AUTOMATED MUSICAL COMPOSITION AND GENERATION PROCESS OF THE PRESENT INVENTION SUPPORTING THE USE OF GRAPHICAL ICON BASED MUSICAL EXPERIENCE DESCRIPTORS AND SAMPLED-INSTRUMENT SYNTHESIS

A: SYSTEM USER ACCESSES THE TOY AUTOMATED MUSICAL COMPOSITION AND GENERATION INSTRUMENT SYSTEM OF THE PRESENT INVENTION, AND THEN SELECTS A VIDEO TO BE SCORED WITH MUSIC GENERATED BY THE AUTOMATED MUSIC COMPOSITION AND GENERATION ENGINE WITHIN THE SYSTEM

B: SYSTEM USER SELECTS AND PROVIDES GRAPHICAL ICON-BASED MUSICAL EXPERIENCE DESCRIPTORS TO THE AUTOMATED MUSIC COMPOSITION AND GENERATION ENGINE OF THE SYSTEM

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: THE SYSTEM COMBINES THE COMPOSED MUSIC WITH THE SELECTED VIDEO TO CREATE A NEW VIDEO FILE FOR DISPLAY

FIG. 10

ELECTRONIC SYSTEM INTEGRATING THE SOC-BASED AUTOMATED MUSIC COMPOSITION AND GENERATION SYSTEM OF THE PRESENT INVENTION

SYSTEM ARCHITECTURE OF A CLIENT SYSTEM SUPPORTING ACCESS TO THE AUTOMATED MUSIC COMPOSITION AND GENERATION SYSTEM

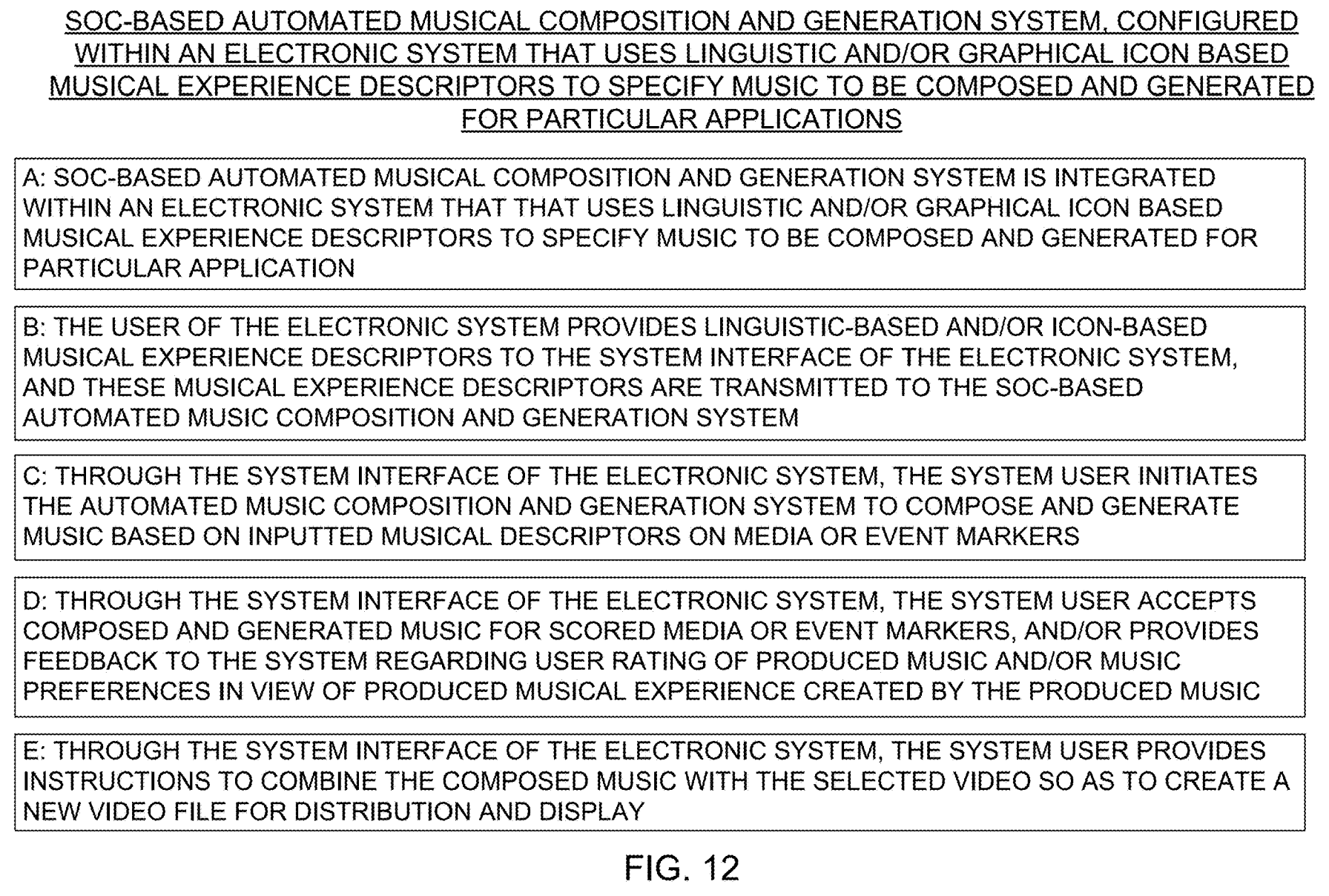

SOC-BASED AUTOMATED MUSICAL COMPOSITION AND GENERATION SYSTEM, CONFIGURED WITHIN AN ELECTRONIC SYSTEM THAT USES LINGUISTIC AND/OR GRAPHICAL ICON BASED MUSICAL EXPERIENCE DESCRIPTORS TO SPECIFY MUSIC TO BE COMPOSED AND GENERATED FOR PARTICULAR APPLICATIONS

A: SOC-BASED AUTOMATED MUSICAL COMPOSITION AND GENERATION SYSTEM IS INTEGRATED WITHIN AN ELECTRONIC SYSTEM THAT THAT USES LINGUISTIC AND/OR GRAPHICAL ICON BASED MUSICAL EXPERIENCE DESCRIPTORS TO SPECIFY MUSIC TO BE COMPOSED AND GENERATED FOR PARTICULAR APPLICATION

B: THE USER OF THE ELECTRONIC SYSTEM PROVIDES LINGUISTIC-BASED AND/OR ICON-BASED MUSICAL EXPERIENCE DESCRIPTORS TO THE SYSTEM INTERFACE OF THE ELECTRONIC SYSTEM, AND THESE MUSICAL EXPERIENCE DESCRIPTORS ARE TRANSMITTED TO THE SOC-BASED AUTOMATED MUSIC COMPOSITION AND GENERATION SYSTEM

C: THROUGH THE SYSTEM INTERFACE OF THE ELECTRONIC SYSTEM, THE SYSTEM USER INITIATES THE AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: THROUGH THE SYSTEM INTERFACE OF THE ELECTRONIC SYSTEM, THE SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE CREATED BY THE PRODUCED MUSIC

E: THROUGH THE SYSTEM INTERFACE OF THE ELECTRONIC SYSTEM, THE SYSTEM USER PROVIDES INSTRUCTIONS TO COMBINE THE COMPOSED MUSIC WITH THE SELECTED VIDEO SO AS TO CREATE A NEW VIDEO FILE FOR DISTRIBUTION AND DISPLAY

FIG. 12

WEB-BASED AUTOMATED MUSIC COMPOSITION AND GENERATION PLATFORM ACCESSIBLE USING WEB-ENABLED MOBILE AND DESKTOP CLIENT MACHINES

ENTERPRISE-LEVEL INTERNET-BASED MUSIC COMPOSITION AND GENERATION SYSTEM FOR SCORING VIDEOS, IMAGES, PODCASTS, AND OTHER EVENT MARKERS WITH AUTOMATICALLY COMPOSED AND GENERATED MUSIC, USING SAMPLED-INSTRUMENT SYNTHESIS AND THE USE OF LINGUISTIC-BASED MUSICAL EXPERIENCE DESCRIPTORS PRODUCED USING A TEXT KEYBOARD AND/OR A SPEECH RECOGNITION INTERFACE

EXEMPLARY SERVER ARCHITECTURE IN THE AUTOMATED MUSIC COMPOSITION AND GENERATION SYSTEM OF THE PRESENT INVENTION

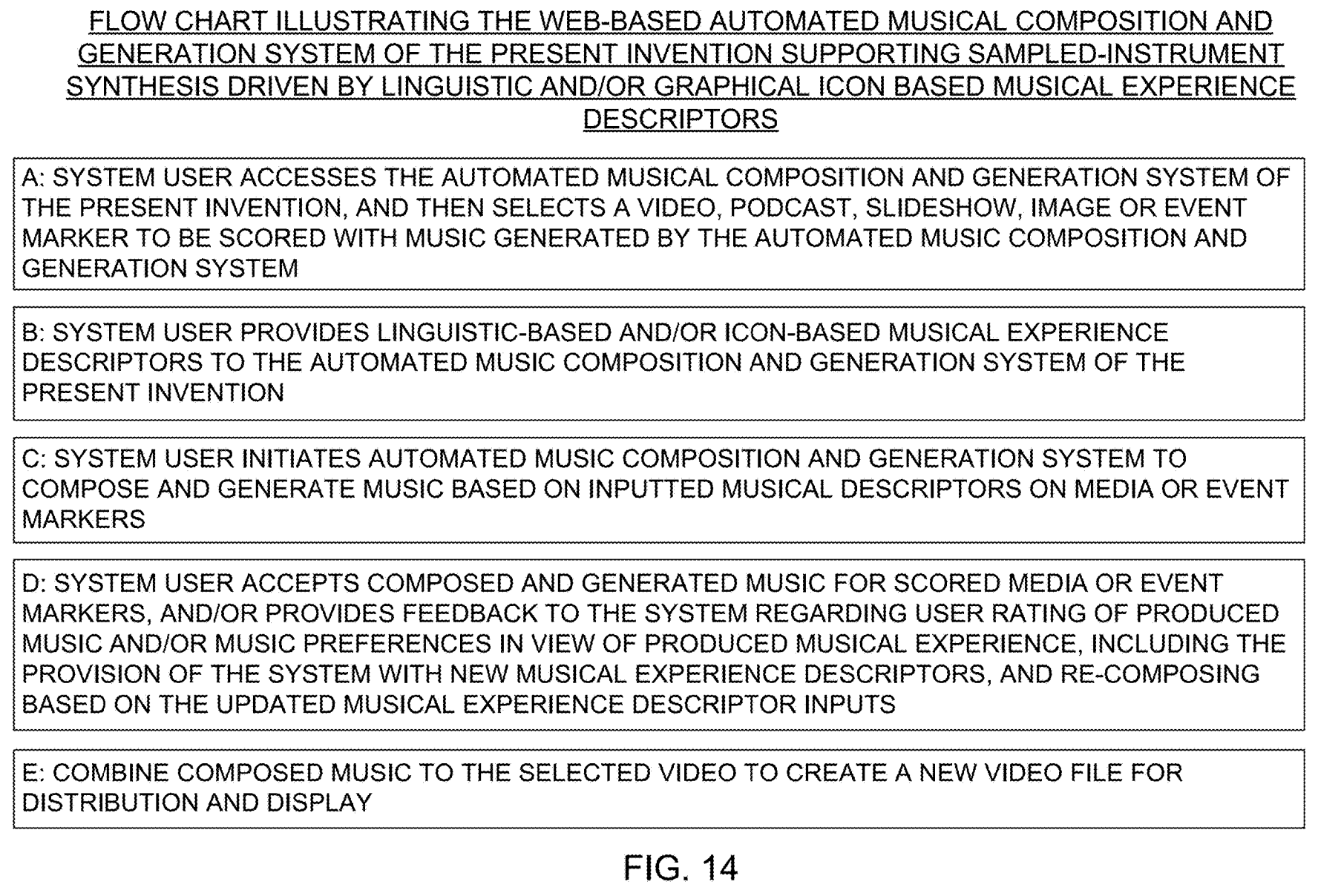

FLOW CHART ILLUSTRATING THE WEB-BASED AUTOMATED MUSICAL COMPOSITION AND GENERATION SYSTEM OF THE PRESENT INVENTION SUPPORTING SAMPLED-INSTRUMENT SYNTHESIS DRIVEN BY LINGUISTIC AND/OR GRAPHICAL ICON BASED MUSICAL EXPERIENCE DESCRIPTORS

A: SYSTEM USER ACCESSES THE AUTOMATED MUSICAL COMPOSITION AND GENERATION SYSTEM OF THE PRESENT INVENTION, AND THEN SELECTS A VIDEO, PODCAST, SLIDESHOW, IMAGE OR EVENT MARKER TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION SYSTEM OF THE PRESENT INVENTION

C: SYSTEM USER INITIATES AUTOMATED MUSIC COMPOSITION AND GENERATION SYSTEM TO COMPOSE AND GENERATE MUSIC BASED ON INPUTTED MUSICAL DESCRIPTORS ON MEDIA OR EVENT MARKERS

D: SYSTEM USER ACCEPTS COMPOSED AND GENERATED MUSIC FOR SCORED MEDIA OR EVENT MARKERS, AND/OR PROVIDES FEEDBACK TO THE SYSTEM REGARDING USER RATING OF PRODUCED MUSIC AND/OR MUSIC PREFERENCES IN VIEW OF PRODUCED MUSICAL EXPERIENCE, INCLUDING THE PROVISION OF THE SYSTEM WITH NEW MUSICAL EXPERIENCE DESCRIPTORS, AND RE-COMPOSING BASED ON THE UPDATED MUSICAL EXPERIENCE DESCRIPTOR INPUTS

E: COMBINE COMPOSED MUSIC TO THE SELECTED VIDEO TO CREATE A NEW VIDEO FILE FOR DISTRIBUTION AND DISPLAY

FIG. 14

FIG. 15B
16:16 PM
80%
Cancel
Camera Roll
0:36
Photos
Shared
Albums

INTERNET-BASED AUTOMATED MUSIC COMPOSITION AND GENERATION PLATFORM ACCESSIBLE USING MOBILE AND DESKTOP CLIENT MACHINES AND FOR SUPPORTING COMPOSED MUSIC TO BE DELIVERED TO EMOTIONALLY-SCORED TEXT SMS AND EMAIL DOCUMENTS, PACKAGE DELIVERY, PRODUCT (E.G. FLOWER) DELIVERY

SYSTEM ARCHITECTURE OF A CLIENT SYSTEM SUPPORTING ACCESS TO THE AUTOMATED MUSIC COMPOSITION AND GENERATION SYSTEM

INTERNET-BASED MUSIC COMPOSITION AND GENERATION SYSTEM FOR SCORING TEXT (SMS), EMAIL MESSAGES, DOCUMENTS, WITH MUSIC, USING SAMPLED-INSTRUMENT SYNTHESIS AND THE USE OF LINGUISTIC AND/OR GRAPHICAL ICON-BASED MUSICAL EXPERIENCE DESCRIPTORS PRODUCED USING A VIRTUAL KEYBOARD

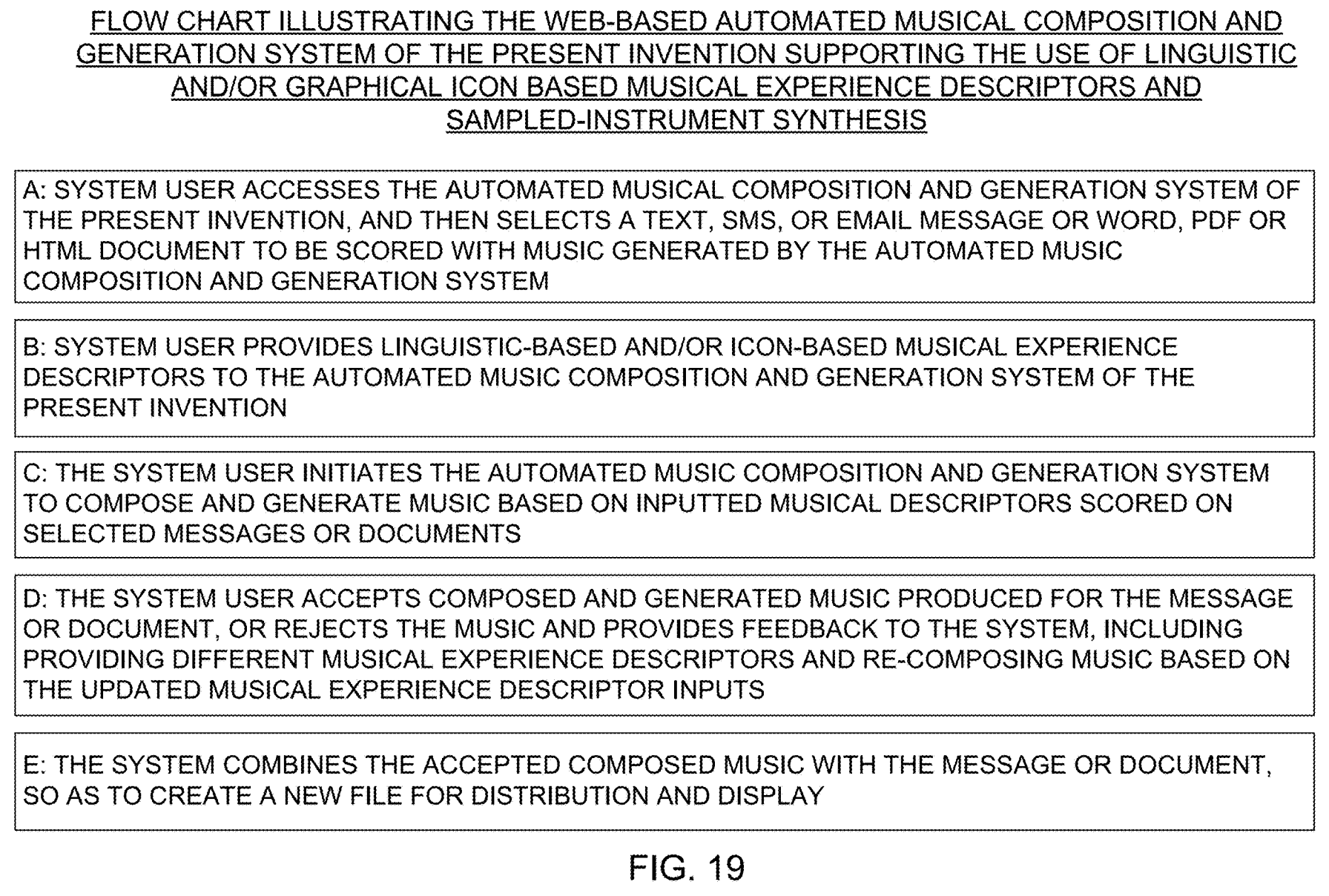

FLOW CHART ILLUSTRATING THE WEB-BASED AUTOMATED MUSICAL COMPOSITION AND GENERATION SYSTEM OF THE PRESENT INVENTION SUPPORTING THE USE OF LINGUISTIC AND/OR GRAPHICAL ICON BASED MUSICAL EXPERIENCE DESCRIPTORS AND SAMPLED-INSTRUMENT SYNTHESIS

A: SYSTEM USER ACCESSES THE AUTOMATED MUSICAL COMPOSITION AND GENERATION SYSTEM OF THE PRESENT INVENTION, AND THEN SELECTS A TEXT, SMS, OR EMAIL MESSAGE OR WORD, PDF OR HTML DOCUMENT TO BE SCORED WITH MUSIC GENERATED BY THE AUTOMATED MUSIC COMPOSITION AND GENERATION SYSTEM

B: SYSTEM USER PROVIDES LINGUISTIC-BASED AND/OR ICON-BASED MUSICAL EXPERIENCE DESCRIPTORS TO THE AUTOMATED MUSIC COMPOSITION AND GENERATION SYSTEM OF THE PRESENT INVENTION

C: THE SYSTEM USER INITIATES THE AUTOMATED MUSIC COMPOSITION AND GENERATION SYSTEM TO COMPOSE AND GENERATE MUSIC BASED ON INPUTTED MUSICAL DESCRIPTORS SCORED ON SELECTED MESSAGES OR DOCUMENTS

D: THE SYSTEM USER ACCEPTS COMPOSED AND GENERATED MUSIC PRODUCED FOR THE MESSAGE OR DOCUMENT, OR REJECTS THE MUSIC AND PROVIDES FEEDBACK TO THE SYSTEM, INCLUDING PROVIDING DIFFERENT MUSICAL EXPERIENCE DESCRIPTORS AND RE-COMPOSING MUSIC BASED ON THE UPDATED MUSICAL EXPERIENCE DESCRIPTOR INPUTS

E: THE SYSTEM COMBINES THE ACCEPTED COMPOSED MUSIC WITH THE MESSAGE OR DOCUMENT, SO AS TO CREATE A NEW FILE FOR DISTRIBUTION AND DISPLAY

FIG. 19

WEB-BASED AUTOMATED MUSIC COMPOSITION AND GENERATION PLATFORM ACCESSIBLE USING WEB-ENABLED MOBILE AND DESKTOP CLIENT MACHINES

AUTONOMOUS MUSIC ANALYZING, COMPOSING AND PERFORMING INSTRUMENT

AUTONOMOUS MUSIC COMPOSITION AND PERFORMANCE SYSTEM FOR ANALYZING MUSIC PERFORMED BY MULTIPLE MUSICAL INSTRUMENTS DURING A PERFORMANCE SESSION AND COMPOSING AND PERFORMING ACCOMPANIMENT MUSIC IN REAL-TIME USING SAMPLED-INSTRUMENT SYNTHESIS

AUTOMATED MUSIC COMPOSITION AND GENERATION SYSTEM
OF THE PRESENT INVENTION WITH SAMPLED INSTRUMENT SYNTHESIS

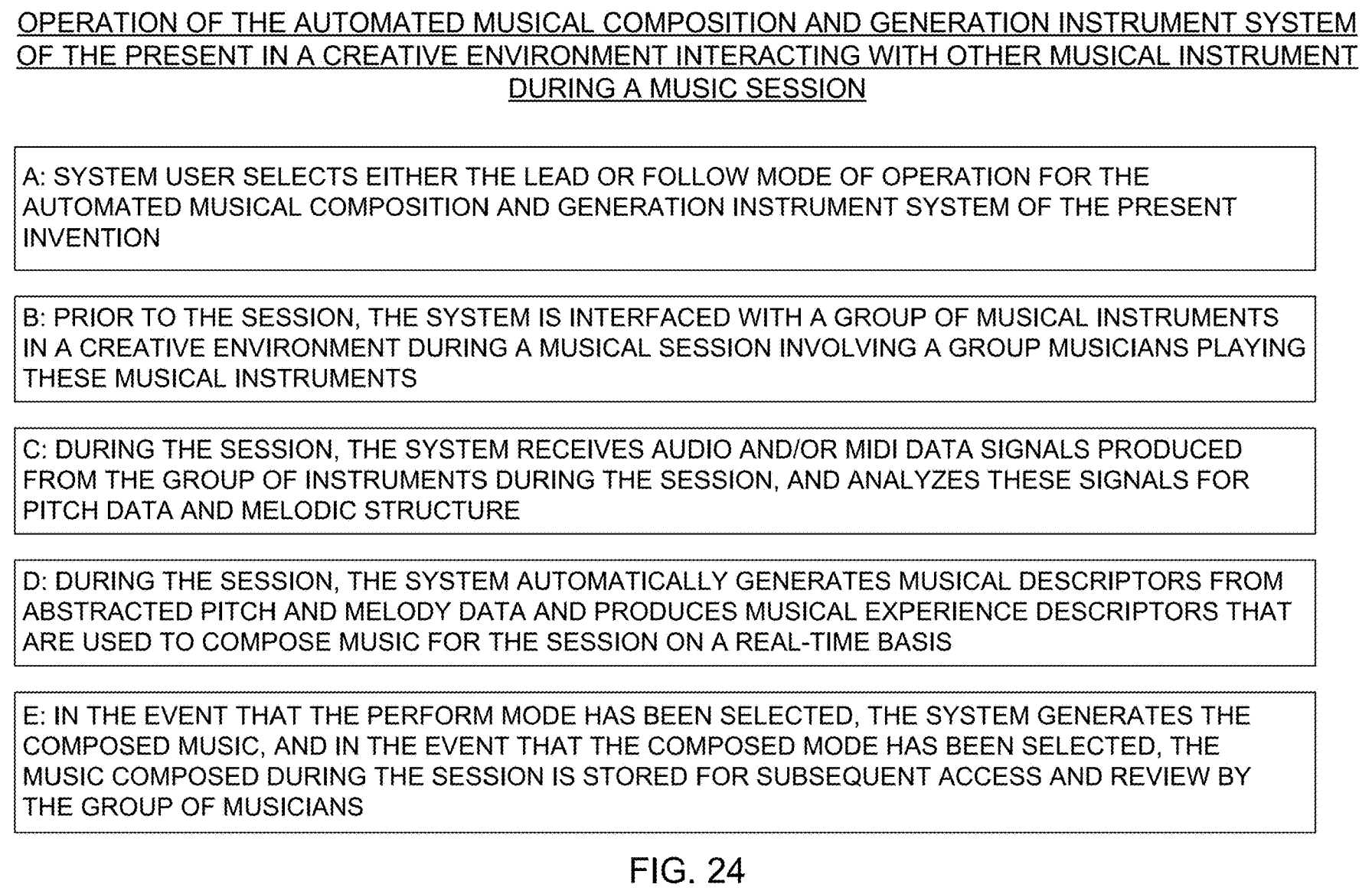

OPERATION OF THE AUTOMATED MUSICAL COMPOSITION AND GENERATION INSTRUMENT SYSTEM OF THE PRESENT IN A CREATIVE ENVIRONMENT INTERACTING WITH OTHER MUSICAL INSTRUMENT DURING A MUSIC SESSION

A: SYSTEM USER SELECTS EITHER THE LEAD OR FOLLOW MODE OF OPERATION FOR THE AUTOMATED MUSICAL COMPOSITION AND GENERATION INSTRUMENT SYSTEM OF THE PRESENT INVENTION

B: PRIOR TO THE SESSION, THE SYSTEM IS INTERFACED WITH A GROUP OF MUSICAL INSTRUMENTS IN A CREATIVE ENVIRONMENT DURING A MUSICAL SESSION INVOLVING A GROUP MUSICIANS PLAYING THESE MUSICAL INSTRUMENTS

C: DURING THE SESSION, THE SYSTEM RECEIVES AUDIO AND/OR MIDI DATA SIGNALS PRODUCED FROM THE GROUP OF INSTRUMENTS DURING THE SESSION, AND ANALYZES THESE SIGNALS FOR PITCH DATA AND MELODIC STRUCTURE

D: DURING THE SESSION, THE SYSTEM AUTOMATICALLY GENERATES MUSICAL DESCRIPTORS FROM ABSTRACTED PITCH AND MELODY DATA AND PRODUCES MUSICAL EXPERIENCE DESCRIPTORS THAT ARE USED TO COMPOSE MUSIC FOR THE SESSION ON A REAL-TIME BASIS

E: IN THE EVENT THAT THE PERFORM MODE HAS BEEN SELECTED, THE SYSTEM GENERATES THE COMPOSED MUSIC, AND IN THE EVENT THAT THE COMPOSED MODE HAS BEEN SELECTED, THE MUSIC COMPOSED DURING THE SESSION IS STORED FOR SUBSEQUENT ACCESS AND REVIEW BY THE GROUP OF MUSICIANS

FIG. 24

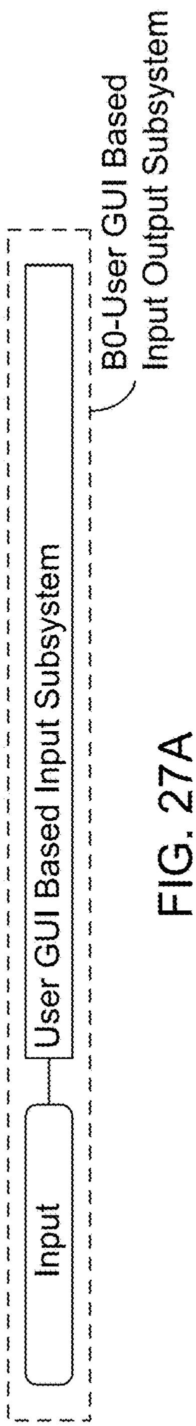
FIG. 27A
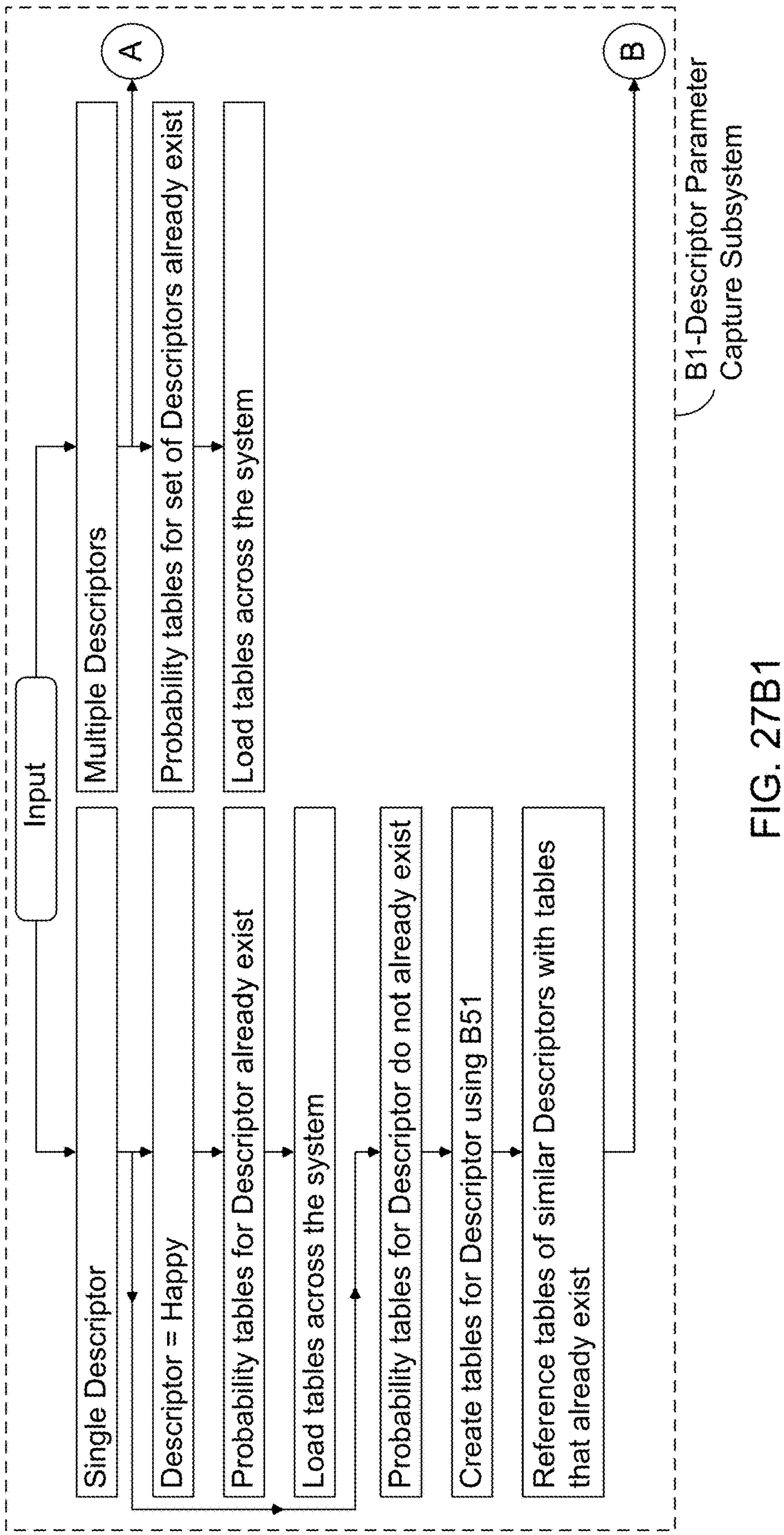
FIG. 27B1

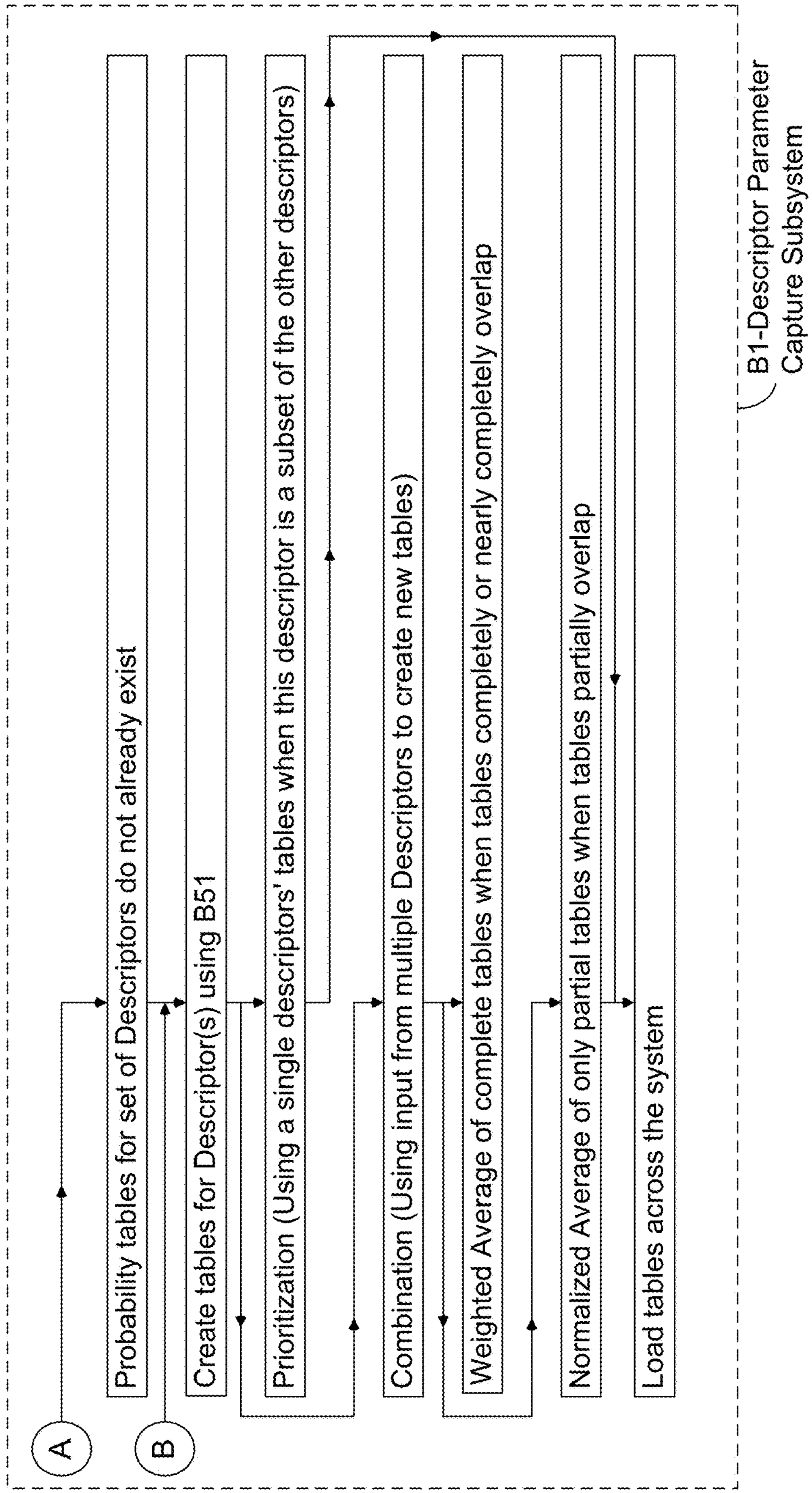
FIG. 27B2

INFORMATION PROCESSING ENGINE FOR TRANSFORMING MUSICAL EXPERIENCE (MUSEX) PARAMETERS AND OPTIONALLY TIMING AND/OR SPATIAL PARAMETERS, INTO PROBABILITY-BASED SYSTEM OPERATING PARAMETERS MAINTAINED WITHIN PROGRAMMABLE PARAMETER TABLES EMPLOYED WITHIN THE DIVERSE SUBSYSTEMS OF THE AUTOMATED MUSIC COMPOSITION AND GENERATION SYSTEM OF THE PRESENT INVENTION

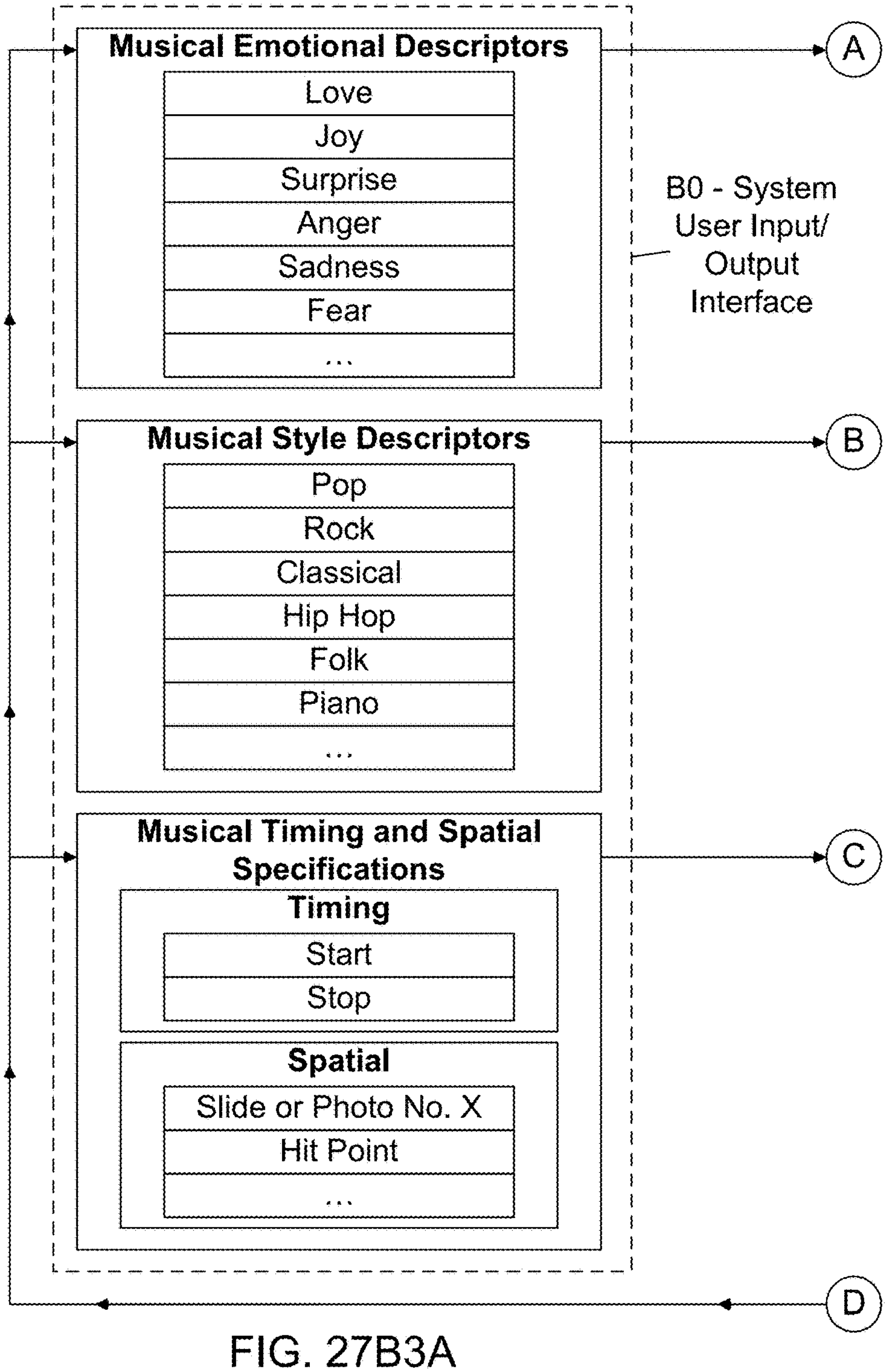

FIG. 27B3A

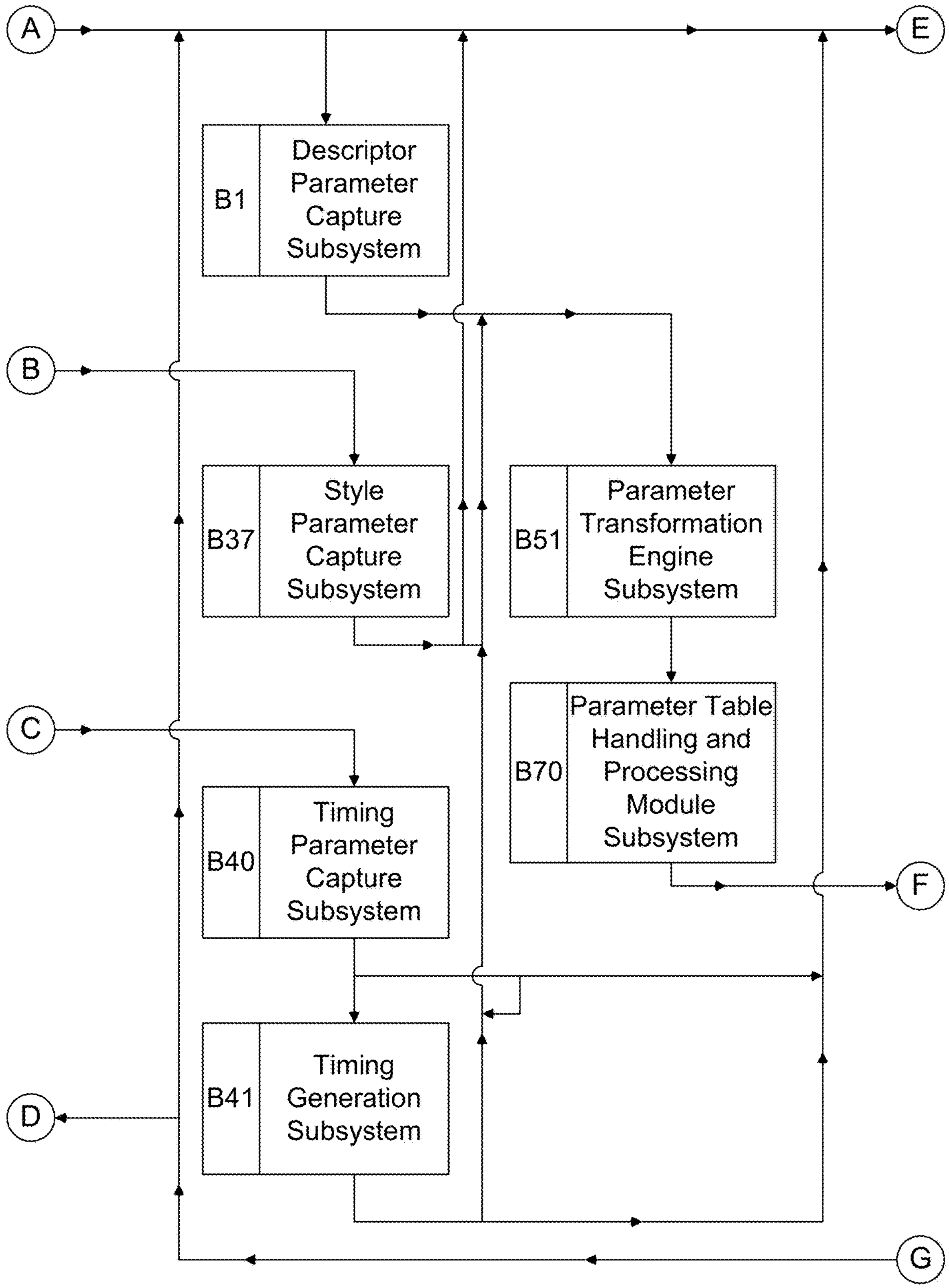
FIG. 27B3B

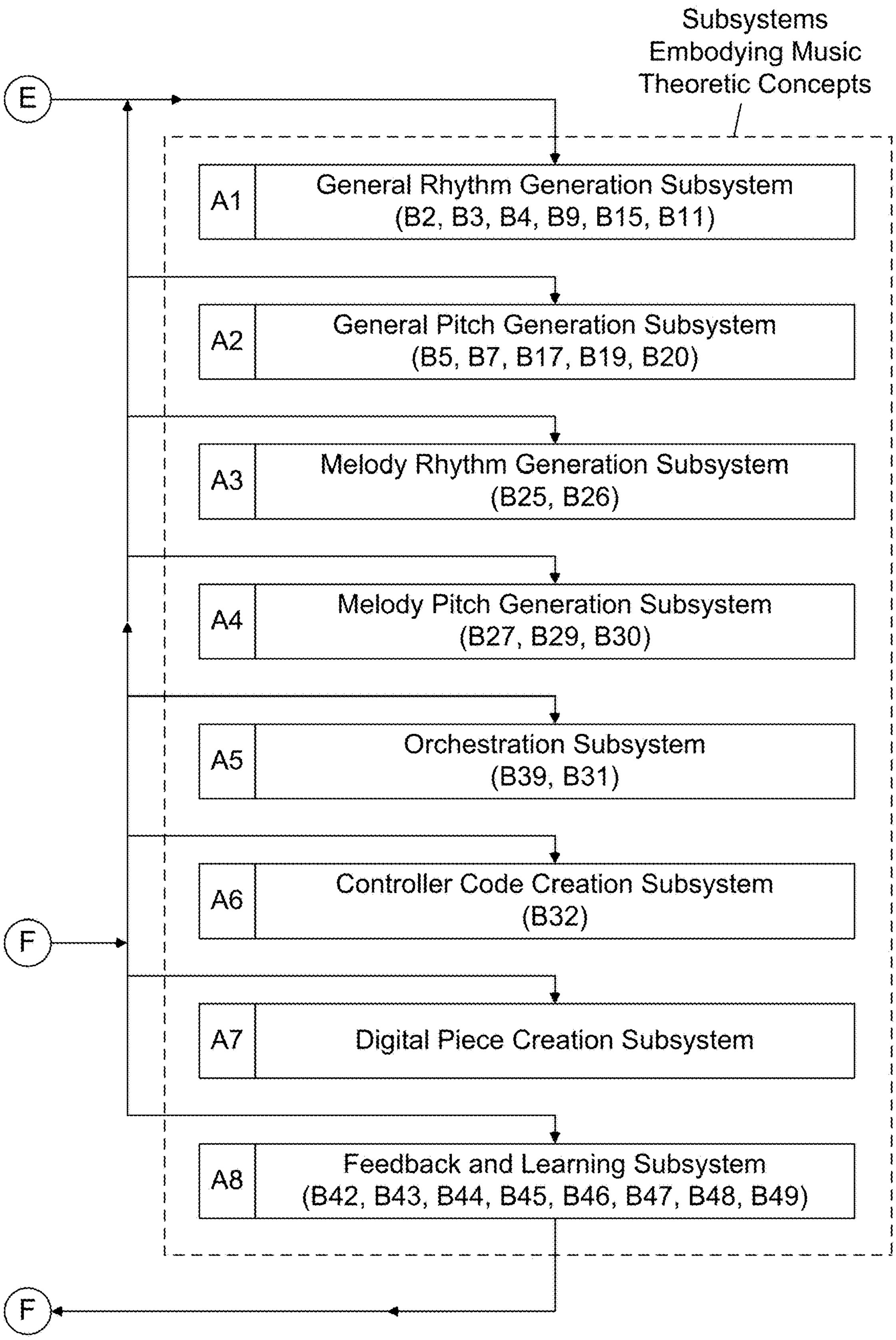
FIG. 27B3C

MAP SPECIFYING LOCATIONS OF PARTICULAR SYSTEM OPERATING PARAMETER (SOP) TABLES WITHIN THE SUBSYSTEMS OF AUTOMATIC MUSIC COMPOSITION AND GENERATION SYSTEM OF THE PRESENT INVENTION

A1

| Subsystems Embodying Music Theoretic Concepts | | Probability-Based System Operating Parameter Tables | | | |
|---|---|---|---|---|---|
| B2 | Length Generation Subsystem | Length | | | |
| B3 | Tempo Generation Subsystem | Tempo | | | |
| B4 | Meter Generation Subsystem | Meter | | | |
| B9 | Song Form Generation Subsystem | Song Form | | | |
| B15 | Sub-Phrase Length Generation Subsystem | Sub Phrase | Sub Phrase Length | | |
| B11 | Chord Length Generation Subsystem | Initial Chord Length | Second Chord Length | Third Chord Length | nth Chord Length |

FIG. 27B4A

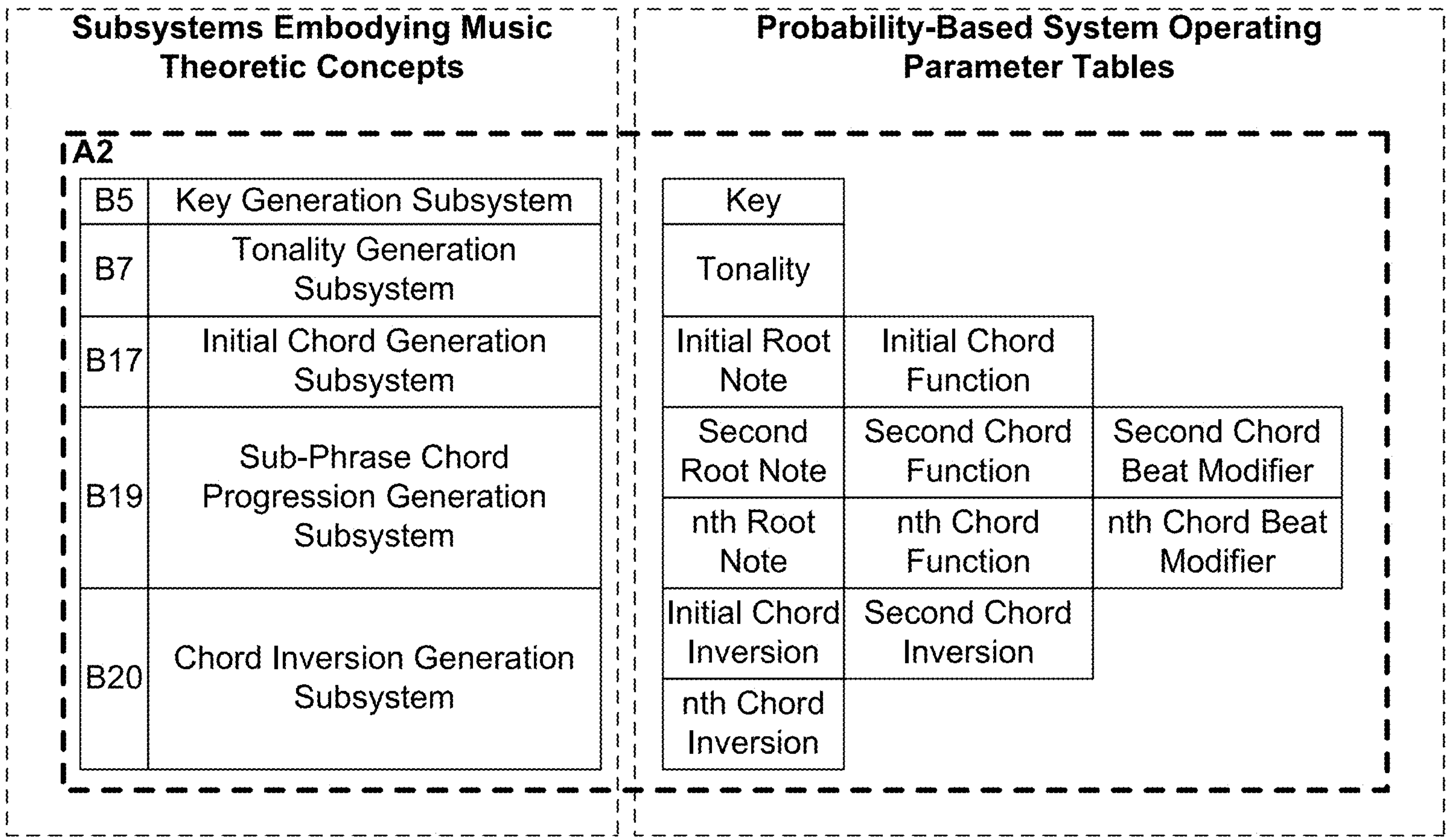
FIG. 27B4B

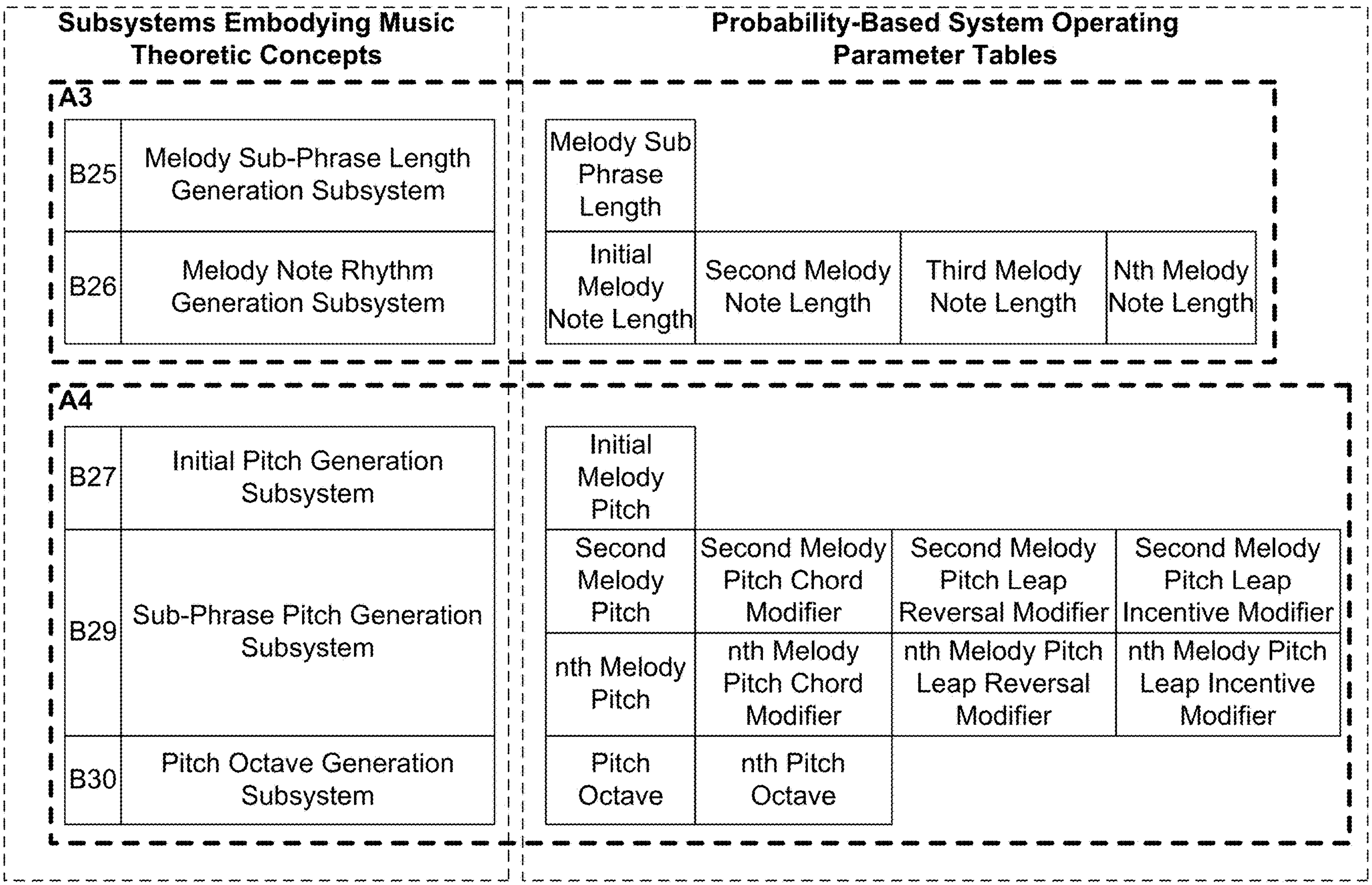
FIG. 27B4C

Subsystems Embodying Music Theoretic Concepts

A5

| | |
|---|---|
| B39 | Instrument Selector Subsystem |
| B31 | Orchestration Generation Subsystem |

Probability-Based System Operating Parameter Tables

| | | | | |
|---|---|---|---|---|
| Instrument Selector | | | | |
| Function | Piano Style | Piano Right Hand | Piano Left Hand | Piano Initial Note Length |
| Piano Second Note Length | Piano Third Note Length | Piano nth Note Length | Piano Dynamic | nth Instrument Style |
| nth Instrument Right Hand | nth Instrument Left Hand | nth Instrument Initial Note Length | nth Instrument Second Note Length | |
| nth Instrument Third Note Length | nth Instrument nth Note Length | nth Instrument Dynamic | | |

FIG. 27B4D

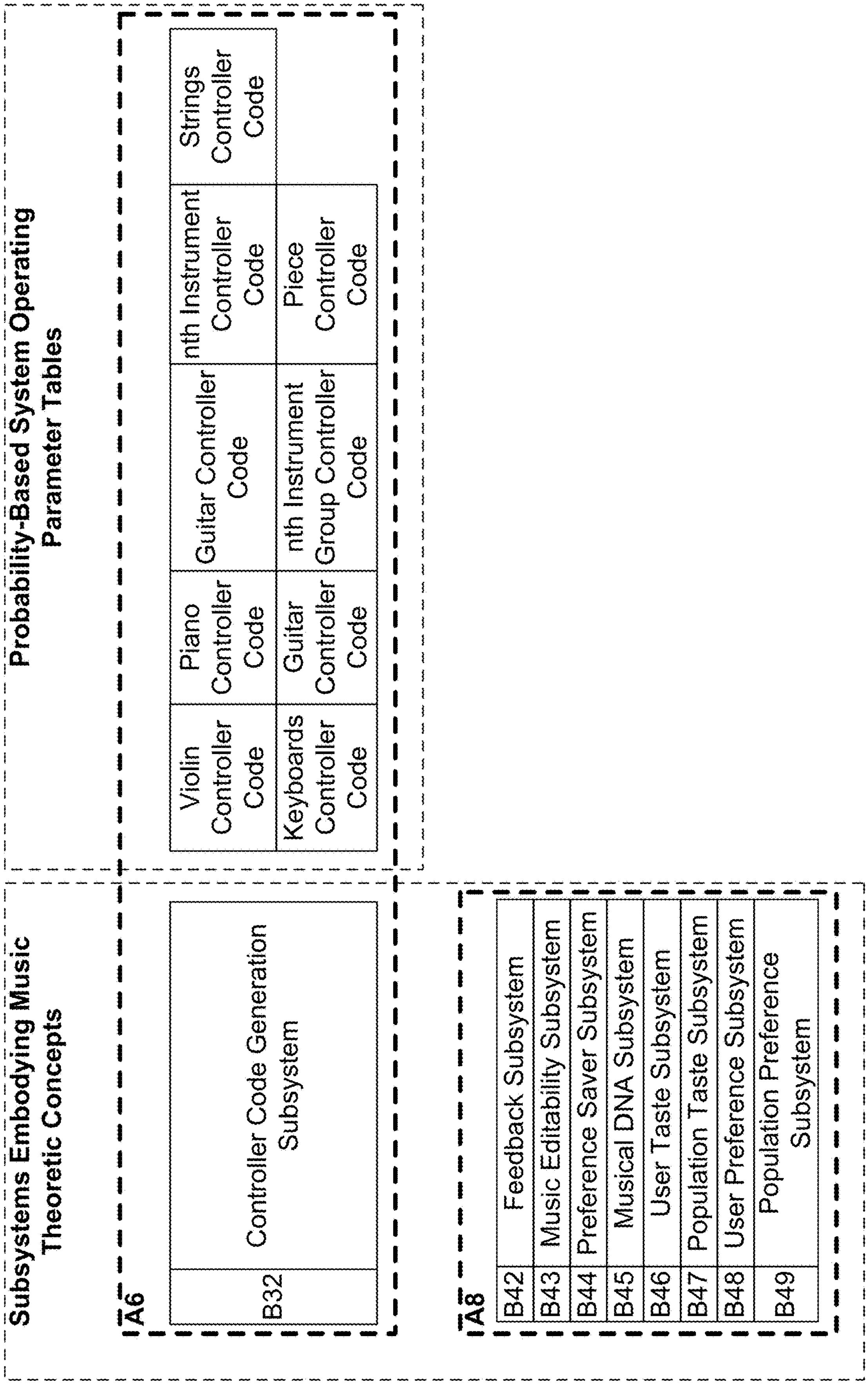
FIG. 27B4E

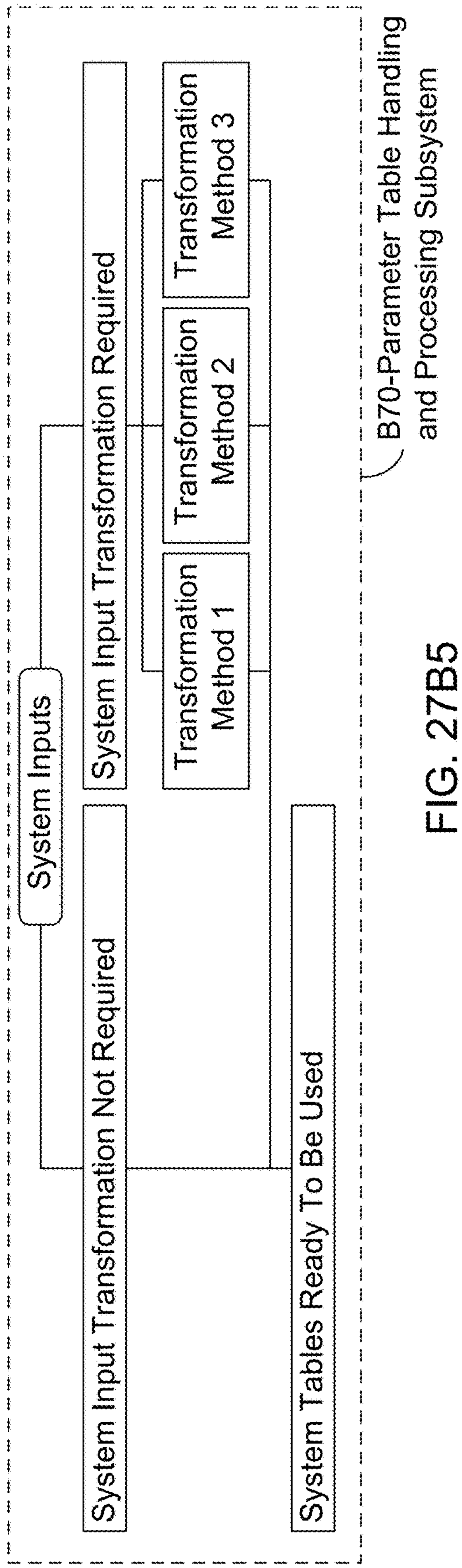
FIG. 27B5
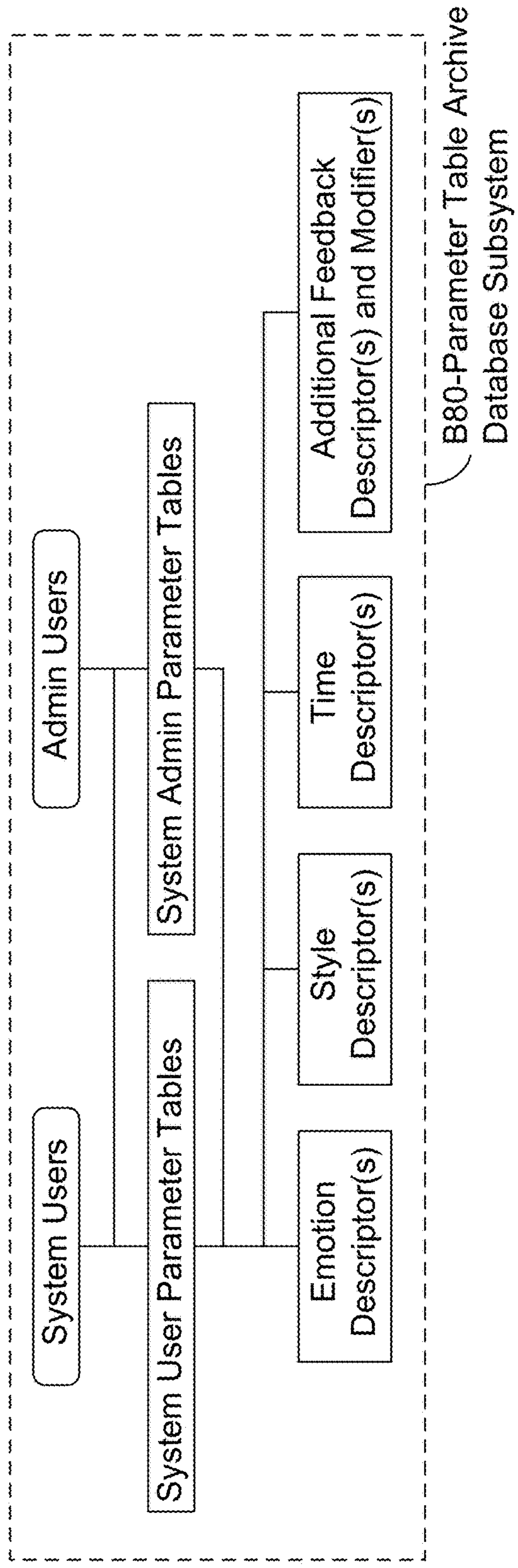
FIG. 27B6

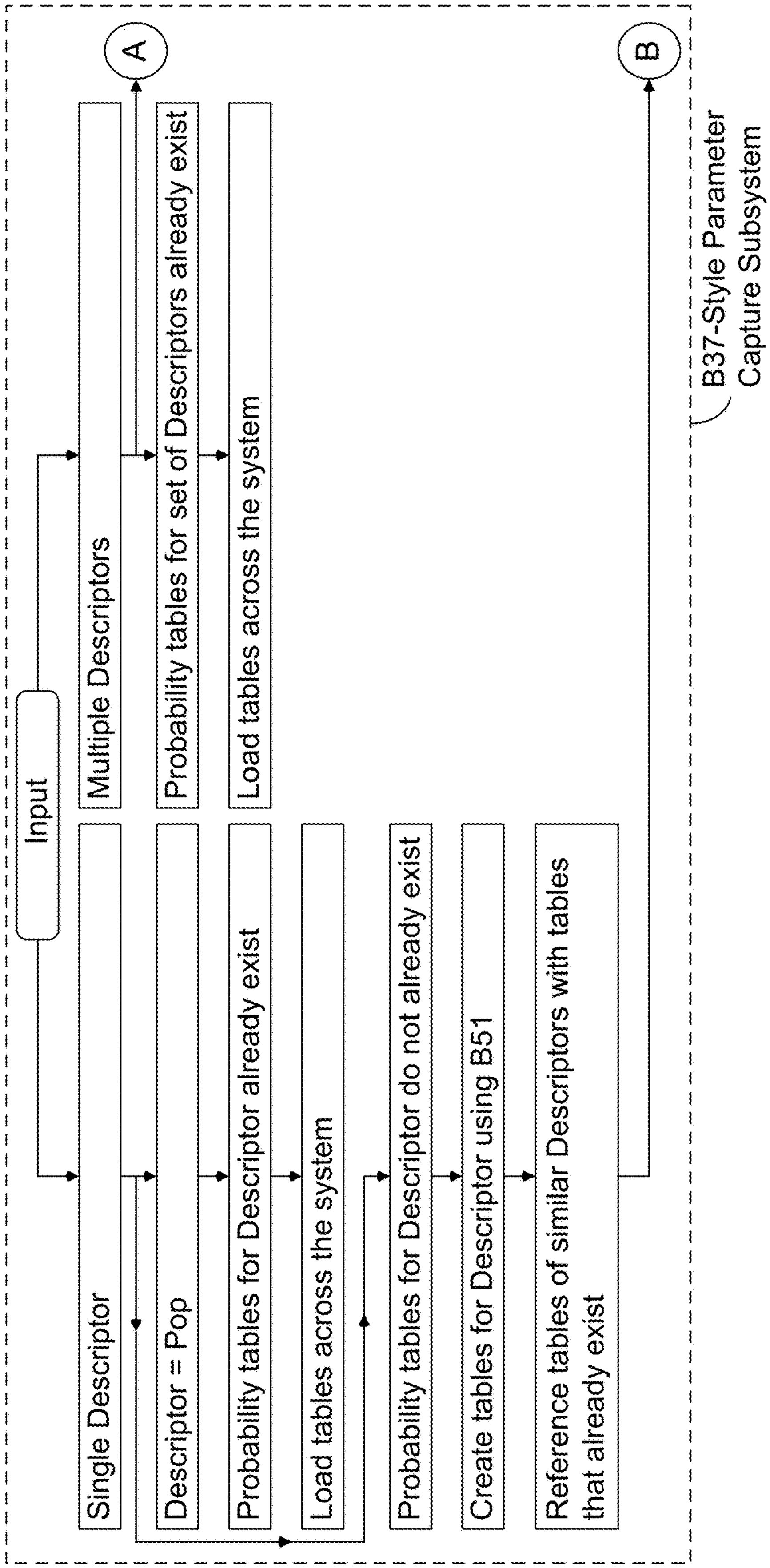
FIG. 27C1

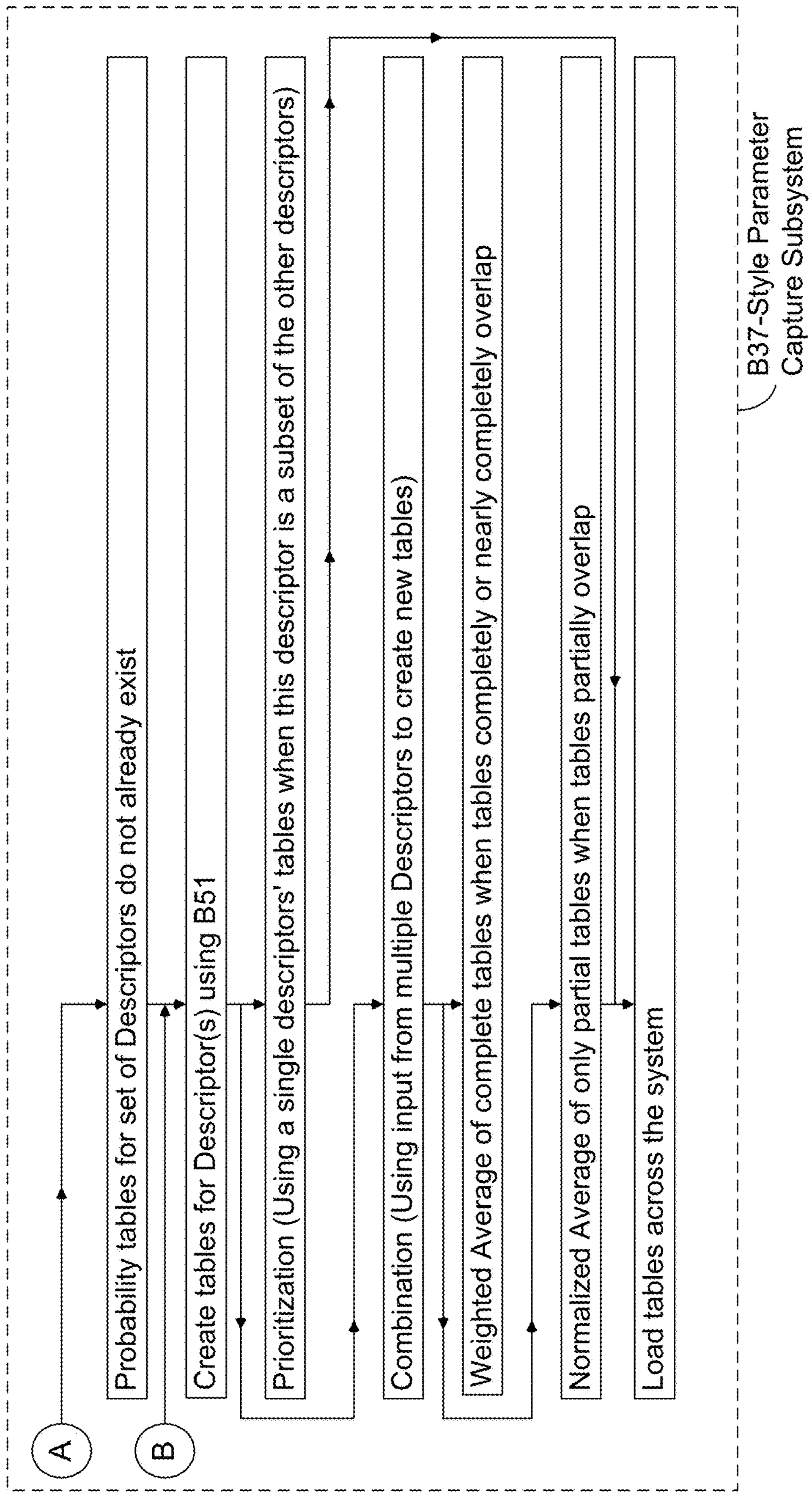
FIG. 27C2

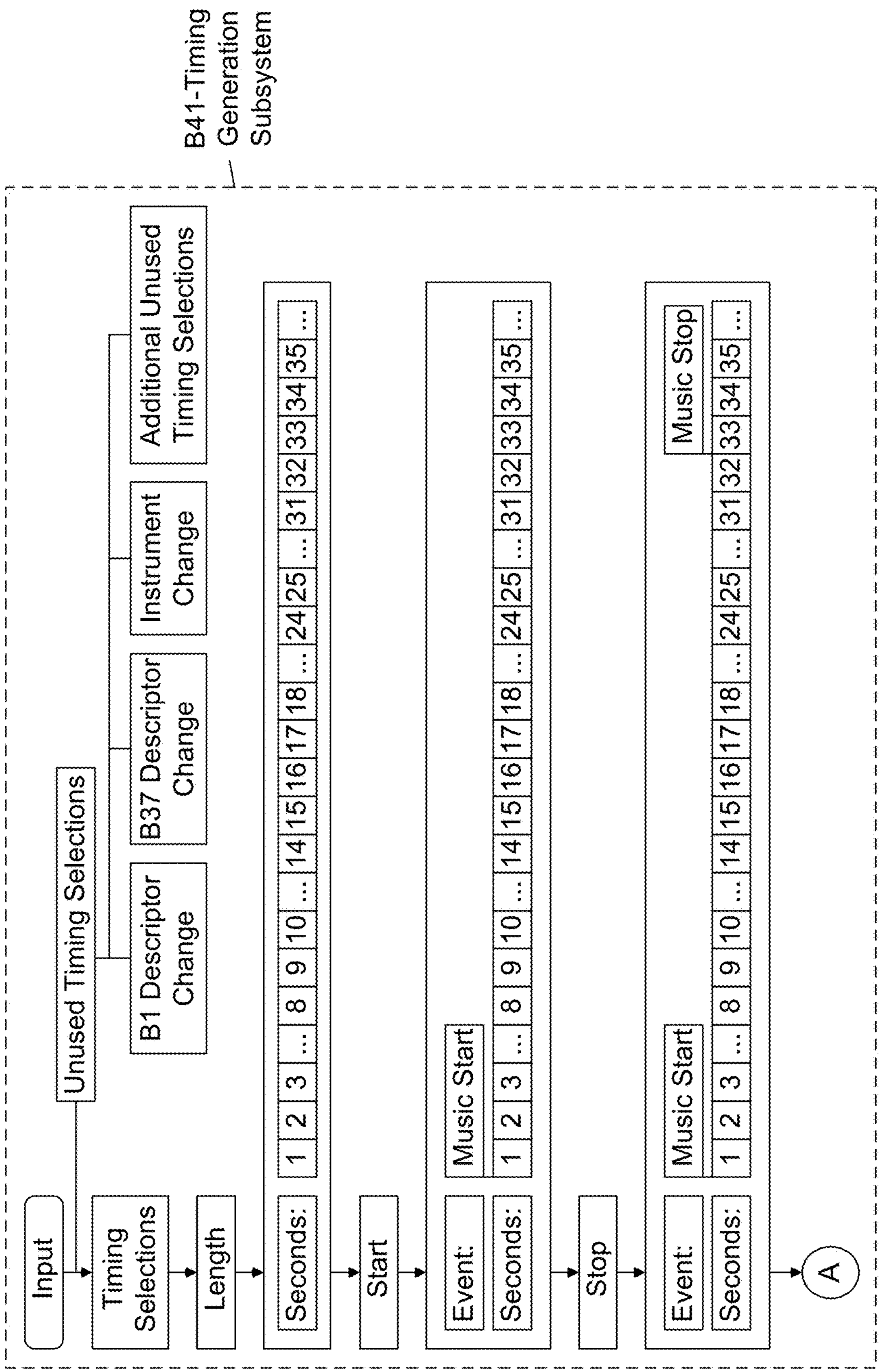
FIG. 27E1

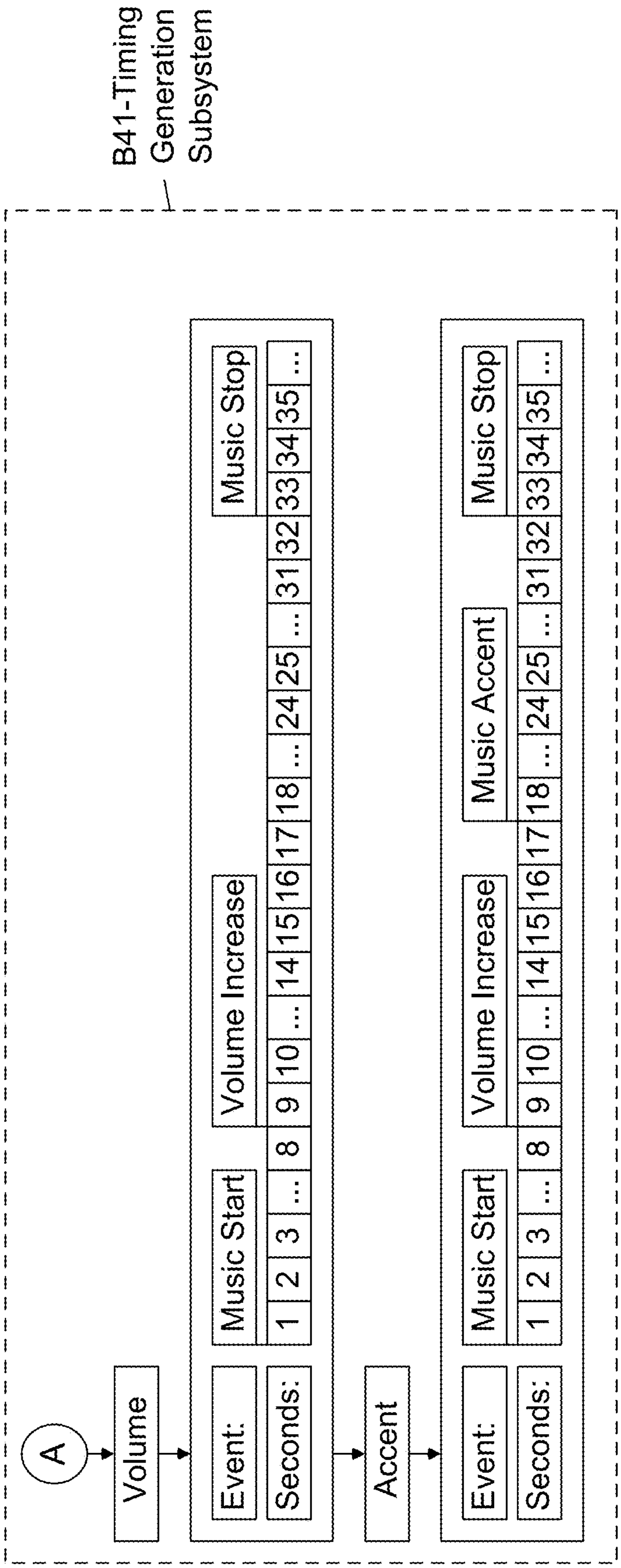
FIG. 27E2

| Key | 0 | 1 | 2 | 3 | 4 | 5 | 6 | 7 | 8 | 9 | 10 | 11 |
|---|---|---|---|---|---|---|---|---|---|---|---|---|
| Musical Letter | C | C#/Db | D | D#/Eb | E | F | F#/Gb | G | G#/Ab | A | A#/Bb | B |
| Probability | 0.1 | 0.1 | 0.1 | 0.1 | 0.1 | 0.1 | 0.1 | 0.1 | 0.1 | 0.1 | 0 | 0 |

| Tonality | Major | Minor (Natural) | Minor (Harmonic) | Minor (Melodic) | Dorian | Phrygian | Lydian | Mixolydian | Aeolian | Locrian |
|---|---|---|---|---|---|---|---|---|---|---|
| Probability | 0.5 | 0.0 | 0.0 | 0.0 | 0.1 | 0.1 | 0.1 | 0.1 | 0.1 | 0.0 |

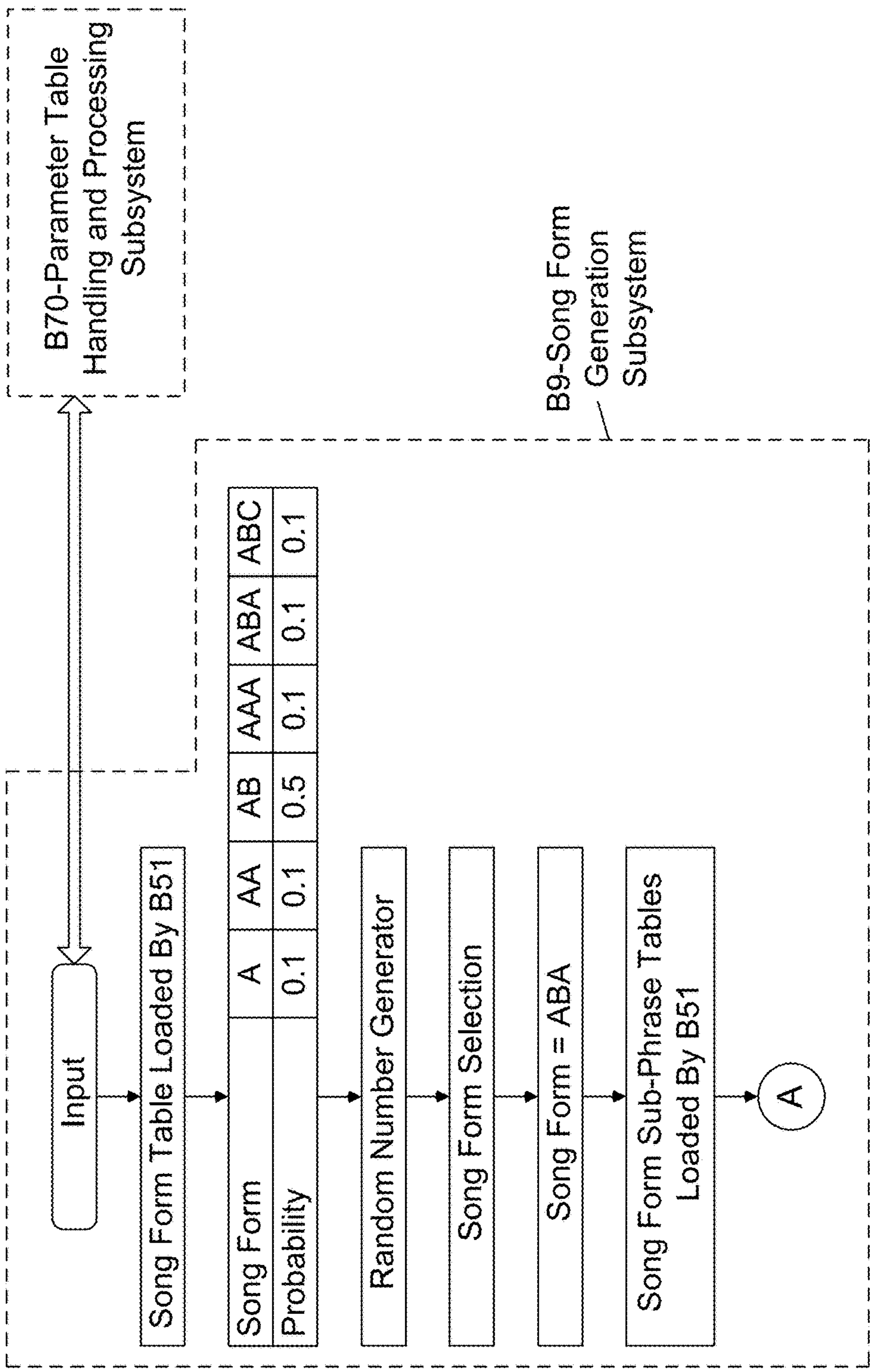
FIG. 27M1

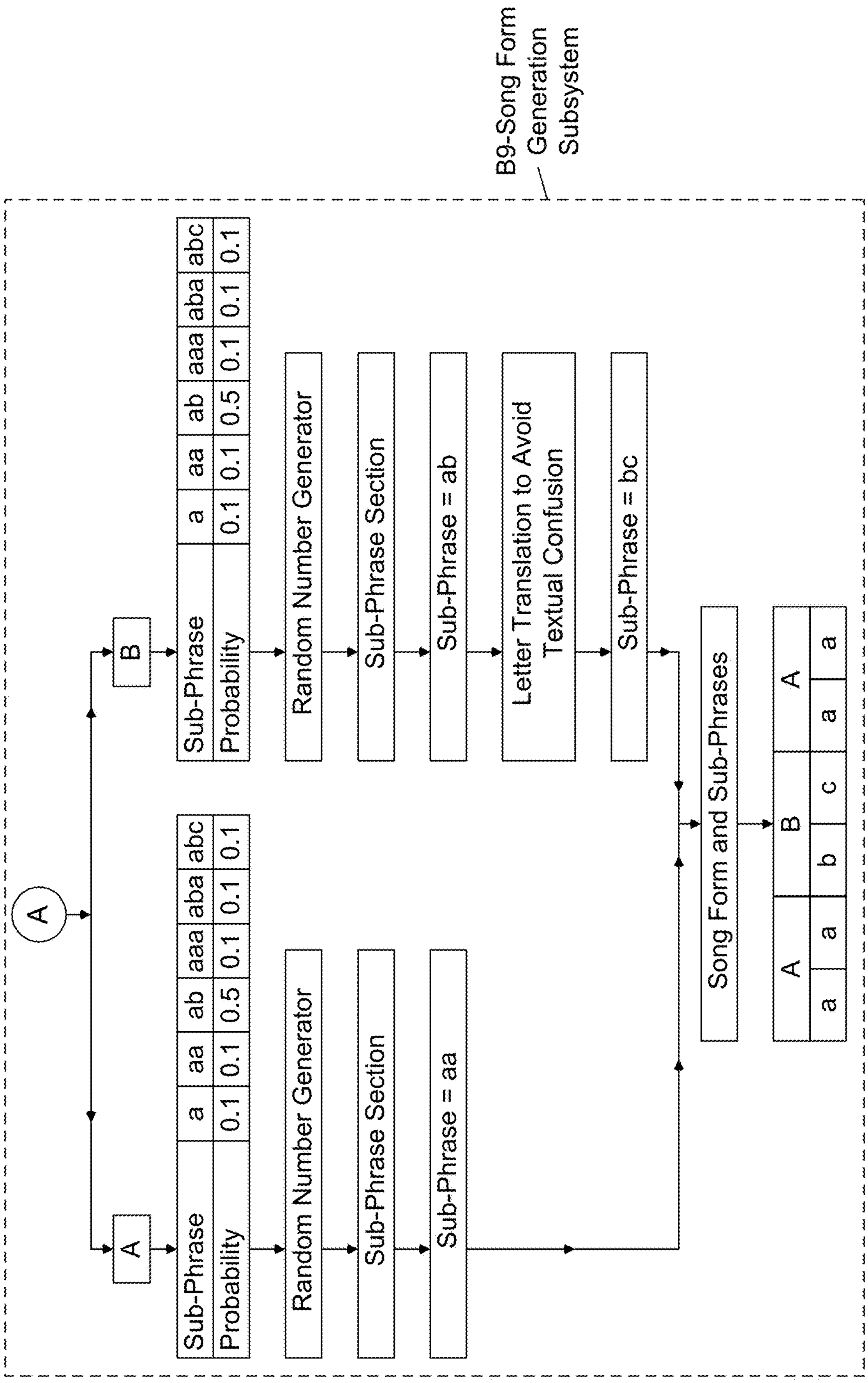
FIG. 27M2

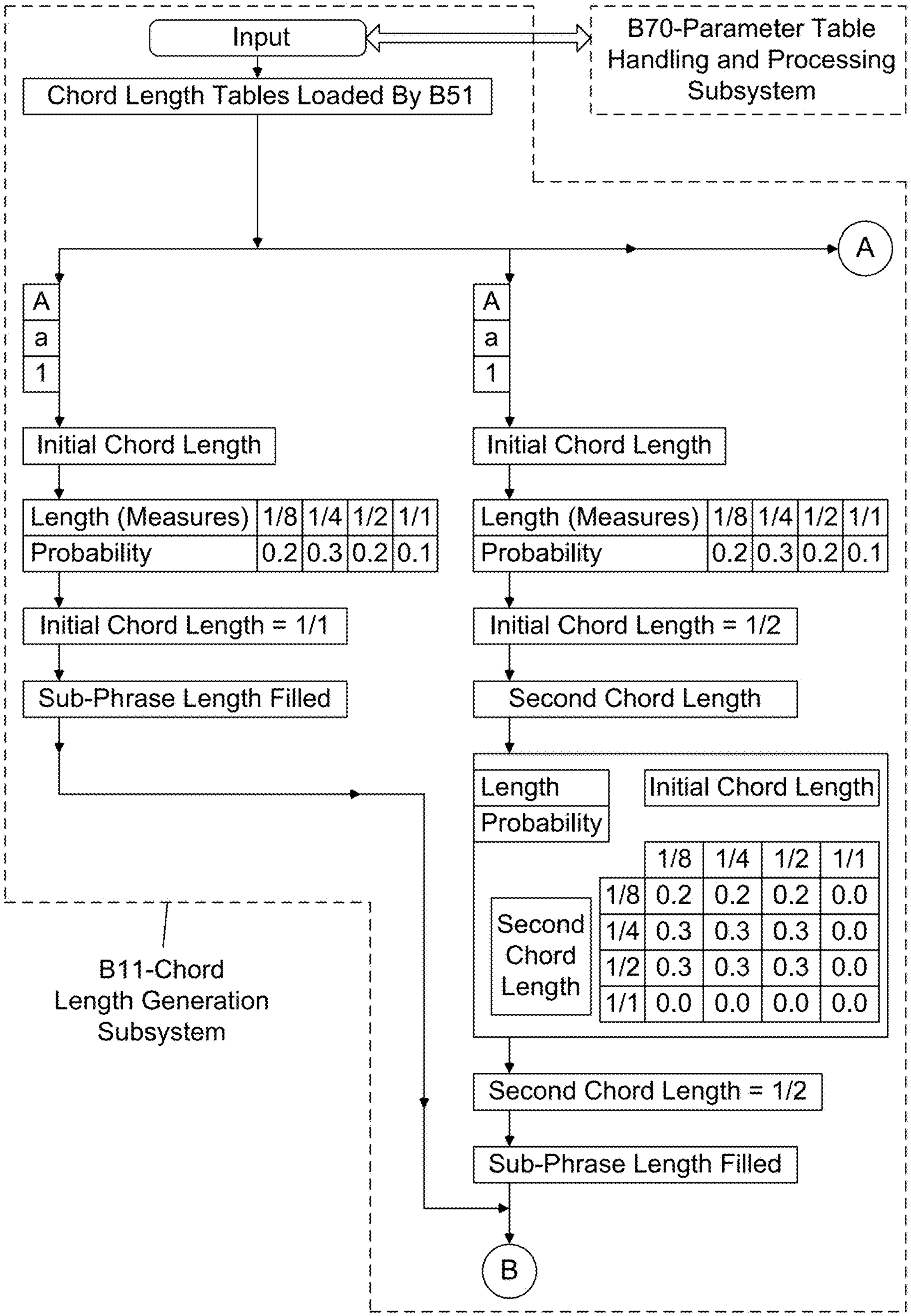
FIG. 27O1

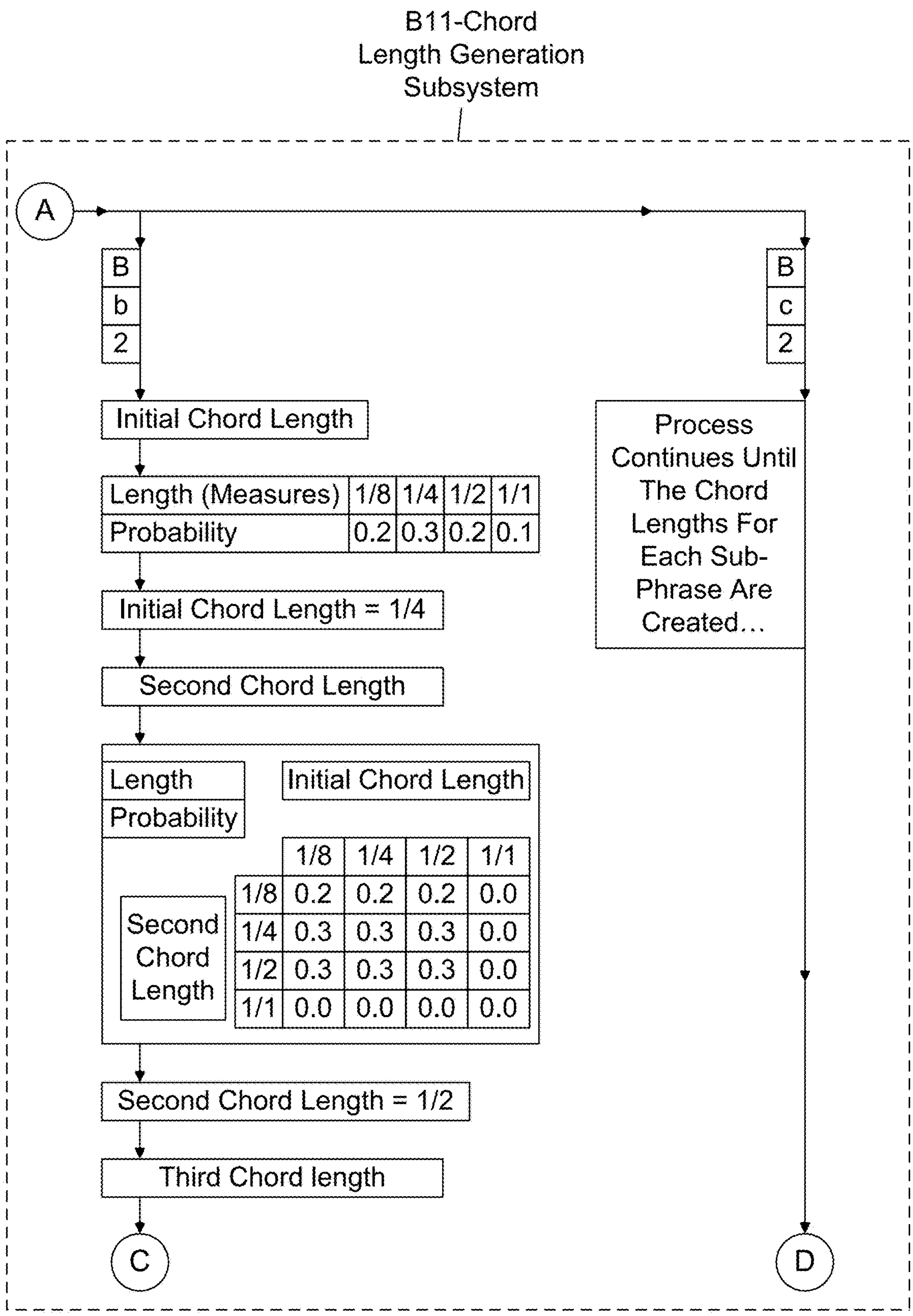
FIG. 27O2

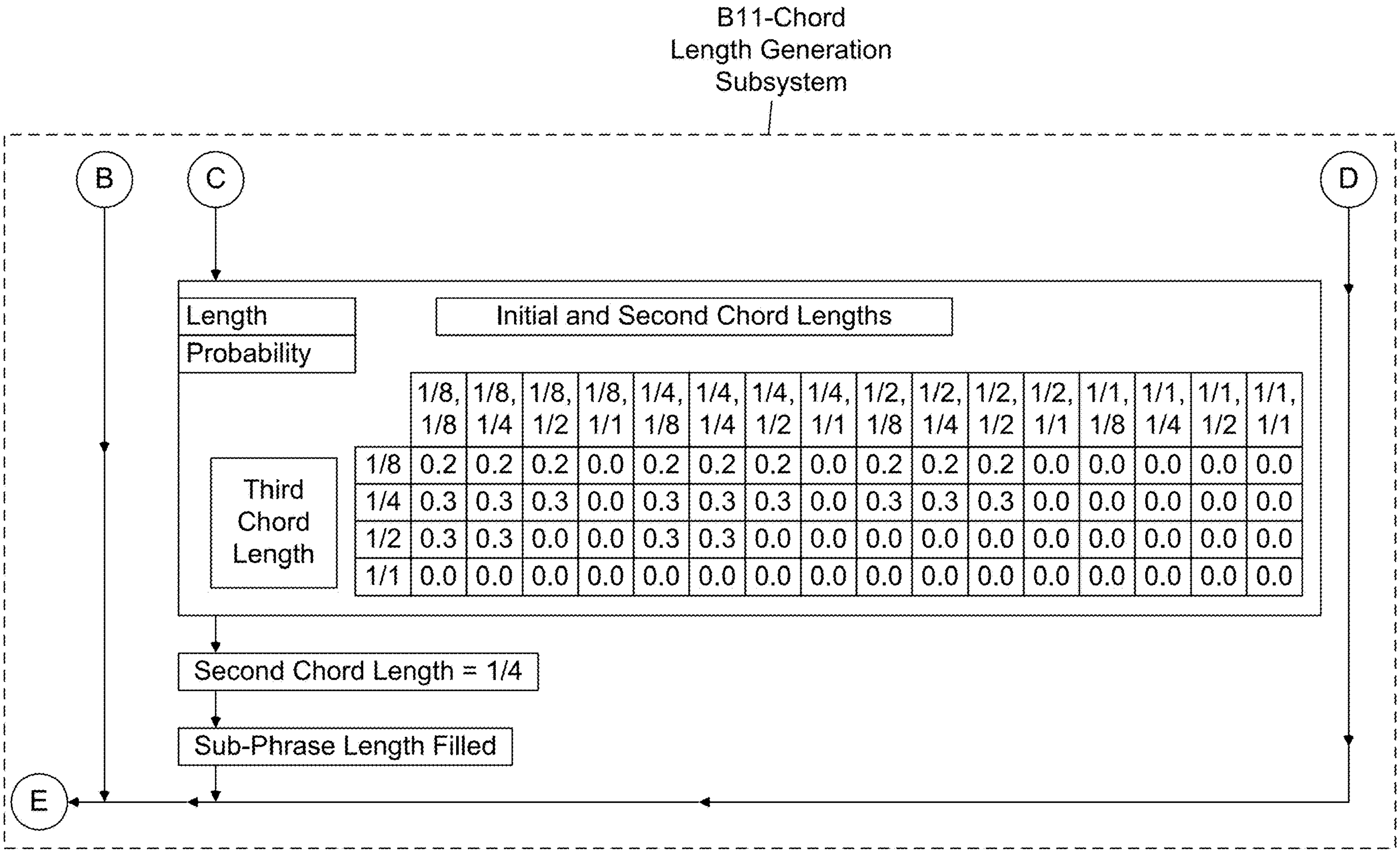
| Third Chord Length | 1/8, 1/8 | 1/8, 1/4 | 1/8, 1/2 | 1/8, 1/1 | 1/4, 1/8 | 1/4, 1/4 | 1/4, 1/2 | 1/4, 1/1 | 1/2, 1/8 | 1/2, 1/4 | 1/2, 1/2 | 1/2, 1/1 | 1/1, 1/8 | 1/1, 1/4 | 1/1, 1/2 | 1/1, 1/1 |
|---|---|---|---|---|---|---|---|---|---|---|---|---|---|---|---|---|
| 1/8 | 0.2 | 0.2 | 0.2 | 0.0 | 0.2 | 0.2 | 0.2 | 0.0 | 0.2 | 0.2 | 0.2 | 0.0 | 0.0 | 0.0 | 0.0 | 0.0 |
| 1/4 | 0.3 | 0.3 | 0.3 | 0.0 | 0.3 | 0.3 | 0.3 | 0.0 | 0.3 | 0.3 | 0.3 | 0.0 | 0.0 | 0.0 | 0.0 | 0.0 |
| 1/2 | 0.3 | 0.3 | 0.0 | 0.0 | 0.3 | 0.3 | 0.0 | 0.0 | 0.0 | 0.0 | 0.0 | 0.0 | 0.0 | 0.0 | 0.0 | 0.0 |
| 1/1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
FIG. 27O3

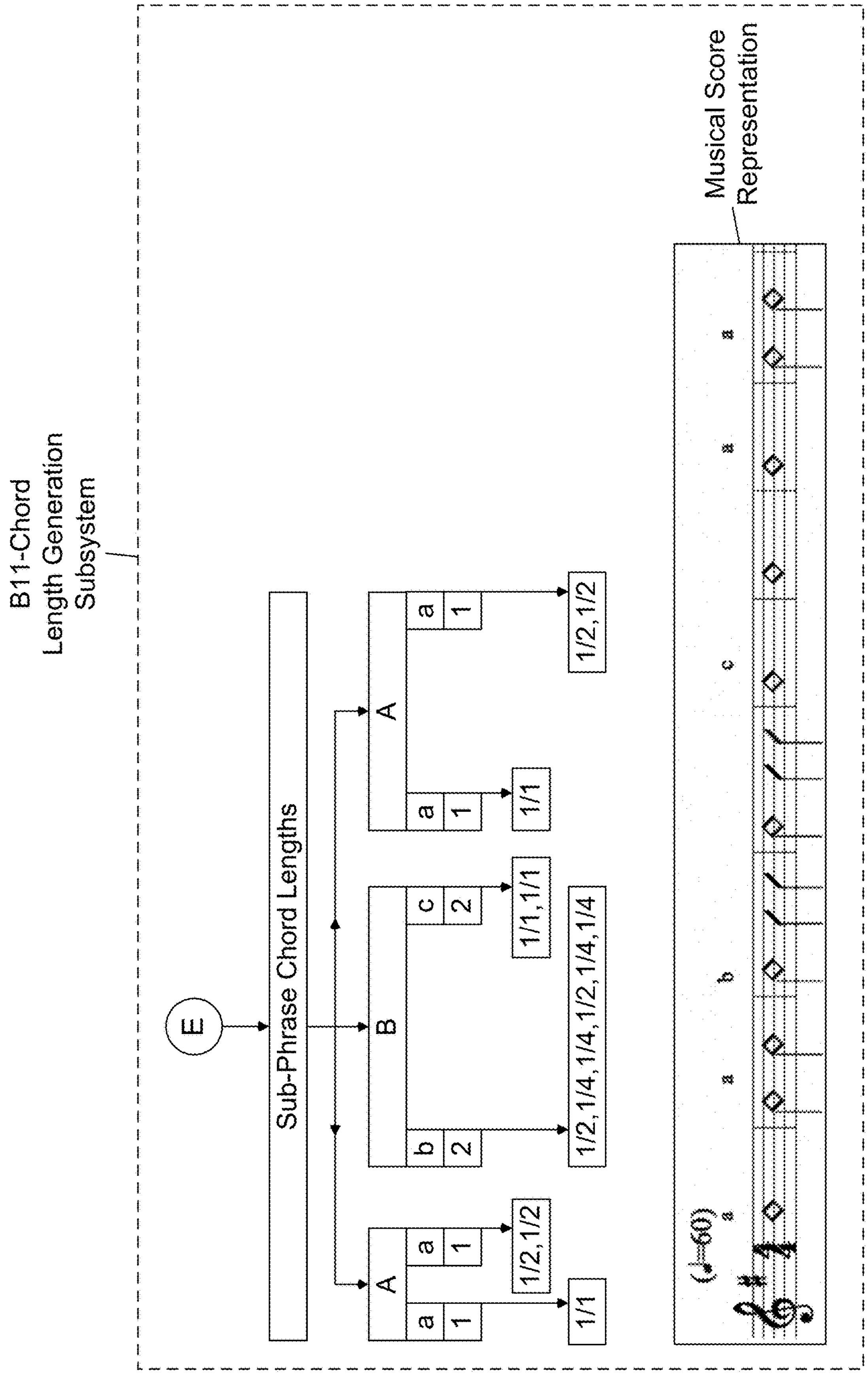
FIG. 27O4

B13-Number of Chords in Phrase Calculator

B10-Unique Phrase Generation Subsystem

Input

B70-Parameter Table Handling and Processing Subsystem

Chord Length Tables Loaded By B51

| | | | Original Chord Root | | | | | | | | | | | |
|---|---|---|---|---|---|---|---|---|---|---|---|---|---|---|
| | | | 0 | 1 | 2 | 3 | 4 | 5 | 6 | 7 | 8 | 9 | 10 | 11 |
| | | | C | C#/Db | D | D#/Eb | E | F | F#/Gb | G | G#/Ab | A | A#/Bb | B |
| New Chord Root | 0 | C | 0.1 | 0.1 | 0.1 | 0.1 | 0.1 | 0.1 | 0.1 | 0.1 | 0.1 | 0.1 | 0.1 | 0.1 |
| | 1 | C#/Db | 0.1 | 0.1 | 0.1 | 0.1 | 0.1 | 0.1 | 0.1 | 0.1 | 0.1 | 0.1 | 0.1 | 0.1 |
| | 2 | D | 0.1 | 0.1 | 0.1 | 0.1 | 0.1 | 0.1 | 0.1 | 0.1 | 0.1 | 0.1 | 0.1 | 0.1 |
| | 3 | D#/Eb | 0.1 | 0.1 | 0.1 | 0.1 | 0.1 | 0.1 | 0.1 | 0.1 | 0.1 | 0.1 | 0.1 | 0.1 |
| | 4 | E | 0.1 | 0.1 | 0.1 | 0.1 | 0.1 | 0.1 | 0.1 | 0.1 | 0.1 | 0.1 | 0.1 | 0.1 |
| | 5 | F | 0.1 | 0.1 | 0.1 | 0.1 | 0.1 | 0.1 | 0.1 | 0.1 | 0.1 | 0.1 | 0.1 | 0.1 |
| | 6 | F#/Gb | 0.1 | 0.1 | 0.1 | 0.1 | 0.1 | 0.1 | 0.1 | 0.1 | 0.1 | 0.1 | 0.1 | 0.1 |
| | 7 | G | 0.1 | 0.1 | 0.1 | 0.1 | 0.1 | 0.1 | 0.1 | 0.1 | 0.1 | 0.1 | 0.1 | 0.1 |
| | 8 | G#/Ab | 0.05 | 0.05 | 0.05 | 0.05 | 0.05 | 0.05 | 0.05 | 0.05 | 0.05 | 0.05 | 0.05 | 0.05 |
| | 9 | A | 0.05 | 0.05 | 0.05 | 0.05 | 0.05 | 0.05 | 0.05 | 0.05 | 0.05 | 0.05 | 0.05 | 0.05 |
| | 10 | A#/Bb | 0.05 | 0.05 | 0.05 | 0.05 | 0.05 | 0.05 | 0.05 | 0.05 | 0.05 | 0.05 | 0.05 | 0.05 |
| | 11 | B | 0.05 | 0.05 | 0.05 | 0.05 | 0.05 | 0.05 | 0.05 | 0.05 | 0.05 | 0.05 | 0.05 | 0.05 |

A

B19-Sub-Phrase Chord Progression Generation Subsystem

Chord Function Root Modifier Table Loaded By B51

| | | Key = G Major | | |
|---|---|---|---|---|
| | | Root Note = 7 | | |
| | | Chord Function | | |
| | | I | i | V/IV |
| 0 | C | 0.1 | 0.1 | 0.1 |
| 1 | C#/Db | -0.1 | -0.1 | -0.1 |
| 2 | D | 0.1 | 0.1 | 0.1 |
| 3 | D#/Eb | -0.1 | -0.1 | -0.1 |
| 4 | E | 0.1 | 0.1 | 0.1 |
| 5 | F | -0.1 | -0.1 | -0.1 |
| 6 | F#/Gb | 0.1 | 0.1 | 0.1 |
| 7 | G | -0.1 | -0.1 | -0.1 |
| 8 | G#/Ab | 0.0 | 0.0 | 0.0 |
| 9 | A | 0.0 | 0.0 | 0.0 |
| 10 | A#/Bb | 0.0 | 0.0 | 0.0 |
| 11 | B | 0.0 | 0.0 | 0.0 |

Current Chord Function Table Values Added To or Subtracted From the Original Root Note Column Values in the Chord Root Table Beat Root Modifier Table Loaded By B51

| | Upcoming Beat In Measure | | | | |
|---|---|---|---|---|---|
| | Beat | 1 | 2 | 3 | 4 |
| 0 | C | 0.1 | 0.1 | 0.1 | 0.1 |
| 1 | C#/Db | -0.1 | -0.1 | -0.1 | -0.1 |
| 2 | D | 0.1 | 0.1 | 0.1 | 0.1 |
| 3 | D#/Eb | -0.1 | -0.1 | -0.1 | -0.1 |
| 4 | E | 0.1 | 0.1 | 0.1 | 0.1 |
| 5 | F | -0.1 | -0.1 | -0.1 | -0.1 |
| 6 | F#/Gb | 0.1 | 0.1 | 0.1 | 0.1 |
| 7 | G | -0.1 | -0.1 | -0.1 | -0.1 |
| 8 | G#/Ab | 0.0 | 0.0 | 0.0 | 0.0 |
| 9 | A | 0.0 | 0.0 | 0.0 | 0.0 |
| 10 | A#/Bb | 0.0 | 0.0 | 0.0 | 0.0 |
| 11 | B | 0.0 | 0.0 | 0.0 | 0.0 |

Beat Analyzer

Beat Root Modifier Selected

B

B19-Sub-Phrase Chord Progression Generation Subsystem

Upcoming Beat in Measure = 2

Beat Root Modifier Table Values Added To or Subtracted From the Original Root Note Column Values in the Chord Root Table Random Number Generator Next Chord Root Is Selected Beginning with Chord Function Root Modifier Table, Process Repeats Until All Chords Have Been Selected

| | |
|---|---|
| G Major Triad | |
| C Major Triad | |
| D Major Triad | |
| G Major Triad | |
| A Minor Triad | |
| D Major Triad | |
| E Minor Triad | |
| C Major Triad | |
| A Minor Triad | |
| D Major Triad | |
| D Major Triad | |
| G Major Triad | |
| C Major Triad | |
| D Major Triad | |

Musical Score Representation

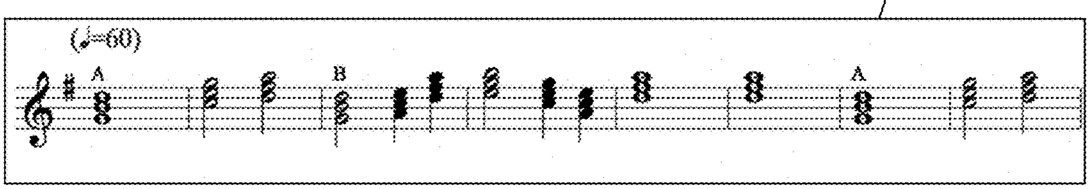

B19-Sub-Phrase Chord Progression Generation Subsystem

FIG. 27V3

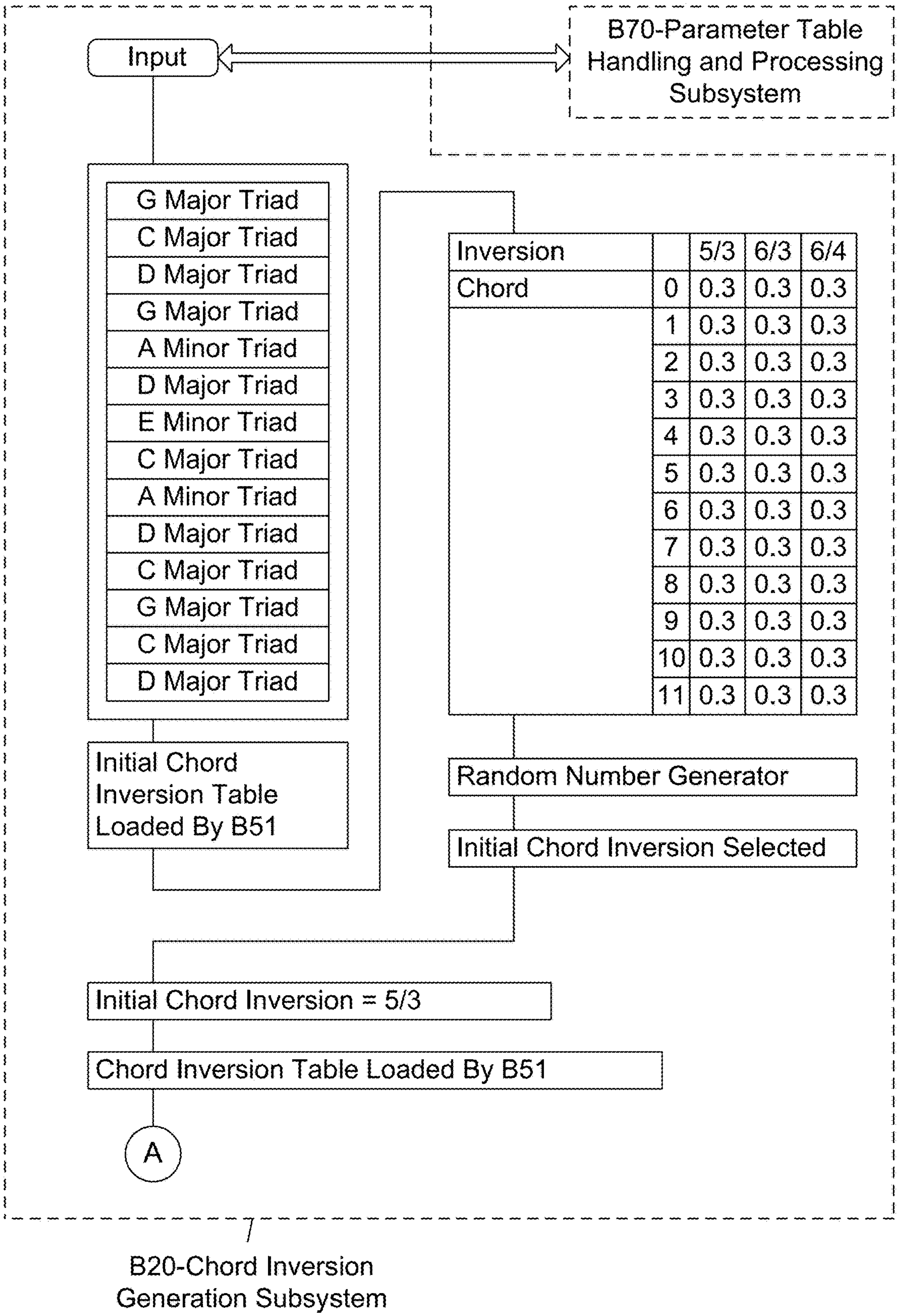
FIG. 27X1

A

| | Original Chord Root | | | |
|---|---|---|---|---|
| | 0 | | | |
| | Inversion | | | |
| Next Chord Root | | 5/3 | 6/3 | 6/4 |
| | 5/3 | 0.3 | 0.3 | 0.3 |
| 0 | 6/3 | 0.4 | 0.4 | 0.4 |
| Inversion | 6/4 | 0.3 | 0.3 | 0.3 |

| | Original Chord Root | | | |
|---|---|---|---|---|
| | 1 | | | |
| | Inversion | | | |
| Next Chord Root | | 5/3 | 6/3 | 6/4 |
| | 5/3 | 0.3 | 0.3 | 0.3 |
| 0 | 6/3 | 0.4 | 0.4 | 0.4 |
| Inversion | 6/4 | 0.3 | 0.3 | 0.3 |

...(11)

| | Original Chord Root | | | |
|---|---|---|---|---|
| | 0 | | | |
| | Inversion | | | |
| Next Chord Root | | 5/3 | 6/3 | 6/4 |
| | 5/3 | 0.3 | 0.3 | 0.3 |
| 1 | 6/3 | 0.4 | 0.4 | 0.4 |
| Inversion | 6/4 | 0.3 | 0.3 | 0.3 |

| | Original Chord Root | | | |
|---|---|---|---|---|
| | 0 | | | |
| | Inversion | | | |
| Next Chord Root | | 5/3 | 6/3 | 6/4 |
| | 5/3 | 0.3 | 0.3 | 0.3 |
| 0 | 6/3 | 0.4 | 0.4 | 0.4 |
| Inversion | 6/4 | 0.3 | 0.3 | 0.3 |

⋮
(11)

B

B20-Chord Inversion Generation Subsystem

Random Number Generator

Chord Inversion Selected

Chord Inversion Selection Repeats Until All Chord Inversions Have Been Selected

| | Inversion |
|---|---|
| G Major Triad | 5/3 |
| C Major Triad | 6/4 |
| D Major Triad | 6/4 |
| G Major Triad | 6/3 |
| A Minor Triad | 6/3 |
| D Major Triad | 5/3 |
| E Minor Triad | 5/3 |
| C Major Triad | 5/3 |
| A Minor Triad | 6/3 |
| D Major Triad | 5/3 |
| C Major Triad | 5/3 |
| G Major Triad | 5/3 |
| C Major Triad | 6/4 |
| D Major Triad | 6/4 |

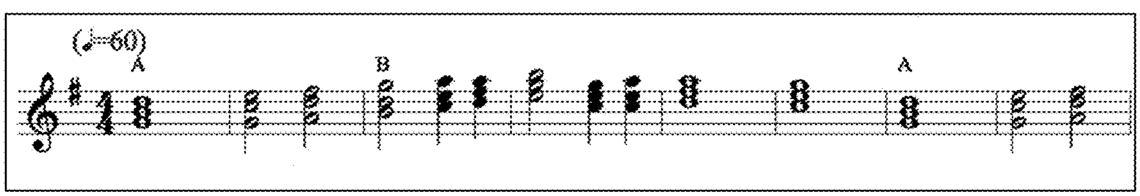

B20-Chord Inversion Generation Subsystem

FIG. 27X3

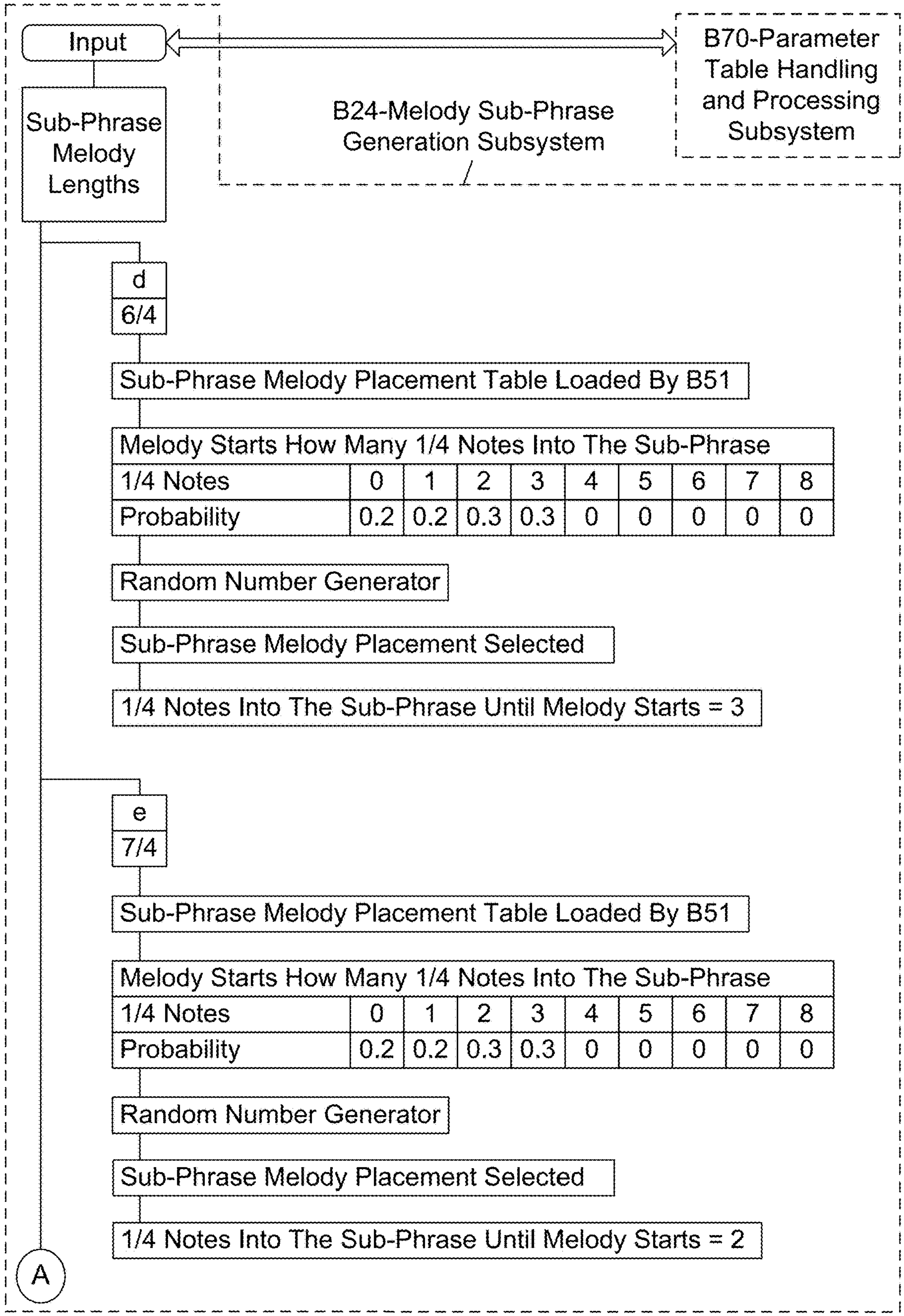
FIG. 27Z1

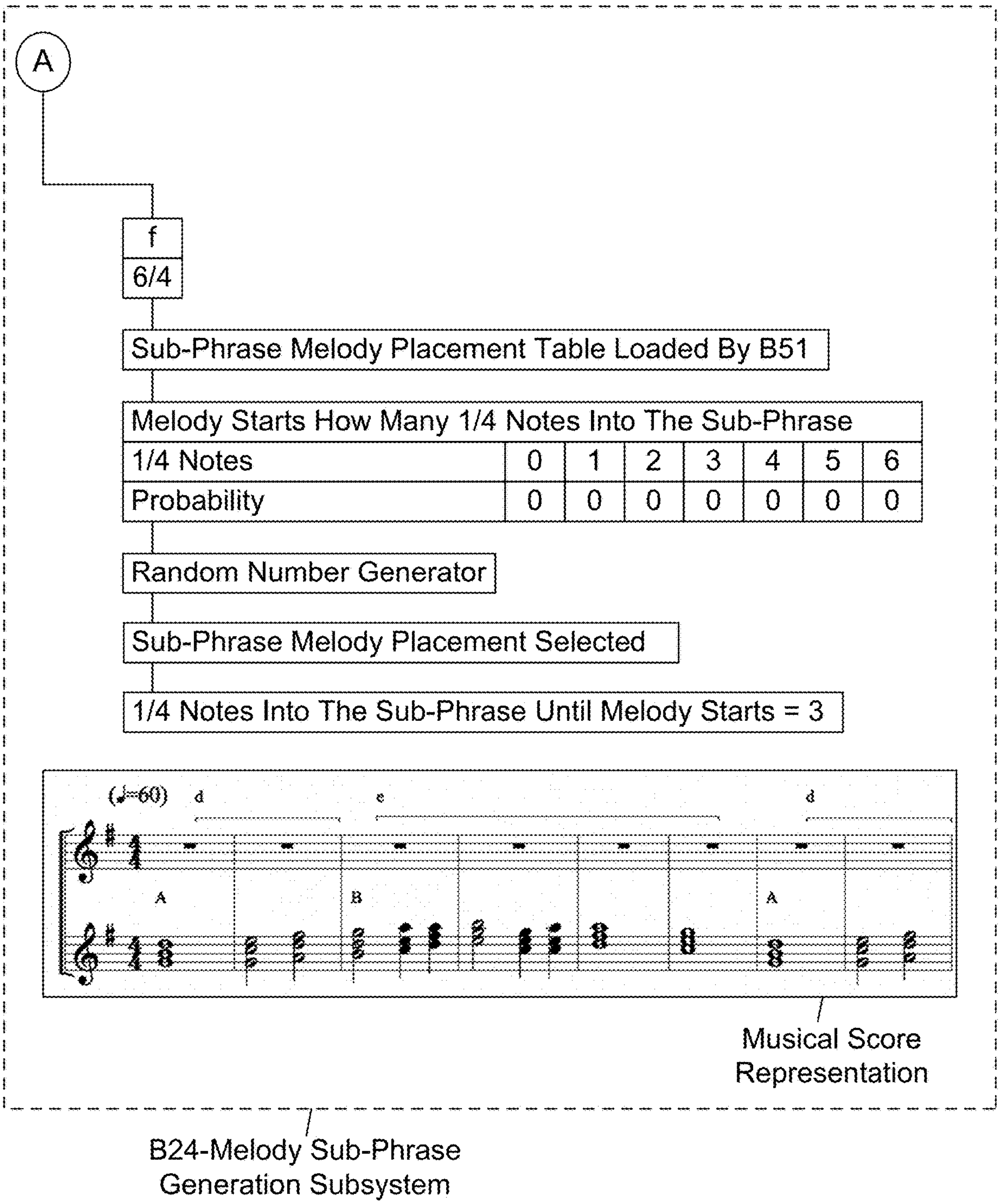
FIG. 27Z2

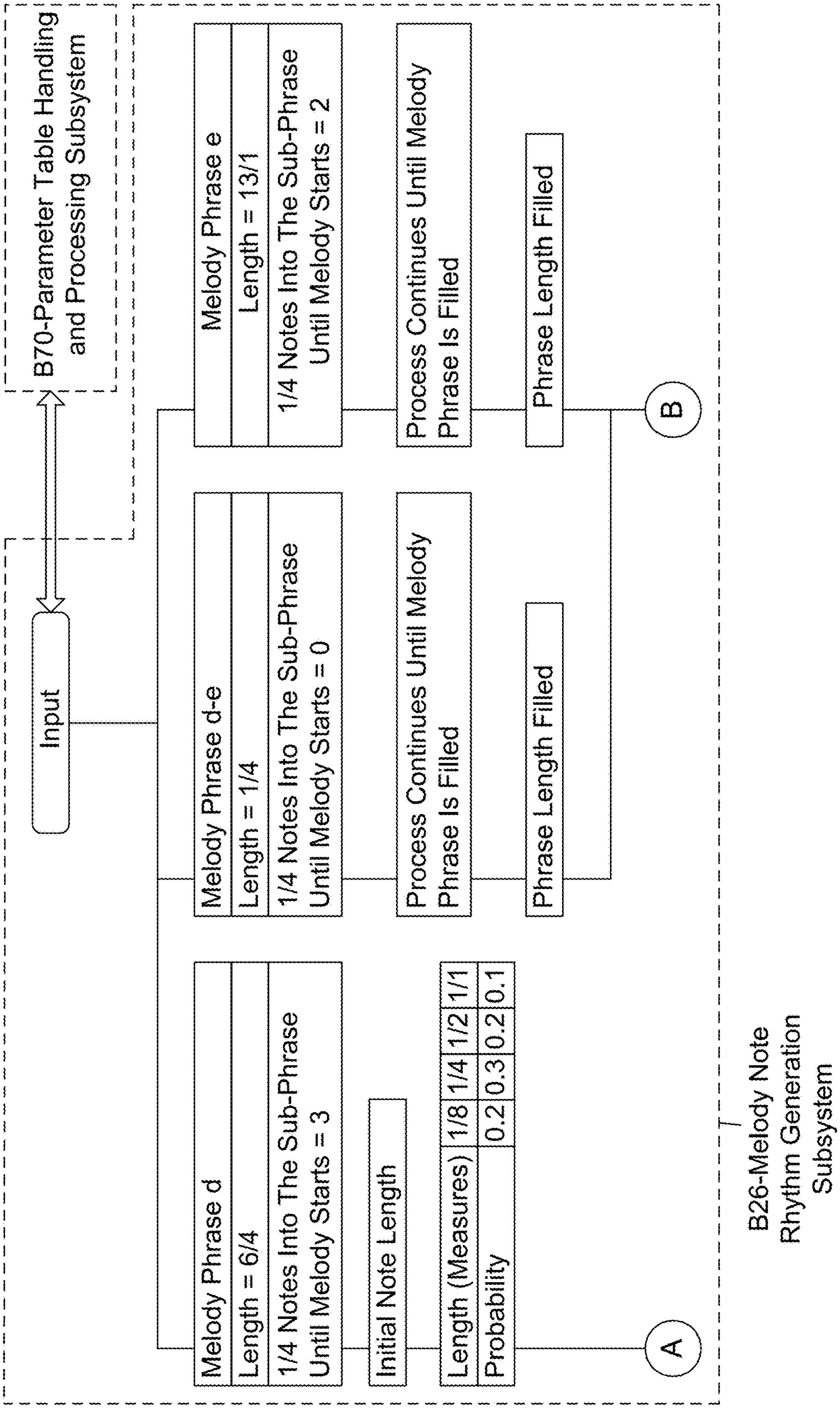
FIG. 27DD1

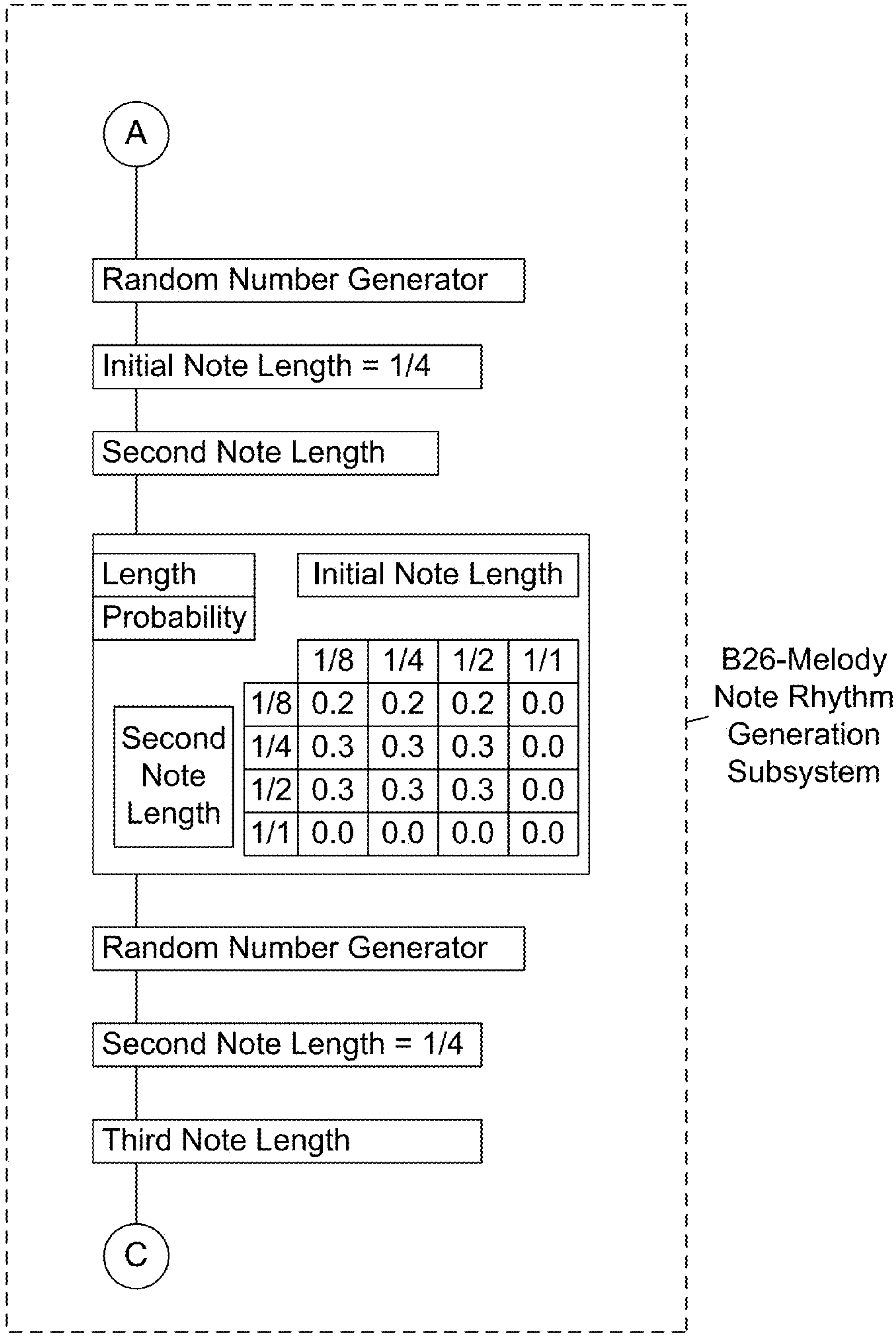
FIG. 27DD2

B26-Melody Note Rhythm Generation Subsystem
(C)
Length Probability
| Third Note Length | Initial and Second Note Lengths: 1/8, 1/8 | 1/8, 1/4 | 1/8, 1/2 | 1/8, 1/1 | 1/4, 1/8 | 1/4, 1/4 | 1/4, 1/2 | 1/4, 1/1 | 1/2, 1/8 | 1/2, 1/4 | 1/2, 1/2 | 1/2, 1/1 | 1/1, 1/8 | 1/1, 1/4 | 1/1, 1/2 | 1/1, 1/1 |
|---|---|---|---|---|---|---|---|---|---|---|---|---|---|---|---|---|
| 1/8 | 0.2 | 0.2 | 0.2 | 0.0 | 0.2 | 0.2 | 0.2 | 0.0 | 0.2 | 0.2 | 0.2 | 0.0 | 0.0 | 0.0 | 0.0 | 0.0 |
| 1/4 | 0.3 | 0.3 | 0.3 | 0.0 | 0.3 | 0.3 | 0.3 | 0.0 | 0.3 | 0.3 | 0.3 | 0.0 | 0.0 | 0.0 | 0.0 | 0.0 |
| 1/2 | 0.3 | 0.3 | 0.0 | 0.0 | 0.3 | 0.3 | 0.0 | 0.0 | 0.0 | 0.0 | 0.0 | 0.0 | 0.0 | 0.0 | 0.0 | 0.0 |
| 1/1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |
Random Number Generator → Sub-Phrase Length Filled → Third Note Length = 1/4
Process Continues Until Melody Phrase Is Filled
Phrase Length Filled
(B)
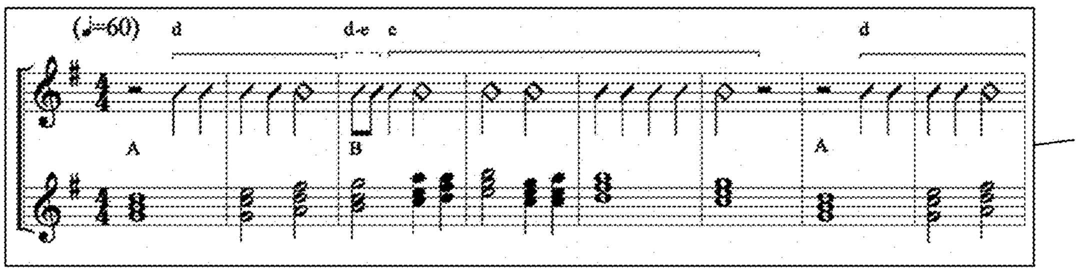
Musical Score Representation
FIG. 27DD3

| Note | 0 | 1 | 2 | 3 | 4 | 5 | 6 | 7 | 8 | 9 | 10 | 11 |
|---|---|---|---|---|---|---|---|---|---|---|---|---|
| Note Letter | C | C#/Db | D | D#/Eb | E | F | F#/Gb | G | G#/Ab | A | A#/Bb | B |
| Probability | 0.1 | 0.1 | 0.1 | 0.1 | 0.1 | 0.1 | 0.1 | 0.1 | 0.1 | 0.1 | 0 | 0 |

Input

B29-Sub-Phrase Pitch Generation Subsystem

B70-Parameter Table Handling and Processing Subsystem

Melody Note Table Loaded By B51

| | | | Original Note | | | | | | | | | | | |
|---|---|---|---|---|---|---|---|---|---|---|---|---|---|---|
| | | | 0 | 1 | 2 | 3 | 4 | 5 | 6 | 7 | 8 | 9 | 10 | 11 |
| | | | C | C#/Db | D | D#/Eb | E | F | F#/Gb | G | G#/Ab | A | A#/Bb | B |
| New Note | 0 | C | 0.1 | 0.1 | 0.1 | 0.1 | 0.1 | 0.1 | 0.1 | 0.1 | 0.1 | 0.1 | 0.1 | 0.1 |
| | 1 | C#/Db | 0.1 | 0.1 | 0.1 | 0.1 | 0.1 | 0.1 | 0.1 | 0.1 | 0.1 | 0.1 | 0.1 | 0.1 |
| | 2 | D | 0.1 | 0.1 | 0.1 | 0.1 | 0.1 | 0.1 | 0.1 | 0.1 | 0.1 | 0.1 | 0.1 | 0.1 |
| | 3 | D#/Eb | 0.1 | 0.1 | 0.1 | 0.1 | 0.1 | 0.1 | 0.1 | 0.1 | 0.1 | 0.1 | 0.1 | 0.1 |
| | 4 | E | 0.1 | 0.1 | 0.1 | 0.1 | 0.1 | 0.1 | 0.1 | 0.1 | 0.1 | 0.1 | 0.1 | 0.1 |
| | 5 | F | 0.1 | 0.1 | 0.1 | 0.1 | 0.1 | 0.1 | 0.1 | 0.1 | 0.1 | 0.1 | 0.1 | 0.1 |
| | 6 | F#/Gb | 0.1 | 0.1 | 0.1 | 0.1 | 0.1 | 0.1 | 0.1 | 0.1 | 0.1 | 0.1 | 0.1 | 0.1 |
| | 7 | G | 0.1 | 0.1 | 0.1 | 0.1 | 0.1 | 0.1 | 0.1 | 0.1 | 0.1 | 0.1 | 0.1 | 0.1 |
| | 8 | G#/Ab | 0.05 | 0.05 | 0.05 | 0.05 | 0.05 | 0.05 | 0.05 | 0.05 | 0.05 | 0.05 | 0.05 | 0.05 |
| | 9 | A | 0.05 | 0.05 | 0.05 | 0.05 | 0.05 | 0.05 | 0.05 | 0.05 | 0.05 | 0.05 | 0.05 | 0.05 |
| | 10 | A#/Bb | 0.05 | 0.05 | 0.05 | 0.05 | 0.05 | 0.05 | 0.05 | 0.05 | 0.05 | 0.05 | 0.05 | 0.05 |
| | 11 | B | 0.05 | 0.05 | 0.05 | 0.05 | 0.05 | 0.05 | 0.05 | 0.05 | 0.05 | 0.05 | 0.05 | 0.05 |

Chord Modifier Table Loaded By B51

B29-Sub-Phrase Pitch Generation Subsystem (A)

| | Probability Change | 1 | 2 | 3 | 4 | 5 | 6 | 7 | 8 | 9 | 10 | 11 | 12 |
|---|---|---|---|---|---|---|---|---|---|---|---|---|---|
| Maj | 0.1 | 1 | 2 | 3 | 4 | 5 | 6 | 7 | 8 | 9 | 10 | 11 | 12 |
| | 0.1 | 5 | 6 | 7 | 8 | 9 | 10 | 11 | 12 | 1 | 2 | 3 | 4 |
| | 0.1 | 8 | 9 | 10 | 11 | 12 | 1 | 2 | 3 | 4 | 5 | 6 | 7 |
| Min | 0.1 | 1 | 2 | 3 | 4 | 5 | 6 | 7 | 8 | 9 | 10 | 11 | 12 |
| | 0.1 | 4 | 5 | 6 | 7 | 8 | 9 | 10 | 11 | 12 | 1 | 2 | 3 |
| | 0.1 | 8 | 9 | 10 | 11 | 12 | 1 | 2 | 3 | 4 | 5 | 6 | 7 |
| Aug | 0.1 | 1 | 2 | 3 | 4 | 5 | 6 | 7 | 8 | 9 | 10 | 11 | 12 |
| | 0.1 | 5 | 6 | 7 | 8 | 9 | 10 | 11 | 12 | 1 | 2 | 3 | 4 |
| | 0.1 | 9 | 10 | 11 | 12 | 1 | 2 | 3 | 4 | 5 | 6 | 7 | 8 |
| Dim | 0.1 | 1 | 2 | 3 | 4 | 5 | 6 | 7 | 8 | 9 | 10 | 11 | 12 |
| | 0.1 | 4 | 5 | 6 | 7 | 8 | 9 | 10 | 11 | 12 | 1 | 2 | 3 |
| | 0.1 | 7 | 8 | 9 | 10 | 11 | 12 | 1 | 2 | 3 | 4 | 5 | 6 |

| Leap Reversal Modifier Table Loaded By B51 | | | | | | | | | | | | |
|---|---|---|---|---|---|---|---|---|---|---|---|---|
| Previous Leap Distance | 1 | 2 | 3 | 4 | 5 | 6 | 7 | 8 | 9 | 10 | 11 | 12 |
| Originating Leap Side Modification | 0.0 | 0.0 | 0.0 | 0.1 | 0.1 | 0.1 | 0.1 | 0.1 | 0.1 | 0.1 | 0.1 | 0.1 |

Leap Incentive Modifier Table Loaded By B51

B
| Rhythmic Distance | 0.5 | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 | 9.5 | 10.0 |
|---|---|---|---|---|---|---|---|---|---|---|---|---|---|---|---|---|---|---|---|---|
| Minimum Leap Required | 0 | 0 | 0 | 1 | 1 | 1 | 1 | 1 | 4 | 4 | 4 | 6 | 6 | 6 | 8 | 8 | 8 | 8 | 8 | 8 |
| Else, Modify Leaps Greater Than Minimum | 0 | 0 | 0 | 0 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
Random Number Generator
Melodic Note Selected
| | | | Original Notes | | |
|---|---|---|---|---|---|
| | | | 0,0 | 0,1 | ... |
| | | | C,C | C,C#/Db | ... |
| New Note | 0 | C | 0.1 | 0.1 | ... |
| | 1 | C#/Db | 0.1 | 0.1 | ... |
| | ⋮ | ⋮ | | | |
Process Repeats Until All Sub-Phrase Melodic Notes Have Been Selected
Musical Score Representation
B29-Sub-Phrase Pitch Generation Subsystem
FIG. 27FF3

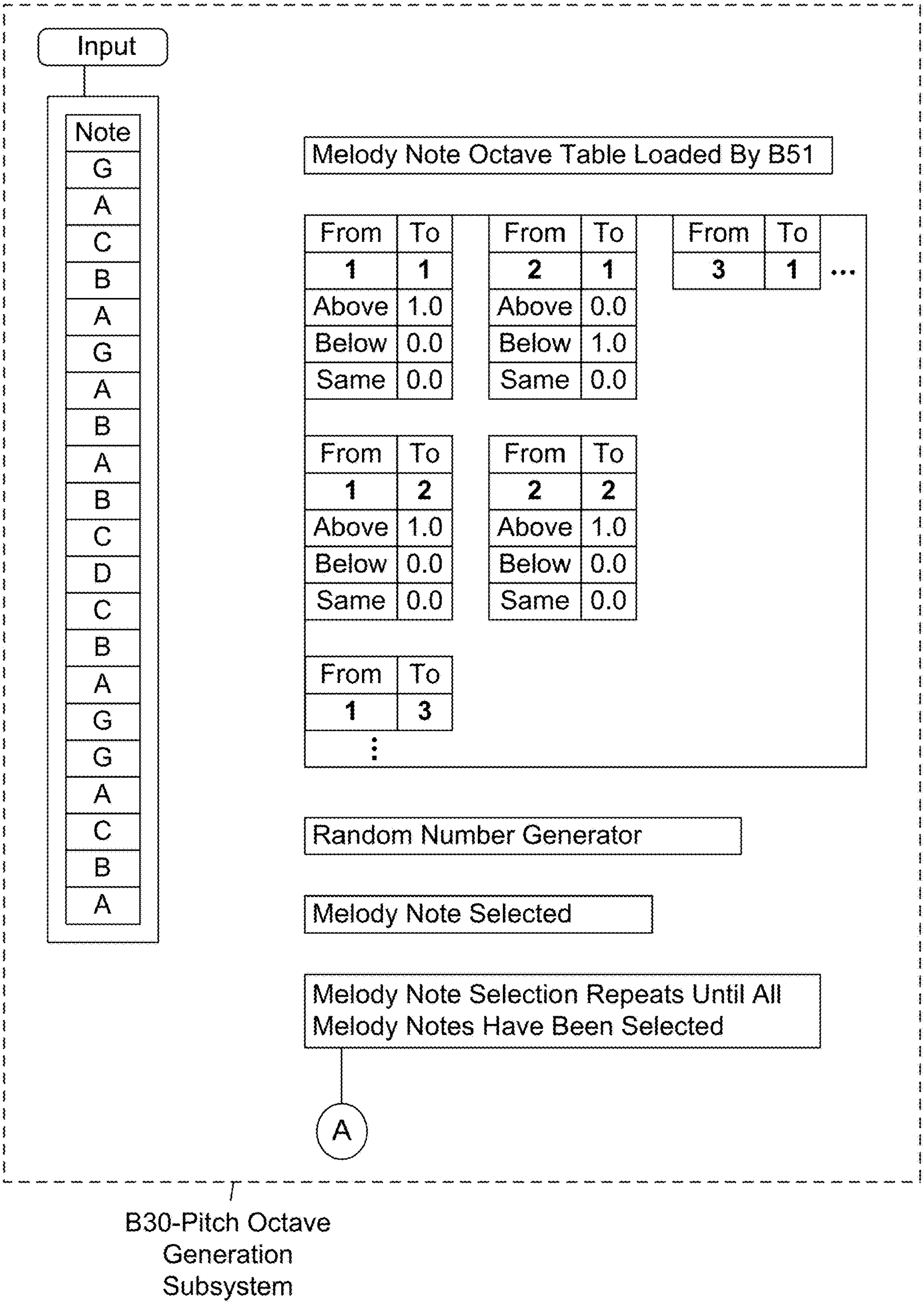
FIG. 27HH1

A
| Note | Octave |
|---|---|
| G | 5 |
| A | 5 |
| C | 5 |
| B | 4 |
| A | 4 |
| G | 4 |
| A | 4 |
| B | 4 |
| A | 4 |
| B | 4 |
| C | 5 |
| D | 5 |
| C | 5 |
| B | 4 |
| A | 4 |
| G | 5 |
| G | 4 |
| A | 4 |
| C | 5 |
| B | 4 |
| A | 4 |
Musical Score Representation
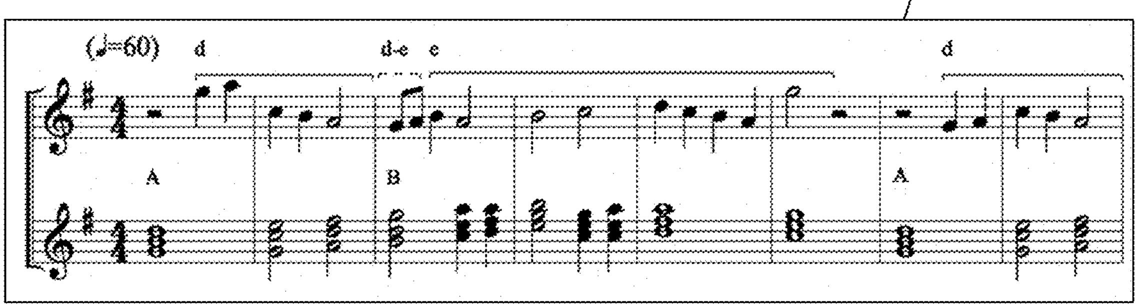
B30-Pitch Octave Generation Subsystem
FIG. 27HH2

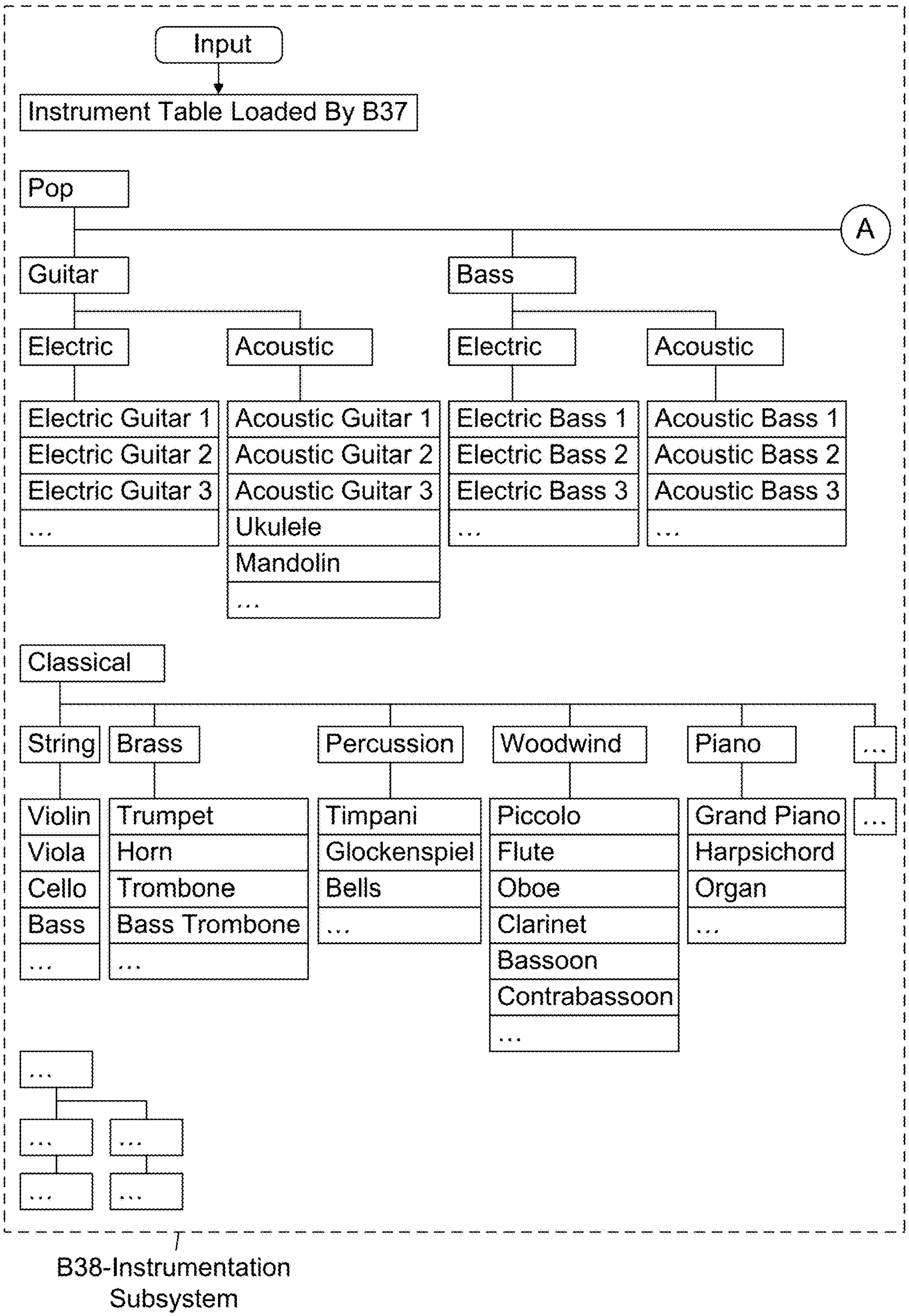
FIG. 27II1

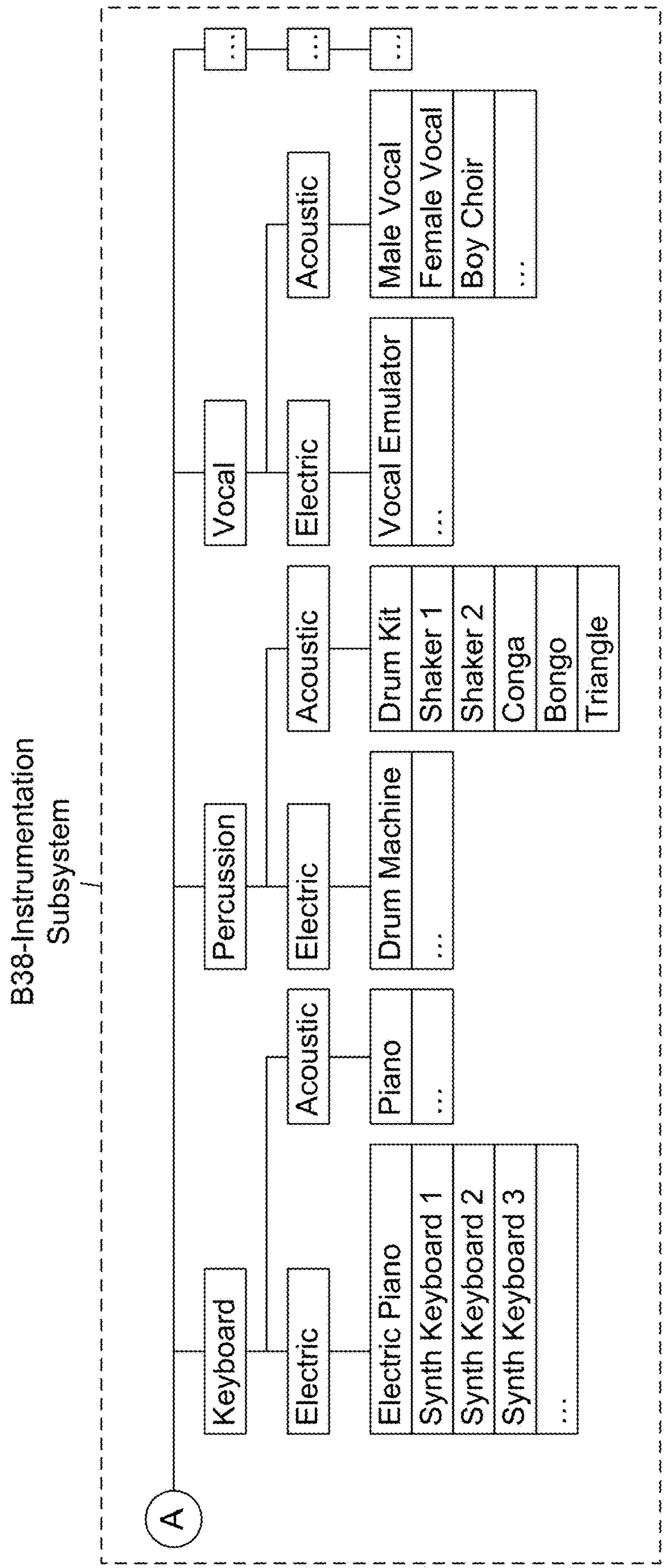
FIG. 27II2

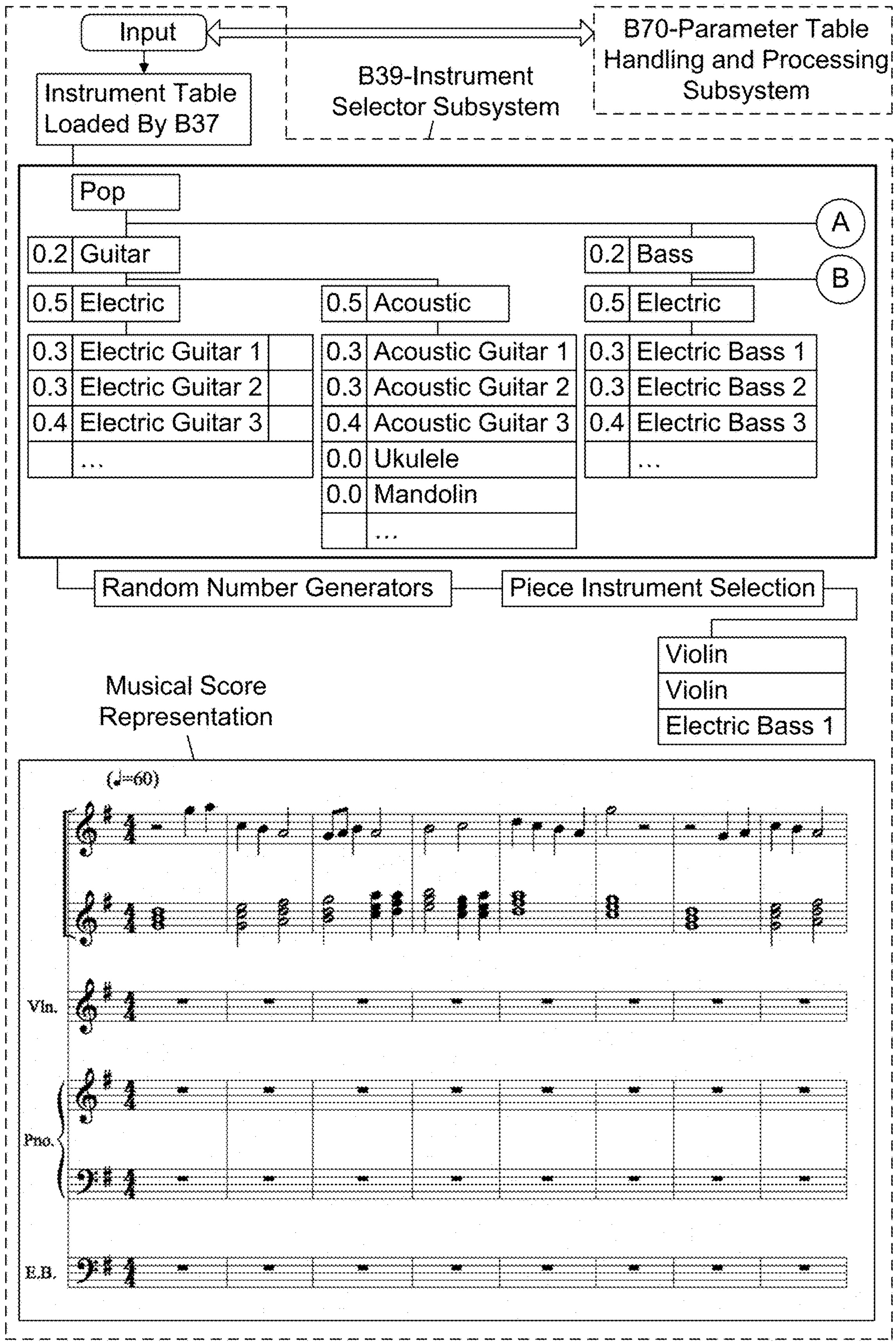
FIG. 27JJ1

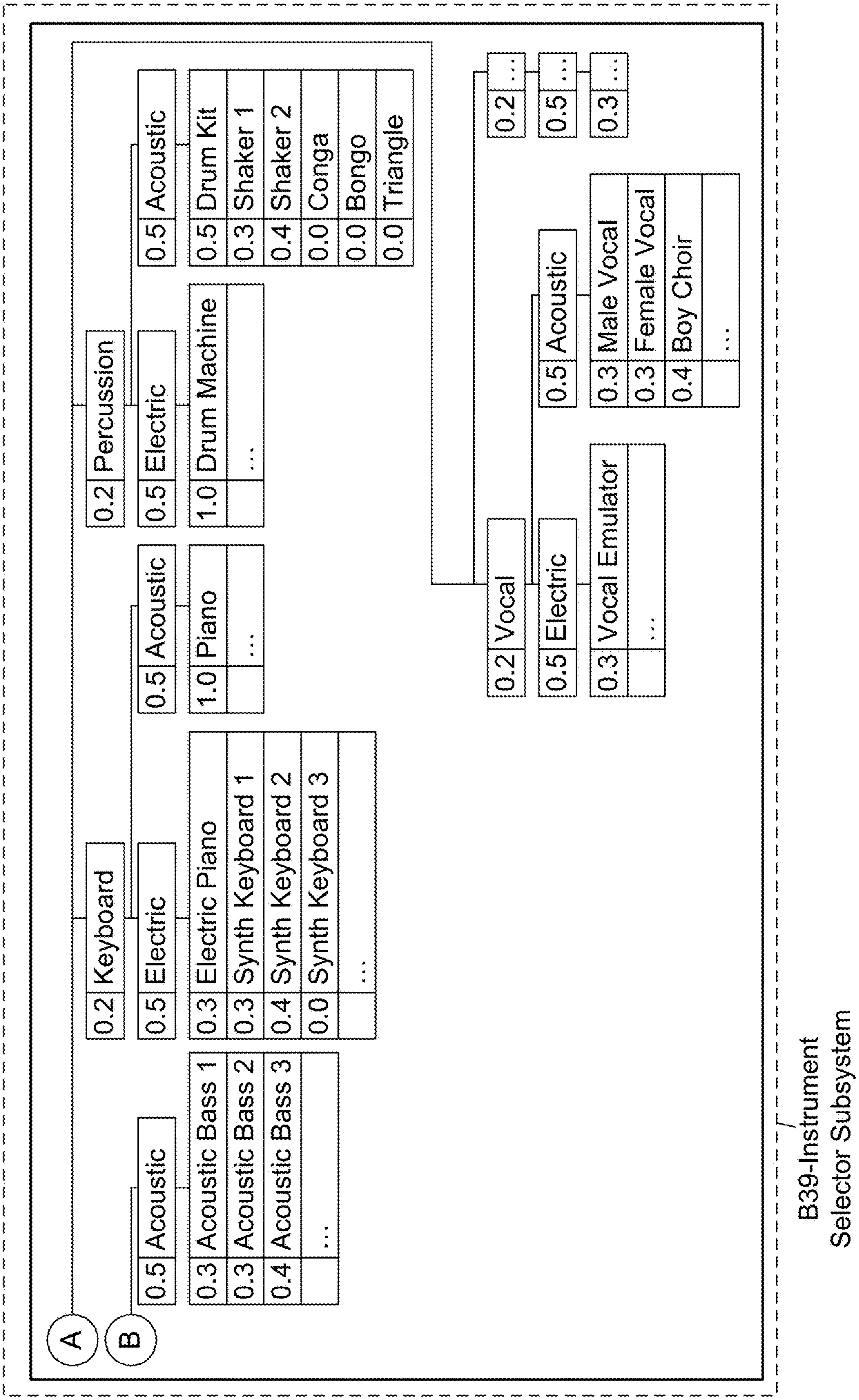
B39-Instrument Selector Subsystem
FIG. 27JJ2

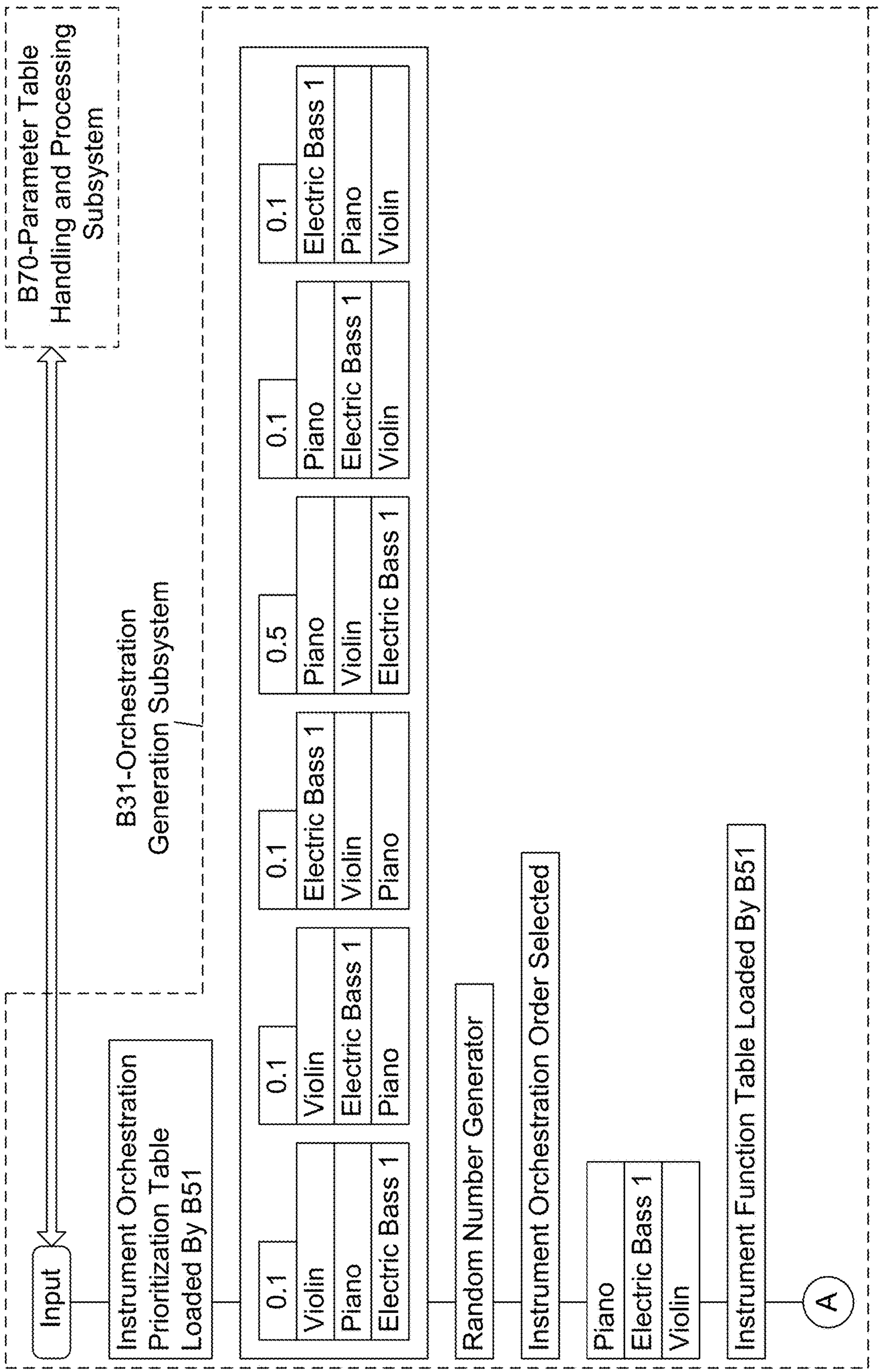
FIG. 27KK1

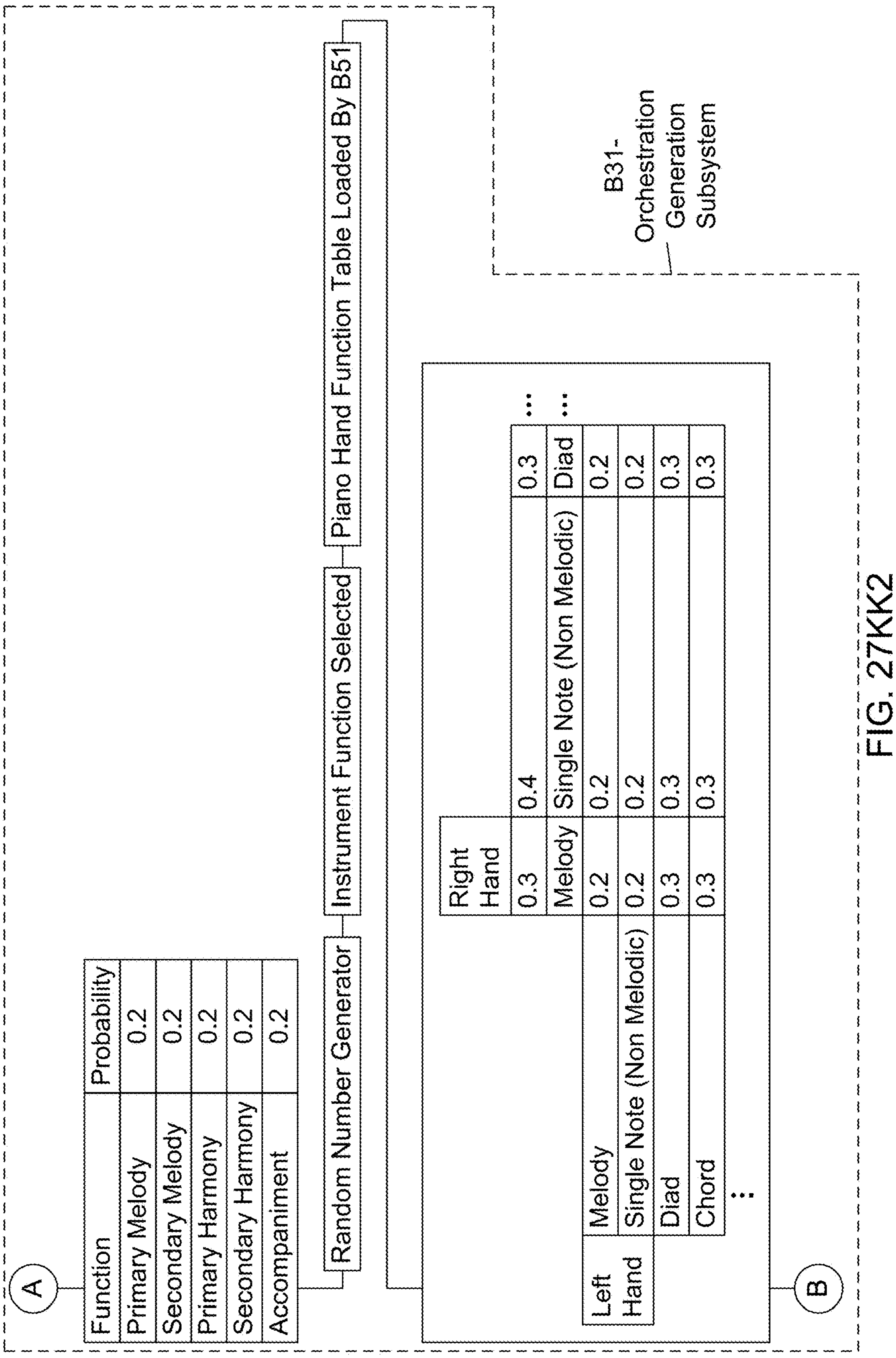
FIG. 27KK2

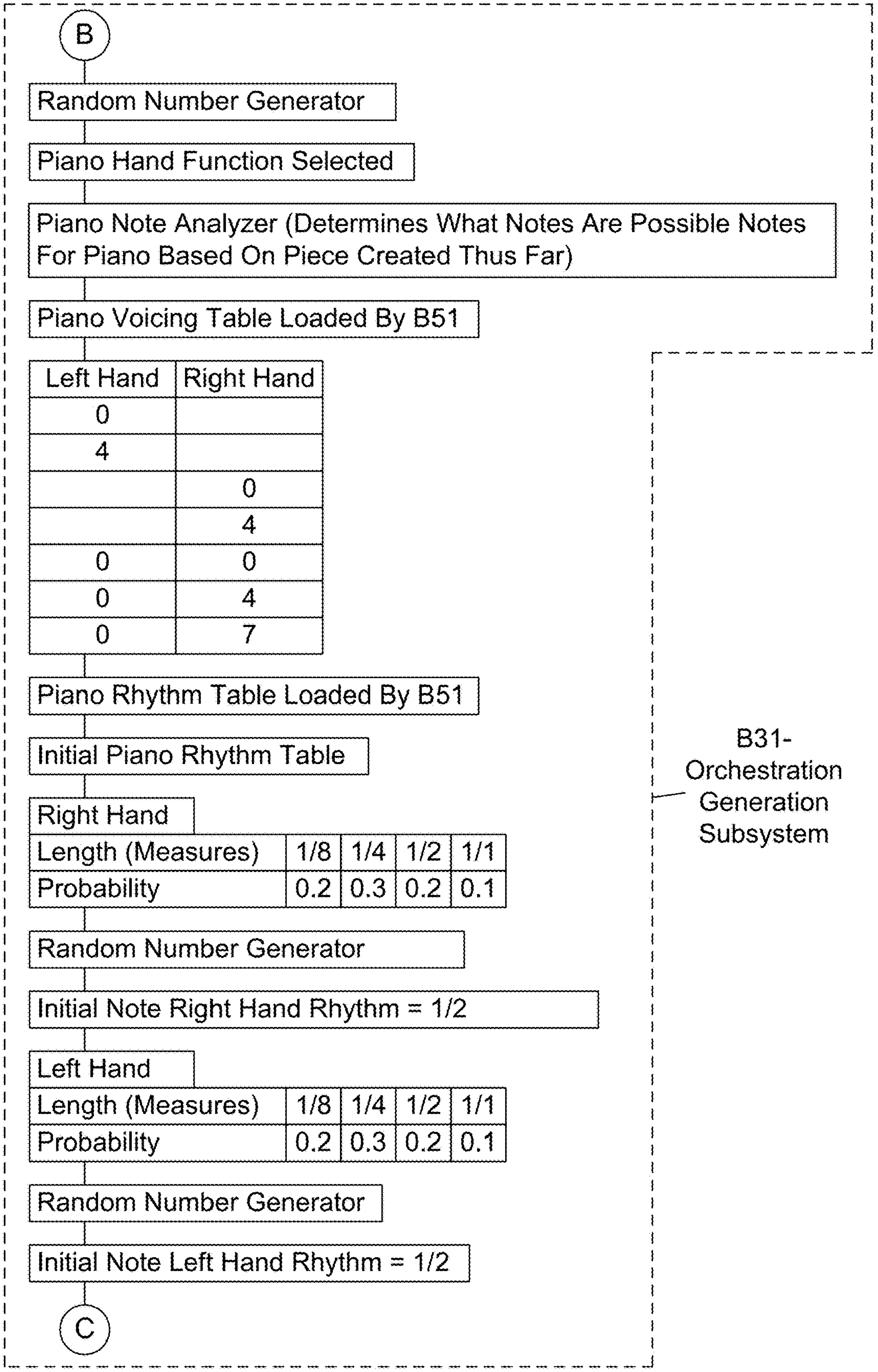
FIG. 27KK3

C

Second Note Right Hand Table

Length Probability — Initial Note Length

| Second Note Length | 1/8 | 1/4 | 1/2 | 1/1 |
|---|---|---|---|---|
| 1/8 | 0.2 | 0.2 | 0.2 | 0.0 |
| 1/4 | 0.3 | 0.3 | 0.3 | 0.0 |
| 1/2 | 0.3 | 0.3 | 0.3 | 0.0 |
| 1/1 | 0.0 | 0.0 | 0.0 | 0.0 |

Random Number Generator

Second Note Right Hand Rhythm = 1/8

Second Note Left Hand Table

Length Probability — Initial Note Length

| Second Note Length | 1/8 | 1/4 | 1/2 | 1/1 |
|---|---|---|---|---|
| 1/8 | 0.2 | 0.2 | 0.2 | 0.0 |
| 1/4 | 0.3 | 0.3 | 0.3 | 0.0 |
| 1/2 | 0.3 | 0.3 | 0.3 | 0.0 |
| 1/1 | 0.0 | 0.0 | 0.0 | 0.0 |

Random Number Generator

Second Note Left Hand Rhythm = 1/2

Third Note Right Hand Length

D

B31- Orchestration Generation Subsystem

FIG. 27KK4

B31- Orchestration Generation Subsystem

D

Length Probability

Initial and Second Note Lengths

| Third Note Length | 1/8, 1/8 | 1/8, 1/4 | 1/8, 1/2 | 1/8, 1/1 | 1/4, 1/8 | 1/4, 1/4 | 1/4, 1/2 | 1/4, 1/1 | 1/2, 1/8 | 1/2, 1/4 | 1/2, 1/2 | 1/2, 1/1 | 1/1, 1/8 | 1/1, 1/4 | 1/1, 1/2 | 1/1, 1/1 |
|---|---|---|---|---|---|---|---|---|---|---|---|---|---|---|---|---|
| 1/8 | 0.2 | 0.2 | 0.2 | 0.0 | 0.2 | 0.2 | 0.2 | 0.0 | 0.2 | 0.2 | 0.2 | 0.0 | 0.0 | 0.0 | 0.0 | 0.0 |
| 1/4 | 0.3 | 0.3 | 0.3 | 0.0 | 0.3 | 0.3 | 0.3 | 0.0 | 0.3 | 0.3 | 0.3 | 0.0 | 0.0 | 0.0 | 0.0 | 0.0 |
| 1/2 | 0.3 | 0.3 | 0.0 | 0.0 | 0.3 | 0.3 | 0.0 | 0.0 | 0.0 | 0.0 | 0.0 | 0.0 | 0.0 | 0.0 | 0.0 | 0.0 |
| 1/1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

Random Number Generator

Third Note Right Hand Length = 1/8

...

Process Continues Until Piano Orchestration Is Filled

FIG. 27KK5

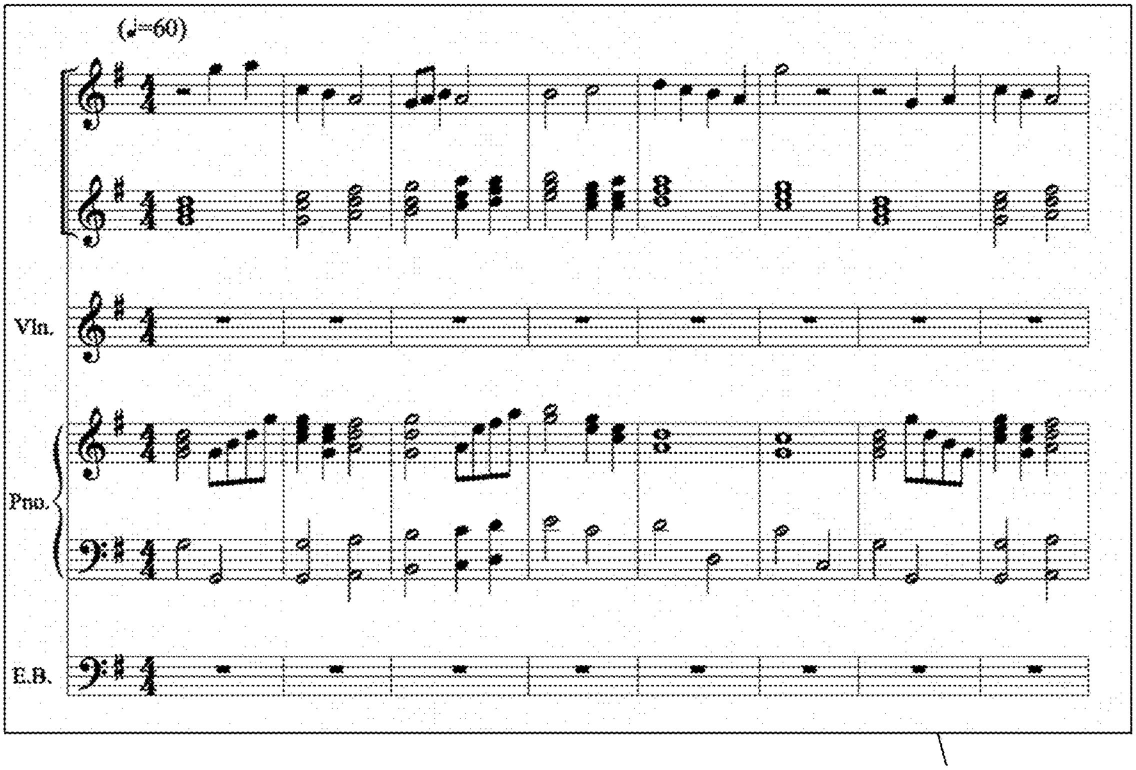
Musical Score Representation
Piano Dynamics Table Loaded By B51
| Dynamic | Probability |
|---|---|
| piano | 0.1 |
| mezzo piano | 0.3 |
| mezzo forte | 0.3 |
| forte | 0.3 |
Random Number Generator
Piano Dynamic For Beat 1 Selected
Piano Dynamic For Beat 1 = piano
Process Repeats Until Piano Dynamics Have Been Selected For All Piano Notes
B31-Orchestration Generation Subsystem
FIG. 27KK6

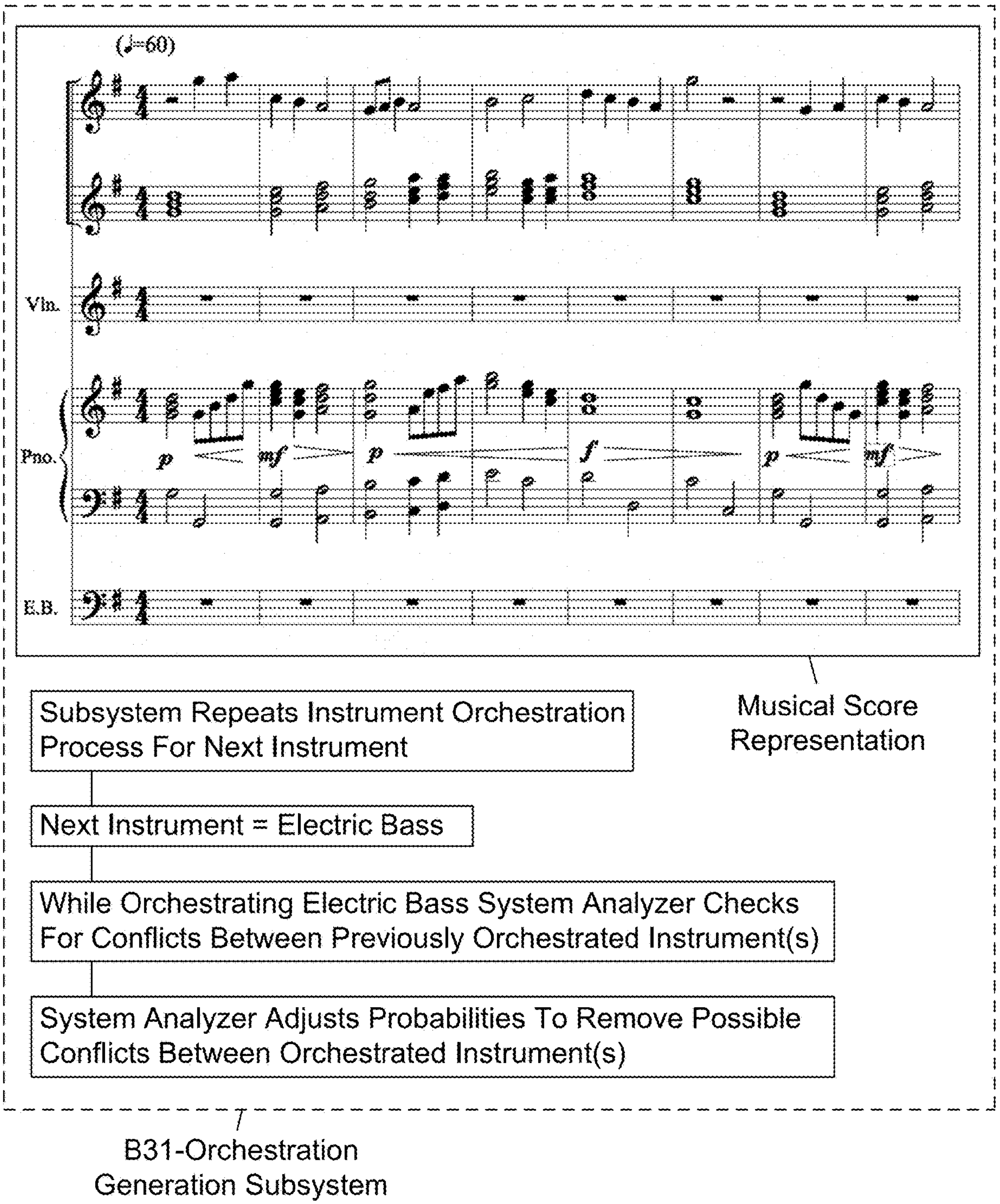
FIG. 27KK7

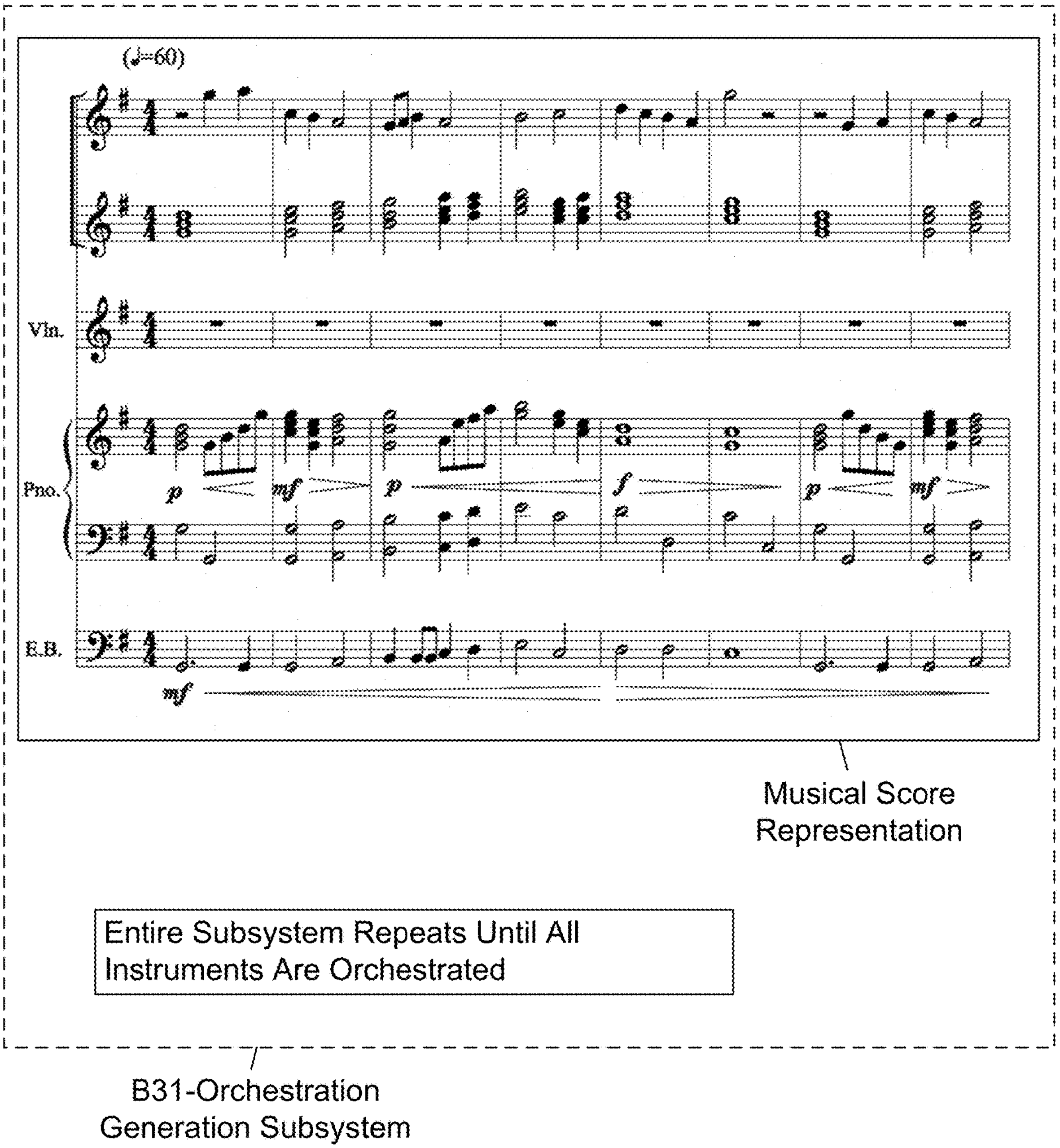
FIG. 27KK8

Musical Score Representation
Entire Orchestration Is Analyzed By Master Orchestration Analyzer To Modify And Improve Orchestration
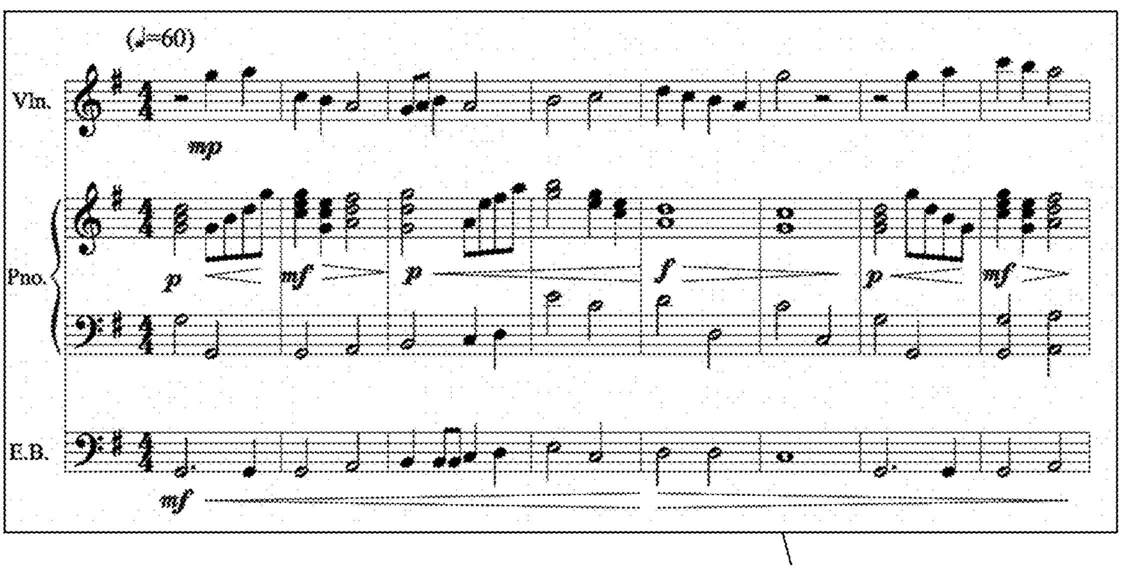
Musical Score Representation
B31-Orchestration Generation Subsystem
FIG. 27KK9

FIG. 27OO
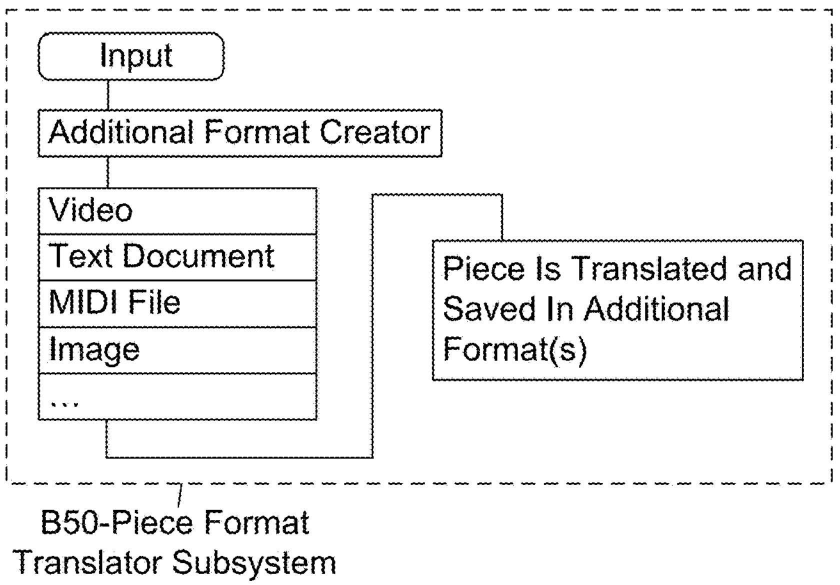
FIG. 27OO1
FIG. 27PP

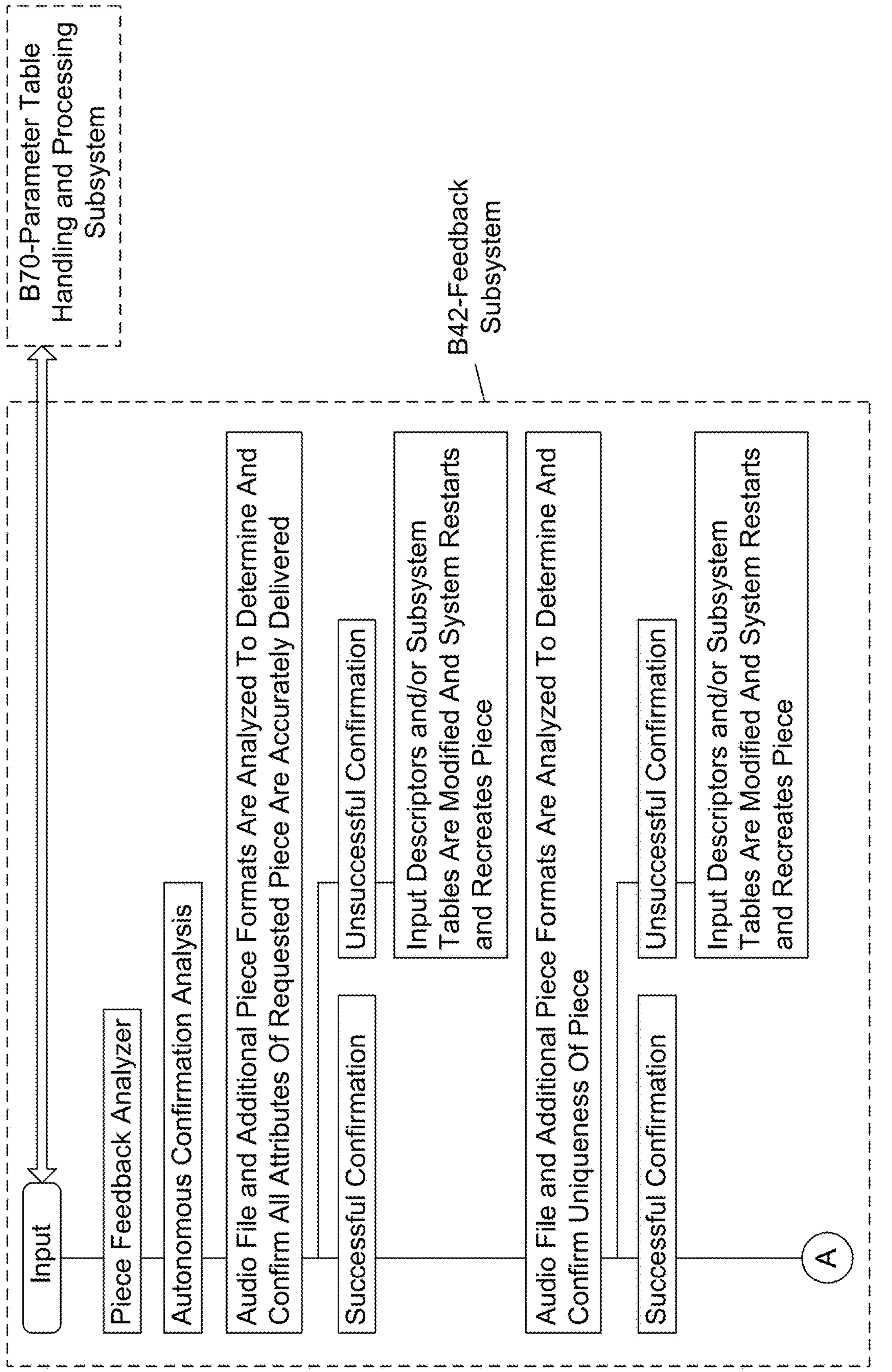
FIG. 27QQ1

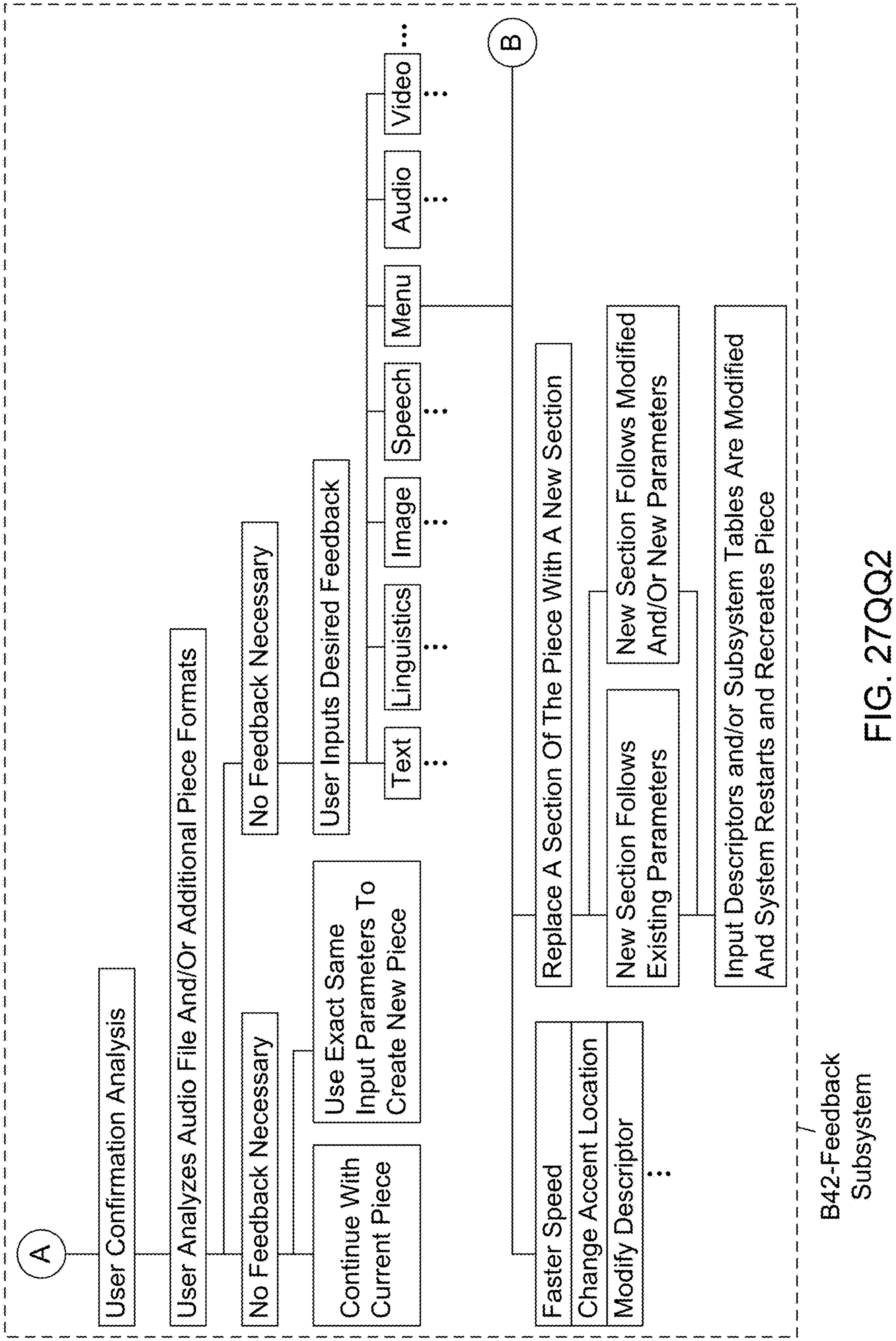
FIG. 27QQ2

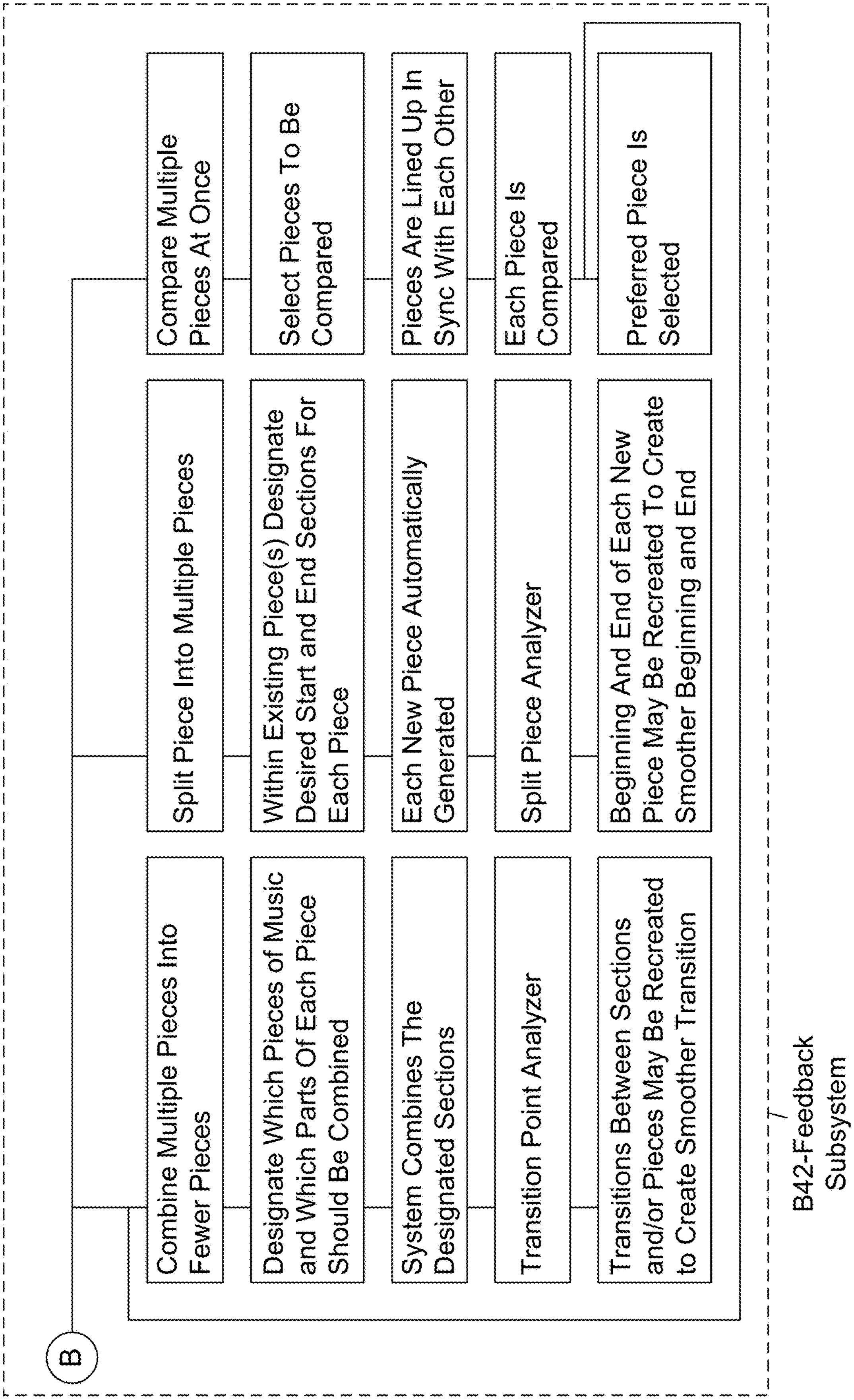
FIG. 27QQ3

B47-Population Taste Subsystem

| Tempo (Beats Per Minute "BPM") | … | 40 | 45 | 50 | 55 | 60 | 65 | 70 | 75 | 80 | … |
|---|---|---|---|---|---|---|---|---|---|---|---|
| Probability for UDID: Happy | 0.0 | 0.1 | 0.1 | 0.1 | 0.1 | 0.2 | 0.1 | 0.1 | 0.1 | 0.1 | 0.0 |
| Probability for UDID: Sad | 0.0 | 0.1 | 0.1 | 0.1 | 0.2 | 0.1 | 0.1 | 0.1 | 0.1 | 0.1 | 0.0 |
| Probability for UDID: Angry | 0.0 | 0.1 | 0.1 | 0.1 | 0.1 | 0.2 | 0.1 | 0.1 | 0.1 | 0.1 | 0.0 |
| Probability for UDID: Fearful | 0.0 | 0.1 | 0.1 | 0.1 | 0.1 | 0.2 | 0.1 | 0.1 | 0.1 | 0.1 | 0.0 |
| Probability for UDID: Love | 0.0 | 0.1 | 0.1 | 0.1 | 0.2 | 0.1 | 0.1 | 0.1 | 0.1 | 0.1 | 0.0 |
| Probability for UDID: … | … | … | … | … | … | … | … | … | … | … | … |

B3-Tempo Generation Subsystem

FIG. 28A

| Length (Seconds) | 15 | 20 | 25 | 30 | 35 | 40 | 45 | 50 | 55 |
|---|---|---|---|---|---|---|---|---|---|
| Probability for UDID: Happy | 0.1 | 0.1 | 0.1 | 0.1 | 0.2 | 0.1 | 0.1 | 0.1 | 0.1 |
| Probability for UDID: Sad | 0.1 | 0.1 | 0.1 | 0.2 | 0.1 | 0.1 | 0.1 | 0.1 | 0.1 |
| Probability for UDID: Angry | 0.1 | 0.1 | 0.1 | 0.1 | 0.1 | 0.2 | 0.1 | 0.1 | 0.1 |
| Probability for UDID: Fearful | 0.1 | 0.1 | 0.1 | 0.1 | 0.2 | 0.1 | 0.1 | 0.1 | 0.1 |
| Probability for UDID: Love | 0.1 | 0.1 | 0.1 | 0.2 | 0.1 | 0.1 | 0.1 | 0.1 | 0.1 |
| Probability for UDID: … | … | … | … | … | … | … | … | … | … |

B2-Length Generation Subsystem

FIG. 28B

| Meter | ... | 2/4 | 3/4 | 4/4 | 6/8 | 12/8 | ... |
|---|---|---|---|---|---|---|---|
| Probability for UDID: Happy | ... | 0.1 | 0.1 | 0.6 | 0.1 | 0.1 | ... |
| Probability for UDID: Sad | ... | 0.1 | 0.1 | 0.4 | 0.3 | 0.1 | ... |
| Probability for UDID: Angry | ... | 0.6 | 0.1 | 0.1 | 0.1 | 0.1 | ... |
| Probability for UDID: Fearful | ... | 0.1 | 0.1 | 0.6 | 0.1 | 0.1 | ... |
| Probability for UDID: Love | ... | 0.1 | 0.4 | 0.3 | 0.1 | 0.1 | ... |
| Probability for UDID: ... | ... | ... | ... | ... | ... | ... | ... |

B4-Meter Generation Subsystem

NOTE: Each Subsequent Data Table May Have Unique Data For Each UDID, as demonstrated in the Data Tables above.

FIG. 28C

| Key | 0 | 1 | 2 | 3 | 4 | 5 | 6 | 7 | 8 | 9 | 10 | 11 |
|---|---|---|---|---|---|---|---|---|---|---|---|---|
| Musical Letter | C | C#/Db | D | D#/Eb | E | F | F#/Gb | G | G#/Ab | A | A#/Bb | B |
| Probability for UDID: Happy | 0.1 | 0.1 | 0.1 | 0.1 | 0.1 | 0.1 | 0.1 | 0.1 | 0.1 | 0.1 | 0 | 0 |

B5-Key Generation Subsystem

FIG. 28D

| Musical Letter | Major | Minor (Natural) | Minor (Harmonic) | Minor (Melodic) | Dorian | Phrygian | Lydian | Mixolydian | Aeolian | Locrian |
|---|---|---|---|---|---|---|---|---|---|---|
| Probability for UDID: Happy | 0.5 | 0.0 | 0.0 | 0.0 | 0.1 | 0.1 | 0.1 | 0.1 | 0.1 | 0.0 |

B7-Tonality Generation Subsystem

FIG. 28E

| Song Form | A | AA | AB | AAA | ABA | ABC |
|---|---|---|---|---|---|---|
| Probability for UDID: Happy | 0.1 | 0.1 | 0.5 | 0.1 | 0.1 | 0.1 |

| Sub-Phrase | a | aa | ab | aaa | aba | abc |
|---|---|---|---|---|---|---|
| Probability for UDID: Happy | 0.1 | 0.1 | 0.5 | 0.1 | 0.1 | 0.1 |

B9-Song Form Generation Subsystem

FIG. 28F

| Length (Measures) | 1 | 2 | 3 | 4 | 5 | 6 |
|---|---|---|---|---|---|---|
| Probability for UDID: Happy | 0.2 | 0.3 | 0.1 | 0.2 | 0.1 | 0.1 |

B15-Sub-Phrase Length Generation Subsystem

FIG. 28G

| Length(Measures) | 1/8 | 1/4 | 1/2 | 1/1 |
|---|---|---|---|---|
| Probability for UDID: Happy | 0.2 | 0.3 | 0.2 | 0.1 |

Length

Probability for UDID: Happy

| Second Chord Length \ Initial Chord Length | 1/8 | 1/4 | 1/2 | 1/1 |
|---|---|---|---|---|
| 1/8 | 0.2 | 0.3 | 0.3 | 0.0 |
| 1/4 | 0.2 | 0.3 | 0.3 | 0.0 |
| 1/2 | 0.2 | 0.3 | 0.3 | 0.0 |
| 1/1 | 0.0 | 0.0 | 0.0 | 0.0 |

Length

Probability for UDID: Happy

| Third Chord Length \ Initial and Second Chord Lengths | 1/8, 1/8 | 1/8, 1/4 | 1/8, 1/2 | 1/8, 1/1 | 1/4, 1/8 | 1/4, 1/4 | 1/4, 1/2 | 1/4, 1/1 | 1/2, 1/8 | 1/2, 1/4 | 1/2, 1/2 | 1/2, 1/1 | 1/1, 1/8 | 1/1, 1/4 | 1/1, 1/2 | 1/1, 1/1 |
|---|---|---|---|---|---|---|---|---|---|---|---|---|---|---|---|---|
| 1/8 | 0.2 | 0.2 | 0.2 | 0.0 | 0.2 | 0.2 | 0.2 | 0.0 | 0.2 | 0.2 | 0.2 | 0.0 | 0.0 | 0.0 | 0.0 | 0.0 |
| 1/4 | 0.3 | 0.3 | 0.3 | 0.0 | 0.3 | 0.3 | 0.3 | 0.0 | 0.3 | 0.3 | 0.3 | 0.0 | 0.0 | 0.0 | 0.0 | 0.0 |
| 1/2 | 0.3 | 0.3 | 0.0 | 0.0 | 0.3 | 0.3 | 0.0 | 0.0 | 0.0 | 0.0 | 0.0 | 0.0 | 0.0 | 0.0 | 0.0 | 0.0 |
| 1/1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

B11-Chord Inversion Generation Subsystem

FIG. 28H

| Root Note | 0 | 1 | 2 | 3 | 4 | 5 | 6 | 7 | 8 | 9 | 10 | 11 |
|---|---|---|---|---|---|---|---|---|---|---|---|---|
| Musical Letter | C | C#/Db | D | D#/Eb | E | F | F#/Gb | G | G#/Ab | A | A#/Bb | B |
| Probability for UDID: Happy | 0.1 | 0.1 | 0.1 | 0.1 | 0.1 | 0.1 | 0.1 | 0.1 | 0.1 | 0.1 | 0 | 0 |

| | Key = G Major | | | |
|---|---|---|---|---|
| | Root Note = 7 | | | |
| | Chord Function | | | |
| | I | i | V/IV | |
| Probability | 0.9 | 0 | 0.1 | |

B17-Initial Chord Generation Subsystem

FIG. 28I

| UDID: Happy | | | Original Chord Root | | | | | | | | | | | |
|---|---|---|---|---|---|---|---|---|---|---|---|---|---|---|
| | | | 0 | 1 | 2 | 3 | 4 | 5 | 6 | 7 | 8 | 9 | 10 | 11 |
| | | | C | C#/Db | D | D#/Eb | E | F | F#/Gb | G | G#/Ab | A | A#/Bb | B |
| New Chord Root | 0 | C | 0.1 | 0.1 | 0.1 | 0.1 | 0.1 | 0.1 | 0.1 | 0.1 | 0.1 | 0.1 | 0.1 | 0.1 |
| | 1 | C#/Db | 0.1 | 0.1 | 0.1 | 0.1 | 0.1 | 0.1 | 0.1 | 0.1 | 0.1 | 0.1 | 0.1 | 0.1 |
| | 2 | D | 0.1 | 0.1 | 0.1 | 0.1 | 0.1 | 0.1 | 0.1 | 0.1 | 0.1 | 0.1 | 0.1 | 0.1 |
| | 3 | D#/Eb | 0.1 | 0.1 | 0.1 | 0.1 | 0.1 | 0.1 | 0.1 | 0.1 | 0.1 | 0.1 | 0.1 | 0.1 |
| | 4 | E | 0.1 | 0.1 | 0.1 | 0.1 | 0.1 | 0.1 | 0.1 | 0.1 | 0.1 | 0.1 | 0.1 | 0.1 |
| | 5 | F | 0.1 | 0.1 | 0.1 | 0.1 | 0.1 | 0.1 | 0.1 | 0.1 | 0.1 | 0.1 | 0.1 | 0.1 |
| | 6 | F#/Gb | 0.1 | 0.1 | 0.1 | 0.1 | 0.1 | 0.1 | 0.1 | 0.1 | 0.1 | 0.1 | 0.1 | 0.1 |
| | 7 | G | 0.1 | 0.1 | 0.1 | 0.1 | 0.1 | 0.1 | 0.1 | 0.1 | 0.1 | 0.1 | 0.1 | 0.1 |
| | 8 | G#/Ab | 0.05 | 0.05 | 0.05 | 0.05 | 0.05 | 0.05 | 0.05 | 0.05 | 0.05 | 0.05 | 0.05 | 0.05 |
| | 9 | A | 0.05 | 0.05 | 0.05 | 0.05 | 0.05 | 0.05 | 0.05 | 0.05 | 0.05 | 0.05 | 0.05 | 0.05 |
| | 10 | A#/Bb | 0.05 | 0.05 | 0.05 | 0.05 | 0.05 | 0.05 | 0.05 | 0.05 | 0.05 | 0.05 | 0.05 | 0.05 |
| | 11 | B | 0.05 | 0.05 | 0.05 | 0.05 | 0.05 | 0.05 | 0.05 | 0.05 | 0.05 | 0.05 | 0.05 | 0.05 |

B19-Sub-Phrase Chord Progression Generation Subsystem

FIG. 28J1

| UDID: Happy | | Key = G Major | | |
|---|---|---|---|---|
| | | Root Note = 7 | | |
| | | Chord Function | | |
| | | I | i | V/IV |
| 0 | C | 0.1 | 0.1 | 0.1 |
| 1 | C#/Db | -0.1 | -0.1 | -0.1 |
| 2 | D | 0.1 | 0.1 | 0.1 |
| 3 | D#/Eb | -0.1 | -0.1 | -0.1 |
| 4 | E | 0.1 | 0.1 | 0.1 |
| 5 | F | -0.1 | -0.1 | -0.1 |
| 6 | F#/Gb | 0.1 | 0.1 | 0.1 |
| 7 | G | -0.1 | -0.1 | -0.1 |
| 8 | G#/Ab | 0.0 | 0.0 | 0.0 |
| 9 | A | 0.0 | 0.0 | 0.0 |
| 10 | A#/Bb | 0.0 | 0.0 | 0.0 |
| 11 | B | 0.0 | 0.0 | 0.0 |

| UDID: Happy | Upcoming Beat In Measure | | | | |
|---|---|---|---|---|---|
| | Beat | 1 | 2 | 3 | 4 |
| 0 | C | 0.1 | 0.1 | 0.1 | 0.1 |
| 1 | C#/Db | -0.1 | -0.1 | -0.1 | -0.1 |
| 2 | D | 0.1 | 0.1 | 0.1 | 0.1 |
| 3 | D#/Eb | -0.1 | -0.1 | -0.1 | -0.1 |
| 4 | E | 0.1 | 0.1 | 0.1 | 0.1 |
| 5 | F | -0.1 | -0.1 | -0.1 | -0.1 |
| 6 | F#/Gb | 0.1 | 0.1 | 0.1 | 0.1 |
| 7 | G | -0.1 | -0.1 | -0.1 | -0.1 |
| 8 | G#/Ab | 0.0 | 0.0 | 0.0 | 0.0 |
| 9 | A | 0.0 | 0.0 | 0.0 | 0.0 |
| 10 | A#/Bb | 0.0 | 0.0 | 0.0 | 0.0 |
| 11 | B | 0.0 | 0.0 | 0.0 | 0.0 |

B19-Sub-Phrase Chord Progression Generation Subsystem

FIG. 28J2

| UDID: Happy | | | | |
|---|---|---|---|---|
| Inversion | | 5/3 | 6/3 | 6/4 |
| Chord | 0 | 0.3 | 0.3 | 0.3 |
| | 1 | 0.3 | 0.3 | 0.3 |
| | 2 | 0.3 | 0.3 | 0.3 |
| | 3 | 0.3 | 0.3 | 0.3 |
| | 4 | 0.3 | 0.3 | 0.3 |
| | 5 | 0.3 | 0.3 | 0.3 |
| | 6 | 0.3 | 0.3 | 0.3 |
| | 7 | 0.3 | 0.3 | 0.3 |
| | 8 | 0.3 | 0.3 | 0.3 |
| | 9 | 0.3 | 0.3 | 0.3 |
| | 10 | 0.3 | 0.3 | 0.3 |
| | 11 | 0.3 | 0.3 | 0.3 |

| UDID: Happy | Original Chord Root | | | |
|---|---|---|---|---|
| | 0 | | | |
| | Inversion | | | |
| Next | | 5/3 | 6/3 | 6/4 |
| Chord Root | 5/3 | 0.3 | 0.3 | 0.3 |
| 0 | 6/3 | 0.4 | 0.4 | 0.4 |
| Inversion | 6/4 | 0.3 | 0.3 | 0.3 |

| | Original Chord Root | | | |
|---|---|---|---|---|
| | 1 | | | |
| | Inversion | | | |
| Next | | 5/3 | 6/3 | 6/4 |
| Chord Root | 5/3 | 0.3 | 0.3 | 0.3 |
| 0 | 6/3 | 0.4 | 0.4 | 0.4 |
| Inversion | 6/4 | 0.3 | 0.3 | 0.3 |

...(11)

| | Original Chord Root | | | |
|---|---|---|---|---|
| | 0 | | | |
| | Inversion | | | |
| Next | | 5/3 | 6/3 | 6/4 |
| Chord Root | 5/3 | 0.3 | 0.3 | 0.3 |
| 1 | 6/3 | 0.4 | 0.4 | 0.4 |
| Inversion | 6/4 | 0.3 | 0.3 | 0.3 |

| | Original Chord Root | | | |
|---|---|---|---|---|
| | 0 | | | |
| | Inversion | | | |
| Next | | 5/3 | 6/3 | 6/4 |
| Chord Root | 5/3 | 0.3 | 0.3 | 0.3 |
| 0 | 6/3 | 0.4 | 0.4 | 0.4 |
| Inversion | 6/4 | 0.3 | 0.3 | 0.3 |

⋮
(11)

B20-Chord Inversion Generation Subsystem

FIG. 28K

| Length (Measures) | 1/4 | 1/2 | 3/4 | 1/1 | 5/4 | 6/4 | 7/4 | 2/1 |
|---|---|---|---|---|---|---|---|---|
| Probability | 0.1 | 0.1 | 0.1 | 0.1 | 0.2 | 0.2 | 0.1 | 0.1 |

B25-Melody Sub-Phrase Length Generation Subsystem

FIG. 28L1

Input

| UDID: Happy | | | | | | | | | |
|---|---|---|---|---|---|---|---|---|---|
| Melody Starts How Many 1/4 Notes Into The Sub-Phrase | | | | | | | | | |
| 1/4 Notes | 0 | 1 | 2 | 3 | 4 | 5 | 6 | 7 | 8 |
| Probability | 0.2 | 0.2 | 0.3 | 0.3 | 0 | 0 | 0 | 0 | 0 |

B24-Melody Sub-Phrase Generation Subsystem

FIG. 28L2

| Length(Measures) | 1/8 | 1/4 | 1/2 | 1/1 |
|---|---|---|---|---|
| Probability for UDID: Happy | 0.2 | 0.3 | 0.2 | 0.1 |

Length
Probability for UDID: Happy

| Second Chord Length \ Initial Chord Length | 1/8 | 1/4 | 1/2 | 1/1 |
|---|---|---|---|---|
| 1/8 | 0.2 | 0.2 | 0.2 | 0.0 |
| 1/4 | 0.3 | 0.3 | 0.3 | 0.0 |
| 1/2 | 0.3 | 0.3 | 0.3 | 0.0 |
| 1/1 | 0.0 | 0.0 | 0.0 | 0.0 |

Length
Probability for UDID: Happy

| Third Chord Length \ Initial and Second Chord Lengths | 1/8, 1/8 | 1/8, 1/4 | 1/8, 1/2 | 1/8, 1/1 | 1/4, 1/8 | 1/4, 1/4 | 1/4, 1/2 | 1/4, 1/1 | 1/2, 1/8 | 1/2, 1/4 | 1/2, 1/2 | 1/2, 1/1 | 1/1, 1/8 | 1/1, 1/4 | 1/1, 1/2 | 1/1, 1/1 |
|---|---|---|---|---|---|---|---|---|---|---|---|---|---|---|---|---|
| 1/8 | 0.2 | 0.2 | 0.2 | 0.0 | 0.2 | 0.2 | 0.2 | 0.0 | 0.2 | 0.2 | 0.2 | 0.0 | 0.0 | 0.0 | 0.0 | 0.0 |
| 1/4 | 0.3 | 0.3 | 0.3 | 0.0 | 0.3 | 0.3 | 0.3 | 0.0 | 0.3 | 0.3 | 0.3 | 0.0 | 0.0 | 0.0 | 0.0 | 0.0 |
| 1/2 | 0.3 | 0.3 | 0.0 | 0.0 | 0.3 | 0.3 | 0.0 | 0.0 | 0.0 | 0.0 | 0.0 | 0.0 | 0.0 | 0.0 | 0.0 | 0.0 |
| 1/1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

B26-Melody Note Rhythm Generation Subsystem

FIG. 28M

B27-Initial Pitch Generation Subsystem

| Note | 0 | 1 | 2 | 3 | 4 | 5 | 6 | 7 | 8 | 9 | 10 | 11 |
|---|---|---|---|---|---|---|---|---|---|---|---|---|
| Note Letter | C | C#/Db | D | D#/Eb | E | F | F#/Gb | G | G#/Ab | A | A#/Bb | B |
| Probability for UDID: Happy | 0.1 | 0.1 | 0.1 | 0.1 | 0.1 | 0.1 | 0.1 | 0.1 | 0.1 | 0.1 | 0 | 0 |

FIG. 28N

| UDID: Happy | | | Original Note | | | | | | | | | | | |
|---|---|---|---|---|---|---|---|---|---|---|---|---|---|---|
| | | | 0 | 1 | 2 | 3 | 4 | 5 | 6 | 7 | 8 | 9 | 10 | 11 |
| | | | C | C#/Db | D | D#/Eb | E | F | F#/Gb | G | G#/Ab | A | A#/Bb | B |
| New Note | 0 | C | 0.1 | 0.1 | 0.1 | 0.1 | 0.1 | 0.1 | 0.1 | 0.1 | 0.1 | 0.1 | 0.1 | 0.1 |
| | 1 | C#/Db | 0.1 | 0.1 | 0.1 | 0.1 | 0.1 | 0.1 | 0.1 | 0.1 | 0.1 | 0.1 | 0.1 | 0.1 |
| | 2 | D | 0.1 | 0.1 | 0.1 | 0.1 | 0.1 | 0.1 | 0.1 | 0.1 | 0.1 | 0.1 | 0.1 | 0.1 |
| | 3 | D#/Eb | 0.1 | 0.1 | 0.1 | 0.1 | 0.1 | 0.1 | 0.1 | 0.1 | 0.1 | 0.1 | 0.1 | 0.1 |
| | 4 | E | 0.1 | 0.1 | 0.1 | 0.1 | 0.1 | 0.1 | 0.1 | 0.1 | 0.1 | 0.1 | 0.1 | 0.1 |
| | 5 | F | 0.1 | 0.1 | 0.1 | 0.1 | 0.1 | 0.1 | 0.1 | 0.1 | 0.1 | 0.1 | 0.1 | 0.1 |
| | 6 | F#/Gb | 0.1 | 0.1 | 0.1 | 0.1 | 0.1 | 0.1 | 0.1 | 0.1 | 0.1 | 0.1 | 0.1 | 0.1 |
| | 7 | G | 0.1 | 0.1 | 0.1 | 0.1 | 0.1 | 0.1 | 0.1 | 0.1 | 0.1 | 0.1 | 0.1 | 0.1 |
| | 8 | G#/Ab | 0.05 | 0.05 | 0.05 | 0.05 | 0.05 | 0.05 | 0.05 | 0.05 | 0.05 | 0.05 | 0.05 | 0.05 |
| | 9 | A | 0.05 | 0.05 | 0.05 | 0.05 | 0.05 | 0.05 | 0.05 | 0.05 | 0.05 | 0.05 | 0.05 | 0.05 |
| | 10 | A#/Bb | 0.05 | 0.05 | 0.05 | 0.05 | 0.05 | 0.05 | 0.05 | 0.05 | 0.05 | 0.05 | 0.05 | 0.05 |
| | 11 | B | 0.05 | 0.05 | 0.05 | 0.05 | 0.05 | 0.05 | 0.05 | 0.05 | 0.05 | 0.05 | 0.05 | 0.05 |

B29-Sub-Phrase Pitch Generation Subsystem

FIG. 28O1

B29-Sub-Phrase Pitch Generation Subsystem

| UDID: Happy | Probability Change | 1 | 2 | 3 | 4 | 5 | 6 | 7 | 8 | 9 | 10 | 11 | 12 |
|---|---|---|---|---|---|---|---|---|---|---|---|---|---|
| Maj | 0.1 | 1 | 2 | 3 | 4 | 5 | 6 | 7 | 8 | 9 | 10 | 11 | 12 |
| | 0.1 | 5 | 6 | 7 | 8 | 9 | 10 | 11 | 12 | 1 | 2 | 3 | 4 |
| | 0.1 | 8 | 9 | 10 | 11 | 12 | 1 | 2 | 3 | 4 | 5 | 6 | 7 |
| Min | 0.1 | 1 | 2 | 3 | 4 | 5 | 6 | 7 | 8 | 9 | 10 | 11 | 12 |
| | 0.1 | 4 | 5 | 6 | 7 | 8 | 9 | 10 | 11 | 12 | 1 | 2 | 3 |
| | 0.1 | 8 | 9 | 10 | 11 | 12 | 1 | 2 | 3 | 4 | 5 | 6 | 7 |
| Aug | 0.1 | 1 | 2 | 3 | 4 | 5 | 6 | 7 | 8 | 9 | 10 | 11 | 12 |
| | 0.1 | 5 | 6 | 7 | 8 | 9 | 10 | 11 | 12 | 1 | 2 | 3 | 4 |
| | 0.1 | 9 | 10 | 11 | 12 | 1 | 2 | 3 | 4 | 5 | 6 | 7 | 8 |
| Dim | 0.1 | 1 | 2 | 3 | 4 | 5 | 6 | 7 | 8 | 9 | 10 | 11 | 12 |
| | 0.1 | 4 | 5 | 6 | 7 | 8 | 9 | 10 | 11 | 12 | 1 | 2 | 3 |
| | 0.1 | 7 | 8 | 9 | 10 | 11 | 12 | 1 | 2 | 3 | 4 | 5 | 6 |

| Leap Reversal Modifier Table Loaded By B1, B37 | | | | | | | | | | | | |
|---|---|---|---|---|---|---|---|---|---|---|---|---|
| UDID: Happy | | | | | | | | | | | | |
| Previous Leap Distance | 1 | 2 | 3 | 4 | 5 | 6 | 7 | 8 | 9 | 10 | 11 | 12 |
| Originating Leap Side Modification | 0.0 | 0.0 | 0.0 | 0.1 | 0.1 | 0.1 | 0.1 | 0.1 | 0.1 | 0.1 | 0.1 | 0.1 |

FIG. 28O2

| Rhythmic Distance | 0.5 | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 | 9.5 | 10.0 |
|---|---|---|---|---|---|---|---|---|---|---|---|---|---|---|---|---|---|---|---|---|
| Minimum Leap Required | 0 | 0 | 0 | 1 | 1 | 1 | 1 | 1 | 4 | 4 | 4 | 6 | 6 | 6 | 8 | 8 | 8 | 8 | 8 | 8 |
| Else, Modify Leaps Greater Than Minimum | 0 | 0 | 0 | 0 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |

| UDID: Happy | | | Original Notes | | |
|---|---|---|---|---|---|
| | | | 0,0 | 0,1 | ... |
| | | | C,C | C,C#/Db | ... |
| New Note | 0 | C | 0.1 | 0.1 | ... |
| | 1 | C#/Db | 0.1 | 0.1 | ... |
| | ⋮ | ⋮ | | | |

B29-Sub-Phrase Pitch Generation Subsystem

FIG. 28O3

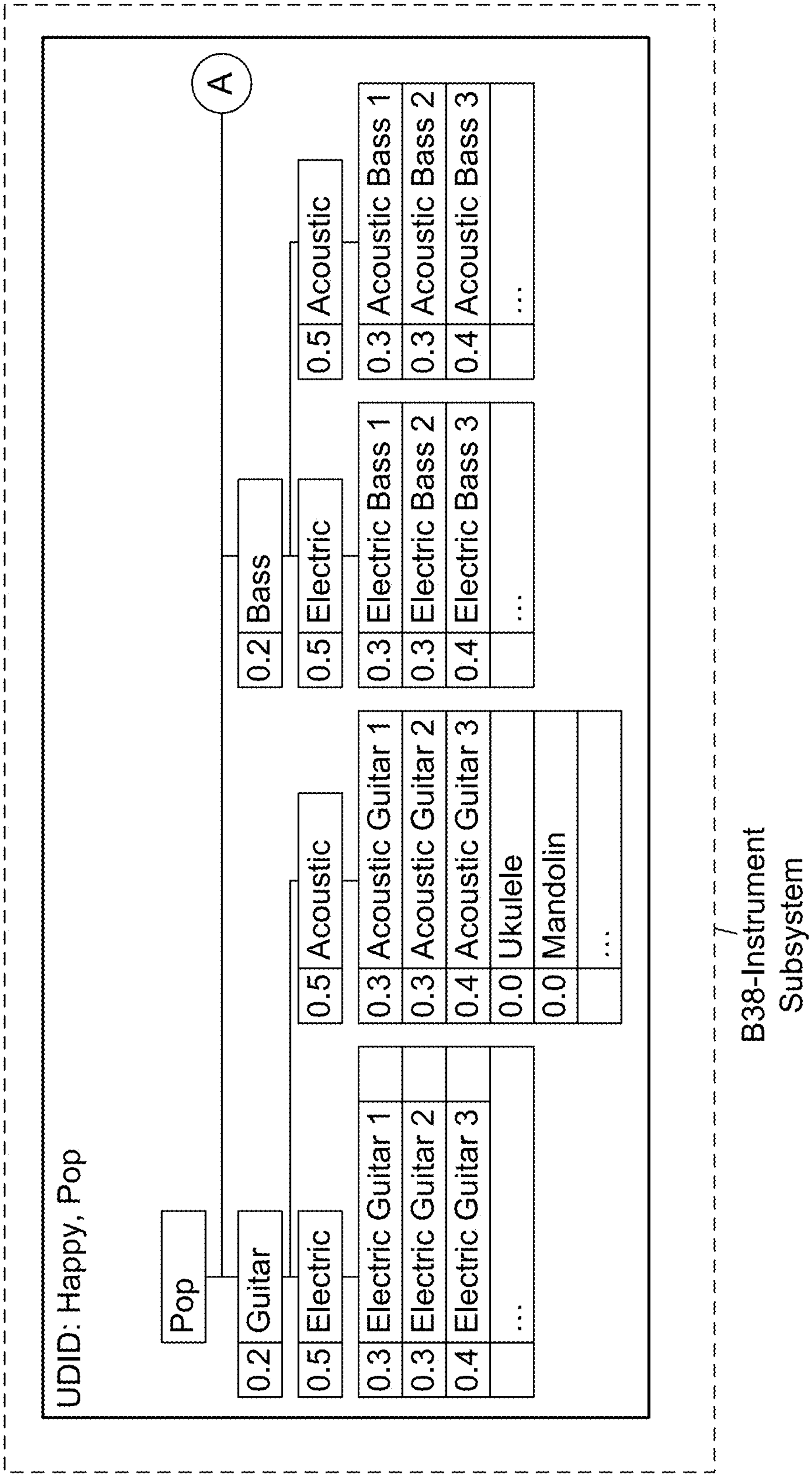
FIG. 28Q1A

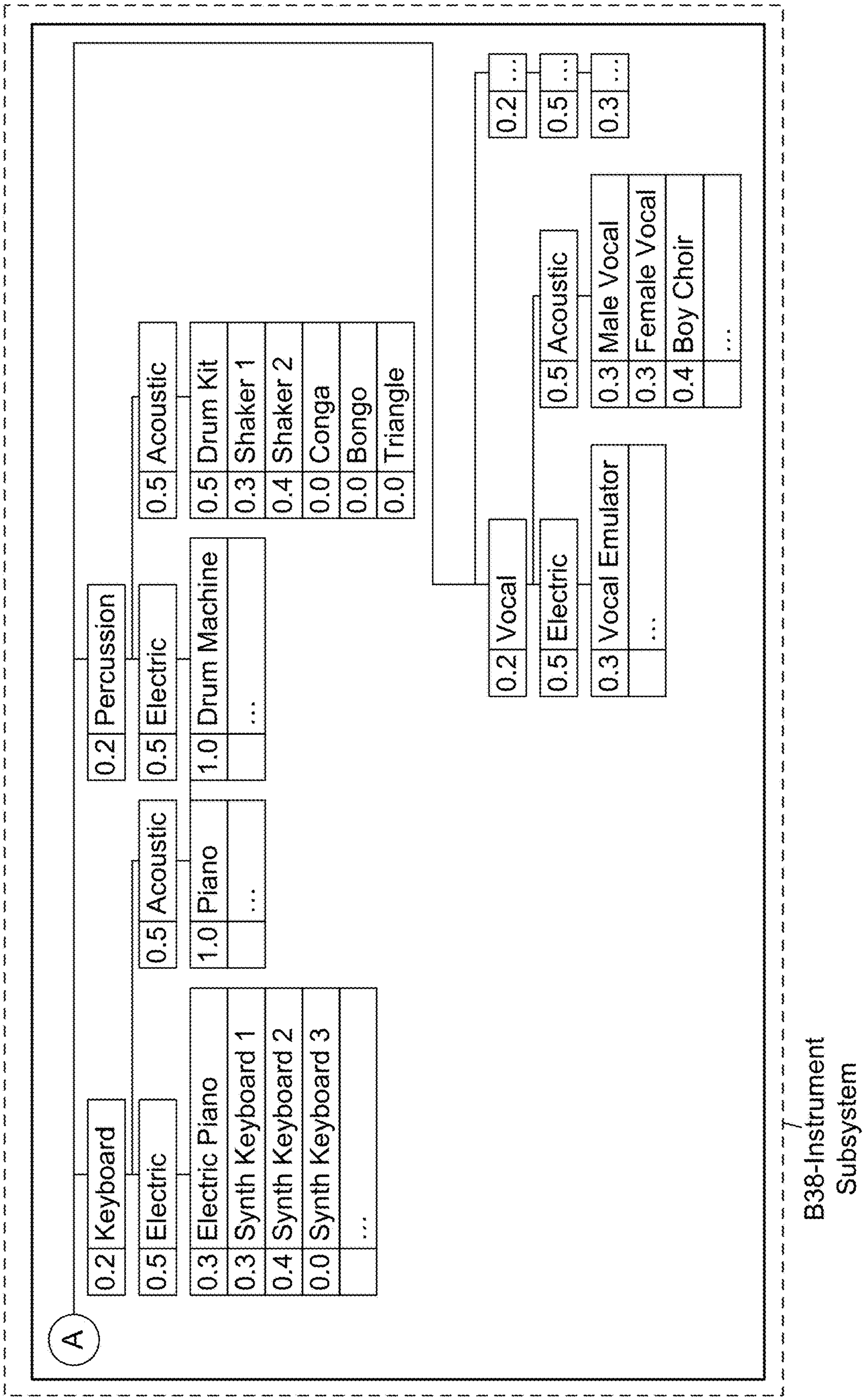
FIG. 28Q1B

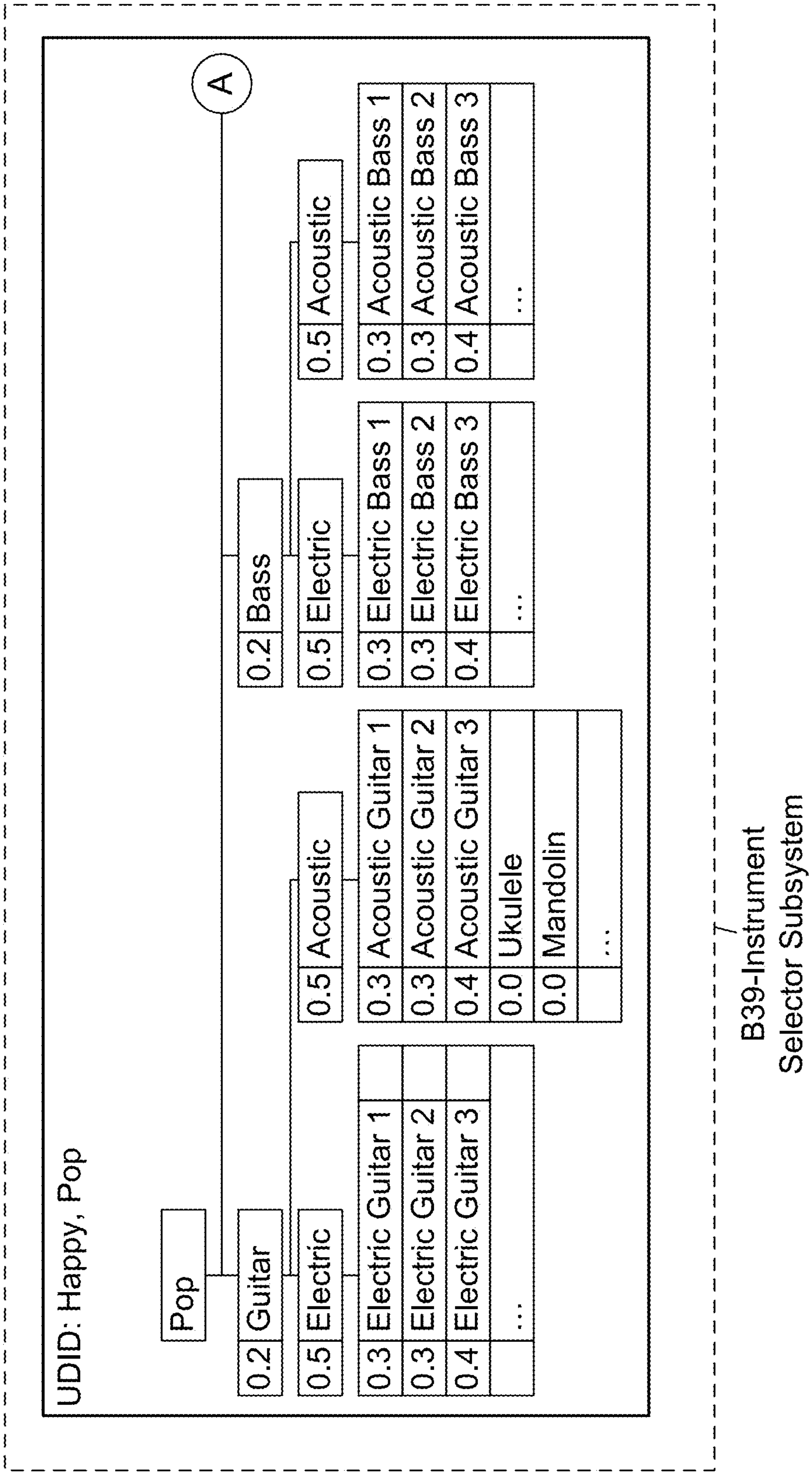
B39-Instrument Selector Subsystem
FIG. 28Q2A

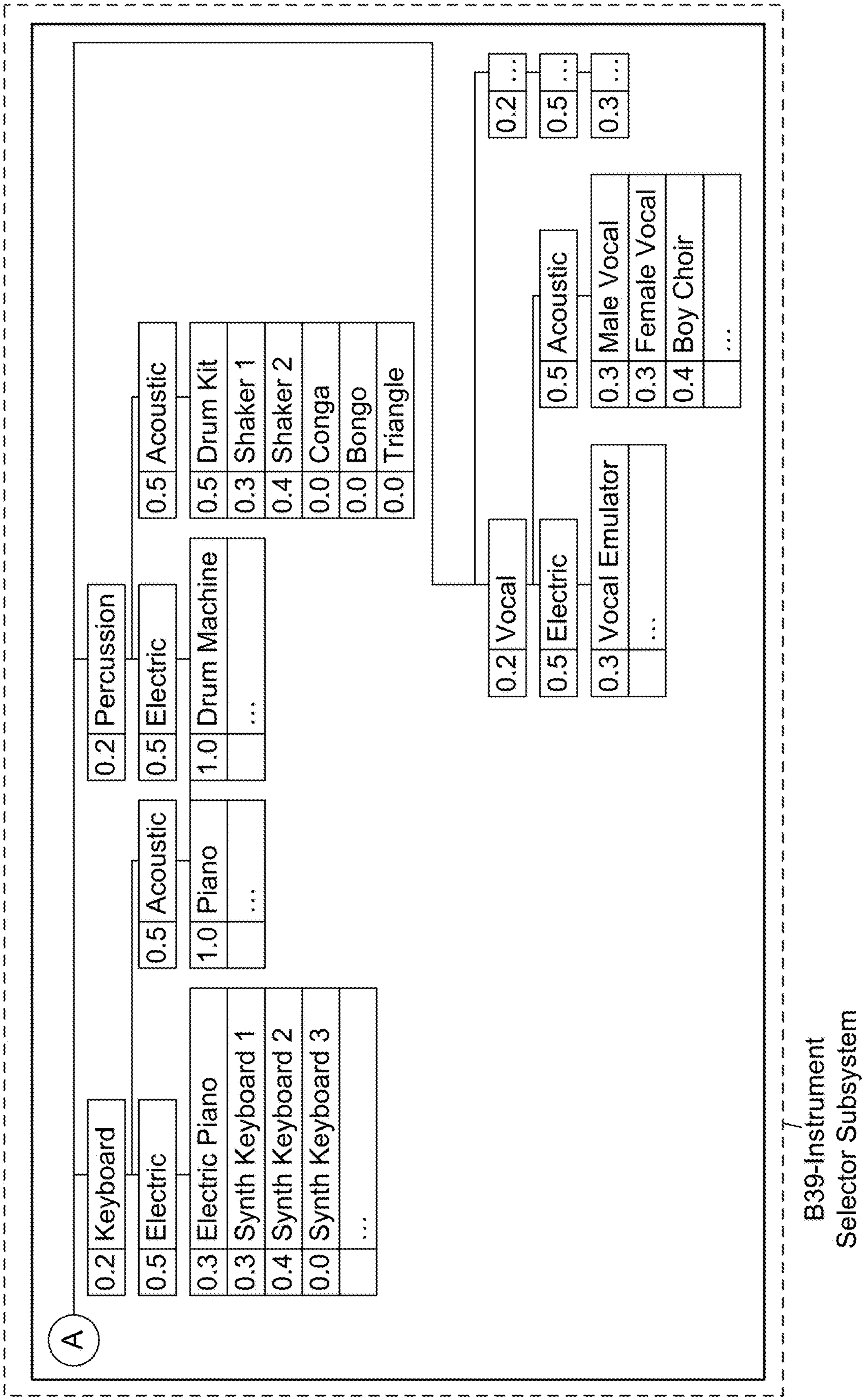
FIG. 28Q2B

B31-Orchestration Generation Subsystem

UDID: Happy

| 0.1 | 0.1 | 0.1 | 0.5 | 0.1 | 0.1 |
|---|---|---|---|---|---|
| Violin | Violin | Electric Bass 1 | Piano | Piano | Electric Bass 1 |
| Piano | Electric Bass 1 | Violin | Violin | Electric Bass 1 | Piano |
| Electric Bass 1 | Piano | Piano | Electric Bass 1 | Violin | Violin |

| Function | Probability |
|---|---|
| Primary Melody | 0.2 |
| Secondary Melody | 0.2 |
| Primary Harmony | 0.2 |
| Secondary Harmony | 0.2 |
| Accompaniment | 0.2 |

UDID: Happy

| | | Right Hand | | | |
|---|---|---|---|---|---|
| | | 0.3 | 0.4 | 0.3 | ... |
| | | Melody | Single Note (Non Melodic) | Diad | ... |
| Left Hand | Melody | 0.2 | 0.2 | 0.2 | |
| | Single Note (Non Melodic) | 0.2 | 0.2 | 0.2 | |
| | Diad | 0.3 | 0.3 | 0.3 | |
| | Chord | 0.3 | 0.3 | 0.3 | |
| | ⋮ | | | | |

FIG. 28R1

B31-Orchestration Generation Subsystem

Right Hand

| Length (Measures) | 1/8 | 1/4 | 1/2 | 1/1 |
|---|---|---|---|---|
| Probability | 0.2 | 0.3 | 0.2 | 0.1 |

Left Hand

| Length (Measures) | 1/8 | 1/4 | 1/2 | 1/1 |
|---|---|---|---|---|
| Probability | 0.2 | 0.3 | 0.2 | 0.1 |

Length Probability

Initial Note Length

| Second Note Length | 1/8 | 1/4 | 1/2 | 1/1 |
|---|---|---|---|---|
| 1/8 | 0.2 | 0.2 | 0.2 | 0.0 |
| 1/4 | 0.3 | 0.3 | 0.3 | 0.0 |
| 1/2 | 0.3 | 0.3 | 0.3 | 0.0 |
| 1/1 | 0.0 | 0.0 | 0.0 | 0.0 |

Length Probability

Initial Note Length

| Second Note Length | 1/8 | 1/4 | 1/2 | 1/1 |
|---|---|---|---|---|
| 1/8 | 0.2 | 0.2 | 0.2 | 0.0 |
| 1/4 | 0.3 | 0.3 | 0.3 | 0.0 |
| 1/2 | 0.3 | 0.3 | 0.3 | 0.0 |
| 1/1 | 0.0 | 0.0 | 0.0 | 0.0 |

FIG. 28R2

B31-Orchestration Generation Subsystem

| Length |
|---|
| Probability |

Initial and Second Note Lengths

| Third Note Length | 1/8, 1/8 | 1/8, 1/4 | 1/8, 1/2 | 1/8, 1/1 | 1/4, 1/8 | 1/4, 1/4 | 1/4, 1/2 | 1/4, 1/1 | 1/2, 1/8 | 1/2, 1/4 | 1/2, 1/2 | 1/2, 1/1 | 1/1, 1/8 | 1/1, 1/4 | 1/1, 1/2 | 1/1, 1/1 |
|---|---|---|---|---|---|---|---|---|---|---|---|---|---|---|---|---|
| 1/8 | 0.2 | 0.2 | 0.2 | 0.0 | 0.2 | 0.2 | 0.2 | 0.0 | 0.2 | 0.2 | 0.2 | 0.0 | 0.0 | 0.0 | 0.0 | 0.0 |
| 1/4 | 0.3 | 0.3 | 0.3 | 0.0 | 0.3 | 0.3 | 0.3 | 0.0 | 0.3 | 0.3 | 0.3 | 0.0 | 0.0 | 0.0 | 0.0 | 0.0 |
| 1/2 | 0.3 | 0.3 | 0.0 | 0.0 | 0.3 | 0.3 | 0.0 | 0.0 | 0.0 | 0.0 | 0.0 | 0.0 | 0.0 | 0.0 | 0.0 | 0.0 |
| 1/1 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 | 0.0 |

| Dynamic | Probability |
|---|---|
| piano | 0.1 |
| mezzo piano | 0.3 |
| mezzo forte | 0.3 |
| forte | 0.3 |

FIG. 28R3

TIMING CONTROL SYSTEM DIAGRAM

| | |
|---|---|
| FIG. 30A | FIG. 30B |
| FIG. 30C | FIG. 30D |
| FIG. 30E | FIG. 30F |
| FIG. 30G | FIG. 30H |
| FIG. 30I | FIG. 30J |

FIG. 30

| Block Name | Input/ Output | Format | Additional Format | Additional Format | Additional Format | Additional Format | Additional Format | Additional Format |
|---|---|---|---|---|---|---|---|---|
| B0 | i | Touch Screen | Experiential Icon | Index Keyboard | Mouse Click | Linguistics | Typewriter | Text Prompt |
| B0 | o | Text | Image | Linguistics | Speech | Menu Selection | Audio File | Video |
| B1 | i | Text | Image | Linguistics | Speech | Menu Selection | Audio File | Video |
| B1 | o | Number | Time | | | | | |
| B2 | i | Time | | | | | | |
| B2 | o | Time | | | | | | |
| B3 | i | Number | | | | | | |
| B3 | o | Tempo | | | | | | |
| B4 | i | Number | | | | | | |
| B4 | o | Meter | | | | | | |
| B5 | i | Number | | | | | | |
| B5 | o | Number | | | | | | |
| B6 | i | Time | Tempo | | | | | |
| B6 | o | Number | | | | | | |
| B7 | i | Number | | | | | | |
| B7 | o | Tonality | | | | | | |
| B8 | i | Number | Meter | | | | | |
| B8 | o | Number | | | | | | |

FIG. 30A

| **Additional Format** | **Additional Format** | **Additional Format** | **Additional Format** |
|---|---|---|---|
| Speech Input with automated recognition | Image input with automated recognition and analysis | Video input with automated recognition and analysis | Other form of communication and request transmission |
| Other Descriptor | | | |
| Other Descriptor | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |

FIG. 30B

| Block Name | Input/ Output | Format | Additional Format | Additional Format | Additional Format | Additional Format | Additional Format | Additional Format |
|---|---|---|---|---|---|---|---|---|
| B9 | i | Number | | | | | | |
| B9 | o | Letter | | | | | | |
| B10 | i | Letter | | | | | | |
| B10 | o | Letter | | | | | | |
| B11 | i | Time | Letter | | | | | |
| B11 | o | Time | | | | | | |
| B12 | i | Time | Number | | | | | |
| B12 | o | Time | | | | | | |
| B13 | i | Time | | | | | | |
| B13 | o | Time | | | | | | |
| B14 | i | Letter | | | | | | |
| B14 | o | Letter | | | | | | |
| B15 | i | Time | | | | | | |
| B15 | o | Time | | | | | | |
| B16 | i | Time | | | | | | |
| B16 | o | Time | | | | | | |
| B17 | i | Time | Number | Tonality | | | | |
| B17 | o | Chord | | | | | | |
| B18 | i | Chord | Number | Tonality | | | | |

FIG. 30C

| Additional Format | Additional Format | Additional Format | Additional Format |
|---|---|---|---|
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |

FIG. 30D

| Block Name | Input/ Output | Format | Additional Format | Additional Format | Additional Format | Additional Format | Additional Format | Additional Format |
|---|---|---|---|---|---|---|---|---|
| B18 | o | Chord | | | | | | |
| B19 | i | Chord | | | | | | |
| B19 | o | Chord | | | | | | |
| B20 | i | Chord | | | | | | |
| B20 | o | Chord | | | | | | |
| B21 | i | Chord | | | | | | |
| B21 | o | Time | | | | | | |
| B22 | i | Time | | | | | | |
| B22 | o | Letter | | | | | | |
| B23 | i | Letter | Time | | | | | |
| B23 | o | Time | | | | | | |
| B24 | i | Time | | | | | | |
| B24 | o | Letter | | | | | | |
| B25 | i | Letter | | | | | | |
| B25 | o | Time | | | | | | |
| B26 | i | Letter | Time | | | | | |
| B26 | o | Time | | | | | | |
| B27 | i | Chord | Time | | | | | |

FIG. 30E

| Additional Format | Additional Format | Additional Format | Additional Format |
|---|---|---|---|
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |

FIG. 30F

| Block Name | Input/ Output | Format | Additional Format | Additional Format | Additional Format | Additional Format | Additional Format | Additional Format |
|---|---|---|---|---|---|---|---|---|
| B27 | o | Pitch | | | | | | |
| B28 | i | Chord | Time | Pitch | | | | |
| B28 | o | Pitch | | | | | | |
| B29 | i | Pitch | | | | | | |
| B29 | o | Pitch | | | | | | |
| B30 | i | Pitch | | | | | | |
| B30 | o | Pitch | | | | | | |
| B31 | i | Chord | Time | Pitch | Number | Tonality | Letter | |
| B31 | o | Chord | Time | Pitch | Number | | | |
| B32 | i | Chord | Time | Pitch | Number | Tonality | Letter | |
| B32 | o | Time | Number | | | | | |
| B33 | i | Chord | Time | Pitch | Number | Tonality | Letter | |
| B33 | o | Audio File | | | | | | |
| B34 | i | Audio File | | | | | | |
| B34 | o | Audio File | | | | | | |
| B50 | i | Audio File | Text | | | | | |
| B50 | o | Audio File | Text | Video | Image | MIDI | Other File Format | |
| B35 | i | Audio File | | | | | | |
| B35 | o | Audio File | | | | | | |

FIG. 30G

| Additional Format | Additional Format | Additional Format | Additional Format |
| --- | --- | --- | --- |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |

FIG. 30H

| Block Name | Input/ Output | Format | Additional Format | Additional Format | Additional Format | Additional Format | Additional Format | Additional Format |
|---|---|---|---|---|---|---|---|---|
| B36 | i | Audio File | | | | | | |
| B36 | o | Audio File | | | | | | |
| B37 | i | Text | Image | Linguistics | Speech | Menu Selection | Audio File | Video |
| B37 | o | Database | | | | | | |
| B38 | i | Database | | | | | | |
| B38 | o | Text | | | | | | |
| B39 | i | Text | | | | | | |
| B39 | o | Text | | | | | | |
| B40 | i | Text | Image | Linguistics | Speech | Menu Selection | Audio File | Video |
| B40 | o | Command | | | | | | |
| B41 | i | Text | Image | Linguistics | Speech | Time | Menu Selection | Video |
| B41 | o | Time | | | | | | |
| ⋮ | | ⋮ | | ⋮ | | ⋮ | | ⋮ |

FIG. 30I

| Additional Format | Additional Format | Additional Format | Additional Format |
|---|---|---|---|
| | | | |
| | | | |
| Other Descriptor | | | |
| | | | |
| | | | |
| | | | |
| | | | |
| | | | |
| Other Descriptor | | | |
| | | | |
| Other Descriptor | | | |
| | | | |

| Format Examples: | |
|---|---|
| Text | Happy, Table, Airplane |
| Chord | C, D, E, F#, G Sharp, Ab, B Flat, Major, Minor |
| Audio File | Wave, MP3, OGG, AIFF |
| Binary | Yes/No, 0/1 |
| Command | Open, Close, Run |
| Meter | 3/4, 4/4, 6/8, 7/8 |
| Image | .PNG, .JPEG, .PDF |
| Time | Day, Hour, Minute, Second, Measure, Beat |
| Pitch | Hertz, Frequency, Note |
| Number | 0,1,2,3,4,5 |
| Tonality | C, D, E, F#, G Sharp, Ab, B Flat, Major, Minor |
| Tempo | Beats Per Minute, 0,1,2,3,4 |
| Letter | A, B, C, D |
| Linguistics | The music should be broad like a bird's wings |
| | The kids are playing on the ground with toys |
| Speech | Audio input, Microphone input, .Wav, .Mp3 |
| MIDI | .MID .MIDI |

FIG. 31

| Primary | Love | | |
|---|---|---|---|
| Secondary | Affection | Lust | Longing |
| Tertiary | acceptance | arousal | admiration |
| | adoration | Attraction (sexual) | adoration |
| | affection | curious | ambitious |
| | aroused | desire | ardent |
| | attraction | desire | attraction (intellectual) |
| | camaraderie | enthralled | awed |
| | caring | fascinated | eager |
| | compassion | infatuation | enigmatic |
| | compassionate | infatuation | interest |
| | enchanted | lust | Longing |
| | fondness | obsessed | needed |
| | kind | passion | |
| | liking | sensual | |
| | love | sexy | |
| | love | yearning | |
| | loyal | | |
| | passion | | |
| | sensitive | | |
| | sentimentality | | |
| | sweet | | |
| | tenderness | | |
| | | | |
| | | | |
| | | | |
| | | | |
| | | | |
| | | | |
| | | | |
| | | | |
| | | | |
| | | | |

FIG. 32A

| Joy | | | | ... |
|---|---|---|---|---|
| **Cheerfulness** | **Zest** | **Contentment** | **Pride** | **Optimism** |
| amusement | crafty | amused | boastful | courageous |
| bliss | enthusiasm | calm | cocky | determined |
| bliss | excitement | collected | confident | eagerness |
| bubbly | exhilaration | comfortable | exuberance | excited |
| cheerfulness | goofy | contentment | Pride | hope |
| delight | lively | delighted | proud | hopeful |
| ecstasy | playful | fulfillment | resolved | innocent |
| ecstatic | spirited | humored | selfish | inspired |
| elation | thrill | inner peace | solemn | optimism |
| enjoyment | zeal | pacified | strong | optimistic |
| euphoria | zest | peaceful | superior | |
| gaiety | zesty | pensive | triumph | |
| gay | | pleased | trust | |
| giddy | | pleasure | zeal | |
| gladness | | pleasure | | |
| glee | | relief | | |
| gleeful | | satisfied | | |
| happiness | | serenity | | |
| happy | | sincerity | | |
| jolliness | | tranquil | | |
| joviality | | warm | | |
| joy | | | | |
| joy | | | | |
| jubilant | | | | |
| jubilation | | | | |
| merry | | | | |
| satisfaction | | | | |
| | | | | |
| | | | | |
| | | | | |
| | | | | |

FIG. 32B

| ...Joy | | Surprise | Anger | ... |
|---|---|---|---|---|
| **Enthrallment** | **Relief** | **Surprise** | **Irritation** | **Exasperation** |
| breathless | appreciative | amazement | aggravation | bewildered |
| enthrallment | grateful | astonishment | agitation | crazy |
| euphoric | gratified | enlightened | annoyance | denial |
| hyper | liberated | flabbergasted | cranky | distrustful |
| insanity | mercy | shocked | cynic | Exasperation |
| rapture | relief | surprise | delirious | exhausted |
| wonder | | thrilled | grouchiness | frazzled |
| | | | grouchy | frustration |
| | | | grudging | hysterical |
| | | | grumpiness | overwhelmed |
| | | | hostile | |
| | | | irritability | |
| | | | irritation | |
| | | | perturbation | |
| | | | provoked | |
| | | | tense | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |
| | | | | |

FIG. 32C

| **...Anger** | | | | **Sadness ...** |
|---|---|---|---|---|
| **Rage** | **Disgust** | **Envy** | **Torment** | **Suffering** |
| aggressive | animosity | bitter | anguish | Agony |
| anger | contempt | envy | calamitous | betrayed |
| bitterness | detest | greedy | cruelty | disheartened |
| dislike | Disgust | jealousy | loathsome | distressed |
| enraged | dismal | possessive | submissive | heartbroken |
| ferocity | hate | schadenfreude | torment | homesick |
| furious | obscene | vengeful | troubled | hurt |
| fury | offended | | | hurt |
| hate | resentment | | | longing |
| hostility | revulsion | | | lovesick |
| infuriated | scorn | | | mean |
| irate | | | | miserable |
| loathing | | | | needy |
| mad | | | | pain |
| outrage | | | | suffering |
| outraged | | | | suffering |
| rage | | | | weary |
| resentment | | | | worn-out |
| scorn | | | | |
| spite | | | | |
| vengefulness | | | | |
| vicious | | | | |
| wrath | | | | |
| wrathful | | | | |
| | | | | |
| | | | | |
| | | | | |
| | | | | |
| | | | | |
| | | | | |
| | | | | |

FIG. 32D

| **...Sadness** | | | | |
|---|---|---|---|---|
| **Sadness** | **Disappointment** | **Shame** | **Neglect** | **Sympathy** |
| apathy | bored | cowardly | abandoned | concerned |
| blue | crummy | dopey | alienation | empathic |
| cold | crushed | dreary | contempt | pity |
| dark | dejected | embarrassed | defeat | sympathy |
| Depression | depression | foolish | dejection | |
| despair | disappointment | guilt | discouraged | |
| despair | disapproval | guilty | dispirited | |
| devastated | dismay | humiliated | distracted | |
| down | displeasure | regret | embarrassment | |
| emptiness | hopeless | remorse | homesickness | |
| gloom | jaded | remorse | humiliation | |
| gloomy | lazy | shame | indifference | |
| glumness | pathetic | sheepish | indignation | |
| gray | resignation | | insecurity | |
| grief | sorry | | insult | |
| hopelessness | worthless | | loneliness | |
| lonely | | | neglect | |
| melancholic | | | rejection | |
| melancholy | | | remorse | |
| mellow | | | | |
| misery | | | | |
| pessimistic | | | | |
| sadness | | | | |
| somber | | | | |
| sorrow | | | | |
| sorrow | | | | |
| tired | | | | |
| unhappiness | | | | |
| unhappy | | | | |
| upset | | | | |
| woe | | | | |

FIG. 32E

| **Fear** | |
|---|---|
| **Horror** | **Nervousness** |
| Alarm | alert |
| fear | anticipation |
| fright | anxiety |
| horrified | apprehension |
| horror | cautious |
| hysteria | confused |
| intimidated | distress |
| invidious | dread |
| morbid | expectation |
| mortification | fight-or-flight |
| panic | insecure |
| petrified | nervous |
| shock | nervousness |
| terrified | panicky |
| terror | paranoia |
| threatened | puzzled |
| | scared |
| | shy |
| | stressed |
| | temperamental |
| | tenseness |
| | uncertainty |
| | uneasiness |
| | uneasiness |
| | worried |
| | worry |
| | |
| | |
| | |
| | |
| | |

FIG. 32F

| Base level unique styles that are distilled, alone in combination, from system inputs |
|---|
| Alternative |
| Art Punk |
| Alternative Rock |
| College Rock |
| Experimental Rock |
| Goth / Gothic Rock |
| Grunge |
| Hardcore Punk |
| Hard Rock |
| Indie Rock |
| Lo-fi |
| New Wave |
| Progressive Rock |
| Punk |
| Shoegaze |
| Steampunk |
| Anime |
| Blues |
| Acoustic Blues |
| Chicago Blues |
| Classic Blues |
| Contemporary Blues |
| Country Blues |
| Delta Blues |
| Electric Blues |
| Children's Music |
| Lullabies |
| Sing-Along |
| Stories |
| Classical |
| Avant-Garde |
| Baroque |

| |
|---|
| Chamber Music |
| Chant |
| Choral |
| Classical Crossover |
| Early Music |
| High Classical |
| Impressionist |
| Medieval |
| Minimalism |
| Modern Composition |
| Opera |
| Orchestral |
| Renaissance |
| Romantic |
| Wedding Music |
| Comedy |
| Novelty |
| Standup Comedy |
| Vaudeville |
| Commercial |
| Jingles |
| TV Themes |
| Country |
| Alternative Country |
| Americana |
| Bluegrass |
| Contemporary Bluegrass |
| Contemporary Country |
| Country Gospel |
| Country Pop |
| Honky Tonk |
| Outlaw Country |
| Traditional Bluegrass |
| Traditional Country |
| Urban Cowboy |

FIG. 33A

| |
|---|
| Dance/EDM |
| Club / Club Dance |
| Breakbeat |
| Brostep |
| Deep House |
| Dubstep |
| Electro House |
| Exercise |
| Garage |
| Glitch Hop |
| Hardcore |
| Hard Dance |
| Hi-NRG / Eurodance |
| House |
| Jackin House |
| Jungle / Drum'n'bass |
| Regstep |
| Techno |
| Trance |
| Trap |
| Disney |
| Easy Listening |
| Bop |
| Lounge |
| Swing |
| Electronic |
| 8bit |
| Ambient |
| Bassline |
| Chiptune |
| Crunk |
| Downtempo |
| Drum & Bass |
| Electro |
| Electro-swing |
| Electronica |

| |
|---|
| Electronic Rock |
| Hardstyle |
| IDM/Experimental |
| Industrial |
| Trip Hop |
| Enka |
| French Pop |
| German Folk |
| German Pop |
| Fitness & Workout |
| Hip-Hop/Rap |
| Alternative Rap |
| Bounce |
| Dirty South |
| East Coast Rap |
| Gangsta Rap |
| Hardcore Rap |
| Hip-Hop |
| Latin Rap |
| Old School Rap |
| Rap |
| Turntablism |
| Underground Rap |
| West Coast Rap |
| Holiday |
| Chanukah |
| Christmas |
| Christmas: Children's |
| Christmas: Classic |
| Christmas: Classical |
| Christmas: Jazz |
| Christmas: Modern |
| Christmas: Pop |
| Christmas: R&B |
| Christmas: Religious |
| Christmas: Rock |

FIG. 33B

| |
|---|
| Easter |
| Halloween |
| Holiday: Other |
| Thanksgiving |
| Indie Pop |
| Industrial |
| Inspirational – Christian & Gospel |
| CCM |
| Christian Metal |
| Christian Pop |
| Christian Rap |
| Christian Rock |
| Classic Christian |
| Contemporary Gospel |
| Gospel |
| Christian & Gospel |
| Praise & Worship |
| Qawwali |
| Southern Gospel |
| Traditional Gospel |
| Instrumental |
| March (Marching Band) |
| J-Pop |
| J-Rock |
| J-Synth |
| J-Ska |
| J-Punk |
| Jazz |
| Acid Jazz |
| Avant-Garde Jazz |
| Bebop |
| Big Band |
| Blue Note |
| Contemporary Jazz |
| Cool |
| Crossover Jazz |

| |
|---|
| Dixieland |
| Ethio-jazz |
| Fusion |
| Gypsy Jazz |
| Hard Bop |
| Latin Jazz |
| Mainstream Jazz |
| Ragtime |
| Smooth Jazz |
| Trad Jazz |
| K-Pop |
| Karaoke |
| Kayokyoku |
| Latin |
| Alternativo & Rock Latino |
| Argentine tango |
| Baladas y Boleros |
| Bossa Nova |
| Brazilian |
| Contemporary Latin |
| Flamenco / Spanish Flamenco |
| Latin Jazz |
| Nuevo Flamenco |
| Pop Latino |
| Portuguese fado |
| Raíces |
| Reggaeton y Hip-Hop |
| Regional Mexicano |
| Salsa y Tropical |
| New Age |
| Environmental |
| Healing |
| Meditation |
| Nature |
| Relaxation |
| Travel |

FIG. 33C

| | |
|---|---|
| Opera | Adult-Oriented Rock |
| Pop | Afro Punk |
| Adult Contemporary | Adult Alternative |
| Britpop | Alternative Rock |
| Bubblegum Pop | American Trad Rock |
| Chamber Pop | Anatolian Rock |
| Dance Pop | Arena Rock |
| Dream Pop | Art Rock |
| Electro Pop | Blues-Rock |
| Orchestral Pop | British Invasion |
| Pop/Rock | Death Metal / Black Metal |
| Power Pop | Glam Rock |
| Soft Rock | Gothic Metal |
| Synthpop | Hair Metal |
| Teen Pop | Hard Rock |
| R&B/Soul | Metal |
| Contemporary R&B | Noise Rock |
| Disco | Jam Bands |
| Doo Wop | Post Punk |
| Funk | Prog-Rock/Art Rock |
| Modern Soul | Psychedelic |
| Motown | Rock & Roll |
| Neo-Soul | Rockabilly |
| Northern Soul | Roots Rock |
| Psychedelic Soul | Singer/Songwriter |
| Quiet Storm | Southern Rock |
| Soul | Surf |
| Soul Blues | Tex-Mex |
| Southern Soul | Time Lord Rock |
| Reggae | Singer/Songwriter |
| Dancehall | Alternative Folk |
| Dub | Contemporary Folk |
| Roots Reggae | Contemporary Singer/Songwriter |
| Ska | Indie Folk |
| Rock | Folk-Rock |
| Acid Rock | Love Song |

FIG. 33D

| |
|---|
| New Acoustic |
| Traditional Folk |
| Soundtrack |
| Foreign Cinema |
| Musicals |
| Original Score |
| Soundtrack |
| TV Soundtrack |
| Spoken Word |
| Tex-Mex / Tejano |
| Chicano |
| Classic |
| Conjunto |
| Conjunto Progressive |
| New Mex |
| Tex-Mex |
| Vocal |
| A cappella |
| Barbershop |
| Doo-wop |
| Gregorian Chant |
| Standards |
| Traditional Pop |
| Vocal Jazz |
| Vocal Pop |
| World |
| Africa |
| Afro-Beat |
| Afro-Pop |
| Asia |
| Australia |
| Cajun |
| Calypso |
| Caribbean |
| Celtic |
| Celtic Folk |

| |
|---|
| Contemporary Celtic |
| Dangdut |
| Drinking Songs |
| Drone |
| Europe |
| France |
| Hawaii |
| Indian Ghazal |
| Indian Pop |
| Japan |
| Japanese Pop |
| Klezmer |
| Middle East |
| North America |
| Ode |
| Polka |
| Soca |
| South Africa |
| South America |
| Traditional Celtic |
| Worldbeat |
| Zydeco |

FIG. 33E

SYSTEM NETWORK FOR SYSTEM DESIGNERS TO REMOTELY CONFIGURE THE PARAMETER TRANSFORMATION ENGINE SUBSYSTEM B51 IN THE AUTOMATED MUSIC AND COMPOSITION GENERATION ENGINE OF THE SYSTEM OF THE PRESENT INVENTION

GRAPHICAL USER INTERFACE (GUI) SUPPORTING THE CREATION AND MANAGEMENT OF PARAMETER CONFIGURATIONS WITHIN THE PARAMETER TRANSFORMATION ENGINE SUBSYSTEM B51 OF THE AUTOMATED MUSIC COMPOSITION AND GENERATION SYSTEM NETWORK OF THE PRESENT INVENTION

GRAPHICAL USER INTERFACE (GUI) SUPPORTING THE CREATION AND MANAGEMENT OF PARAMETER CONFIGURATIONS WITHIN THE PARAMETER TRANSFORMATION ENGINE SUBSYSTEM B51 OF THE AUTOMATED MUSIC COMPOSITION AND GENERATION SYSTEM NETWORK OF THE PRESENT INVENTION

| CREATING AND MANAGING PARAMETER MAPPING CONFIGURATIONS | |
|---|---|
| Manage Existing Parameter Mapping Configurations | Create New Parameter Mapping Configuration |
| HAPPY; POP; 32 Seconds | |
| SAD; POP; 60 Seconds | |
| HAPPY & FRIGHTENED; POP & CLASSICAL; 120 Seconds | |
| JOYFUL & NERVOUS; POP; 120 Seconds | |
| JOYFUL & NERVOUS; CLASSICAL; 120 Seconds | |
| JOYFUL & NERVOUS; COUNTRY; 120 Seconds | |
| JOYFUL & RUSHED; POP; 120 Seconds | |
| ANNOYED & PATIENT; JAZZ; 60 Seconds | |

FIG. 35B

GRAPHICAL USER INTERFACE (GUI) SUPPORTING THE CREATION AND MANAGEMENT OF PARAMETER CONFIGURATIONS WITHIN THE PARAMETER TRANSFORMATION ENGINE SUBSYSTEM B51 OF THE AUTOMATED MUSIC COMPOSITION AND GENERATION SYSTEM NETWORK OF THE PRESENT INVENTION

GRAPHICAL USER INTERFACE (GUI) SUPPORTING THE CREATION AND MANAGEMENT OF PARAMETER CONFIGURATIONS WITHIN THE PARAMETER TRANSFORMATION ENGINE SUBSYSTEM B51 OF THE AUTOMATED MUSIC COMPOSITION AND GENERATION SYSTEM NETWORK OF THE PRESENT INVENTION

CREATING AND MANAGING PARAMETER MAPPING CONFIGURATIONS

Manage Existing Parameter Mapping Configurations | Create New Parameter Mapping Configuration A Set of Emotion, Style & Timing Parameters From System Users → A Set of Probability-Based Music-Theoretic System Operating Parameters (SOP)

Parameter Transformation/Mapping Worksheet For System Users

| Emotional Descriptors | Style Descriptors | Time Descriptors |
|---|---|---|
| Happy | Pop | 4/4 Meter |
| Sad | Rock | 3/4 Meter |
| Love | Classical | 30 Seconds |
| Hate | Hip Hop | 60 Seconds |
| Fear | Indie | ABA |
| Excitement | Acoustic | ABC |
| ... | ... | ... |

Parameter Tables

B2-Length Generation Subsystem

| Length (Seconds) | ... | 20 | 25 | 30 | 35 | 40 | 45 | 50 | ... |
|---|---|---|---|---|---|---|---|---|---|
| Probability for UDID | ... | 0.1 | 0.1 | 0.1 | 0.1 | 0.1 | 0.1 | 0.1 | ... |

B3-Tempo Generation Subsystem

| Tempo (Beats Per Minute "BPM") | ... | 40 | 45 | 50 | 55 | 60 | 65 | 70 | 75 | 80 | ... |
|---|---|---|---|---|---|---|---|---|---|---|---|
| Probability for UDID | ... | 0.1 | 0.1 | 0.1 | 0.1 | 0.1 | 0.1 | 0.1 | 0.1 | 0.1 | ... |

B4-Meter Generation Subsystem

| Meter | ... | 2/4 | 3/4 | 4/4 | 6/8 | 12/8 | ... |
|---|---|---|---|---|---|---|---|
| Probability for UDID | ... | 0.1 | 0.1 | 0.6 | 0.1 | 0.1 | ... |

FIG. 36B

AUTOMATED MUSIC COMPOSITION AND GENERATION INSTRUMENT SYSTEM SUPPORTING SAMPLED-INSTRUMENT SYNTHESIS AND THE USE OF LINGUISTIC-BASED MUSICAL EXPERIENCE DESCRIPTORS AND LYRICAL WORD DESCRIPTIONS PRODUCED USING A TEXT KEYBOARD AND/OR A SPEECH RECOGNITION INTERFACE

AUTOMATED MUSIC COMPOSITION AND GENERATION INSTRUMENT SYSTEM SUPPORTING SAMPLED-INSTRUMENT SYNTHESIS AND THE USE OF LINGUISTIC-BASED MUSICAL EXPERIENCE DESCRIPTORS PRODUCED USING A TEXT KEYBOARD AND/OR A SPEECH RECOGNITION INTERFACE

THE REAL-TIME PITCH EVENT, RHYTHMIC AND PROSODIC ANALYSIS ON LYRICAL INPUT PROVIDED TO SUBSYSTEM B1

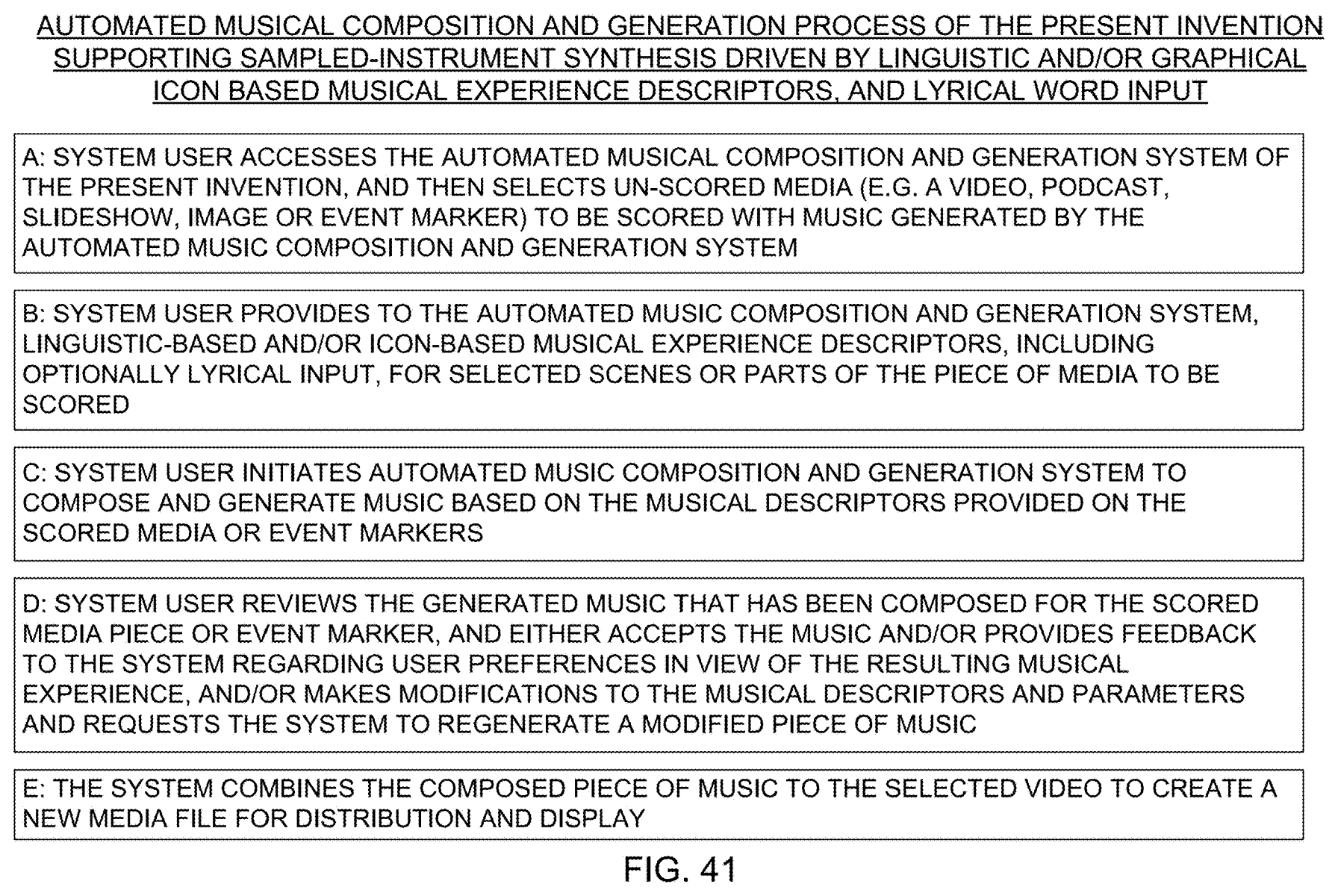

AUTOMATED MUSICAL COMPOSITION AND GENERATION PROCESS OF THE PRESENT INVENTION SUPPORTING SAMPLED-INSTRUMENT SYNTHESIS DRIVEN BY LINGUISTIC AND/OR GRAPHICAL ICON BASED MUSICAL EXPERIENCE DESCRIPTORS, AND LYRICAL WORD INPUT

A: SYSTEM USER ACCESSES THE AUTOMATED MUSICAL COMPOSITION AND GENERATION SYSTEM OF THE PRESENT INVENTION, AND THEN SELECTS UN-SCORED MEDIA (E.G. A VIDEO, PODCAST, SLIDESHOW, IMAGE OR EVENT MARKER) TO BE SCORED WITH MUSIC GENERATED BY THE AUTOMATED MUSIC COMPOSITION AND GENERATION SYSTEM

B: SYSTEM USER PROVIDES TO THE AUTOMATED MUSIC COMPOSITION AND GENERATION SYSTEM, LINGUISTIC-BASED AND/OR ICON-BASED MUSICAL EXPERIENCE DESCRIPTORS, INCLUDING OPTIONALLY LYRICAL INPUT, FOR SELECTED SCENES OR PARTS OF THE PIECE OF MEDIA TO BE SCORED

C: SYSTEM USER INITIATES AUTOMATED MUSIC COMPOSITION AND GENERATION SYSTEM TO COMPOSE AND GENERATE MUSIC BASED ON THE MUSICAL DESCRIPTORS PROVIDED ON THE SCORED MEDIA OR EVENT MARKERS

D: SYSTEM USER REVIEWS THE GENERATED MUSIC THAT HAS BEEN COMPOSED FOR THE SCORED MEDIA PIECE OR EVENT MARKER, AND EITHER ACCEPTS THE MUSIC AND/OR PROVIDES FEEDBACK TO THE SYSTEM REGARDING USER PREFERENCES IN VIEW OF THE RESULTING MUSICAL EXPERIENCE, AND/OR MAKES MODIFICATIONS TO THE MUSICAL DESCRIPTORS AND PARAMETERS AND REQUESTS THE SYSTEM TO REGENERATE A MODIFIED PIECE OF MUSIC

E: THE SYSTEM COMBINES THE COMPOSED PIECE OF MUSIC TO THE SELECTED VIDEO TO CREATE A NEW MEDIA FILE FOR DISTRIBUTION AND DISPLAY

FIG. 41

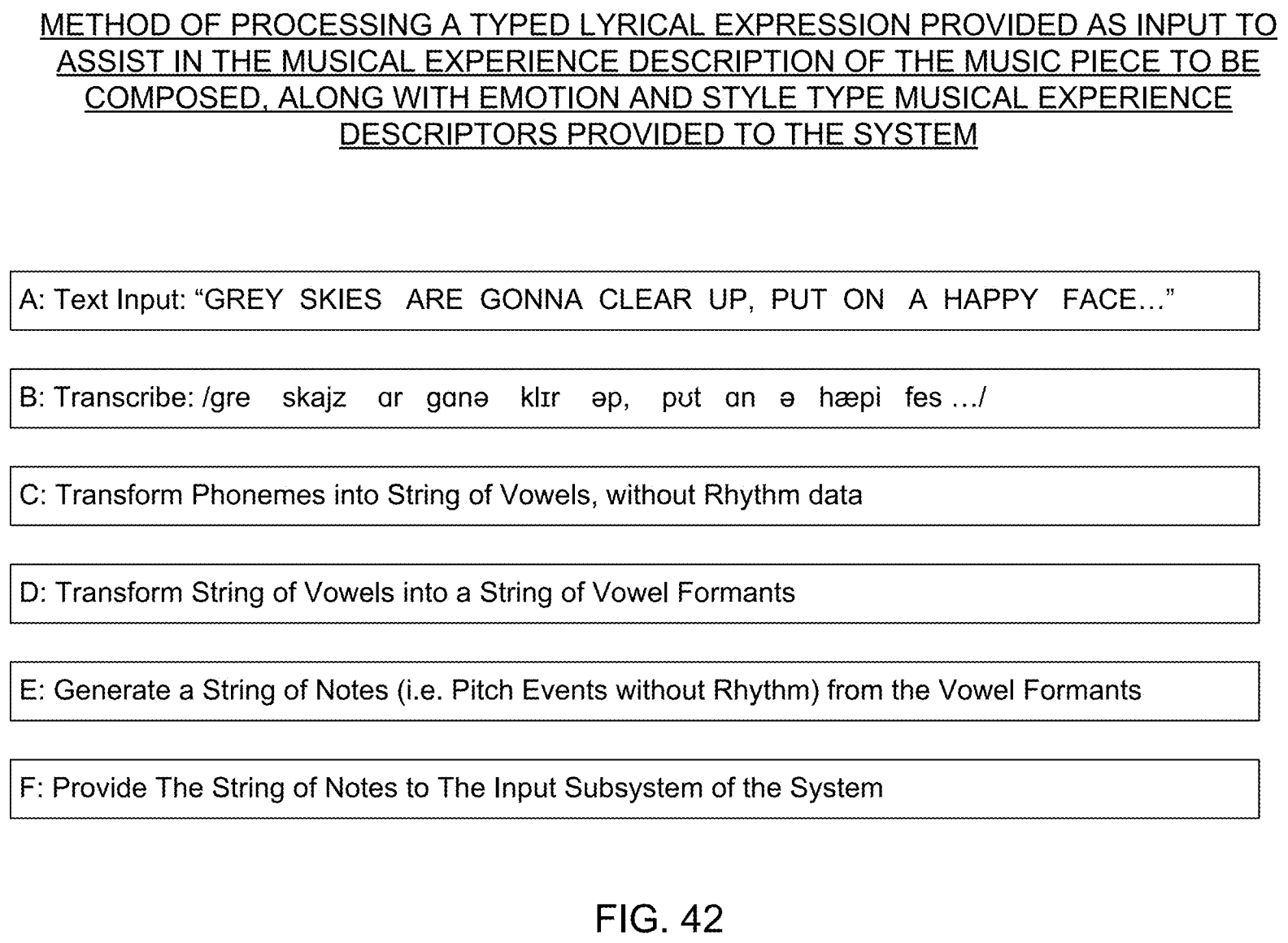

METHOD OF PROCESSING A TYPED LYRICAL EXPRESSION PROVIDED AS INPUT TO ASSIST IN THE MUSICAL EXPERIENCE DESCRIPTION OF THE MUSIC PIECE TO BE COMPOSED, ALONG WITH EMOTION AND STYLE TYPE MUSICAL EXPERIENCE DESCRIPTORS PROVIDED TO THE SYSTEM

A: Text Input: “GREY SKIES ARE GONNA CLEAR UP, PUT ON A HAPPY FACE…”

B: Transcribe: /gre skajz ɑr gɑnə klɪr əp, pʊt ɑn ə hæpi fes …/

C: Transform Phonemes into String of Vowels, without Rhythm data

D: Transform String of Vowels into a String of Vowel Formants

E: Generate a String of Notes (i.e. Pitch Events without Rhythm) from the Vowel Formants F: Provide The String of Notes to The Input Subsystem of the System

FIG. 42

METHOD OF PROCESSING A SPOKEN LYRICAL EXPRESSION PROVIDED AS INPUT TO ASSIST IN THE MUSICAL EXPERIENCE DESCRIPTION OF THE MUSIC PIECE TO BE COMPOSED, ALONG WITH EMOTION AND STYLE TYPE MUSICAL EXPERIENCE DESCRIPTORS PROVIDED TO THE SYSTEM

A: Spoken Input: “GREY SKIES ARE GONNA CLEAR UP, PUT ON A HAPPY FACE…”

B: Transcribe: /gre skajz ɑr gɑnə klɪr əp, pʊt ɑn ə hæpi fes …/

C: Transform Phonemes into String of Vowels, capturing Rhythm data

D: Transform String of Vowels into a String of Vowel Formants

E: Generate a String of Notes (i.e. Pitch Events with Rhythm) from the Vowel Formants F: Provide The String of Notes to The Input Subsystem of the System

FIG. 43

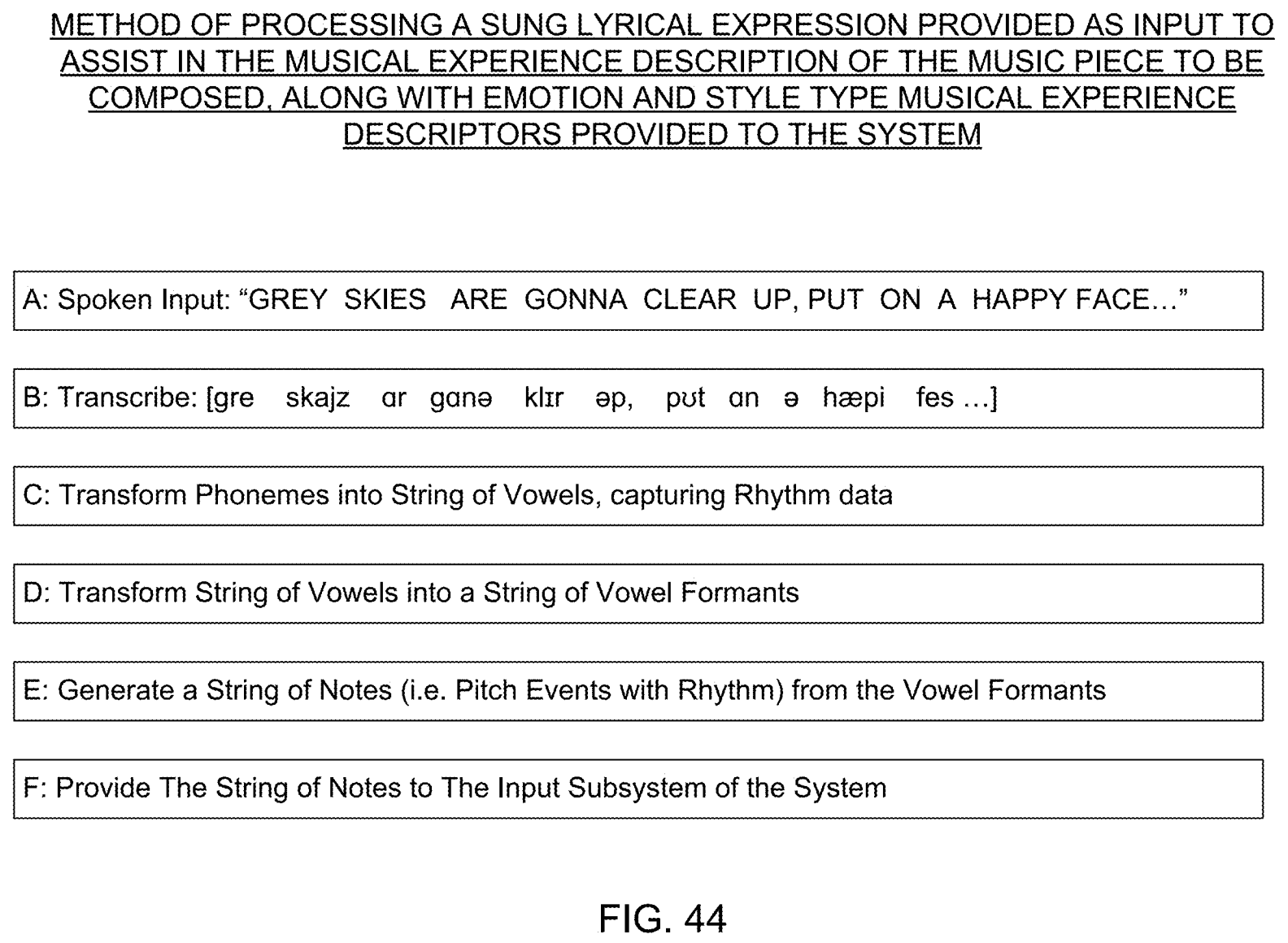

METHOD OF PROCESSING A SUNG LYRICAL EXPRESSION PROVIDED AS INPUT TO ASSIST IN THE MUSICAL EXPERIENCE DESCRIPTION OF THE MUSIC PIECE TO BE COMPOSED, ALONG WITH EMOTION AND STYLE TYPE MUSICAL EXPERIENCE DESCRIPTORS PROVIDED TO THE SYSTEM

A: Spoken Input: "GREY SKIES ARE GONNA CLEAR UP, PUT ON A HAPPY FACE…"

B: Transcribe: [gre skajz ɑr gɑnə klɪr əp, pʊt ɑn ə hæpi fes …]

C: Transform Phonemes into String of Vowels, capturing Rhythm data

D: Transform String of Vowels into a String of Vowel Formants

E: Generate a String of Notes (i.e. Pitch Events with Rhythm) from the Vowel Formants F: Provide The String of Notes to The Input Subsystem of the System

FIG. 44

THE SCORE OF MUSICAL NOTES AUTOMATICALLY RECOGNIZED WITHIN THE SUNG LYRICAL EXPRESSION AT BLOCK E IN FIG. 44 USING AUTOMATED VOWEL FORMANT ANALYSIS

Score

Put On A Happy Face

Charles Strouse

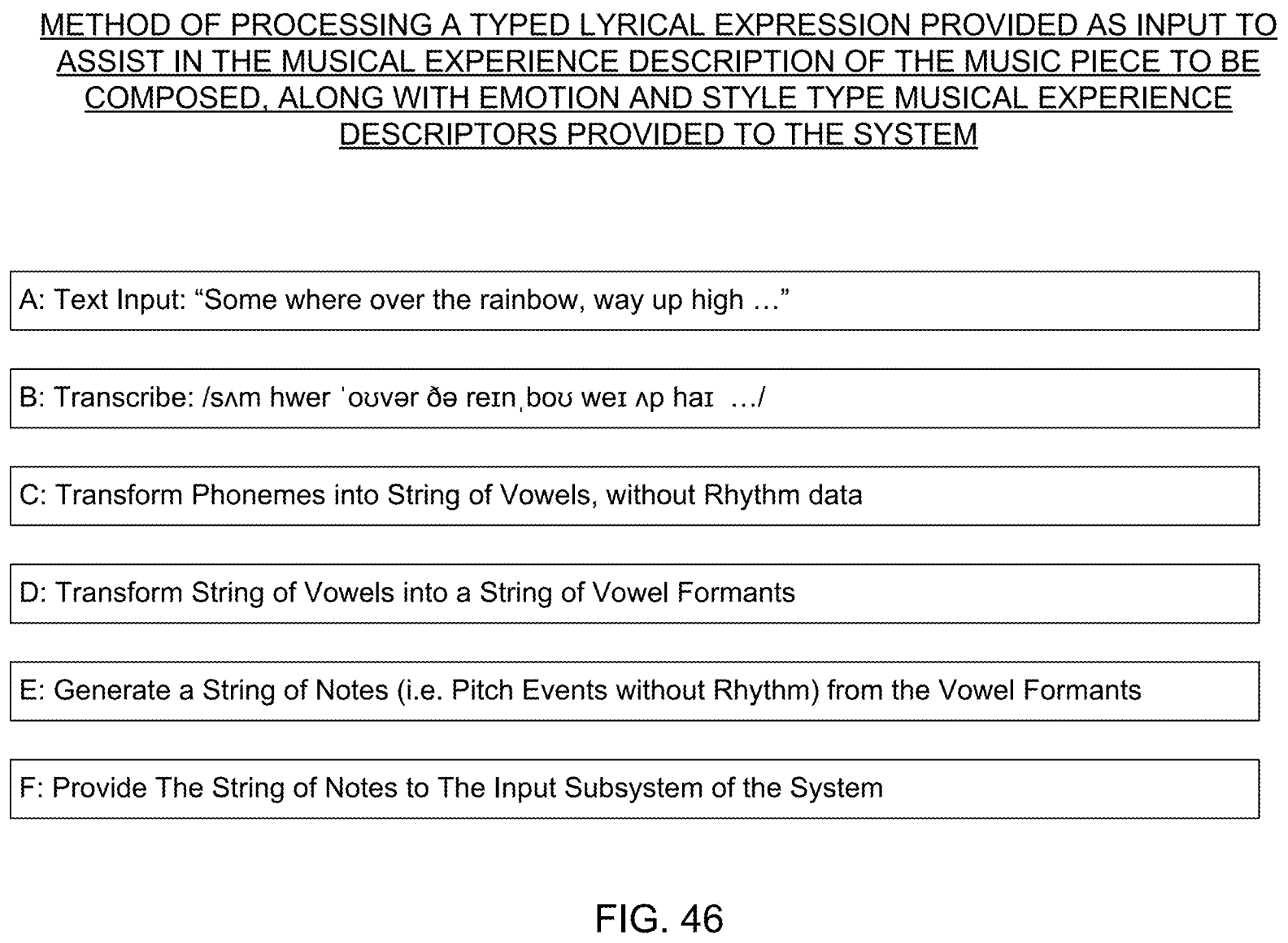

METHOD OF PROCESSING A TYPED LYRICAL EXPRESSION PROVIDED AS INPUT TO ASSIST IN THE MUSICAL EXPERIENCE DESCRIPTION OF THE MUSIC PIECE TO BE COMPOSED, ALONG WITH EMOTION AND STYLE TYPE MUSICAL EXPERIENCE DESCRIPTORS PROVIDED TO THE SYSTEM

A: Text Input: “Some where over the rainbow, way up high …”

B: Transcribe: /sʌm hwer ˈoʊvər ðə reɪnˌboʊ weɪ ʌp haɪ …/

C: Transform Phonemes into String of Vowels, without Rhythm data

D: Transform String of Vowels into a String of Vowel Formants

E: Generate a String of Notes (i.e. Pitch Events without Rhythm) from the Vowel Formants F: Provide The String of Notes to The Input Subsystem of the System

FIG. 46

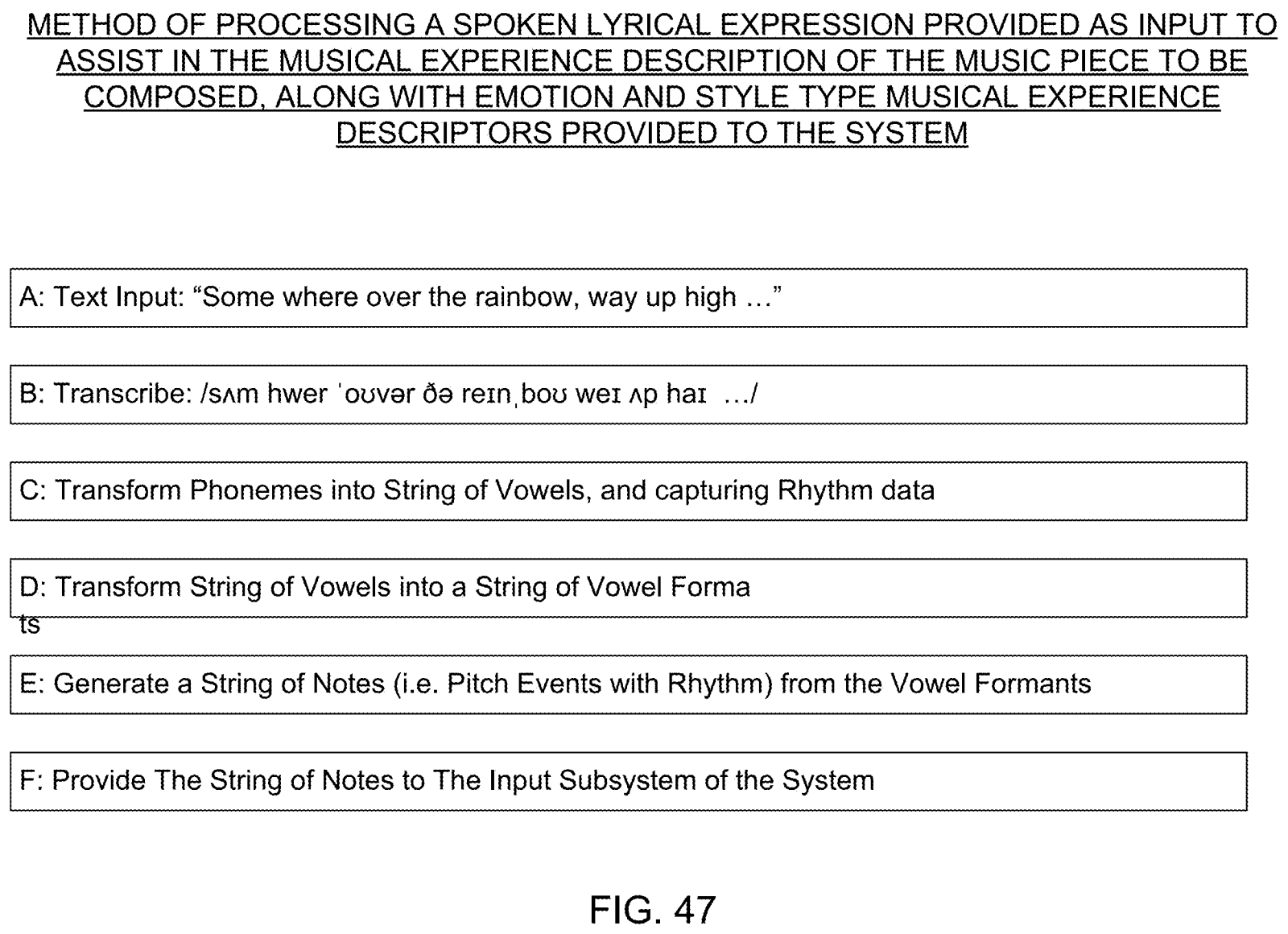

METHOD OF PROCESSING A SPOKEN LYRICAL EXPRESSION PROVIDED AS INPUT TO ASSIST IN THE MUSICAL EXPERIENCE DESCRIPTION OF THE MUSIC PIECE TO BE COMPOSED, ALONG WITH EMOTION AND STYLE TYPE MUSICAL EXPERIENCE DESCRIPTORS PROVIDED TO THE SYSTEM

A: Text Input: “Some where over the rainbow, way up high …”

B: Transcribe: /sʌm hwer ˈoʊvər ðə reɪnˌboʊ weɪ ʌp haɪ …/

C: Transform Phonemes into String of Vowels, and capturing Rhythm data

D: Transform String of Vowels into a String of Vowel Forma
ts

E: Generate a String of Notes (i.e. Pitch Events with Rhythm) from the Vowel Formants F: Provide The String of Notes to The Input Subsystem of the System

FIG. 47

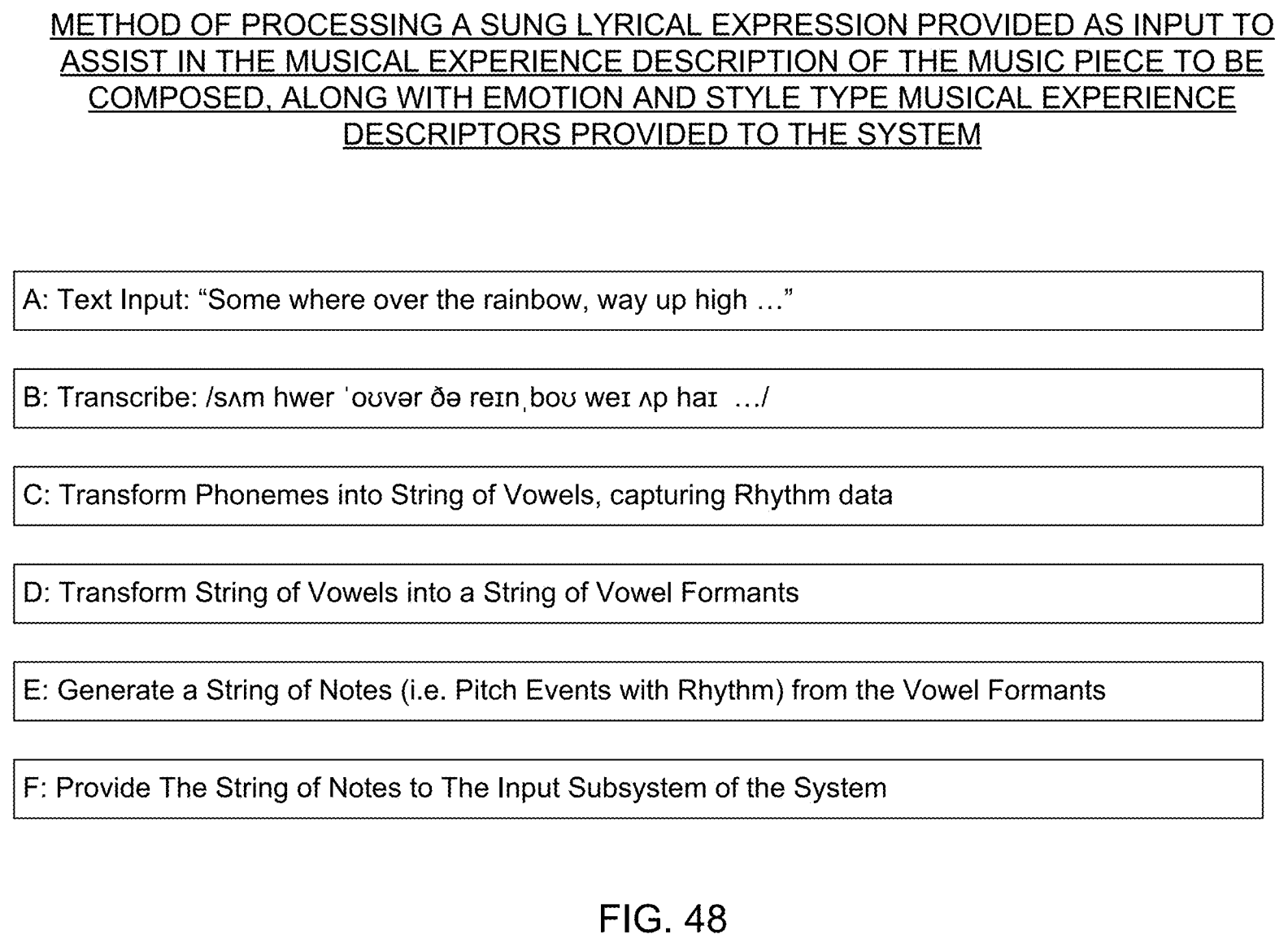

METHOD OF PROCESSING A SUNG LYRICAL EXPRESSION PROVIDED AS INPUT TO ASSIST IN THE MUSICAL EXPERIENCE DESCRIPTION OF THE MUSIC PIECE TO BE COMPOSED, ALONG WITH EMOTION AND STYLE TYPE MUSICAL EXPERIENCE DESCRIPTORS PROVIDED TO THE SYSTEM

A: Text Input: “Some where over the rainbow, way up high …”

B: Transcribe: /sʌm hwer ˈoʊvər ðə reɪnˌboʊ weɪ ʌp haɪ …/

C: Transform Phonemes into String of Vowels, capturing Rhythm data

D: Transform String of Vowels into a String of Vowel Formants

E: Generate a String of Notes (i.e. Pitch Events with Rhythm) from the Vowel Formants F: Provide The String of Notes to The Input Subsystem of the System

FIG. 48

THE SCORE OF MUSICAL NOTES AUTOMATICALLY RECOGNIZED WITHIN THE SUNG LYRICAL EXPRESSION AT BLOCK E IN FIG. 48 USING AUTOMATED VOWEL FORMANT ANALYSIS

Score

Somewhere Over The Rainbow

Harold Arlen

AUTOMATED MUSICAL COMPOSITION AND GENERATION PROCESS OF THE PRESENT INVENTION SUPPORTED BY THE ARCHITECTURE OF THE AUTOMATED MUSIC COMPOSITION AND GENERATION SYSTEM ILLUSTRATED IN FIGS. 26A THROUGH 26P

A: Using the system input and output subsystem A0 to receive emotion-type and style-type and optionally timing-type parameters as musical descriptors for the piece of music which the system user wishes to be automatically composed and generated by machine of the present invention.

B: General Rhythm Generation Subsystem A1 for generating the general rhythm for the piece of music being composed C: General Pitch Generation Subsystem A2 for generating chords for the piece of music being composed D: Using the Melody Rhythm Generation Subsystem A3 for generating a melody rhythm for the piece of music being composed E: Using the Melody Pitch Generation Subsystem A4 for generating a melody pitch for the piece of music being composed F: Using the Orchestration Subsystem A5 for generating the orchestration for the piece of music being composed G: Using the Controller Code Creation Subsystem A6 for creating controller code for the piece of music being composed H: Using the Digital Piece Creation Subsystem A7 for creating the digital piece of music being composed I: Using the Feedback and Learning Subsystem A8 for supporting the feedback and learning cycle of the system

FIG. 50

METHOD OF AND SYSTEM FOR SPOTTING DIGITAL MEDIA OBJECTS AND EVENT MARKERS USING MUSICAL EXPERIENCE DESCRIPTORS TO CHARACTERIZE DIGITAL MUSIC TO BE AUTOMATICALLY COMPOSED AND GENERATED BY AN AUTOMATED MUSIC COMPOSITION AND GENERATION ENGINE

RELATED CASES

The Present application is a Continuation of co-pending patent application Ser. No. 15/489,707 filed Apr. 17, 2017, which is a Continuation of U.S. patent application Ser. No. 14/869,911 filed Sep. 29, 2015, now U.S. Pat. No. 9,721,551 granted on Apr. 1, 2017, which are commonly and owned by Amper Music, Inc., and incorporated herein by reference as if fully set forth herein.

BACKGROUND OF INVENTION

Field of Invention

The present invention relates to new and improved methods of and apparatus for helping individuals, groups of individuals, as well as children and businesses alike, to create original music for various applications, without having special knowledge in music theory or practice, as generally required by prior art technologies.

Brief Overview of the State of Knowledge and Skill in the Art

It is very difficult for video and graphics art creators to find the right music for their content within the time, legal, and budgetary constraints that they face. Further, after hours or days searching for the right music, licensing restrictions, non-exclusivity, and inflexible deliverables often frustrate the process of incorporating the music into digital content. In their projects, content creators often use “Commodity Music” which is music that is valued for its functional purpose but, unlike “Artistic Music”, not for the creativity and collaboration that goes into making it.

Currently, the Commodity Music market is $3 billion and growing, due to the increased amount of content that uses Commodity Music being created annually, and the technology-enabled surge in the number of content creators. From freelance video editors, producers, and consumer content creators to advertising and digital branding agencies and other professional content creation companies, there has been an extreme demand for a solution to the problem of music discovery and incorporation in digital media.

Indeed, the use of computers and algorithms to help create and compose music has been pursued by many for decades, but not with any great success. In his 2000 landmark book, “The Algorithmic Composer,” David Cope surveyed the state of the art back in 2000, and described his progress in “algorithmic composition”, as he put it, including his progress developing his interactive music composition system called ALICE (ALgorithmically Integrated Composing Environment).

In this celebrated book, David Cope described how his ALICE system could be used to assist composers in composing and generating new music, in the style of the composer, and extract musical intelligence from prior music that has been composed, to provide a useful level of assistance which composers had not had before. David Cope has advanced his work in this field over the past 15 years, and his impressive body of work provides musicians with many interesting tools for augmenting their capacities to generate music in accordance with their unique styles, based on best efforts to extract musical intelligence from the artist’s music compositions. However, such advancements have clearly fallen short of providing any adequate way of enabling non-musicians to automatically compose and generate unique pieces of music capable of meeting the needs and demands of the rapidly growing commodity music market.

Furthermore, over the past few decades, numerous music composition systems have been proposed and/or developed, employing diverse technologies, such as hidden Markov models, generative grammars, transition networks, chaos and self-similarity (fractals), genetic algorithms, cellular automata, neural networks, and artificial intelligence (AI) methods. While many of these systems seek to compose music with computer-algorithmic assistance, some even seem to compose and generate music in an automated manner.

However, the quality of the music produced by such automated music composition systems has been quite poor to find acceptable usage in commercial markets, or consumer markets seeking to add value to media-related products, special events and the like. Consequently, the dream for machines to produce wonderful music has hitherto been unfulfilled, despite the efforts by many to someday realize the same.

Consequently, many compromises have been adopted to make use of computer or machine assisted music composition suitable for use and sale in contemporary markets.

For example, in U.S. Pat. No. 7,754,959 entitled “System and Method of Automatically Creating An Emotional Controlled Soundtrack” by Herberger et al. (assigned to Magix AG) provides a system for enabling a user of digital video editing software to automatically create an emotionally controlled soundtrack that is matched in overall emotion or mood to the scenes in the underlying video work. As disclosed, the user will be able to control the generation of the soundtrack by positioning emotion tags in the video work that correspond to the general mood of each scene. The subsequent soundtrack generation step utilizes these tags to prepare a musical accompaniment to the video work that generally matches its on-screen activities, and which uses a plurality of prerecorded loops (and tracks) each of which has at least one musical style associated therewith. As disclosed, the moods associated with the emotion tags are selected from the group consisting of happy, sad, romantic, excited, scary, tense, frantic, contemplative, angry, nervous, and ecstatic. As disclosed, the styles associated with the plurality of prerecorded music loops are selected from the group consisting of rock, swing, jazz, waltz, disco, Latin, country, gospel, ragtime, calypso, reggae, oriental, rhythm and blues, salsa, hip hop, rap, samba, zydeco, blues and classical.

While the general concept of using emotion tags to score frames of media is compelling, the automated methods and apparatus for composing and generating pieces of music, as disclosed and taught by Herberger et al. in U.S. Pat. No. 7,754,959, is neither desirable or feasible in most environments and makes this system too limited for useful application in almost any commodity music market.

At the same time, there are a number of companies who are attempting to meet the needs of the rapidly growing commodity music market, albeit, without much success.

Overview of the XHail System by Score Music Interactive

In particular, Score Music Interactive (trading as Xhail) based in Market Square, Gorey, in Wexford County, Ireland provides the XHail system which allows users to create novel combinations of prerecorded audio loops and tracks, along the lines proposed in U.S. Pat. No. 7,754,959.

Currently available as beta web-based software, the XHail system allows musically literate individuals to create unique combinations of pre-existing music loops, based on descriptive tags. To reasonably use the XHail system, a user must understand the music creation process, which includes, but is not limited to, (i) knowing what instruments work well when played together, (ii) knowing how the audio levels of instruments should be balanced with each other, (iii) knowing how to craft a musical contour with a diverse palette of instruments, (iv) knowing how to identifying each possible instrument or sound and audio generator, which includes, but is not limited to, orchestral and synthesized instruments, sound effects, and sound wave generators, and (v) possessing standard or average level of knowledge in the field of music.

While the XHail system seems to combine pre-existing music loops into internally-novel combinations at an abrupt pace, much time and effort is required in order to modify the generated combination of pre-existing music loops into an elegant piece of music. Additional time and effort is required to sync the music combination to a pre-existing video. As the XHail system uses pre-created "music loops" as the raw material for its combination process, it is limited by the quantity of loops in its system database and by the quality of each independently created music loop. Further, as the ownership, copyright, and other legal designators of original creativity of each loop are at least partially held by the independent creators of each loop, and because XHail does not control and create the entire creation process, users of the XHail system have legal and financial obligations to each of its loop creators each time a pre-exiting loop is used in a combination.

While the XHail system appears to be a possible solution to music discovery and incorporation, for those looking to replace a composer in the content creation process, it is believed that those desiring to create Artistic Music will always find an artist to create it and will not forfeit the creative power of a human artist to a machine, no matter how capable it may be. Further, the licensing process for the created music is complex, the delivery materials are inflexible, an understanding of music theory and current music software is required for full understanding and use of the system, and perhaps most importantly, the XHail system has no capacity to learn and improve on a user-specific and/or user-wide basis.

Overview of the Scorify System by Jukedeck

The Scorify System by Jukedeck based in London, England, and founded by Cambridge graduates Ed Rex and Patrick Stobbs, uses artificial intelligence (AI) to generate unique, copyright-free pieces of music for everything from YouTube videos to games and lifts. The Scorify system allows video creators to add computer-generated music to their video. The Scorify System is limited in the length of pre-created video that can be used with its system. Scorify's only user inputs are basic style/genre criteria. Currently, Scorify's available styles are: Techno, Jazz, Blues, 8-Bit, and Simple, with optional sub-style instrument designation, and general music tempo guidance. By requiring users to select specific instruments and tempo designations, the Scorify system inherently requires its users to understand classical music terminology and be able to identify each possible instrument or sound and audio generator, which includes, but is not limited to, orchestral and synthesized instruments, sound effects, and sound wave generators.

The Scorify system lacks adequate provisions that allow any user to communicate his or her desires and/or intentions, regarding the piece of music to be created by the system. Further, the audio quality of the individual instruments supported by the Scorify system remains well below professional standards.

Further, the Scorify system does not allow a user to create music independently of a video, to create music for any media other than a video, and to save or access the music created with a video independently of the content with which it was created.

While the Scorify system appears to provide an extremely elementary and limited solution to the market's problem, the system has no capacity for learning and improving on a user-specific and/or user-wide basis. Also, the Scorify system and music delivery mechanism is insufficient to allow creators to create content that accurately reflects their desires and there is no way to edit or improve the created music, either manually or automatically, once it exists.

Overview of the SonicFire Pro System by SmartSound

The SonicFire Pro system by SmartSound out of Beaufort, S.C., USA allows users to purchase and use pre-created music for their video content. Currently available as a web-based and desktop-based application, the SonicFire Pro System provides a Stock Music Library that uses pre-created music, with limited customizability options for its users. By requiring users to select specific instruments and volume designations, the SonicFire Pro system inherently requires its users to have the capacity to (i) identify each possible instrument or sound and audio generator, which includes, but is not limited to, orchestral and synthesized instruments, sound effects, and sound wave generators, and (ii) possess professional knowledge of how each individual instrument should be balanced with every other instrument in the piece. As the music is pre-created, there are limited "Variations" options to each piece of music. Further, because each piece of music is not created organically (i.e. on a note-by-note and/or chord/by-chord basis) for each user, there is a finite amount of music offered to a user. The process is relatively arduous and takes a significant amount of time in selecting a pre-created piece of music, adding limited-customizability features, and then designating the length of the piece of music.

The SonicFire Pro system appears to provide a solution to the market, limited by the amount of content that can be created, and a floor below which the price which the previously-created music cannot go for economic sustenance reasons. Further, with a limited supply of content, the music for each user lacks uniqueness and complete customizability. The SonicFire Pro system does not have any capacity for self-learning or improving on a user-specific and/or user-wide basis. Moreover, the process of using the software to discover and incorporate previously created music can take a significant amount of time, and the resulting discovered music remains limited by stringent licensing and legal requirements, which are likely to be created by using previously-created music.

Other Stock Music Libraries

Stock Music Libraries are collections of pre-created music, often available online, that are available for license. In these Music Libraries, pre-created music is usually tagged with relevant descriptors to allow users to search for a piece of music by keyword. Most glaringly, all stock music (sometimes referred to as "Royalty Free Music") is pre-created and lacks any user input into the creation of the music. Users must browse what can be hundreds and thousands of individual audio tracks before finding the appropriate piece of music for their content.

Additional examples of stock music containing and exhibiting very similar characteristics, capabilities, limitations, shortcomings, and drawbacks of SmartSound's SonicFire Pro System, include, for example, Audio Socket, Free Music Archive, Friendly Music, Rumble Fish, and Music Bed.

The prior art described above addresses the market need for Commodity Music only partially, as the length of time to discover the right music, the licensing process and cost to incorporate the music into content, and the inflexible delivery options (often a single stereo audio file) serve as a woefully inadequate solution.

Further, the requirement of a certain level of music theory background and/or education adds a layer of training necessary for any content creator to use the current systems to their full potential.

Moreover, the prior art systems described above are static systems that do not learn, adapt, and self-improve as they are used by others, and do not come close to offering "white glove" service comparable to that of the experience of working with a professional composer.

In view, therefore, of the prior art and its shortcomings and drawbacks, there is a great need in the art for a new and improved information processing systems and methods that enable individuals, as well as other information systems, without possessing any musical knowledge, theory or expertise, to automatically compose and generate music pieces for use in scoring diverse kinds of media products, as well as supporting and/or celebrating events, organizations, brands, families and the like as the occasion may suggest or require, while overcoming the shortcomings and drawbacks of prior art systems, methods and technologies.

SUMMARY AND OBJECTS OF THE PRESENT INVENTION

Accordingly, a primary object of the present invention is to provide a new and improved Automated Music Composition And Generation System and Machine, and information processing architecture that allows anyone, without possessing any knowledge of music theory or practice, or expertise in music or other creative endeavors, to instantly create unique and professional-quality music, with the option, but not requirement, of being synchronized to any kind of media content, including, but not limited to, video, photography, slideshows, and any pre-existing audio format, as well as any object, entity, and/or event.

Another object of the present invention is to provide such Automated Music Composition And Generation System, wherein the system user only requires knowledge of ones own emotions and/or artistic concepts which are to be expressed musically in a piece of music that will be ultimately composed by the Automated Composition And Generation System of the present invention.

Another object of the present invention is to provide an Automated Music Composition and Generation System that supports a novel process for creating music, completely changing and advancing the traditional compositional process of a professional media composer.

Another object of the present invention is to provide a novel process for creating music using an Automated Music Composition and Generation System that intuitively makes all of the musical and non-musical decisions necessary to create a piece of music and learns, codifies, and formalizes the compositional process into a constantly learning and evolving system that drastically improves one of the most complex and creative human endeavors—the composition and creation of music.

Another object of the present invention is to provide a novel process for composing and creating music an using automated virtual-instrument music synthesis technique driven by musical experience descriptors and time and space (T&S) parameters supplied by the system user, so as to automatically compose and generate music that rivals that of a professional music composer across any comparative or competitive scope.

Another object of the present invention is to provide an Automated Music Composition and Generation System, wherein the musical spirit and intelligence of the system is embodied within the specialized information sets, structures and processes that are supported within the system in accordance with the information processing principles of the present invention.

Another object of the present invention is to provide an Automated Music Composition and Generation System, wherein automated learning capabilities are supported so that the musical spirit of the system can transform, adapt and evolve over time, in response to interaction with system users, which can include individual users as well as entire populations of users, so that the musical spirit and memory of the system is not limited to the intellectual and/or emotional capacity of a single individual, but rather is open to grow in response to the transformative powers of all who happen to use and interact with the system.

Another object of the present invention is to provide a new and improved Automated Music Composition and Generation system that supports a highly intuitive, natural, and easy to use graphical interface (GUI) that provides for very fast music creation and very high product functionality.

Another object of the present invention is to provide a new and improved Automated Music Composition and Generation System that allows system users to be able to describe, in a manner natural to the user, including, but not limited to text, image, linguistics, speech, menu selection, time, audio file, video file, or other descriptive mechanism, what the user wants the music to convey, and/or the preferred style of the music, and/or the preferred timings of the music, and/or any single, pair, or other combination of these three input categories.

Another object of the present invention is to provide an Automated Music Composition and Generation Process supporting automated virtual-instrument music synthesis driven by linguistic and/or graphical icon based musical experience descriptors supplied by the system user, wherein linguistic-based musical experience descriptors, and a video, audio-recording, image, or event marker, supplied as input through the system user interface, and are used by the Automated Music Composition and Generation Engine of the present invention to generate musically-scored media (e.g. video, podcast, image, slideshow etc.) or event marker using virtual-instrument music synthesis, which is then supplied back to the system user via the system user interface.

Another object of the present invention is to provide an Automated Music Composition and Generation System supporting the use of automated virtual-instrument music synthesis driven by linguistic and/or graphical icon based musical experience descriptors supplied by the system user, wherein (i) during the first step of the process, the system user accesses the Automated Music Composition and Generation System, and then selects a video, an audio-recording (e.g. a podcast), a slideshow, a photograph or image, or an event marker to be scored with music generated by the Automated Music Composition and Generation System, (ii) the system user then provides linguistic-based and/or icon-based musical experience descriptors to its Automated Music Composition and Generation Engine, (iii) the system user initiates the Automated Music Composition and Generation System to compose and generate music using an automated virtual-instrument music synthesis method based on inputted musical descriptors that have been scored on (i.e. applied to) selected media or event markers by the system user, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display/performance.

Another object of the present invention is to provide an Automated Music Composition and Generation Instrument System supporting automated virtual-instrument music synthesis driven by linguistic-based musical experience descriptors produced using a text keyboard and/or a speech recognition interface provided in a compact portable housing that can be used in almost any conceivable user application.

Another object of the present invention is to provide a toy instrument supporting Automated Music Composition and Generation Engine supporting automated virtual-instrument music synthesis driven by icon-based musical experience descriptors selected by the child or adult playing with the toy instrument, wherein a touch screen display is provided for the system user to select and load videos from a video library maintained within storage device of the toy instrument, or from a local or remote video file server connected to the Internet, and children can then select musical experience descriptors (e.g. emotion descriptor icons and style descriptor icons) from a physical or virtual keyboard or like system interface, so as to allow one or more children to compose and generate custom music for one or more segmented scenes of the selected video.

Another object is to provide an Automated Toy Music Composition and Generation Instrument System, wherein graphical-icon based musical experience descriptors, and a video are selected as input through the system user interface (i.e. touch-screen keyboard) of the Automated Toy Music Composition and Generation Instrument System and used by its Automated Music Composition and Generation Engine to automatically generate a musically-scored video story that is then supplied back to the system user, via the system user interface, for playback and viewing.

Another object of the present invention is to provide an Electronic Information Processing and Display System, integrating a SOC-based Automated Music Composition and Generation Engine within its electronic information processing and display system architecture, for the purpose of supporting the creative and/or entertainment needs of its system users.

Another object of the present invention is to provide a SOC-based Music Composition and Generation System supporting automated virtual-instrument music synthesis driven by linguistic and/or graphical icon based musical experience descriptors, wherein linguistic-based musical experience descriptors, and a video, audio file, image, slideshow, or event marker, are supplied as input through the system user interface, and used by the Automated Music Composition and Generation Engine to generate musically-scored media (e.g. video, podcast, image, slideshow etc.) or event marker, that is then supplied back to the system user via the system user interface.

Another object of the present invention is to provide an Enterprise-Level Internet-Based Music Composition And Generation System, supported by a data processing center with web servers, application servers and database (RDBMS) servers operably connected to the infrastructure of the Internet, and accessible by client machines, social network servers, and web-based communication servers, and allowing anyone with a web-based browser to access automated music composition and generation services on websites (e.g. on YouTube, Vimeo, etc.), social-networks, social-messaging networks (e.g. Twitter) and other Internet-based properties, to allow users to score videos, images, slide-shows, audio files, and other events with music automatically composed using virtual-instrument music synthesis techniques driven by linguistic-based musical experience descriptors produced using a text keyboard and/or a speech recognition interface.

Another object of the present invention is to provide an Automated Music Composition and Generation Process supported by an enterprise-level system, wherein (i) during the first step of the process, the system user accesses an Automated Music Composition and Generation System, and then selects a video, an audio-recording (i.e. podcast), slideshow, a photograph or image, or an event marker to be scored with music generated by the Automated Music Composition and Generation System, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv) the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Another object of the present invention is to provide an Internet-Based Automated Music Composition and Generation Platform that is deployed so that mobile and desktop client machines, using text, SMS and email services supported on the Internet, can be augmented by the addition of composed music by users using the Automated Music Composition and Generation Engine of the present invention, and graphical user interfaces supported by the client machines while creating text, SMS and/or email documents (i.e. messages) so that the users can easily select graphic and/or linguistic based emotion and style descriptors for use in generating compose music pieces for such text, SMS and email messages.

Another object of the present invention is a mobile client machine (e.g. Internet-enabled smartphone or tablet computer) deployed in a system network supporting the Automated Music Composition and Generation Engine of the present invention, where the client machine is realized as a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a client application is running that provides the user with a virtual keyboard supporting the creation of a web-based (i.e.

html) document, and the creation and insertion of a piece of composed music created by selecting linguistic and/or graphical-icon based emotion descriptors, and style-descriptors, from a menu screen, so that the music piece can be delivered to a remote client and experienced using a conventional web-browser operating on the embedded URL, from which the embedded music piece is being served by way of web, application and database servers.

Another object of the present invention is to provide an Internet-Based Automated Music Composition and Generation System supporting the use of automated virtual-instrument music synthesis driven by linguistic and/or graphical icon based musical experience descriptors so as to add composed music to text, SMS and email documents/messages, wherein linguistic-based or icon-based musical experience descriptors are supplied by the system user as input through the system user interface, and used by the Automated Music Composition and Generation Engine to generate a musically-scored text document or message that is generated for preview by system user via the system user interface, before finalization and transmission.

Another object of the present invention is to provide an Automated Music Composition and Generation Process using a Web-based system supporting the use of automated virtual-instrument music synthesis driven by linguistic and/or graphical icon based musical experience descriptors so to automatically and instantly create musically-scored text, SMS, email, PDF, Word and/or HTML documents, wherein (i) during the first step of the process, the system user accesses the Automated Music Composition and Generation System, and then selects a text, SMS or email message or Word, PDF or HTML document to be scored (e.g. augmented) with music generated by the Automated Music Composition and Generation System, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected messages or documents, (iv) the system user accepts composed and generated music produced for the message or document, or rejects the music and provides feedback to the system, including providing different musical experience descriptors and a request to re-compose music based on the updated musical experience descriptor inputs, and (v) the system combines the accepted composed music with the message or document, so as to create a new file for distribution and display.

Another object of the present invention is to provide an AI-Based Autonomous Music Composition, Generation and Performance System for use in a band of human musicians playing a set of real and/or synthetic musical instruments, employing a modified version of the Automated Music Composition and Generation Engine, wherein the AI-based system receives musical signals from its surrounding instruments and musicians and buffers and analyzes these instruments and, in response thereto, can compose and generate music in real-time that will augment the music being played by the band of musicians, or can record, analyze and compose music that is recorded for subsequent playback, review and consideration by the human musicians.

Another object of the present invention is to provide an Autonomous Music Analyzing, Composing and Performing Instrument having a compact rugged transportable housing comprising a LCD touch-type display screen, a built-in stereo microphone set, a set of audio signal input connectors for receiving audio signals produced from the set of musical instruments in the system environment, a set of MIDI signal input connectors for receiving MIDI input signals from the set of instruments in the system environment, audio output signal connector for delivering audio output signals to audio signal preamplifiers and/or amplifiers, WIFI and BT network adapters and associated signal antenna structures, and a set of function buttons for the user modes of operation including (i) LEAD mode, where the instrument system autonomously leads musically in response to the streams of music information it receives and analyzes from its (local or remote) musical environment during a musical session, (ii) FOLLOW mode, where the instrument system autonomously follows musically in response to the music it receives and analyzes from the musical instruments in its (local or remote) musical environment during the musical session, (iii) COMPOSE mode, where the system automatically composes music based on the music it receives and analyzes from the musical instruments in its (local or remote) environment during the musical session, and (iv) PERFORM mode, where the system autonomously performs automatically composed music, in real-time, in response to the musical information received and analyzed from its environment during the musical session.

Another object of the present invention is to provide an Automated Music Composition and Generation Instrument System, wherein audio signals as well as MIDI input signals are produced from a set of musical instruments in the system environment are received by the instrument system, and these signals are analyzed in real-time, on the time and/or frequency domain, for the occurrence of pitch events and melodic and rhythmic structure so that the system can automatically abstract musical experience descriptors from this information for use in generating automated music composition and generation using the Automated Music Composition and Generation Engine of the present invention.

Another object of the present invention is to provide an Automated Music Composition and Generation Process using the system, wherein (i) during the first step of the process, the system user selects either the LEAD or FOLLOW mode of operation for the Automated Musical Composition and Generation Instrument System, (ii) prior to the session, the system is then is interfaced with a group of musical instruments played by a group of musicians in a creative environment during a musical session, (iii) during the session, the system receives audio and/or MIDI data signals produced from the group of instruments during the session, and analyzes these signals for pitch and rhythmic data and melodic structure, (iv) during the session, the system automatically generates musical descriptors from abstracted pitch, rhythmic and melody data, and uses the musical experience descriptors to compose music for each session on a real-time basis, and (v) in the event that the PERFORM mode has been selected, the system automatically generates music composed for the session, and in the event that the COMPOSE mode has been selected, the music composed during the session is stored for subsequent access and review by the group of musicians.

Another object of the present invention is to provide a novel Automated Music Composition and Generation System, supporting virtual-instrument music synthesis and the use of linguistic-based musical experience descriptors and lyrical (LYRIC) or word descriptions produced using a text keyboard and/or a speech recognition interface, so that system users can further apply lyrics to one or more scenes in a video that are to be emotionally scored with composed music in accordance with the principles of the present invention.

Another object of the present invention is to provide such an Automated Music Composition and Generation System supporting virtual-instrument music synthesis driven by graphical-icon based musical experience descriptors selected by the system user with a real or virtual keyboard interface, showing its various components, such as multi-core CPU, multi-core GPU, program memory (DRAM), video memory (VRAM), hard drive, LCD/touch-screen display panel, microphone/speaker, keyboard, WIFI/Bluetooth network adapters, pitch recognition module/board, and power supply and distribution circuitry, integrated around a system bus architecture.

Another object of the present invention is to provide such an Automated Music Composition and Generation System, wherein linguistic and/or graphics based musical experience descriptors, including lyrical input, and other media (e.g. a video recording, live video broadcast, video game, slide-show, audio recording, or event marker) are selected as input through a system user interface (i.e. touch-screen keyboard), wherein the media can be automatically analyzed by the system to extract musical experience descriptors (e.g. based on scene imagery and/or information content), and thereafter used by its Automated Music Composition and Generation Engine to generate musically-scored media that is then supplied back to the system user via the system user interface or other means.

Another object of the present invention is to provide such an Automated Music Composition and Generation System, wherein a system user interface is provided for transmitting typed, spoken or sung words or lyrical input provided by the system user to a subsystem where the real-time pitch event, rhythmic and prosodic analysis is performed to automatically captured data that is used to modify the system operating parameters in the system during the music composition and generation process of the present invention.

Another object of the present invention is to provide such an Automated Music Composition and Generation Process, wherein the primary steps involve supporting the use of linguistic musical experience descriptors, (optionally lyrical input), and virtual-instrument music synthesis, wherein (i) during the first step of the process, the system user accesses the Automated Music Composition and Generation System and then selects media to be scored with music generated by its Automated Music Composition and Generation Engine, (ii) the system user selects musical experience descriptors (and optionally lyrics) provided to the Automated Music Composition and Generation Engine of the system for application to the selected media to be musically-scored, (iii) the system user initiates the Automated Music Composition and Generation Engine to compose and generate music based on the provided musical descriptors scored on selected media, and (iv) the system combines the composed music with the selected media so as to create a composite media file for display and enjoyment.

Another object of the present invention is to provide an Automated Music Composition and Generation Engine comprises a system architecture that is divided into two very high-level "musical landscape" categorizations, namely: (i) a Pitch Landscape Subsystem C0 comprising the General Pitch Generation Subsystem A2, the Melody Pitch Generation Subsystem A4, the Orchestration Subsystem A5, and the Controller Code Creation Subsystem A6; and (ii) a Rhythmic Landscape Subsystem comprising the General Rhythm Generation Subsystem A1, Melody Rhythm Generation Subsystem A3, the Orchestration Subsystem A5, and the Controller Code Creation Subsystem A6.

Another object of the present invention is to provide an Automated Music Composition and Generation Engine comprises a system architecture including a user GUI-based Input Output Subsystem A0, a General Rhythm Subsystem A1, a General Pitch Generation Subsystem A2, a Melody Rhythm Generation Subsystem A3, a Melody Pitch Generation Subsystem A4, an Orchestration Subsystem A5, a Controller Code Creation Subsystem A6, a Digital Piece Creation Subsystem A7, and a Feedback and Learning Subsystem A8.

Another object of the present invention is to provide an Automated Music Composition and Generation System comprising a plurality of subsystems integrated together, wherein a User GUI-based input output subsystem (B0) allows a system user to select one or more musical experience descriptors for transmission to the descriptor parameter capture subsystem B1 for processing and transformation into probability-based system operating parameters which are distributed to and loaded in tables maintained in the various subsystems within the system, and subsequent subsystem set up and use during the automated music composition and generation process of the present invention.

Another object of the present invention is to provide an Automated Music Composition and Generation System comprising a plurality of subsystems integrated together, wherein a descriptor parameter capture subsystem (B1) is interfaced with the user GUI-based input output subsystem for receiving and processing selected musical experience descriptors to generate sets of probability-based system operating parameters for distribution to parameter tables maintained within the various subsystems therein.

Another object of the present invention is to provide such an Automated Music Composition and Generation System, wherein a Style Parameter Capture Subsystem (B37) is used in an Automated Music Composition and Generation Engine, wherein the system user provides the exemplary "style-type" musical experience descriptor—POP, for example—to the Style Parameter Capture Subsystem for processing and transformation within the parameter transformation engine, to generate probability-based parameter tables that are then distributed to various subsystems therein, and subsequent subsystem set up and use during the automated music composition and generation process of the present invention.

Another object of the present invention is to provide such an Automated Music Composition and Generation System, wherein a Timing Parameter Capture Subsystem (B40) is used in the Automated Music Composition and Generation Engine, wherein the Timing Parameter Capture Subsystem (B40) provides timing parameters to the Timing Generation Subsystem (B41) for distribution to the various subsystems in the system, and subsequent subsystem set up and use during the automated music composition and generation process of the present invention.

Another object of the present invention is to provide such an Automated Music Composition and Generation System, wherein a Parameter Transformation Engine Subsystem (B51) is used in the Automated Music Composition and Generation Engine, wherein musical experience descriptor parameters and Timing Parameters Subsystem are automatically transformed into sets of probabilistic-based system operating parameters, generated for specific sets of user-supplied musical experience descriptors and timing signal parameters provided by the system user.

Another object of the present invention is to provide such an Automated Music Composition and Generation System, wherein a Timing Generation Subsystem (B41) is used in the Automated Music Composition and Generation Engine, wherein the timing parameter capture subsystem (B40) provides timing parameters (e.g. piece length) to the timing generation subsystem (B41) for generating timing information relating to (i) the length of the piece to be composed, (ii) start of the music piece, (iii) the stop of the music piece, (iv) increases in volume of the music piece, and (v) accents in the music piece, that are to be created during the automated music composition and generation process of the present invention.

Another object of the present invention is to provide such an Automated Music Composition and Generation System, wherein a Length Generation Subsystem (B2) is used in the Automated Music Composition and Generation Engine, wherein the time length of the piece specified by the system user is provided to the length generation subsystem (B2) and this subsystem generates the start and stop locations of the piece of music that is to be composed during the during the automated music composition and generation process of the present invention.

Another object of the present invention is to provide such an Automated Music Composition and Generation System, wherein a Tempo Generation Subsystem (B3) is used in the Automated Music Composition and Generation Engine, wherein the tempos of the piece (i.e. BPM) are computed based on the piece time length and musical experience parameters that are provided to this subsystem, wherein the resultant tempos are measured in beats per minute (BPM) and are used during the automated music composition and generation process of the present invention.

Another object of the present invention is to provide such an Automated Music Composition and Generation System, wherein a Meter Generation Subsystem (B4) is used in the Automated Music Composition and Generation Engine, wherein the meter of the piece is computed based on the piece time length and musical experience parameters that are provided to this subsystem, wherein the resultant tempo is measured in beats per minute (BPM) and is used during the automated music composition and generation process of the present invention.

Another object of the present invention is to provide such an Automated Music Composition and Generation System, wherein a Key Generation Subsystem (B5) is used in the Automated Music Composition and Generation Engine of the present invention, wherein the key of the piece is computed based on musical experience parameters that are provided to the system, wherein the resultant key is selected and used during the automated music composition and generation process of the present invention.

Another object of the present invention is to provide such an Automated Music Composition and Generation System, wherein a Beat Calculator Subsystem (B6) is used in the Automated Music Composition and Generation Engine, wherein the number of beats in the piece is computed based on the piece length provided to the system and tempo computed by the system, wherein the resultant number of beats is used during the automated music composition and generation process of the present invention.

Another object of the present invention is to provide such an Automated Music Composition and Generation System, wherein a Measure Calculator Subsystem (B8) is used in the Automated Music Composition and Generation Engine, wherein the number of measures in the piece is computed based on the number of beats in the piece, and the computed meter of the piece, wherein the meters in the piece is used during the automated music composition and generation process of the present invention.

Another object of the present invention is to provide such an Automated Music Composition and Generation System, wherein a Tonality Generation Subsystem (B7) is used in the Automated Music Composition and Generation Engine, wherein the tonalities of the piece is selected using the probability-based tonality parameter table maintained within the subsystem and the musical experience descriptors provided to the system by the system user, and wherein the selected tonalities are used during the automated music composition and generation process of the present invention.

Another object of the present invention is to provide such an Automated Music Composition and Generation System, wherein a Song Form Generation Subsystem (B9) is used in the Automated Music Composition and Generation Engine, wherein the song forms are selected using the probability-based song form sub-phrase parameter table maintained within the subsystem and the musical experience descriptors provided to the system by the system user, and wherein the selected song forms are used during the automated music composition and generation process of the present invention.

Another object of the present invention is to provide such an Automated Music Composition and Generation System, wherein a Sub-Phrase Length Generation Subsystem (B15) is used in the Automated Music Composition and Generation Engine, wherein the sub-phrase lengths are selected using the probability-based sub-phrase length parameter table maintained within the subsystem and the musical experience descriptors provided to the system by the system user, and wherein the selected sub-phrase lengths are used during the automated music composition and generation process of the present invention.

Another object of the present invention is to provide such an Automated Music Composition and Generation System, wherein a Chord Length Generation Subsystem (B11) is used in the Automated Music Composition and Generation Engine, wherein the chord lengths are selected using the probability-based chord length parameter table maintained within the subsystem and the musical experience descriptors provided to the system by the system user, and wherein the selected chord lengths are used during the automated music composition and generation process of the present invention.

Another object of the present invention is to provide such an Automated Music Composition and Generation System, wherein an Unique Sub-Phrase Generation Subsystem (B14) is used in the Automated Music Composition and Generation Engine, wherein the unique sub-phrases are selected using the probability-based unique sub-phrase parameter table maintained within the subsystem and the musical experience descriptors provided to the system by the system user, and wherein the selected unique sub-phrases are used during the automated music composition and generation process of the present invention.

Another object of the present invention is to provide such an Automated Music Composition and Generation System, wherein a Number Of Chords In Sub-Phrase Calculation Subsystem (B16) is used in the Automated Music Composition and Generation Engine, wherein the number of chords in a sub-phrase is calculated using the computed unique sub-phrases, and wherein the number of chords in the sub-phrase is used during the automated music composition and generation process of the present invention.

Another object of the present invention is to provide such an Automated Music Composition and Generation System, wherein a Phrase Length Generation Subsystem (B12) is used in the Automated Music Composition and Generation Engine, wherein the length of the phrases are measured using a phrase length analyzer, and wherein the length of the phrases (in number of measures) are used during the automated music composition and generation process of the present invention.

Another object of the present invention is to provide such an Automated Music Composition and Generation System, wherein a Unique Phrase Generation Subsystem (B10) is used in the Automated Music Composition and Generation Engine, wherein the number of unique phrases is determined using a phrase analyzer, and wherein number of unique phrases is used during the automated music composition and generation process of the present invention.

Another object of the present invention is to provide such an Automated Music Composition and Generation System, wherein a Number Of Chords In Phrase Calculation Subsystem (B13) is used in the Automated Music Composition and Generation Engine, wherein the number of chords in a phrase is determined, and wherein number of chords in a phrase is used during the automated music composition and generation process of the present invention.

Another object of the present invention is to provide such an Automated Music Composition and Generation System, wherein an Initial General Rhythm Generation Subsystem (B17) is used in the Automated Music Composition and Generation Engine, wherein the initial chord is determined using the initial chord root table, the chord function table and chord function tonality analyzer, and wherein initial chord is used during the automated music composition and generation process of the present invention.

Another object of the present invention is to provide such an Automated Music Composition and Generation System, wherein a Sub-Phrase Chord Progression Generation Subsystem (B19) is used in the Automated Music Composition and Generation Engine, wherein the sub-phrase chord progressions are determined using the chord root table, the chord function root modifier table, current chord function table values, and the beat root modifier table and the beat analyzer, and wherein sub-phrase chord progressions are used during the automated music composition and generation process of the present invention.

Another object of the present invention is to provide such an Automated Music Composition and Generation System, wherein a Phrase Chord Progression Generation Subsystem (B18) is used in the Automated Music Composition and Generation Engine, wherein the phrase chord progressions are determined using the sub-phrase analyzer, and wherein improved phrases are used during the automated music composition and generation process of the present invention.

Another object of the present invention is to provide such an Automated Music Composition and Generation System, wherein a Chord Inversion Generation Subsystem (B20) is used in the Automated Music Composition and Generation Engine, wherein chord inversions are determined using the initial chord inversion table, and the chord inversion table, and wherein the resulting chord inversions are used during the automated music composition and generation process of the present invention.

Another object of the present invention is to provide such an Automated Music Composition and Generation System, wherein a Melody Sub-Phrase Length Generation Subsystem (B25) is used in the Automated Music Composition and Generation Engine, wherein melody sub-phrase lengths are determined using the probability-based melody sub-phrase length table, and wherein the resulting melody sub-phrase lengths are used during the automated music composition and generation process of the present invention.

Another object of the present invention is to provide such an Automated Music Composition and Generation System, wherein a Melody Sub-Phrase Generation Subsystem (B24) is used in the Automated Music Composition and Generation Engine, wherein sub-phrase melody placements are determined using the probability-based sub-phrase melody placement table, and wherein the selected sub-phrase melody placements are used during the automated music composition and generation process of the present invention.

Another object of the present invention is to provide such an Automated Music Composition and Generation System, wherein a Melody Phrase Length Generation Subsystem (B23) is used in the Automated Music Composition and Generation Engine, wherein melody phrase lengths are determined using the sub-phrase melody analyzer, and wherein the resulting phrase lengths of the melody are used during the automated music composition and generation process of the present invention;

Another object of the present invention is to provide such an Automated Music Composition and Generation System, wherein a Melody Unique Phrase Generation Subsystem (B22) used in the Automated Music Composition and Generation Engine, wherein unique melody phrases are determined using the unique melody phrase analyzer, and wherein the resulting unique melody phrases are used during the automated music composition and generation process of the present invention.

Another object of the present invention is to provide such an Automated Music Composition and Generation System, wherein a Melody Length Generation Subsystem (B21) used in the Automated Music Composition and Generation Engine, wherein melody lengths are determined using the phrase melody analyzer, and wherein the resulting phrase melodies are used during the automated music composition and generation process of the present invention.

Another object of the present invention is to provide such an Automated Music Composition and Generation System, wherein a Melody Note Rhythm Generation Subsystem (B26) used in the Automated Music Composition and Generation Engine, wherein melody note rhythms are determined using the probability-based initial note length table, and the probability-based initial, second, and $n^{th}$ chord length tables, and wherein the resulting melody note rhythms are used during the automated music composition and generation process of the present invention.

Another object of the present invention is to provide such an Automated Music Composition and Generation System, wherein an Initial Pitch Generation Subsystem (B27) used in the Automated Music Composition and Generation Engine, wherein initial pitch is determined using the probability-based initial note length table, and the probability-based initial, second, and $n^{th}$ chord length tables, and wherein the resulting melody note rhythms are used during the automated music composition and generation process of the present invention.

Another object of the present invention is to provide such an Automated Music Composition and Generation System, wherein a Sub-Phrase Pitch Generation Subsystem (B29) used in the Automated Music Composition and Generation Engine, wherein the sub-phrase pitches are determined using the probability-based melody note table, the probability-based chord modifier tables, and probability-based leap reversal modifier table, and wherein the resulting sub-phrase pitches are used during the automated music composition and generation process of the present invention.

Another object of the present invention is to provide such an Automated Music Composition and Generation System, wherein a Phrase Pitch Generation Subsystem (B28) used in the Automated Music Composition and Generation Engine, wherein the phrase pitches are determined using the sub-phrase melody analyzer and used during the automated music composition and generation process of the present invention.

Another object of the present invention is to provide such an Automated Music Composition and Generation System, wherein a Pitch Octave Generation Subsystem (B30) is used in the Automated Music Composition and Generation Engine, wherein the pitch octaves are determined using the probability-based melody note octave table, and the resulting pitch octaves are used during the automated music composition and generation process of the present invention.

Another object of the present invention is to provide such an Automated Music Composition and Generation System, wherein an Instrumentation Subsystem (B38) is used in the Automated Music Composition and Generation Engine, wherein the instrumentations are determined using the probability-based instrument tables based on musical experience descriptors (e.g. style descriptors) provided by the system user, and wherein the instrumentations are used during the automated music composition and generation process of the present invention.

Another object of the present invention is to provide such an Automated Music Composition and Generation System, wherein an Instrument Selector Subsystem (B39) is used in the Automated Music Composition and Generation Engine, wherein piece instrument selections are determined using the probability-based instrument selection tables, and used during the automated music composition and generation process of the present invention.

Another object of the present invention is to provide such an Automated Music Composition and Generation System, wherein an Orchestration Generation Subsystem (B31) is used in the Automated Music Composition and Generation Engine, wherein the probability-based parameter tables (i.e. instrument orchestration prioritization table, instrument energy tabled, piano energy table, instrument function table, piano hand function table, piano voicing table, piano rhythm table, second note right hand table, second note left hand table, piano dynamics table) employed in the subsystem is set up for the exemplary "emotion-type" musical experience descriptor—HAPPY—and used during the automated music composition and generation process of the present invention so as to generate a part of the piece of music being composed.

Another object of the present invention is to provide such an Automated Music Composition and Generation System, wherein a Controller Code Generation Subsystem (B32) is used in the Automated Music Composition and Generation Engine, wherein the probability-based parameter tables (i.e. instrument, instrument group and piece wide controller code tables) employed in the subsystem is set up for the exemplary "emotion-type" musical experience descriptor—HAPPY—and used during the automated music composition and generation process of the present invention so as to generate a part of the piece of music being composed.

Another object of the present invention is to provide such an Automated Music Composition and Generation System, wherein a digital audio retriever subsystem (B33) is used in the Automated Music Composition and Generation Engine, wherein digital audio (instrument note) files are located and used during the automated music composition and generation process of the present invention.

Another object of the present invention is to provide such an Automated Music Composition and Generation System, wherein Digital Audio Sample Organizer Subsystem (B34) is used in the Automated Music Composition and Generation Engine, wherein located digital audio (instrument note) files are organized in the correct time and space according to the music piece during the automated music composition and generation process of the present invention.

Another object of the present invention is to provide such an Automated Music Composition and Generation System, wherein a Piece Consolidator Subsystem (B35) is used in the Automated Music Composition and Generation Engine, wherein the digital audio files are consolidated and manipulated into a form or forms acceptable for use by the System User.

Another object of the present invention is to provide such an Automated Music Composition and Generation System, wherein a Piece Format Translator Subsystem (B50) is used in the Automated Music Composition and Generation Engine, wherein the completed music piece is translated into desired alterative formats requested during the automated music composition and generation process of the present invention.

Another object of the present invention is to provide such an Automated Music Composition and Generation System, wherein a Piece Deliver Subsystem (B36) is used in the Automated Music Composition and Generation Engine, wherein digital audio files are combined into digital audio files to be delivered to the system user during the automated music composition and generation process of the present invention.

Another object of the present invention is to provide such an Automated Music Composition and Generation System, wherein a Feedback Subsystem (B42) is used in the Automated Music Composition and Generation Engine, wherein (i) digital audio file and additional piece formats are analyzed to determine and confirm that all attributes of the requested piece are accurately delivered, (ii) that digital audio file and additional piece formats are analyzed to determine and confirm uniqueness of the musical piece, and (iii) the system user analyzes the audio file and/or additional piece formats, during the automated music composition and generation process of the present invention.

Another object of the present invention is to provide such an Automated Music Composition and Generation System, wherein a Music Editability Subsystem (B43) is used in the Automated Music Composition and Generation Engine, wherein requests to restart, rerun, modify and/or recreate the system are executed during the automated music composition and generation process of the present invention.

Another object of the present invention is to provide such an Automated Music Composition and Generation System, wherein a Preference Saver Subsystem (B44) is used in the Automated Music Composition and Generation Engine, wherein musical experience descriptors, parameter tables and parameters are modified to reflect user and autonomous feedback to cause a more positively received piece during future automated music composition and generation process of the present invention.

Another object of the present invention is to provide such an Automated Music Composition and Generation System, wherein a Musical Kernel (e.g. "DNA") Generation Subsystem (B45) is used in the Automated Music Composition and Generation Engine, wherein the musical "kernel" of a music piece is determined, in terms of (i) melody (sub-phrase melody note selection order), (ii) harmony (i.e. phrase chord progression), (iii) tempo, (iv) volume, and/or (v) orchestration, so that this music kernel can be used during future automated music composition and generation process of the present invention.

Another object of the present invention is to provide such an Automated Music Composition and Generation System, wherein a User Taste Generation Subsystem (B46) is used in the Automated Music Composition and Generation Engine, wherein the system user's musical taste is determined based on system user feedback and autonomous piece analysis, for use in changing or modifying the style and musical experience descriptors, parameters and table values for a music composition during the automated music composition and generation process of the present invention.

Another object of the present invention is to provide such an Automated Music Composition and Generation System, wherein a Population Taste Aggregator Subsystem (B47) is used in the Automated Music Composition and Generation Engine, wherein the music taste of a population is aggregated and changes to style, musical experience descriptors, and parameter table probabilities can be modified in response thereto during the automated music composition and generation process of the present invention;

Another object of the present invention is to provide such an Automated Music Composition and Generation System, wherein a User Preference Subsystem (B48) is used in the Automated Music Composition and Generation Engine, wherein system user preferences (e.g. style and musical experience descriptors, table parameters) are determined and used during the automated music composition and generation process of the present invention.

Another object of the present invention is to provide such an Automated Music Composition and Generation System, wherein a Population Preference Subsystem (B49) is used in its Automated Music Composition and Generation Engine, wherein user population preferences (e.g. style and musical experience descriptors, table parameters) are determined and used during the automated music composition and generation process of the present invention.

Another object of the present invention is to provide such an Automated Music Composition and Generation System, wherein a probability-based parameter table is maintained in the Tempo Generation Subsystem (B3) of its Automated Music Composition and Generation Engine, wherein for each emotional descriptor supported by the system, a probability measure is provided for each tempo (beats per minute) supported by the system, and the probability-based parameter table is used during the automated music composition and generation process of the present invention.

Another object of the present invention is to provide such an Automated Music Composition and Generation System, wherein a probability-based parameter table is maintained in the Length Generation Subsystem (B2) of its Automated Music Composition and Generation Engine, wherein for each emotional descriptor supported by the system, a probability measure is provided for each length (seconds) supported by the system, and this probability-based parameter table is used during the automated music composition and generation process of the present invention.

Another object of the present invention is to provide such an Automated Music Composition and Generation System, wherein a probability-based parameter table is maintained in the Meter Generation Subsystem (B4) of its Automated Music Composition and Generation Engine, wherein for each emotional descriptor supported by the system, a probability measure is provided for each meter supported by the system, and this probability-based parameter table is used during the automated music composition and generation process of the present invention.

Another object of the present invention is to provide such an Automated Music Composition and Generation System, wherein a probability-based parameter table is maintained in the key generation subsystem (B5) of its Automated Music Composition and Generation Engine, wherein for each musical experience descriptor selected by the system user, a probability measure is provided for each key supported by the system, and this probability-based parameter table is used during the automated music composition and generation process of the present invention.

Another object of the present invention is to provide such an Automated Music Composition and Generation System, wherein a probability-based parameter table is maintained in the Tonality Generation Subsystem (B7) of its Automated Music Composition and Generation Engine, wherein for each musical experience descriptor selected by the system user, a probability measure is provided for each tonality (i.e. Major, Minor-Natural, Minor-Harmonic, Minor-Melodic, Dorian, Phrygian, Lydian, Mixolydian, Aeolian, and Locrian) supported by the system, and this probability-based parameter table is used during the automated music composition and generation process of the present invention;

Another object of the present invention is to provide such an Automated Music Composition and Generation System, wherein a probability-based parameter tables maintained in the Song Form Generation Subsystem (B9) of its Automated Music Composition and Generation Engine, wherein for each musical experience descriptor selected by the system user, a probability measure is provided for each song form (i.e. A, AA, AB, AAA, ABA, ABC) supported by the system, as well as for each sub-phrase form (a, aa, ab, aaa, aba, abc), and these probability-based parameter tables are used during the automated music composition and generation process of the present invention;

Another object of the present invention is to provide such an Automated Music Composition and Generation System, wherein a probability-based parameter table is maintained in the Sub-Phrase Length Generation Subsystem (B15) of its Automated Music Composition and Generation Engine, wherein for each musical experience descriptor selected by the system user, a probability measure is provided for each sub-phrase length (i.e. measures) supported by the system, and this probability-based parameter table is used during the automated music composition and generation process of the present invention.

Another object of the present invention is to provide such an Automated Music Composition and Generation System, wherein a probability-based parameter tables is maintained in the Chord Length Generation Subsystem (B11) of its Automated Music Composition and Generation Engine, wherein for each musical experience descriptor selected by the system user, a probability measure is provided for each initial chord length and second chord lengths supported by the system, and these probability-based parameter tables are used during the automated music composition and generation process of the present invention.

Another object of the present invention is to provide such an Automated Music Composition and Generation System, wherein a probability-based parameter tables is maintained in the Initial General Rhythm Generation Subsystem (B17) of its Automated Music Composition and Generation Engine, wherein for each musical experience descriptor selected by the system user, a probability measure is provided for each root note (i.e. indicated by musical letter) supported by the system, and these probability-based parameter tables are used during the automated music composition and generation process of the present invention.

Another object of the present invention is to provide such an Automated Music Composition and Generation System, wherein probability-based parameter tables are maintained in the Sub-Phrase Chord Progression Generation Subsystem (B19) of its Automated Music Composition and Generation Engine, wherein for each musical experience descriptor selected by the system user, a probability measure is provided for each original chord root (i.e. indicated by musical letter) and upcoming beat in the measure supported by the system, and these probability-based parameter tables are used during the automated music composition and generation process of the present invention.

Another object of the present invention is to provide such an Automated Music Composition and Generation System, wherein a probability-based parameter tables is maintained in the Chord Inversion Generation Subsystem (B20) of its Automated Music Composition and Generation Engine, wherein for each musical experience descriptor selected by the system user, a probability measure is provided for each inversion and original chord root (i.e. indicated by musical letter) supported by the system, and these probability-based parameter tables are used during the automated music composition and generation process of the present invention.

Another object of the present invention is to provide such an Automated Music Composition and Generation System, wherein a probability-based parameter tables is maintained in the Melody Sub-Phrase Length Progression Generation Subsystem (B25) of its Automated Music Composition and Generation Engine, wherein for each musical experience descriptor selected by the system user, a probability measure is provided for each original chord root (i.e. indicated by musical letter) supported by the system, and this probability-based parameter table is used during the automated music composition and generation process of the present invention.

Another object of the present invention is to provide such an Automated Music Composition and Generation System, wherein a probability-based parameter tables is maintained in the Melody Note Rhythm Generation Subsystem (B26) of its Automated Music Composition and Generation Engine, wherein for each musical experience descriptor selected by the system user, a probability measure is provided for each initial note length and second chord lengths supported by the system, and these probability-based parameter tables are used during the automated music composition and generation process of the present invention.

Another object of the present invention is to provide such an Automated Music Composition and Generation System, wherein a probability-based parameter table is maintained in the Initial Pitch Generation Subsystem (B27) of its Automated Music Composition and Generation Engine, wherein for each musical experience descriptor selected by the system user, a probability measure is provided for each note (i.e. indicated by musical letter) supported by the system, and this probability-based parameter table is used during the automated music composition and generation process of the present invention.

Another object of the present invention is to provide such an Automated Music Composition and Generation System, wherein probability-based parameter tables are maintained in the Sub-Phrase Pitch Generation Subsystem (B29) of its Automated Music Composition and Generation Engine, and wherein for each musical experience descriptor selected by the system user, a probability measure is provided for each original note (i.e. indicated by musical letter) supported by the system, and leap reversal, and these probability-based parameter tables are used during the automated music composition and generation process of the present invention.

Another object of the present invention is to provide such an Automated Music Composition and Generation System, wherein a probability-based parameter table is maintained in the Melody Sub-Phrase Length Progression Generation Subsystem (B25) of its Automated Music Composition and Generation Engine, and wherein for each musical experience descriptor selected by the system user, a probability measure is provided for the length of time the melody starts into the sub-phrase that are supported by the system, and this probability-based parameter table is used during the automated music composition and generation process of the present invention.

Another object of the present invention is to provide such an Automated Music Composition and Generation System, wherein probability-based parameter tables are maintained in the Melody Note Rhythm Generation Subsystem (B25) of its Automated Music Composition and Generation Engine, and wherein for each musical experience descriptor selected by the system user, a probability measure is provided for each initial note length, second chord length (i.e. measure), and $n^{th}$ chord length supported by the system, and these probability-based parameter tables are used during the automated music composition and generation process of the present invention.

Another object of the present invention is to provide such an Automated Music Composition and Generation System, wherein a probability-based parameter table are maintained in the Initial Pitch Generation Subsystem (B27) of its Automated Music Composition and Generation Engine, and wherein for each musical experience descriptor selected by the system user, a probability-based measure is provided for each note supported by the system, and this probability-based parameter table is used during the automated music composition and generation process of the present invention.

Another object of the present invention is to provide such an Automated Music Composition and Generation System, wherein probability-based parameter tables are maintained in the sub-phrase pitch generation subsystem (B29) of its Automated Music Composition and Generation Engine, and wherein for each musical experience descriptor selected by the system user, a probability measure is provided for each original note and leap reversal supported by the system, and these probability-based parameter tables are used during the automated music composition and generation process of the present invention.

Another object of the present invention is to provide such an Automated Music Composition and Generation System, wherein probability-based parameter tables are maintained in the Pitch Octave Generation Subsystem (B30) of its Automated Music Composition and Generation Engine, and wherein for each musical experience descriptor selected by the system user, a set of probability measures are provided, and this probability-based parameter table is used during the automated music composition and generation process of the present invention.

Another object of the present invention is to provide such an Automated Music Composition and Generation System, wherein probability-based parameter tables are maintained in the Instrument Selector Subsystem (B39) of its Automated Music Composition and Generation Engine, wherein for each musical experience descriptor selected by the system user, a probability measure is provided for each instrument supported by the system, and these probability-based parameter tables are used during the automated music composition and generation process of the present invention.

Another object of the present invention is to provide such an Automated Music Composition and Generation System, wherein probability-based parameter tables are maintained in the Orchestration Generation Subsystem (B31) of the Automated Music Composition and Generation Engine, and wherein for each musical experience descriptor selected by the system user, probability measures are provided for each instrument supported by the system, and these parameter tables are used during the automated music composition and generation process of the present invention.

Another object of the present invention is to provide such an Automated Music Composition and Generation System, wherein probability-based parameter tables are maintained in the Controller Code Generation Subsystem (B32) of the Automated Music Composition and Generation Engine, and wherein for each musical experience descriptor selected by the system user, probability measures are provided for each instrument supported by the system, and these parameter tables are used during the automated music composition and generation process of the present invention.

Another object of the present invention is to provide such an Automated Music Composition and Generation System, wherein a Timing Control Subsystem is used to generate timing control pulse signals which are sent to each subsystem, after the system has received its musical experience descriptor inputs from the system user, and the system has been automatically arranged and configured in its operating mode, wherein music is automatically composed and generated in accordance with the principles of the present invention.

Another object of the present invention is to provide a novel system and method of automatically composing and generating music in an automated manner using a real-time pitch event analyzing subsystem.

Another object of the present invention is to provide such an automated music composition and generation system, supporting a process comprising the steps of: (a) providing musical experience descriptors (e.g. including "emotion-type" musical experience descriptors, and "style-type" musical experience descriptors) to the system user interface of the automated music composition and generation system; (b) providing lyrical input (e.g. in typed, spoken or sung format) to the system-user interface of the system, for one or more scenes in a video or media object to be scored with music composed and generated by the system; (c) using the real-time pitch event analyzing subsystem for processing the lyrical input provided to the system user interface, using real-time rhythmic, pitch event, and prosodic analysis of typed/spoken/sung lyrics or words (for certain frames of the scored media), based on time and/or frequency domain techniques; (d) using the real-time pitch event analyzing subsystem to extract pitch events, rhythmic information and prosodic information on a high-resolution time line from the analyzed lyrical input, and code with timing information on when such detected events occurred; and (e) providing the extracted information to the automated music composition and generation engine for use in constraining the probability-based parameters tables employed in the various subsystems of the automated system.

Another object of the present invention is to provide a distributed, remotely accessible GUI-based work environment supporting the creation and management of parameter configurations within the parameter transformation engine subsystem of the automated music composition and generation system network of the present invention, wherein system designers remotely situated anywhere around the globe can log into the system network and access the GUI-based work environment and create parameter mapping configurations between (i) different possible sets of emotion-type, style-type and timing/spatial parameters that might be selected by system users, and (ii) corresponding sets of probability-based music-theoretic system operating parameters, preferably maintained within parameter tables, for persistent storage within the parameter transformation engine subsystem and its associated parameter table archive database subsystem supported on the automated music composition and generation system network of the present invention.

Yet, another object of the present invention is to provide a novel automated music composition and generation systems for generating musical score representations of automatically composed pieces of music responsive to emotion and style type musical experience descriptors, and converting such representations into MIDI control signals to drive and control one or more MIDI-based musical instruments that produce an automatically composed piece of music for the enjoyment of others.

These and other objects of the present invention will become apparent hereinafter and in view of the appended Claims to Invention.

BRIEF DESCRIPTION OF THE DRAWINGS

The Objects of the Present Invention will be more fully understood when read in conjunction with the Figures Drawings, wherein:

FIG. 2 is a flow chart illustrating the primary steps involved in carrying out the generalized automated music composition and generation process of the present invention supporting the use of virtual-instrument music synthesis driven by linguistic and/or graphical icon based musical experience descriptors and, wherein (i) during the first step of the process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 6 is a flow chart illustrating the primary steps involved in carrying out the automated music composition and generation process of the first illustrative embodiment of the present invention supporting the use of linguistic and/or graphical icon based musical experience descriptors and virtual-instrument music synthesis using the instrument system shown in FIGS. 3-5, wherein (i) during the first step of the process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 10 is a flow chart illustrating the primary steps involved in carrying out the automated music composition and generation process within the toy music composing and generation system of the second illustrative embodiment of the present invention, supporting the use of virtual-instrument music synthesis driven by graphical icon based musical experience descriptors using the instrument system shown in FIGS. 7 through 9, wherein (i) during the first step of the process, the system user accesses the Automated Music Composition and Generation System of the present invention, and then selects a video to be scored with music generated by the Automated Music Composition and Generation Engine of the present invention, (ii) the system user selects graphical icon-based musical experience descriptors to be provided to the Automated Music Composition and Generation Engine of the system, (iii) the system user initiates the Automated Music Composition and Generation Engine to compose and generate music based on inputted musical descriptors scored on selected video media, and (iv) the system combines the composed music with the selected video so as to create a video file for display and enjoyment;

FIG. 11B is a schematic representation of the system illustrated in FIGS. 11 and 11A, comprising a SOC-based subsystem architecture including a multi-core CPU, a multi-core GPU, program memory (RAM), and video memory (VRAM), shown interfaced with a solid-state (DRAM) hard drive, a LCD/Touch-screen display panel, a micro-phone speaker, a keyboard or keypad, WIFI/Bluetooth network adapters, and 3G/LTE/GSM network adapter integrated with one or more bus architecture supporting controllers and the like;

FIG. 12 is a flow chart illustrating the primary steps involved in carrying out the automated music composition and generation process of the present invention using the SOC-based system shown in FIGS. 11-11A supporting the use of virtual-instrument music synthesis driven by linguistic and/or graphical icon based musical experience descriptors and, wherein (i) during the first step of the process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 14 is a flow chart illustrating the primary steps involved in carrying out the Automated Music Composition And Generation Process of the present invention supported by the system illustrated in FIGS. 13 and 13A, wherein (i) during the first step of the process, the system user accesses the Automated Music Composition and Generation System of the present invention, and then selects a video, an audio-recording (i.e. podcast), slideshow, a photograph or image, or an event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display;

FIG. 19 is a flow chart illustrating the primary steps involved in carrying out the automated music composition and generation process of the present invention using the Web-based system shown in FIGS. 16-18 supporting the use of virtual-instrument music synthesis driven by linguistic and/or graphical icon based musical experience descriptors so as to create musically-scored text, SMS, email, PDF, Word and/or html documents, wherein (i) during the first step of the process, the system user accesses the Automated Music Composition and Generation System of the present invention, and then selects a text, SMS or email message or Word, PDF or HTML document to be scored (e.g. augmented) with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected messages or documents, (iv) the system user accepts composed and generated music produced for the message or document, or rejects the music and provides feedback to the system, including providing different musical experience descriptors and a request to re-compose music based on the updated musical experience descriptor inputs, and (v) the system combines the accepted composed music with the message or document, so as to create a new file for distribution and display;

FIG. 24 is a flow chart illustrating the primary steps involved in carrying out the automated music composition and generation process of the present invention using the system shown in FIGS. 20 through 23, wherein (i) during the first step of the process, the system user selects either the LEAD or FOLLOW mode of operation for the automated musical composition and generation instrument system of the present invention, (ii) prior to the session, the system is then is interfaced with a group of musical instruments played by a group of musicians in a creative environment during a musical session, (iii) during the session system receives audio and/or MIDI data signals produced from the group of instruments during the session, and analyzes these signals for pitch data and melodic structure, (iv) during the session, the system automatically generates musical descriptors from abstracted pitch and melody data, and uses the musical experience descriptors to compose music for the session on a real-time basis, and (v) in the event that the PERFORM mode has been selected, the system generates the composed music, and in the event that the COMPOSE mode has been selected, the music composed during for the session is stored for subsequent access and review by the group of musicians;

FIGS. 27B1 and 27B2, taken together, show a schematic representation of the Descriptor Parameter Capture Subsystem (B1) used in the Automated Music Composition and Generation Engine of the present invention, wherein the system user provides the exemplary "emotion-type" musical experience descriptor—HAPPY—to the descriptor parameter capture subsystem for distribution to the probability-based parameter tables employed in the various subsystems therein, and subsequent subsystem set up and use during the automated music composition and generation process of the present invention;

FIGS. 27B3A, 27B3B and 27B3C, taken together, provide a schematic representation of the Parameter Transformation Engine Subsystem (B51) configured with the Parameter Capture Subsystem (B1), Style Parameter Capture Subsystem (B37) and Timing Parameter Capture Subsystem (B40) used in the Automated Music Composition and Generation Engine of the present invention, for receiving emotion-type and style-type musical experience descriptors and timing/spatial parameters for processing and transformation into music-theoretic system operating parameters for distribution, in table-type data structures, to various subsystems in the system of the illustrative embodiments;

FIGS. 27B4A, 27B4B, 27B4C, 27B4D and 27B4E, taken together, provide a schematic map representation specifying the locations of particular music-theoretic system operating parameter (SOP) tables employed within the subsystems of the automatic music composition and generation system of the present invention;

FIG. 27B5 is a schematic representation of the Parameter Table Handling and Processing Subsystem (B70) used in the Automated Music Composition and Generation Engine of the present invention, wherein multiple emotion/style-specific music-theoretic system operating parameter (SOP) tables are received from the Parameter Transformation Engine Subsystem B51 and handled and processed using one or parameter table processing methods M1, M2 or M3 so as to generate system operating parameter tables in a form that is more convenient and easier to process and use within the subsystems of the system of the present invention;

FIG. 27B6 is a schematic representation of the Parameter Table Archive Database Subsystem (B80) used in the Automated Music Composition and Generation System of the present invention, for storing and archiving system user account profiles, tastes and preferences, as well as all emotion/style-indexed system operating parameter (SOP) tables generated for system user music composition requests on the system;

FIGS. 27C1 and 27C2, taken together, show a schematic representation of the Style Parameter Capture Subsystem (B37) used in the Automated Music Composition and Generation Engine of the present invention, wherein the probability-based parameter table employed in the subsystem is set up for the exemplary "style-type" musical experience descriptor—POP—and used during the automated music composition and generation process of the present invention;

FIGS. 27E1 and 27E2, taken together, show a schematic representation of the Timing Generation Subsystem (B41) used in the Automated Music Composition and Generation Engine of the present invention, wherein the timing parameter capture subsystem (B40) provides timing parameters (e.g. piece length) to the timing generation subsystem (B41) for generating timing information relating to (i) the length of the piece to be composed, (ii) start of the music piece, (iii) the stop of the music piece, (iv) increases in volume of the music piece, and (v) accents in the music piece, that are to be created during the automated music composition and generation process of the present invention;

FIGS. 27M1 and 27M2, taken together, show a schematic representation of the Song Form Generation Subsystem (B9) used in the Automated Music Composition and Generation Engine of the present invention, wherein the song form is selected using the probability-based song form sub-phrase parameter table employed within the subsystem for the exemplary "emotion-type" musical experience descriptor—HAPPY—provided to the system by the system user, and wherein the selected song form is used during the automated music composition and generation process of the present invention;

FIGS. 27O1, 27O2, 27O3 and 27O4, taken together, show a schematic representation of the Chord Length Generation Subsystem (B11) used in the Automated Music Composition and Generation Engine of the present invention, wherein the chord length is selected using the probability-based chord length parameter table employed within the subsystem for the exemplary "emotion-type" musical experience descriptor provided to the system by the system user, and wherein the selected chord length is used during the automated music composition and generation process of the present invention;

FIGS. 27V1, 27V2 and 27V3, taken together, show a schematic representation of the Sub-Phrase Chord Progression Generation Subsystem (B19) used in the Automated Music Composition and Generation Engine of the present invention, wherein the probability-based parameter tables (i.e. chord root table, chord function root modifier, and beat root modifier table) employed in the subsystem for the exemplary "emotion-type" musical experience descriptor—HAPPY—is used during the automated music composition and generation process of the present invention;

FIGS. 27X1, 27X2 and 27X3, taken together, show a schematic representation of the Chord Inversion Generation Subsystem (B20) used in the Automated Music Composition and Generation Engine of the present invention, wherein chord inversion is determined using the probability-based parameter tables (i.e. initial chord inversion table, and chord inversion table) for the exemplary "emotion-type" musical experience descriptor—HAPPY—and used during the automated music composition and generation process of the present invention;

FIGS. 27Z1 and 27Z2, taken together, show a schematic representation of the Melody Sub-Phrase Generation Subsystem (B24) used in the Automated Music Composition and Generation Engine of the present invention, wherein the probability-based parameter tables (i.e. sub-phrase melody placement tables) employed in the subsystem for the exemplary "emotion-type" musical experience descriptor—HAPPY—are used during the automated music composition and generation process of the present invention;

FIG. 27AA shows a schematic representation of the Melody Phrase Length Generation Subsystem (B23) used in the Automated Music Composition and Generation Engine of the present invention, wherein melody phrase length is determined using the sub-phrase melody analyzer, and used during the automated music composition and generation process of the present invention;

FIG. 27BB shows a schematic representation of the Melody Unique Phrase Generation Subsystem (B22) used in the Automated Music Composition and Generation Engine of the present invention, wherein unique melody phrase is determined using the unique melody phrase analyzer, and used during the automated music composition and generation process of the present invention;

FIG. 27CC shows a schematic representation of the Melody Length Generation Subsystem (B21) used in the Automated Music Composition and Generation Engine of the present invention, wherein melody length is determined using the phrase melody analyzer, and used during the automated music composition and generation process of the present invention;

FIGS. 27DD1, 27DD2 and 27DD3, taken together, show a schematic representation of the Melody Note Rhythm Generation Subsystem (B26) used in the Automated Music Composition and Generation Engine of the present invention, wherein the probability-based parameter tables (i.e. initial note length table and initial and second chord length tables) employed in the subsystem for the exemplary "emotion-type" musical experience descriptor—HAPPY—are used during the automated music composition and generation process of the present invention;

FIG. 27EE shows a schematic representation of the Initial Pitch Generation Subsystem (B27) used in the Automated Music Composition and Generation Engine of the present invention, wherein the probability-based parameter tables (i.e. initial melody table) employed in the subsystem for the exemplary "emotion-type" musical experience descriptor—HAPPY—are used during the automated music composition and generation process of the present invention;

FIGS. 27FF1 and 27FF2, and 27FF3, taken together, show a schematic representation of the Sub-Phrase Pitch Generation Subsystem (B29) used in the Automated Music Composition and Generation Engine of the present invention, wherein the probability-based parameter tables (i.e. melody note table and chord modifier table, leap reversal modifier table, and leap incentive modifier table) employed in the subsystem for the exemplary "emotion-type" musical experience descriptor—HAPPY—are used during the automated music composition and generation process of the present invention;

FIG. 27GG shows a schematic representation of the Phrase Pitch Generation Subsystem (B28) used in the Automated Music Composition and Generation Engine of the present invention, wherein the phrase pitch is determined using the sub-phrase melody analyzer and used during the automated music composition and generation process of the present invention;

FIGS. 27HH1 and 27HH2, taken together, show a schematic representation of the Pitch Octave Generation Subsystem (B30) used in the Automated Music Composition and Generation Engine of the present invention, wherein the probability-based parameter tables (i.e. melody note octave table) employed in the subsystem is set up for the exemplary "emotion-type" musical experience descriptor—HAPPY—and used during the automated music composition and generation process of the present invention;

FIGS. 27II1 and 27II2, taken together, show a schematic representation of the Instrumentation Subsystem (B38) used in the Automated Music Composition and Generation Engine of the present invention, wherein the probability-based parameter table (i.e. instrument table) employed in the subsystem for the exemplary "emotion-type" musical experience descriptor—HAPPY—are used during the automated music composition and generation process of the present;

FIGS. 27JJ1 and 27JJ2, taken together, show a schematic representation of the Instrument Selector Subsystem (B39) used in the Automated Music Composition and Generation Engine of the present invention, wherein the probability-based parameter tables (i.e. instrument selection table) employed in the subsystem for the exemplary "emotion-type" musical experience descriptor—HAPPY—are used during the automated music composition and generation process of the present invention;

FIGS. 27KK1, 27KK2, 27KK3, 27KK4, 27KK5, 27KK6, 27KK7, 27KK8 and 27KK9, taken together, show a schematic representation of the Orchestration Generation Subsystem (B31) used in the Automated Music Composition and Generation Engine of the present invention, wherein the probability-based parameter tables (i.e. instrument orchestration prioritization table, instrument energy tabled, piano energy table, instrument function table, piano hand function table, piano voicing table, piano rhythm table, second note right hand table, second note left hand table, piano dynamics table, etc.) employed in the subsystem for the exemplary "emotion-type" musical experience descriptor—HAPPY—are used during the automated music composition and generation process of the present invention;

FIG. 27LL shows a schematic representation of the Controller Code Generation Subsystem (B32) used in the Automated Music Composition and Generation Engine of the present invention, wherein the probability-based parameter tables (i.e. instrument, instrument group and piece wide controller code tables) employed in the subsystem for the exemplary "emotion-type" musical experience descriptor—HAPPY—are used during the automated music composition and generation process of the present invention;

FIG. 27MM shows a schematic representation of the Digital Audio Retriever Subsystem (B33) used in the Automated Music Composition and Generation Engine of the present invention, wherein digital audio (instrument note) files are located and used during the automated music composition and generation process of the present invention;

FIG. 27NN shows a schematic representation of the Digital Audio Sample Organizer Subsystem (B34) used in the Automated Music Composition and Generation Engine of the present invention, wherein located digital audio (instrument note) files are organized in the correct time and space according to the music piece during the automated music composition and generation process of the present invention;

FIG. 27OO shows a schematic representation of the Piece Consolidator Subsystem (B35) used in the Automated Music Composition and Generation Engine of the present invention, wherein the sub-phrase pitch is determined using the probability-based melody note table, the probability-based chord modifier tables, and probability-based leap reversal modifier table, and used during the automated music composition and generation process of the present invention;

FIG. 27OO1 shows a schematic representation of the Piece Format Translator Subsystem (B50) used in the Automated Music Composition and Generation Engine of the present invention, wherein the completed music piece is translated into desired alterative formats requested during the automated music composition and generation process of the present invention;

FIG. 27PP shows a schematic representation of the Piece Deliver Subsystem (B36) used in the Automated Music Composition and Generation Engine of the present invention, wherein digital audio files are combined into digital audio files to be delivered to the system user during the automated music composition and generation process of the present invention;

FIGS. 27QQ1, 27QQ2 and 27QQ3, taken together, show a schematic representation of The Feedback Subsystem (B42) used in the Automated Music Composition and Generation Engine of the present invention, wherein (i) digital audio file and additional piece formats are analyzed to determine and confirm that all attributes of the requested piece are accurately delivered, (ii) that digital audio file and additional piece formats are analyzed to determine and confirm uniqueness of the musical piece, and (iii) the system user analyzes the audio file and/or additional piece formats, during the automated music composition and generation process of the present invention;

FIG. 27RR shows a schematic representation of the Music Editability Subsystem (B43) used in the Automated Music Composition and Generation Engine of the present invention, wherein requests to restart, rerun, modify and/or recreate the system are executed during the automated music composition and generation process of the present invention;

FIG. 27SS shows a schematic representation of the Preference Saver Subsystem (B44) used in the Automated Music Composition and Generation Engine of the present invention, wherein musical experience descriptors and parameter tables are modified to reflect user and autonomous feedback to cause a more positively received piece during future automated music composition and generation process of the present invention;

FIG. 27TT shows a schematic representation of the Musical Kernel (i.e. DNA) Generation Subsystem (B45) used in the Automated Music Composition and Generation Engine of the present invention, wherein the musical "kernel" (i.e. DNA) of a music piece is determined, in terms of (i) melody (sub-phrase melody note selection order), (ii) harmony (i.e. phrase chord progression), (iii) tempo, (iv) volume, and (v) orchestration, so that this music kernel can be used during future automated music composition and generation process of the present invention;

FIG. 27UU shows a schematic representation of the User Taste Generation Subsystem (B46) used in the Automated Music Composition and Generation Engine of the present invention, wherein the system user's musical taste is determined based on system user feedback and autonomous piece analysis, for use in changing or modifying the musical experience descriptors, parameters and table values for a music composition during the automated music composition and generation process of the present invention;

FIG. 27VV shows a schematic representation of the Population Taste Aggregator Subsystem (B47) used in the Automated Music Composition and Generation Engine of the present invention, wherein the music taste of a population is aggregated and changes to musical experience descriptors, and table probabilities can be modified in response thereto during the automated music composition and generation process of the present invention;

FIG. 27WW shows a schematic representation of the User Preference Subsystem (B48) used in the Automated Music Composition and Generation Engine of the present invention, wherein system user preferences (e.g. musical experience descriptors, table parameters) are determined and used during the automated music composition and generation process of the present invention;

FIG. 27XX shows a schematic representation of the Population Preference Subsystem (B49) used in the Automated Music Composition and Generation Engine of the present invention, wherein user population preferences (e.g. musical experience descriptors, table parameters) are determined and used during the automated music composition and generation process of the present invention;

Figure 1:
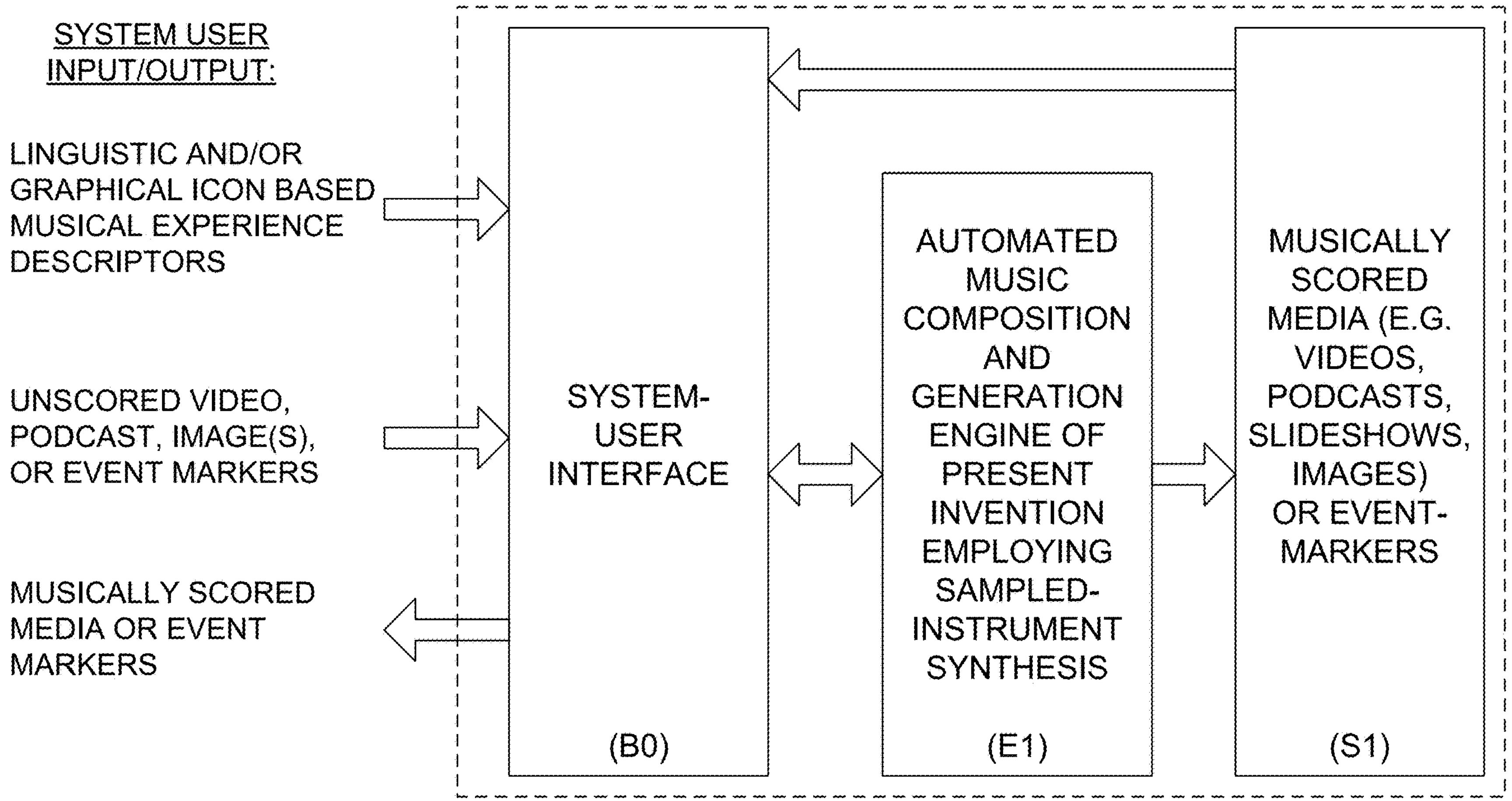
FIG. 1 is schematic representation illustrating the high-level system architecture of the automated music composition and generation system (i.e. machine) of the present invention supporting the use of virtual-instrument music synthesis driven by linguistic and/or graphical icon based musical experience descriptors and, wherein linguistic-based musical experience descriptors, and a video, audio-recording, image, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.
Figure 26A:
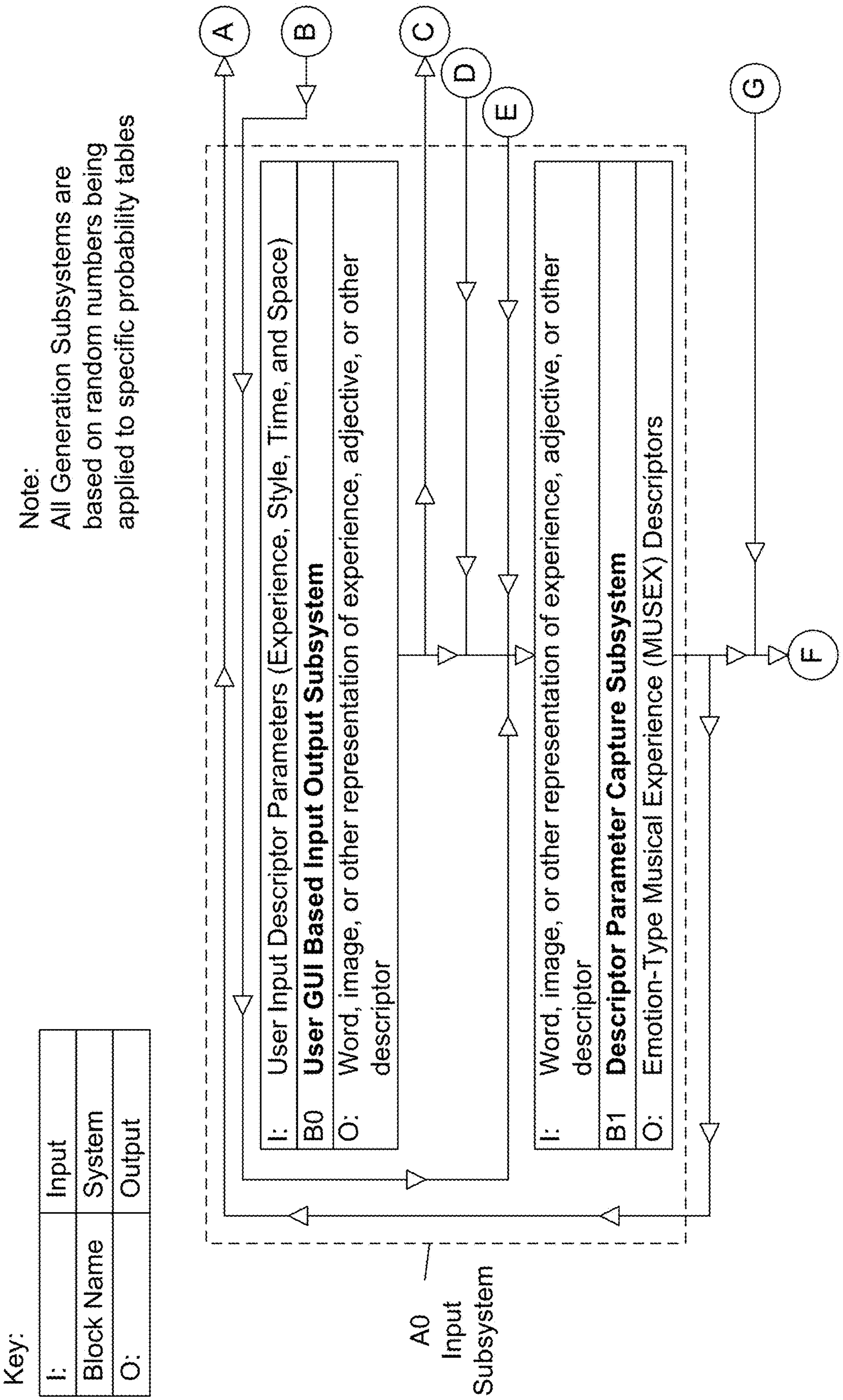
FIGS. 26A, 26B, 26C, 26D, 26E, 26F, 26G, 26H, 26I, 26J, 26K, 26L, 26M, 26N, 26O and 26P, taken together, provide a detailed system diagram showing each subsystem in FIGS. 25A and 25B configured together with other subsystems in accordance with the principles of the present invention, so that musical descriptors provided to the user GUI-Based Input Output System B0 are distributed to their appropriate subsystems for use in the automated music composition and generation process of the present invention.
Figure 26B:
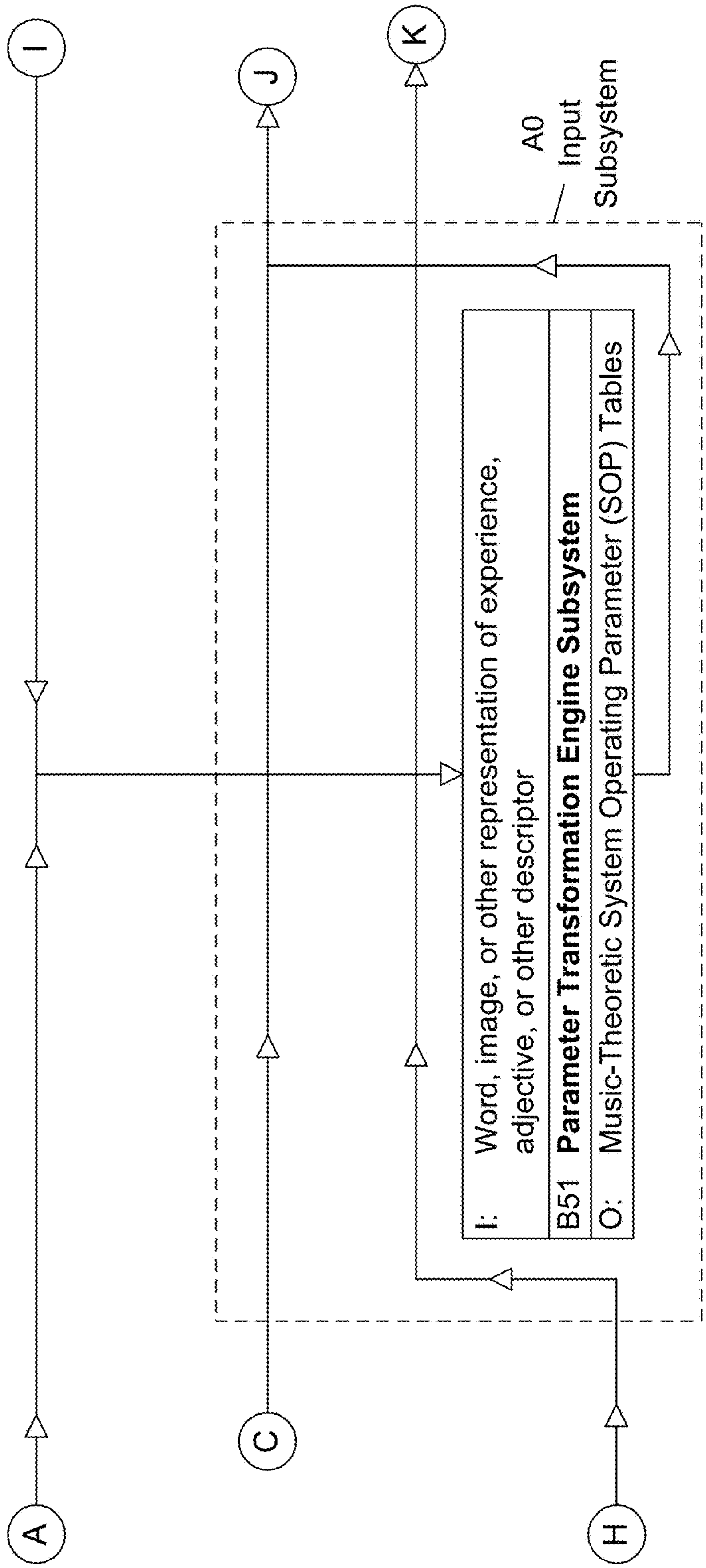
Figure 26C:
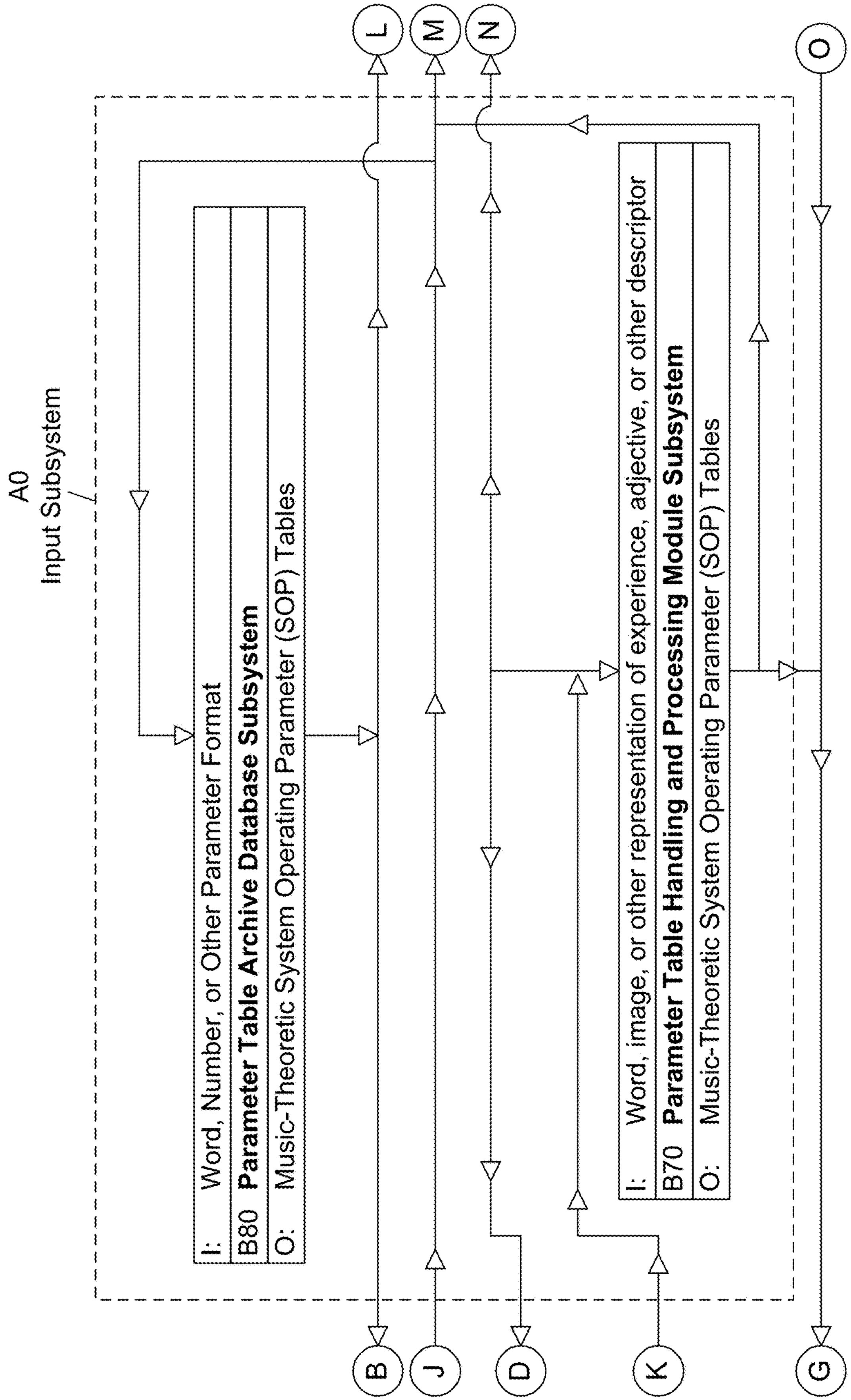
Figure 26D:
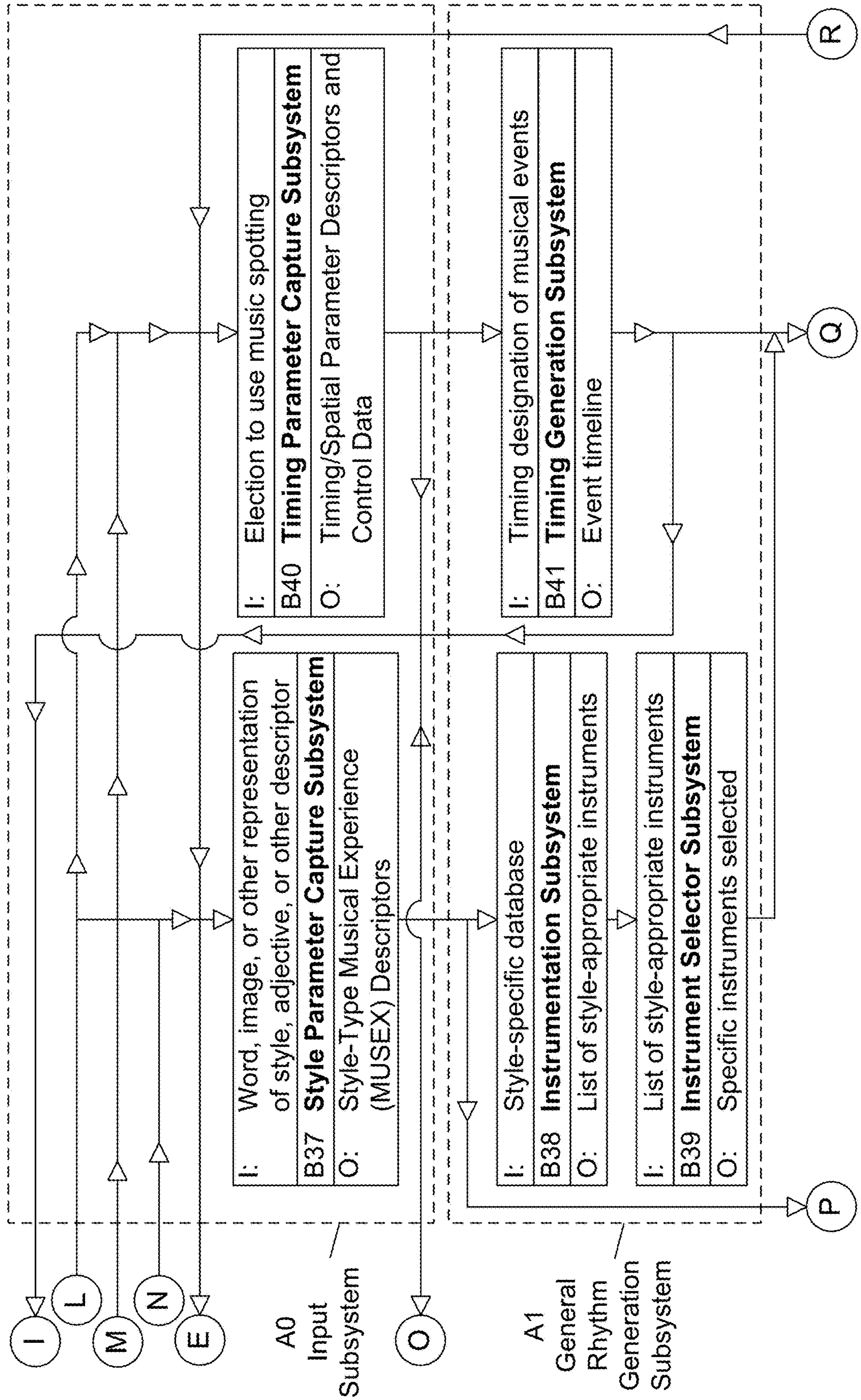
Figure 26E:
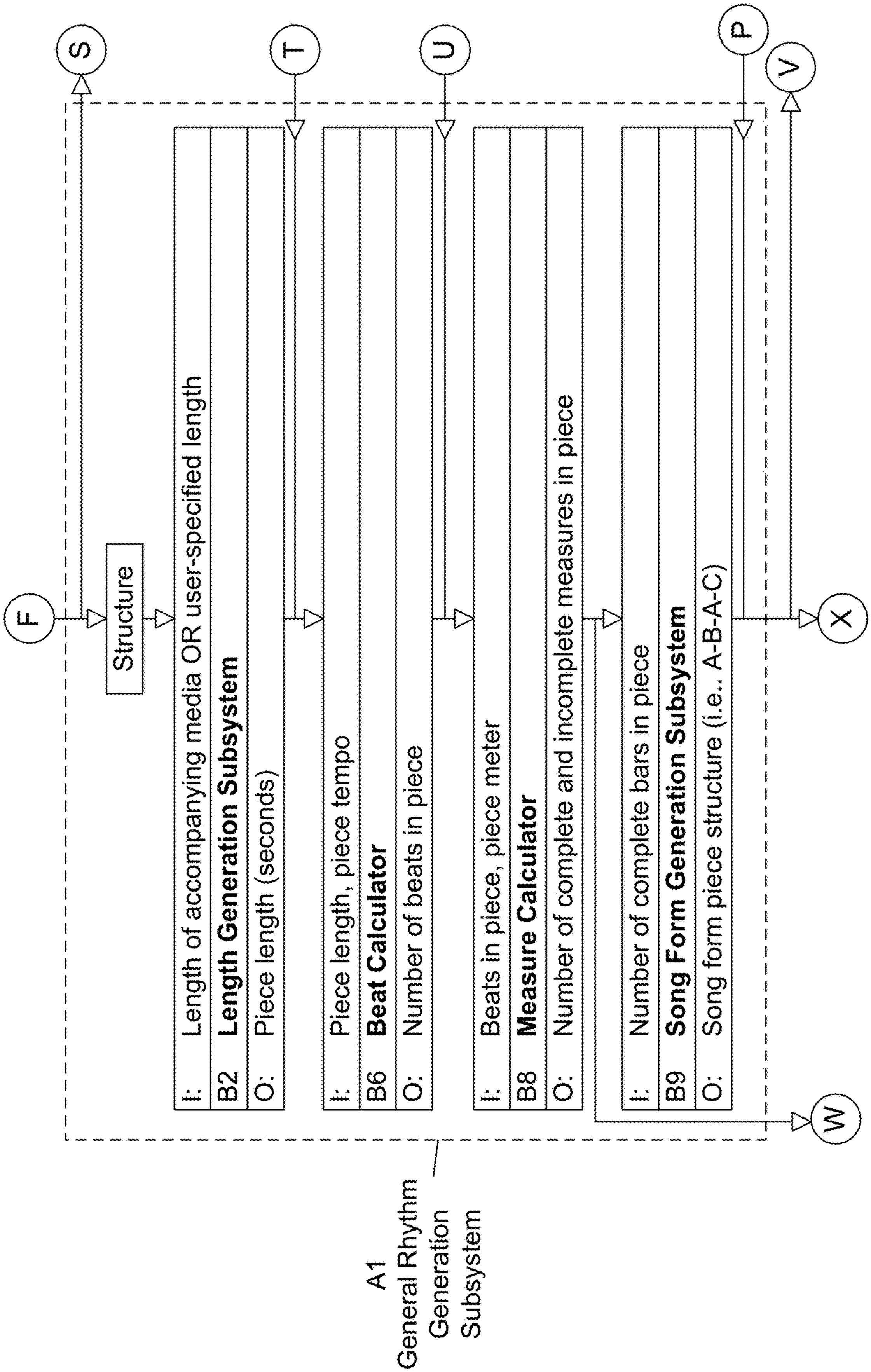
Figure 26F:
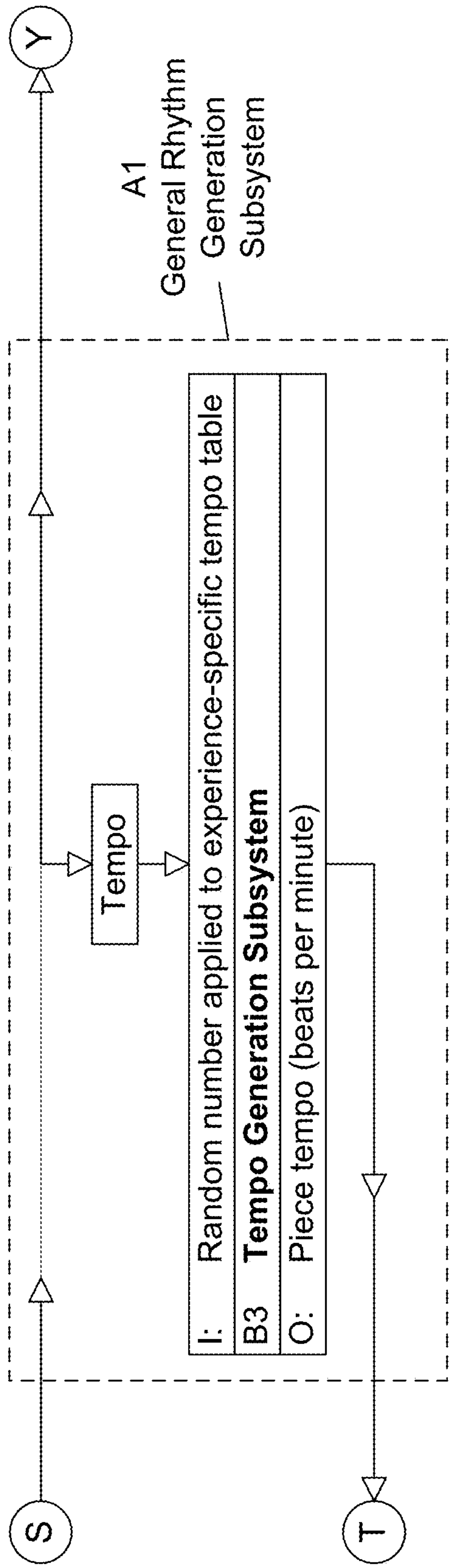
Figure 26G:
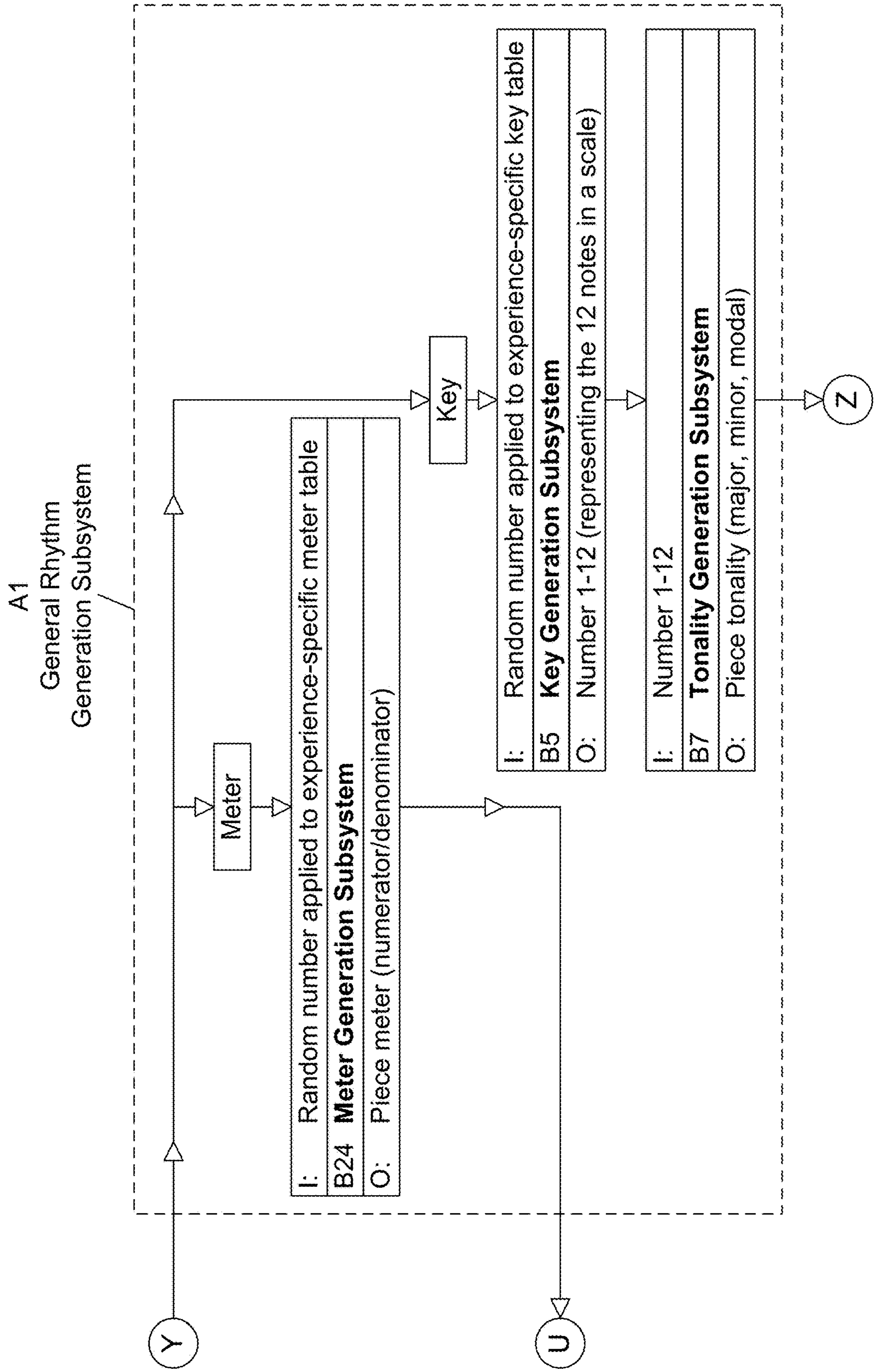
Figure 26H:
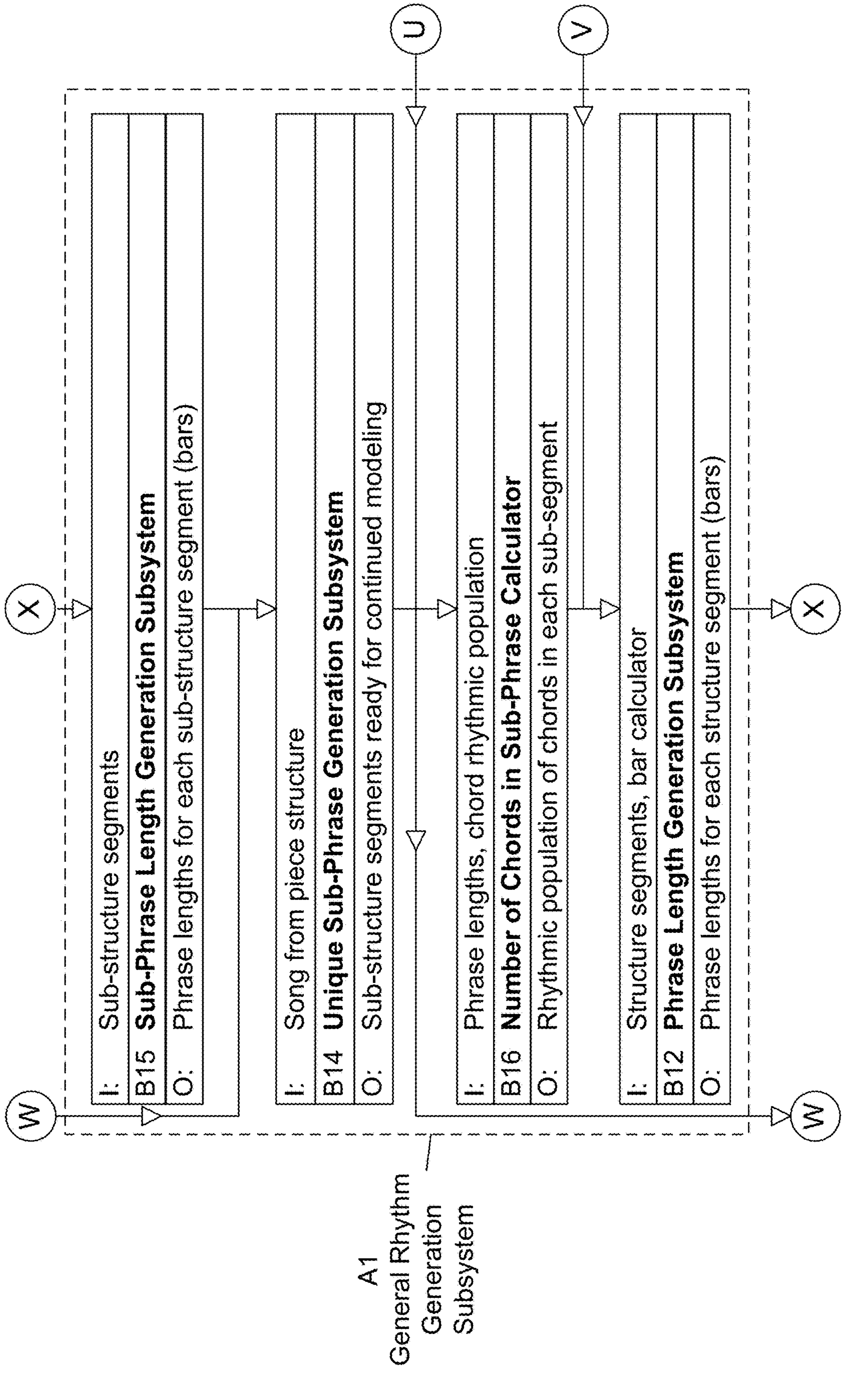
Figure 26I:
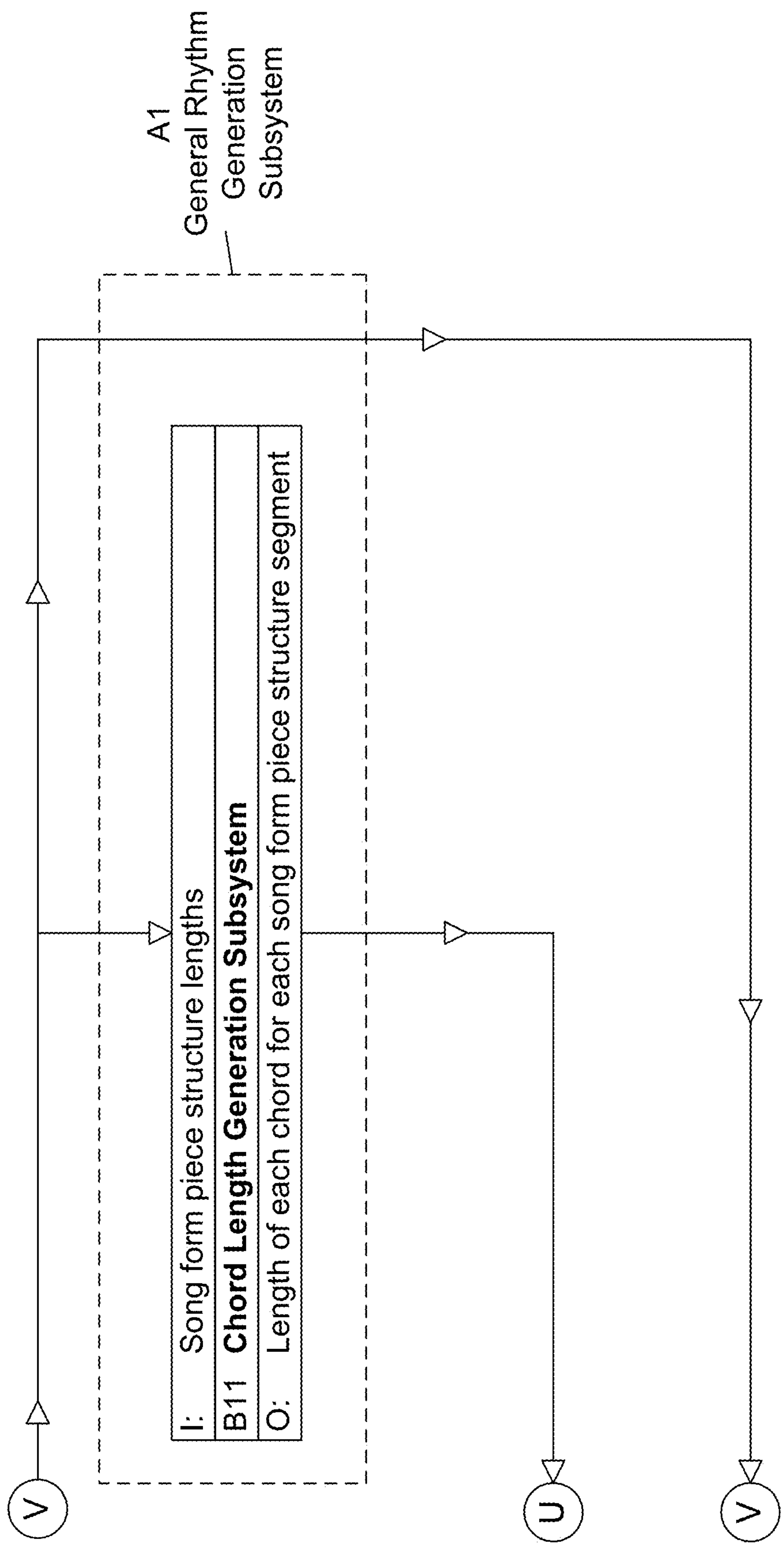
Figure 26J:
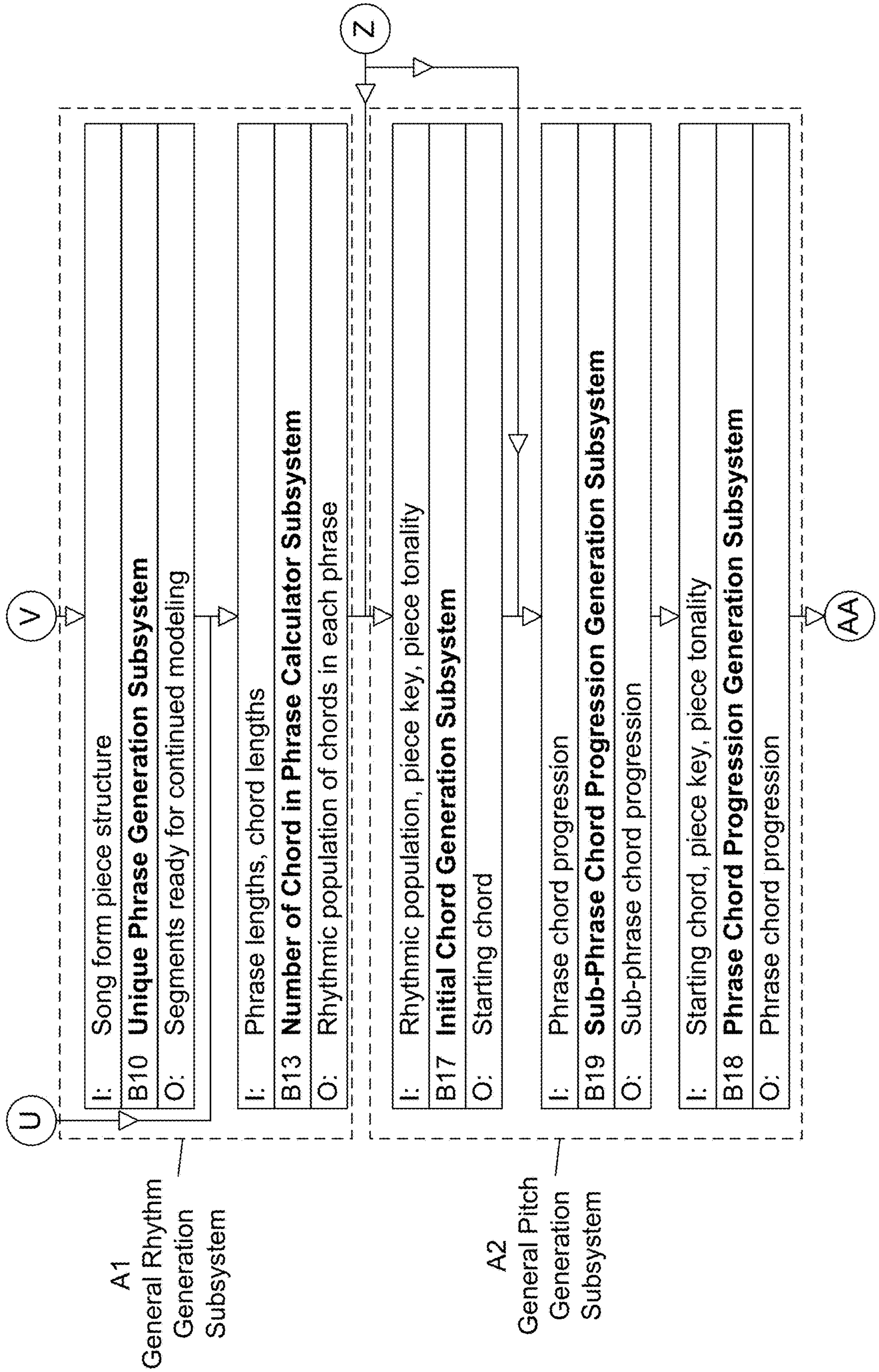
Figure 26K:
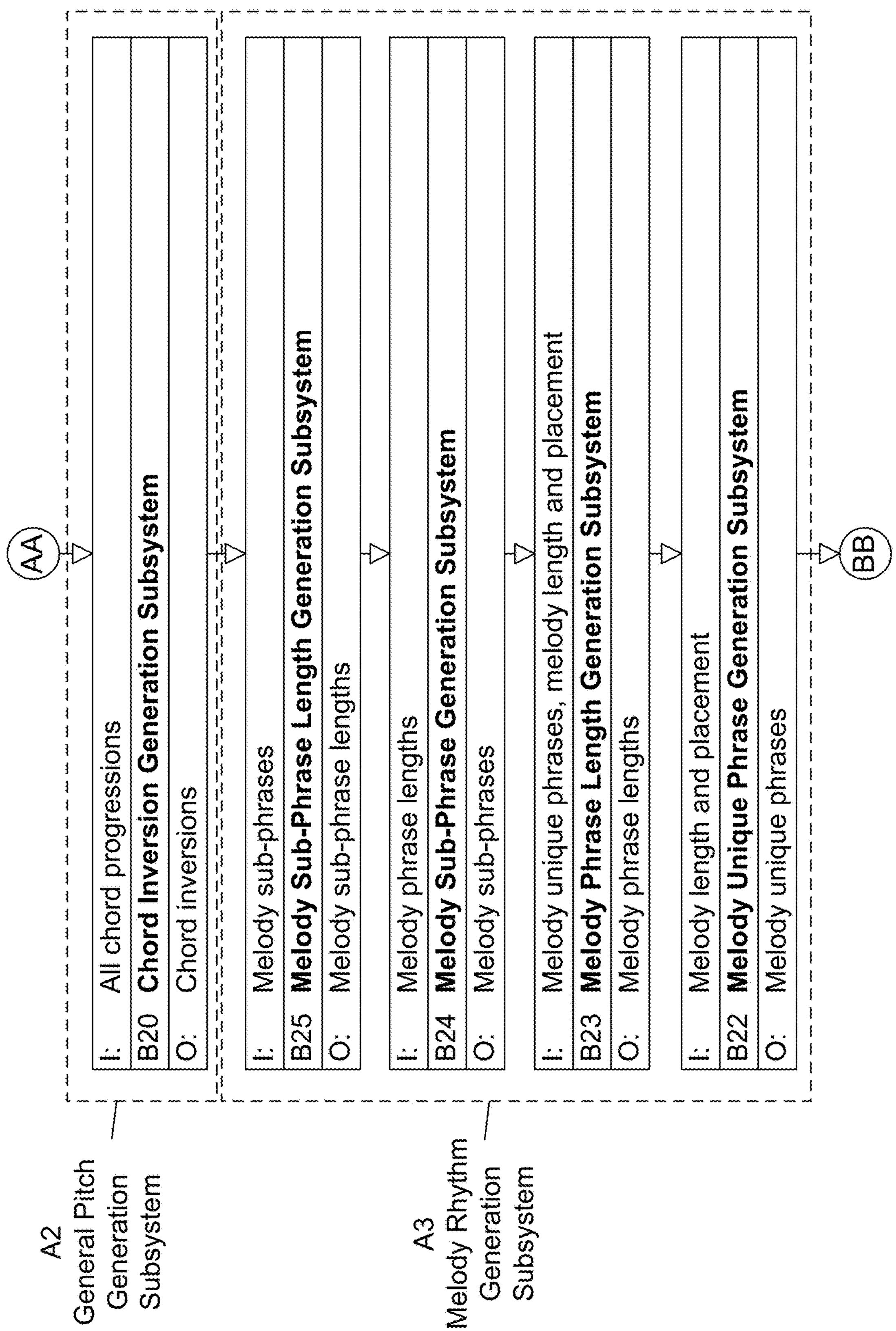
Figure 26L:
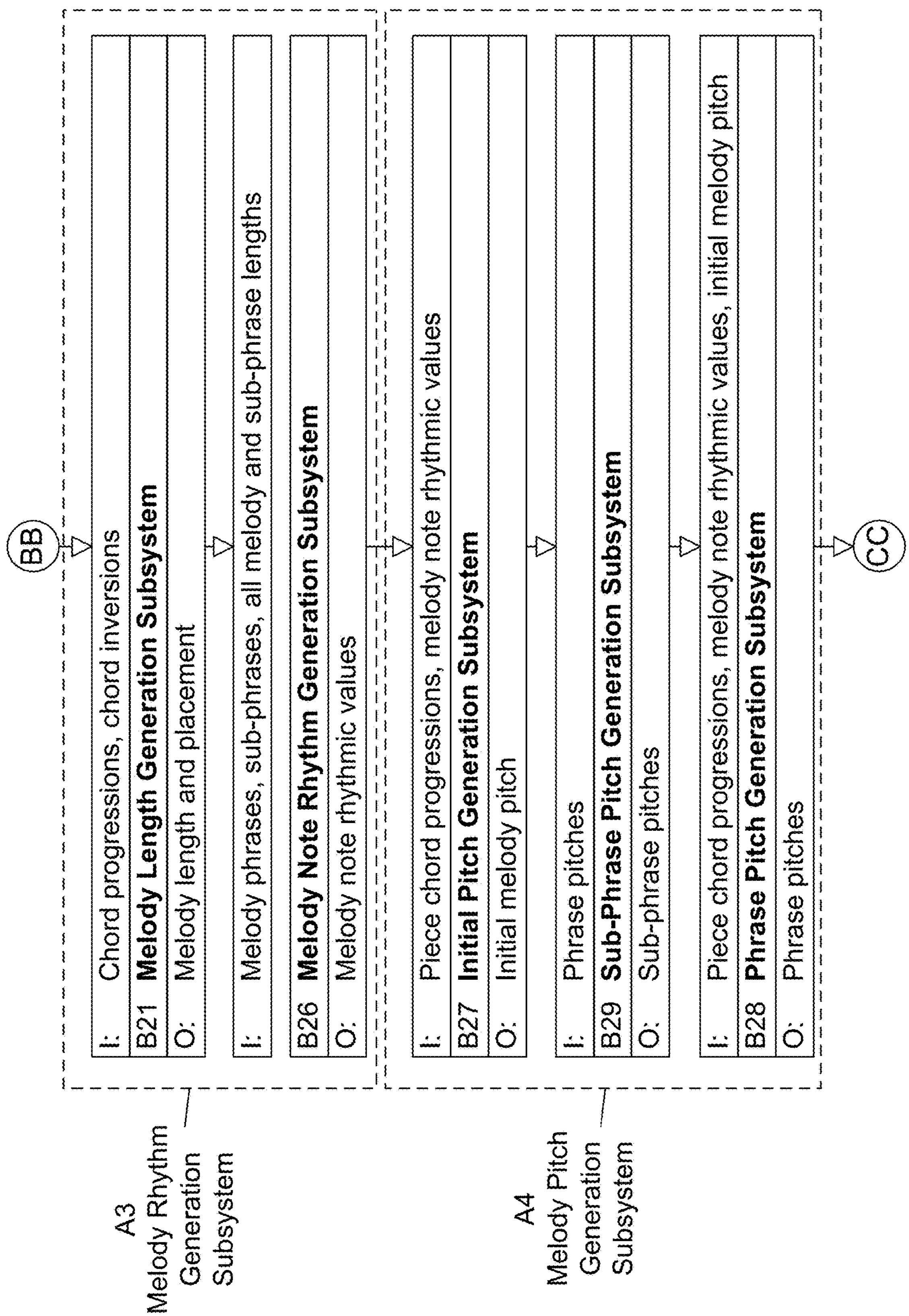
Figure 26M:
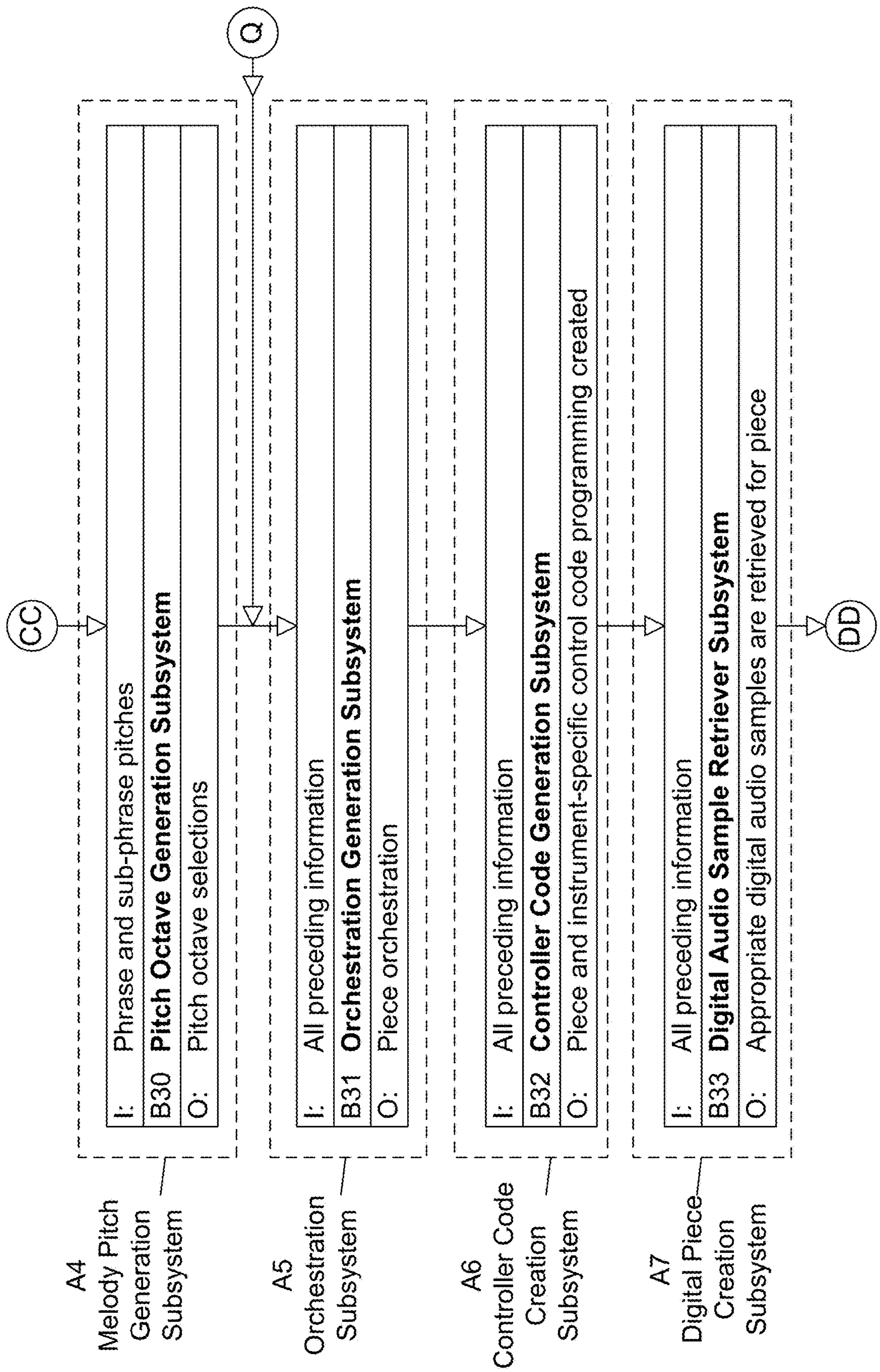
Figure 26N:
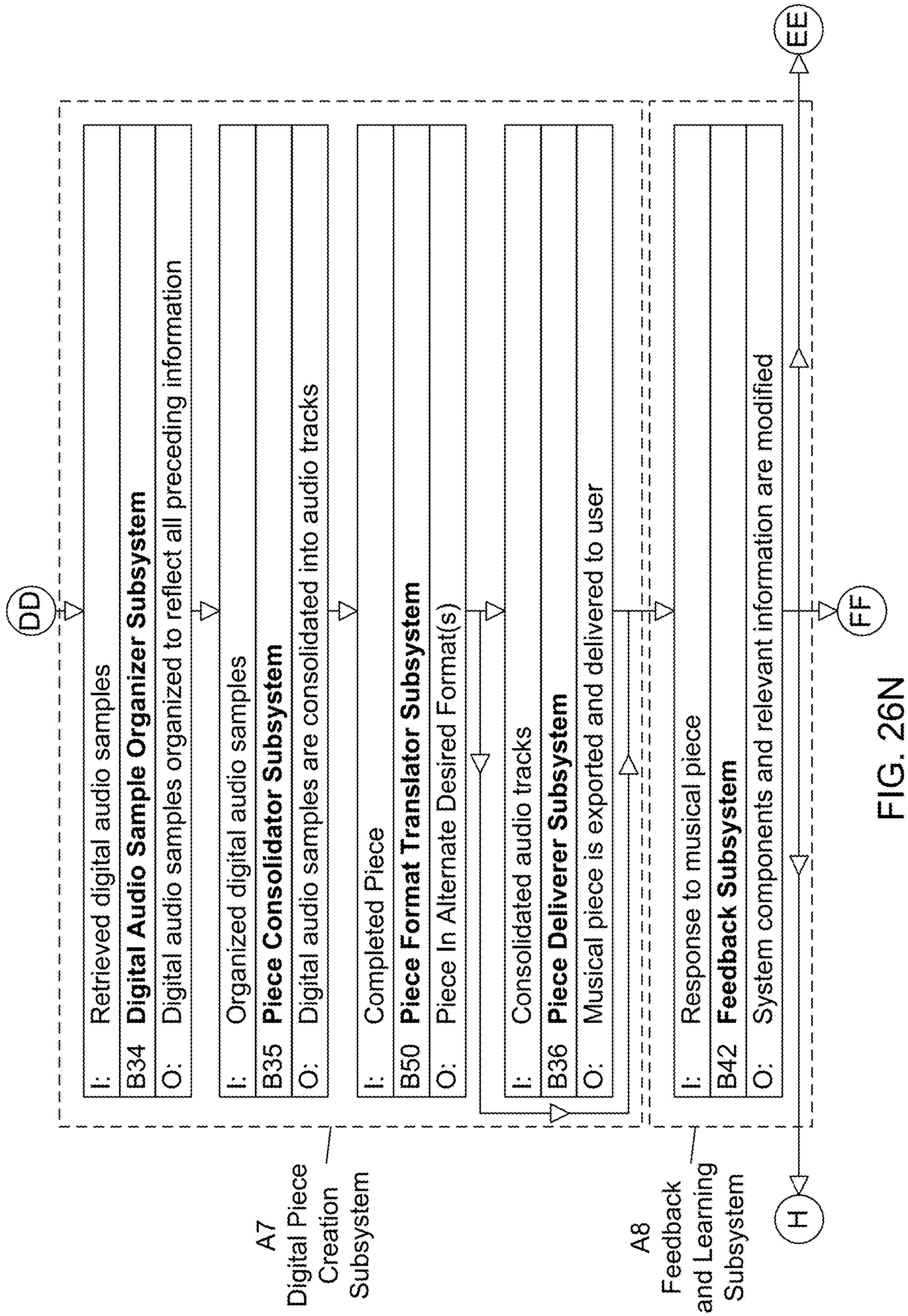
Figure 26O:
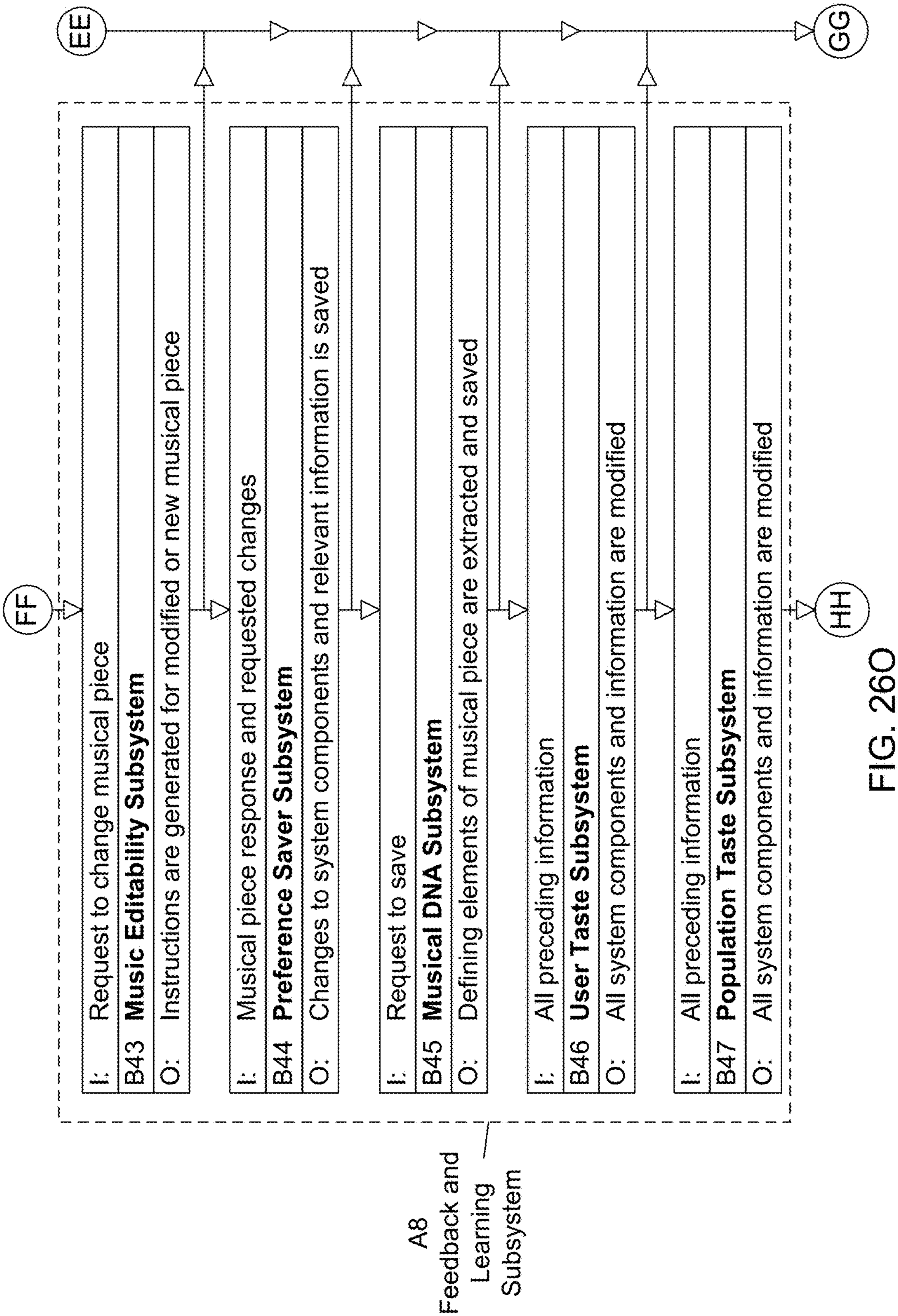
Figure 26P:
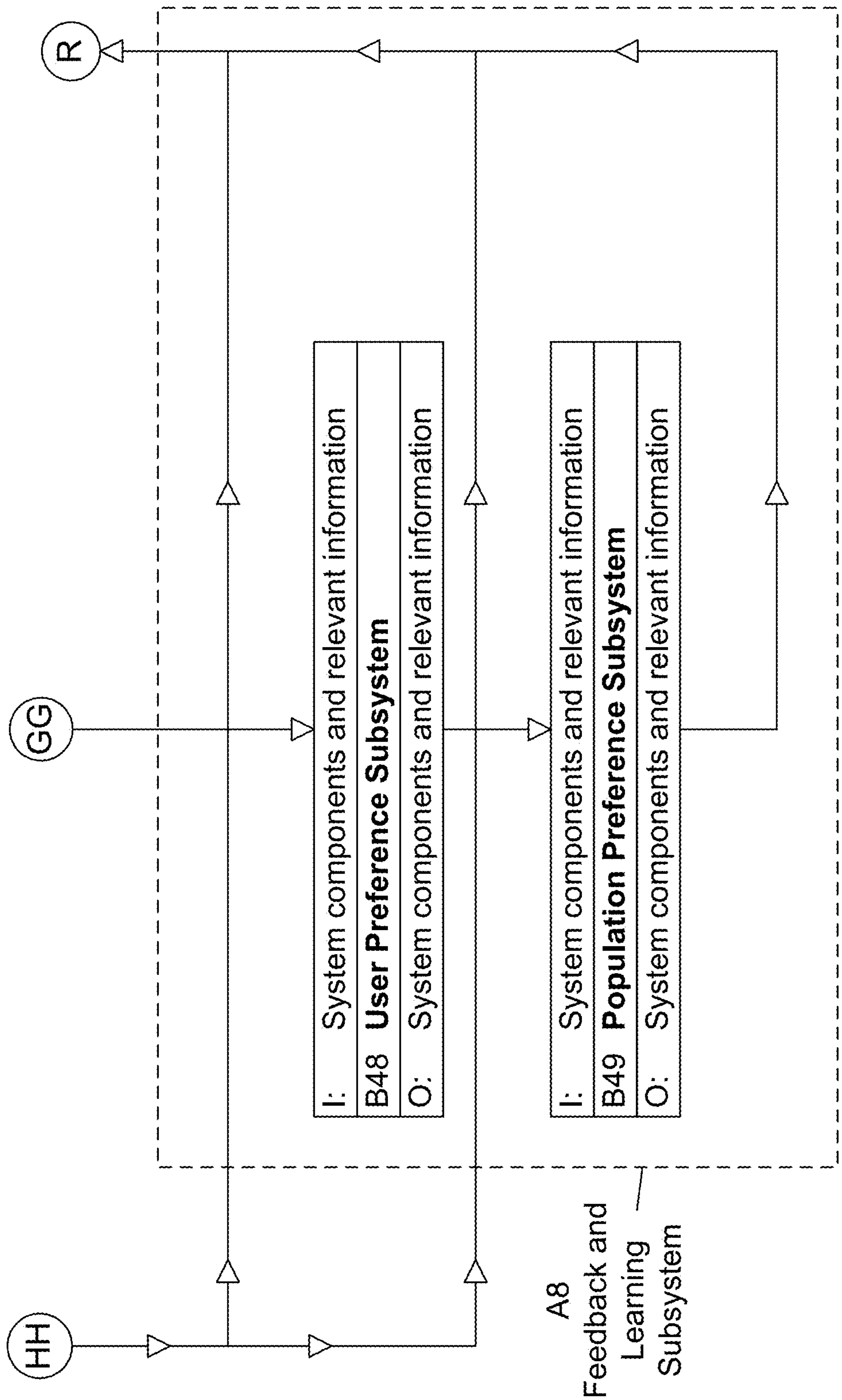
Figure 28P:
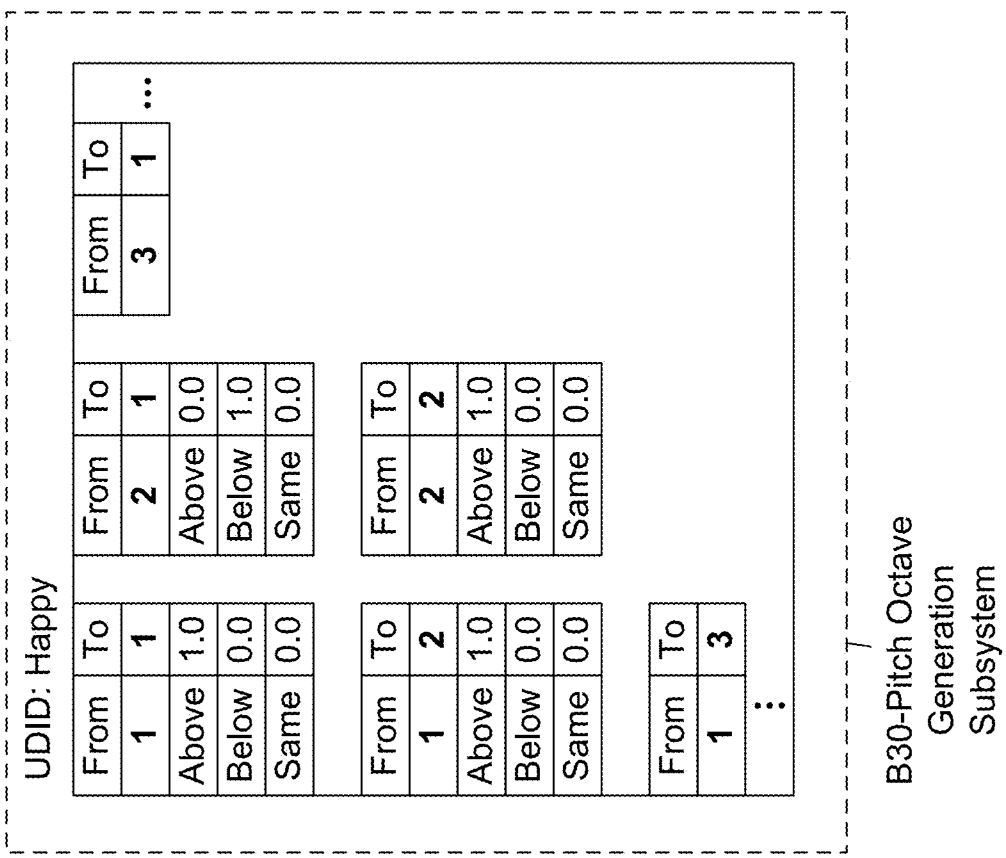
FIG. 28A shows a schematic representation of a probability-based parameter table maintained in the Tempo Generation Subsystem (B3) of the Automated Music Composition and Generation Engine of the present invention, configured for the exemplary emotion-type musical experience descriptors—HAPPY, SAD, ANGRY, FEARFUL, LOVE—specified in the emotion descriptor table in FIGS. 32A through 32F, and used during the automated music composition and generation process of the present invention.
FIG. 28B shows a schematic representation of a probability-based parameter table maintained in the Length Generation Subsystem (B2) of the Automated Music Composition and Generation Engine of the present invention, configured for the exemplary emotion-type musical experience descriptors—HAPPY, SAD, ANGRY, FEARFUL, LOVE—specified in the emotion descriptor table in FIGS. 32A through 32F and used during the automated music composition and generation process of the present invention.
FIG. 28C shows a schematic representation of a probability-based parameter table maintained in the Meter Generation Subsystem (B4) of the Automated Music Composition and Generation Engine of the present invention, configured for the exemplary emotion-type musical experience descriptors—HAPPY, SAD, ANGRY, FEARFUL, LOVE—specified in the emotion descriptor table in FIGS. 32A through 32F and used during the automated music composition and generation process of the present invention.
FIG. 28D shows a schematic representation of a probability-based parameter table maintained in the Key Generation Subsystem (B5) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention.
FIG. 28E shows a schematic representation of a probability-based parameter table maintained in the Tonality Generation Subsystem (B7) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention.
FIG. 28F shows a schematic representation of the probability-based parameter tables maintained in the Song Form Generation Subsystem (B9) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention.
FIG. 28G shows a schematic representation of a probability-based parameter table maintained in the Sub-Phrase Length Generation Subsystem (B15) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention.
Figure 28S:
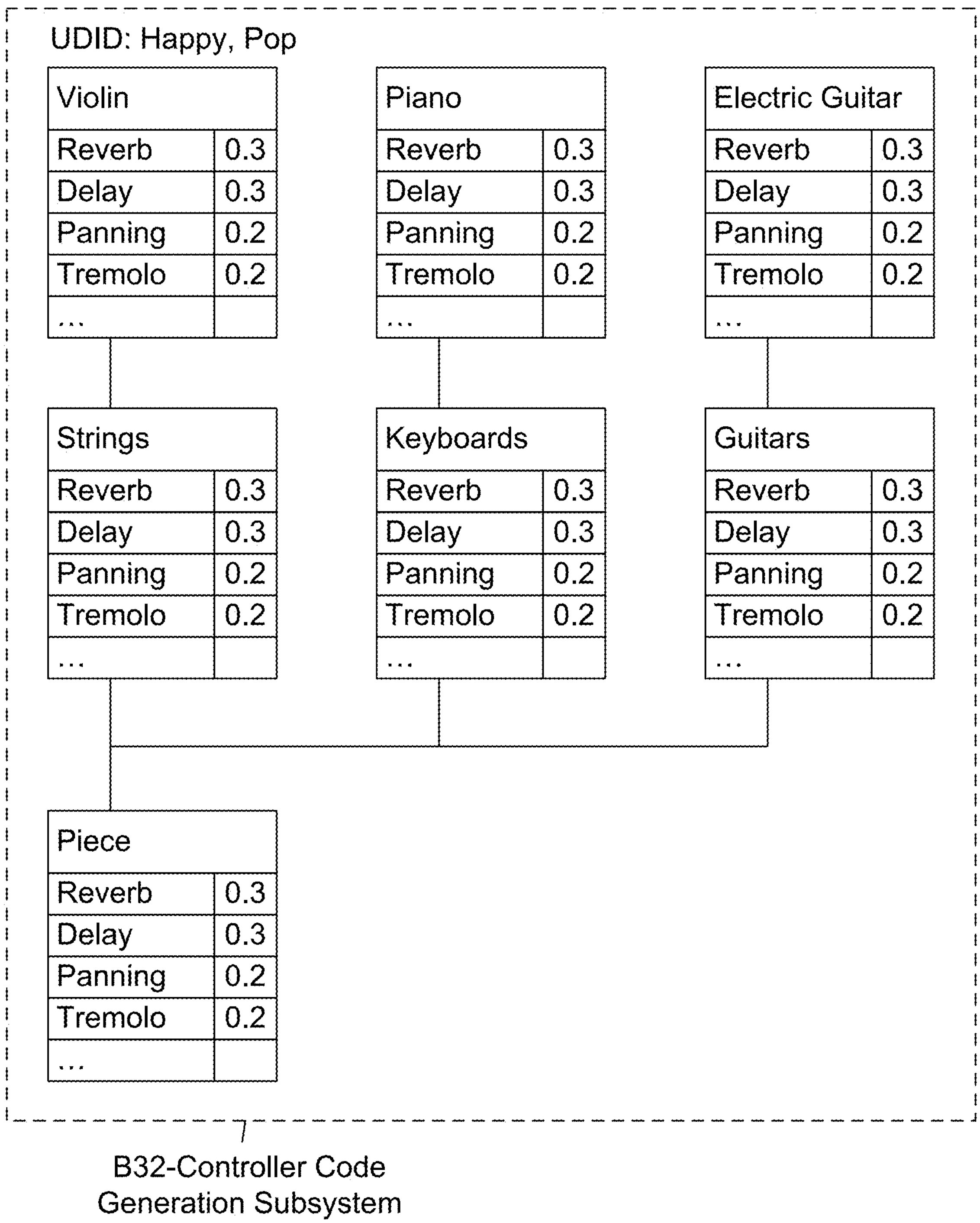
Figure 29A:
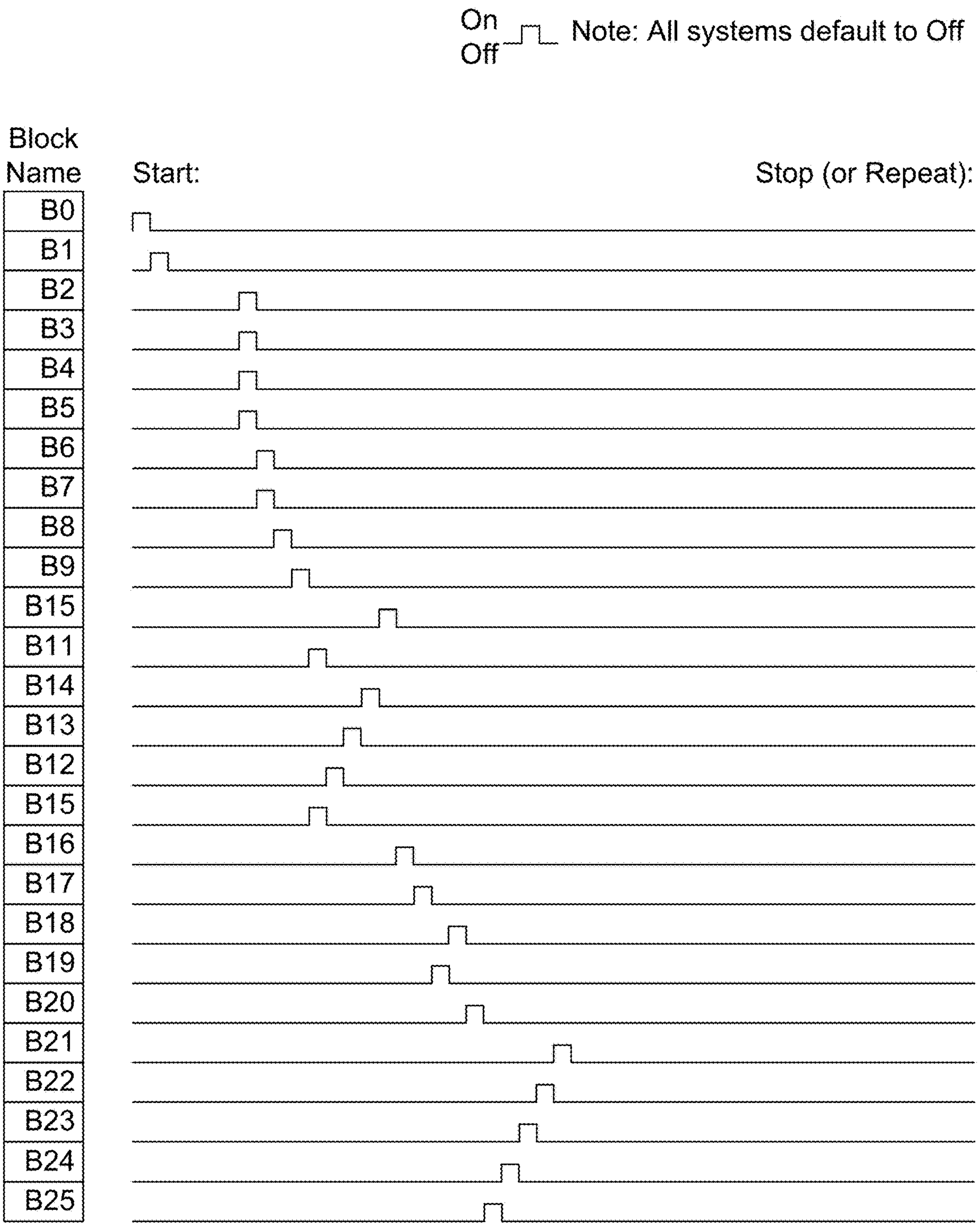
Figure 29B:
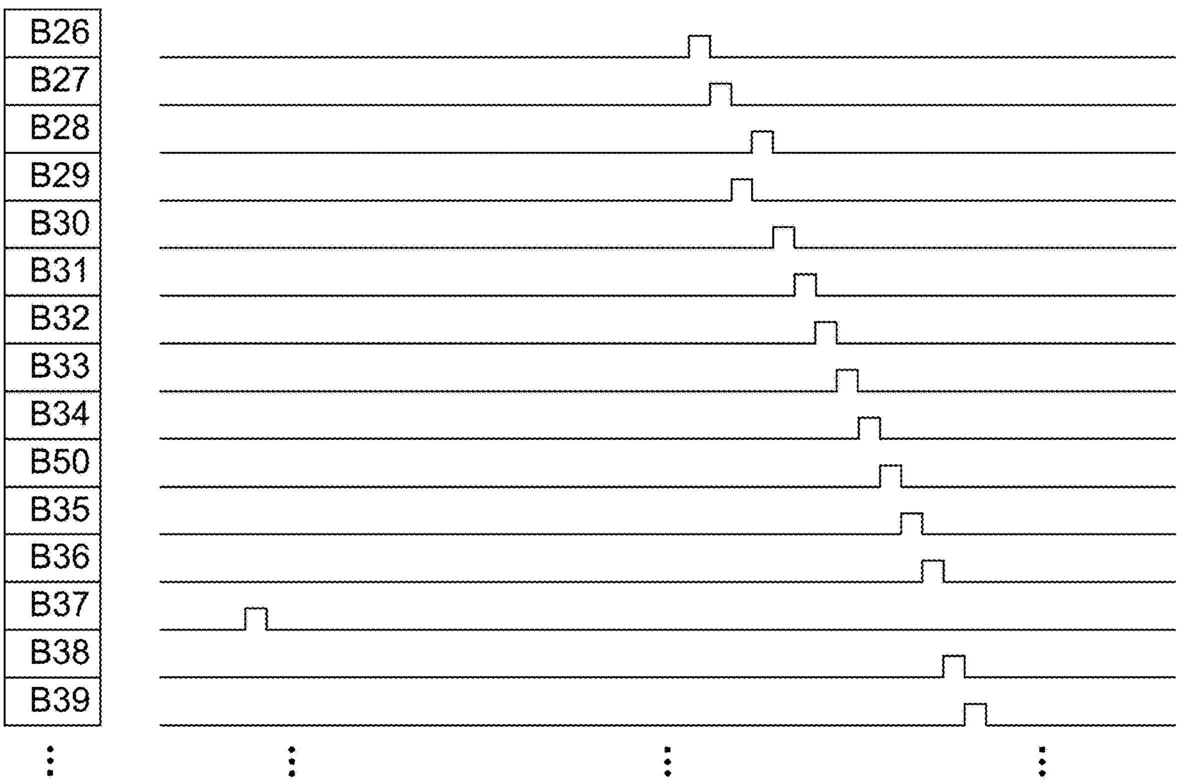
Figure 34:
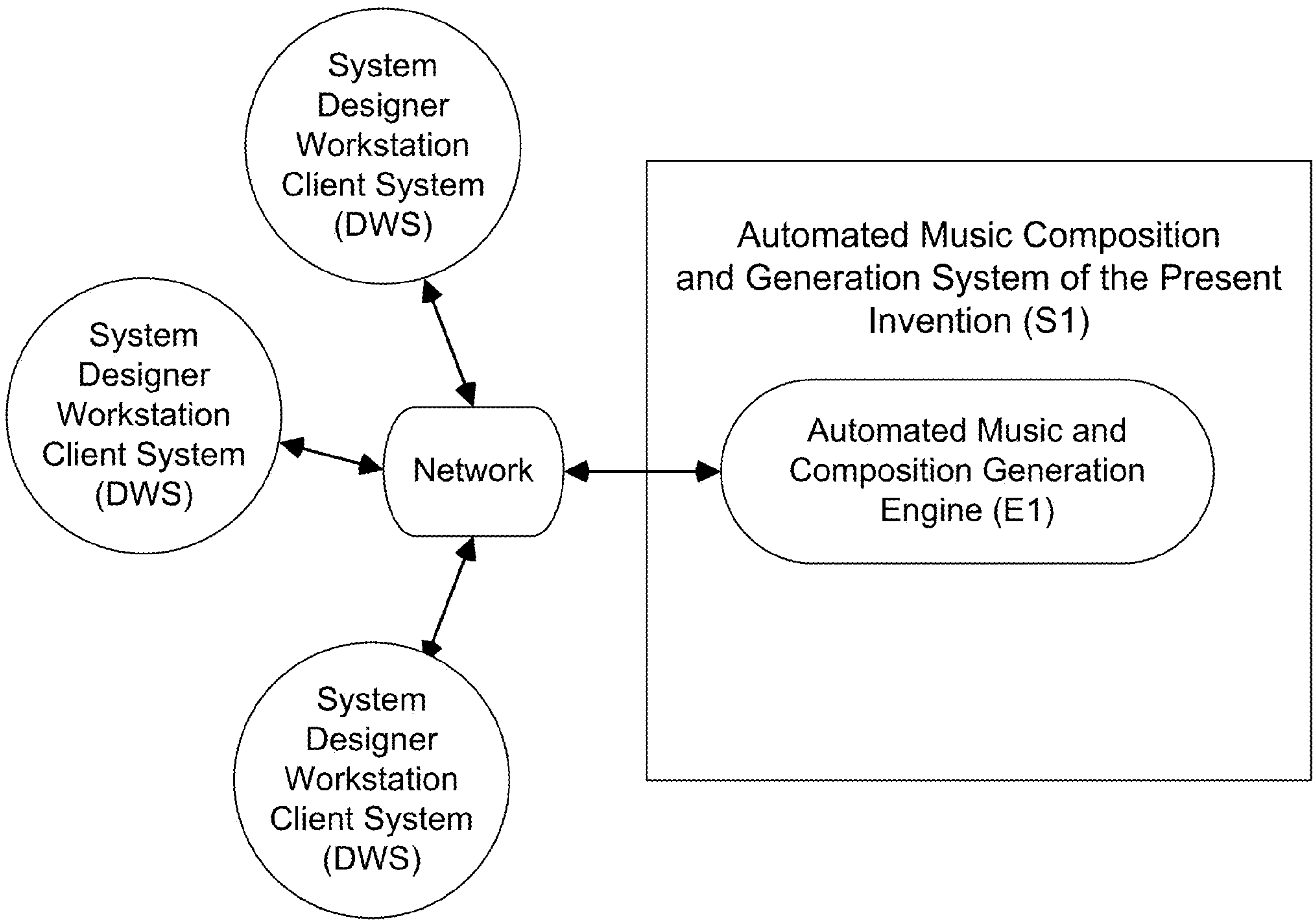
Figure 35A:
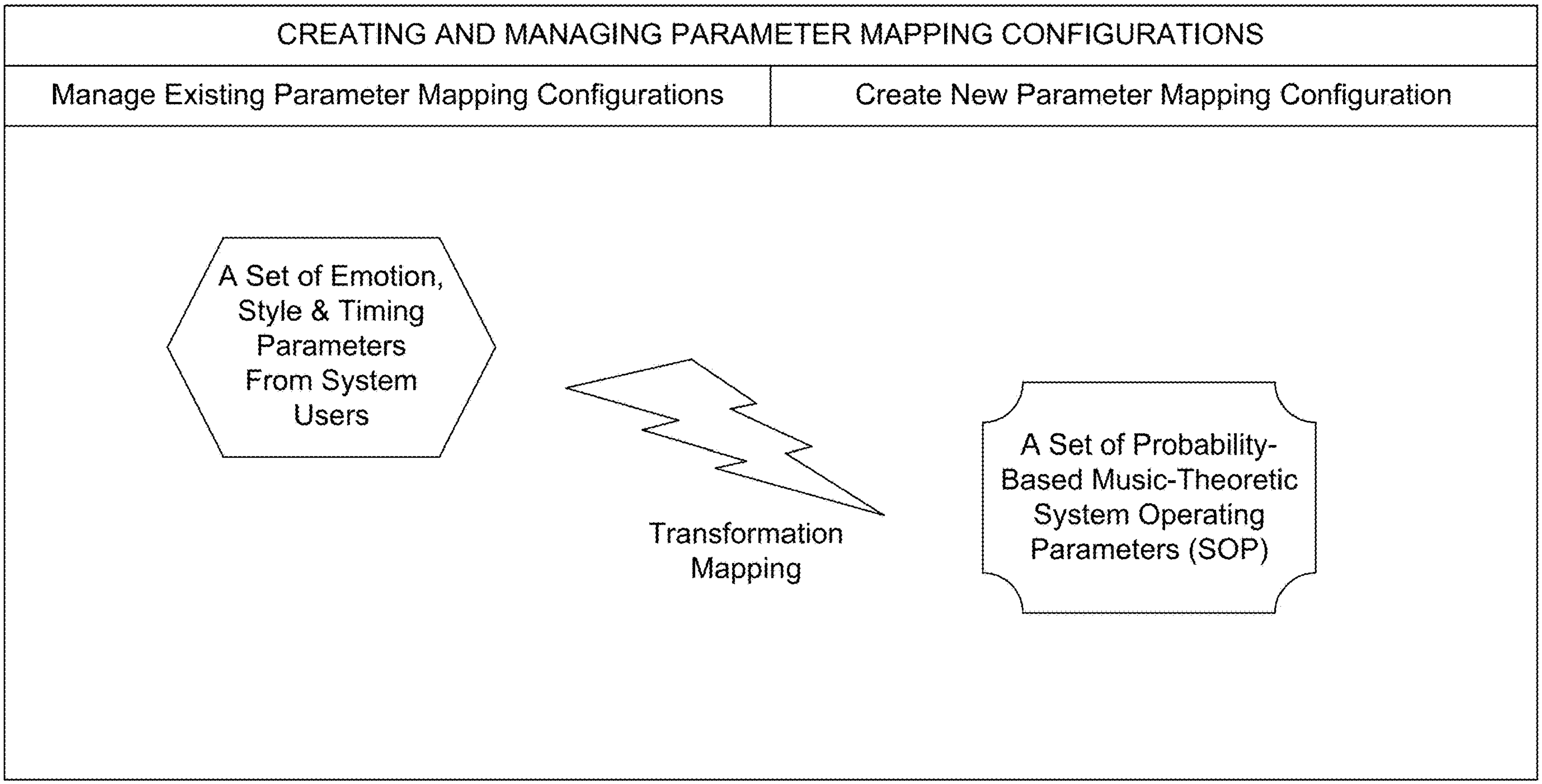
Figure 36A:
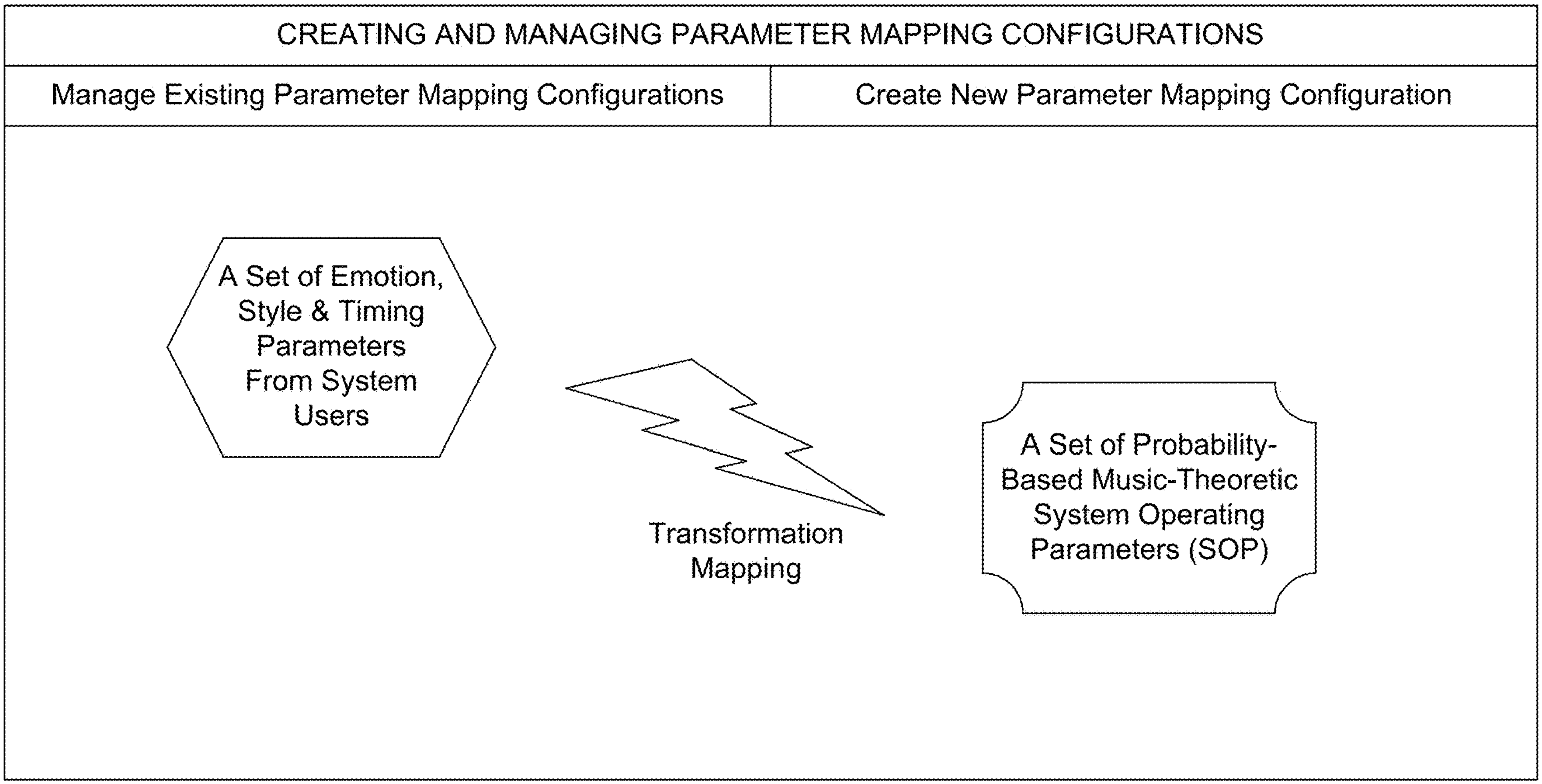
Figure 37:
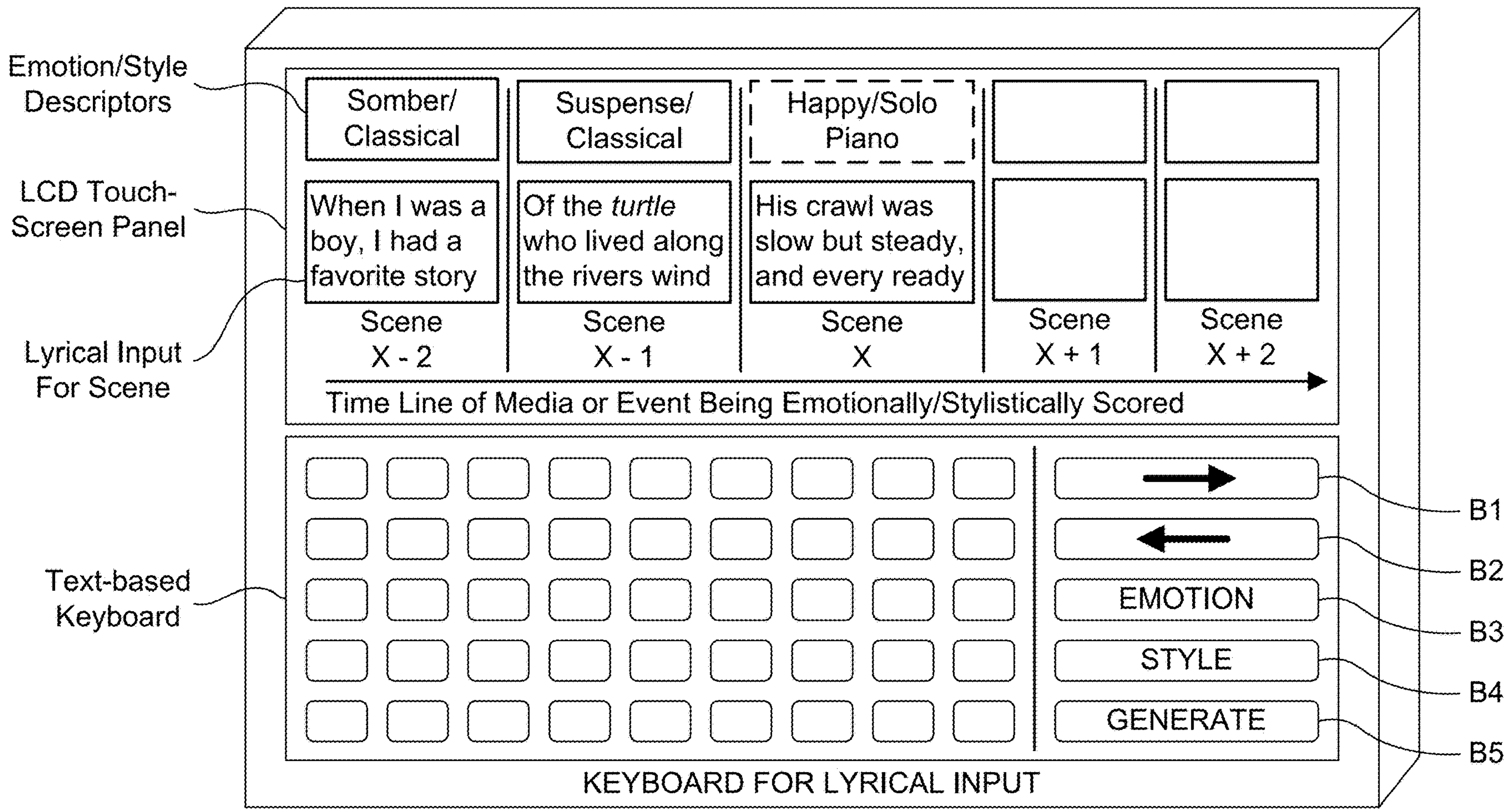
Figure 38:
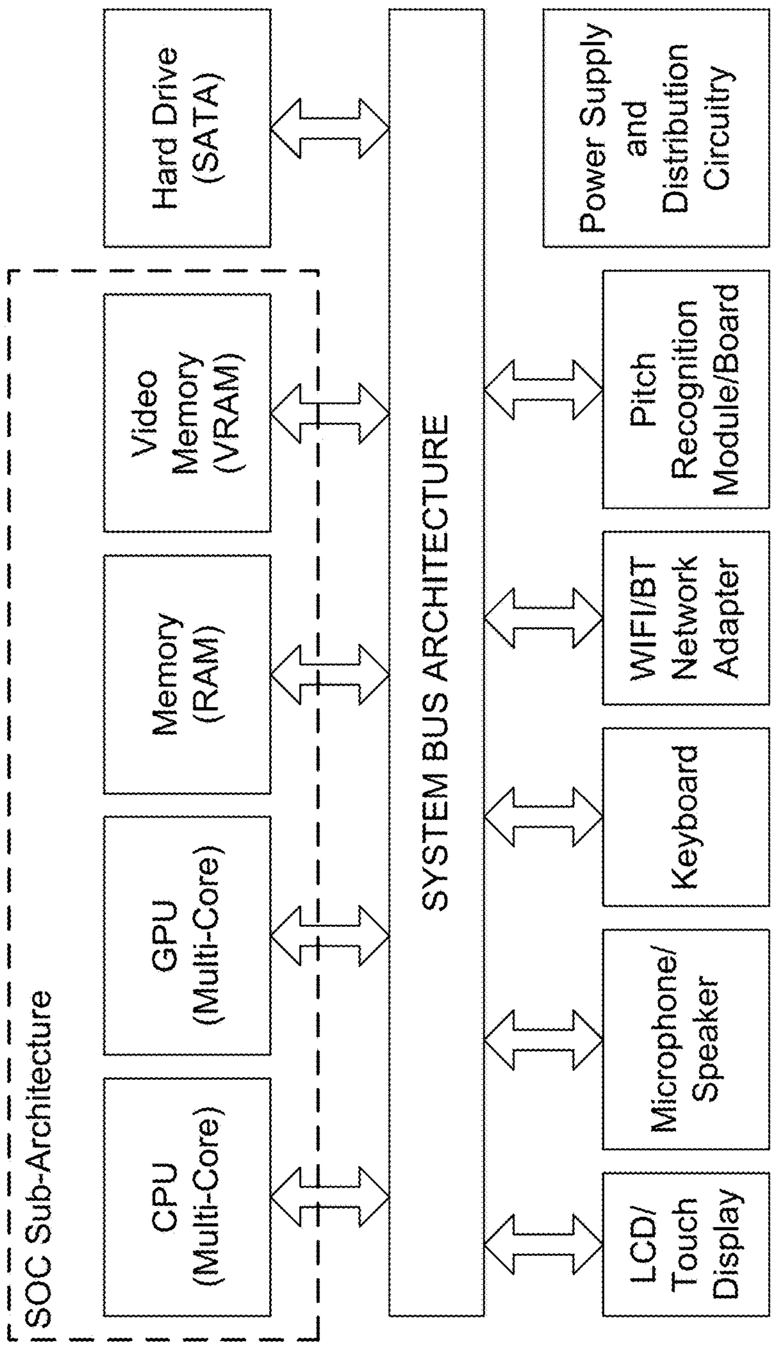
Figure 39:
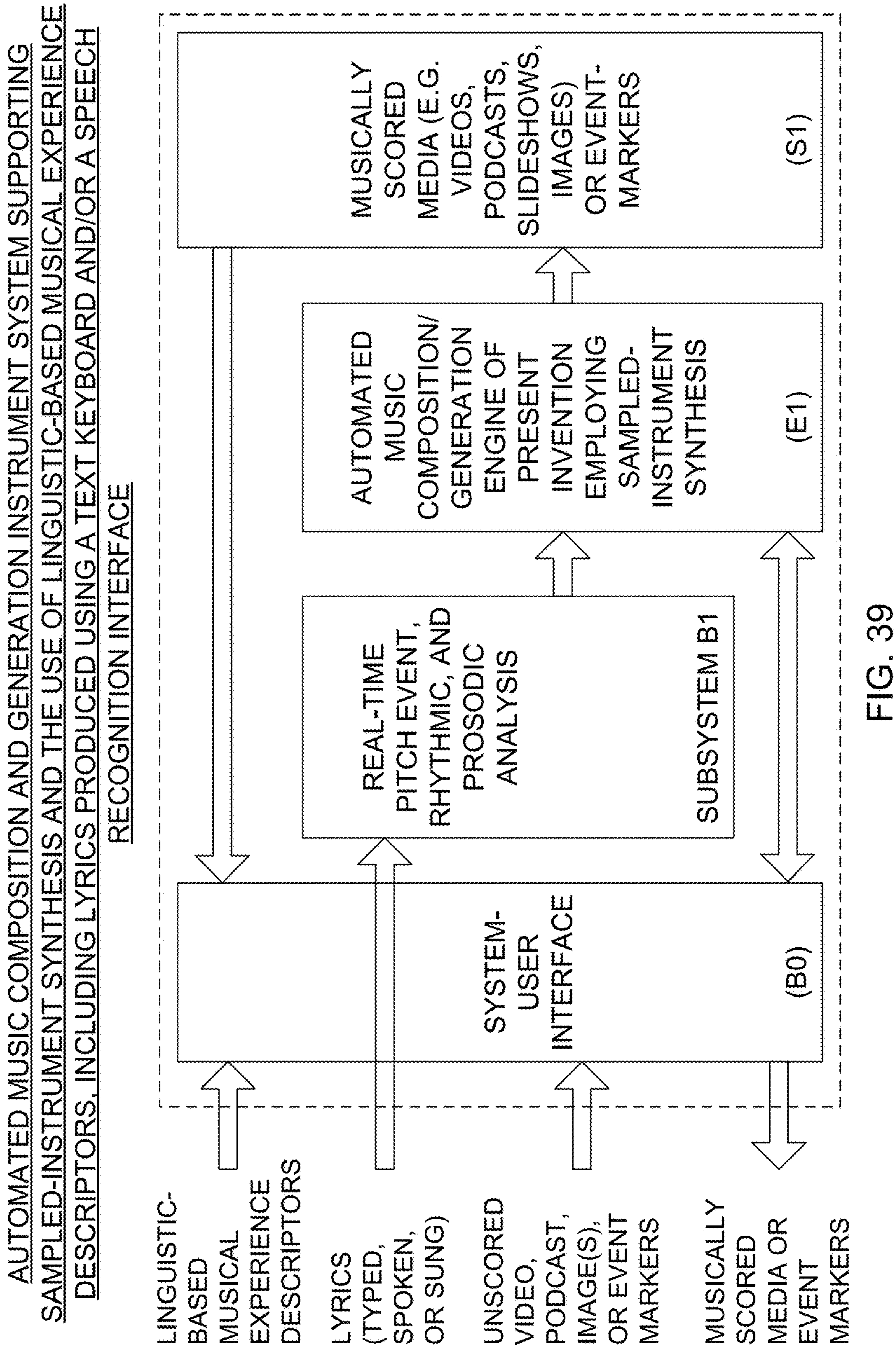
Figure 39A:
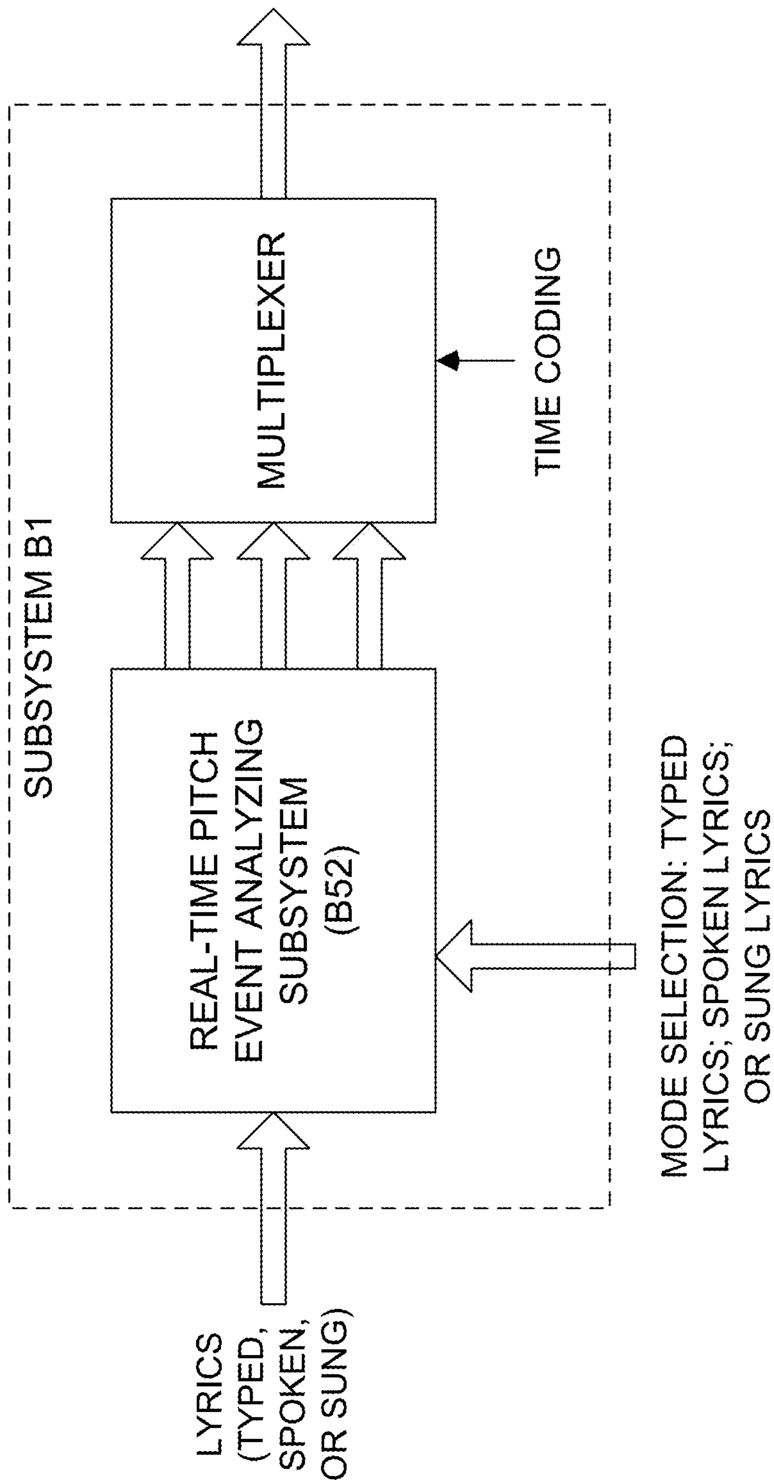
Figure 39B:
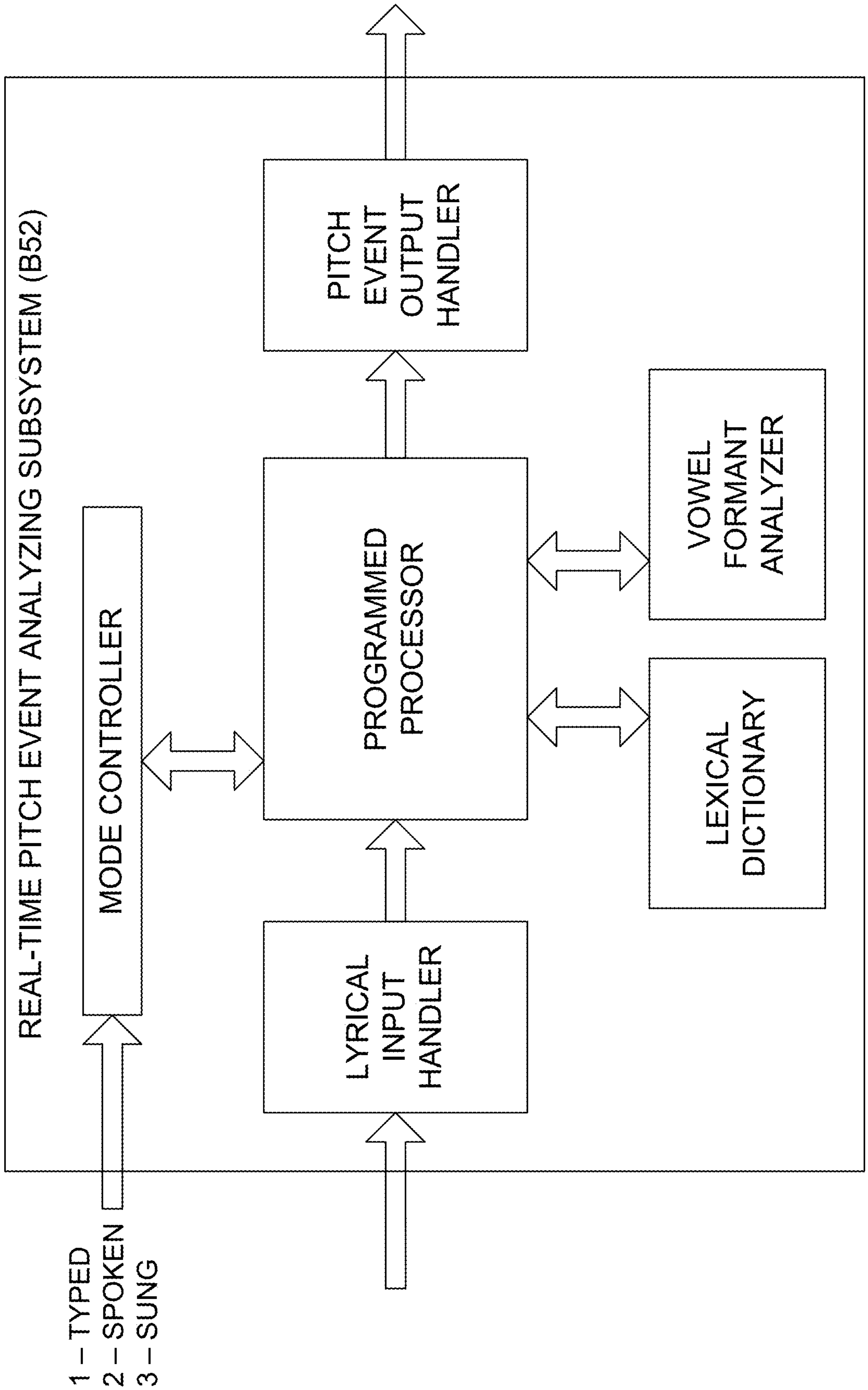
Figure 40:
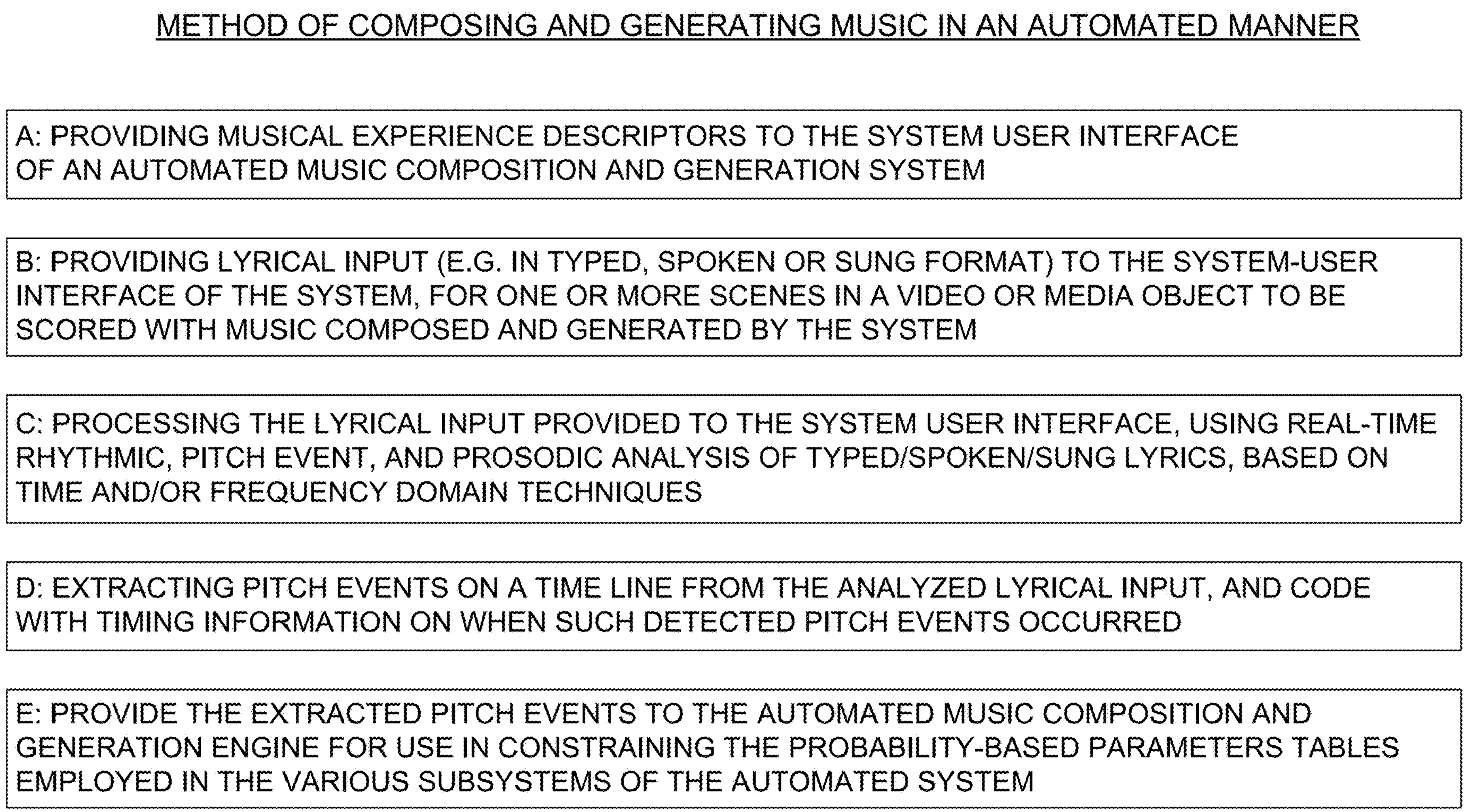
Figure 45:
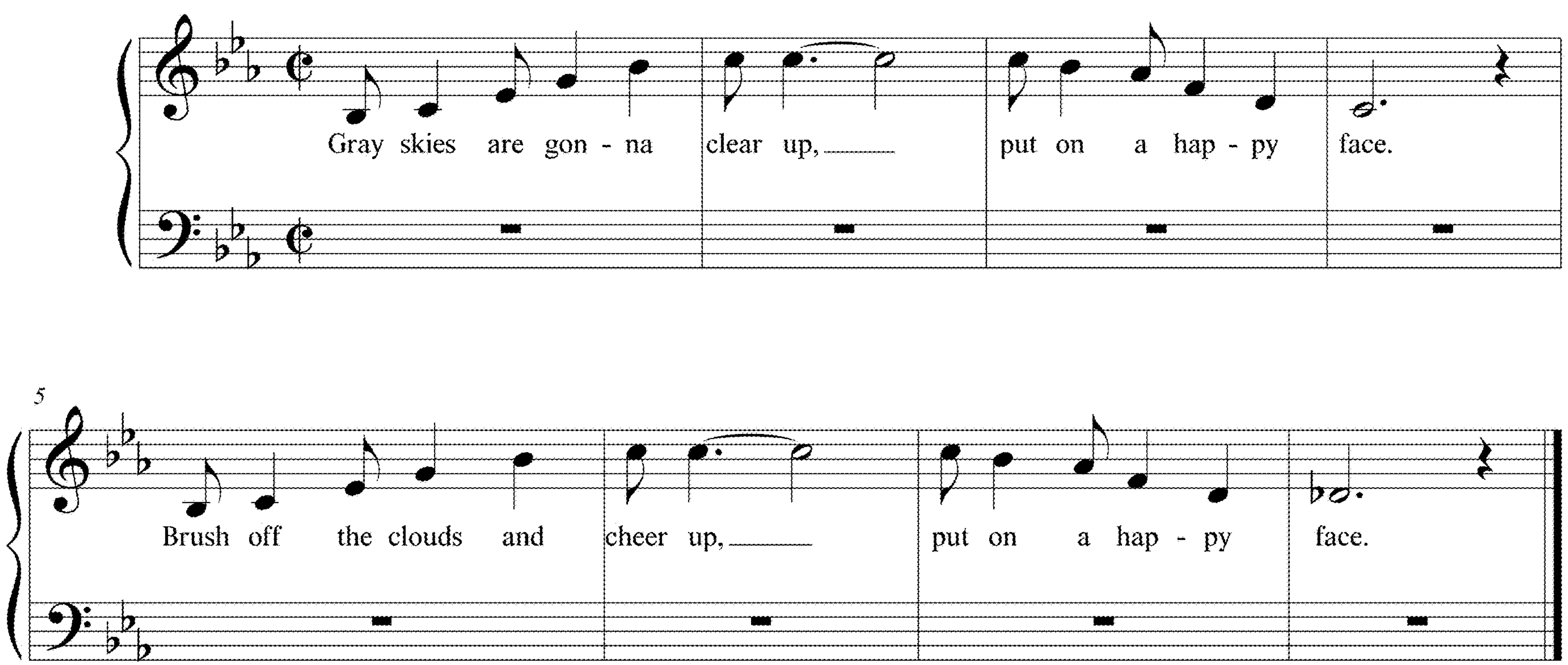
Figure 49:
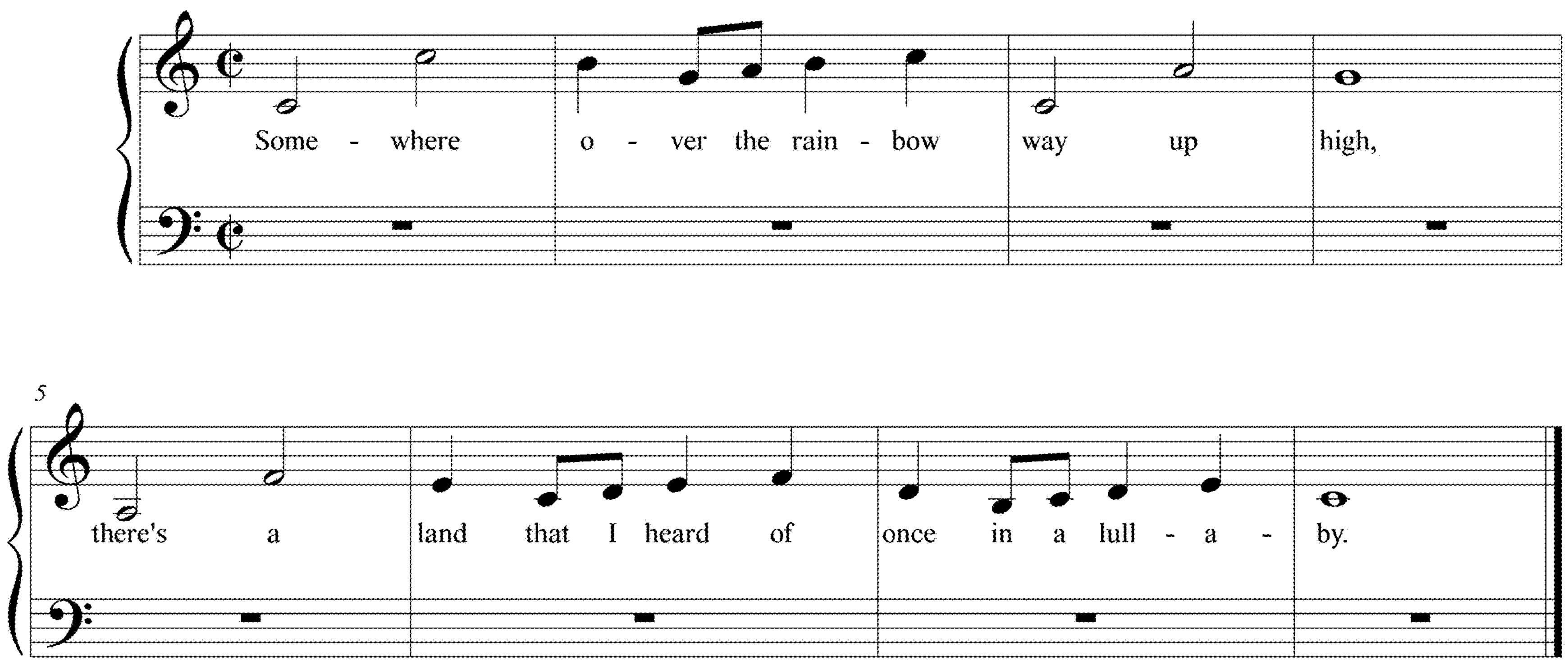

FIG. 28H shows a schematic representation of the probability-based parameter tables maintained in the Chord Length Generation Subsystem (B11) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28I shows a schematic representation of the probability-based parameter tables maintained in the Initial General Rhythm Generation Subsystem (B17) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIGS. 28J1 and 28J2, taken together, show a schematic representation of the probability-based parameter tables maintained in the Sub-Phrase Chord Progression Generation Subsystem (B19) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28K shows a schematic representation of probability-based parameter tables maintained in the Chord Inversion Generation Subsystem (B20) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28L1 shows a schematic representation of probability-based parameter tables maintained in the Melody Sub-Phrase Length Progression Generation Subsystem (B25) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28L2 shows a schematic representation of probability-based parameter tables maintained in the Melody Sub-Phrase Generation Subsystem (B24) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28M shows a schematic representation of probability-based parameter tables maintained in the Melody Note Rhythm Generation Subsystem (B26) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28N shows a schematic representation of the probability-based parameter table maintained in the Initial Pitch Generation Subsystem (B27) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIGS. 28O1, 28O2 and 28O3, taken together, show a schematic representation of probability-based parameter tables maintained in the sub-phrase pitch generation subsystem (B29) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28P shows a schematic representation of the probability-based parameter tables maintained in the Pitch Octave Generation Subsystem (B30) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIGS. 28Q1A and 28Q1B, taken together, show a schematic representation of the probability-based instrument tables maintained in the Instrument Subsystem (B38) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIGS. 28Q2A and 28Q2B, taken together, show a schematic representation of the probability-based instrument selector tables maintained in the Instrument Selector Subsystem (B39) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIGS. 28R1, 28R2 and 28R3, taken together, show a schematic representation of the probability-based parameter tables and energy-based parameter tables maintained in the Orchestration Generation Subsystem (B31) of the Automated Music Composition and Generation Engine of the present invention, configured for the exemplary emotion-type musical experience descriptor—HAPPY—specified in the emotion descriptor table in FIGS. 32A through 32F and used during the automated music composition and generation process of the present invention;

FIG. 28S shows a schematic representation of the probability-based parameter tables maintained in the Controller Code Generation Subsystem (B32) of the Automated Music Composition and Generation Engine of the present invention, configured for the exemplary emotion-type musical experience descriptor—HAPPY—specified in the emotion descriptor table in FIGS. 32A through 32F, and the style-type musical experience descriptor—POP—specified in the style descriptor table in FIG. 33A through 32F, and used during the automated music composition and generation process of the present invention;

FIGS. 29A and 29B, taken together, show a timing control diagram illustrating the time sequence that particular timing control pulse signals are sent to each subsystem block diagram in the system shown in FIGS. 26A through 26P, after the system has received its musical experience descriptor inputs from the system user, and the system has been automatically arranged and configured in its operating mode, wherein music is automatically composed and generated in accordance with the principles of the present invention;

FIGS. 30, 30A 30B, 30C, 30D, 30E, 30F, 30G, 30H, 30I and 30J, taken together, show a schematic representation of a table describing the nature and various possible formats of the input and output data signals supported by each subsystem within the Automated Music Composition and Generation System of the illustrative embodiments of the present invention described herein, wherein each subsystem is identified in the table by its block name or identifier (e.g. B1);

FIG. 31 is a schematic representation of a table describing exemplary data formats that are supported by the various data input and output signals (e.g. text, chord, audio file, binary, command, meter, image, time, pitch, number, tonality, tempo, letter, linguistics, speech, MIDI, etc.) passing through the various specially configured information processing subsystems employed in the Automated Music Composition and Generation System of the present invention;

FIGS. 32A, 32B, 32C, 32D, 32E, and 32F, taken together, provide a schematic representation of a table describing exemplary hierarchical set of "emotional" descriptors, arranged according to primary, secondary and tertiary emotions, which are supported as "musical experience descriptors" for system users to provide as input to the Automated Music Composition and Generation System of the illustrative embodiment of the present invention;

FIGS. 33A 33B, 33C, 33D and 33E, taken together, provide a table describing an exemplary set of "style" musical experience descriptors (MUSEX) which are supported for system users to provide as input to the Automated Music Composition and Generation System of the illustrative embodiment of the present invention;

FIG. 34 is a schematic presentation of the automated music composition and generation system network of the present invention, comprising a plurality of remote system designer client workstations, operably connected to the Automated Music Composition And Generation Engine (E1) of the present invention, wherein its parameter transformation engine subsystem and its associated parameter table archive database subsystem are maintained, and wherein each workstation client system supports a GUI-based work environment for creating and managing "parameter mapping configurations (PMC)" within the parameter transformation engine subsystem, wherein system designers remotely situated anywhere around the globe can log into the system network and access the GUI-based work environment and create parameter mapping configurations between (i) different possible sets of emotion-type, style-type and timing/spatial parameters that might be selected by system users, and (ii) corresponding sets of probability-based music-theoretic system operating parameters, preferably maintained within parameter tables, for persistent storage within the parameter transformation engine subsystem and its associated parameter table archive database subsystem;

FIG. 35A is a schematic representation of the GUI-based work environment supported by the system network shown in FIG. 34, wherein the system designer has the choice of (i) managing existing parameter mapping configurations, and (ii) creating a new parameter mapping configuration for loading and persistent storage in the Parameter Transformation Engine Subsystem B51, which in turn generates corresponding probability-based music-theoretic system operating parameter (SOP) table(s) represented in FIGS. 28A through 28S, and loads the same within the various subsystems employed in the deployed Automated Music Composition and Generation System of the present invention;

FIG. 35B is a schematic representation of the GUI-based work environment supported by the system network shown in FIG. 35A, wherein the system designer selects (i) manage existing parameter mapping configurations, and is presented a list of currently created parameter mapping configurations that have been created and loaded into persistent storage in the Parameter Transformation Engine Subsystem B51 of the system of the present invention;

FIG. 36A is a schematic representation of the GUI-based work environment supported by the system network shown in FIG. 35A, wherein the system designer selects (i) create a new parameter mapping configuration;

FIG. 36B is a schematic representation of the GUI-based work environment supported by the system network shown in FIG. 35A, wherein the system designer is presented with a GUI-based worksheet for use in creating a parameter mapping configuration between (i) a set of possible system-user selectable emotion/style/timing parameters, and a set of corresponding probability-based music-theoretic system operating parameter (SOP) table(s) represented in FIGS. 28A through 28S, for generating and loading within the various subsystems employed in the deployed Automated Music Composition and Generation System of the present invention;

FIG. 37 is a prospective view of a seventh alternative embodiment of the Automated Music Composition And Generation Instrument System of the present invention supporting the use of virtual-instrument music synthesis driven by linguistic-based musical experience descriptors and lyrical word descriptions produced using a text keyboard and/or a speech recognition interface, so that system users can further apply lyrics to one or more scenes in a video that is to be emotionally scored with composed music in accordance with the principles of the present invention;

FIG. 38 is a schematic diagram of an exemplary implementation of the seventh illustrative embodiment of the automated music composition and generation instrument system of the present invention, supporting the use of virtual-instrument music synthesis driven by graphical icon based musical experience descriptors selected using a keyboard interface, showing the various components, such as multi-core CPU, multi-core GPU, program memory (DRAM), video memory (VRAM), hard drive (SATA), LCD/touch-screen display panel, microphone/speaker, keyboard, WIFI/Bluetooth network adapters, pitch recognition module/board, and power supply and distribution circuitry, integrated around a system bus architecture;

FIG. 39 is a high-level system block diagram of the Automated Music Composition and Generation System of the seventh illustrative embodiment, wherein linguistic and/or graphics based musical experience descriptors, including lyrical input, and other media (e.g. a video recording, slide-show, audio recording, or event marker) are selected as input through the system user interface B0 (i.e. touch-screen keyboard), wherein the media can be automatically analyzed by the system to extract musical experience descriptors (e.g. based on scene imagery and/or information content), and thereafter used by the Automated Music Composition and Generation Engine E1 of the present invention to generate musically-scored media, music files and/or hard-copy sheet music, that is then supplied back to the system user via the interface of the system input subsystem B0;

FIG. 39A is a schematic block diagram of the system user interface transmitting typed, spoken or sung speech or lyrical input provided by the system user to a Real-Time Pitch Event Analyzing Subsystem B52, supporting a multiplexer with time coding, where the real-time pitch event, rhythmic and prosodic analysis is performed to generate three (3) different pitch-event streams for typed, spoken and sung lyrics, respectively which are subsequently used to modify parameters in the system during the music composition and generation process of the present invention;

FIG. 39B is a detailed block schematic diagram of the Real-Time Pitch Event Analyzing Subsystem B52 employed in the subsystem shown in FIG. 39A, comprising subcomponents: a lyrical input handler; a pitch-event output handler; a lexical dictionary; and a vowel-format analyzer; and a mode controller, configured about the programmed processor;

FIG. 40 is a flow chart describing a method of composing and generating music in an automated manner using lyrical input supplied by the system user to the Automated Music Composition and Generation System of the present invention, shown in FIGS. 37 through 39B, wherein the process comprises (a) providing musical experience descriptors to the system user interface of an automated music composition and generation system, (b) providing lyrical input (e.g. in typed, spoken or sung format) to the system-user interface of the system, for one or more scenes in a video or media object to be scored with music composed and generated by the system, (c) processing the lyrical input provided to the system user interface, using real-time rhythmic, pitch event, and prosodic analysis of typed/spoken/sung lyrics, based on time and/or frequency domain techniques, (d) extracting pitch events on a time line from the analyzed lyrical input, and code with timing information on when such detected pitch events occurred, (e) providing the extracted pitch events to the automated music composition and generation engine for use in constraining the probability-based parameters tables employed in the various subsystems of the automated system;

FIG. 41 is a flow chart illustrating the primary steps involved in carrying out the automated music composition and generation process within the music composing and generation system of the seventh illustrative embodiment of the present invention, supporting the use of virtual-instrument music synthesis driven by linguistic (including lyrical) musical experience descriptors, wherein during the first step of the process, (a) the system user accesses the Automated Music Composition and Generation System, and then selects media to be scored with music generated by its Automated Music Composition and Generation Engine, (b) the system user selects musical experience descriptors (and optionally lyrics) provided to the Automated Music Composition and Generation Engine of the system for application to the selected media to be musically-scored, (c) the system user initiates the Automated Music Composition and Generation Engine to compose and generate music based on the provided musical descriptors scored on selected media, and (d) the system combines the composed music with the selected media so as to create a composite media file for display and enjoyment;

FIG. 42 is a flow chart describing the high level steps involved in a method of processing typed a lyrical expression (set of words) characteristic of the emotion HAPPY (e.g. "Put On A Happy Face" by Charles Strouse) provided as typed lyrical input into the system so as automatically abstract musical notes (e.g. pitch events) from detected vowel formants, to assist in the musical experience description of the music piece to be composed, along with emotion and style type of musical experience descriptors provided to the system;

FIG. 43 is a flow chart describing the high level steps involved in a method of processing the spoken lyrical expression characteristic of the emotion HAPPY "Put On A Happy Face" by Charles Strouse) provided as spoken lyrical input into the system so as automatically abstract musical notes (e.g. pitch events) from detected vowel formants, to assist in the musical experience description of the music piece to be composed, along with emotion and style type of musical experience descriptors provided to the system;

FIG. 44 is a flow chart describing the high level steps involved in a method of processing the sung lyrical expression characteristic of the emotion HAPPY "Put On A Happy Face" by Charles Strouse) provided as sung lyrical input into the system so as automatically abstract musical notes (e.g. pitch events) from detected vowel formants, to assist in the musical experience description of the music piece to be composed, along with emotion and style type of musical experience descriptors provided to the system;

FIG. 45 is a schematic representation of a score of musical notes automatically recognized within the sung lyrical expression at Block E in FIG. 44 using automated vowel formant analysis methods;

FIG. 46 is a flow chart describing the high level steps involved in a method of processing the typed lyrical expression characteristic of the emotion SAD or MELONCHOLY (e.g. "Somewhere Over The Rainbow" by E. Yip Harburg and Harold Arlen) provided as typed lyrical input into the system so as automatically abstract musical notes (e.g. pitch events) from detected vowel formants, to assist in the musical experience description of the music piece to be composed, along with emotion and style type of musical experience descriptors provided to the system;

FIG. 47 is a flow chart describing the high level steps involved in a method of processing the spoken lyrical expression characteristic of the emotion SAD or MELONCHOLY (e.g. "Somewhere Over The Rainbow" by E. Yip Harburg and Harold Arlen) provided as spoken lyrical input into the system so as automatically abstract musical notes (e.g. pitch events) from detected vowel formants, to assist in the musical experience description of the music piece to be composed, along with emotion and style type of musical experience descriptors provided to the system;

FIG. 48 is a flow chart describing the high level steps involved in a method of processing the sung lyrical expression characteristic of the emotion SAD or MELONCHOLY (e.g. "Somewhere Over The Rainbow" by E. Yip Harburg and Harold Arlen) provided as sung lyrical input into the system so as automatically abstract musical notes (e.g. pitch events) from detected vowel formants, to assist in the musical experience description of the music piece to be composed, along with emotion and style type of musical experience descriptors provided to the system;

FIG. 49 is a schematic representation of a score of musical notes automatically recognized within the sung lyrical expression at Block E in FIG. 48 using automated vowel formant analysis methods; and FIG. 50 is a high-level flow chart set providing an overview of the automated music composition and generation process supported by the various systems of the present invention, with reference to FIGS. 26A through 26P, illustrating the high-level system architecture provided by the system to support the automated music composition and generation process of the present invention.

DETAILED DESCRIPTION OF THE ILLUSTRATIVE EMBODIMENTS OF THE PRESENT INVENTION

Referring to the accompanying Drawings, like structures and elements shown throughout the figures thereof shall be indicated with like reference numerals.

Overview on the Automated Music Composition and Generation System of the Present Invention, and the Employment of its Automated Music Composition and Generation Engine in Diverse Applications FIG. 1 shows the high-level system architecture of the automated music composition and generation system of the present invention S1 supporting the use of virtual-instrument music synthesis driven by linguistic and/or graphical icon based musical experience descriptors, wherein there linguistic-based musical experience descriptors, and an piece of media (e.g. video, audio file, image), or an event marker, are supplied by the system user as input through the system user input output (I/O) interface B0, and used by the Automated Music Composition and Generation Engine of the present invention E1, illustrated in FIGS. 25A through 33E, to generate musically-scored media (e.g. video, podcast, audio file, slideshow etc.) or event marker, that is then supplied back to the system user via the system user (I/O) interface B0. The details of this novel system and its supporting information processes will be described in great technical detail hereinafter.

Figure 25A:
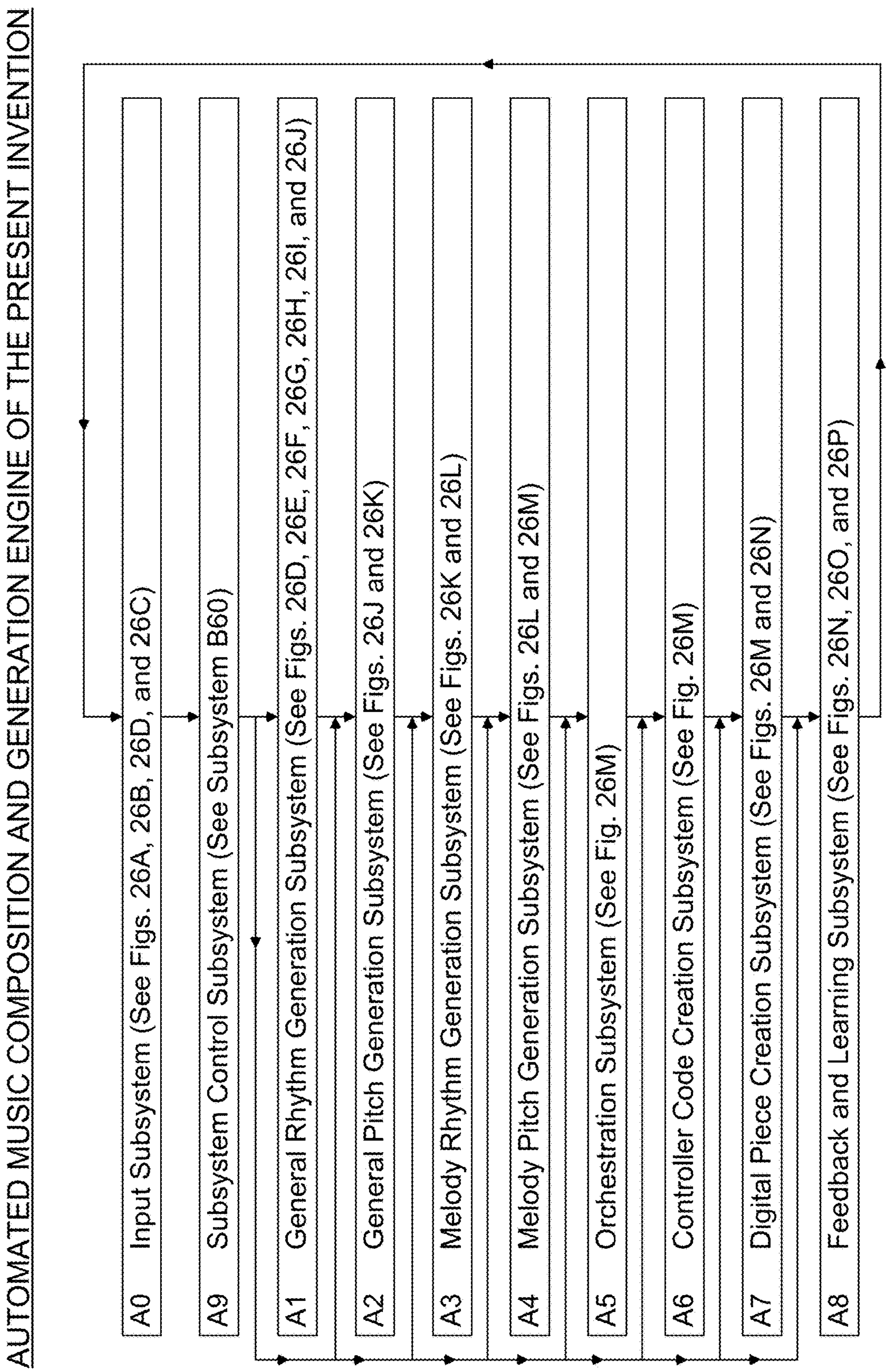
FIG. 25A is a high-level system diagram for the Automated Music Composition and Generation Engine of the present invention employed in the various embodiments of the present invention herein, comprising a user GUI-Based Input Subsystem, a General Rhythm Subsystem, a General Rhythm Generation Subsystem, a Melody Rhythm Generation Subsystem, a Melody Pitch Generation Subsystem, an Orchestration Subsystem, a Controller Code Creation Subsystem, a Digital Piece Creation Subsystem, and a Feedback and Learning Subsystem configured as shown.
Figure 25B:
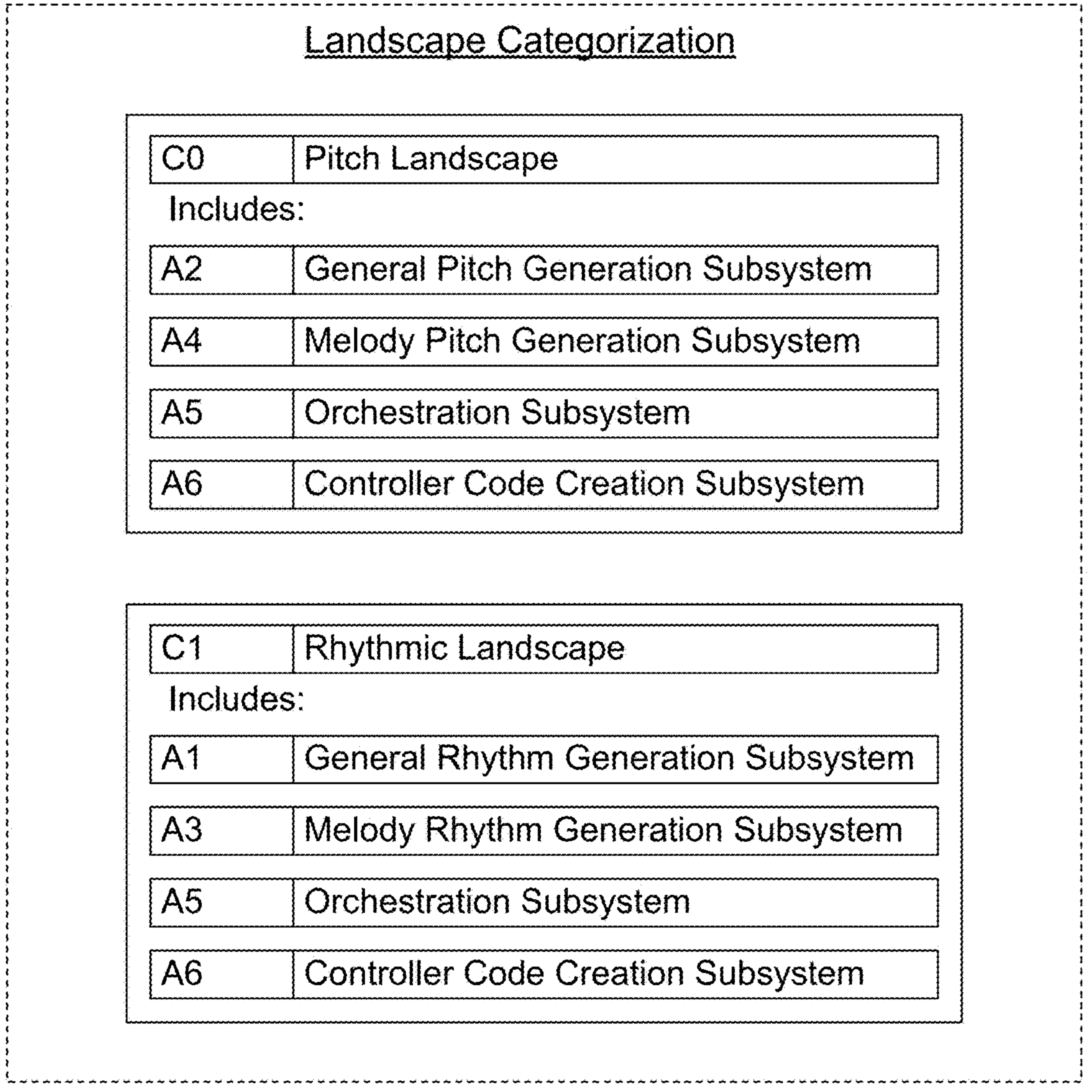
FIG. 25B is a higher-level system diagram illustrating that the system of the present invention comprises two very high-level "musical landscape" categorizations, namely: (i) a Pitch Landscape Subsystem C0 comprising the General Pitch Generation Subsystem A2, the Melody Pitch Generation Subsystem A4, the Orchestration Subsystem A5, and the Controller Code Creation Subsystem A6; and (ii) a Rhythmic Landscape Subsystem C1 comprising the General Rhythm Generation Subsystem A1, Melody Rhythm Generation Subsystem A3, the Orchestration Subsystem A5, and the Controller Code Creation Subsystem A6.

The architecture of the automated music composition and generation system of the present invention is inspired by the inventor's real-world experience composing music scores for diverse kinds of media including movies, video-games and the like. As illustrated in FIGS. 25A and 25B, the system of the present invention comprises a number of higher level subsystems including specifically; an input subsystem A0, a General Rhythm subsystem A1, a General Rhythm Generation Subsystem A2, a melody rhythm generation subsystem A3, a melody pitch generation subsystem A4, an orchestration subsystem A5, a controller code creation subsystem A6, a digital piece creation subsystem A7, and a feedback and learning subsystem A8. As illustrated in the schematic diagram shown in FIGS. 27B1 and 27B2, each of these high-level subsystems A0-A7 comprises a set of subsystems, and many of these subsystems maintain probabilistic-based system operating parameter tables (i.e. structures) that are generated and loaded by the Transformation Engine Subsystem B51.

FIG. 2 shows the primary steps for carrying out the generalized automated music composition and generation process of the present invention using automated virtual-instrument music synthesis driven by linguistic and/or graphical icon based musical experience descriptors. As used herein, the term "virtual-instrument music synthesis" refers to the creation of a musical piece on a note-by-note and chord-by-chord basis, using digital audio sampled notes, chords and sequences of notes, recorded from real or virtual instruments, using the techniques disclosed herein. This method of music synthesis is fundamentally different from methods where many loops, and tracks, of music are pre-recorded and stored in a memory storage device (e.g. a database) and subsequently accessed and combined together, to create a piece of music, as there is no underlying music theoretic characterization/specification of the notes and chords in the components of music used in this prior art synthesis method. In marked contrast, strict musical-theoretic specification of each musical event (e.g. note, chord, phrase, sub-phrase, rhythm, beat, measure, melody, and pitch) within a piece of music being automatically composed and generated by the system/machine of the present invention, must be maintained by the system during the entire music composition/generation process in order to practice the virtual-instrument music synthesis method in accordance with the principles of the present invention.

As shown in FIG. 2, during the first step of the automated music composition process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

The automated music composition and generation system is a complex system comprised of many subsystems, wherein complex calculators, analyzers and other specialized machinery is used to support highly specialized generative processes that support the automated music composition and generation process of the present invention. Each of these components serves a vital role in a specific part of the music composition and generation engine system (i.e. engine) of the present invention, and the combination of each component into a ballet of integral elements in the automated music composition and generation engine creates a value that is truly greater that the sum of any or all of its parts. A concise and detailed technical description of the structure and functional purpose of each of these subsystem components is provided hereinafter in FIGS. 27A through 27XX.

As shown in FIG. 26A through 26P, each of the high-level subsystems specified in FIGS. 25A and 25B is realized by one or more highly-specialized subsystems having very specific functions to be performed within the highly complex automated music composition and generation system of the present invention. In the preferred embodiments, the system employs and implements automated virtual-instrument music synthesis techniques, where sampled notes and chords, and sequences of notes from various kinds of instruments are digitally sampled and represented as a digital audio samples in a database and organized according to a piece of music that is composted and generated by the system of the present invention. In response to linguistic and/or graphical-icon based musical experience descriptors (including emotion-type descriptors illustrated in FIGS. 32A, 32B, 32C, 32D, 32E and 32F, and style-type descriptors illustrated in FIGS. 33A through 33E) that have been supplied to the GUI-based input output subsystem illustrated in FIG. 27A, to reflect the emotional and stylistic requirements desired by the system user, which the system automatically carries out during the automated music composition and generation process of the present invention.

Figure 27D:
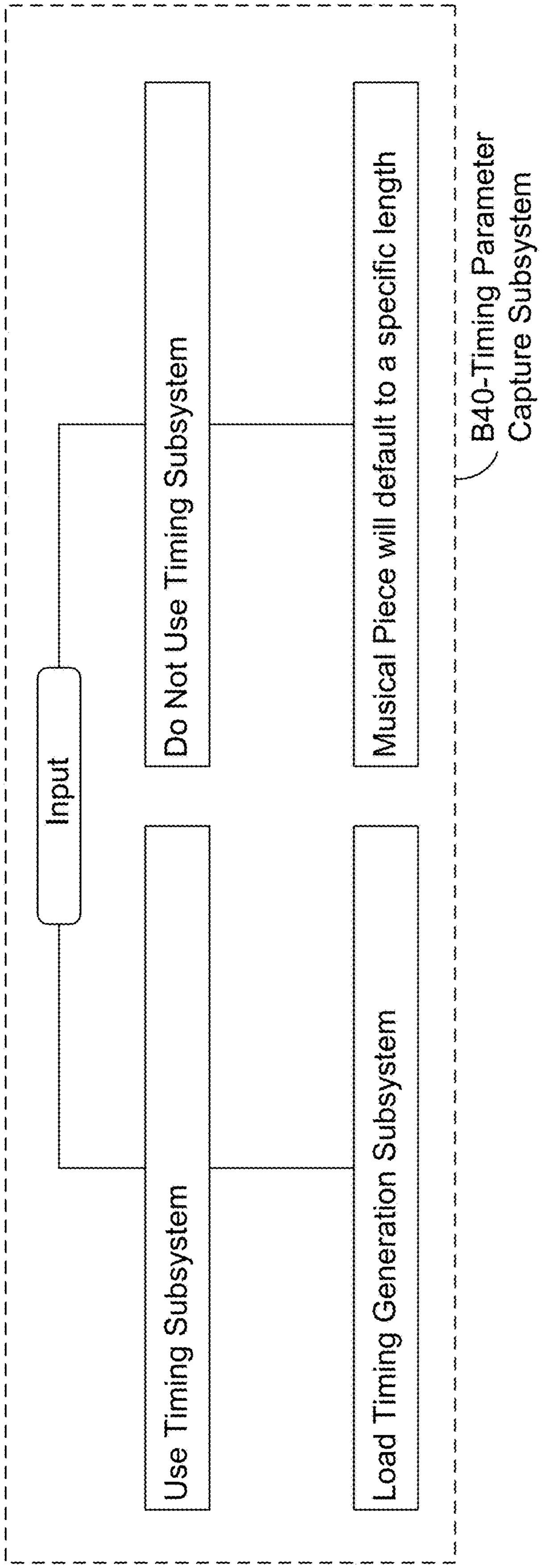
FIG. 27D shows a schematic representation of the Timing Parameter Capture Subsystem (B40) used in the Automated Music Composition and Generation Engine of the present invention, wherein the Timing Parameter Capture Subsystem (B40) provides timing parameters to the timing generation subsystem (B41) for distribution to the various subsystems in the system, and subsequent subsystem configuration and use during the automated music composition and generation process of the present invention.
Figure 27F:
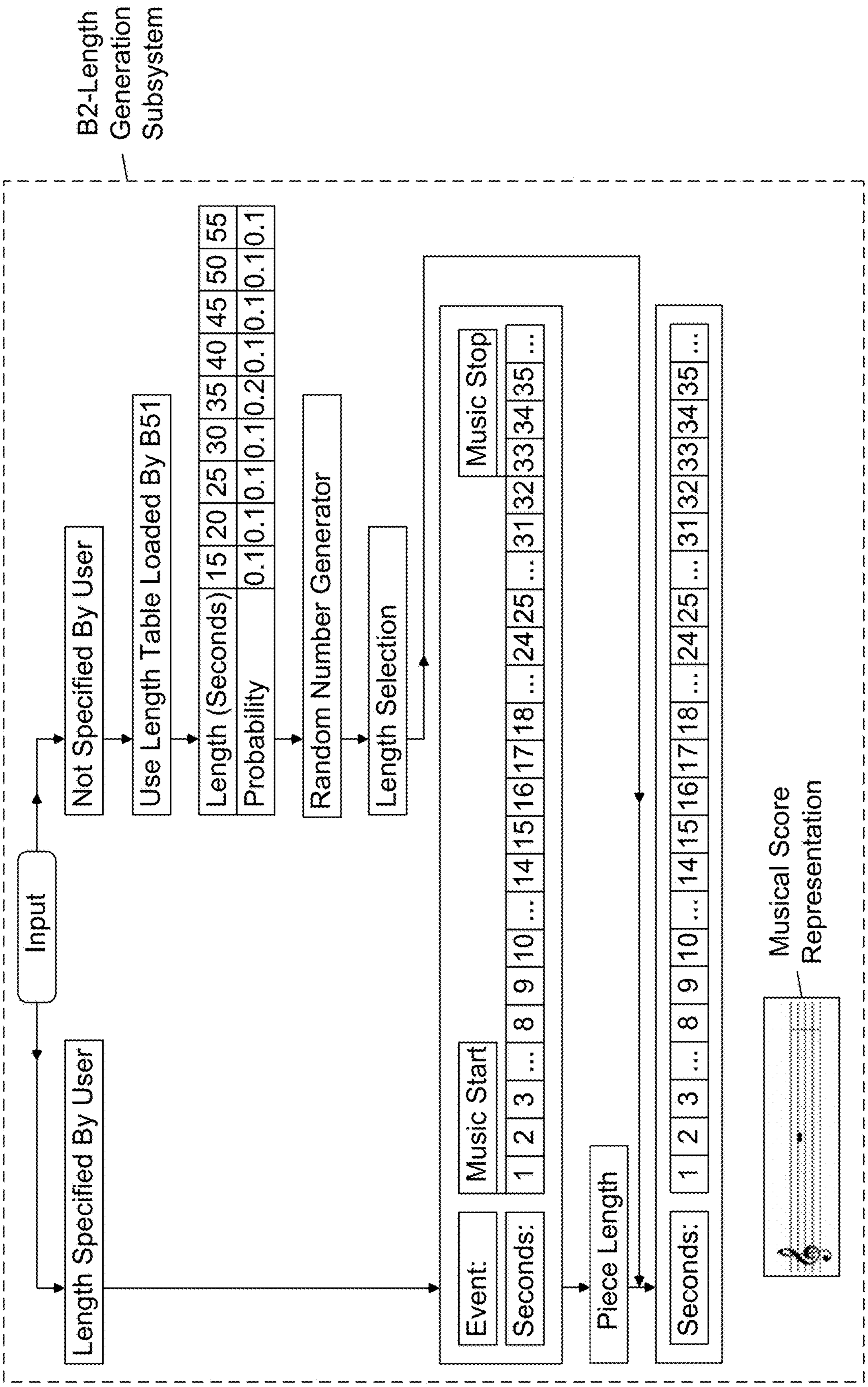
FIG. 27F shows a schematic representation of the Length Generation Subsystem (B2) used in the Automated Music Composition and Generation Engine of the present invention, wherein the time length of the piece specified by the system user is provided to the length generation subsystem (B2) and this subsystem generates the start and stop locations of the piece of music that is to be composed during the during the automated music composition and generation process of the present invention.
Figure 27G:
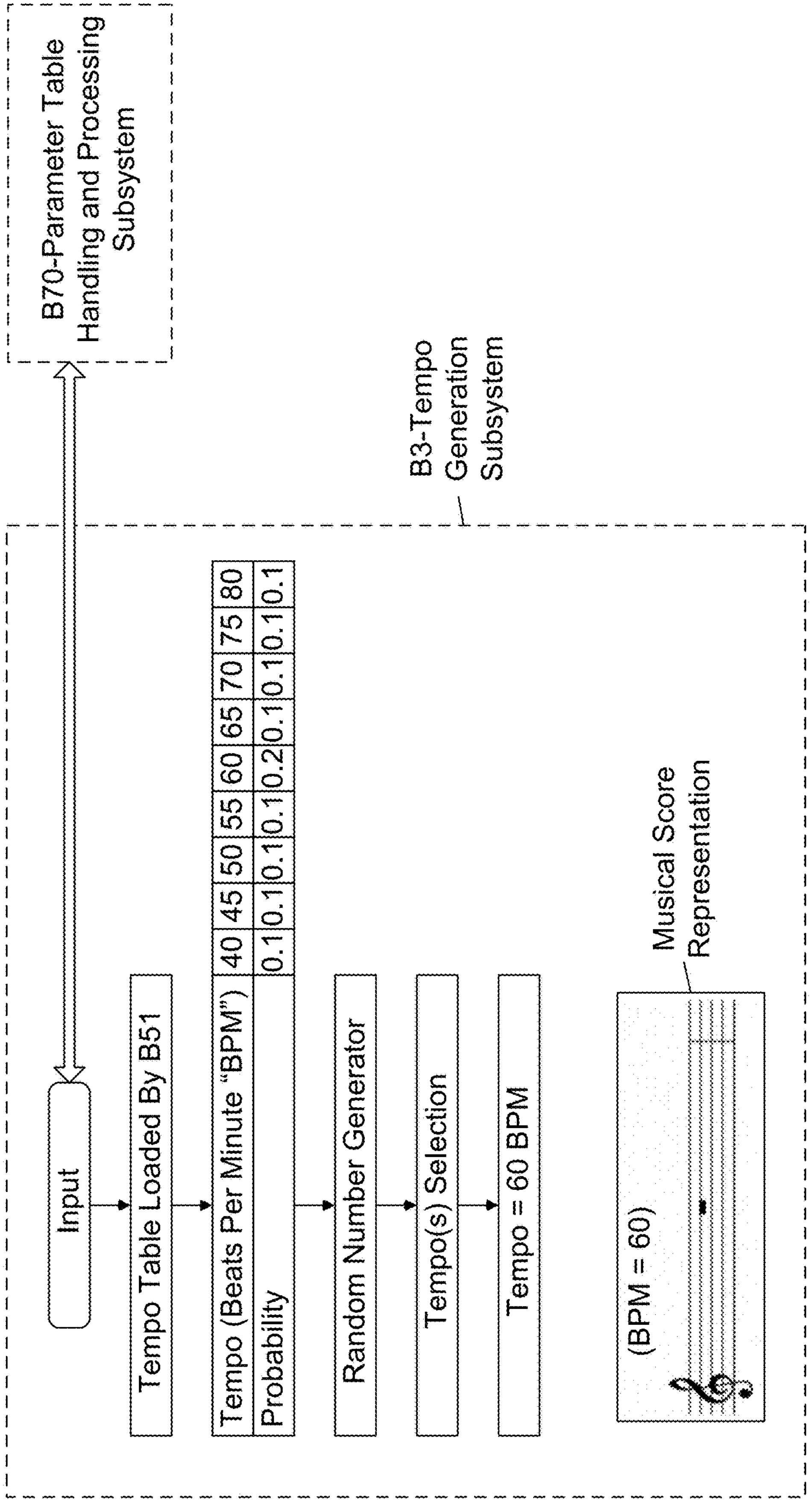
FIG. 27G shows a schematic representation of the Tempo Generation Subsystem (B3) used in the Automated Music Composition and Generation Engine of the present invention, wherein the tempo of the piece (i.e. BPM) is computed based on the piece time length and musical experience parameters that are provided to this subsystem, wherein the resultant tempo is measured in beats per minute (BPM) and is used during the automated music composition and generation process of the present invention.
Figure 27H:
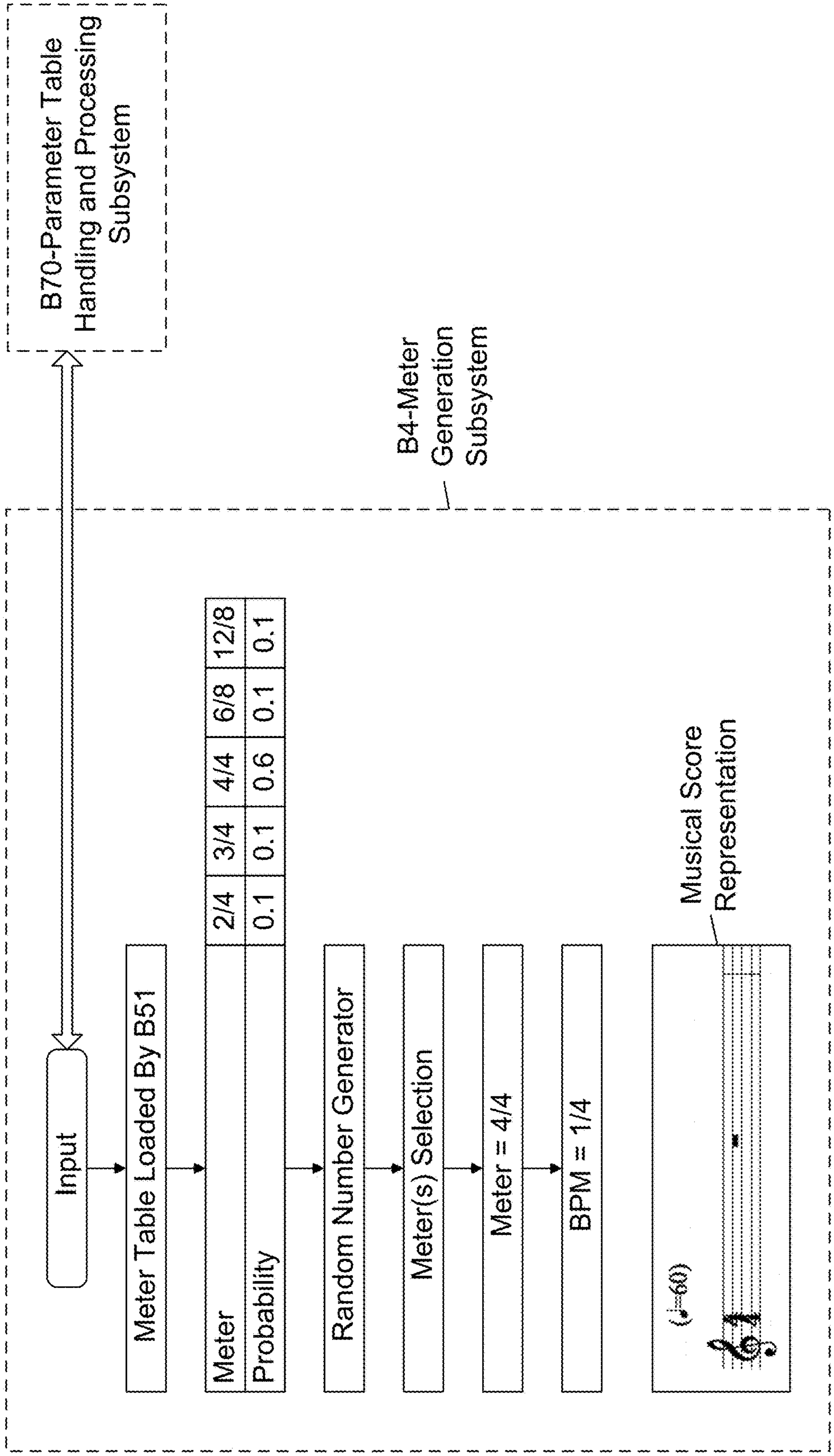
FIG. 27H shows a schematic representation of the Meter Generation Subsystem (B4) used in the Automated Music Composition and Generation Engine of the present invention, wherein the meter of the piece is computed based on the piece time length and musical experience parameters that are provided to this subsystem, wherein the resultant tempo is measured in beats per minute (BPM) and is used during the automated music composition and generation process of the present invention.
Figure 27I:
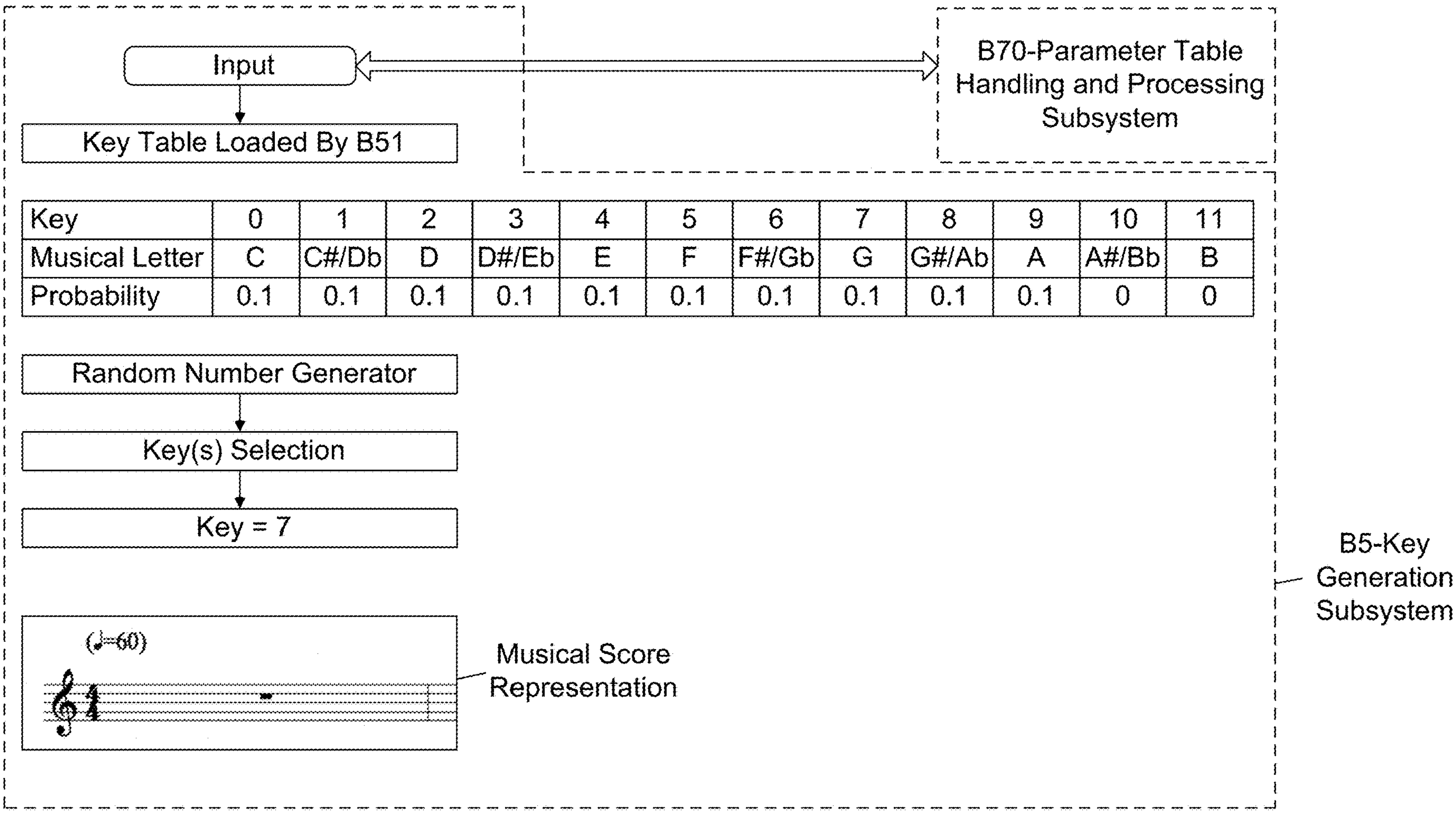
FIG. 27I shows a schematic representation of the Key Generation Subsystem (B5) used in the Automated Music Composition and Generation Engine of the present invention, wherein the key of the piece is computed based on musical experience parameters that are provided to the system, wherein the resultant key is selected and used during the automated music composition and generation process of the present invention.
Figure 27J:
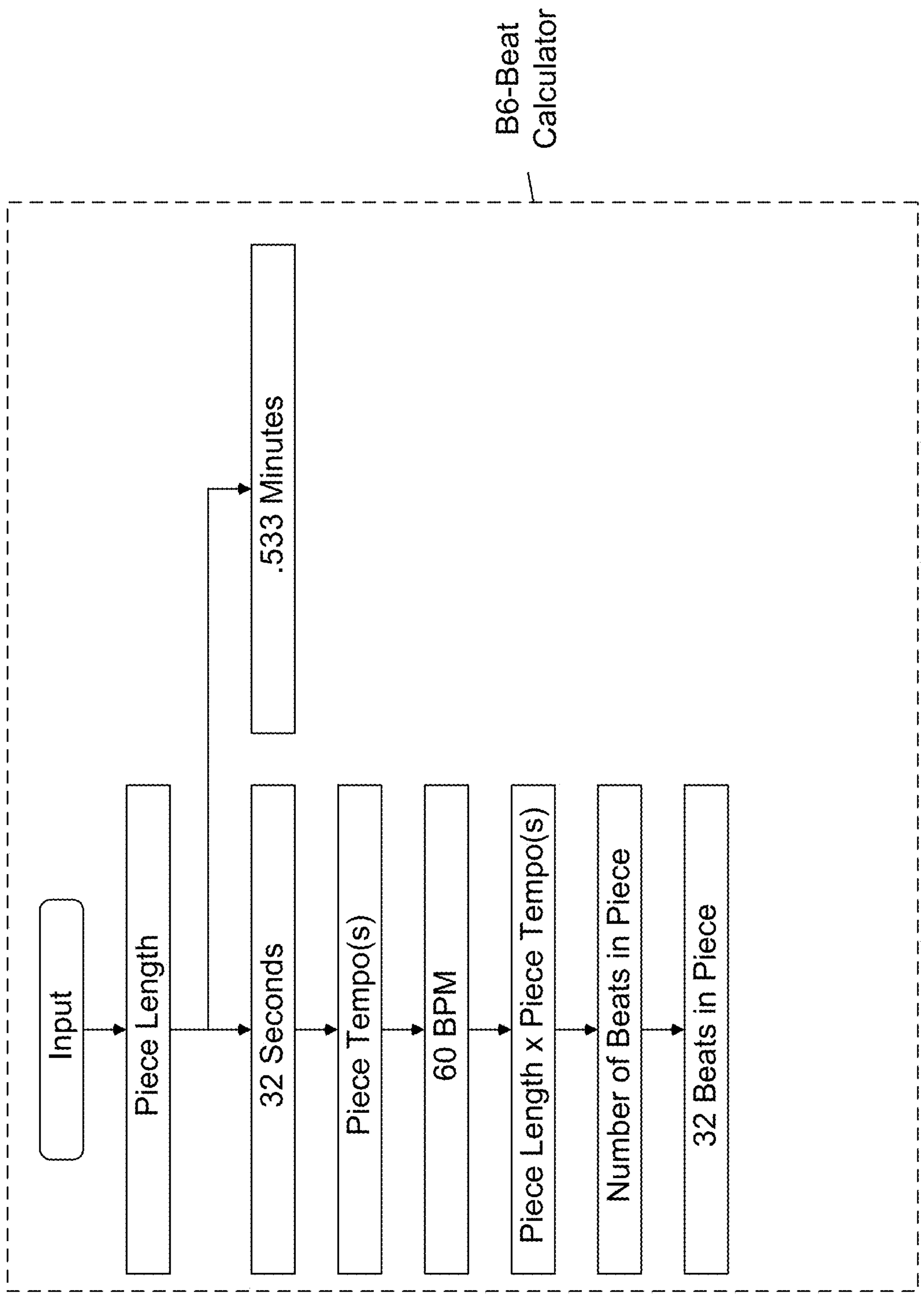
FIG. 27J shows a schematic representation of the beat calculator subsystem (B6) used in the Automated Music Composition and Generation Engine of the present invention, wherein the number of beats in the piece is computed based on the piece length provided to the system and tempo computed by the system, wherein the resultant number of beats is used during the automated music composition and generation process of the present invention.
Figure 27K:
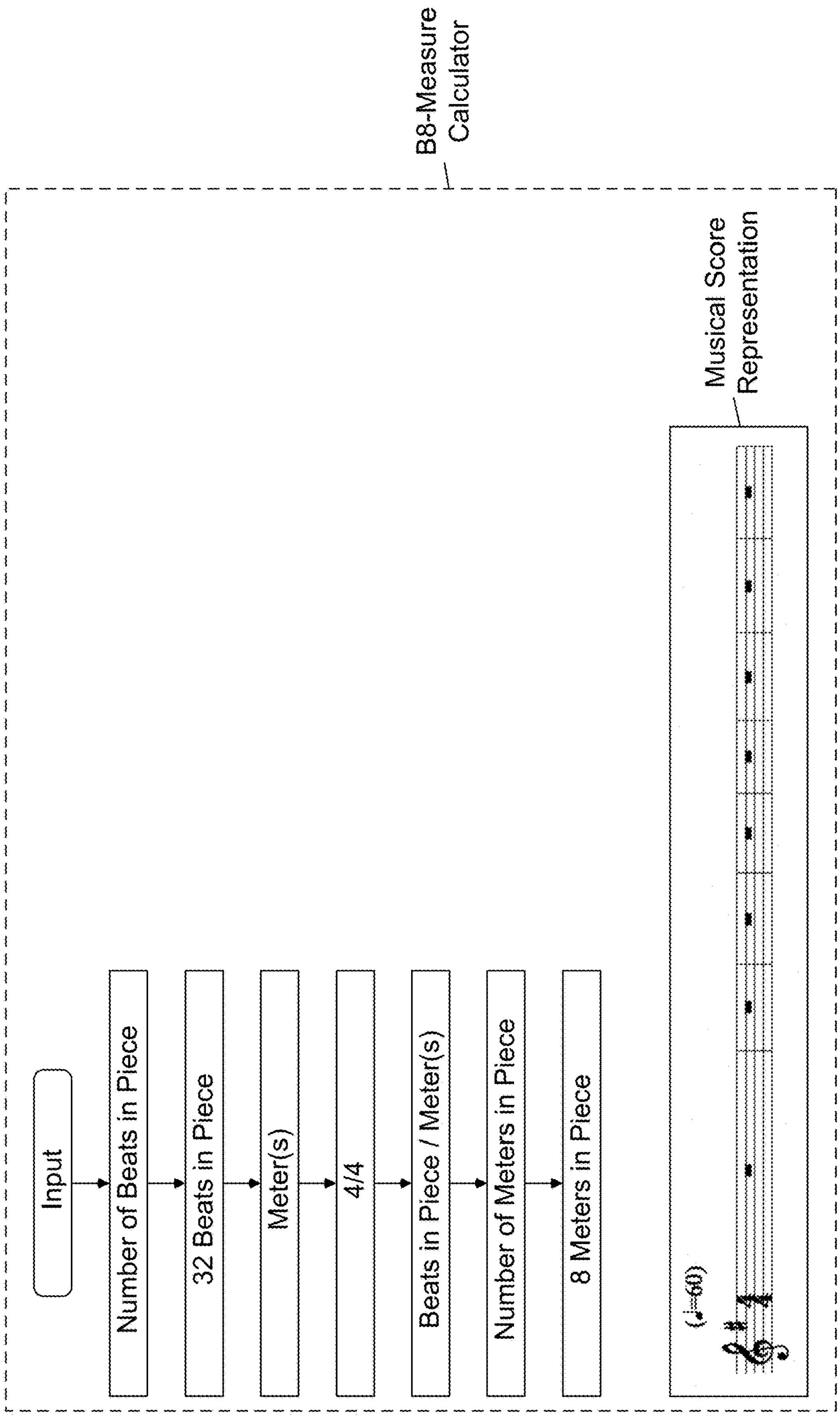
FIG. 27K shows a schematic representation of the Measure Calculator Subsystem (B8) used in the Automated Music Composition and Generation Engine of the present invention, wherein the number of measures in the piece is computed based on the number of beats in the piece, and the computed meter of the piece, wherein the meters in the piece is used during the automated music composition and generation process of the present invention.
Figure 27L:
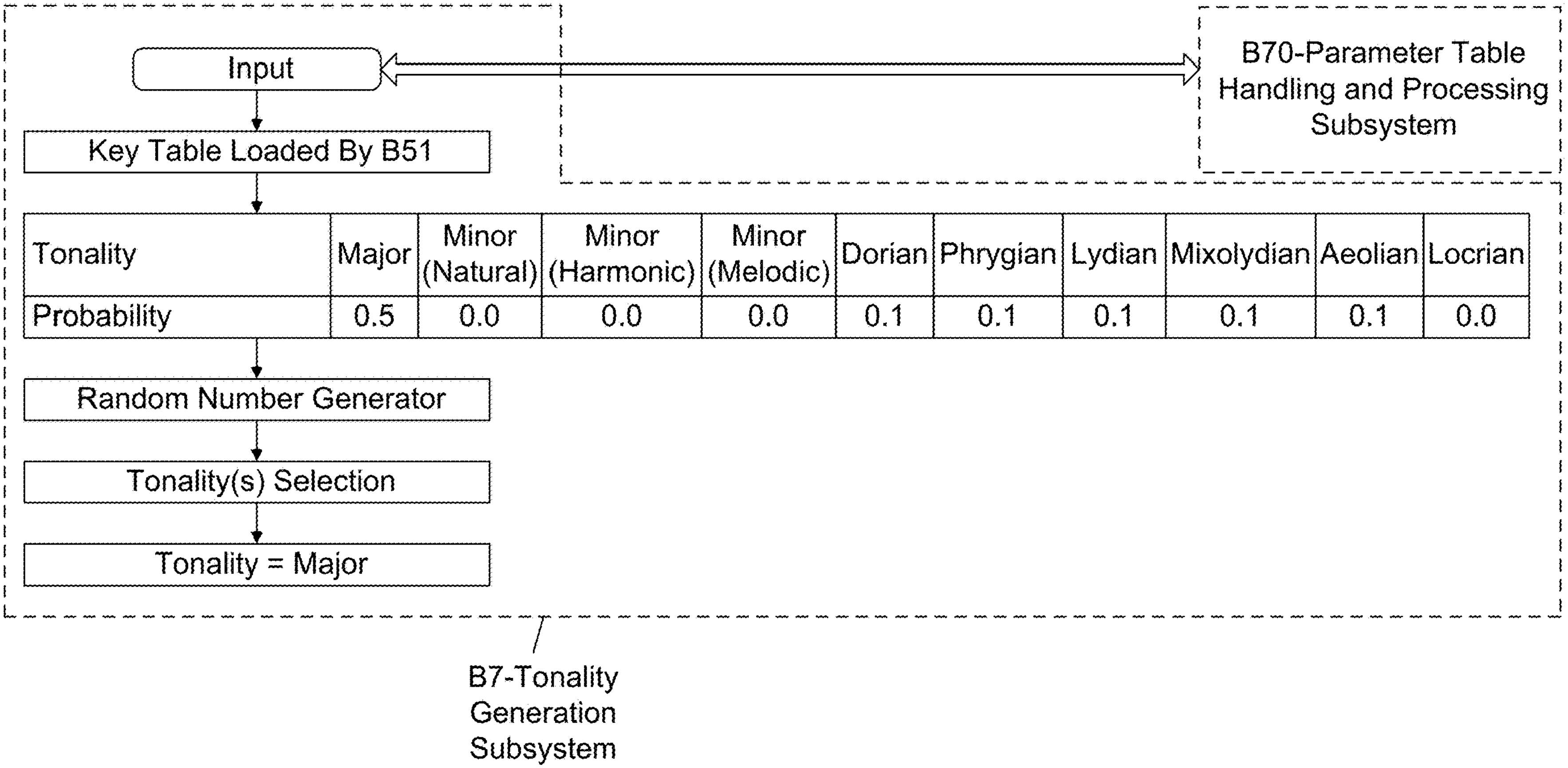
FIG. 27L shows a schematic representation of the Tonality Generation Subsystem (B7) used in the Automated Music Composition and Generation Engine of the present invention, wherein the number of tonality of the piece is selected using the probability-based tonality parameter table employed within the subsystem for the exemplary "emotion-type" musical experience descriptor—HAPPY provided to the system by the system user, and wherein the selected tonality is used during the automated music composition and generation process of the present invention.
Figure 27N:
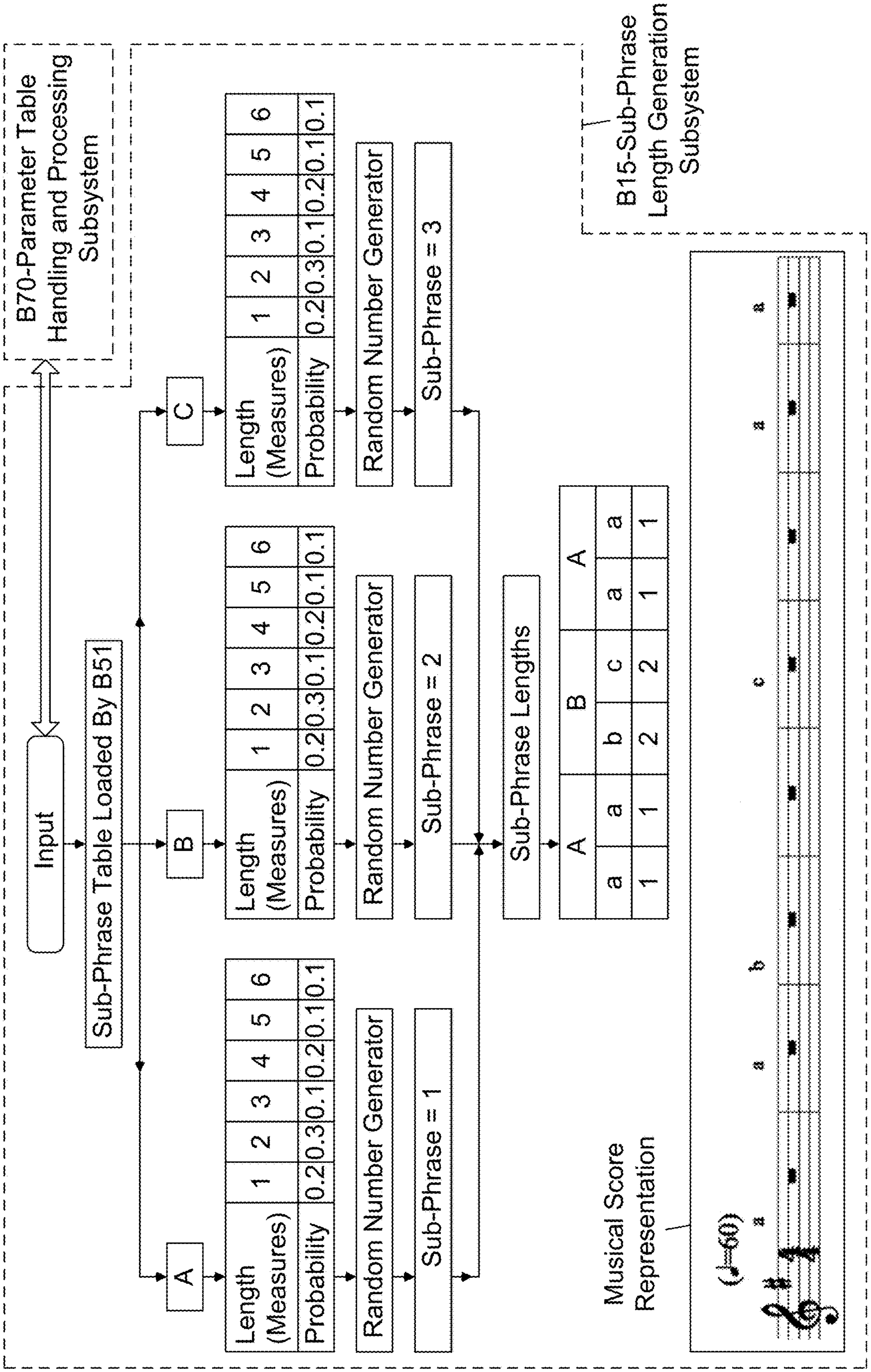
FIG. 27N shows a schematic representation of the Sub-Phrase Length Generation Subsystem (B15) used in the Automated Music Composition and Generation Engine of the present invention, wherein the sub-phrase length is selected using the probability-based sub-phrase length parameter table employed within the subsystem for the exemplary "emotion-style" musical experience descriptor—HAPPY—provided to the system by the system user, and wherein the selected sub-phrase length is used during the automated music composition and generation process of the present invention.
Figure 27P:
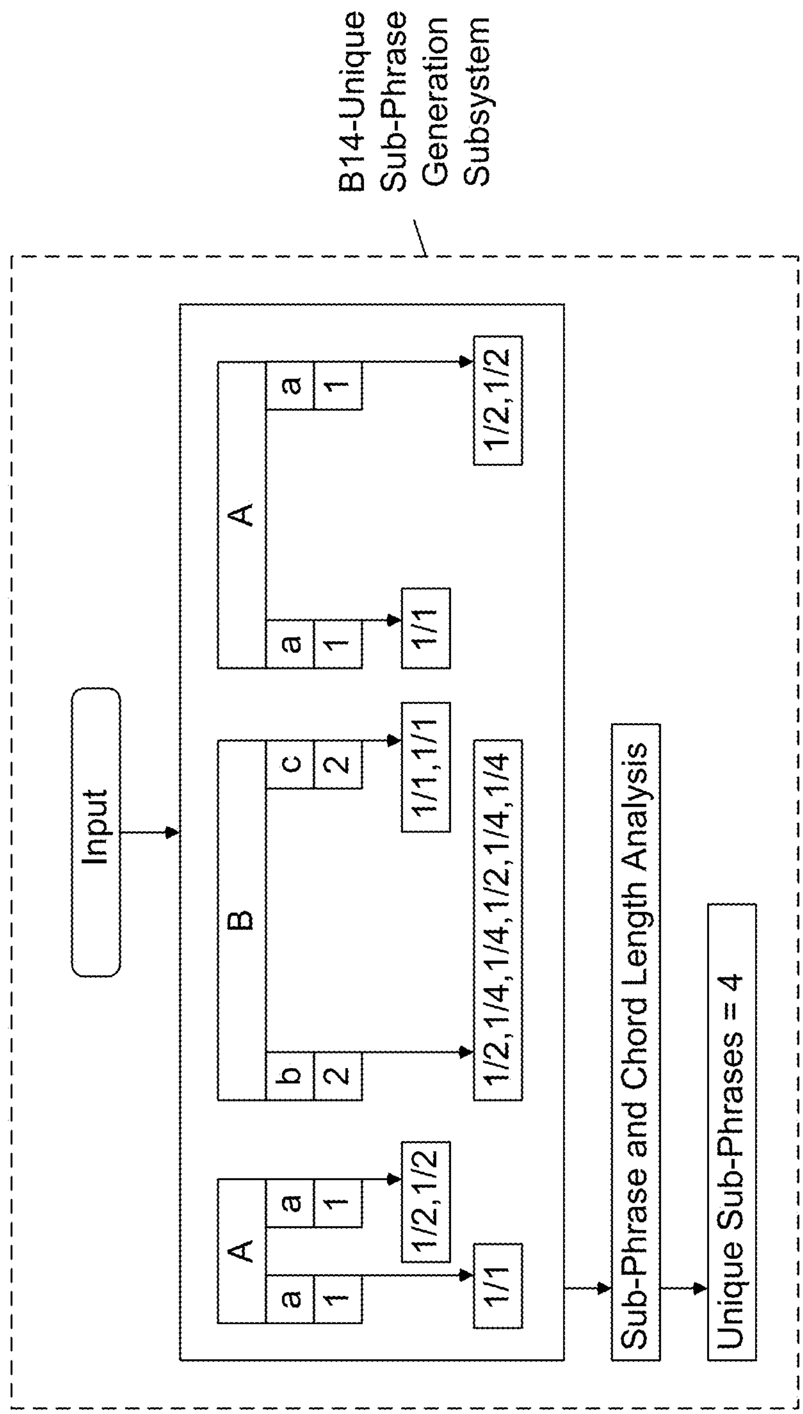
FIG. 27P shows a schematic representation of the Unique Sub-Phrase Generation Subsystem (B14) used in the Automated Music Composition and Generation Engine of the present invention, wherein the unique sub-phrase is selected using the probability-based unique sub-phrase parameter table within the subsystem for the "emotion-type" musical experience descriptor—HAPPY—provided to the system by the system user, and wherein the selected unique sub-phrase is used during the automated music composition and generation process of the present invention.
Figure 27Q:
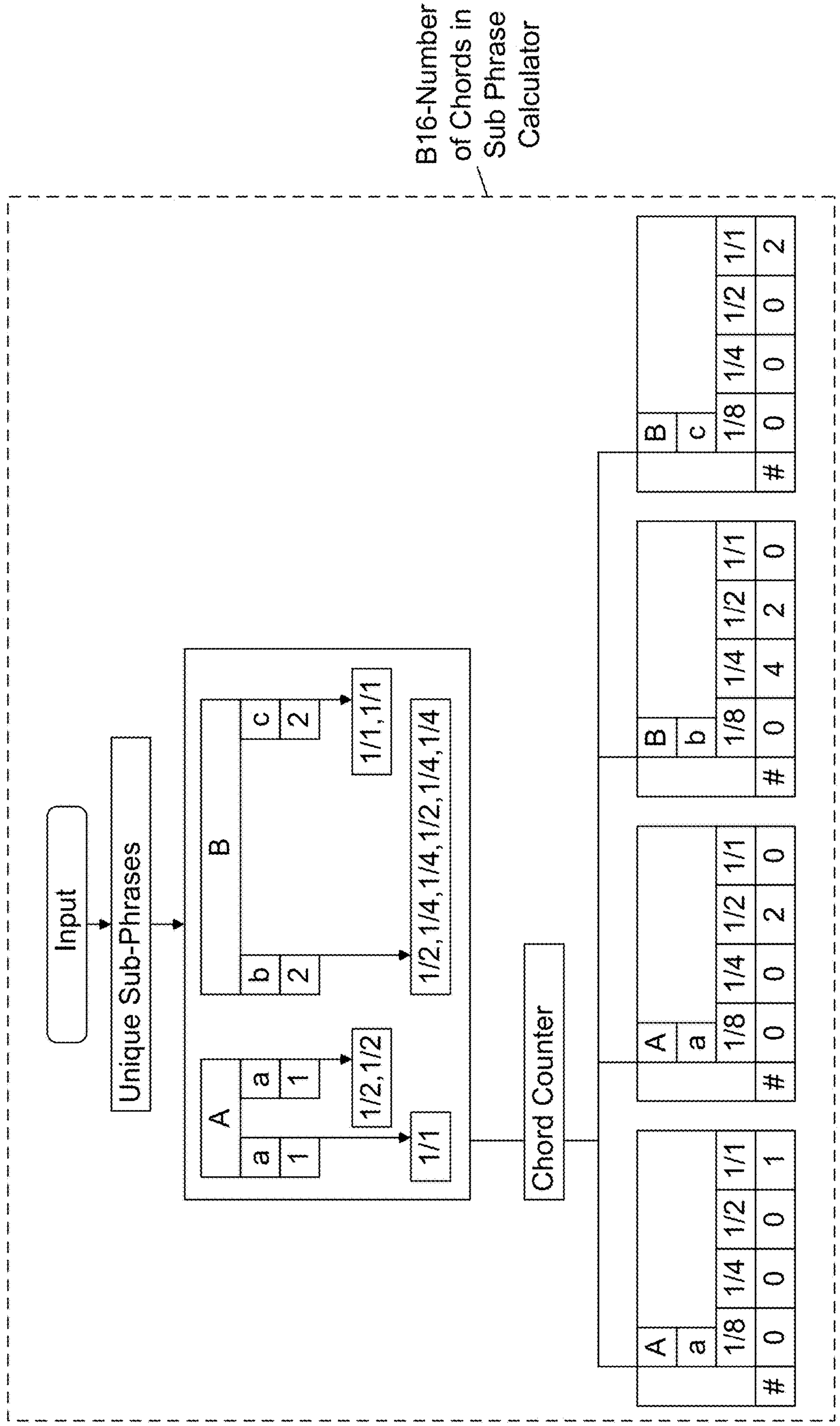
FIG. 27Q shows a schematic representation of the Number Of Chords In Sub-Phrase Calculation Subsystem (B16) used in the Automated Music Composition and Generation Engine of the present invention, wherein the number of chords in a sub-phrase is calculated using the computed unique sub-phrases, and wherein the number of chords in the sub-phrase is used during the automated music composition and generation process of the present invention.
Figure 27R:
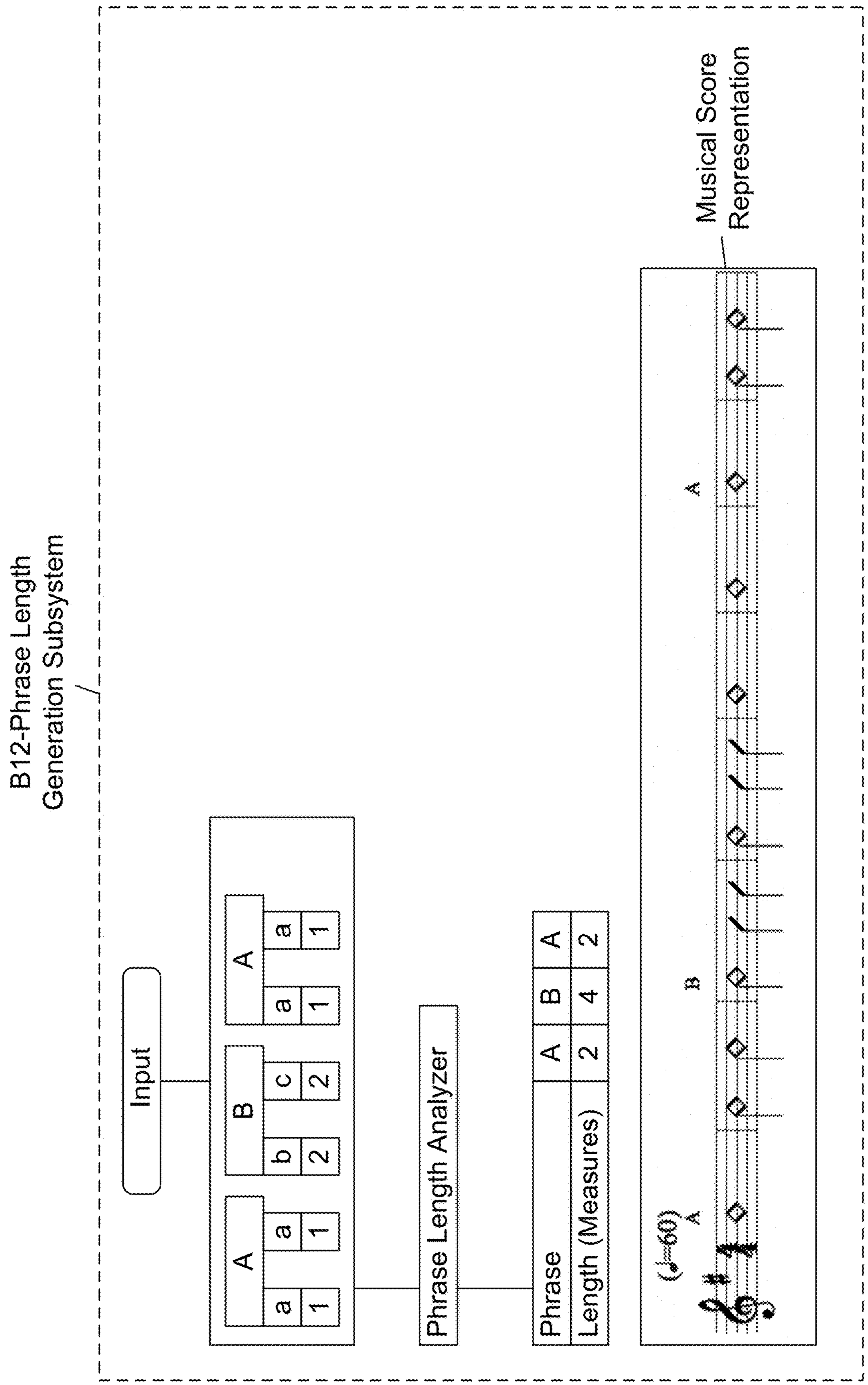
FIG. 27R shows a schematic representation of the Phrase Length Generation Subsystem (B12) used in the Automated Music Composition and Generation Engine of the present invention, wherein the length of the phrases are measured using a phrase length analyzer, and wherein the length of the phrases (in number of measures) are used during the automated music composition and generation process of the present invention.
Figure 27T:
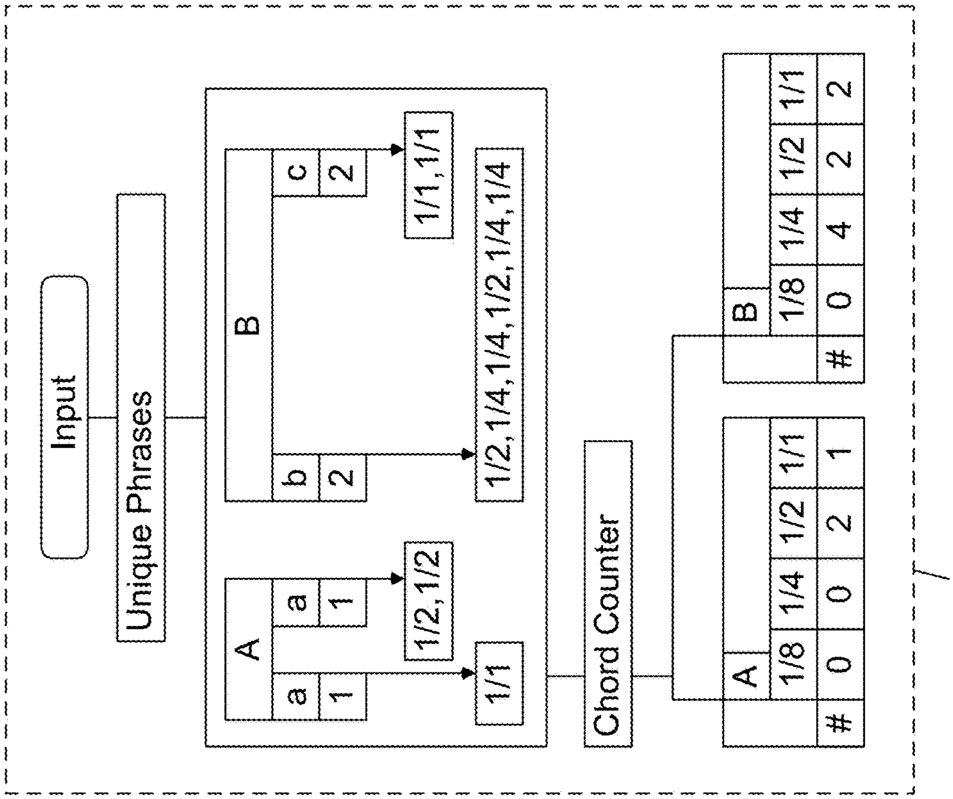
FIG. 27T shows a schematic representation of the Number Of Chords In Phrase Calculation Subsystem (B13) used in the Automated Music Composition and Generation Engine of the present invention, wherein the number of chords in a phrase is determined, and wherein number of chords in a phrase is used during the automated music composition and generation process of the present invention.
Figure 27S:
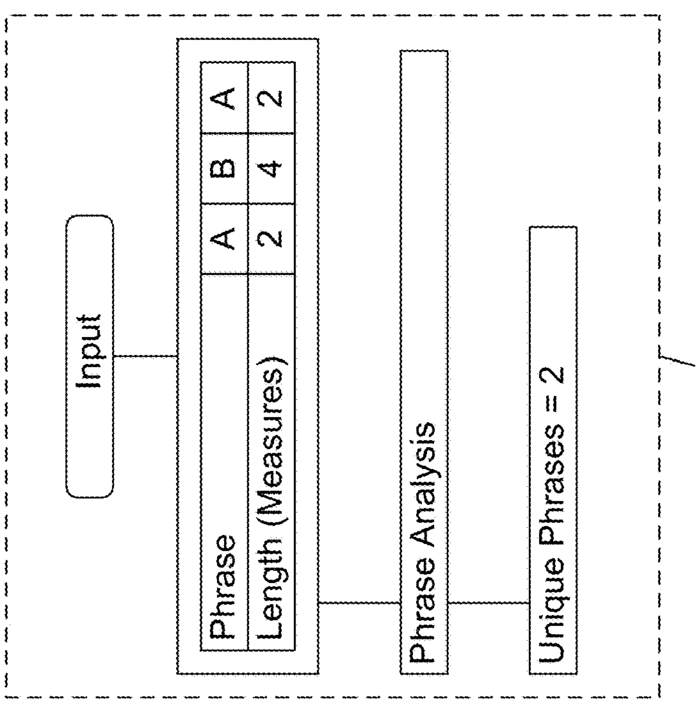
FIG. 27S shows a schematic representation of the unique phrase generation subsystem (B10) used in the Automated Music Composition and Generation Engine of the present invention, wherein the number of unique phrases is determined using a phrase analyzer, and wherein number of unique phrases is used during the automated music composition and generation process of the present invention.
Figure 27U:
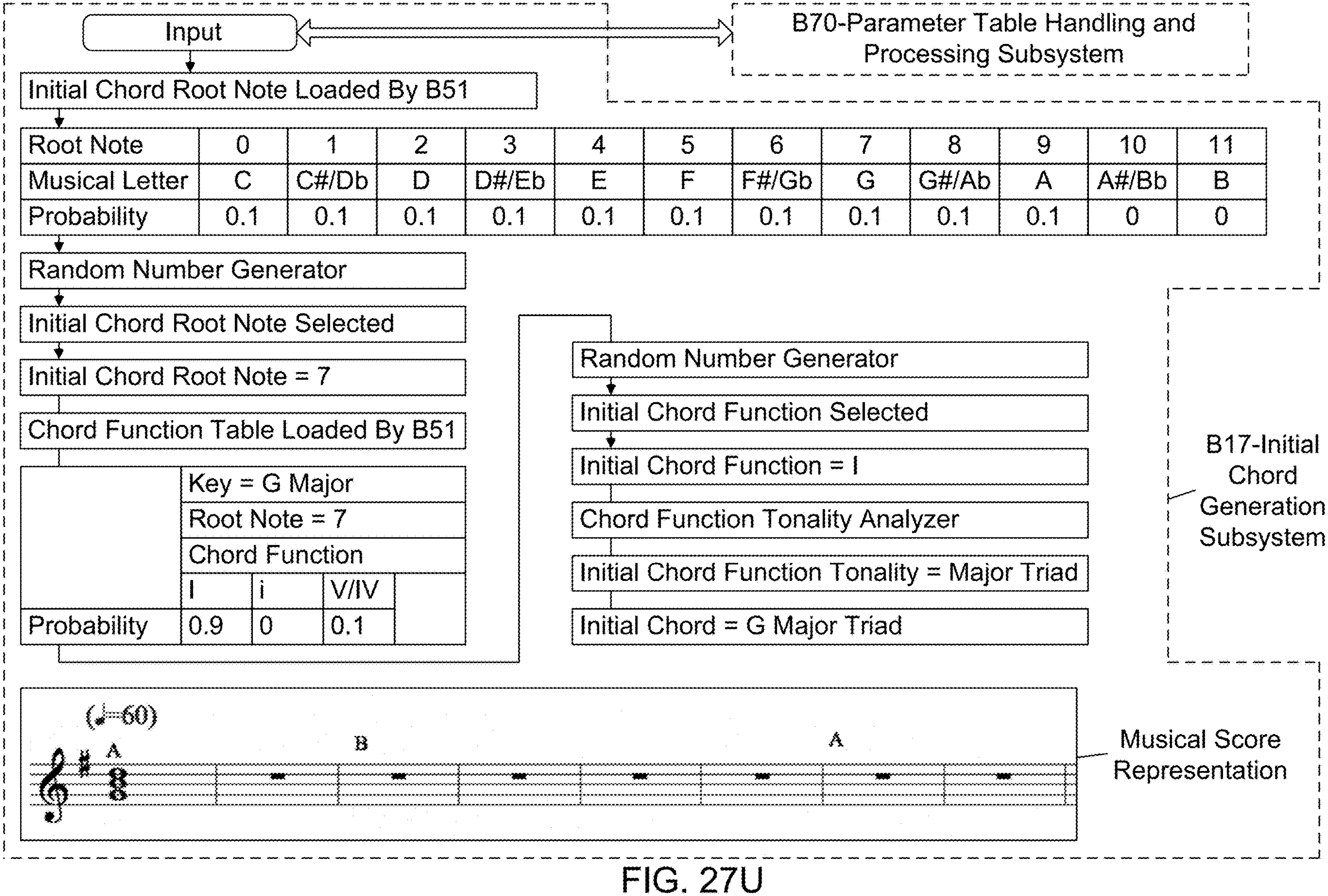
FIG. 27U shows a schematic representation of the Initial General Rhythm Generation Subsystem (B17) used in the Automated Music Composition and Generation Engine of the present invention, wherein the probability-based parameter tables (i.e. the probability-based initial chord root table and probability-based chord function table) employed in the subsystem for the exemplary "emotion-type" musical experience descriptor—HAPPY—is used during the automated music composition and generation process of the present invention.
Figure 27W:
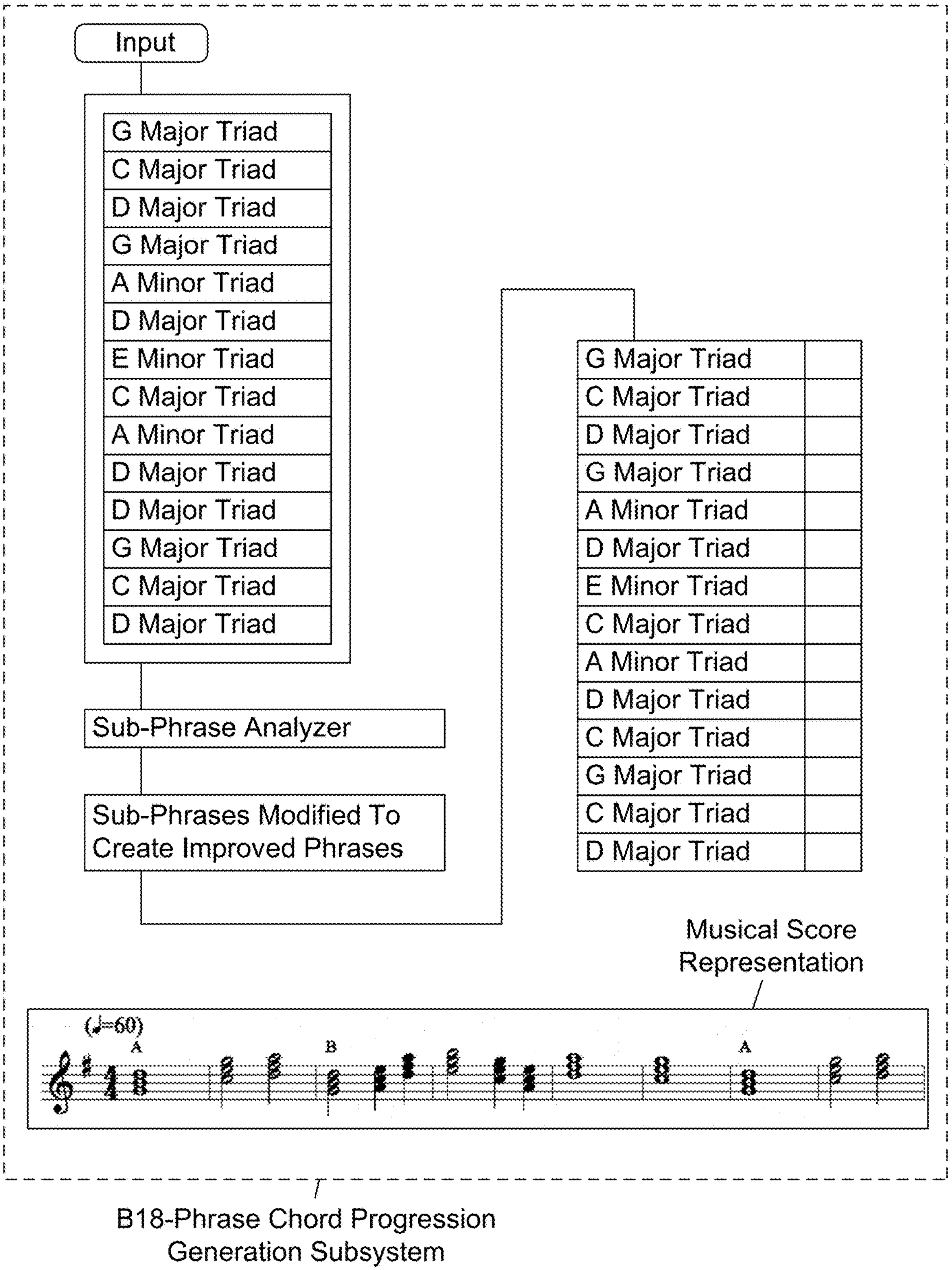
FIG. 27W shows a schematic representation of the Phrase Chord Progression Generation Subsystem (B18) used in the Automated Music Composition and Generation Engine of the present invention, wherein the phrase chord progression is determined using the sub-phrase analyzer, and wherein improved phrases are used during the automated music composition and generation process of the present invention.
Figure 27Y:
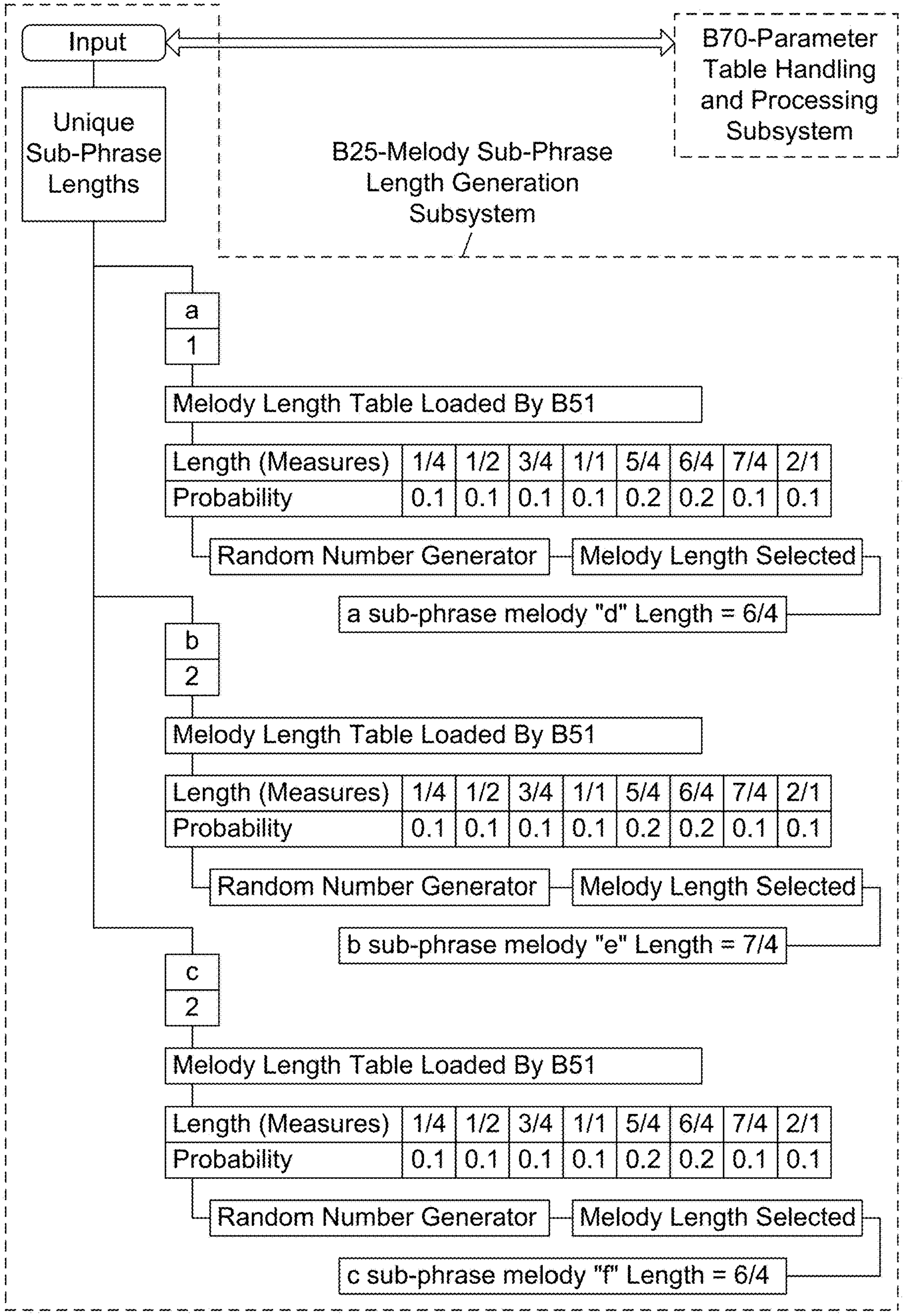
FIG. 27Y shows a schematic representation of the Melody Sub-Phrase Length Generation Subsystem (B25) used in the Automated Music Composition and Generation Engine of the present invention, wherein the probability-based parameter tables (i.e. melody length tables) employed in the subsystem for the exemplary "emotion-type" musical experience descriptor—HAPPY—are used during the automated music composition and generation process of the present invention.
Figure 27A:
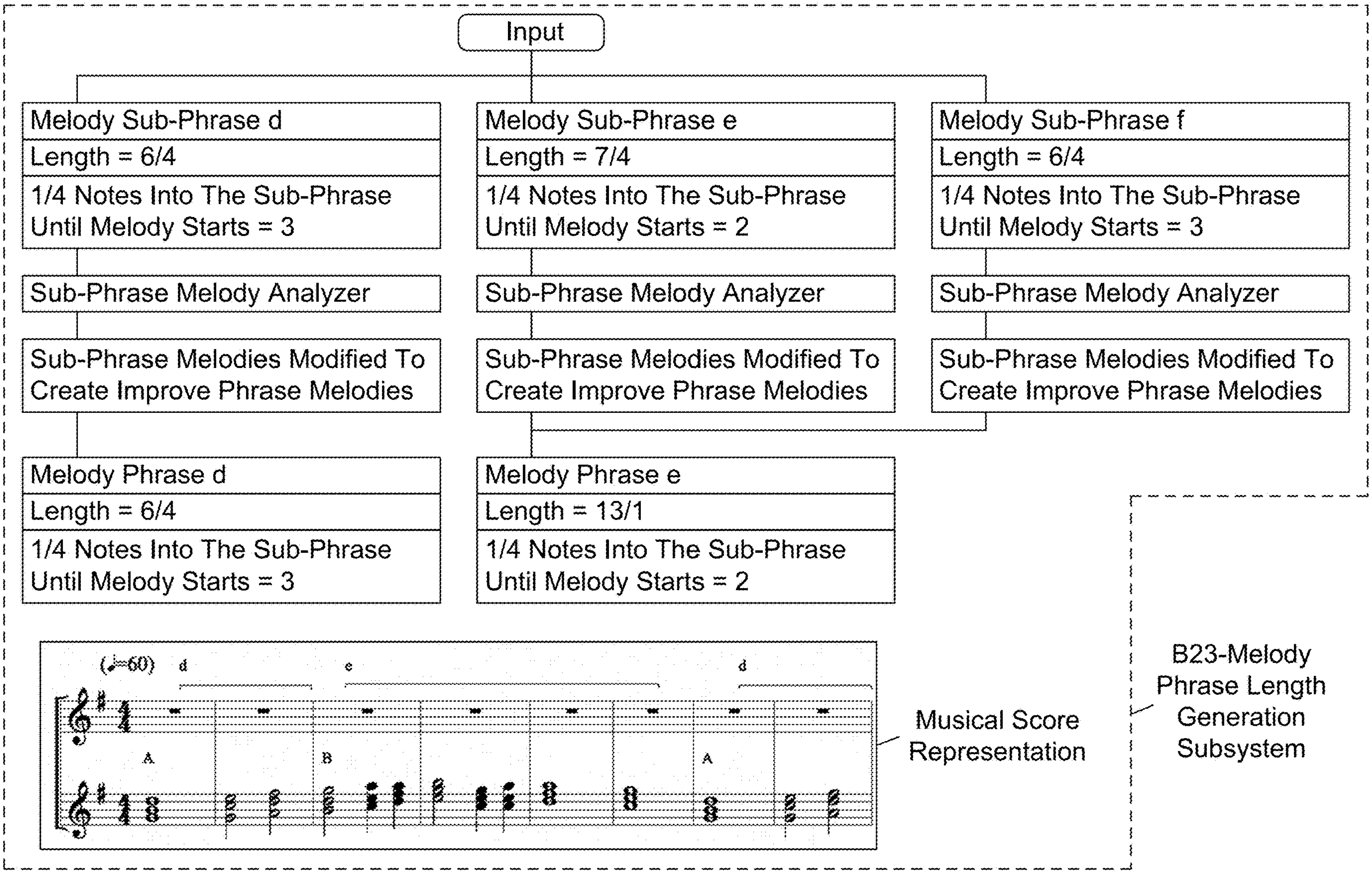
FIG. 27A shows a schematic representation of the User GUI-based input output subsystem (BO) used in the Automated Music Composition and Generation Engine E1 of the present invention, wherein the system user provides musical experience descriptors—e.g. HAPPY—to the input output system B0 for distribution to the descriptor parameter capture subsystem B1, wherein the probability-based tables are generated and maintained by the Parameter Transformation Engine Subsystem B51 shown in FIG. 27B3B, for distribution and loading in the various subsystems therein, for use in subsequent subsystem set up and automated music composition and generation.

In FIG. 27A, musical experience descriptors, and optionally time and space parameters (specifying the time and space requirements of any form of media to be scored with composed music) are provided to the GUI-based interface supported by the input output subsystem B0. The output of the input output subsystem B0 is provided to other subsystems B1, B37 and B40 in the Automated Music Composition and Generation Engine, as shown in FIGS. 26A through 26P.

Figure 27B:
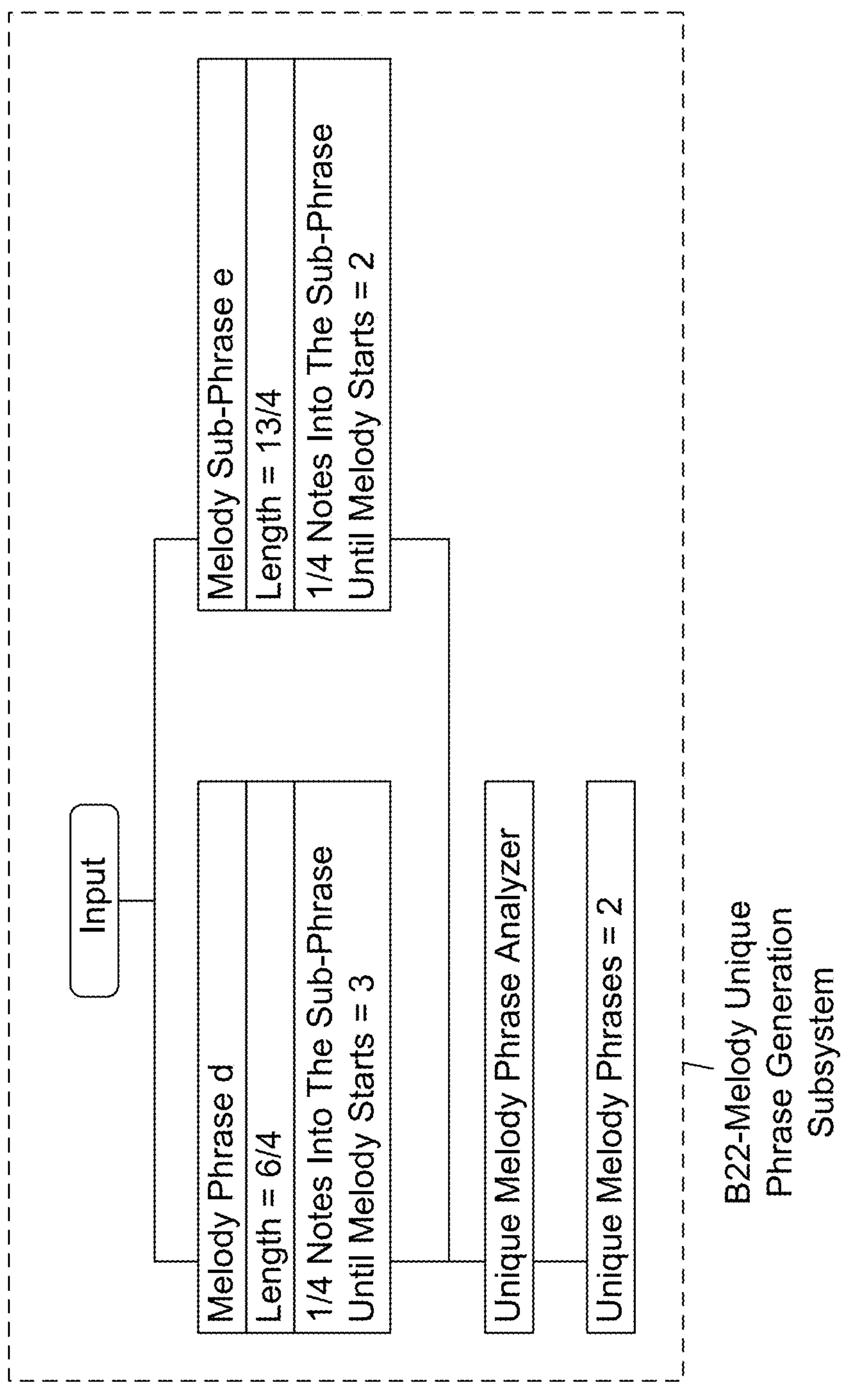

As shown in FIGS. 27B1 and 27B2, the Descriptor Parameter Capture Subsystem B1 interfaces with a Parameter Transformation Engine Subsystem B51 schematically illustrated in FIG. 27B3B, wherein the musical experience descriptors (e.g. emotion-type descriptors illustrated in FIGS. 32A, 32B, 32C, 32D, 32E and 32F and style-type descriptors illustrated in FIGS. 33A, 33B, 33C, 33D, and 33E) and optionally timing (e.g. start, stop and hit timing locations) and/or spatial specifications (e.g. Slide No. 21 in the Photo Slide Show), are provided to the system user interface of subsystem B0. These musical experience descriptors are automatically transformed by the Parameter Transformation Engine B51 into system operating parameter (SOP) values maintained in the programmable music-theoretic parameter tables that are generated, distributed and then loaded into and used by the various subsystems of the system. For purposes of illustration and simplicity of explication, the musical experience descriptor—HAPPY—is used as a system user input selection, as illustrated in FIGS. 28A through 28S. However, the SOP parameter tables corresponding to five exemplary emotion-type musical experience descriptors are illustrated in FIGS. 28A through 28P, for purposes of illustration only. It is understood that the dimensions of such SOP tables in the subsystems will include (i) as many emotion-type musical experience descriptors as the system user has selected, for the probabilistic SOP tables that are structured or dimensioned on emotion-type descriptors in the respective subsystems, and (ii) as many style-type musical experience descriptors as the system user has selected, for probabilistic SOP tables that are structured or dimensioned on style-type descriptors in respective subsystems.

The principles by which such non-musical system user parameters are transformed or otherwise mapped into the probabilistic-based system operating parameters of the various system operating parameter (SOP) tables employed in the system will be described hereinbelow with reference to the transformation engine model schematically illustrated in FIGS. 27B3A, 27B3B and 27B3C, and related figures disclosed herein. In connection therewith, it will be helpful to illustrate how the load of parameter transformation engine in subsystem B51 will increase depending on the degrees of freedom supported by the musical experience descriptor interface in subsystem B0.

Consider an exemplary system where the system supports a set of N different emotion-type musical experience descriptors ($N_e$) and a set of M different style-type musical experience descriptors ($M_s$), from which a system user can select at the system user interface subsystem B0. Also, consider the case where the system user is free to select only one emotion-type descriptor from the set of N different emotion-type musical experience descriptors ($N_e$), and only one style-type descriptor set of M different style-type musical experience descriptors ($M_s$). In this highly limited case, where the system user can select any one of N unique emotion-type musical experience descriptors ($N_e$). and only one of the M different style-type musical experience descriptors ($M_s$), the Parameter Transformation Engine Subsystem B51 FIGS. 27B3A, 27B3B and 27B3C will need to generate $M_{sopt}=N_e!/(N_e-r)!r_e!\times M_s!/(M_s-r_s)!r_s!$ unique sets of probabilistic system operating parameter (SOP) tables, as illustrated in FIGS. 28A through 28S, for distribution to and loading into their respective subsystems during each automated music composition process, where $N_e$ is the total number of emotion-type musical experience descriptors, $M_s$ is the total number of style-type musical experience descriptors, $r_e$ is the number of musical experience descriptors that are selected for emotion, and $r_s$ is the number musical experience descriptors that are selected for style. The above factorial-based combination formula reduces to $N_{sopt}=N_e\times M_e$ for the case where $r_e=1$ and $r_s=1$. If $N_e=30\times M_e=10$, the Transformation Engine will have the capacity to generate 300 different sets of probabilistic system operating parameter tables to support the set of 30 different emotion descriptors and set of 10 style descriptors, from which the system user can select one (1) emotion descriptor and one (1) style descriptor when configuring the automated music composition and generation system—with musical experience descriptors—to create music using the exemplary embodiment of the system in accordance with the principles of the present invention.

For the case where the system user is free to select up to two (2) unique emotion-type musical experience descriptors from the set of N unique emotion-type musical experience descriptors ($N_e$), and two (2) unique style-type musical experience descriptors from the set of M different style-type musical experience descriptors ($M_s$), then the Transformation Engine of FIGS. 27B3A, 27B3B and 27B3C must generate $N_{sopt}=N_e!/(N_e-2)!2!\times M_s!/(M_s-2)!2!$ different sets of probabilistic system operating parameter tables ($S_{OPT}$) as illustrated in FIGS. 28A through 28S, for distribution to and loading into their respective subsystems during each automated music composition process of the present invention, wherein $n_e$ is the total number of emotion-type musical experience descriptors, $M_s$ is the total number of style-type musical experience descriptors, $r_e=2$ is the number of musical experience descriptors that are selected for emotion, and $r_s=2$ is the number musical experience descriptors that are selected for style. If $N_e=30\times M_e=10$, then the Parameter Transformation Engine subsystem B51 will have the capacity to generate $N_{sopt}=30!/(30-2)!2!\times 10!/(10-2)!2!$ different sets of probabilistic system operating parameter tables to support the set of 30 different emotion descriptors and set of 10 style descriptors, from which the system user can select one emotion descriptor and one style descriptor when programming the automated music composition and generation system—with musical experience descriptors—to create music using the exemplary embodiment of the system in accordance with the principles of the present invention. The above factorial-based combinatorial formulas provide guidance on how many different sets of probabilistic system operating parameter tables will need to be generated by the Transformation Engine over the full operating range of the different inputs that can be selected for emotion-type musical experience descriptors, $M_s$ number of style-type musical experience descriptors, $r_e$ number of musical experience descriptors that can be selected for emotion, and $r_s$ number of musical experience descriptors that can be selected for style, in the illustrative example given above. It is understood that design parameters $N_e$, $M_s$, $r_e$, and $r_s$ can be selected as needed to meet the emotional and artistic needs of the expected system user base for any particular automated music composition and generation system-based product to be designed, manufactured and distributed for use in commerce.

While the quantitative nature of the probabilistic system operating tables have been explored above, particularly with respect to the expected size of the table sets, that can be generated by the Transformation Engine Subsystem B51, it will be appropriate to discuss at a later juncture with reference to FIGS. 27B3A, 27B3B and 27B3C and FIGS. 28A through 28S, the qualitative relationships that exist between (i) the musical experience descriptors and timing and spatial parameters supported by the system user interface of the system of the present invention, and (ii) music-theoretic concepts reflected in the probabilistic-based system operating parameter tables (SOPT) illustrated in FIGS. 28A through 28S, and how these qualitative relationships can be used to select specific probability values for each set of probabilistic-based system operating parameter tables that must be generated within the Transformation Engine and distributed to and loaded within the various subsystem before each automated music composition and generation process is carried out like clock-work within the system of the present invention.

Regarding the overall timing and control of the subsystems within the system, reference should be made to the system timing diagram set forth in FIGS. 29A and 29B, illustrating that the timing of each subsystem during each execution of the automated music composition and generation process for a given set of system user selected musical experience descriptors and timing and/or spatial parameters provided to the system.

As shown in FIGS. 29A and 29B, the system begins with B1 turning on, accepting inputs from the system user, followed by similar processes with B37, B40, and B41. At this point, a waterfall creation process is engaged and the system initializes, engages, and disengages each component of the platform in a sequential manner. As described in FIGS. 29A and 29B, each component is not required to remain on or actively engaged throughout the entire compositional process.

The table formed by FIGS. 30, 30A, 30B, 30C, 30D, 30E, 30F, 30G, 30H, 30I and 30J describes the input and output information format(s) of each component of the Automated Music Composition and Generation System. Again, these formats directly correlate to the real-world method of music composition. Each component has a distinct set of inputs and outputs that allow the subsequent components in the system to function accurately.

FIGS. 26A through 26P illustrates the flow and processing of information input, within, and out of the automated music composition and generation system. Starting with user inputs to Blocks 1, 37, 40, and 41, each component subsystem methodically makes decisions, influences other decision-making components/subsystems, and allows the system to rapidly progress in its music creation and generation process. In FIGS. 26A through 26P, and other figure drawings herein, solid lines (dashed when crossing over another line to designate no combination with the line being crossed over) connect the individual components and triangles designate the flow of the processes, with the process moving in the direction of the triangle point that is on the line and away from the triangle side that is perpendicular to the line. Lines that intersect without any dashed line indications represent a combination and or split of information and or processes, again moving in the direction designated by the triangles on the lines.

Overview of the Automated Musical Composition and Generation Process of the Present Invention Supported by the Architectural Components of the Automated Music Composition and Generation System Illustrated in FIGS. 26A Through 26P It will be helpful at this juncture to refer to the high-level flow chart set forth in FIG. 50, providing an overview of the automated music composition and generation process supported by the various systems of the present invention disclosed and taught here. In connection with this process, reference should also be made to FIGS. 26A through 26P, to follow the corresponding high-level system architecture provided by the system to support the automated music composition and generation process of the present invention, carrying out the virtual-instrument music synthesis method, described above.

As indicated in Block A of FIG. 50 and reflected in FIGS. 26A through 26D, the first phase of the automated music composition and generation process according to the illustrative embodiment of the present invention involves receiving emotion-type and style-type and optionally timing-type parameters as musical descriptors for the piece of music which the system user wishes to be automatically composed and generated by machine of the present invention. Typically, the musical experience descriptors are provided through a GUI-based system user I/O Subsystem B0, although it is understood that this system user interface need not be GUI-based, and could use EDI, XML, XML-HTTP and other types information exchange techniques where machine-to-machine, or computer-to-computer communications are required to support system users which are machines, or computer-based machines, request automated music composition and generation services from machines practicing the principles of the present invention, disclosed herein.

As indicated in Block B of FIG. 50, and reflected in FIGS. 26D through 26J, the second phase of the automated music composition and generation process according to the illustrative embodiment of the present invention involves using the General Rhythm Subsystem A1 for generating the General Rhythm for the piece of music to be composed. This phase of the process involves using the following subsystems: the Length Generation Subsystem B2; the Tempo Generation Subsystem B3; the Meter Generation Subsystem B4; the Key Generation Subsystem B5; the Beat Calculator Subsystem B6; the Tonality Generation Subsystem B7; the Measure Calculator Subsystem B8; the Song Form Generation Subsystem B9; the Sub-Phrase Length Generation Subsystem B15; the Number of Chords in Sub-Phrase Calculator Subsystem B16; the Phrase Length Generation Subsystem B12; the Unique Phrase Generation Subsystem B10; the Number of Chords in Phrase Calculator Subsystem B13; the Chord Length Generation Subsystem B11; the Unique Sub-Phrase Generation Subsystem B14; the Instrumentation Subsystem B38; the Instrument Selector Subsystem B39; and the Timing Generation Subsystem B41.

As indicated in Block C of FIG. 50, and reflected in FIGS. 26J and 26K, the third phase of the automated music composition and generation process according to the illustrative embodiment of the present invention involves using the General Pitch Generation Subsystem A2 for generating chords for the piece of music being composed. This phase of the process involves using the following subsystems: the Initial General Rhythm Generation Subsystem B17; the Sub-Phrase Chord Progression Generation Subsystem B19; the Phrase Chord Progression Generation Subsystem B18; the Chord Inversion Generation Subsystem B20.

As indicated in Block D of FIG. 50, and reflected in FIGS. 26K and 26L, the fourth phase of the automated music composition and generation process according to the illustrative embodiment of the present invention involves using the Melody Rhythm Generation Subsystem A3 for generating a melody rhythm for the piece of music being composed. This phase of the process involve using the following subsystems: the Melody Sub-Phrase Length Generation Subsystem B25; the Melody Sub-Phrase Generation Subsystem B24; the Melody Phrase Length Generation Subsystem B23; the Melody Unique Phrase Generation Subsystem B22; the Melody Length Generation Subsystem B21; the Melody Note Rhythm Generation Subsystem B26.

As indicated in Block E of FIG. 50, and reflected FIGS. 26L and 26M, the fifth phase of the automated music composition and generation process according to the illustrative embodiment of the present invention involves using the Melody Pitch Generation Subsystem A4 for generating a melody pitch for the piece of music being composed. This phase of the process involves the following subsystems: the Initial Pitch Generation Subsystem B27; the Sub-Phrase Pitch Generation Subsystem B29; the Phrase Pitch Generation Subsystem B28; and the Pitch Octave Generation Subsystem B30.

As indicated in Block F of FIG. 50, and reflected in FIG. 26M, the sixth phase of the automated music composition and generation process according to the illustrative embodiment of the present invention involves using the Orchestration Subsystem A5 for generating the orchestration for the piece of music being composed. This phase of the process involves the Orchestration Generation Subsystem B31.

As indicated in Block G of FIG. 50, and reflected in FIG. 26M, the seventh phase of the automated music composition and generation process according to the illustrative embodiment of the present invention involves using the Controller Code Creation Subsystem A6 for creating controller code for the piece of music. This phase of the process involves using the Controller Code Generation Subsystem B32.

As indicated in Block H of FIG. 50, and reflected in FIGS. 26M and 26N, the eighth phase of the automated music composition and generation process according to the illustrative embodiment of the present invention involves using the Digital Piece Creation Subsystem A7 for creating the digital piece of music. This phase of the process involves using the following subsystems: the Digital Audio Sample Audio Retriever Subsystem B333; the Digital Audio Sample Organizer Subsystem B34; the Piece Consolidator Subsystem B35; the Piece Format Translator Subsystem B50; and the Piece Deliverer Subsystem B36.

As indicated in Block I of FIG. 50, and reflected in FIGS. 26N, 26O and 26P, the ninth phase of the automated music composition and generation process according to the illustrative embodiment of the present invention involves using the Feedback and Learning Subsystem A8 for supporting the feedback and learning cycle of the system. This phase of the process involves using the following subsystems: the Feedback Subsystem B42; the Music Editability Subsystem B431; the Preference Saver Subsystem B44; the Musical kernel Subsystem B45; the User Taste Subsystem B46; the Population Taste Subsystem B47; the User Preference Subsystem B48; and the Population Preference Subsystem B49.

Figure 3:
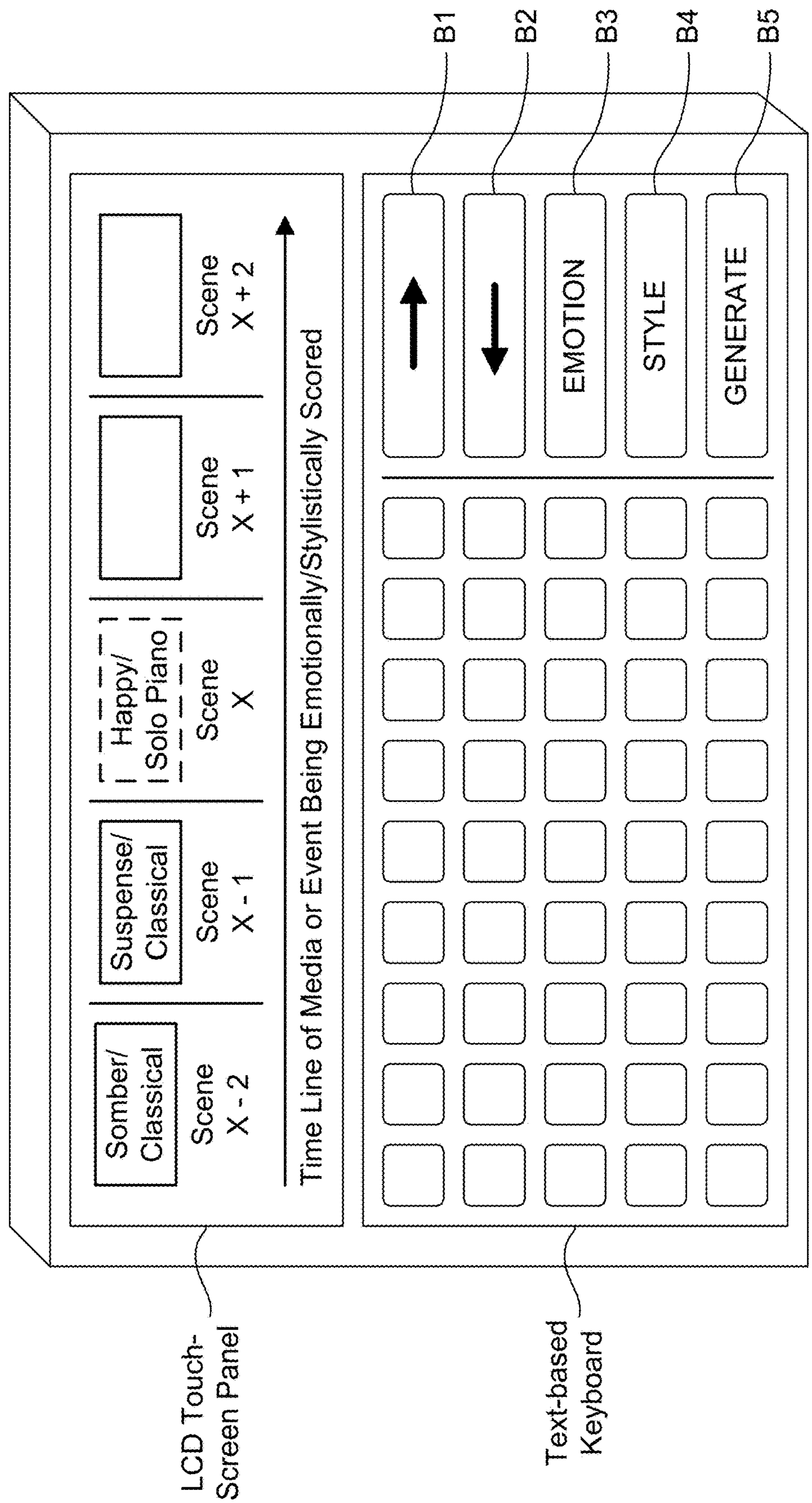
FIG. 3 shows a prospective view of an automated music composition and generation instrument system according to a first illustrative embodiment of the present invention, supporting virtual-instrument music synthesis driven by linguistic-based musical experience descriptors produced using a text keyboard and/or a speech recognition interface provided in a compact portable housing.

Specification of the First Illustrative Embodiment of the Automated Music Composition and Generation System of the Present Invention FIG. 3 shows an automated music composition and generation instrument system according to a first illustrative embodiment of the present invention, supporting virtual-instrument (e.g. sampled-instrument) music synthesis and the use of linguistic-based musical experience descriptors produced using a text keyboard and/or a speech recognition interface provided in a compact portable housing.

Figure 4:
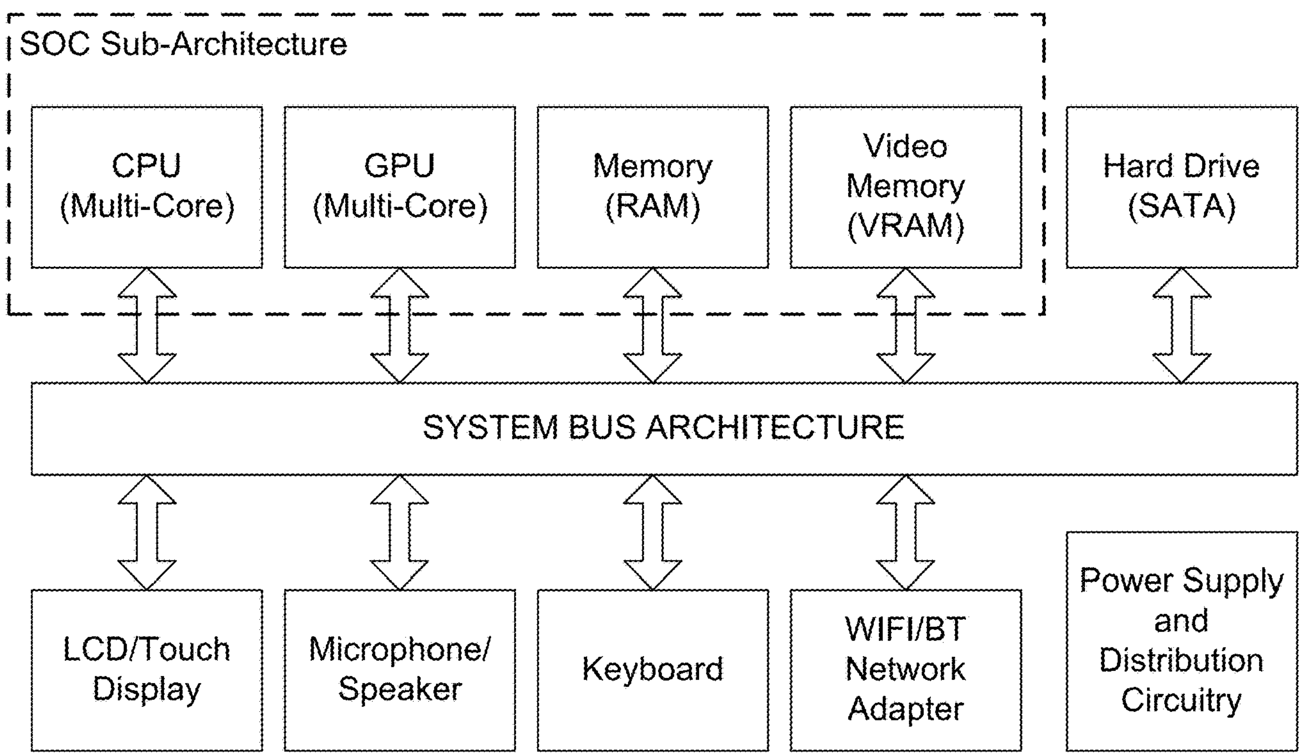
FIG. 4 is a schematic diagram of an illustrative implementation of the automated music composition and generation instrument system of the first illustrative embodiment of the present invention, supporting virtual-instrument music synthesis driven by linguistic-based musical experience descriptors produced using a text keyboard and/or a speech recognition interface, showing the various components of a SOC-based sub-architecture and other system components, integrated around a system bus architecture.

FIG. 4 is a schematic diagram of an illustrative implementation of the automated music composition and generation instrument system of the first illustrative embodiment of the present invention, supporting virtual-instrument (e.g. sampled-instrument) music synthesis and the use of linguistic-based musical experience descriptors produced using a text keyboard and/or a speech recognition interface, showing the various components integrated around a system bus architecture.

In general, the automatic or automated music composition and generation system shown in FIG. 3, including all of its inter-cooperating subsystems shown in FIGS. 26A through 33E and specified above, can be implemented using digital electronic circuits, analog electronic circuits, or a mix of digital and analog electronic circuits specially configured and programmed to realize the functions and modes of operation to be supported by the automatic music composition and generation system. The digital integrated circuitry (IC) can include low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

Figure 5:
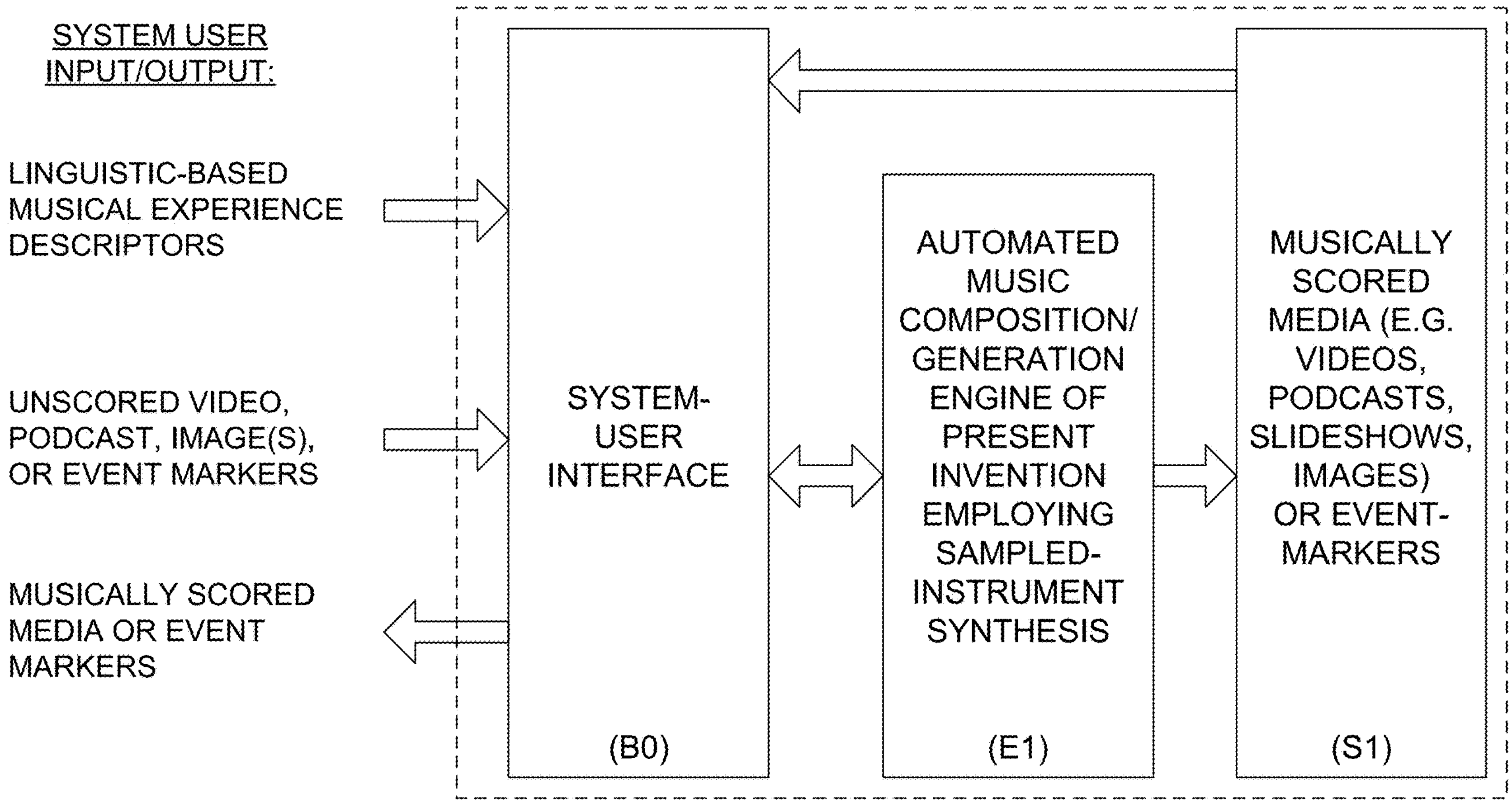
FIG. 5 is a high-level system block diagram of the automated music composition and generation instrument system of the first illustrative embodiment, supporting virtual-instrument music synthesis driven by linguistic-based musical experience descriptors produced using a text keyboard and/or a speech recognition interface, wherein linguistic-based musical experience descriptors, and a video, audio-recording, image, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

FIG. 5 shows the automated music composition and generation instrument system of the first illustrative embodiment, supporting virtual-instrument (e.g. sampled-instrument) music synthesis and the use of linguistic-based musical experience descriptors produced using a text keyboard and/or a speech recognition interface, wherein linguistic-based musical experience descriptors, and a video, audio-recording, image, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

FIG. 6 describes the primary steps involved in carrying out the automated music composition and generation process of the first illustrative embodiment of the present invention supporting the use of linguistic and/or graphical icon based musical experience descriptors and virtual-instrument (e.g. sampled-instrument) music synthesis using the instrument system shown in FIGS. 3 through 5, wherein (i) during the first step of the process, the system user accesses the Automated Music Composition and Generation System of the present invention, and then selects a video, an audio-recording (i.e. podcast), slideshow, a photograph or image, or event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Specification of Modes of Operation of the Automated Music Composition and Generation System of the First Illustrative Embodiment of the Present Invention The Automated Music Composition and Generation System of the first illustrative embodiment shown in FIGS. 3 through 6, can operate in various modes of operation including: (i) Manual Mode where a human system user provides musical experience descriptor and timing/spatial parameter input to the Automated Music Composition and Generation System; (ii) Automatic Mode where one or more computer-controlled systems automatically supply musical experience descriptors and optionally timing/spatial parameters to the Automated Music Composition and Generation System, for controlling the operation the Automated Music Composition and Generation System autonomously without human system user interaction; and (iii) a Hybrid Mode where both a human system user and one or more computer-controlled systems provide musical experience descriptors and optionally timing/spatial parameters to the Automated Music Composition and Generation System.

Figure 7:
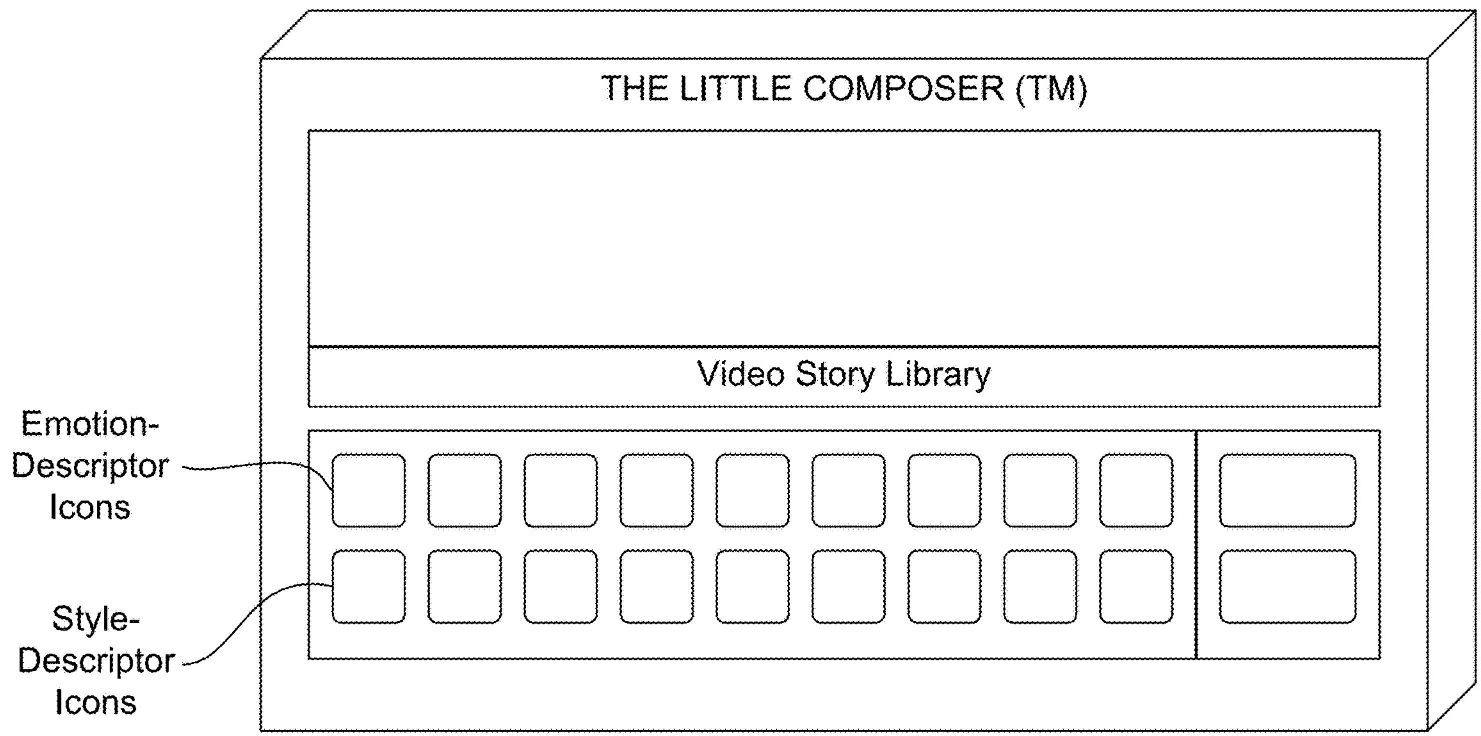
FIG. 7 shows a prospective view of a toy instrument supporting Automated Music Composition and Generation Engine of the second illustrative embodiment of the present invention using virtual-instrument music synthesis driven by icon-based musical experience descriptors, wherein a touch screen display is provided to select and load videos from a library, and children can then select musical experience descriptors (e.g. emotion descriptor icons and style descriptor icons) from a physical keyboard to allow a child to compose and generate custom music for segmented scene of a selected video.

Specification of the Second Illustrative Embodiment of the Automated Music Composition and Generation System of the Present Invention FIG. 7 shows a toy instrument supporting Automated Music Composition and Generation Engine of the second illustrative embodiment of the present invention using virtual-instrument music synthesis and icon-based musical experience descriptors, wherein a touch screen display is provided to select and load videos from a library, and children can then select musical experience descriptors (e.g. emotion descriptor icons and style descriptor icons) from a physical keyboard) to allow a child to compose and generate custom music for a segmented scene of a selected video.

Figure 8:
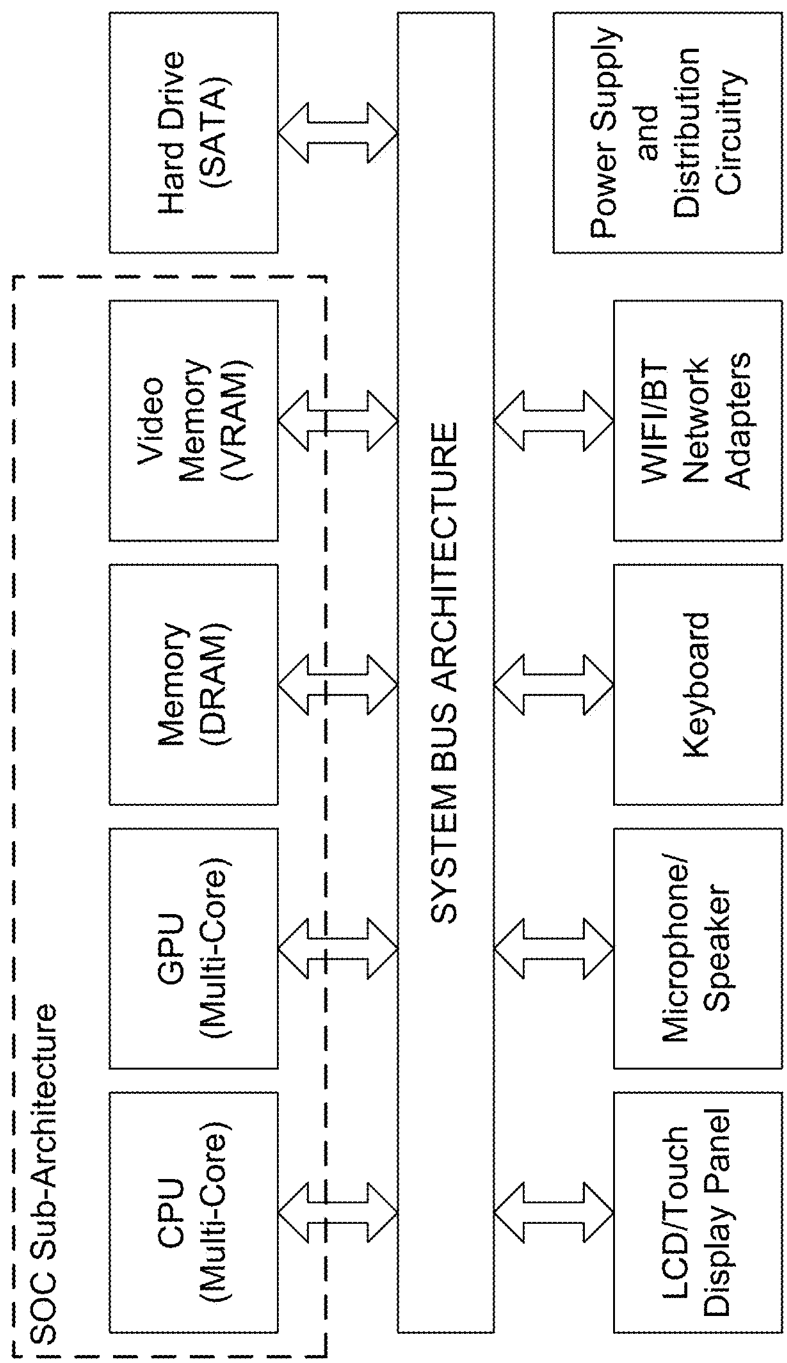
FIG. 8 is a schematic diagram of an illustrative implementation of the automated music composition and generation instrument system of the second illustrative embodiment of the present invention, supporting the use of virtual-instrument music synthesis driven by graphical icon based musical experience descriptors selected by the system user using a keyboard interface, and showing the various components of a SOC-based sub-architecture, such as multi-core CPU, multi-core GPU, program memory (DRAM), video memory (VRAM), interfaced with a hard drive (SATA), LCD/touch-screen display panel, microphone/speaker, keyboard, WIFI/Bluetooth network adapters, and power supply and distribution circuitry, integrated around a system bus architecture.

FIG. 8 is a schematic diagram of an illustrative implementation of the automated music composition and generation instrument system of the second illustrative embodiment of the present invention, supporting virtual-instrument (e.g. sampled-instrument) music synthesis and the use of graphical icon based musical experience descriptors selected using a keyboard interface, showing the various components, such as multi-core CPU, multi-core GPU, program memory (DRAM), video memory (VRAM), hard drive (SATA), LCD/touch-screen display panel, microphone/speaker, keyboard, WIFI/Bluetooth network adapters, and power supply and distribution circuitry, integrated around a system bus architecture.

In general, the automatic or automated music composition and generation system shown in FIG. 7, including all of its inter-cooperating subsystems shown in FIGS. 26A through 33E and specified above, can be implemented using digital electronic circuits, analog electronic circuits, or a mix of digital and analog electronic circuits specially configured and programmed to realize the functions and modes of operation to be supported by the automatic music composition and generation system. The digital integrated circuitry (IC) can include low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

Figure 9:
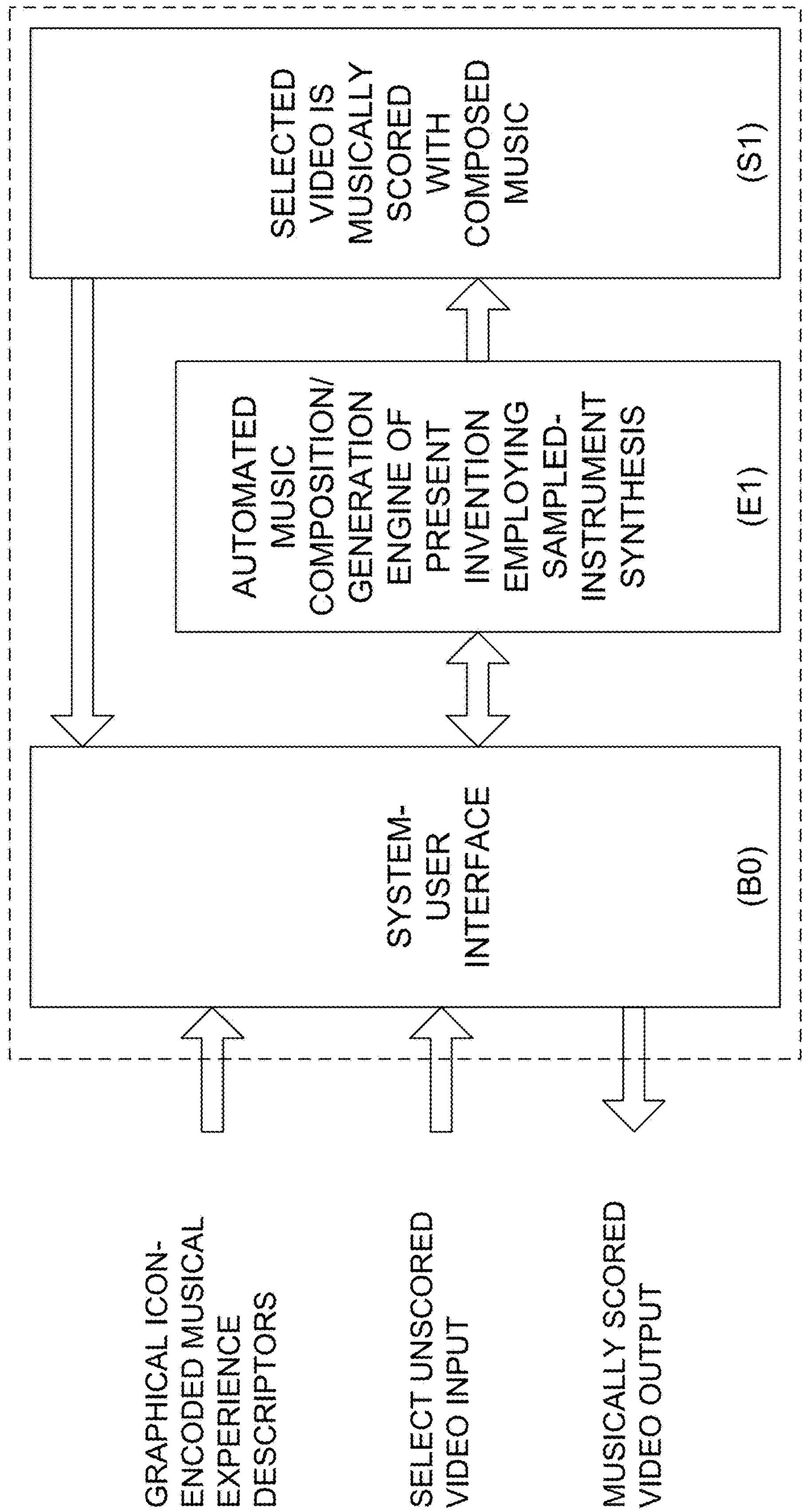
FIG. 9 is a high-level system block diagram of the automated toy music composition and generation toy instrument system of the second illustrative embodiment, wherein graphical icon based musical experience descriptors, and a video are selected as input through the system user interface (i.e. touch-screen keyboard), and used by the Automated Music Composition and Generation Engine of the present invention to generate musically-scored video story that is then supplied back to the system user via the system user interface.

FIG. 9 is a high-level system block diagram of the automated toy music composition and generation toy instrument system of the second illustrative embodiment, wherein graphical icon based musical experience descriptors, and a video are selected as input through the system user interface (i.e. touch-screen keyboard), and used by the Automated Music Composition and Generation Engine of the present invention to generate a musically-scored video story that is then supplied back to the system user via the system user interface.

FIG. 10 is a flow chart illustrating the primary steps involved in carrying out the automated music composition and generation process within the toy music composing and generation system of the second illustrative embodiment of the present invention, supporting the use of graphical icon based musical experience descriptors and virtual-instrument music synthesis using the instrument system shown in FIGS. 7 through 9, wherein (i) during the first step of the process, the system user accesses the Automated Music Composition and Generation System of the present invention, and then selects a video to be scored with music generated by the Automated Music Composition and Generation Engine of the present invention, (ii) the system user selects graphical icon-based musical experience descriptors to be provided to the Automated Music Composition and Generation Engine of the system, (iii) the system user initiates the Automated Music Composition and Generation Engine to compose and generate music based on inputted musical descriptors scored on selected video media, and (iv) the system combines the composed music with the selected video so as to create a video file for display and enjoyment.

Specification of Modes of Operation of the Automated Music Composition and Generation System of the Second Illustrative Embodiment of the Present Invention The Automated Music Composition and Generation System of the second illustrative embodiment shown in FIGS. 7 through 10, can operate in various modes of operation including: (i) Manual Mode where a human system user provides musical experience descriptor and timing/spatial parameter input to the Automated Music Composition and Generation System; (ii) an Automatic Mode where one or more computer-controlled systems automatically supply musical experience descriptors and optionally timing/spatial parameters to the Automated Music Composition and Generation System, for controlling the operation the Automated Music Composition and Generation System autonomously without human system user interaction; and (iii) a Hybrid Mode where both a human system user and one or more computer-controlled systems provide musical experience descriptors and optionally timing/spatial parameters to the Automated Music Composition and Generation System.

Figure 11:
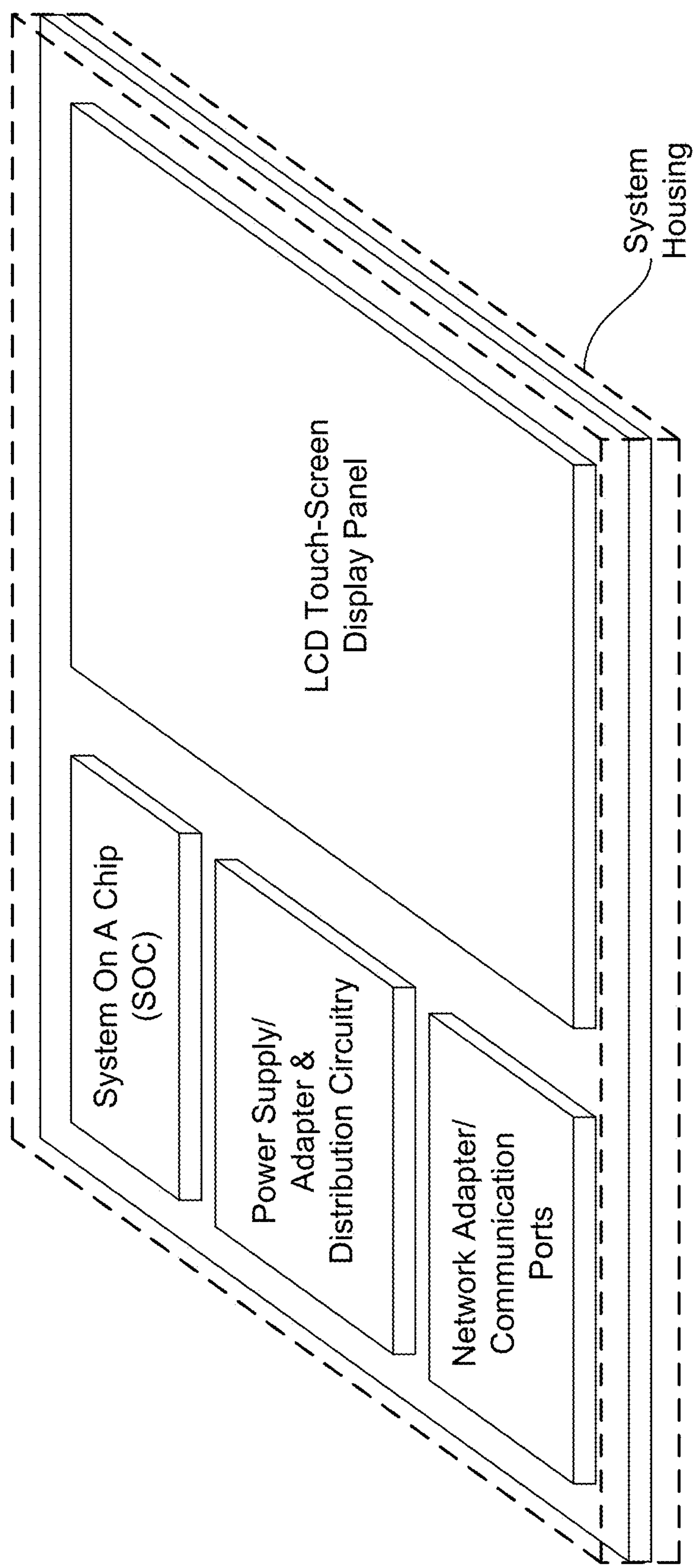
FIG. 11 is a perspective view of an electronic information processing and display system according to a third illustrative embodiment of the present invention, integrating a SOC-based Automated Music Composition and Generation Engine of the present invention within a resultant system, supporting the creative and/or entertainment needs of its system users.

Specification of the Third Illustrative Embodiment of the Automated Music Composition and Generation System of the Present Invention FIG. 11 is a perspective view of an electronic information processing and display system according to a third illustrative embodiment of the present invention, integrating a SOC-based Automated Music Composition and Generation Engine of the present invention within a resultant system, supporting the creative and/or entertainment needs of its system users.

Figure 11A:
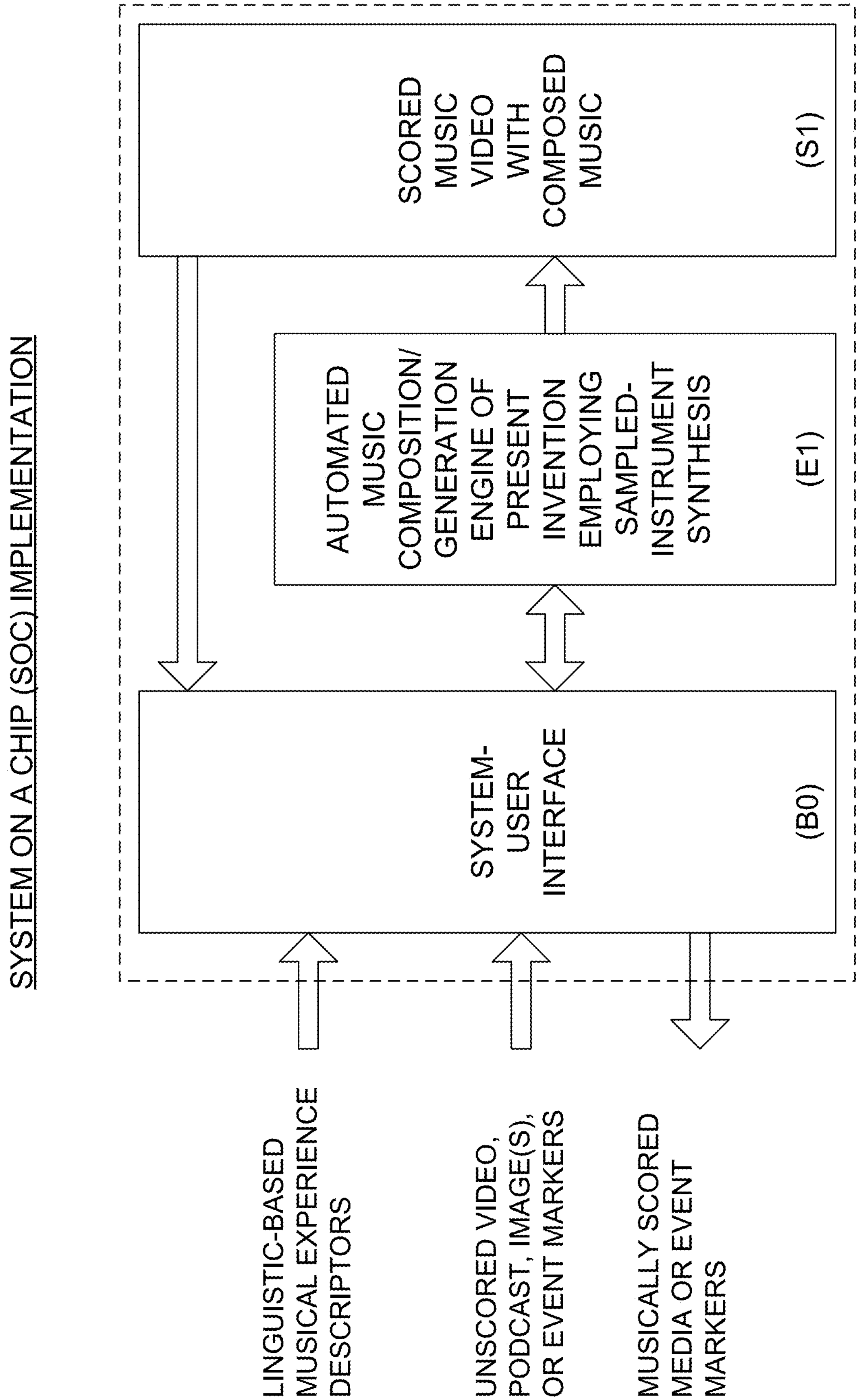
FIG. 11A is schematic representation illustrating the high-level system architecture of the SOC-based music composition and generation system of the present invention supporting the use of virtual-instrument music synthesis driven by linguistic and/or graphical icon based musical experience descriptors and, wherein linguistic-based musical experience descriptors, and a video, audio-recording, image, slideshow, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

FIG. 11A is a schematic representation illustrating the high-level system architecture of the SOC-based music composition and generation system of the present invention supporting the use of linguistic and/or graphical icon based musical experience descriptors and virtual-instrument music synthesis, wherein linguistic-based musical experience descriptors, and a video, audio-recording, image, slideshow, or event marker, are supplied as input through the system user interface, and used by the Automated Music Composition and Generation Engine of the present invention to generate musically-scored media (e.g. video, podcast, image, slideshow etc.) or event marker, that is then supplied back to the system user via the system user interface.

Figure 11B:
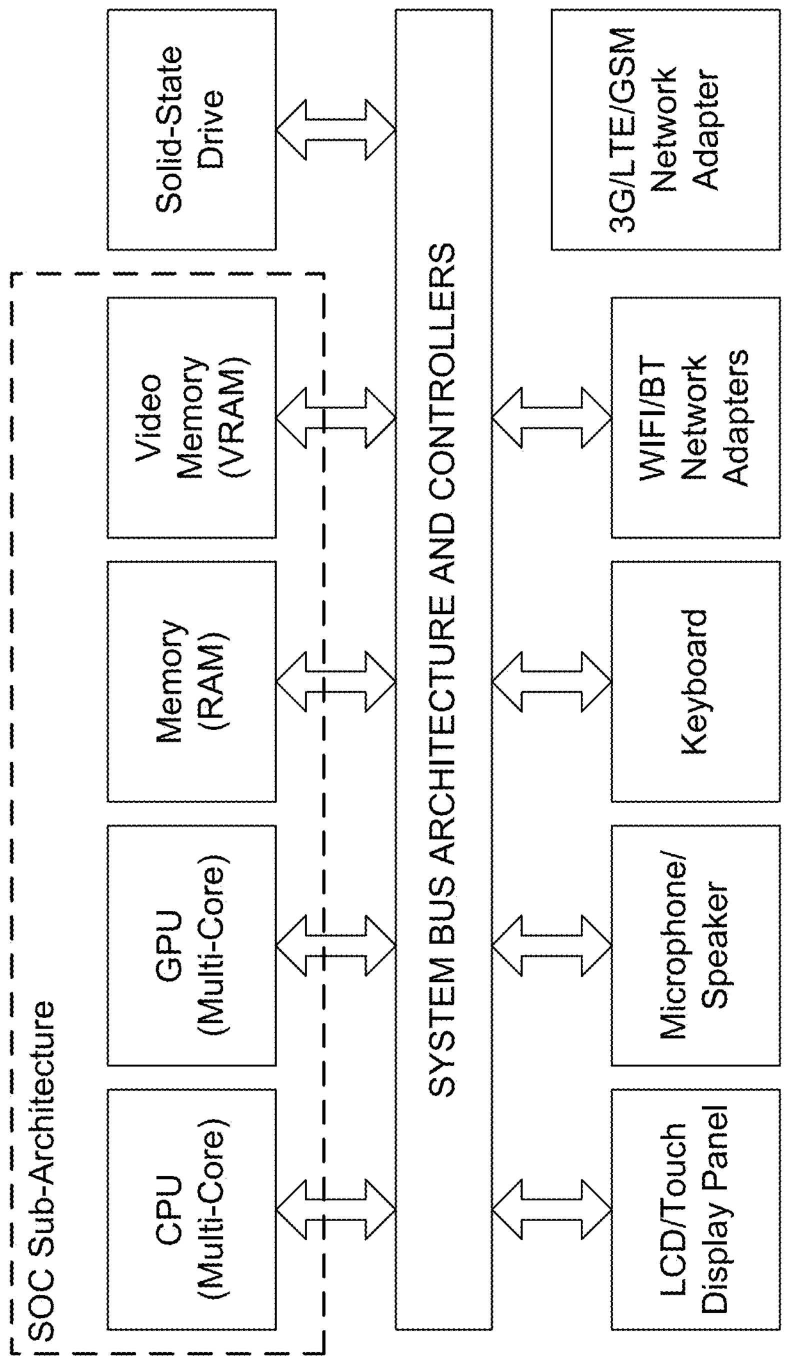

FIG. 11B shows the system illustrated in FIGS. 11 and 11A, comprising a SOC-based subsystem architecture including a multi-core CPU, a multi-core GPU, program memory (RAM), and video memory (VRAM), interfaced with a solid-state (DRAM) hard drive, a LCD/Touch-screen display panel, a micro-phone speaker, a keyboard or keypad, WIFI/Bluetooth network adapters, and 3G/LTE/GSM network adapter integrated with one or more bus architecture supporting controllers and the like.

In general, the automatic or automated music composition and generation system shown in FIG. 11, including all of its inter-cooperating subsystems shown in FIGS. 26A through 33D and specified above, can be implemented using digital electronic circuits, analog electronic circuits, or a mix of digital and analog electronic circuits specially configured and programmed to realize the functions and modes of operation to be supported by the automatic music composition and generation system. The digital integrated circuitry (IC) can include low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

FIG. 12 describes the primary steps involved in carrying out the automated music composition and generation process of the present invention using the SOC-based system shown in FIGS. 11 and 11A supporting the use of linguistic and/or graphical icon based musical experience descriptors and virtual-instrument music synthesis, wherein (i) during the first step of the process, the system user accesses the Automated Music Composition and Generation System of the present invention, and then selects a video, an audio—with music generated by the Automated Music Composition and Generation System of the present invention, (ii) the system user then provides linguistic-based and/or icon recording (i.e. podcast), slideshow, a photograph or image, or event marker to be scored—based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Specification of Modes of Operation of the Automated Music Composition and Generation System of the Third Illustrative Embodiment of the Present Invention The Automated Music Composition and Generation System of the third illustrative embodiment shown in FIGS. 11 through 12, can operate in various modes of operation including: (i) Manual Mode where a human system user provides musical experience descriptor and timing/spatial parameter input to the Automated Music Composition and Generation System; (ii) Automatic Mode where one or more computer-controlled systems automatically supply musical experience descriptors and optionally timing/spatial parameters to the Automated Music Composition and Generation System, for controlling the operation the Automated Music Composition and Generation System autonomously without human system user interaction; and (iii) a Hybrid Mode where both a human system user and one or more computer-controlled systems provide musical experience descriptors and optionally timing/spatial parameters to the Automated Music Composition and Generation System.

Figure 13:
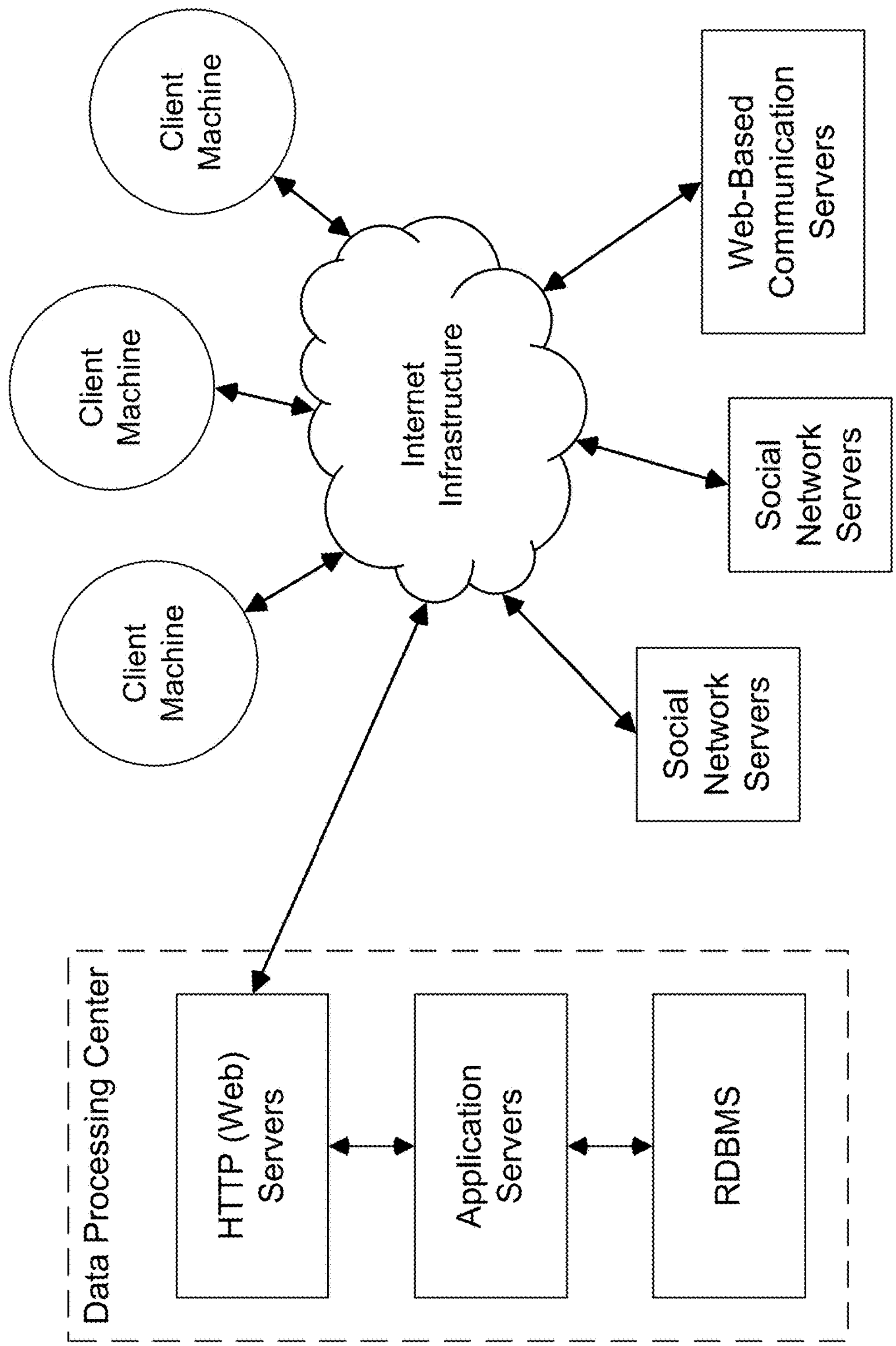
FIG. 13 is a schematic representation of the enterprise-level internet-based music composition and generation system of fourth illustrative embodiment of the present invention, supported by a data processing center with web servers, application servers and database (RDBMS) servers operably connected to the infrastructure of the Internet, and accessible by client machines, social network servers, and web-based communication servers, and allowing anyone with a web-based browser to access automated music composition and generation services on websites (e.g. on YouTube, Vimeo, etc.) to score videos, images, slide-shows, audio-recordings, and other events with music using virtual-instrument music synthesis and linguistic-based musical experience descriptors produced using a text keyboard and/or a speech recognition interface.

Specification of the Fourth Illustrative Embodiment of the Automated Music Composition and Generation System of the Present Invention FIG. 13 is a schematic representation of the enterprise-level internet-based music composition and generation system of fourth illustrative embodiment of the present invention, supported by a data processing center with web servers, application servers and database (RDBMS) servers operably connected to the infrastructure of the Internet, and accessible by client machines, social network servers, and web-based communication servers, and allowing anyone with a web-based browser to access automated music composition and generation services on websites (e.g. on YouTube, Vimeo, etc.) to score videos, images, slide-shows, audio-recordings, and other events with music using virtual-instrument music synthesis and linguistic-based musical experience descriptors produced using a text keyboard and/or a speech recognition interface.

Figure 13A:
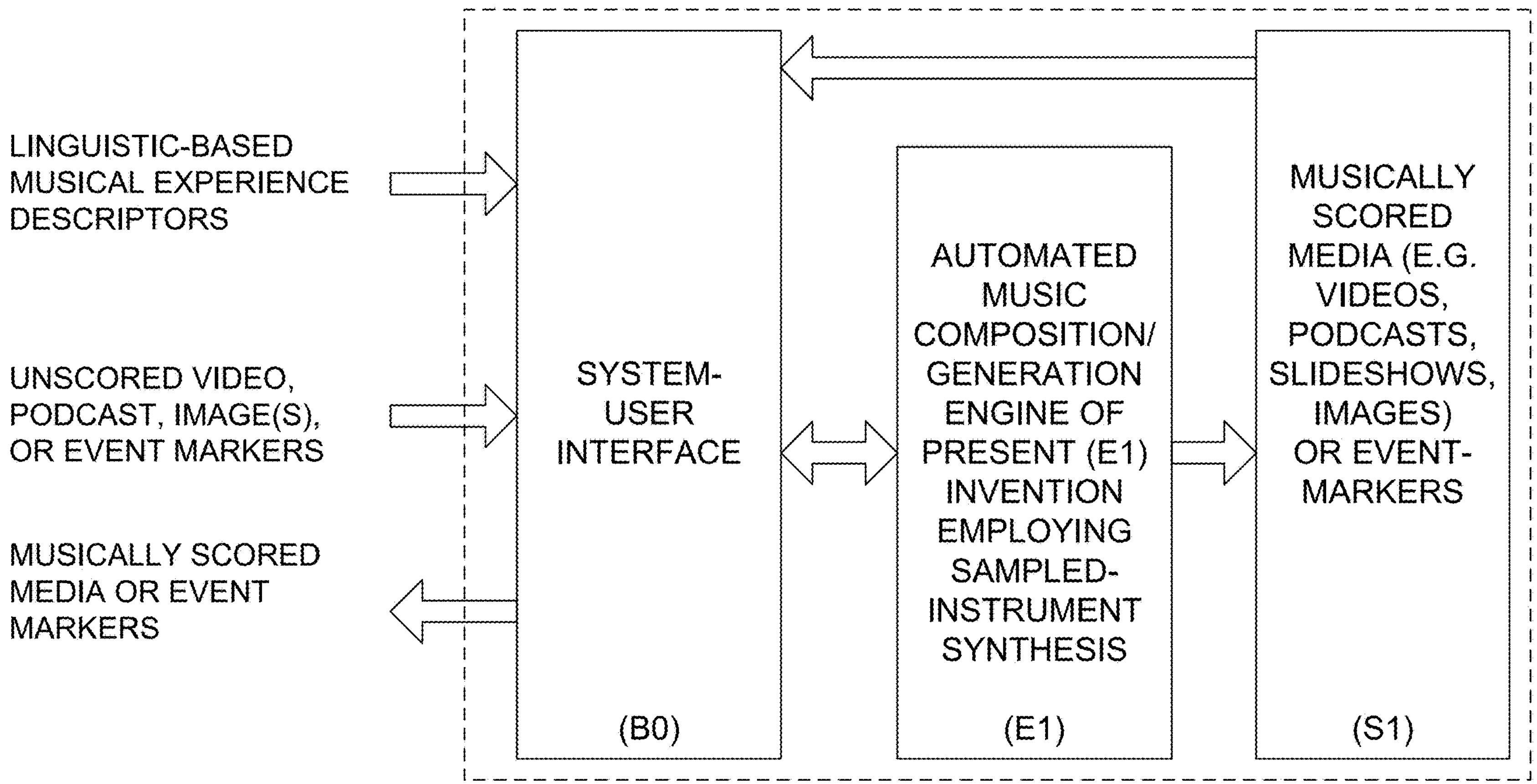
FIG. 13A is schematic representation illustrating the high-level system architecture of the automated music composition and generation process supported by the system shown in FIG. 13, supporting the use of virtual-instrument music synthesis driven by linguistic and/or graphical icon based musical experience descriptors, wherein linguistic-based musical experience descriptors, and a video, audio-recording, image, or event marker, are supplied as input through the web-based system user interface, and used by the Automated Music Composition and Generation Engine of the present invention to generate musically-scored media (e.g. video, podcast, image, slideshow etc.) or event marker, that is then supplied back to the system user via the system user interface.

FIG. 13A is a schematic representation illustrating the high-level system architecture of the automated music composition and generation process supported by the system shown in FIG. 13, supporting the use of linguistic and/or graphical icon based musical experience descriptors and virtual-instrument music synthesis, wherein linguistic-based musical experience descriptors, and a video, audio-recordings, image, or event marker, are supplied as input through the web-based system user interface, and used by the Automated Music Composition and Generation Engine of the present invention to generate musically-scored media (e.g. video, podcast, image, slideshow etc.) or event marker, that is then supplied back to the system user via the system user interface.

Figure 13B:
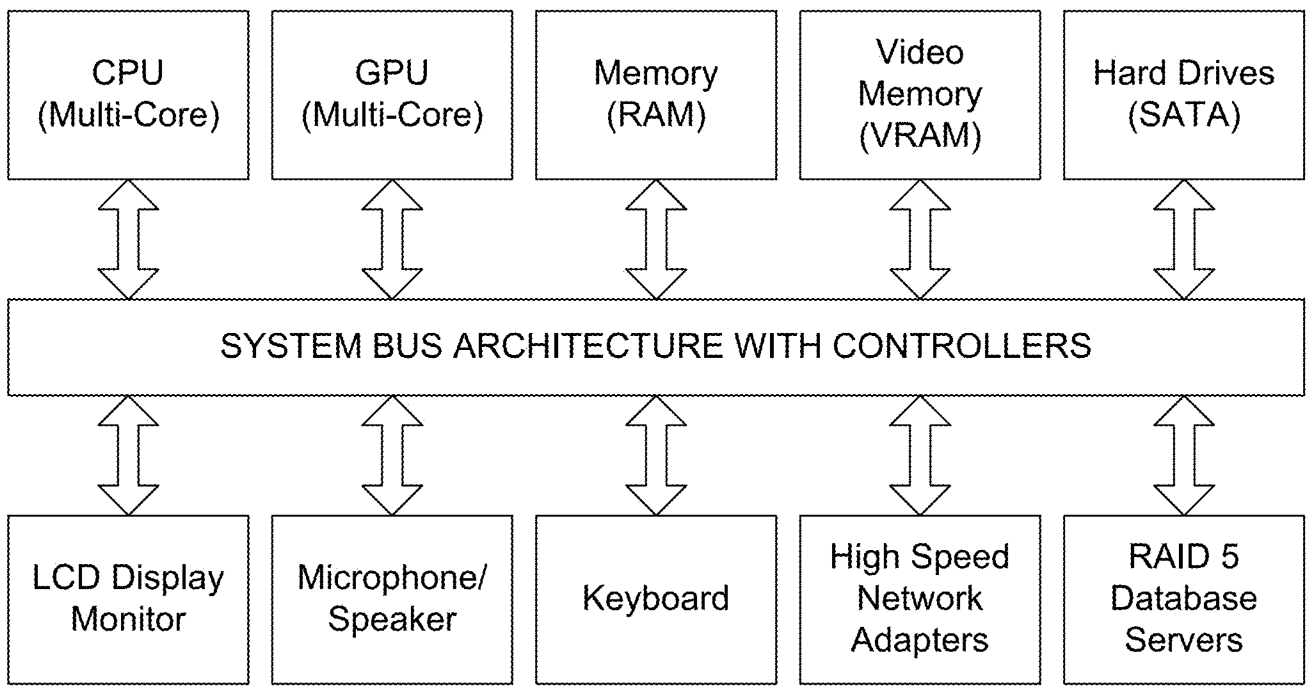
FIG. 13B is a schematic representation of the system architecture of an exemplary computing server machine, one or more of which may be used, to implement the enterprise-level automated music composition and generation system illustrated in FIGS. 13 and 13A.

FIG. 13B shows the system architecture of an exemplary computing server machine, one or more of which may be used, to implement the enterprise-level automated music composition and generation system illustrated in FIGS. 13 and 13A.

FIG. 14 is a flow chart illustrating the primary steps involved in carrying out the automated music composition and generation process supported by the system illustrated in FIGS. 13 and 13A, wherein (i) during the first step of the process, the system user accesses the Automated Music Composition and Generation System of the present invention, and then selects a video, a an audio-recording (i.e. podcast), slideshow, a photograph or image, or an event marker to be scored with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected media or event markers, (iv), the system user accepts composed and generated music produced for the score media or event markers, and provides feedback to the system regarding the system user's rating of the produced music, and/or music preferences in view of the produced musical experience that the system user subjectively experiences, and (v) the system combines the accepted composed music with the selected media or event marker, so as to create a video file for distribution and display.

Specification of Modes of Operation of the Automated Music Composition and Generation System of the Fourth Illustrative Embodiment of the Present Invention The Automated Music Composition and Generation System of the fourth illustrative embodiment shown in FIGS. 13 through 15W, can operate in various modes of operation including: (i) Score Media Mode where a human system user provides musical experience descriptor and timing/spatial parameter input, as well as a piece of media (e.g. video, slideshow, etc.) to the Automated Music Composition and Generation System so it can automatically generate a piece of music scored to the piece of music according to instructions provided by the system user; and (ii) Compose Music-Only Mode where a human system user provides musical experience descriptor and timing/spatial parameter input to the Automated Music Composition and Generation System so it can automatically generate a piece of music scored for use by the system user.

Figure 15A:
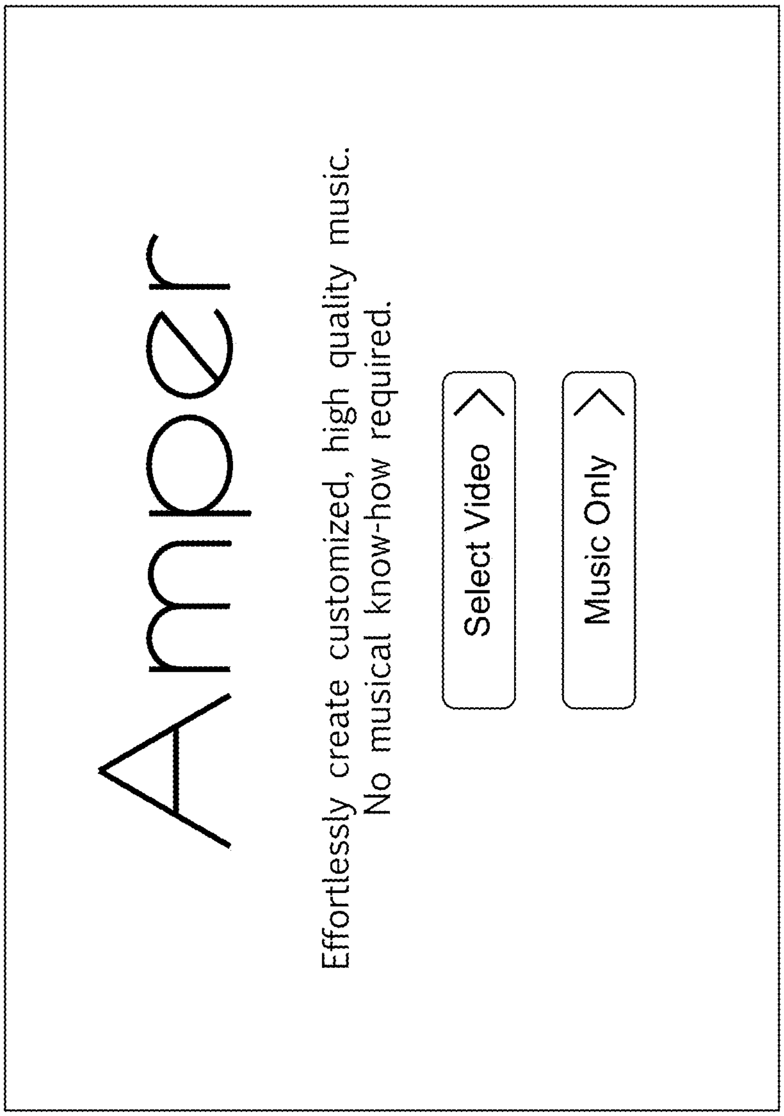
FIG. 15A is an exemplary graphical user interface (GUI) screen that is generated and served by the system illustrated in FIGS. 13 through 14, wherein the interface objects are displayed for (i) Selecting Video to upload into the system as the first step in the automated music composition and generation process of the present invention, and (ii) Composing Music Only option allowing the system user to initiative the Automated Music Composition and Generation System of the present invention.

Specification of Graphical User Interfaces (GUIs) for the Various Modes of Operation Supported by the Automated Music Composition and Generation System of the Fourth Illustrative Embodiment of the Present Invention FIG. 15A is an exemplary graphical user interface (GUI) screen that is generated and served by the system illustrated in FIGS. 13 and 14, wherein the interface objects are displayed for engaging the system into its Score Media Mode of operation or its Compose Music-Only Mode of operation as described above, by selecting one of the following graphical icons, respectively: (i) "Select Video" to upload a video into the system as the first step in the automated composition and generation process of the present invention, and then automatically compose and generate music as scored to the uploaded video; or (ii) "Music Only" to compose music only using the Automated Music Composition and Generation System of the present invention.

Specification of the Score Media Mode

The user decides if the user would like to create music in conjunction with a video or other media, then the user will have the option to engage in the workflow described below and represented in FIGS. 15A through 15W. The details of this work flow will be described below.

Figure 15B:
FIG. 15B is an exemplary graphical user interface (GUI) screen that is generated and served by the system illustrated in FIGS. 13 and 14, when the system user selects the "Select Video" object in the GUI of FIG. 15A, wherein the system allows the user to select a video file from several different local and remote file storage locations (e.g. local photo album, shared hosted folder on the cloud, and local photo albums from ones smartphone camera roll)
Figure 15C:
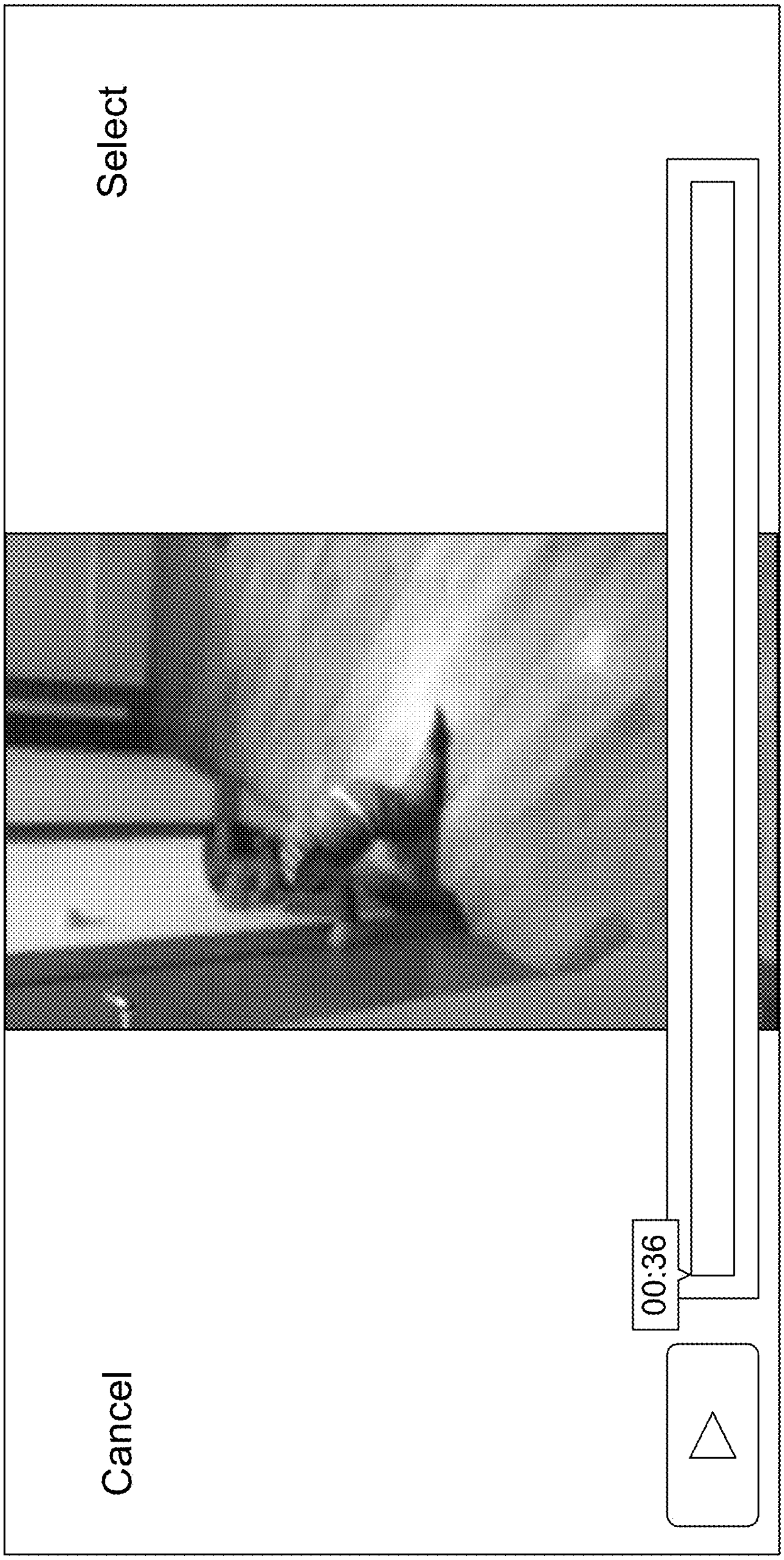
FIG. 15C is an exemplary graphical user interface (GUI) screen that is generated and served by the system illustrated in FIGS. 13 and 14, wherein the selected video is displayed for scoring according to the principles of the present invention.

When the system user selects "Select Video" object in the GUI of FIG. 15A, the exemplary graphical user interface (GUI) screen shown in FIG. 15B is generated and served by the system illustrated in FIGS. 13 and 14. In this mode of operation, the system allows the user to select a video file, or other media object (e.g. slide show, photos, audio file or podcast, etc.), from several different local and remote file storage locations (e.g. photo album, shared folder hosted on the cloud, and photo albums from ones smartphone camera roll), as shown in FIGS. 15B and 15C. If a user decides to create music in conjunction with a video or other media using this mode, then the system user will have the option to engage in a workflow that supports such selected options.

Figure 15D:
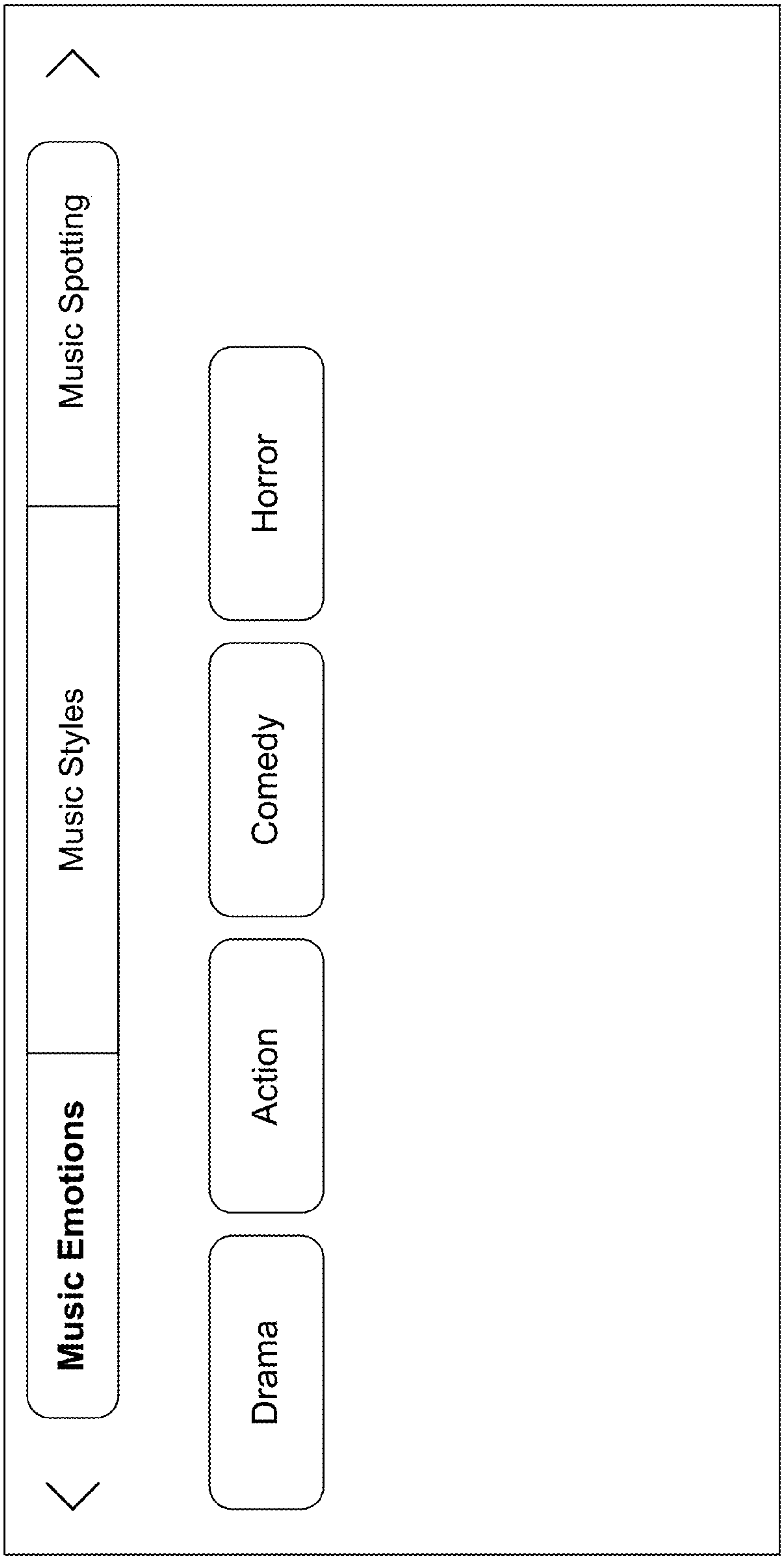
FIG. 15D is an exemplary graphical user interface (GUI) screen that is generated and served by the system illustrated in FIGS. 13 and 14, wherein the system user selects the category "music emotions" from the Music Emotions/Music Style/Music Spotting Menu, to display four exemplary classes of emotions (i.e. Drama, Action, Comedy, and Horror) from which to choose and characterize the musical experience the system user seeks.

Using the GUI screen shown in FIG. 15D, the system user selects the category "music emotions" from the music emotions/music style/music spotting menu, to display four exemplary classes of emotions (i.e. Drama, Action, Comedy, and Horror) from which to choose and characterize the musical experience they system user seeks.

Figure 15E:
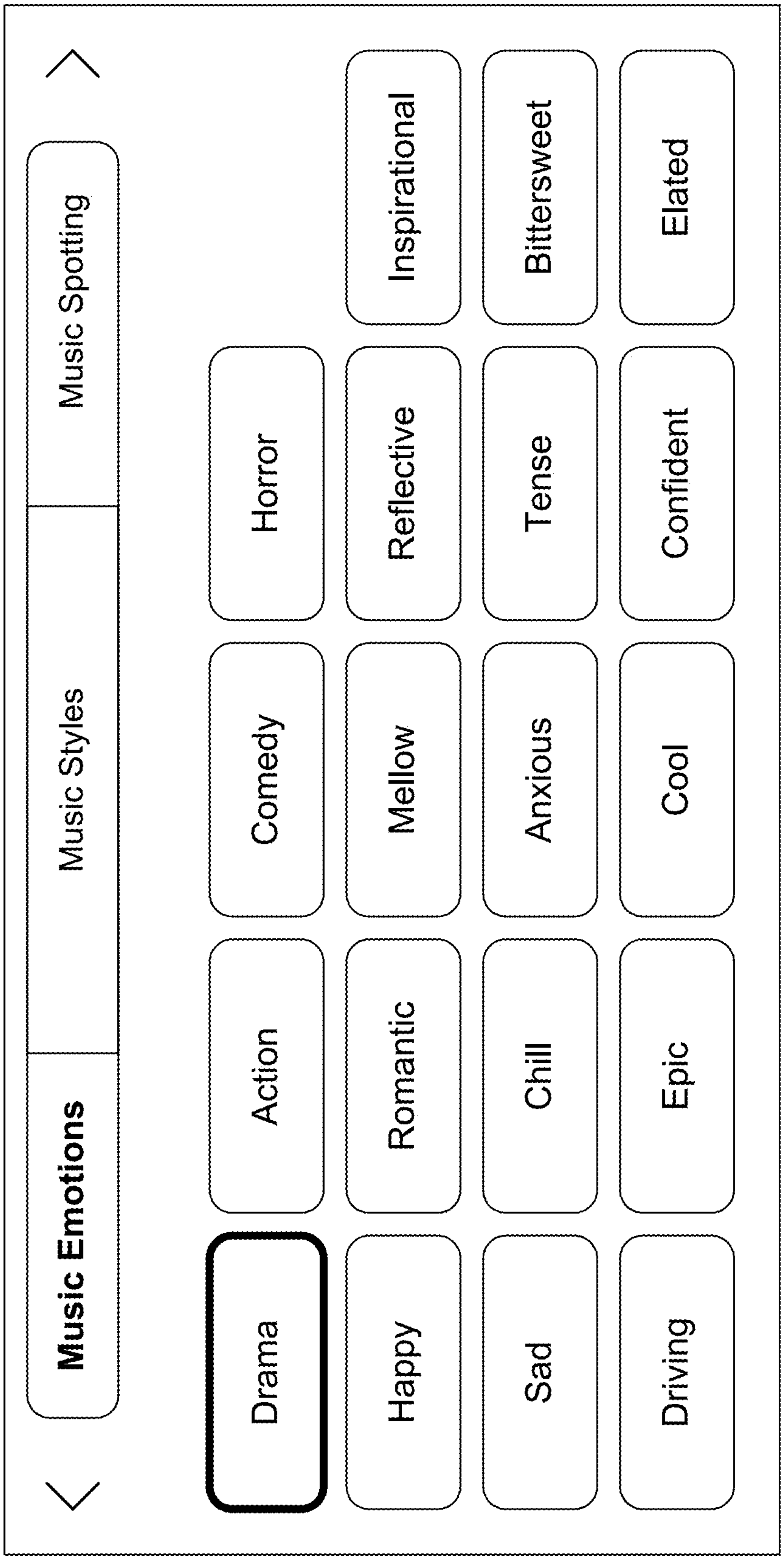
FIG. 15E is an exemplary graphical user interface (GUI) screen that is generated and served by the system illustrated in FIGS. 13 and 14, in response to the system user selecting the music emotion category—Drama.
Figure 15F:
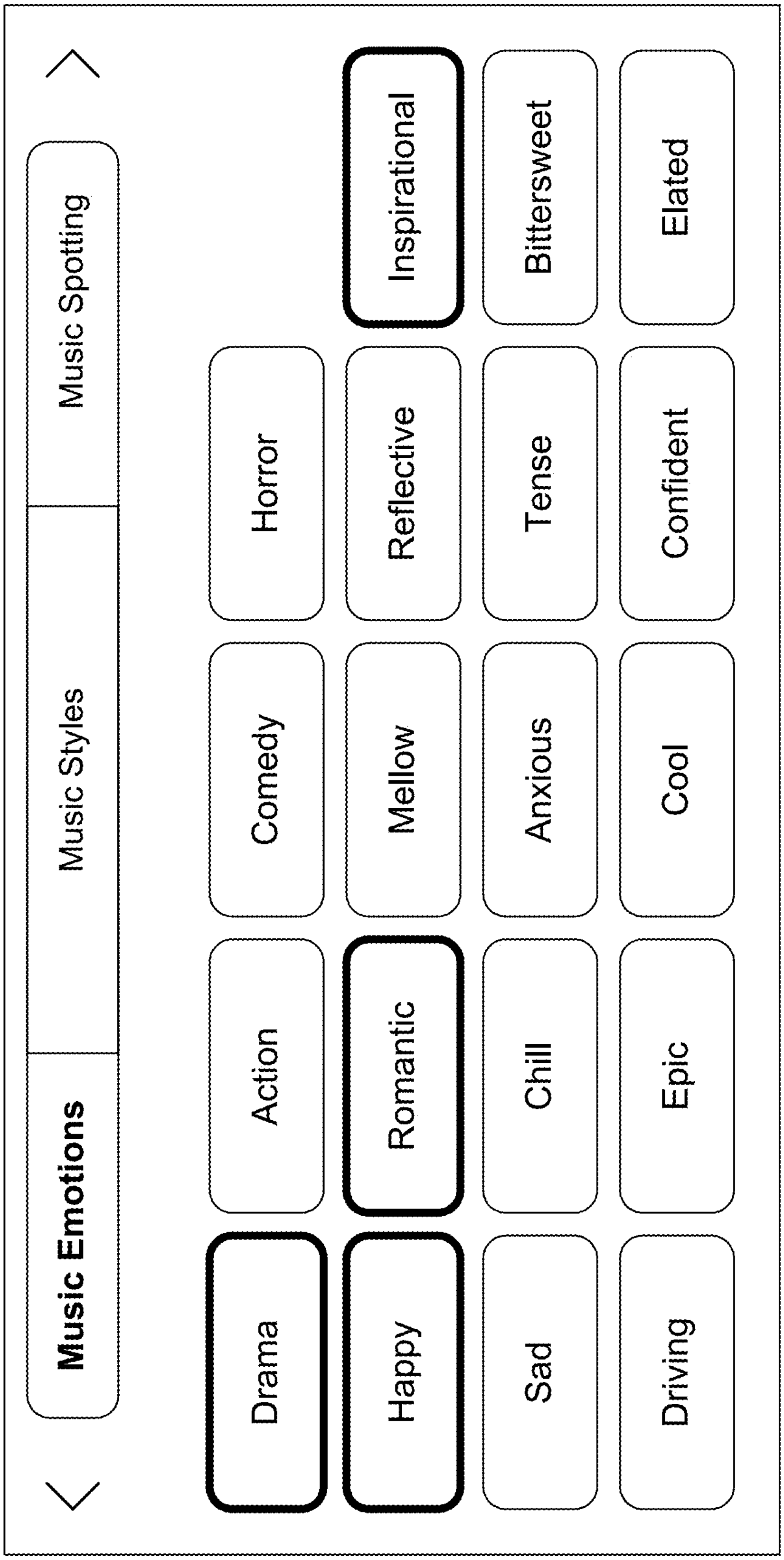
FIG. 15F is an exemplary graphical user interface (GUI) screen that is generated and served by the system illustrated in FIGS. 13 and 14, in response to the system user selecting the music emotion category—Drama, and wherein the system user has subsequently selected the Drama-classified emotions—Happy, Romantic, and Inspirational for scoring the selected video.

FIG. 15E shows an exemplary GUI screen that is generated and served by the system illustrated in FIGS. 13 and 14, in response to the system user selecting the music emotion category—Drama. FIG. 15F shows an exemplary GUI screen that is generated and served by the system illustrated in FIGS. 13 and 14, in response to the system user selecting the music emotion category—Drama, and wherein the system user has selected the Drama-classified emotions—Happy, Romantic, and Inspirational for scoring the selected video.

Figure 15G:
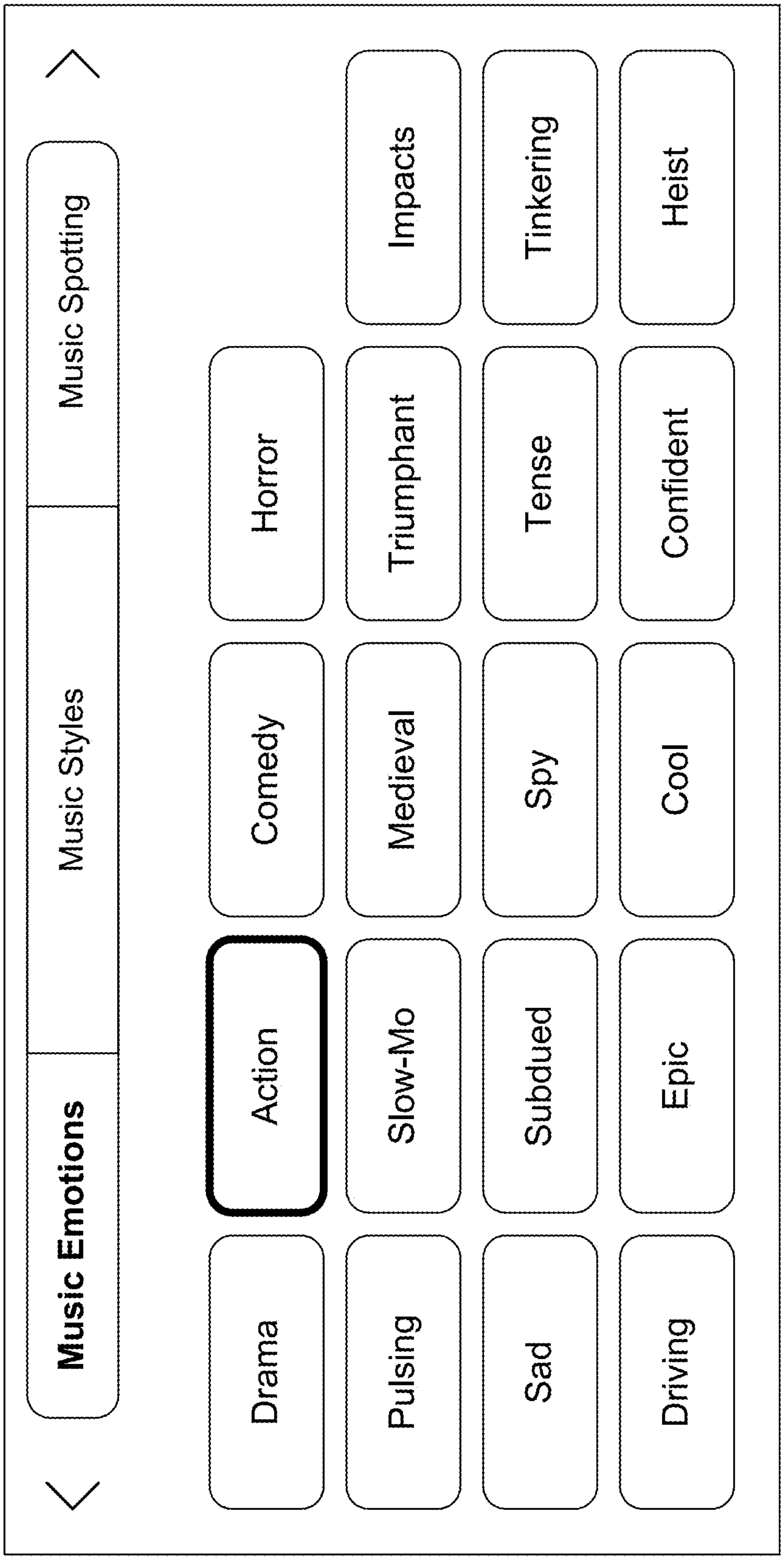
FIG. 15G is an exemplary graphical user interface (GUI) screen that is generated and served by the system illustrated in FIGS. 13 and 14, in response to the system user selecting the music emotion category—Action.
Figure 15H:
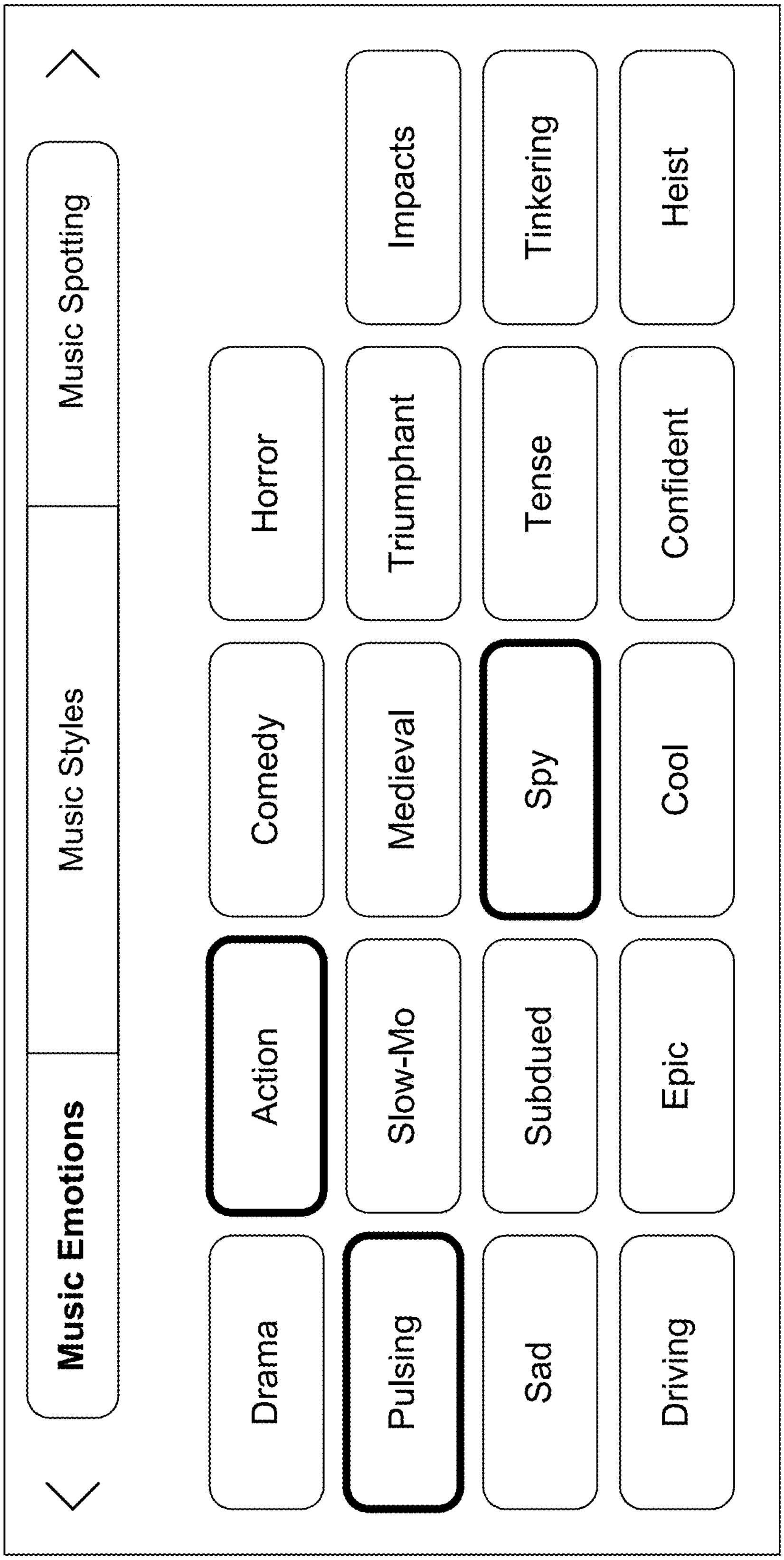
FIG. 15H is an exemplary graphical user interface (GUI) screen that is generated and served by the system illustrated in FIGS. 13 and 14, in response to the system user selecting the music emotion category—Action, and wherein the system user has subsequently selected the Action-classified emotions—Pulsating, and Spy for scoring the selected video.

FIG. 15G shows an exemplary GUI screen that is generated and served by the system illustrated in FIGS. 13 and 14, in response to the system user selecting the music emotion category—Action. FIG. 15H shows an exemplary GUI screen that is generated and served by the system illustrated in FIGS. 13 and 14, in response to the system user selecting the music emotion category—Action, and wherein the system user has selected two Action-classified emotions—Pulsating, and Spy—for scoring the selected video.

Figure 15I:
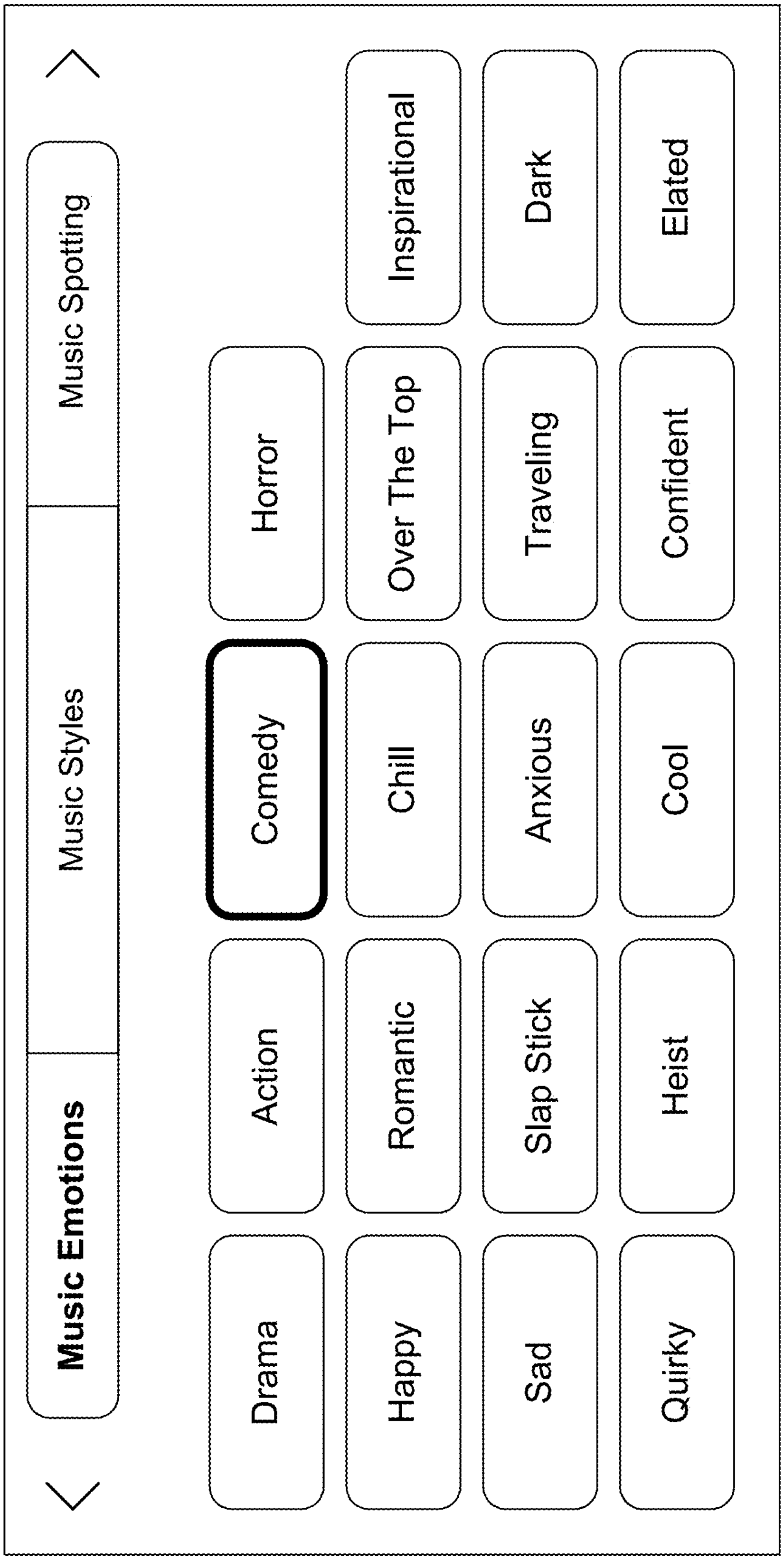
FIG. 15I is an exemplary graphical user interface (GUI) screen that is generated and served by the system illustrated in FIGS. 13 and 14, in response to the system user selecting the music emotion category—Comedy.
Figure 15J:
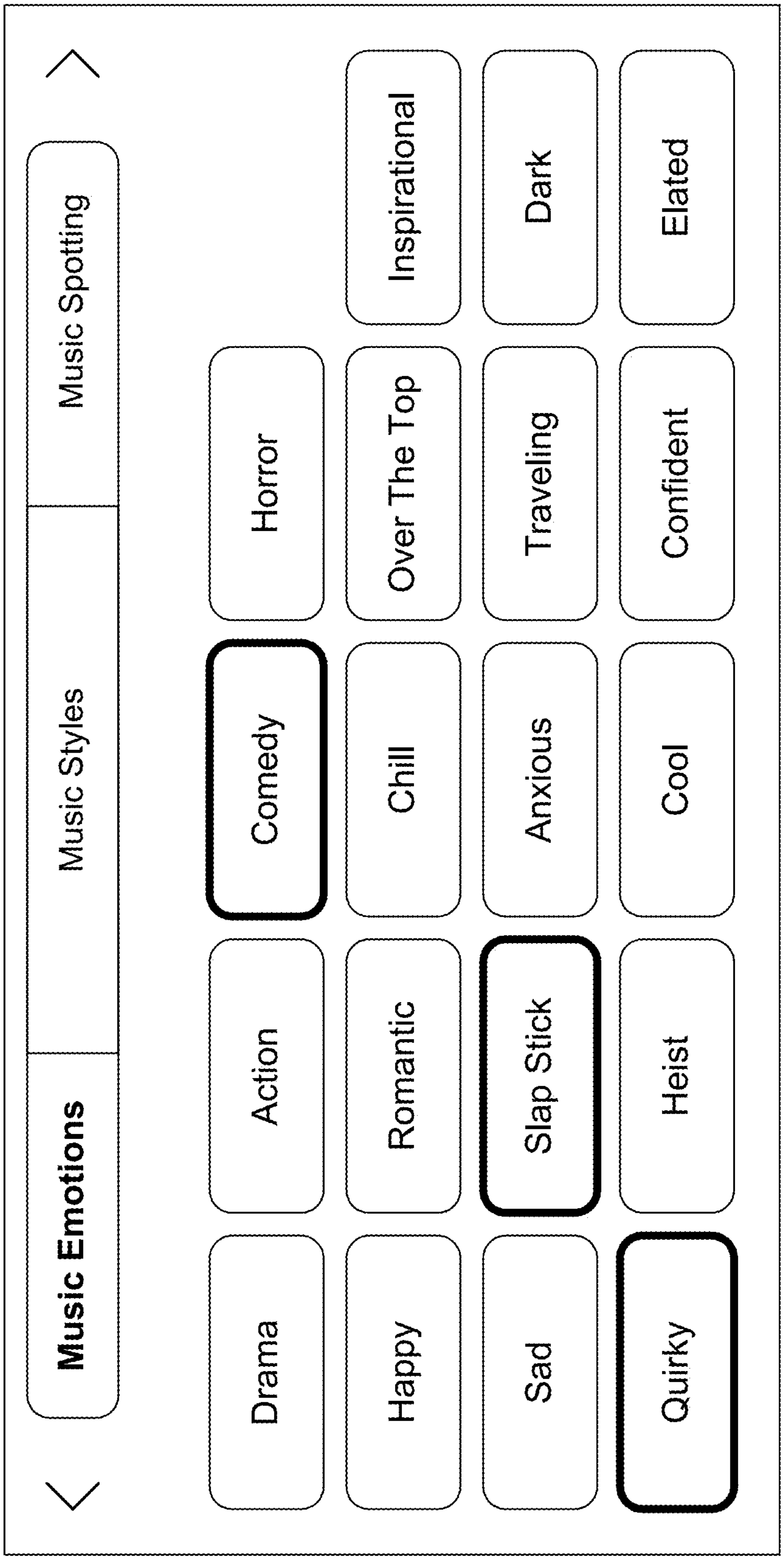
FIG. 15J is an exemplary graphical user interface (GUI) screen that is generated and served by the system illustrated in FIGS. 13 and 14, in response to the system user selecting the music emotion category—Drama, and wherein the system user has subsequently selected the Comedy-classified emotions—Quirky and Slap Stick for scoring the selected video.

FIG. 15I shows an exemplary GUI screen that is generated and served by the system illustrated in FIGS. 13 and 14, in response to the system user selecting the music emotion category—Comedy. FIG. 15J is an exemplary graphical user interface (GUI) screen that is generated and served by the system illustrated in FIGS. 13 and 14, in response to the system user selecting the music emotion category—Drama, and wherein the system user has selected the Comedy-classified emotions—Quirky and Slap Stick for scoring the selected video.

Figure 15K:
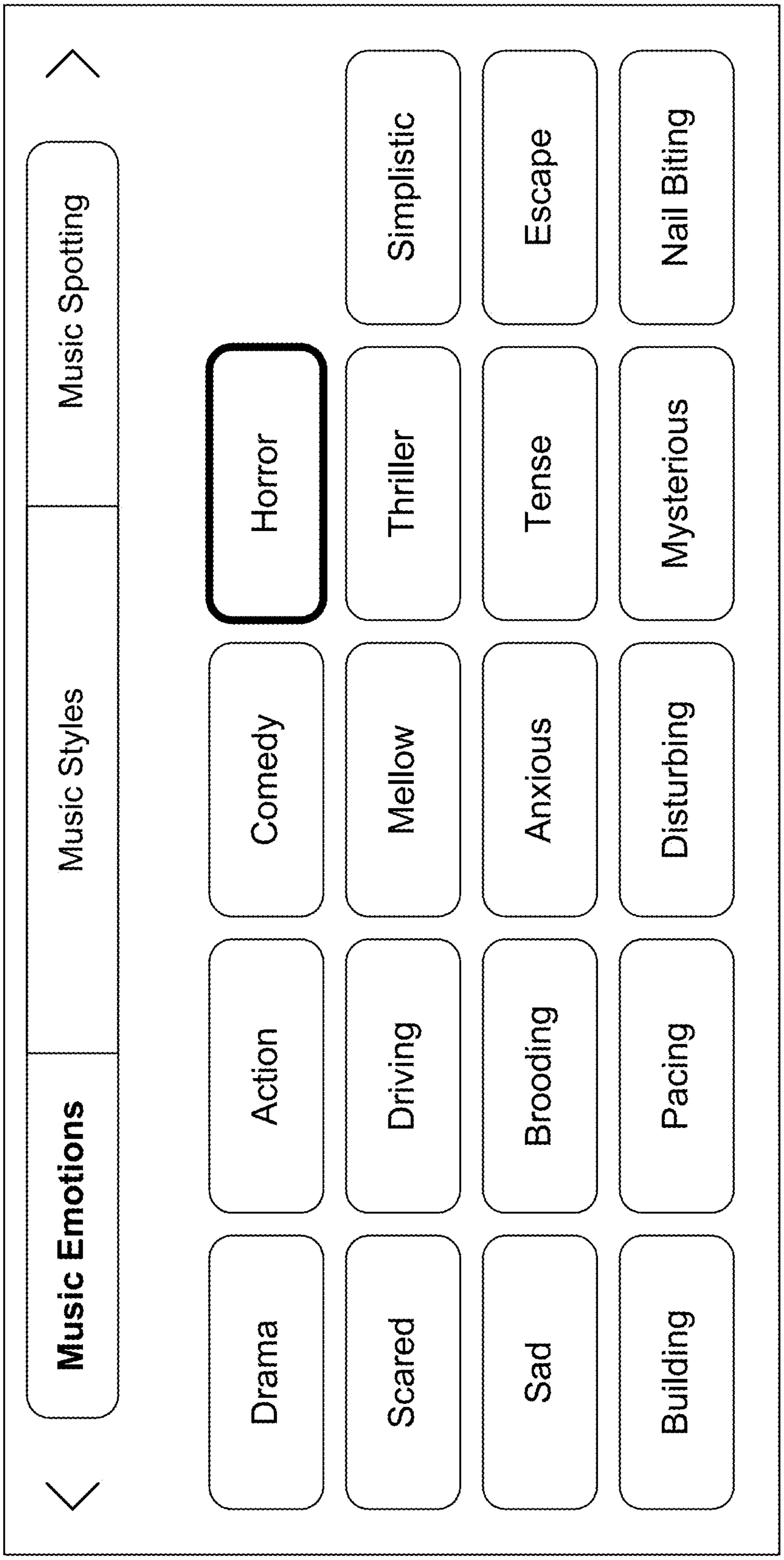
FIG. 15K is an exemplary graphical user interface (GUI) screen that is generated and served by the system illustrated in FIGS. 13 and 14, in response to the system user selecting the music emotion category—Horror.
Figure 15L:
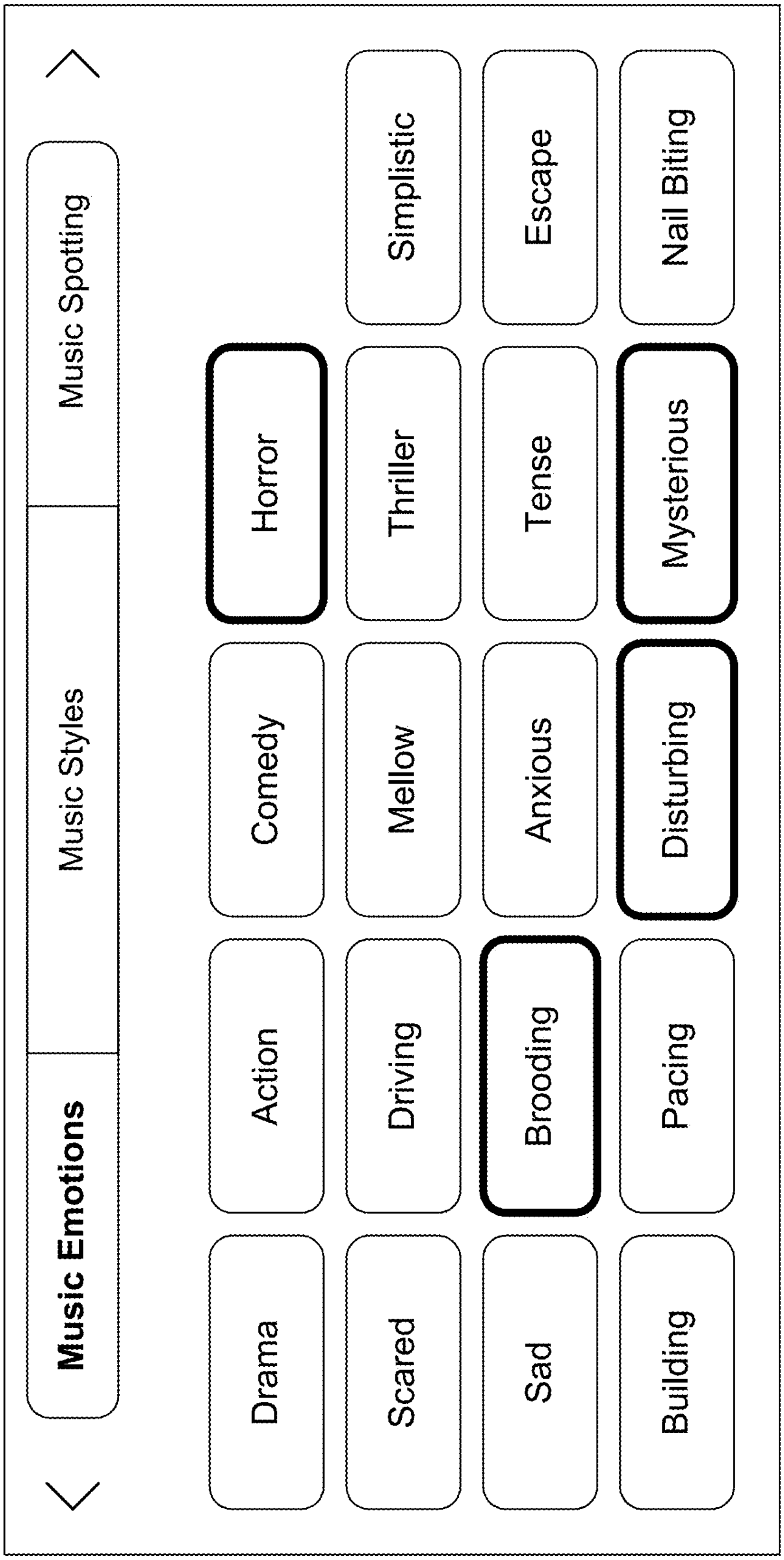
FIG. 15L is an exemplary graphical user interface (GUI) screen that is generated and served by the system illustrated in FIGS. 13 and 14, in response to the system user selecting the music emotion category—Horror, and wherein the system user has subsequently selected the Horror-classified emotions—Brooding, Disturbing and Mysterious for scoring the selected video.

FIG. 15K shows an exemplary GUI screen that is generated and served by the system illustrated in FIGS. 13 and 14, in response to the system user selecting the music emotion category—Horror. FIG. 15L shows an exemplary graphical user interface (GUI) screen that is generated and served by the system illustrated in FIGS. 13 and 14, in response to the system user selecting the music emotion category—Horror, and wherein the system user has selected the Horror-classified emotions—Brooding, Disturbing and Mysterious for scoring the selected video.

It should be noted at this juncture that while the fourth illustrative embodiment shows a fixed set of emotion-type musical experience descriptors, for characterizing the emotional quality of music to be composed and generated by the system of the present invention, it is understood that in general, the music composition system of the present invention can be readily adapted to support the selection and input of a wide variety of emotion-type descriptors such as, for example, linguistic descriptors (e.g. words), images, and/or like representations of emotions, adjectives, or other descriptors that the user would like to music to convey the quality of emotions to be expressed in the music to be composed and generated by the system of the present invention.

Figure 15M:
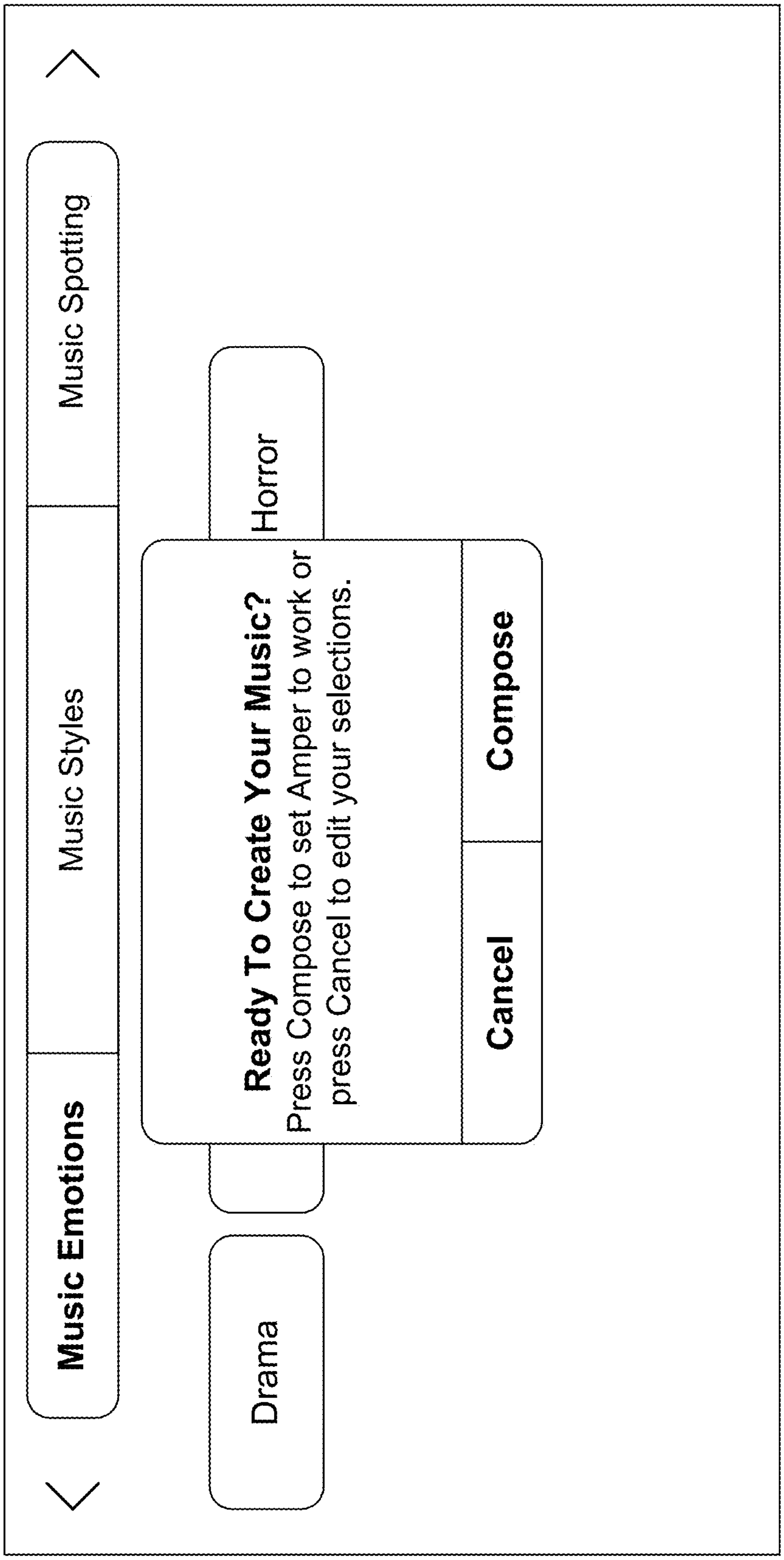
FIG. 15M is an exemplary graphical user interface (GUI) screen that is generated and served by the system illustrated in FIGS. 13 and 14, in response to the system user completing the selection of the music emotion category, displaying the message to the system user—"Ready to Create Your Music" Press Compose to Set Amper To Work Or Press Cancel To Edit Your Selections"

FIG. 15M shows an exemplary GUI screen that is generated and served by the system illustrated in FIGS. 13 and 14, in response to the system user completing the selection of the music emotion category, displaying the message to the system user—"Ready to Create Your Music" Press Compose to Set Amper To Work Or Press Cancel To Edit Your Selections".

At this stage of the workflow, the system user can select COMPOSE and the system will automatically compose and generate music based only on the emotion-type musical experience parameters provided by the system user to the system interface. In such a case, the system will choose the style-type parameters for use during the automated music composition and generation system. Alternatively, the system user has the option to select CANCEL, to allow the user to edit their selections and add music style parameters to the music composition specification.

Figure 15N:
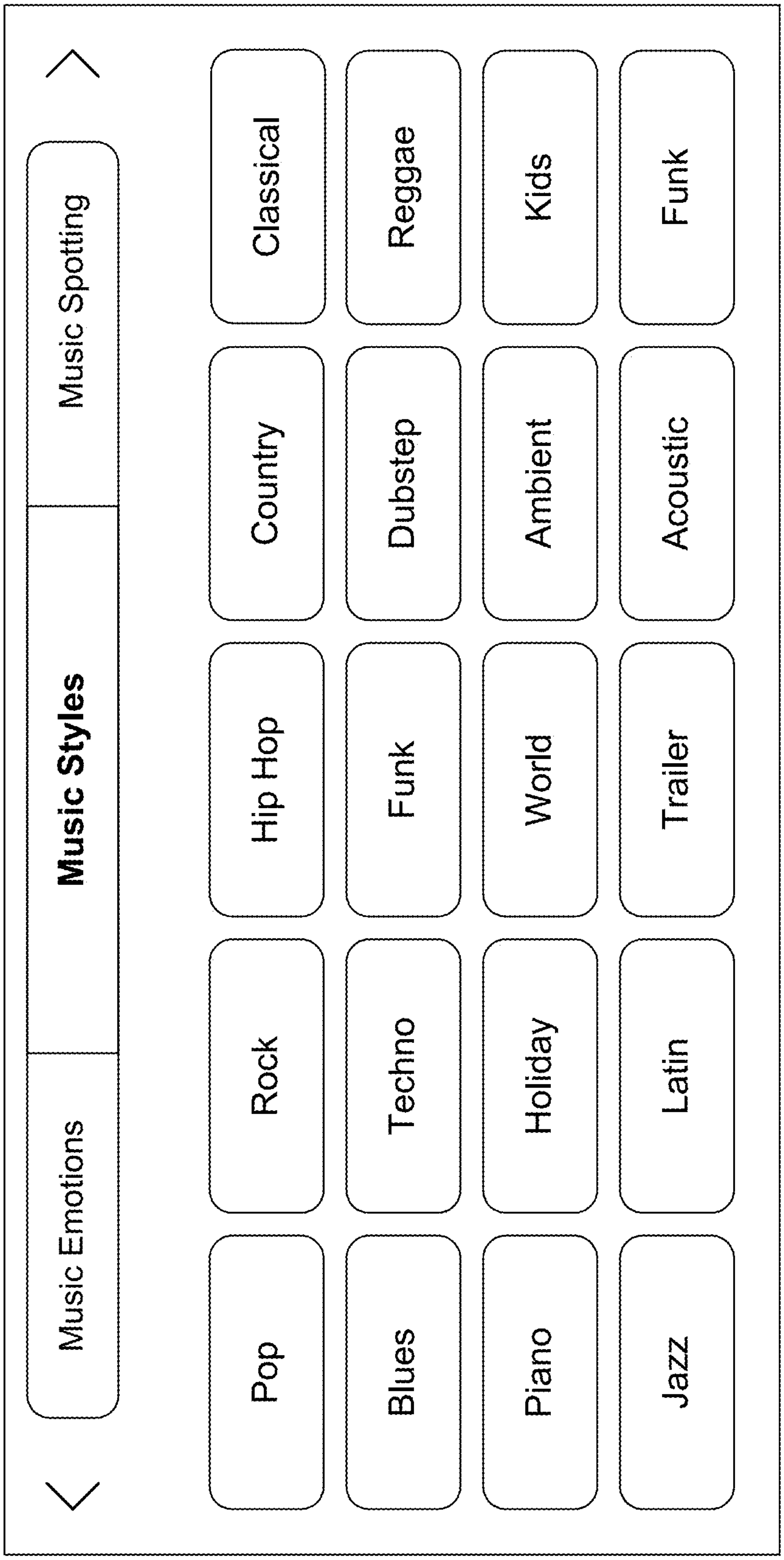
FIG. 15N is an exemplary graphical user interface (GUI) screen that is generated and served by the system illustrated in FIGS. 13 and 14, wherein the system user selects the category "music style" from the music emotions/music style/music spotting menu, to display twenty (20) styles (i.e. Pop, Rock, Hip Hop, etc.) from which to choose and characterize the musical experience they system user seeks.

FIG. 15N shows an exemplary GUI screen that is generated and served by the system illustrated in FIGS. 13 and 14 when the user selects CANCEL followed by selection of the MUSIC STYLE button from the music emotions/music style/music spotting menu, thereby displaying twenty (20) styles (i.e. Pop, Rock, Hip Hop, etc.) from which to choose and characterize the musical experience they system user seeks.

Figure 15O:
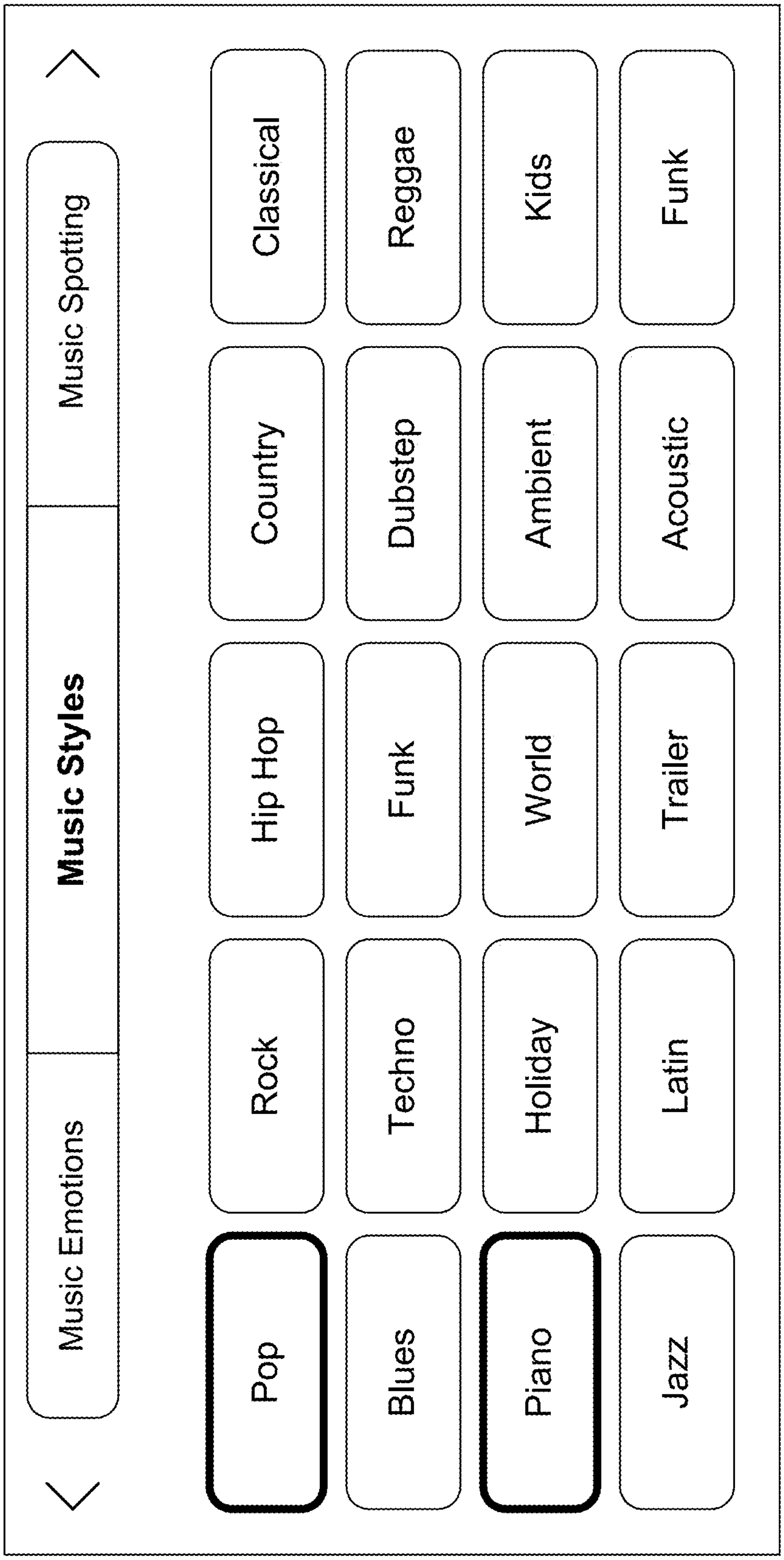
FIG. 15O is an exemplary graphical user interface (GUI) screen that is generated and served by the system illustrated in FIGS. 13 and 14, in response to the system user selecting the music style categories—Pop and Piano.

FIG. 15O is an exemplary GUI screen that is generated and served by the system illustrated in FIGS. 13 and 14, wherein the system user has selected the music style categories—Pop and Piano.

It should be noted at this juncture that while the fourth illustrative embodiment shows a fixed set of style-type musical experience descriptors, for characterizing the style quality of music to be composed and generated by the system of the present invention, it is understood that in general, the music composition system of the present invention can be readily adapted to support the selection and input of a wide variety of style-type descriptors such as, for example, linguistic descriptors (e.g. words), images, and/or like representations of emotions, adjectives, or other descriptors that the user would like to music to convey the quality of styles to be expressed in the music to be composed and generated by the system of the present invention.

Figure 15P:
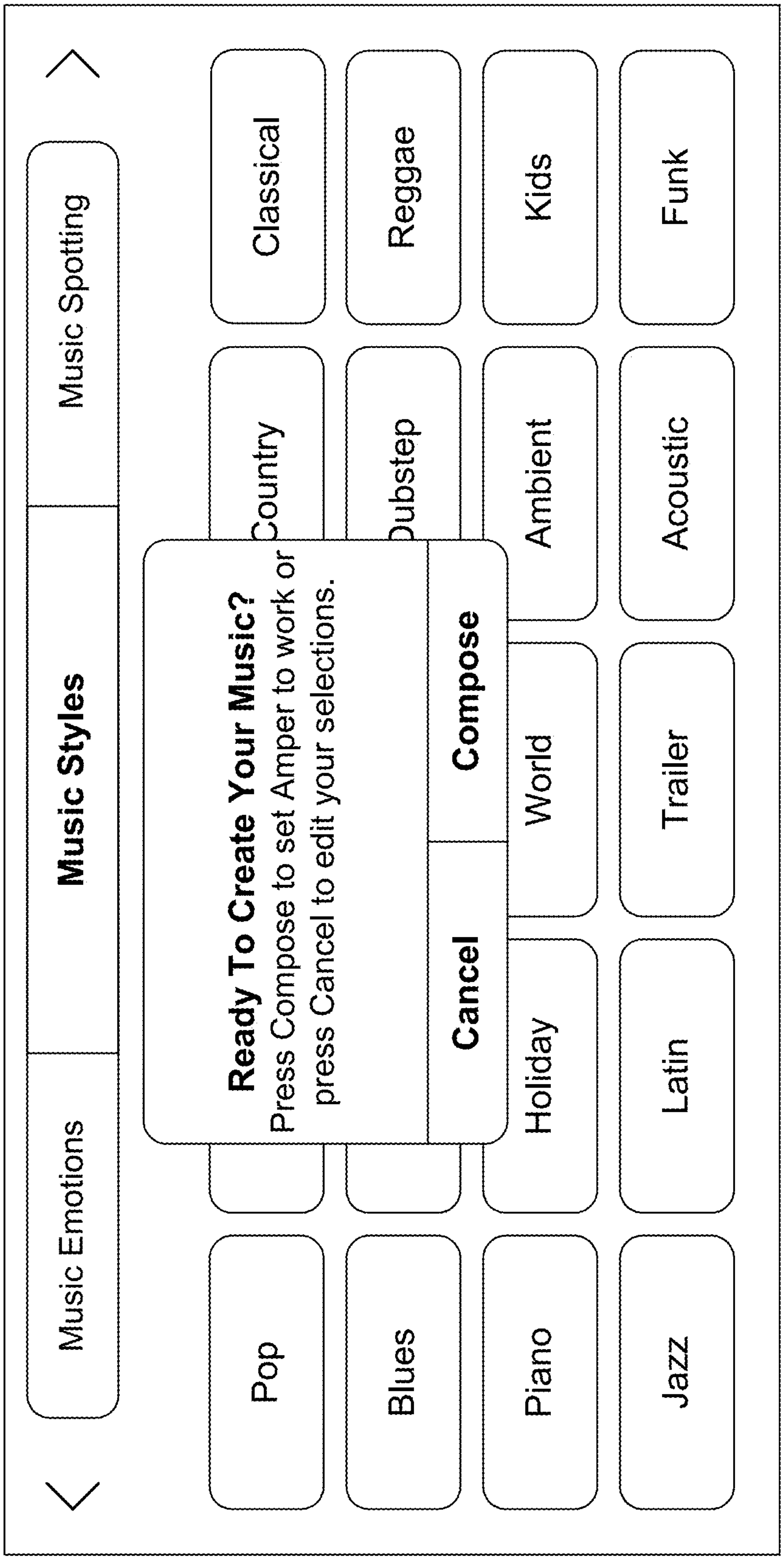
FIG. 15P is an exemplary graphical user interface (GUI) screen that is generated and served by the system illustrated in FIGS. 13 and 14, in response to the system user completing the selection of the music style category, displaying the message to the system user—"Ready to Create Your Music" Press Compose to Set Amper To Work Or Press Cancel To Edit Your Selections"

FIG. 15P is an exemplary GUI screen that is generated and served by the system illustrated in FIGS. 13 and 14, in response to the system user has selected the music style categories—POP and PIANO. At this stage of the workflow, the system user can select COMPOSE and the system will automatically compose and generate music based only on the emotion-type musical experience parameters provided by the system user to the system interface. In such a case, the system will use both the emotion-type and style-type musical experience parameters selected by the system user for use during the automated music composition and generation system. Alternatively, the system user has the option to select CANCEL, to allow the user to edit their selections and add music spotting parameters to the music composition specification.

Figure 15Q:
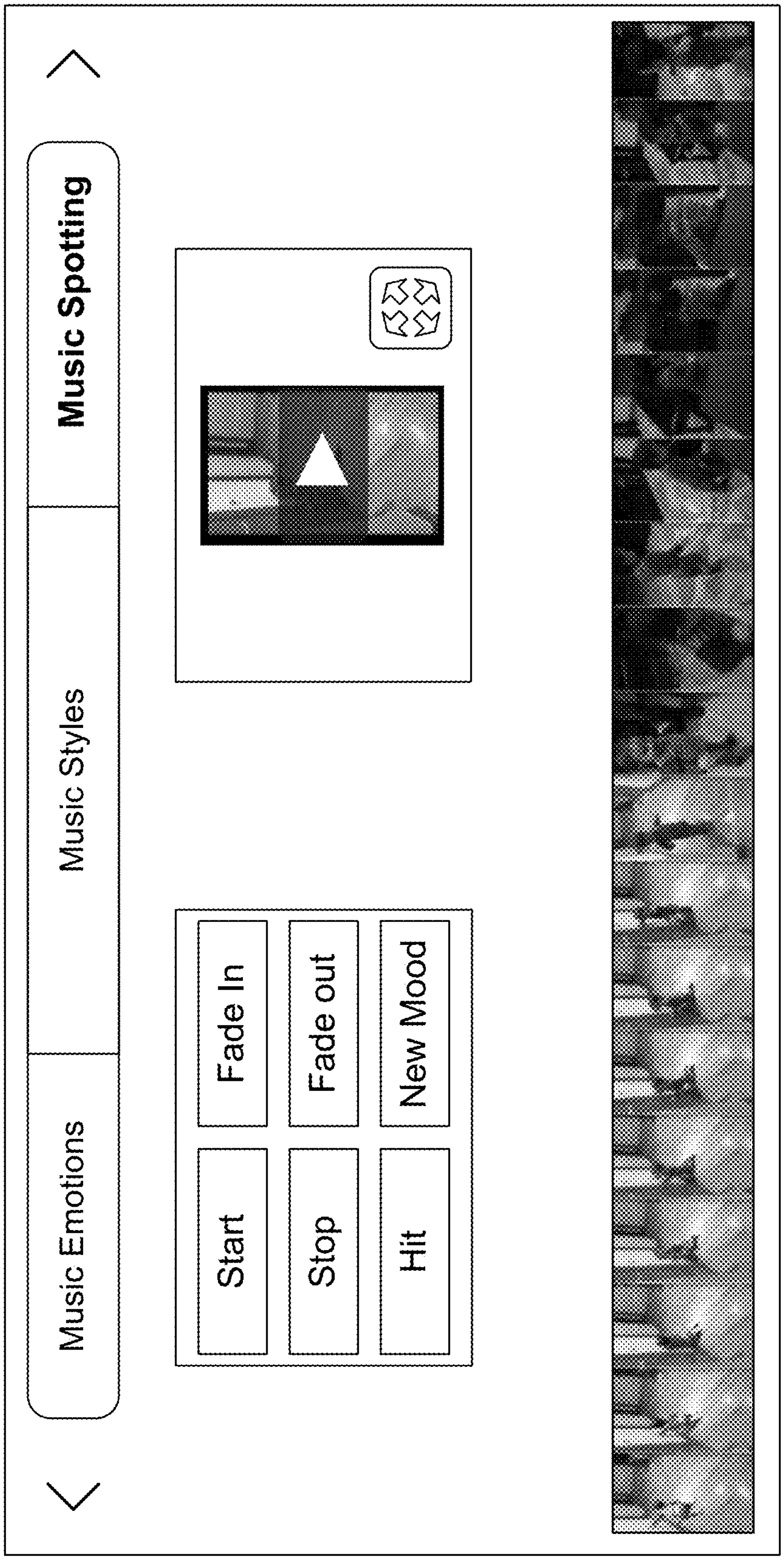
FIG. 15Q is an exemplary graphical user interface (GUI) screen that is generated and served by the system illustrated in FIGS. 13 and 14, wherein the system user selects the category "music spotting" from the music emotions/music style/music spotting menu, to display six commands from which the system user can choose during music spotting functions—"Start," "Stop," "Hit," "Fade In", "Fade Out," and "New Mood" commands.

FIG. 15Q is an exemplary GUI screen that is generated and served by the system illustrated in FIGS. 13 and 14, allowing the system user to select the category "music spotting" from the music emotions/music style/music spotting menu, to display six commands from which the system user can choose during music spotting functions.

Figure 15R:
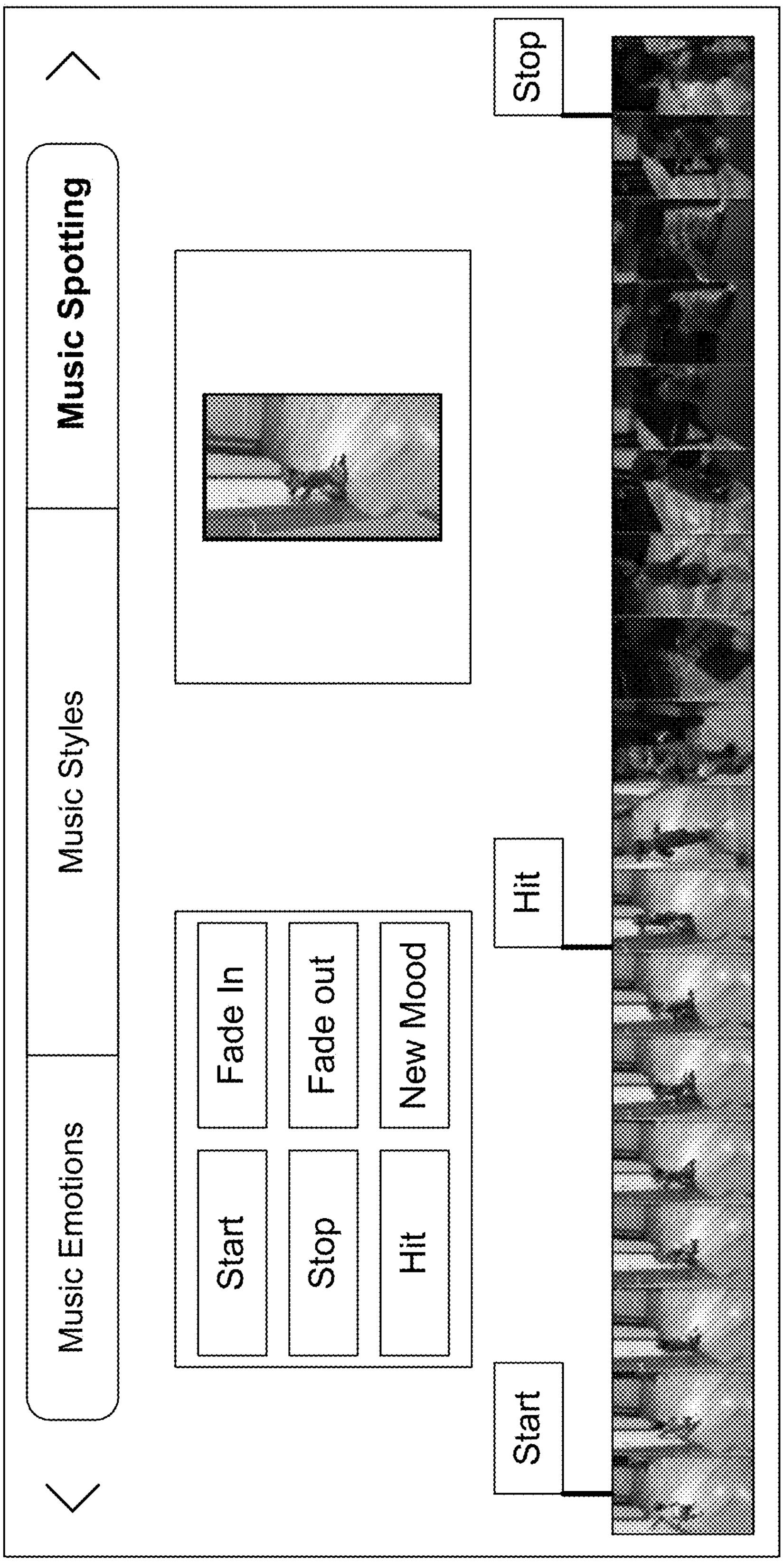
FIG. 15R is an exemplary graphical user interface (GUI) screen that is generated and served by the system illustrated in FIGS. 13 and 14, in response to the system user selecting "music spotting" from the function menu, showing the "Start," "Stop," and commands being scored on the selected video, as shown.

FIG. 15R is an exemplary GUI screen that is generated and served by the system illustrated in FIGS. 13 and 14, in response to the system user selecting "music spotting" from the function menu, showing the "Start," "Stop," "Hit," "Fade In", "Fade Out," and "New Mood" markers being scored on the selected video, as shown.

In this illustrative embodiment, the "music spotting" function or mode allows a system user to convey the timing parameters of musical events that the user would like to music to convey, including, but not limited to, music start, stop, descriptor change, style change, volume change, structural change, instrumentation change, split, combination, copy, and paste. This process is represented in subsystem blocks 40 and 41 in FIGS. 26A through 26D. As will be described in greater detail hereinafter, the transformation engine B51 within the automatic music composition and generation system of the present invention receives the timing parameter information, as well as emotion-type and style-type descriptor parameters, and generates appropriate sets of probabilistic-based system operating parameter tables, reflected in FIGS. 28A through 28S, which are distributed to their respective subsystems, using subsystem indicated by Blocks 1 and 37.

Figure 15S:
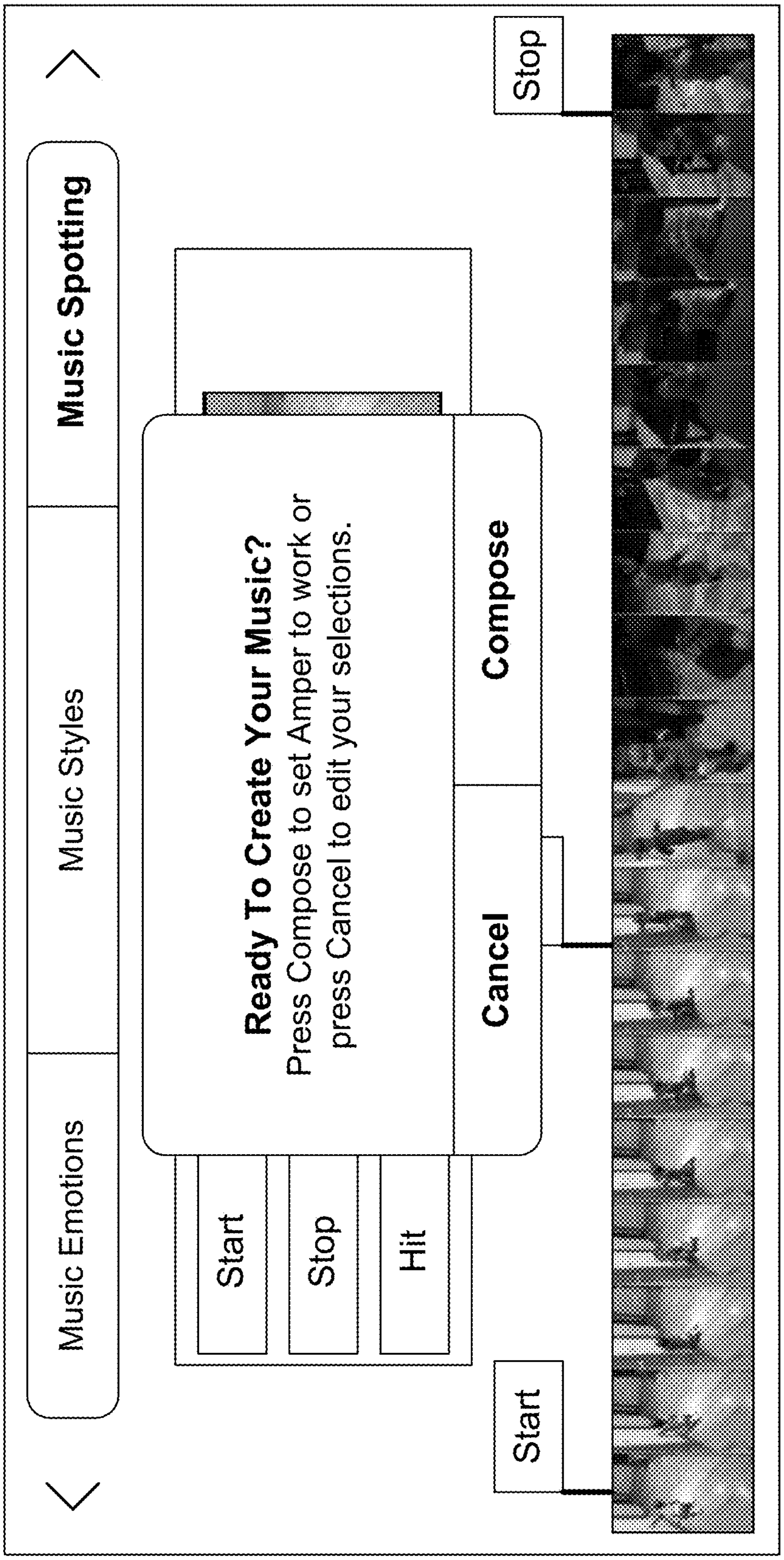
FIG. 15S is an exemplary graphical user interface (GUI) screen that is generated and served by the system illustrated in FIGS. 13 and 14, in response to completing the music spotting function, displaying a message to the system user—"Ready to Create Music" Press Compose to Set Amper To work or "Press Cancel to Edit Your Selection"

FIG. 15S is an exemplary GUI screen that is generated and served by the system illustrated in FIGS. 13 and 14, in response to completing the music spotting function, displaying a message to the system user—"Ready to Create Music" Press Compose to Set Amper To work or "Press Cancel to Edit Your Selection". At this juncture, the system user has the option of selecting COMPOSE which will initiate the automatic music composition and generation system using the musical experience descriptors and timing parameters supplied to the system by the system user. Alternatively, the system user can select CANCEL, whereupon the system will revert to displaying a GUI screen such as shown in FIG. 15D, or like form, where all three main function menus are displayed for MUSIC EMOTIONS, MUSIC STYLE, and MUSIC SPOTTING.

Figure 15T:
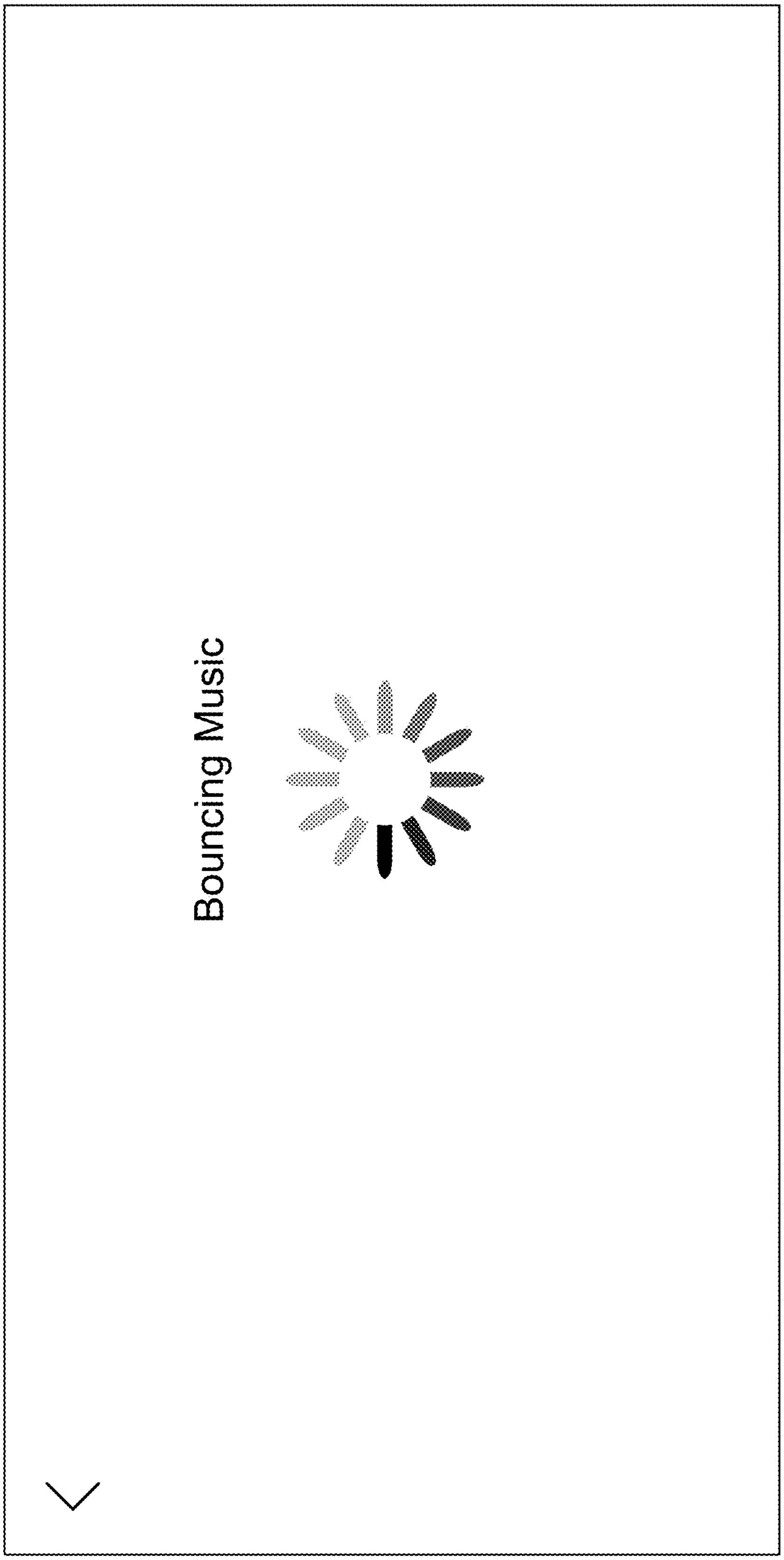
FIG. 15T is an exemplary graphical user interface (GUI) screen that is generated and served by the system illustrated in FIGS. 13 and 14, in response to the system user pressing the "Compose" button.

FIG. 15T shows an exemplary GUI screen that is generated and served by the system illustrated in FIGS. 13 and 14, in response to the system user pressing the "Compose" button, indicating the music is being composed and generated by the phrase "Bouncing Music." After the confirming the user's request for the system to generate a piece of music, the user's client system transmits, either locally or externally, the request to the music composition and generation system, whereupon the request is satisfied. The system generates a piece of music and transmits the music, either locally or externally, to the user.

Figure 15U:
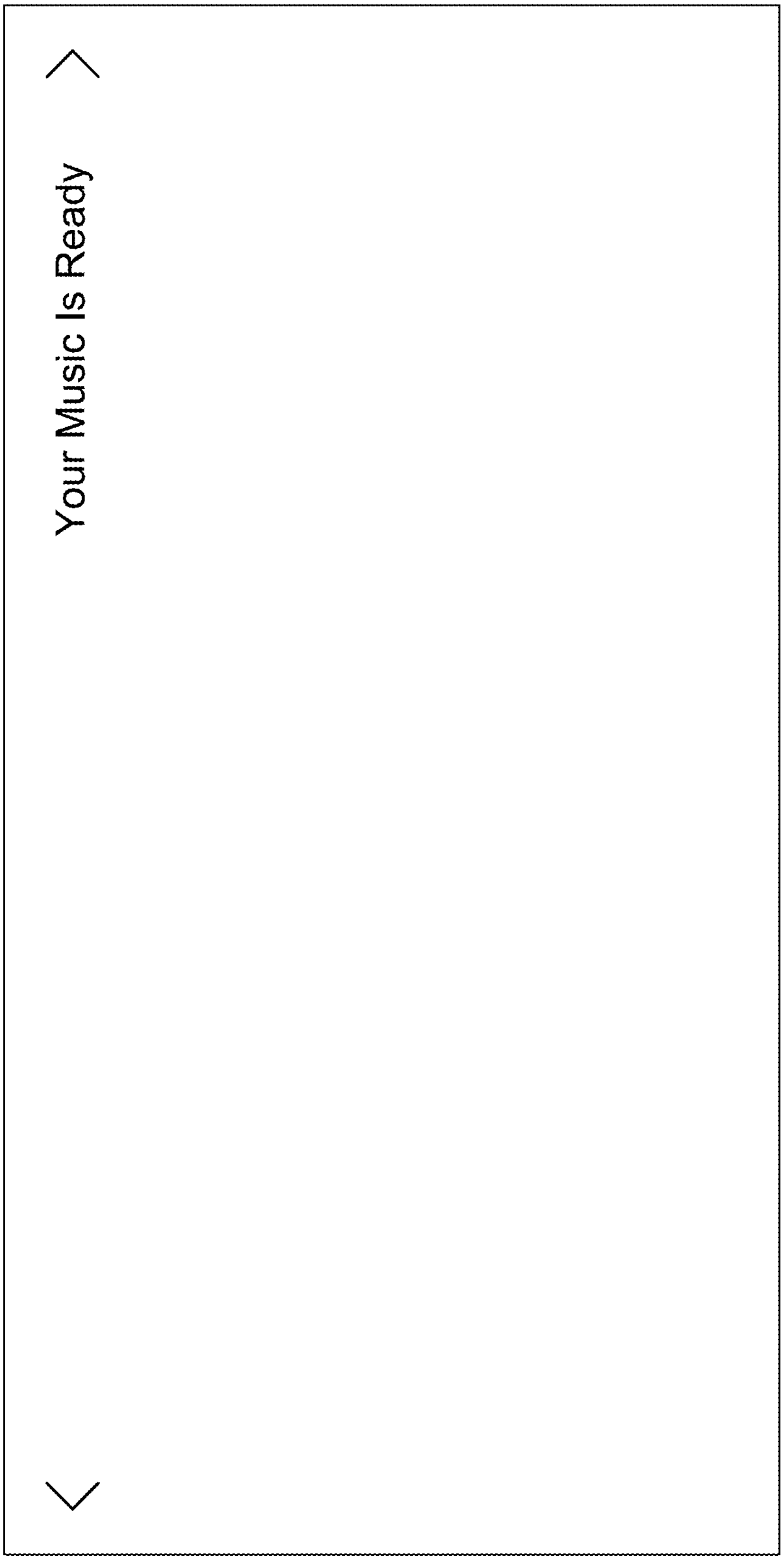
FIG. 15U is an exemplary graphical user interface (GUI) screen that is generated and served by the system illustrated in FIGS. 13 and 14, when the system user's composed music is ready for review.
Figure 15V:
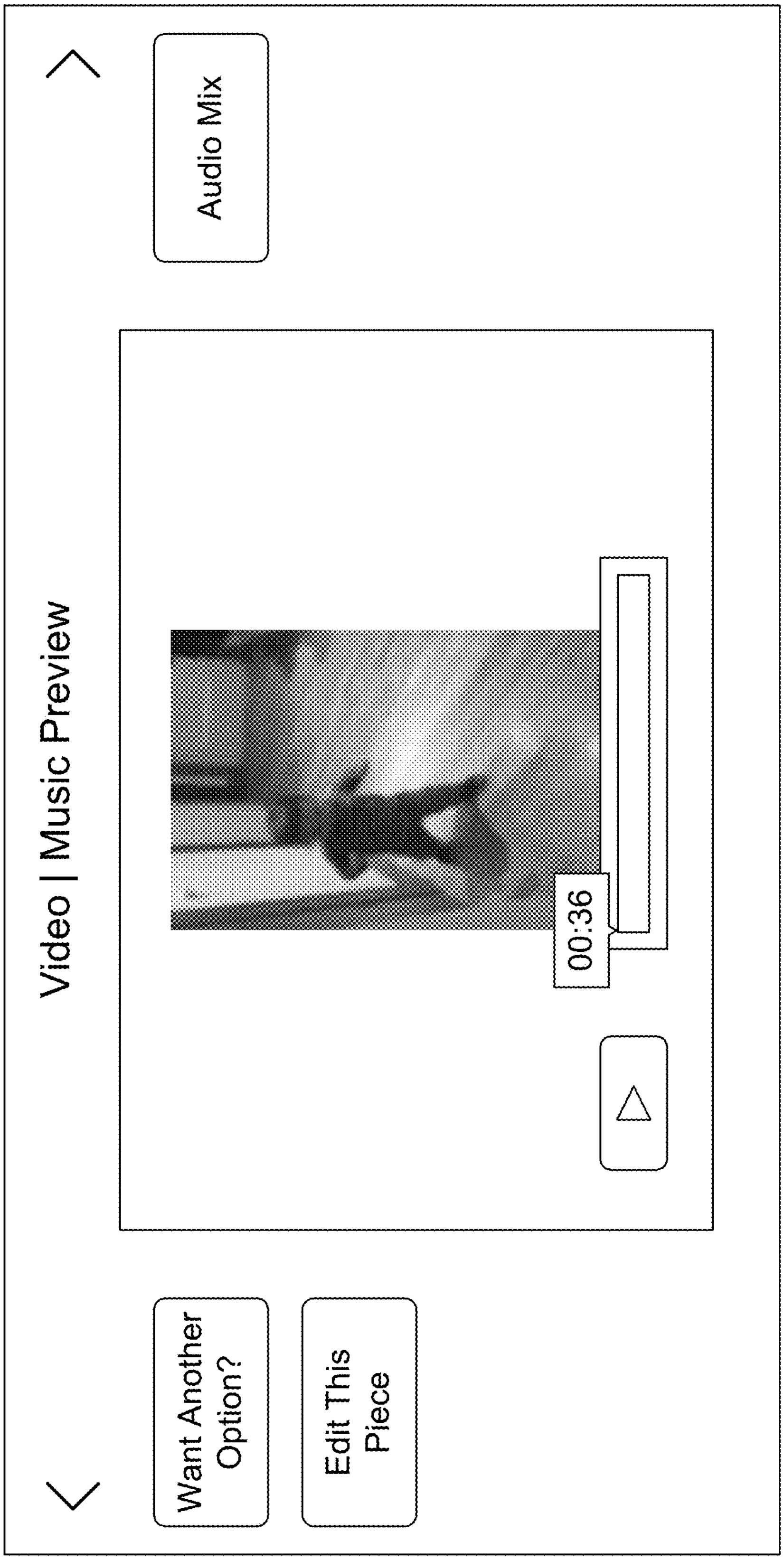
FIG. 15V is an exemplary graphical user interface (GUI) screen that is generated and served by the system illustrated in FIGS. 13 and 14, after a music composition has been generated and is ready for preview against the selected video, wherein the system user is provided with the option to edit the musical experience descriptors set for the musical piece and recompile the musical composition, or accept the generated piece of composed music and mix the audio with the video to generated a scored video file.

FIG. 15U shows an exemplary GUI screen that is generated and served by the system illustrated in FIGS. 13 and 14, when the system user's composed music is ready for review. FIG. 15V is an exemplary GUI screen that is generated and served by the system illustrated in FIGS. 13 and 14, in response to the system user selecting the "Your Music is Ready" object in the GUI screen.

At this stage of the process, the system user may preview the music that has been created. If the music was created with a video or other media, then the music may be synchronized to this content in the preview.

As shown in FIG. 15V, after a music composition has been generated and is ready for preview against the selected video, the system user is provided with several options:

(i) edit the musical experience descriptors set for the musical piece and recompile the musical composition;

(ii) accept the generated piece of composed music and mix the audio with the video to generated a scored video file; and (iii) select other options supported by the automatic music composition and generation system of the present invention.

If the user would like to resubmit the same request for music to the system and receive a different piece of music, then the system user may elect to do so. If the user would like to change all or part of the user's request, then the user may make these modifications. The user may make additional requests if the user would like to do so. The user may elect to balance and mix any or all of the audio in the project on which the user is working including, but not limited to, the pre-existing audio in the content and the music that has been generated by the platform. The user may elect to edit the piece of music that has been created.

The user may edit the music that has been created, inserting, removing, adjusting, or otherwise changing timing information. The user may also edit the structure of the music, the orchestration of the music, and/or save or incorporate the music kernel, or music genome, of the piece. The user may adjust the tempo and pitch of the music. Each of these changes can be applied at the music piece level or in relation to a specific subset, instrument, and/or combination thereof. The user may elect to download and/or distribute the media with which the user has started and used the platform to create.

The user may elect to download and/or distribute the media with which the user has started and used the platform to create.

In the event that, at the GUI screen shown in FIG. 15S, the system user decides to select CANCEL, then the system generates and delivers a GUI screen as shown in FIG. 15D with the full function menu allowing the system user to make edits with respect to music emotion descriptors, music style descriptors, and/or music spotting parameters, as discussed and described above.

Specification of the Compose Music Only Mode of System Operation

If the user decides to create music independently of any additional content by selecting Music Only in the GUI screen of FIG. 15A, then the workflow described and represented in the GUI screens shown in FIGS. 15B, 15C, 15Q, 15R, and 15S are not required, although these spotting features may still be used if the user wants to convey the timing parameters of musical events that the user would like to music to convey.

FIG. 15B is an exemplary graphical user interface (GUI) screen that is generated and served by the system illustrated in FIGS. 13 and 14, when the system user selects "Music Only" object in the GUI of FIG. 15A. In the mode of operation, the system allows the user to select emotion and style descriptor parameters, and timing information, for use by the system to automatically compose and generate a piece of music that expresses the qualities reflected in the musical experience descriptors. In this mode, the general workflow is the same as in the Score Media Mode, except that scoring commands for music spotting, described above, would not typically be supported. However, the system user would be able to input timing parameter information as would desired in some forms of music.

Figure 16:
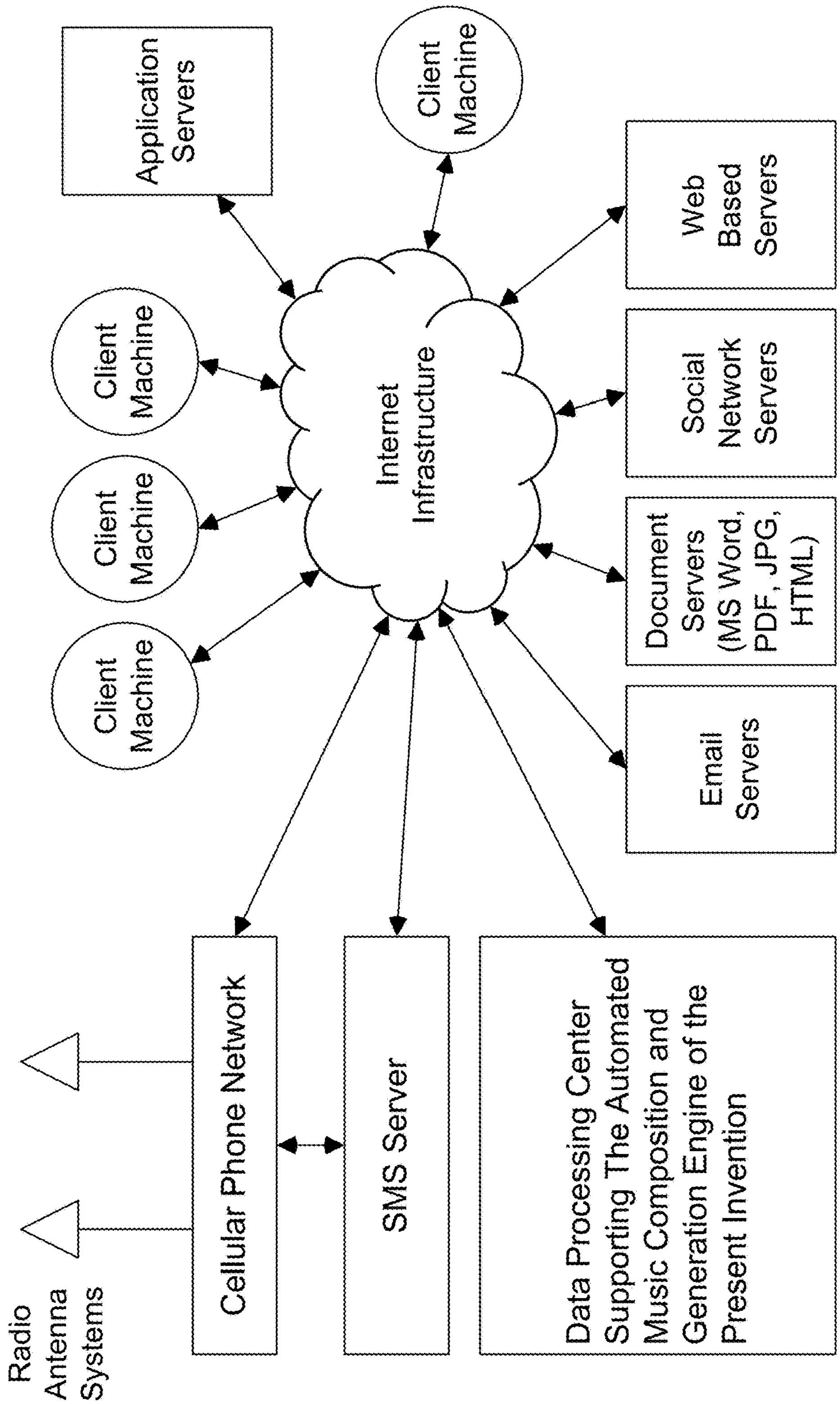
FIG. 16 is a perspective view of the Automated Music Composition and Generation System according to a fifth illustrative embodiment of the present invention, wherein an Internet-based automated music composition and generation platform is deployed so mobile and desktop client machines, alike, using text, SMS and email services supported on the Internet can be augmented by the addition of composed music by users using the Automated Music Composition and Generation Engine of the present invention, and graphical user interfaces supported by the client machines while creating text, SMS and/or email documents (i.e. messages) so that the users can easily select graphic and/or linguistic based emotion and style descriptors for use in generating compose music pieces for such text, SMS and email messages.

Specification of the Fifth Illustrative Embodiment of the Automated Music Composition and Generation System of the Present Invention FIG. 16 shows the Automated Music Composition and Generation System according to a fifth illustrative embodiment of the present invention. In this illustrative embodiment, an Internet-based automated music composition and generation platform is deployed so that mobile and desktop client machines, alike, using text, SMS and email services supported on the Internet, can be augmented by the addition of automatically-composed music by users using the Automated Music Composition and Generation Engine of the present invention, and graphical user interfaces supported by the client machines while creating text, SMS and/or email documents (i.e. messages). Using these interfaces and supported functionalities, remote system users can easily select graphic and/or linguistic based emotion and style descriptors for use in generating composed music pieces for insertion into text, SMS and email messages, as well as diverse document and file types.

Figure 16A:
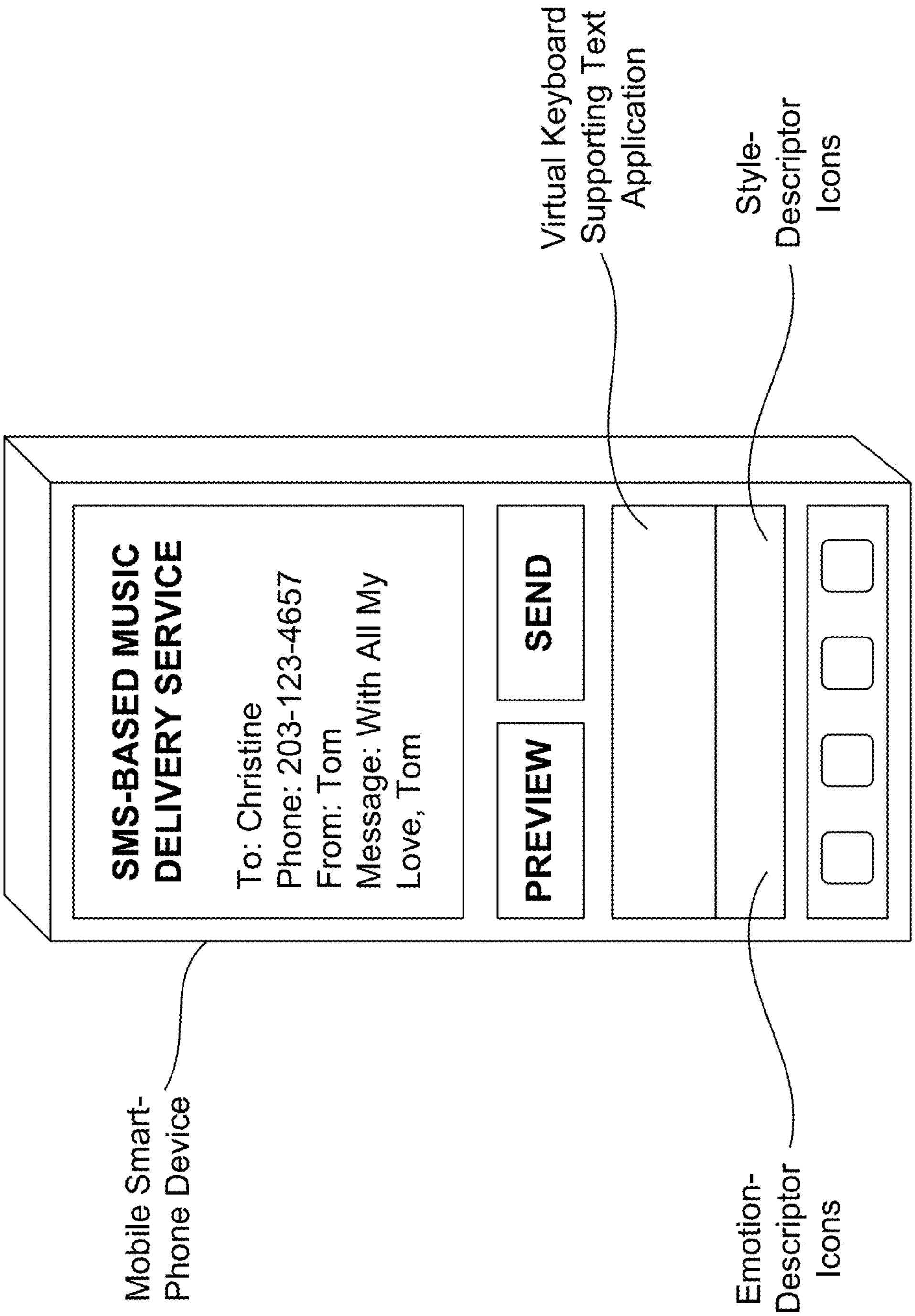
FIG. 16A is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a first exemplary client application is running that provides the user with a virtual keyboard supporting the creation of a text or SMS message, and the creation and insertion of a piece of composed music created by selecting linguistic and/or graphical-icon based emotion descriptors, and style-descriptors, from a menu screen.

FIG. 16A is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a first exemplary client application is running that provides the user with a virtual keyboard supporting the creation of a text or SMS message, and the creation and insertion of a piece of composed music created by selecting linguistic and/or graphical-icon based emotion descriptors, and style-descriptors, from a menu screen.

Figure 16B:
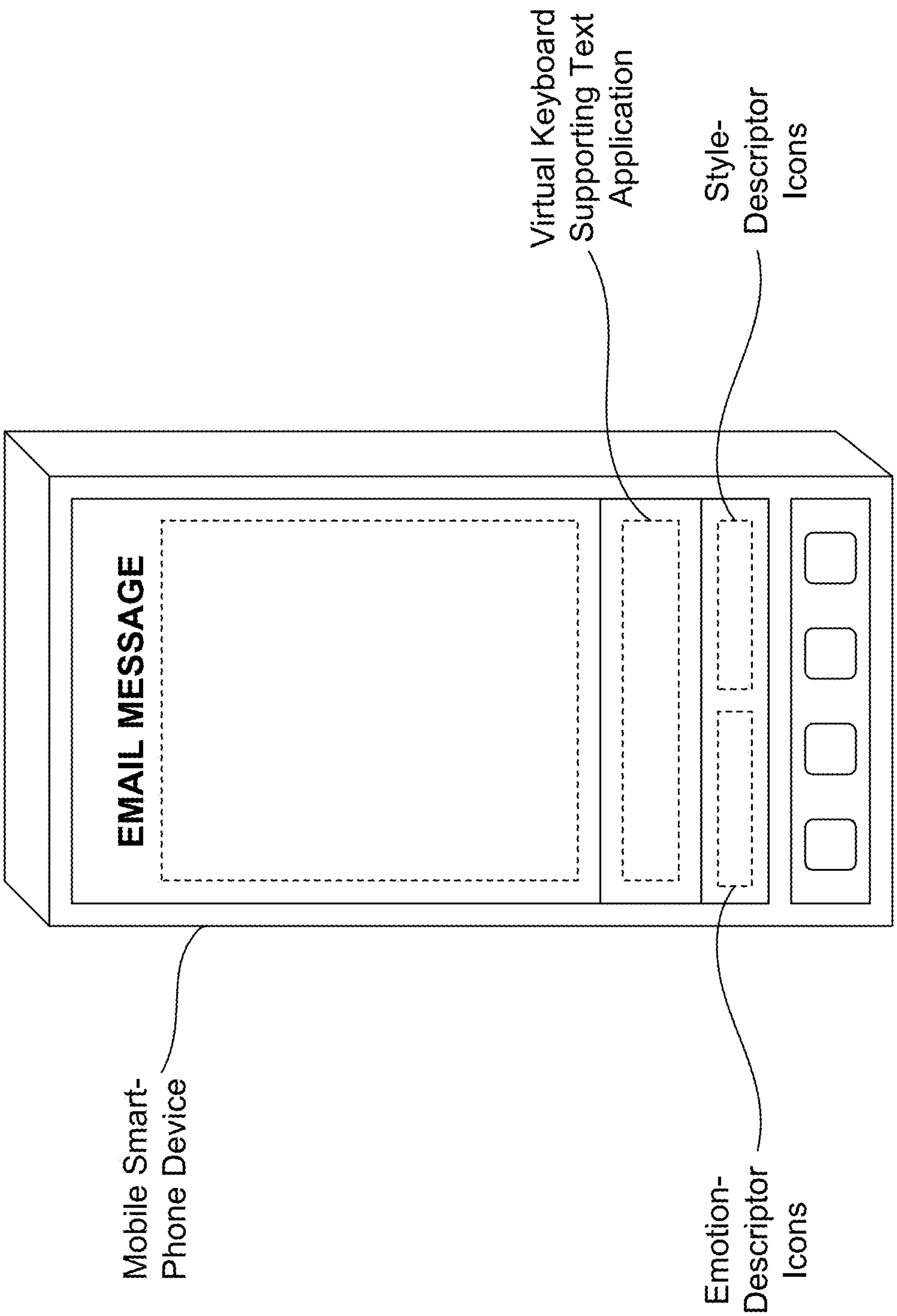
FIG. 16B is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of an email document, and the creation and embedding of a piece of composed music therein created by the user selecting linguistic and/or graphical-icon based emotion descriptors, and style-type descriptors from a menu screen in accordance with the principles of the present invention.

FIG. 16B is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of an email document, and the creation and embedding of a piece of composed music therein, which has been created by the user selecting linguistic and/or graphical-icon based emotion descriptors, and style-descriptors, from a menu screen in accordance with the principles of the present invention.

Figure 16C:
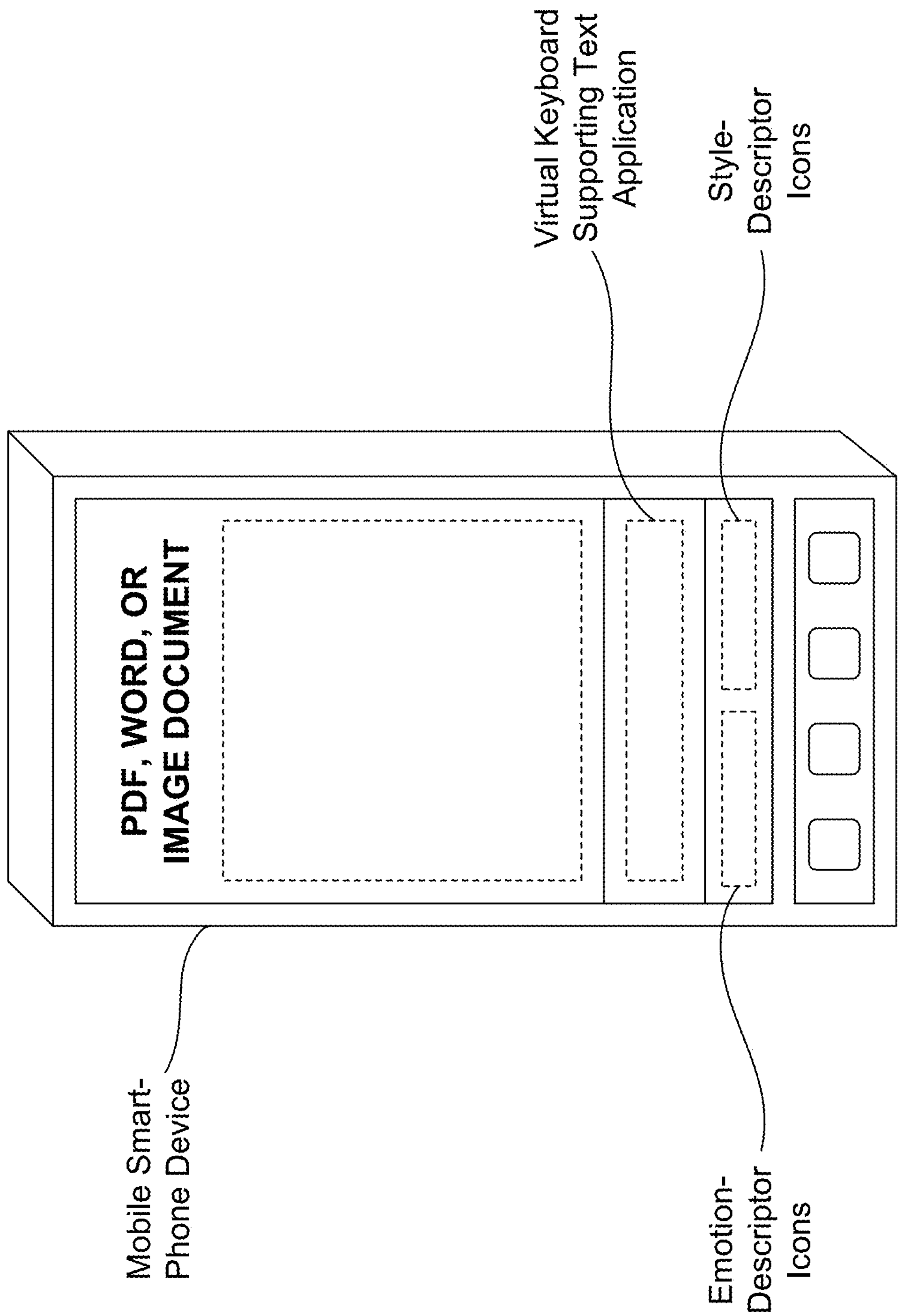
FIG. 16C is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a Microsoft Word, PDF, or image (e.g. jpg or tiff) document, and the creation and insertion of a piece of composed music created by selecting linguistic and/or graphical-icon based emotion descriptors, and style-descriptors, from a menu screen.

FIG. 16C is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a Microsoft Word, PDF, or image (e.g. jpg or tiff) document, and the creation and insertion of a piece of composed music created by selecting linguistic and/or graphical-icon based emotion descriptors, and style-descriptors, from a menu screen.

Figure 16D:
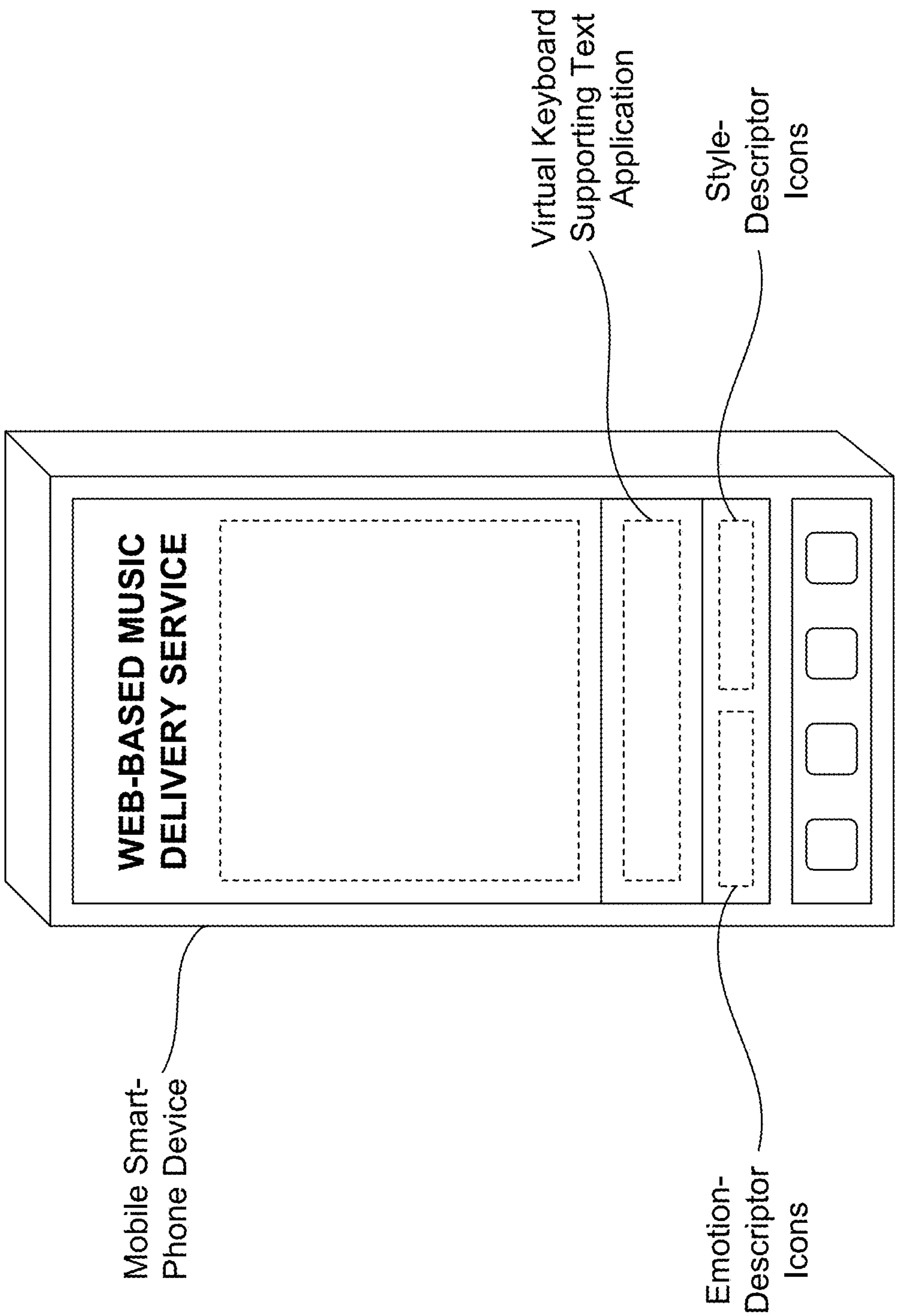
FIG. 16D is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a web-based (i.e. html) document, and the creation and insertion of a piece of composed music created by selecting linguistic and/or graphical-icon based emotion descriptors, and style-descriptors, from a menu screen, so that the music piece can be delivered to a remote client and experienced using a conventional web-browser operating on the embedded URL, from which the embedded music piece is being served by way of web, application and database servers.

FIG. 16D is a perspective view of a mobile client machine (e.g. Internet-enabled smartphone or tablet computer) deployed in the system network illustrated in FIG. 16, where the client machine is realized a mobile computing machine having a touch-screen interface, a memory architecture, a central processor, graphics processor, interface circuitry, network adapters to support various communication protocols, and other technologies to support the features expected in a modern smartphone device (e.g. Apple iPhone, Samsung Android Galaxy, et al), and wherein a second exemplary client application is running that provides the user with a virtual keyboard supporting the creation of a web-based (i.e. html) document, and the creation and insertion of a piece of composed music created by selecting linguistic and/or graphical-icon based emotion descriptors, and style-descriptors, from a menu screen, so that the music piece can be delivered to a remote client and experienced using a conventional web-browser operating on the embedded URL, from which the embedded music piece is being served by way of web, application and database servers.

Figure 17:
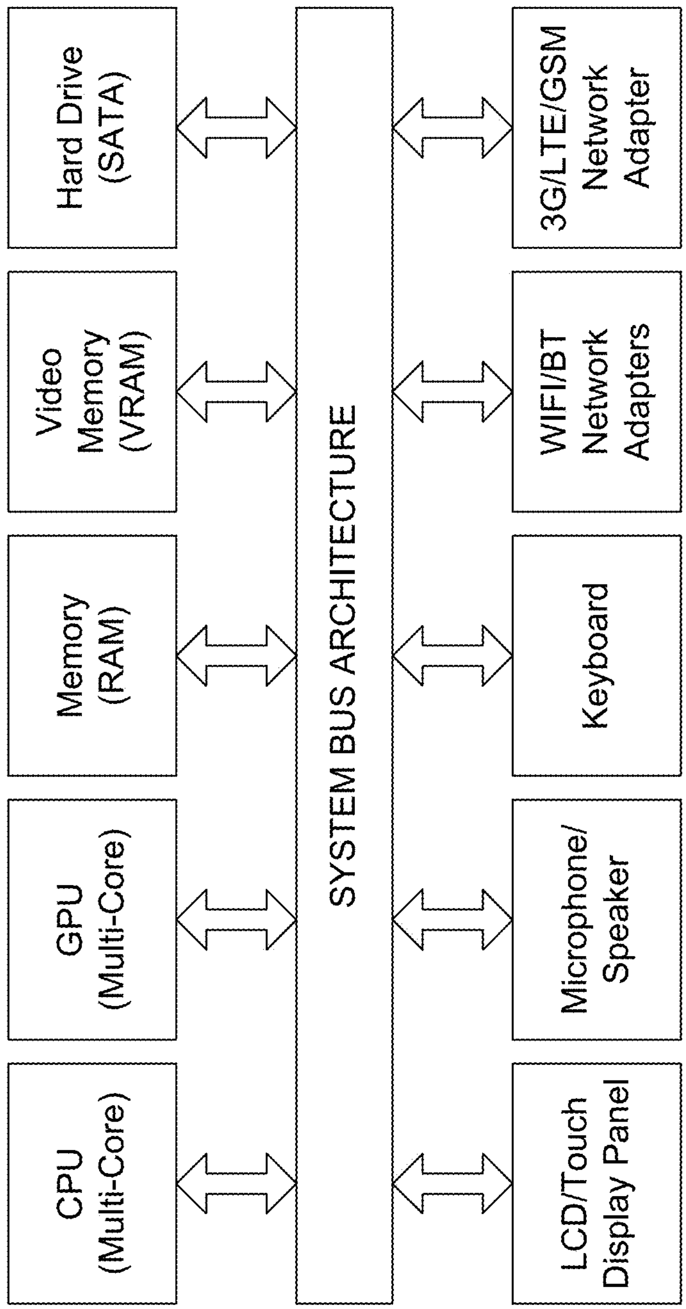
FIG. 17 is a schematic representation of the system architecture of each client machine deployed in the system illustrated in FIGS. 16A, 16B, 16C and 16D, comprising around a system bus architecture, subsystem modules including a multi-core CPU, a multi-core GPU, program memory (RAM), video memory (VRAM), hard drive (SATA drive), LCD/Touch-screen display panel, micro-phone speaker, keyboard, WIFI/Bluetooth network adapters, and 3G/LTE/GSM network adapter integrated with the system bus architecture.

FIG. 17 is a schematic representation of the system architecture of each client machine deployed in the system illustrated in FIGS. 16A, 16B, 16C and 16D, comprising around a system bus architecture, subsystem modules including a multi-core CPU, a multi-core GPU, program memory (RAM), video memory (VRAM), hard drive (SATA drive), LCD/Touch-screen display panel, micro-phone speaker, keyboard, WIFI/Bluetooth network adapters, and 3G/LTE/GSM network adapter integrated with the system bus architecture.

Figure 18:
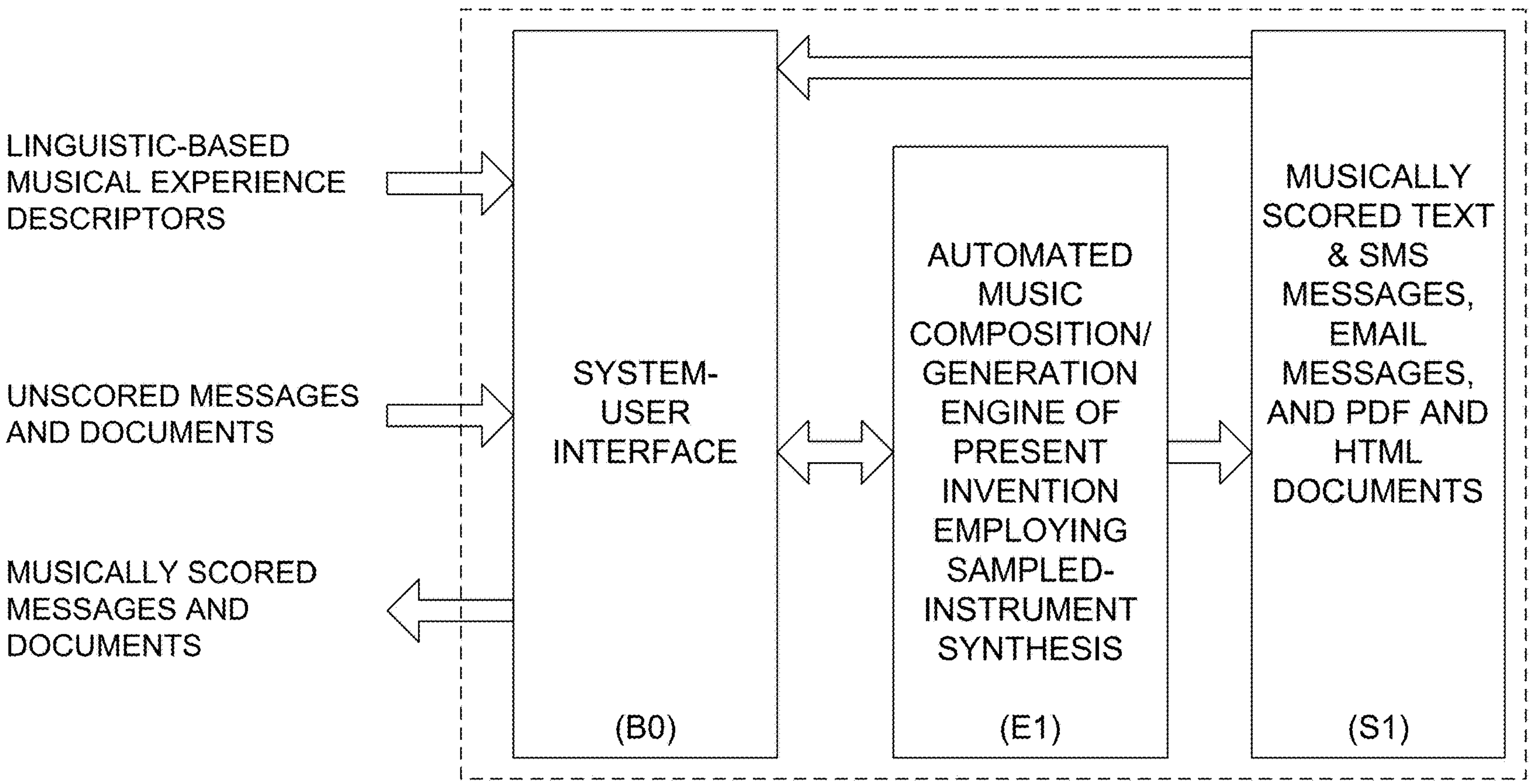
FIG. 18 is a schematic representation illustrating the high-level system architecture of the Internet-based music composition and generation system of the present invention supporting the use of virtual-instrument music synthesis driven by linguistic and/or graphical icon based musical experience descriptors, so as to add composed music to text, SMS and email documents/messages, wherein linguistic-based or icon-based musical experience descriptors are supplied as input through the system user interface, and used by the Automated Music Composition and Generation Engine of the present invention to generate a musically-scored text document or message that is generated for preview by system user via the system user interface, before finalization and transmission.

FIG. 18 is a schematic representation illustrating the high-level system architecture of the Internet-based music composition and generation system of the present invention supporting the use of linguistic and/or graphical icon based musical experience descriptors and virtual-instrument music synthesis to add composed music to text, SMS and email documents/messages, wherein linguistic-based or icon-based musical experience descriptors are supplied as input through the system user interface, and used by the Automated Music Composition and Generation Engine of the present invention to generate a musically-scored text document or message that is generated for preview by system user via the system user interface, before finalization and transmission.

FIG. 19 is a flow chart illustrating the primary steps involved in carrying out the automated music composition and generation process of the present invention using the Web-based system shown in FIGS. 16-18 supporting the use of linguistic and/or graphical icon based musical experience descriptors and virtual-instrument music synthesis to create musically-scored text, SMS, email, PDF, Word and/or html documents, wherein (i) during the first step of the process, the system user accesses the Automated Music Composition and Generation System of the present invention, and then selects a text, SMS or email message or Word, PDF or HTML document to be scored (e.g. augmented) with music generated by the Automated Music Composition and Generation System of the present invention, (ii) the system user then provides linguistic-based and/or icon-based musical experience descriptors to the Automated Music Composition and Generation Engine of the system, (iii) the system user initiates the Automated Music Composition and Generation System to compose and generate music based on inputted musical descriptors scored on selected messages or documents, (iv) the system user accepts composed and generated music produced for the message or document, or rejects the music and provides feedback to the system, including providing different musical experience descriptors and a request to re-compose music based on the updated musical experience descriptor inputs, and (v) the system combines the accepted composed music with the message or document, so as to create a new file for distribution and display.

Figure 20:
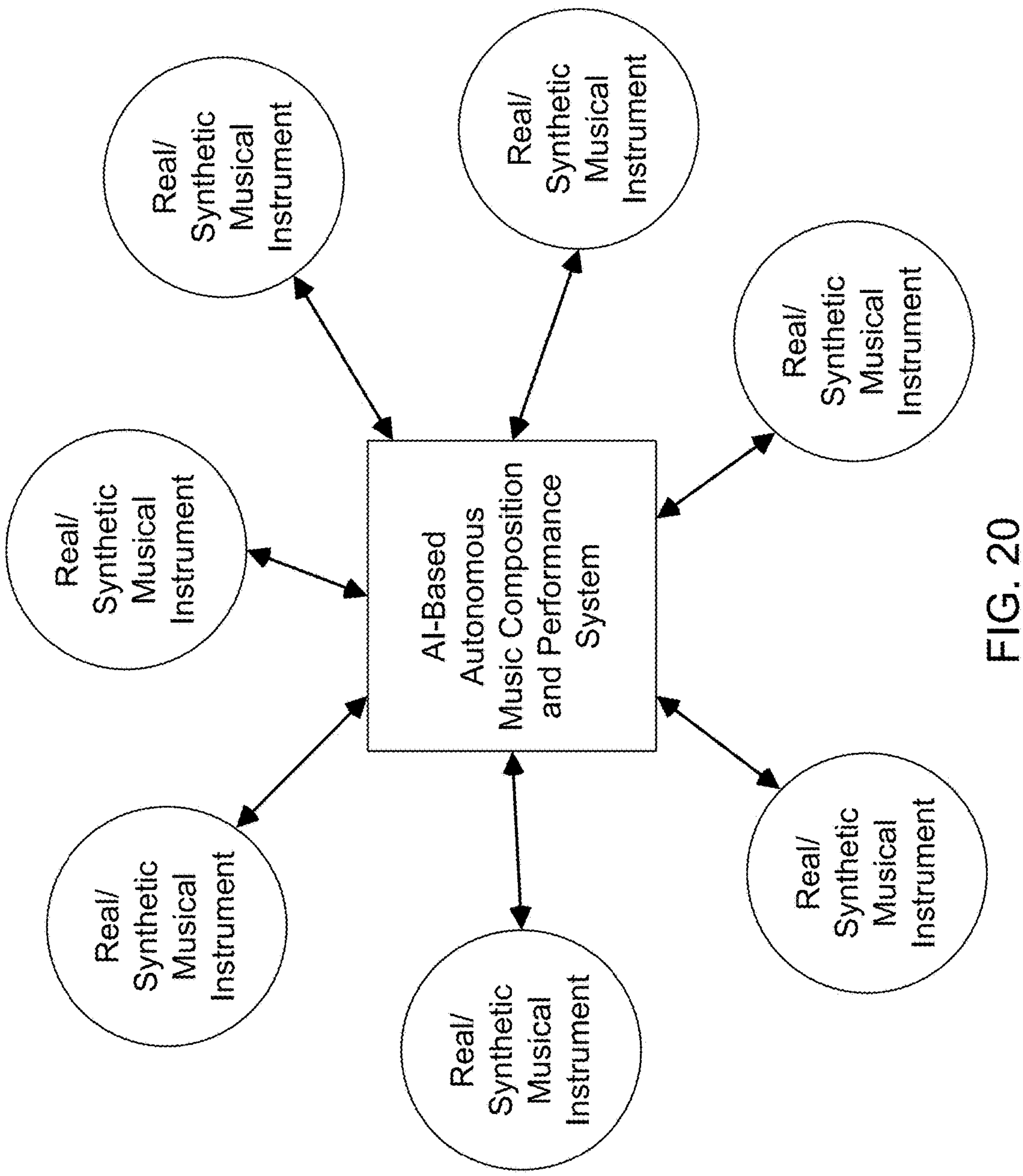
FIG. 20 is a schematic representation of a band of human musicians with a real or synthetic musical instrument, surrounded about an AI-based autonomous music composition and composition performance system, employing a modified version of the Automated Music Composition and Generation Engine of the present invention, wherein the AI-based system receives musical signals from its surrounding instruments and musicians and buffers and analyzes these instruments and, in response thereto, can compose and generate music in real-time that will augment the music being played by the band of musicians, or can record, analyze and compose music that is recorded for subsequent playback, review and consideration by the human musicians.

Specification of the Sixth Illustrative Embodiment of the Automated Music Composition and Generation System of the Present Invention FIG. 20 is a schematic representation of a band of musicians with real or synthetic musical instruments, surrounded about an AI-based autonomous music composition and composition performance system, employing a modified version of the Automated Music Composition and Generation Engine of the present invention, wherein the AI-based system receives musical signals from its surrounding instruments and musicians and buffers and analyzes these instruments and, in response thereto, can compose and generate music in real-time that will augment the music being played by the band of musicians, or can record, analyze and compose music that is recorded for subsequent playback, review and consideration by the human musicians.

Figure 21:
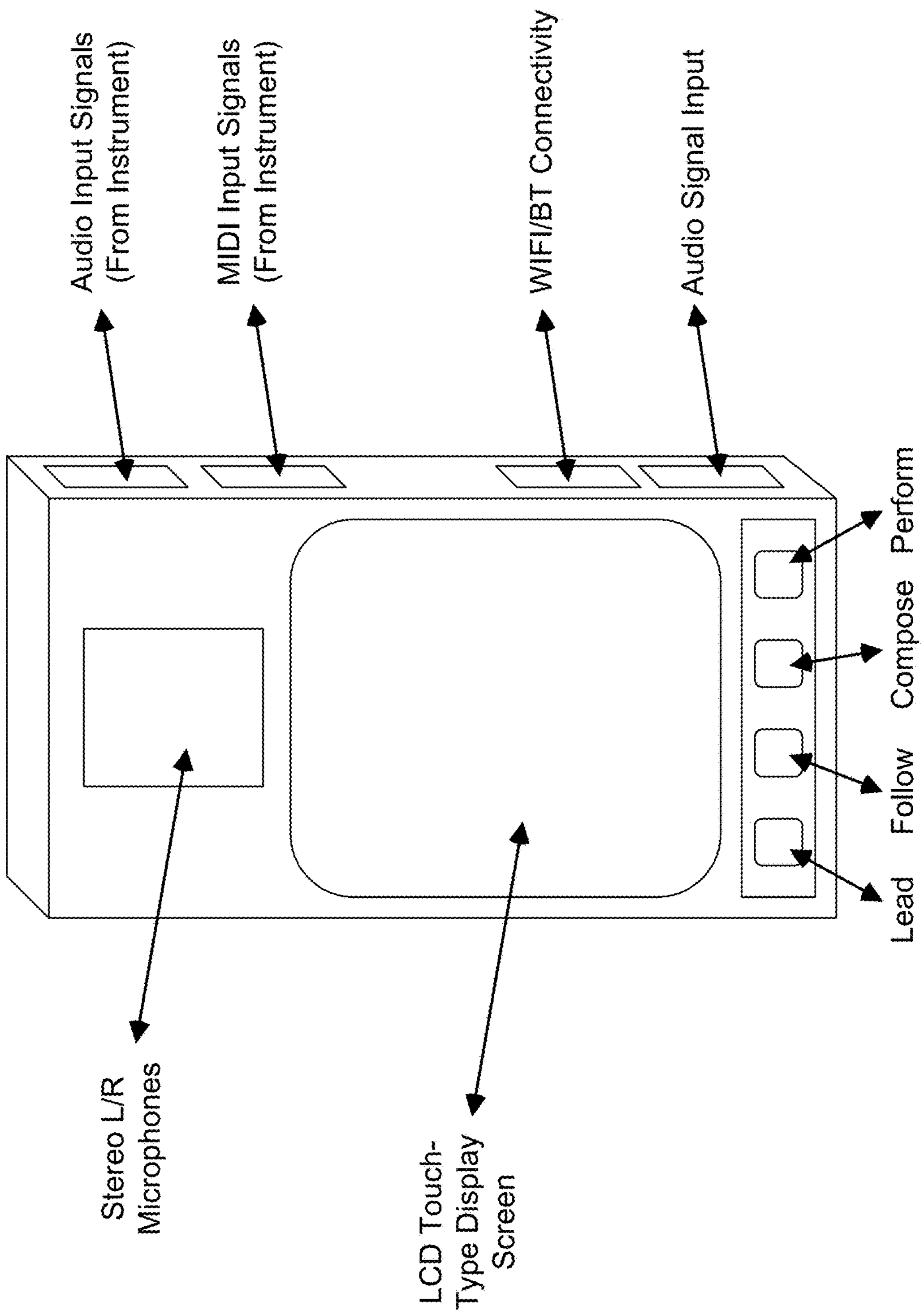
FIG. 21 is a schematic representation of the Autonomous Music Analyzing, Composing and Performing Instrument System, having a compact rugged transportable housing comprising a LCD touch-type display screen, a built-in stereo microphone set, a set of audio signal input connectors for receiving audio signals produced from the set of musical instruments in the system's environment, a set of MIDI signal input connectors for receiving MIDI input signals from the set of instruments in the system environment, audio output signal connector for delivering audio output signals to audio signal preamplifiers and/or amplifiers, WIFI and BT network adapters and associated signal antenna structures, and a set of function buttons for the user modes of operation including (i) LEAD mode, where the instrument system autonomously leads musically in response to the streams of music information it receives and analyzes from its (local or remote) musical environment during a musical session, (ii) FOLLOW mode, where the instrument system autonomously follows musically in response to the music it receives and analyzes from the musical instruments in its (local or remote) musical environment during the musical session, (iii) COMPOSE mode, where the system automatically composes music based on the music it receives and analyzes from the musical instruments in its (local or remote) environment during the musical session, and (iv) PERFORM mode, where the system autonomously performs automatically composed music, in real-time, in response to the musical information it receives and analyzes from its environment during the musical session.

FIG. 21 is a schematic representation of the autonomous music analyzing, composing and performing instrument, having a compact rugged transportable housing comprising a LCD touch-type display screen, a built-in stereo microphone set, a set of audio signal input connectors for receiving audio signals produced from the set of musical instruments in the system's environment, a set of MIDI signal input connectors for receiving MIDI input signals from the set of instruments in the system environment, audio output signal connector for delivering audio output signals to audio signal preamplifiers and/or amplifiers, WIFI and BT network adapters and associated signal antenna structures, and a set of function buttons for the user modes of operation including (i) LEAD mode, where the instrument system autonomously leads musically in response to the streams of music information it receives and analyzes from its (local or remote) musical environment during a musical session, (ii) FOLLOW mode, where the instrument system autonomously follows musically in response to the music it receives and analyzes from the musical instruments in its (local or remote) musical environment during the musical session, (iii) COMPOSE mode, where the system automatically composes music based on the music it receives and analyzes from the musical instruments in its (local or remote) environment during the musical session, and (iv) PERFORM mode, where the system autonomously performs automatically composed music, in real-time, in response to the musical information it receives and analyzes from its environment during the musical session.

Figure 22:
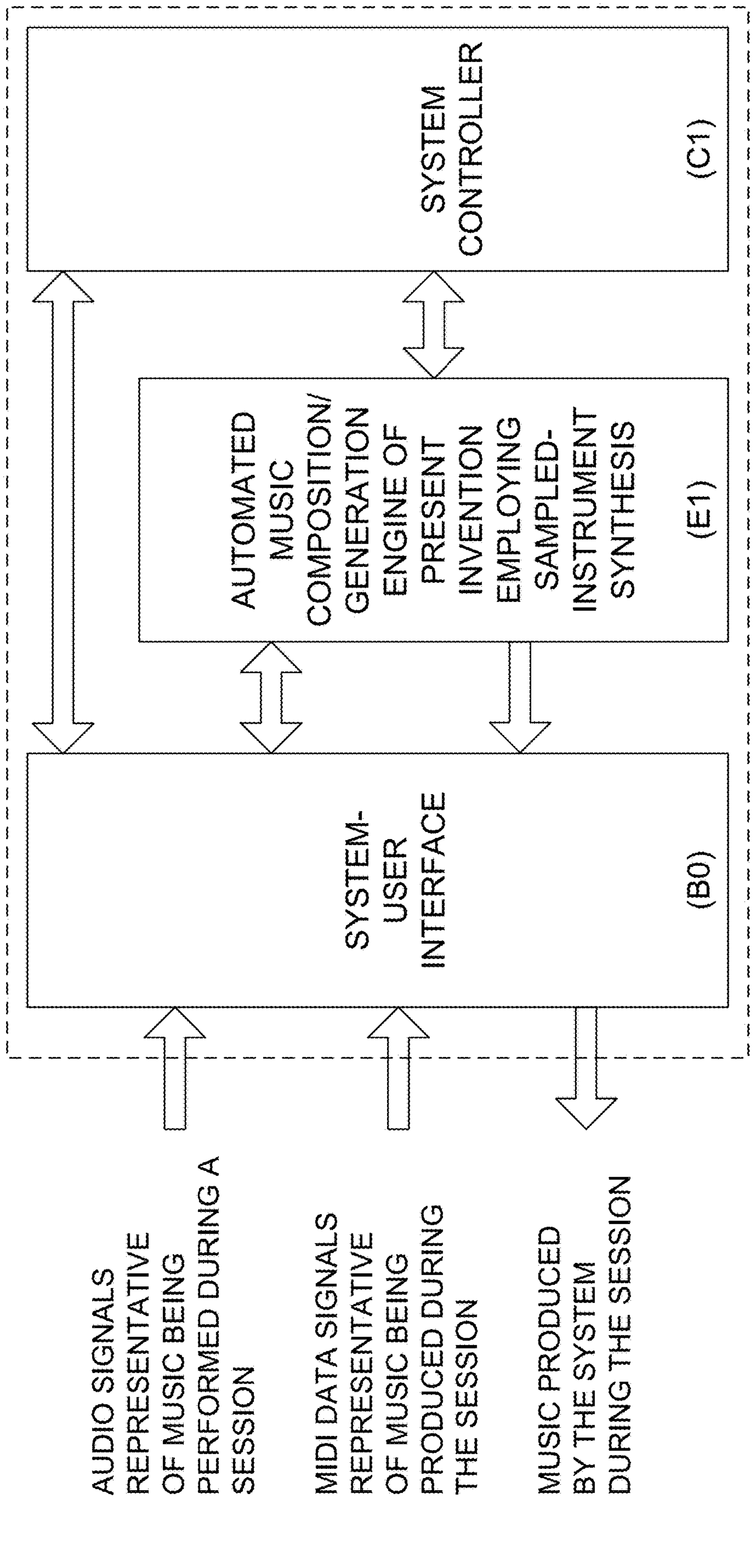
FIG. 22 is a schematic representation illustrating the high-level system architecture of the Autonomous Music Analyzing, Composing and Performing Instrument System shown in FIG. 21, wherein audio signals as well as MIDI input signals produced from a set of musical instruments in the system's environment are received by the instrument system, and these signals are analyzed in real-time, on the time and/or frequency domain, for the occurrence of pitch events and melodic structure so that the system can automatically abstract musical experience descriptors from this information for use in generating automated music composition and generation using the Automated Music Composition and Generation Engine of the present invention.

FIG. 22 illustrates the high-level system architecture of the automated music composition and generation instrument system shown in FIG. 21. As shown in FIG. 22, audio signals as well as MIDI input signals produced from a set of musical instruments in the system's environment are received by the instrument system, and these signals are analyzed in real-time, on the time and/or frequency domain, for the occurrence of pitch events and melodic structure. The purpose of this analysis and processing is so that the system can automatically abstract musical experience descriptors from this information for use in generating automated music composition and generation using the Automated Music Composition and Generation Engine of the present invention.

Figure 23:
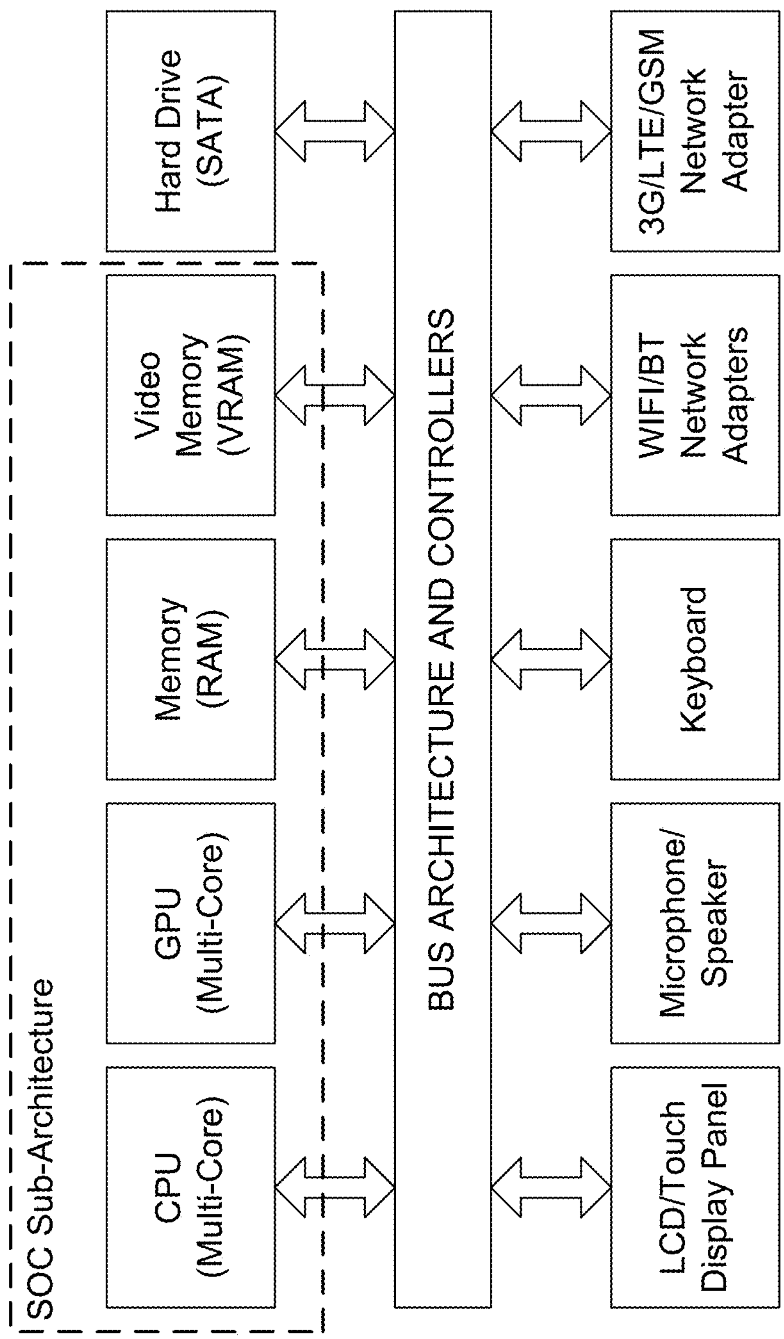
FIG. 23 is a schematic representation of the system architecture of the instrument system illustrated in FIGS. 20 and 21, comprising an arrangement of subsystem modules, around a system bus architecture, including a multi-core CPU, a multi-core GPU, program memory (DRAM), video memory (VRAM), hard drive (SATA drive), LCD/Touch-screen display panel, stereo microphones, audio speaker, keyboard, WIFI/Bluetooth network adapters, and 3G/LTE/GSM network adapter integrated with the system bus architecture.

FIG. 23 is a schematic representation of the system architecture of the system illustrated in FIGS. 20 and 21, comprising an arrangement of subsystem modules, around a system bus architecture, including a multi-core CPU, a multi-core GPU, program memory (DRAM), video memory (VRAM), hard drive (SATA drive), LCD/Touch-screen display panel, stereo microphones, audio speaker, keyboard, WIFI/Bluetooth network adapters, and 3G/LTE/GSM network adapter integrated with the system bus architecture.

In general, the automatic or automated music composition and generation system shown in FIGS. 20 and 21, including all of its inter-cooperating subsystems shown in FIGS. 26A through 33E and specified above, can be implemented using digital electronic circuits, analog electronic circuits, or a mix of digital and analog electronic circuits specifically configured and programmed to realize the functions and modes of operation to be supported by the automatic music composition and generation system. The digital integrated circuitry (IC) can be low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (ID) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, as well as other subsystems employed in the system.

FIG. 24 is a flow chart illustrating the primary steps involved in carrying out the automated music composition and generation process of the present invention using the system shown in FIGS. 20-23, wherein (i) during the first step of the process, the system user selects either the LEAD or FOLLOW mode of operation for the automated musical composition and generation instrument system of the present invention, (ii) prior to the session, the system is then is interfaced with a group of musical instruments played by a group of musicians in a creative environment during a musical session, (iii) during the session system receives audio and/or MIDI data signals produced from the group of instruments during the session, and analyzes these signals for pitch data and melodic structure, (iv) during the session, the system automatically generates musical descriptors from abstracted pitch and melody data, and uses the musical experience descriptors to compose music for the session on a real-time basis, and (v) in the event that the PERFORM mode has been selected, the system generates the composed music, and in the event that the COMPOSE mode has been selected, the music composed during for the session is stored for subsequent access and review by the group of musicians.

Specification of the Illustrative Embodiment of the Automated Music Composition and Generation Engine of the Present Invention FIG. 25A shows a high-level system diagram for the Automated Music Composition and Generation Engine of the present invention (E1) employed in the various embodiments of the present invention herein. As shown, the Engine E1 comprises: a user GUI-Based Input Subsystem A0, a General Rhythm Subsystem A1, a General Pitch Generation Subsystem A2, a Melody Rhythm Generation Subsystem A3, a Melody Pitch Generation Subsystem A4, an Orchestration Subsystem A5, a Controller Code Creation Subsystem A6, a Digital Piece Creation Subsystem A7, and a Feedback and Learning Subsystem A8 configured as shown.

FIG. 25B shows a higher-level system diagram illustrating that the system of the present invention comprises two very high level subsystems, namely: (i) a Pitch Landscape Subsystem C0 comprising the General Pitch Generation Subsystem A2, the Melody Pitch Generation Subsystem A4, the Orchestration Subsystem A5, and the Controller Code Creation Subsystem A6, and (ii) a Rhythmic Landscape Subsystem C1 comprising the General Rhythm Generation Subsystem A1, Melody Rhythm Generation Subsystem A3, the Orchestration Subsystem A5, and the Controller Code Creation Subsystem A6.

At this stage, it is appropriate to discuss a few important definitions and terms relating to important music-theoretic concepts that will be helpful to understand when practicing the various embodiments of the automated music composition and generation systems of the present invention. However, it should be noted that, while the system of the present invention has a very complex and rich system architecture, such features and aspects are essentially transparent to all system users, allowing them to have essentially no knowledge of music theory, and no musical experience and/or talent. To use the system of the present invention, all that is required by the system user is to have (i) a sense of what kind of emotions they system user wishes to convey in an automatically composed piece of music, and/or (ii) a sense of what musical style they wish or think the musical composition should follow.

At the top level, the "Pitch Landscape" C0 is a term that encompasses, within a piece of music, the arrangement in space of all events. These events are often, though not always, organized at a high level by the musical piece's key and tonality; at a middle level by the musical piece's structure, form, and phrase; and at a low level by the specific organization of events of each instrument, participant, and/or other component of the musical piece. The various subsystem resources available within the system to support pitch landscape management are indicated in the schematic representation shown in FIG. 25B.

Similarly, "Rhythmic Landscape" C1 is a term that encompasses, within a piece of music, the arrangement in time of all events. These events are often, though not always, organized at a high level by the musical piece's tempo, meter, and length; at a middle level by the musical piece's structure, form, and phrase; and at a low level by the specific organization of events of each instrument, participant, and/or other component of the musical piece. The various subsystem resources available within the system to support pitch landscape management are indicated in the schematic representation shown in FIG. 25B.

There are several other high-level concepts that play important roles within the Pitch and Rhythmic Landscape Subsystem Architecture employed in the Automated Music Composition And Generation System of the present invention.

In particular, "Melody Pitch" is a term that encompasses, within a piece of music, the arrangement in space of all events that, either independently or in concert with other events, constitute a melody and/or part of any melodic material of a musical piece being composed.

"Melody Rhythm" is a term that encompasses, within a piece of music, the arrangement in time of all events that, either independently or in concert with other events, constitute a melody and/or part of any melodic material of a musical piece being composed.

"Orchestration" for the piece of music being composed is a term used to describe manipulating, arranging, and/or adapting a piece of music.

"Controller Code" for the piece of music being composed is a term used to describe information related to musical expression, often separate from the actual notes, rhythms, and instrumentation.

"Digital Piece" of music being composed is a term used to describe the representation of a musical piece in a digital or combination or digital and analog, but not solely analog manner.

FIG. 26A through 26P, taken together, show how each subsystem in FIG. 25 are configured together with other subsystems in accordance with the principles of the present invention, so that musical experience descriptors provided to the user GUI-based input/output subsystem A0/B0 are distributed to their appropriate subsystems for processing and use in the automated music composition and generation process of the present invention, described in great technical detail herein. It is appropriate at this juncture to identify and describe each of the subsystems B0 through B52 that serve to implement the higher-level subsystems A0 through A8 within the Automated Music Composition and Generation System (S) of the present invention.

More specifically, as shown in FIGS. 26A through 26D, the GUI-Based Input Subsystem A0 comprises: the User GUI-Based Input Output Subsystem B0; Descriptor Parameter Capture Subsystem B1; Parameter Transformation Engine Subsystem B51; Style Parameter Capture Subsystem B37; and the Timing Parameter Capture Subsystem B40. These subsystems receive and process all musical experience parameters (e.g. emotional descriptors, style descriptors, and timing/spatial descriptors) provided to the Systems A0 via the system users, or other means and ways called for by the end system application at hand.

As shown in FIGS. 27D, 26E, 26F, 26G, 26H, 26I and 27J, the General Rhythm Generation Subsystem A1 for generating the General Rhythm for the piece of music to be composed, comprises the following subsystems: the Length Generation Subsystem B2; the Tempo Generation Subsystem B3; the Meter Generation Subsystem B4; the Beat Calculator Subsystem B6; the Measure Calculator Subsystem B8; the Song Form Generation Subsystem B9; the Sub-Phrase Length Generation Subsystem B15; the Number of Chords in Sub-Phrase Calculator Subsystem B16; the Phrase Length Generation Subsystem B12; the Unique Phrase Generation Subsystem B10; the Number of Chords in Phrase Calculator Subsystem B13; the Chord Length Generation Subsystem B11; the Unique Sub-Phrase Generation Subsystem B14; the Instrumentation Subsystem B38; the Instrument Selector Subsystem B39; and the Timing Generation Subsystem B41.

As shown in FIGS. 27J and 26K, the General Pitch Generation Subsystem A2 for generating chords (i.e. pitch events) for the piece of music being composed, comprises: the Key Generation Subsystem B5; the Tonality Generation Subsystem B7; the Initial General Rhythm Generation Subsystem B17; the Sub-Phrase Chord Progression Generation Subsystem B19; the Phrase Chord Progression Generation Subsystem B18; the Chord Inversion Generation Subsystem B20; the Instrumentation Subsystem B38; the Instrument Selector Subsystem B39.

As shown in FIGS. 26K and 26L, the Melody Rhythm Generation Subsystem A3 for generating a Melody Rhythm for the piece of music being composed, comprises: the Melody Sub-Phrase Length Generation Subsystem B25; the Melody Sub-Phrase Generation Subsystem B24; the Melody Phrase Length Generation Subsystem B23; the Melody Unique Phrase Generation Subsystem B22; the Melody Length Generation Subsystem B21; the Melody Note Rhythm Generation Subsystem B26.

Figure 27C:
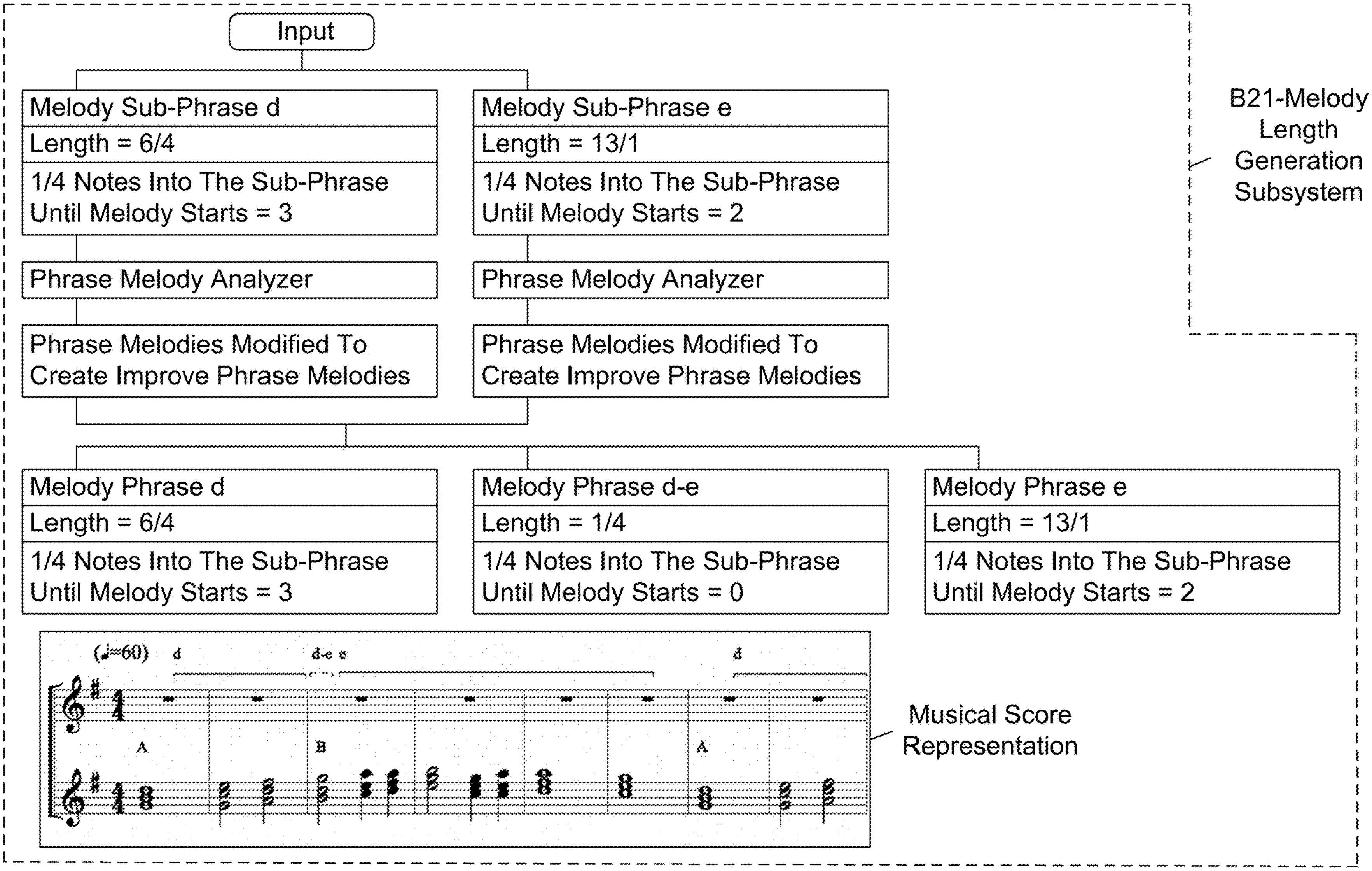
Figure 27E:
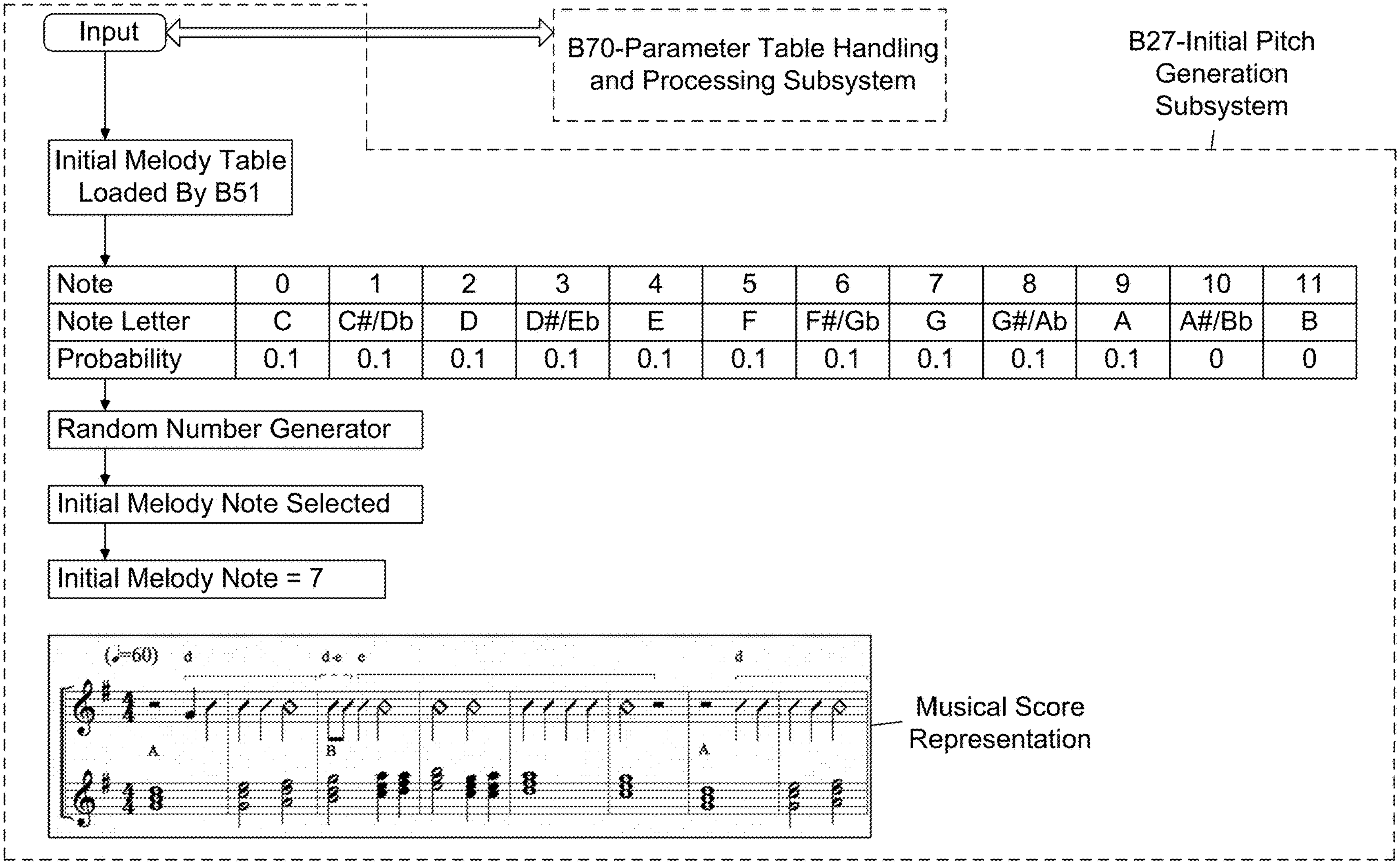
Figure 27G:
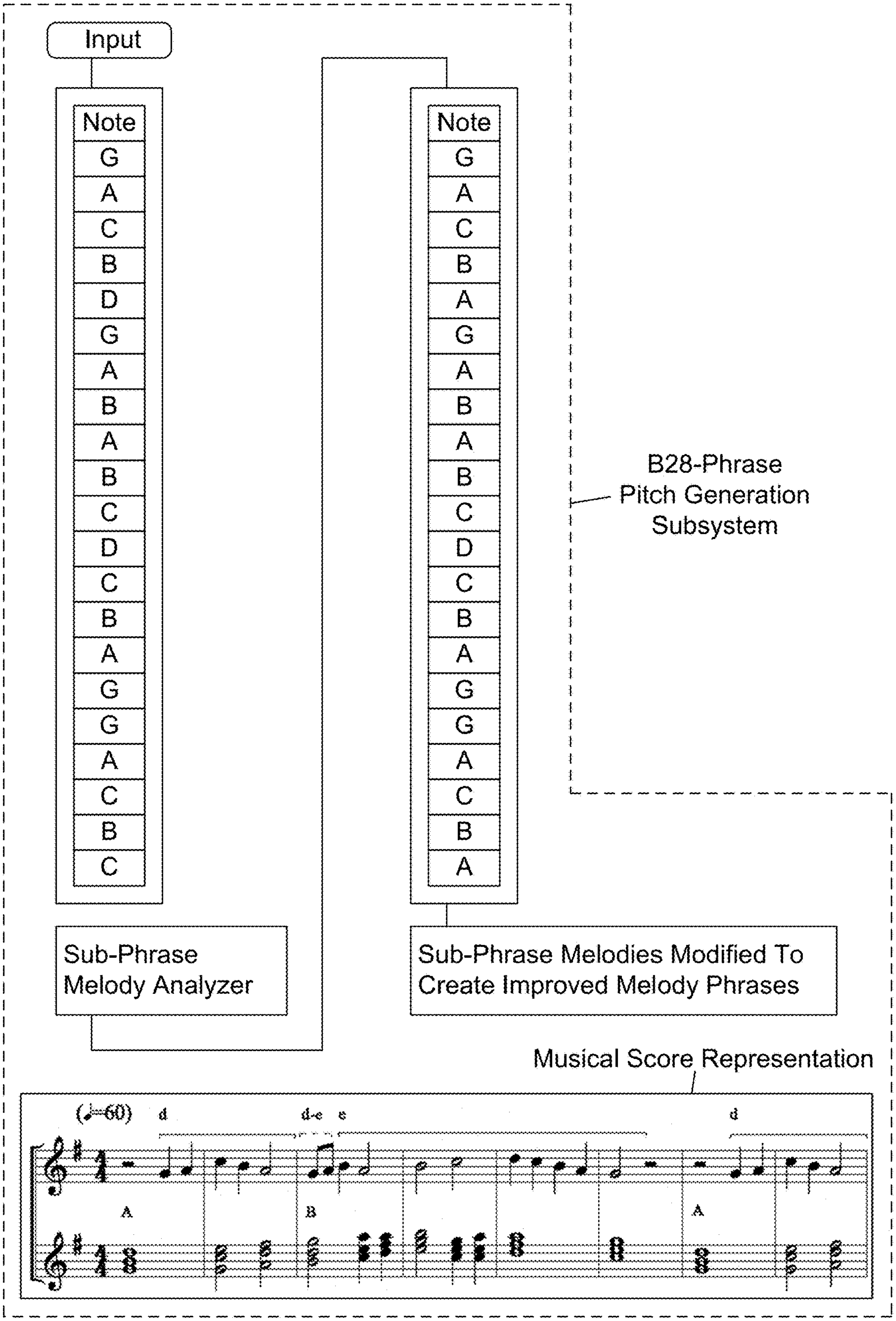
Figure 27L:
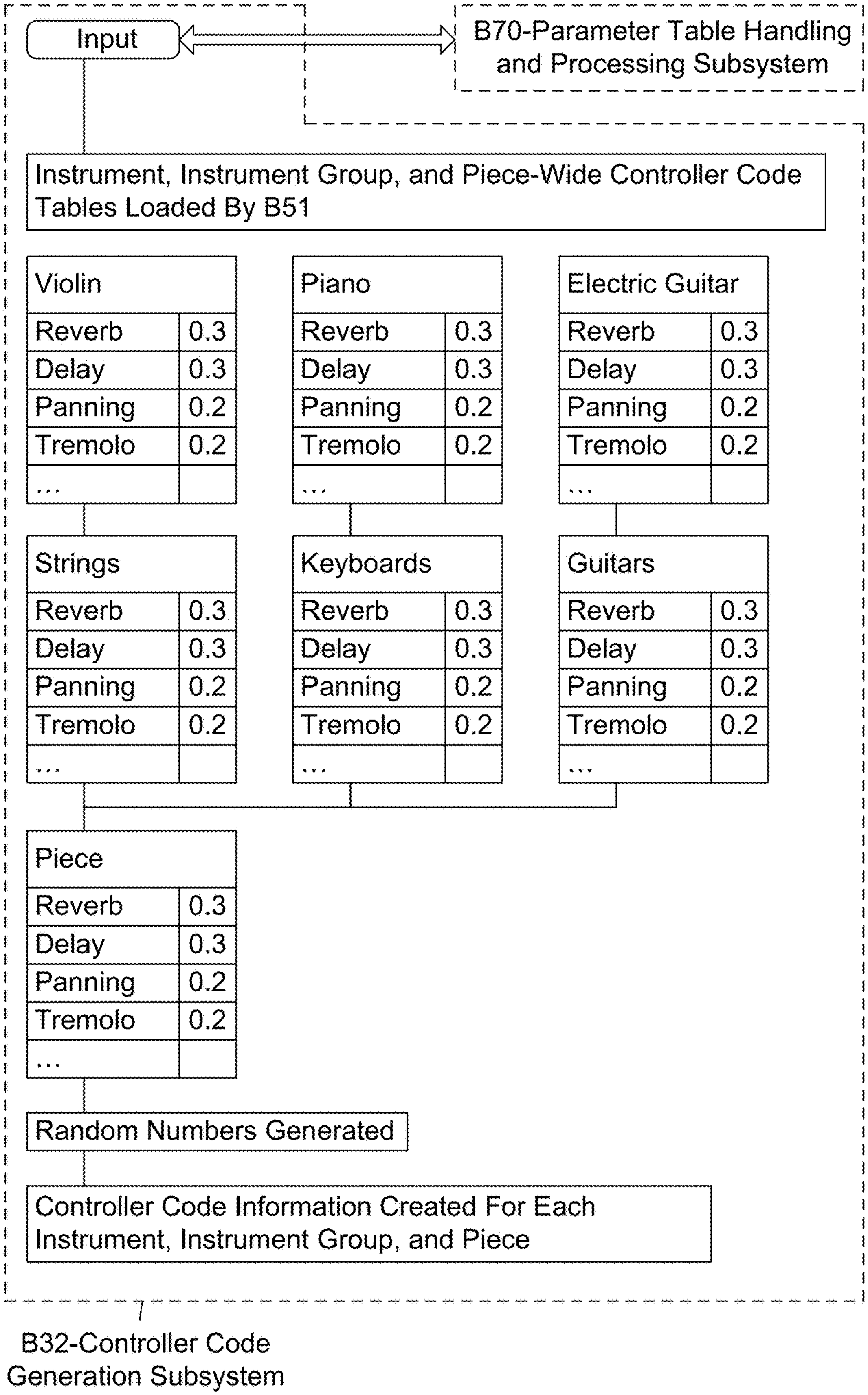
Figure 27M:
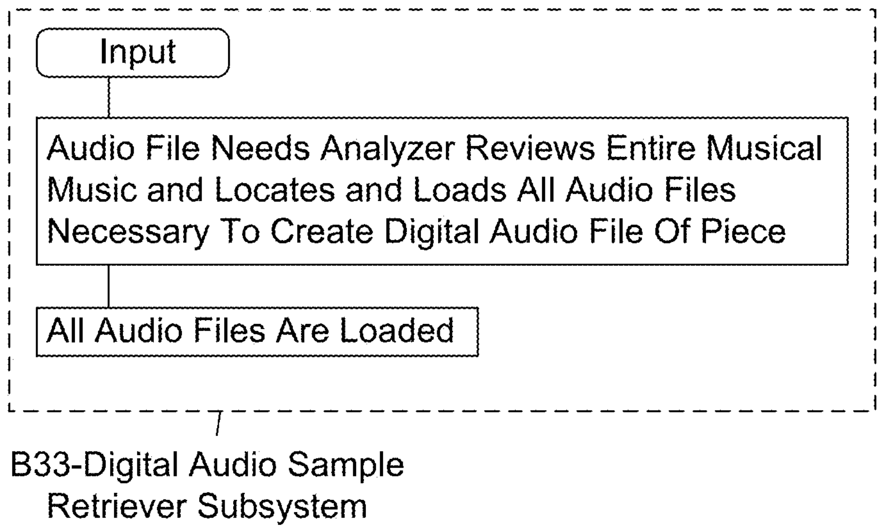
Figure 27N:
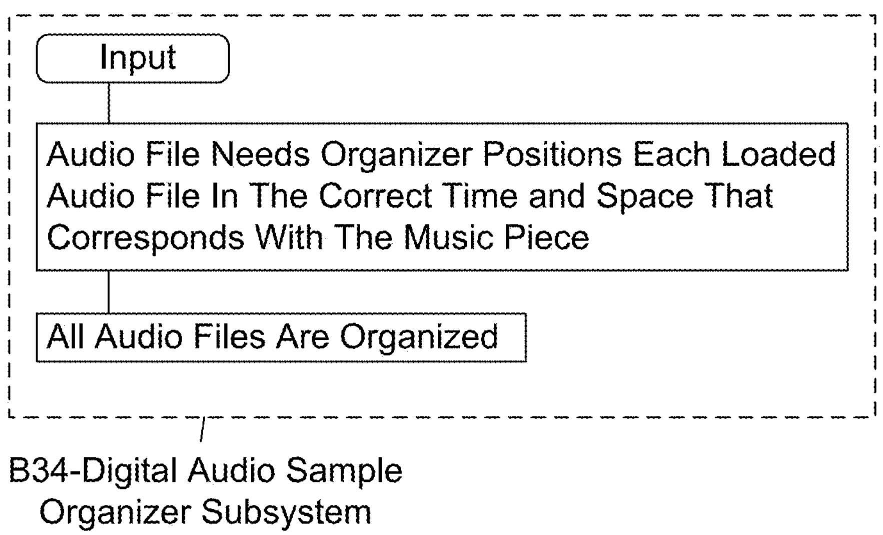
Figure 27R:
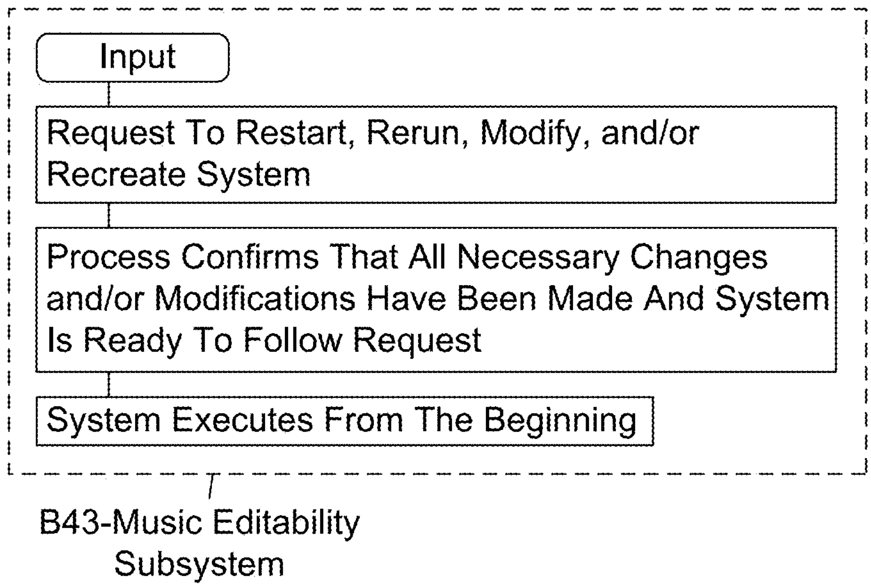
Figure 27S:
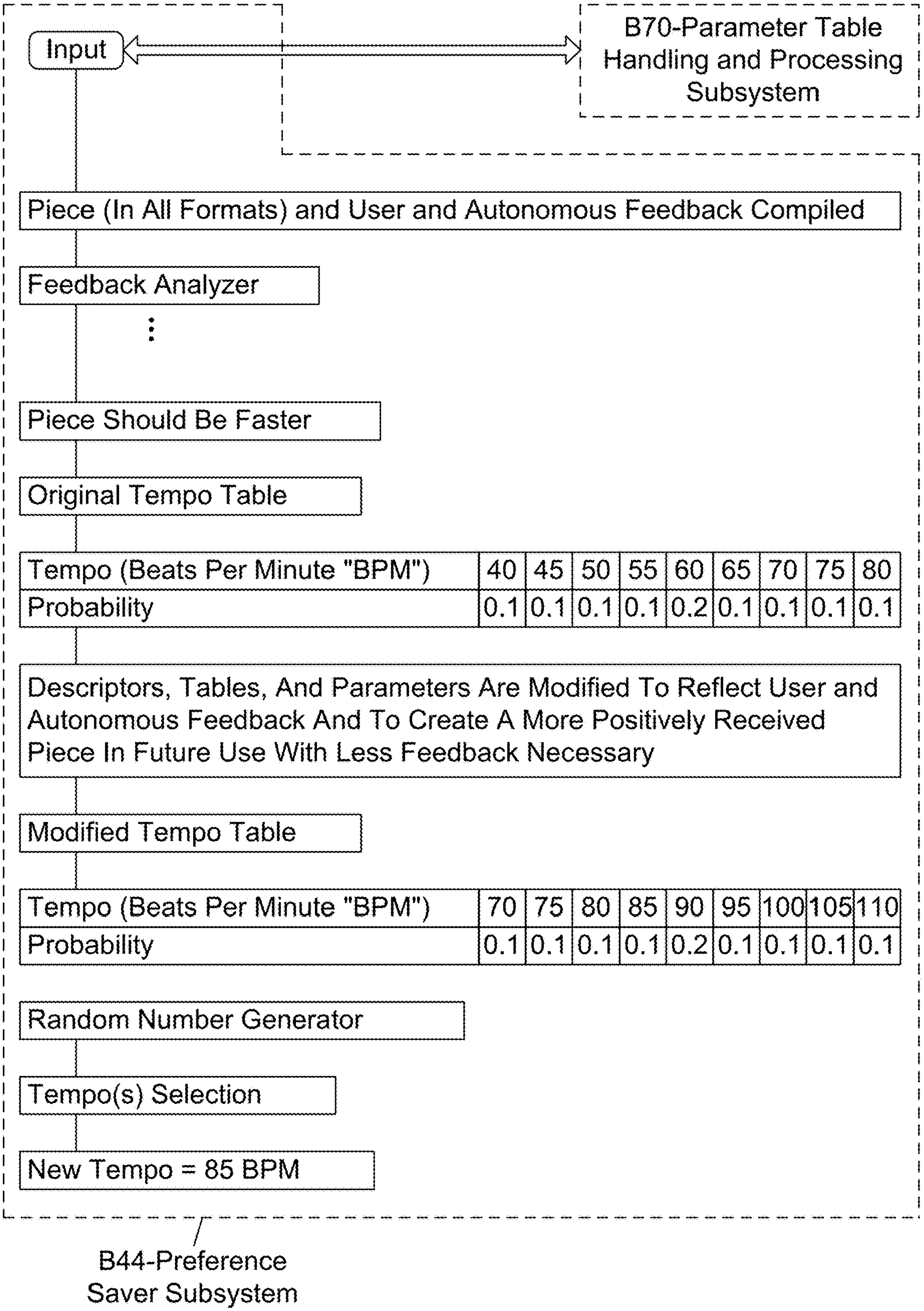
Figure 27T:
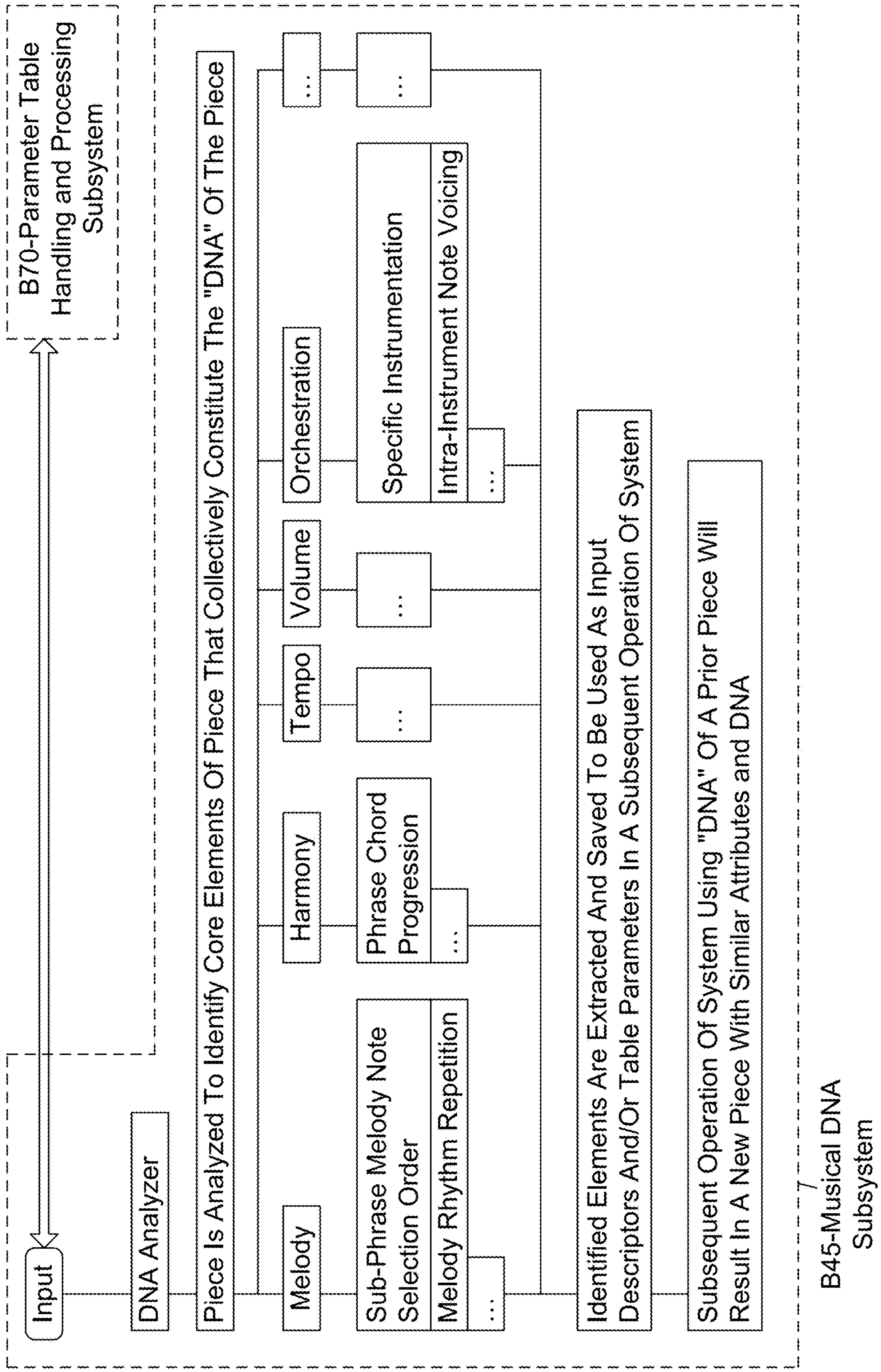
Figure 27U:
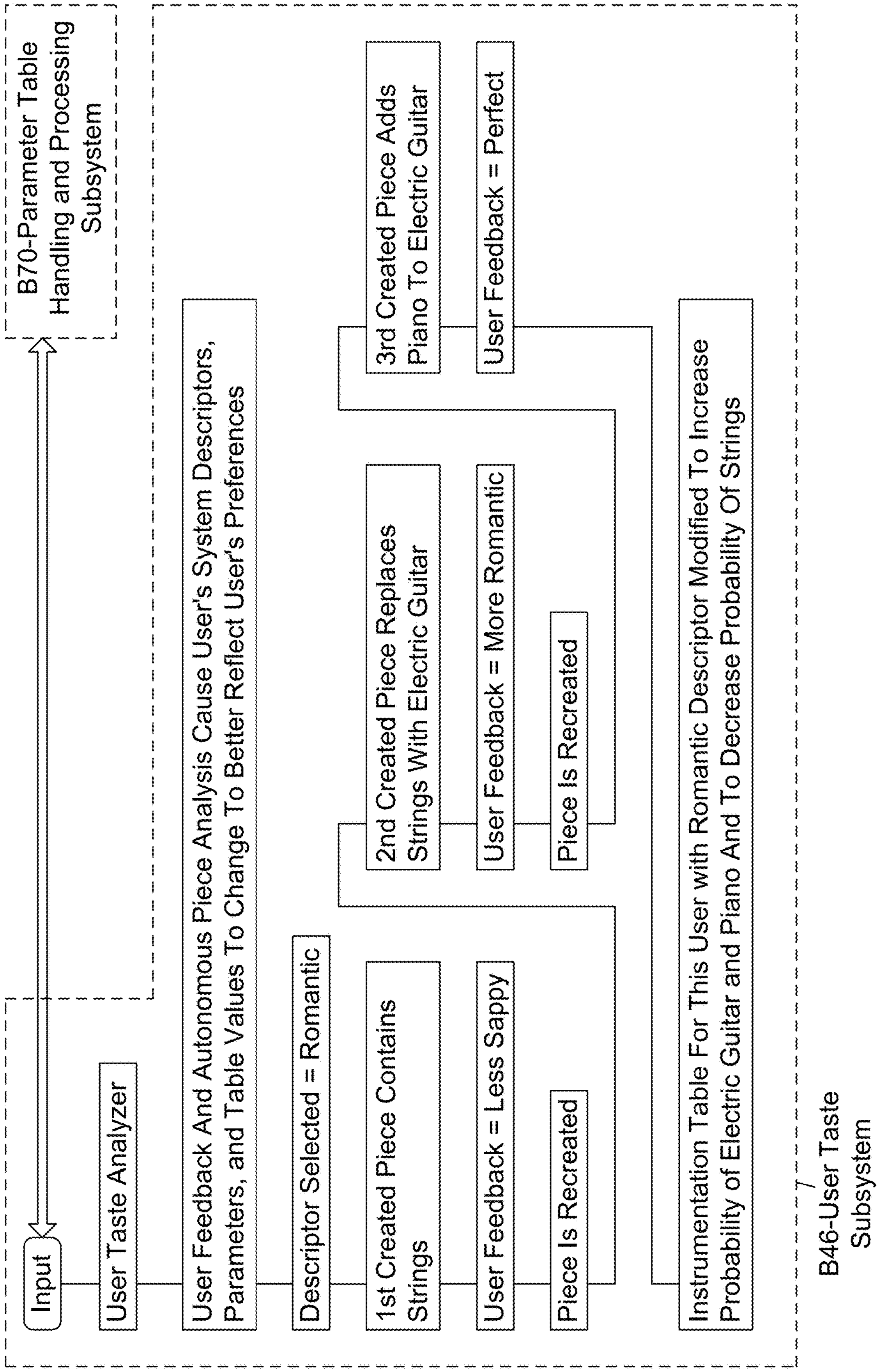

As shown in FIGS. 26L and 27M, the Melody Pitch Generation Subsystem A4 for generating a Melody Pitch for the piece of music being composed, comprises: the Initial Pitch Generation Subsystem B27; the Sub-Phrase Pitch Generation Subsystem B29; the Phrase Pitch Generation Subsystem B28; and the Pitch Octave Generation Subsystem B30.

As shown in FIG. 26M, the Orchestration Subsystem A5 for generating the Orchestration for the piece of music being composed comprises: the Orchestration Generation Subsystem B31.

As shown in FIG. 26M, the Controller Code Creation Subsystem A6 for creating Controller Code for the piece of music being composed comprises: the Controller Code Generation Subsystem B32.

As shown in FIGS. 26M and 26N, the Digital Piece Creation Subsystem A7 for creating the Digital Piece of music being composed comprises: the Digital Audio Sample Audio Retriever Subsystem B33; the Digital Audio Sample Organizer Subsystem B34; the Piece Consolidator Subsystem B35; the Piece Format Translator Subsystem B50; and the Piece Deliverer Subsystem B36.

As shown in FIGS. 26N, 26O and 26P, the Feedback and Learning Subsystem A8 for supporting the feedback and learning cycle of the system, comprises: the Feedback Subsystem B42; the Music Editability Subsystem B43; the Preference Saver Subsystem B44; the Musical kernel Subsystem B45; the User Taste Subsystem B46; the Population Taste Subsystem B47; the User Preference Subsystem B48; and the Population Preference Subsystem B49.

As shown in FIGS. 26N, 26O and 26P, the Feedback and Learning Subsystem A8 for supporting the feedback and learning cycle of the system, comprises: the Feedback Subsystem B42; the Music Editability Subsystem B43; the Preference Saver Subsystem B44; the Musical kernel Subsystem B45; the User Taste Subsystem B46; the Population Taste Subsystem B47; the User Preference Subsystem B48; and the Population Preference Subsystem B49. Having taken an overview of the subsystems employed in the system, it is appropriate at this juncture to describe, in greater detail, the input and output port relationships that exist among the subsystems, as clearly shown in FIGS. 26A through 26P.

As shown in FIGS. 26A through 26J, the system user provides inputs such as emotional, style and timing type musical experience descriptors to the GUI-Based Input Output Subsystem BO, typically using LCD touchscreen, keyboard or microphone speech-recognition interfaces, well known in the art. In turn, the various data signal outputs from the GUI-Based Input and Output Subsystem B0 are provided as input data signals to the Descriptor Parameter Capture Subsystems B1, the Parameter Transformation Engine Subsystem B51, the Style Parameter Capture Subsystem B37, and the Timing Parameter Capture Subsystem B40, as shown. The (Emotional) Descriptor Parameter Capture Subsystems B1 receives words, images and/or other representations of musical experience to be produced by the piece of music to be composed, and these captured emotion-type musical experience parameters are then stored preferably in a local data storage device (e.g. local database, DRAM, etc.) for subsequent transmission to other subsystems. The Style Parameter Capture Subsystems B17 receives words, images and/or other representations of musical experience to be produced by the piece of music to be composed, and these captured style-type musical experience parameters are then stored preferably in a local data storage device (e.g. local database, DRAM, etc.), as well, for subsequent transmission to other subsystems. In the event that the music spotting feature is enabled or accessed by the system user, and timing parameters are transmitted to the input subsystem B0, the Timing Parameter Capture Subsystem B40 will enable other subsystems (e.g. Subsystems A1, A2, etc.) to support such functionalities. The Parameter Transformation Engine Subsystems B51 receives words, images and/or other representations of musical experience parameters to be produced by the piece of music to be composed, and these emotion-type, style-type and timing-type musical experience parameters are transformed by the engine subsystem B51 to generate sets of probabilistic-based system operating parameter tables, based on the provided system user input, for subsequent distribution to and loading within respective subsystems, as will be described in greater technical detailer hereinafter, with reference to FIGS. 23B3A-27B3C and 27B4A-27B4E, in particular and other figures as well.

Having provided an overview of the subsystems employed in the system, it is appropriate at this juncture to describe, in greater detail, the input and output port relationships that exist among the subsystems, as clearly shown in FIGS. 26A through 26P.

Specification of Input and Output Port Connections Among Subsystems within the Input Subsystem B0

As shown in FIGS. 26A through 26J, the system user provides inputs such as emotional, style and timing type musical experience descriptors to the GUI-Based Input Output Subsystem BO, typically using LCD touchscreen, keyboard or microphone speech-recognition interfaces, well known in the art. In turn, the various data signal outputs from the GUI-Based Input and Output Subsystem B0, encoding the emotion and style musical descriptors and timing parameters, are provided as input data signals to the Descriptor Parameter Capture Subsystems B1, the Parameter Transformation Engine Subsystem B51, the Style Parameter Capture Subsystem B37, and the Timing Parameter Capture Subsystem B40, as shown.

As shown in FIGS. 26A through 26J, the (Emotional) Descriptor Parameter Capture Subsystem B1 receives words, images and/or other representations of musical experience to be produced by the piece of music to be composed, and these captured emotion-type musical experience parameters are then stored preferably in a local data storage device (e.g. local database, DRAM, etc.) for subsequent transmission to other subsystems.

As shown in FIGS. 26A through 26J, the Style Parameter Capture Subsystems B17 receives words, images and/or other representations of musical experience to be produced by the piece of music to be composed, and these captured style-type musical experience parameters are then stored preferably in a local data storage device (e.g. local database, DRAM, etc.), as well, for subsequent transmission to other subsystems.

In the event that the "music spotting" feature is enabled or accessed by the system user, and timing parameters are transmitted to the input subsystem B0, then the Timing Parameter Capture Subsystem B40 will enable other subsystems (e.g. Subsystems A1, A2, etc.) to support such functionalities.

As shown in FIGS. 26A through 26J, the Parameter Transformation Engine Subsystem B51 receives words, images and/or other representations of musical experience parameters, and timing parameters, to be reflected by the piece of music to be composed, and these emotion-type, style-type and timing-type musical experience parameters are automatically and transparently transformed by the parameter transformation engine subsystem B51 so as to generate, as outputs, sets of probabilistic-based system operating parameter tables, based on the provided system user input, which are subsequently distributed to and loaded within respective subsystems, as will be described in greater technical detailer hereinafter, with reference to FIGS. 27B3A-27B3C and 27B4A-27B4E, in particular and other figures as well.

Specification of Input and Output Port Connections Among Subsystems within the General Rhythm Generation Subsystem A1

As shown in FIGS. 26A through 26J, the General Rhythm Generation Subsystem A1 generates the General Rhythm for the piece of music to be composed.

As shown in FIGS. 26A through 26J, the data input ports of the User GUI-based Input Output Subsystem B0 can be realized by LCD touch-screen display panels, keyboards, microphones and various kinds of data input devices well known the art. As shown, the data output of the User GUI-based Input Output Subsystem B0 is connected to the data input ports of the (Emotion-type) Descriptor Parameter Capture Subsystem B1, the Parameter Transformation Engine Subsystem B51, the Style Parameter Capture Subsystem B37, and the Timing Parameter Capture Subsystem B40.

As shown in FIGS. 26A through 26P, the data input port of the Parameter Transformation Engine Subsystem B51 is connected to the output data port of the Population Taste Subsystem B47 and the data input port of the User Preference Subsystem B48, functioning a data feedback pathway.

As shown in FIGS. 26A through 26P, the data output port of the Parameter Transformation Engine B51 is connected to the data input ports of the (Emotion-Type) Descriptor Parameter Capture Subsystem B1, and the Style Parameter Capture Subsystem B37.

As shown in FIGS. 26A through 26F, the data output port of the Style Parameter Capture Subsystem B37 is connected to the data input port of the Instrumentation Subsystem B38 and the Sub-Phrase Length Generation Subsystem B15.

As shown in FIGS. 26A through 26G, the data output port of the Timing Parameter Capture Subsystem B40 is connected to the data input ports of the Timing Generation Subsystem B41 and the Length Generation Subsystem B2, the Tempo Generation Subsystem B3, the Meter Generation Subsystem B4, and the Key Generation Subsystem B5.

As shown in FIGS. 26A through 26G, the data output ports of the (Emotion-Type) Descriptor Parameter Capture Subsystem B1 and Timing Parameter Capture Subsystem B40 are connected to (i) the data input ports of the Length Generation Subsystem B2 for structure control, (ii) the data input ports of the Tempo Generation Subsystem B3 for tempo control, (iii) the data input ports of the Meter Generation Subsystem B4 for meter control, and (iv) the data input ports of the Key Generation Subsystem B5 for key control.

As shown in FIG. 26E, the data output ports of the Length Generation Subsystem B2 and the Tempo Generation Subsystem B3 are connected to the data input port of the Beat Calculator Subsystem B6.

As shown in FIGS. 26E through 26K, the data output ports of the Beat Calculator Subsystem B6 and the Meter Generation Subsystem B4 are connected to the input data ports of the Measure Calculator Subsystem B8.

As shown in FIGS. 26E, 26F, 26G and 26H, the output data port of the Measure Calculator B8 is connected to the data input ports of the Song Form Generation Subsystem B9, and also the Unique Sub-Phrase Generation Subsystem B14.

As shown in FIG. 26G, the output data port of the Key Generation Subsystem B5 is connected to the data input port of the Tonality Generation Subsystem B7.

As shown in FIGS. 26G and 26J, the data output port of the Tonality Generation Subsystem B7 is connected to the data input ports of the Initial General Rhythm Generation Subsystem B17, and also the Sub-Phrase Chord Progression Generation Subsystem B19.

As shown in FIGS. 26E1, 26H and 26I, the data output port of the Song Form Subsystem B9 is connected to the data input ports of the Sub-Phrase Length Generation Subsystem B15, the Chord Length Generation Subsystem B11, and Phrase Length Generation Subsystem B12.

As shown in FIGS. 26G, 26H, 26I and 26J, the data output port of the Sub-Phrase Length Generation Subsystem B15 is connected to the input data port of the Unique Sub-Phrase Generation Subsystem B14. As shown, the output data port of the Unique Sub-Phrase Generation Subsystem B14 is connected to the data input ports of the Number of Chords in Sub-Phrase Calculator Subsystem B16. As shown, the output data port of the Chord Length Generation Subsystem B11 is connected to the Number of Chords in Phrase Calculator Subsystem B13.

As shown in FIG. 26H, the data output port of the Number of Chords in Sub-Phrase Calculator Subsystem B16 is connected to the data input port of the Phrase Length Generation Subsystem B12.

As shown in FIGS. 26E, 26H, 26I and 26J, the data output port of the Phrase Length Generation Subsystem B12 is connected to the data input port of the Unique Phrase Generation Subsystem B10.

As shown in FIG. 26J, the data output port of the Unique Phrase Generation Subsystem B10 is connected to the data input port of the Number of Chords in Phrase Calculator Subsystem B13.

Specification of Input and Output Port Connections Among Subsystems within the General Pitch Generation Subsystem A2

As shown in FIGS. 26J and 26K, the General Pitch Generation Subsystem A2 generates chords for the piece of music being composed.

As shown in FIGS. 26G and 26J, the data output port of the Initial Chord Generation Subsystem B17 is connected to the data input port of the Sub-Phrase Chord Progression Generation Subsystem B19, which is also connected to the output data port of the Tonality Generation Subsystem B7.

As shown in FIG. 26J, the data output port of the Sub-Phrase Chord Progression Generation Subsystem B19 is connected to the data input port of the Phrase Chord Progression Generation Subsystem B18.

As shown in FIGS. 26J and 26K, the data output port of the Phrase Chord Progression Generation Subsystem B18 is connected to the data input port of the Chord Inversion Generation Subsystem B20.

Specification of Input and Output Port Connections Among Subsystems within the Melody Rhythm Generation Subsystem A3

As shown in FIGS. 26K and 26L, the Melody Rhythm Generation Subsystem A3 generates a melody rhythm for the piece of music being composed.

As shown in FIGS. 26J and 26K, the data output port of the Chord Inversion Generation Subsystem B20 is connected to the data input port of the Melody Sub-Phrase Length Generation Subsystem B18.

As shown in FIG. 26K, the data output port of the Chord Inversion Generation Subsystem B20 is connected to the data input port of the Melody Sub-Phrase Length Generation Subsystem B25.

As shown in FIG. 26K, the data output port of the Melody Sub-Phrase Length Generation Subsystem B25 is connected to the data input port of the Melody Sub-Phrase Generation Subsystem B24.

As shown in FIG. 26K, the data output port of the Melody Sub-Phrase Generation Subsystem B24 is connected to the data input port of the Melody Phrase Length Generation Subsystem B23.

As shown in FIG. 26K, the data output port of the Melody Phrase Length Generation Subsystem B23 is connected to the data input port of the Melody Unique Phrase Generation Subsystem B22.

As shown in FIGS. 26K and 26L, the data output port of the Melody Unique Phrase Generation Subsystem B22 is connected to the data input port of Melody Length Generation Subsystem B21.

As shown in 26L, the data output port of the Melody Length Generation Subsystem B21 is connected to the data input port of Melody Note Rhythm Generation Subsystem B26.

Specification of Input and Output Port Connections Among Subsystems within the Melody Pitch Generation Subsystem A4

As shown in FIGS. 26L through 26N, the Melody Pitch Generation Subsystem A4 generates a melody pitch for the piece of music being composed.

As shown in FIG. 26L, the data output port of the Melody Note Rhythm Generation Subsystem B26 is connected to the data input port of the Initial Pitch Generation Subsystem B27.

As shown in FIG. 26L, the data output port of the Initial Pitch Generation Subsystem B27 is connected to the data input port of the Sub-Phrase Pitch Generation Subsystem B29.

As shown in FIG. 26L, the data output port of the Sub-Phrase Pitch Generation Subsystem B29 is connected to the data input port of the Phrase Pitch Generation Subsystem B28.

As shown in FIGS. 26L and 26M, the data output port of the Phrase Pitch Generation Subsystem B28 is connected to the data input port of the Pitch Octave Generation Subsystem B30.

Specification of Input and Output Port Connections Among Subsystems within the Orchestration Subsystem A5

As shown in FIG. 26M, the Orchestration Subsystem A5 generates an orchestration for the piece of music being composed.

As shown in FIGS. 26D and 26M, the data output ports of the Pitch Octave Generation Subsystem B30 and the Instrument Selector Subsystem B39 are connected to the data input ports of the Orchestration Generation Subsystem B31.

As shown in FIG. 26M, the data output port of the Orchestration Generation Subsystem B31 is connected to the data input port of the Controller Code Generation Subsystem B32.

Specification of Input and Output Port Connections Among Subsystems within the Controller Code Creation Subsystem A6

As shown in FIG. 26M, the Controller Code Creation Subsystem A6 creates controller code for the piece of music being composed.

As shown in FIG. 26M, the data output port of the Orchestration Generation Subsystem B31 is connected to the data input port of the Controller Code Generation Subsystem B32.

Specification of Input and Output Port Connections Among Subsystems within the Digital Piece Creation Subsystem A7

As shown in FIGS. 26M and 26N, the Digital Piece Creation Subsystem A7 creates the digital piece of music.

As shown in FIG. 26M, the data output port of the Controller Code Generation Subsystem B32 is connected to the data input port of the Digital Audio Sample Audio Retriever Subsystem B33.

As shown in FIGS. 26M and 26N, the data output port of the Digital Audio Sample Audio Retriever Subsystem B33 is connected to the data input port of the Digital Audio Sample Organizer Subsystem B34.

As shown in FIG. 26N, the data output port of the Digital Audio Sample Organizer Subsystem B34 is connected to the data input port of the Piece Consolidator Subsystem B35.

As shown in FIG. 26N, the data output port of the Piece Consolidator Subsystem B35 is connected to the data input port of the Piece Format Translator Subsystem B50.

As shown in FIG. 26N, the data output port of the Piece Format Translator Subsystem B50 is connected to the data input ports of the Piece Deliverer Subsystem B36 and also the Feedback Subsystem B42.

Specification of Input and Output Port Connections Among Subsystems within the Feedback and Learning Subsystem A8

As shown in FIGS. 26N, 26O and 26P, the Feedback and Learning Subsystem A8 supports the feedback and learning cycle of the system.

As shown in FIG. 26N, the data output port of the Piece Deliverer Subsystem B36 is connected to the data input port of the Feedback Subsystem B42.

As shown in FIGS. 26N and 26O, the data output port of the Feedback Subsystem B42 is connected to the data input port of the Music Editability Subsystem B43.

As shown in FIG. 26O, the data output port of the Music Editability Subsystem B43 is connected to the data input port of the Preference Saver Subsystem B44.

As shown in FIG. 26O, the data output port of the Preference Saver Subsystem B44 is connected to the data input port of the Musical Kernel (DNA) Subsystem B45.

As shown in FIG. 26O, the data output port of the Musical Kernel (DNA) Subsystem B45 is connected to the data input port of the User Taste Subsystem B46.

As shown in FIG. 26O, the data output port of the User Taste Subsystem B46 is connected to the data input port of the Population Taste Subsystem B47

As shown in FIGS. 26O and 26P, the data output port of the Population Taste Subsystem B47 is connected to the data input ports of the User Preference Subsystem B48 and the Population Preference Subsystem B49.

As shown in FIGS. 26A through 26P, the data output ports of the Music Editability Subsystem B43, the Preference Saver Subsystem B44, the Musical Kernel (DNA) Subsystem B45, the User Taste Subsystem B46 and the Population Taster Subsystem B47 are provided to the data input ports of the User Preference Subsystem B48 and the Population Preference Subsystem B49, as well as the Parameter Transformation Engine Subsystem B51, as part of a first data feedback loop, shown in FIGS. 26A through 26P.

As shown in FIGS. 26N through 26P, the data output ports of the Music Editability Subsystem B43, the Preference Saver Subsystem B44, the Musical Kernel (DNA) Subsystem B45, the User Taste Subsystem B46 and the Population Taster Subsystem B47, and the User Preference Subsystem B48 and the Population Preference Subsystem B49, are provided to the data input ports of the (Emotion-Type) Descriptor Parameter Capture Subsystem B1, the Style Descriptor Capture Subsystem B37 and the Timing Parameter Capture Subsystem B40, as part of a second data feedback loop, shown in FIGS. 26A through 26P.

Specification of Lower (B) Level Subsystems Implementing Higher (A) Level Subsystems with the Automated Music Composition and Generation Systems of the Present Invention, and Quick Identification of Parameter Tables Employed in Each B-Level Subsystem Referring to FIGS. 23B3A, 27B3B and 27B3C, there is shown a schematic representation illustrating how system user supplied sets of emotion, style and timing/spatial parameters are mapped, via the Parameter Transformation Engine Subsystem B51, into sets of system operating parameters stored in parameter tables that are loaded within respective subsystems across the system of the present invention. Also, the schematic representation illustrated in FIGS. 27B4A, 27B4B, 27B4C, 27B4D and 27B4E, also provides a map that illustrates which lower B-level subsystems are used to implement particular higher A-level subsystems within the system architecture, and which parameter tables are employed within which B-level subsystems within the system. These subsystems and parameter tables will be specified in greater technical detail hereinafter.

Specification of the Probability-Based System Operating Parameters Maintained within the Programmed Tables of the Various Subsystems within the Automated Music Composition and Generation System of the Present Invention The probability-based system operating parameters (SOPs) maintained within the programmed tables of the various subsystems specified in FIGS. 28A through 28S play important roles within the Automated Music Composition And Generation Systems of the present invention. It is appropriate at this juncture to describe, in greater detail these, (i) these system operating parameter (SOP) tables, (ii) the information elements they contain, (iii) the music-theoretic objects they represent, (iv) the functions they perform within their respective subsystems, and (v) how such information objects are used within the subsystems for the intended purposes.

Specification of the Tempo Generation Table within the Tempo Generation Subsystem (B3)

FIG. 28A shows the probability-based parameter table maintained in the tempo generation subsystem (B3) of the Automated Music Composition and Generation Engine of the present invention. As shown in FIG. 28A, for each emotion-type musical experience descriptor supported by the system and selected by the system user (e.g. HAPPY, SAD, ANGRY, FEARFUL, LOVE selected from the emotion descriptor table in FIGS. 32A through 32F), a probability measure is provided for each tempo (beats per minute) supported by the system, and this probability-based parameter table is used during the automated music composition and generation process of the present invention.

The primary function of the tempo generation table is to provide a framework to determine the tempo(s) of a musical piece, section, phrase, or other structure. The tempo generation table is used by loading a proper set of parameters into the various subsystems determined by subsystems B1, B37, B40, and B41 and, through a guided stochastic process illustrated in FIG. 27G, the subsystem makes a determination(s) as to what value (s) and/or parameter(s) in the table to use.

Specification of the Length Generation Table within the Length Generation Subsystem (B2)

FIG. 28B shows the probability-based parameter table maintained in the length generation subsystem (B2) of the Automated Music Composition and Generation Engine of the present invention. As shown in FIG. 28B, for each emotion-type musical experience descriptor supported by the system and selected by the system user (e.g. HAPPY, SAD, ANGRY, FEARFUL, LOVE selected from the emotion descriptor table in FIGS. 32A through 32F, a probability measure is provided for each length (seconds) supported by the system, and this probability-based parameter table is used during the automated music composition and generation process of the present invention.

The primary function of the length generation table is to provide a framework to determine the length(s) of a musical piece, section, phrase, or other structure. The length generation table is used by loading a proper set of parameters into the various subsystems determined by subsystems B1, B37, B40, and B41 and, through a guided stochastic process illustrated in FIG. 27F, the subsystem B2 makes a determination(s) as to what value(s) and/or parameter(s) to select from the parameter table and use during the automated music composition and generation process of the present invention.

Specification of the Meter Generation Table within the Meter Generation Subsystem (B4)

FIG. 28C shows the probability-based meter generation table maintained in the Meter Generation Subsystem (B4) of the Automated Music Composition and Generation Engine of the present invention. As shown in FIG. 28C, for each emotion-type musical experience descriptor supported by the system and selected by the system user (e.g. HAPPY, SAD, ANGRY, FEARFUL, LOVE selected from the emotion descriptor table in FIGS. 32A through 32F), a probability measure is provided for each meter supported by the system, and this probability-based parameter table is used during the automated music composition and generation process of the present invention.

The primary function of the meter generation table is to provide a framework to determine the meter(s) of a musical piece, section, phrase, or other structure. The meter generation table is used by loading a proper set of parameters into the various subsystems determined by subsystems B1, B37, B40, and B41 and, through a guided stochastic process illustrated in FIG. 27H, the subsystem B4 makes a determination(s) as to what value(s) and/or parameter(s) to select from the parameter table and use during the automated music composition and generation process of the present invention.

Like all system operating parameter (SOP) tables, the Parameter Transformation Engine Subsystem B51 generates probability-weighted tempo parameter tables for all of the possible musical experience descriptors selected at the system user input subsystem B0. Taking into consideration these inputs, this subsystem B4 creates the meter(s) of the piece. For example, a piece with an input descriptor of "Happy," a length of thirty seconds, and a tempo of sixty beats per minute might have a one third probability of using a meter of 4/4 (four quarter notes per measure), a one third probability of using a meter of 6/8(six eighth notes per measure), and a one third probability of using a tempo of 2/4(two quarter notes per measure). If there are multiple sections, music timing parameters, and/or starts and stops in the music, multiple meters might be selected.

There is a strong relationship between Emotion and style descriptors and meter. For example, a waltz is often played with a meter of 3/4, whereas a march is often played with a meter of 2/4. The system's meter tables are reflections of the cultural connection between a musical experience and/or style and the meter in which the material is delivered.

Further, meter(s) of the musical piece may be unrelated to the emotion and style descriptor inputs and solely in existence to line up the measures and/or beats of the music with certain timing requests. For example, if a piece of music a certain tempo needs to accent a moment in the piece that would otherwise occur on halfway between the fourth beat of a 4/4 measure and the first beat of the next 4/4 measure, an change in the meter of a single measure preceding the desired accent to 7/8 would cause the accent to occur squarely on the first beat of the measure instead, which would then lend itself to a more musical accent in line with the downbeat of the measure.

Specification of the Key Generation Table within the Key Generation Subsystem (B5)

FIG. 28D shows the probability-based parameter table maintained in the Key Generation Subsystem (B5) of the Automated Music Composition and Generation Engine of the present invention. As shown in FIG. 28D, for each emotion-type musical experience descriptor supported by the system and selected by the system user, a probability measure is provided for each key supported by the system, and this probability-based parameter table is used during the automated music composition and generation process of the present invention.

The primary function of the key generation table is to provide a framework to determine the key(s) of a musical piece, section, phrase, or other structure. The key generation table is used by loading a proper set of parameters into the various subsystems determined by subsystems B1, B37, B40, and B41 and, through a guided stochastic process illustrated in FIG. 27I, the subsystem B5 makes a determination(s) as to what value(s) and/or parameter(s) to select from the parameter table and use during the automated music composition and generation process of the present invention.

Specification of the Tonality Generation Table within the Tonality Generation Subsystem (B7)

FIG. 28E shows the probability-based parameter table maintained in the Tonality Generation Subsystem (B7) of the Automated Music Composition and Generation Engine of the present invention. As shown in FIG. 28E, for each emotion-type musical experience descriptor supported by the system and selected by the system user, a probability measure is provided for each tonality (i.e. Major, Minor-Natural, Minor-Harmonic, Minor-Melodic, Dorian, Phrygian, Lydian, Mixolydian, Aeolian, Locrian) supported by the system, and this probability-based parameter table is used during the automated music composition and generation process of the present invention.

The primary function of the tonality generation table is to provide a framework to determine the tonality(s) of a musical piece, section, phrase, or other structure. The tonality generation table is used by loading a proper set of parameters into the various subsystems determined by subsystems B1, B37, B40, and B41 and, through a guided stochastic process illustrated in FIG. 27L, the subsystem B7 makes a determination(s) as to what value(s) and/or parameter(s) to select from the parameter table and use during the automated music composition and generation process of the present invention.

Specification of the Parameter Tables within the Song Form Generation Subsystem (B9)

FIG. 28F shows the probability-based parameter tables maintained in the Song Form Generation Subsystem (B9) of the Automated Music Composition and Generation Engine of the present invention. As shown in FIG. 28F, for each emotion-type musical experience descriptor supported by the system and selected by the system user, a probability measure is provided for each song form (i.e. A, AA, AB, AAA, ABA, ABC) supported by the system, as well as for each sub-phrase form (a, aa, ab, aaa, aba, abc), and these probability-based parameter tables are used during the automated music composition and generation process of the present invention.

The primary function of the song form generation table is to provide a framework to determine the song form(s) of a musical piece, section, phrase, or other structure. The song form generation table is used by loading a proper set of parameters into the various subsystems determined by subsystems B1, B37, B40, and B41 and, through a guided stochastic process illustrated in FIGS. 27M1 and 27M2, the subsystem B9 makes a determination(s) as to what value(s) and/or parameter(s) to select from the parameter table and use during the automated music composition and generation process of the present invention.

The primary function of the sub-phrase generation table is to provide a framework to determine the sub-phrase(s) of a musical piece, section, phrase, or other structure. The sub-phrase generation table is used by loading a proper set of parameters into the various subsystems determined by subsystems B1, B37, B40, and B41 and, through a guided stochastic process illustrated in FIGS. 27M1 and 27M2, the subsystem B9 makes a determination(s) as to what value(s) and/or parameter(s) to select from the parameter table and use during the automated music composition and generation process of the present invention.

Specification of the Parameter Table within the Sub-Phrase Length Generation Subsystem (B15)

FIG. 28G shows the probability-based parameter table maintained in the Sub-Phrase Length Generation Subsystem (B15) of the Automated Music Composition and Generation Engine of the present invention. As shown in FIG. 28G, for each emotion-type musical experience descriptor supported by the system, and selected by the system user, a probability measure is provided for each sub-phrase length (i.e. measures) supported by the system, and this probability-based parameter table is used during the automated music composition and generation process of the present invention.

The primary function of the sub-phrase length generation table provides a framework to determine the length(s) or duration(s) of a musical piece, section, phrase, or other structure. The sub-phrase length generation table is used by loading a proper set of parameters into the various subsystems determined by subsystems B1, B37, B40, and B41 and, through a guided stochastic process illustrated in FIG. 27N, the subsystem B15 makes a determination(s) as to what value(s) and/or parameter(s) to select from the parameter table and use during the automated music composition and generation process of the present invention.

Specification of the Parameter Tables within the Chord Length Generation Subsystem (B11)

FIG. 28H shows the probability-based parameter tables maintained in the Chord Length Generation Subsystem (B11) of the Automated Music Composition and Generation Engine of the present invention. As shown in FIG. 28H, for each emotion-type musical experience descriptor supported by the system and selected by the system user, a probability measure is provided for each initial chord length and second chord lengths supported by the system, and these probability-based parameter tables are used during the automated music composition and generation process of the present invention.

The primary function of the initial chord length table is to provide a framework to determine the duration of an initial chord(s) or prevailing harmony(s) in a musical piece, section, phrase, or other structure. The initial chord length table is used by loading a proper set of parameters as determined by B1, B37, B40, and B41 and, through a guided stochastic process, the subsystem makes a determination(s) as to what value (s) and/or parameter(s) in the table to use.

The primary function of the second chord length table is to provide a framework to determine the duration of a non-initial chord(s) or prevailing harmony(s) in a musical piece, section, phrase, or other structure. The second chord length table is used by loading a proper set of parameters into the various subsystems determined by subsystems B1, B37, B40, and B41 and, through a guided stochastic process illustrated in FIGS. 28O1, 28O2 and 28O3, the subsystem B11 makes a determination(s) as to what value(s) and/or parameter(s) to select from the parameter table and use during the automated music composition and generation process of the present invention.

Specification of the Parameter Tables within the General Rhythm Generation Subsystem (B17)

FIG. 28I shows the probability-based parameter tables maintained in the General Rhythm Generation Subsystem (B17) of the Automated Music Composition and Generation Engine of the present invention. As shown in FIG. 28I, for each emotion-type musical experience descriptor supported by the system and selected by the system user, a probability measure is provided for each root note (i.e. indicated by musical letter) supported by the system, and these probability-based parameter tables are used during the automated music composition and generation process of the present invention.

The primary function of the initial chord root table is to provide a framework to determine the root note of the initial chord(s) of a piece, section, phrase, or other similar structure. The initial chord root table is used by loading a proper set of parameters into the various subsystems determined by subsystems B1, B5, B7, and B37, and, through a guided stochastic process, the subsystem B17 makes a determination(s) as to what value(s) and/or parameter(s) to select from the parameter table and use during the automated music composition and generation process of the present invention.

The primary function of the chord function table is to provide a framework to determine to musical function of a chord or chords. The chord function table is used by loading a proper set of parameters as determined by B1, B5, B7, and B37, and, through a guided stochastic process illustrated in FIG. 27U, the subsystem B17 makes a determination(s) as to what value(s) and/or parameter(s) to select from the parameter table and use during the automated music composition and generation process of the present invention.

Specification of the Parameter Tables within the Sub-Phrase Chord Progression Generation Subsystem (B19)

FIGS. 28J1 and 28J2 shows the probability-based parameter tables maintained in the Sub-Phrase Chord Progression Generation Subsystem (B19) of the Automated Music Composition and Generation Engine of the present invention. As shown in FIGS. 28J1 and 28J2, for each emotion-type musical experience descriptor supported by the system and selected by the system user, a probability measure is provided for each original chord root (i.e. indicated by musical letter) and upcoming beat in the measure supported by the system, and these probability-based parameter tables are used during the automated music composition and generation process of the present invention.

The primary function of the chord function root modifier table is to provide a framework to connect, in a causal manner, future chord root note determination(s)s to the chord function(s) being presently determined. The chord function root modifier table is used by loading a proper set of parameters into the various subsystems determined by subsystems B1, B5, B7, and B37 and, through a guided stochastic process, the subsystem B19 makes a determination(s) as to what value(s) and/or parameter(s) to select from the parameter table and use during the automated music composition and generation process of the present invention.

The primary function of the current chord function is the same as the chord function table. The current chord function table is the same as the chord function table.

The primary function of the beat root modifier table is to provide a framework to connect, in a causal manner, future chord root note determination(s)s to the arrangement in time of the chord root(s) and function(s) being presently determined. The beat root modifier table is used by loading a proper set of parameters into the various subsystems determined by subsystems B1, B37, B40, and B41 and, through a guided stochastic process illustrated in FIGS. 27V1, 27V2 and 27V3, the subsystem B19 makes a determination(s) as to what value(s) and/or parameter(s) to select from the parameter table and use during the automated music composition and generation process of the present invention.

Specification of the Parameter Tables within the Chord Inversion Generation Subsystem (B20)

FIG. 28K shows the probability-based parameter tables maintained in the Chord Inversion Generation Subsystem (B20) of the Automated Music Composition and Generation Engine of the present invention. As shown in FIG. 28K, for each emotion-type musical experience descriptor supported by the system and selected by the system user, a probability measure is provided for each inversion and original chord root (i.e. indicated by musical letter) supported by the system, and these probability-based parameter tables are used during the automated music composition and generation process of the present invention.

The primary function of the initial chord inversion table is to provide a framework to determine the inversion of the initial chord(s) of a piece, section, phrase, or other similar structure. The initial chord inversion table is used by loading a proper set of parameters as determined by B1, B37, B40, and B41 and, through a guided stochastic process, the subsystem B20 makes a determination(s) as to what value(s) and/or parameter(s) to select from the parameter table and use during the automated music composition and generation process of the present invention.

The primary function of the chord inversion table is to provide a framework to determine the inversion of the non-initial chord(s) of a piece, section, phrase, or other similar structure. The chord inversion table is used by loading a proper set of parameters into the various subsystems determined by subsystems B1, B37, B40, and B41 and, through a guided stochastic process illustrated in FIGS. 27X1, 27X2 and 27X3, the subsystem B20 makes a determination(s) as to what value(s) and/or parameter(s) to select from the parameter table and use during the automated music composition and generation process of the present invention.

Specification of the Parameter Tables within the Melody Sub-Phrase Length Progression Generation Subsystem (B25)

FIG. 28L1 shows the probability-based parameter table maintained in the melody sub-phrase length progression generation subsystem (B25) of the Automated Music Composition and Generation Engine and System of the present invention. As shown in FIG. 28L1, for each emotion-type musical experience descriptor supported by the system, configured for the exemplary emotion-type musical experience descriptor—HAPPY—specified in the emotion descriptor table in FIGS. 32A through 32F, a probability measure is provided for each number of ¼ notes the melody starts into the sub-phrase that are supported by the system, and this probability-based parameter table is used during the automated music composition and generation process of the present invention.

The primary function of the melody length table is to provide a framework to determine the length(s) and/or rhythmic value(s) of a musical piece, section, phrase, or other structure. The melody length table is used by loading a proper set of parameters into the various subsystems determined by subsystems B1, B37, B40, and B41 and, through a guided stochastic process illustrated in FIG. 27Y, the subsystem B25 makes a determination(s) as to what value(s) and/or parameter(s) to select from the parameter table and use during the automated music composition and generation process of the present invention.

Specification of the Parameter Tables within the Melody Sub-Phrase Generation Subsystem (B24)

FIG. 28L2 shows a schematic representation of probability-based parameter tables maintained in the Melody Sub-Phrase Length Generation Subsystem (B24) of the Automated Music Composition and Generation Engine of the present invention. As shown in FIG. 28L2, for each emotion-type musical experience descriptor supported by the system and selected by the system user, a probability measure is provided for each ¼ into the sub-phrase supported by the system, and this probability-based parameter table is used during the automated music composition and generation process of the present invention.

The primary function of the sub-phrase melody placement table is to provide a framework to determine the position(s) in time of a melody or other musical event. The sub-phrase melody placement table is used by loading a proper set of parameters into the various subsystems determined by subsystems B1, B37, B40, and B41 and, through a guided stochastic process illustrated in FIGS. 27Z1 and 27Z2, the subsystem B24 makes a determination(s) as to what value(s) and/or parameter(s) to select from the parameter table and use during the automated music composition and generation process of the present invention.

Specification of the Parameter Tables within the Melody Note Rhythm Generation Subsystem (B26)

FIG. 28M shows the probability-based parameter tables maintained in the Melody Note Rhythm Generation Subsystem (B26) of the Automated Music Composition and Generation Engine of the present invention. As shown in FIG. 28M, for each emotion-type musical experience descriptor supported by the system and selected by the system user, a probability measure is provided for each initial note length and second chord lengths supported by the system, and these probability-based parameter tables are used during the automated music composition and generation process of the present invention.

The primary function of the initial note length table is to provide a framework to determine the duration of an initial note(s) in a musical piece, section, phrase, or other structure. The initial note length table is used by loading a proper set of parameters into the various subsystems determined by subsystems B1, B37, B40, and B41 and, through a guided stochastic process illustrated in FIGS. 28DD1, 28DD2 and 28DD3, the subsystem B26 makes a determination(s) as to what value(s) and/or parameter(s) to select from the parameter table and use during the automated music composition and generation process of the present invention.

Specification of the Parameter Tables within the Initial Pitch Generation Subsystem (B27)

FIG. 28N shows the probability-based parameter table maintained in the Initial Pitch Generation Subsystem (B27) of the Automated Music Composition and Generation Engine of the present invention. As shown in FIG. 28N, for each emotion-type musical experience descriptor supported by the system and selected by the system user, a probability measure is provided for each note (i.e. indicated by musical letter) supported by the system, and this probability-based parameter table is used during the automated music composition and generation process of the present invention.

The primary function of the initial melody table is to provide a framework to determine the pitch(es) of the initial melody(s) and/or melodic material(s) of a musical piece, section, phrase, or other structure. The melody length table is used by loading a proper set of parameters into the various subsystems determined by subsystems B1, B5, B7, and B37 and, through a guided stochastic process illustrated in FIG. 27EE, the subsystem B27 makes a determination(s) as to what value(s) and/or parameter(s) to select from the parameter table and use during the automated music composition and generation process of the present invention.

Specification of the Parameter Tables within the Sub-Phrase Pitch Generation Subsystem (B29)

FIGS. 28O1, 28O2 and 28O3 shows the four probability-based system operating parameter (SOP) tables maintained in the Sub-Phrase Pitch Generation Subsystem (B29) of the Automated Music Composition and Generation Engine of the present invention. As shown in FIGS. 28O1, 28O2 and 28O3, for each emotion-type musical experience descriptor supported by the system and selected by the system user, a probability measure is provided for each original note (i.e. indicated by musical letter) supported by the system, and leap reversal, and these probability-based parameter tables are used during the automated music composition and generation process of the present invention.

The primary function of the melody note table is to provide a framework to determine the pitch(es) of a melody(s) and/or melodic material(s) of a musical piece, section, phrase, or other structure. The melody note table is used by loading a proper set of parameters into the various subsystems determined by subsystems B1, B5, B7, and B37 and, through a guided stochastic process illustrated in FIGS. 27FF1, 27FF2 and 27FF3, the subsystem B29 makes a determination(s) as to what value(s) and/or parameter(s) to select from the parameter table and use during the automated music composition and generation process of the present invention.

The primary function of the chord modifier table is to provide a framework to influence the pitch(es) of a melody(s) and/or melodic material(s) of a musical piece, section, phrase, or other structure. The melody note table is used by loading a proper set of parameters into the various subsystems determined by subsystems B1, B5, B7, and B37 and, through a guided stochastic process illustrated in FIGS. 27FF1, 27FF2 and 27FF3, the subsystem B29 makes a determination(s) as to what value(s) and/or parameter(s) to select from the parameter table and use during the automated music composition and generation process of the present invention.

The primary function of the leap reversal modifier table is to provide a framework to influence the pitch(es) of a melody(s) and/or melodic material(s) of a musical piece, section, phrase, or other structure. The leap reversal modifier table is used by loading a proper set of parameters into the various subsystems determined by subsystems B1 and B37 and, through a guided stochastic process illustrated in FIGS. 27FF1, 27FF2 and 27FF3, the subsystem B29 makes a determination(s) as to what value(s) and/or parameter(s) to select from the parameter table and use during the automated music composition and generation process of the present invention.

The primary function of the leap incentive modifier table to provide a framework to influence the pitch(es) of a melody(s) and/or melodic material(s) of a musical piece, section, phrase, or other structure. The leap incentive modifier table is used by loading a proper set of parameters into the various subsystems determined by subsystems B1 and B37 and, through a guided stochastic process illustrated in FIGS. 27FF1, 27FF2 and 27FF3, the subsystem B29 makes a determination(s) as to what value(s) and/or parameter(s) to select from the parameter table and use during the automated music composition and generation process of the present invention.

Specification of the Parameter Tables within the Pitch Octave Generation Subsystem (B30)

FIG. 28P shows the probability-based parameter tables maintained in the Pitch Octave Generation Subsystem (B30) of the Automated Music Composition and Generation Engine of the present invention. As shown in FIG. 28P, for each emotion-type musical experience descriptor supported by the system and selected by the system user, a set of probability measures are provided for used during the automated music composition and generation process of the present invention.

The primary function of the melody note octave table is to provide a framework to determine the specific frequency(s) of a note(s) in a musical piece, section, phrase, or other structure. The melody note octave table is used by loading a proper set of parameters into the various subsystems determined by subsystems B1, B37, B40, and B41 and, through a guided stochastic process illustrated in FIGS. 27HH1 and 27HH2, the subsystem B30 makes a determination(s) as to what value(s) and/or parameter(s) to select from the parameter table and use during the automated music composition and generation process of the present invention.

Specification of the Parameter Tables within the Instrument Subsystem (B38)

FIGS. 28Q1A and 28Q1B show the probability-based instrument table maintained in the Instrument Subsystem (B38) of the Automated Music Composition and Generation Engine of the present invention. As shown in FIGS. 28Q1A and 28Q1B, for each emotion-type musical experience descriptor supported by the system and selected by the system user, a probability measure is provided for each instrument supported by the system, and these probability-based parameter tables are used during the automated music composition and generation process of the present invention.

The primary function of the instrument table is to provide a framework for storing a local library of instruments, from which the Instrument Selector Subsystem B39 can make selections during the subsequent stage of the musical composition process. There are no guided stochastic processes within subsystem B38, nor any determination(s) as to what value(s) and/or parameter(s) should be select from the parameter table and use during the automated music composition and generation process of the present invention. Such decisions take place within the Instrument Selector Subsystem B39.

Specification of the Parameter Tables within the Instrument Selector Subsystem (B39)

FIGS. 28Q2A and 28Q2B show the probability-based instrument section table maintained in the Instrument Selector Subsystem (B39) of the Automated Music Composition and Generation Engine of the present invention. As shown in FIGS. 28Q 1A and 28Q1B, for each emotion-type musical experience descriptor supported by the system and selected by the system user, a probability measure is provided for each instrument supported by the system, and these probability-based parameter tables are used during the automated music composition and generation process of the present invention.

The primary function of the instrument selection table is to provide a framework to determine the instrument or instruments to be used in the musical piece, section, phrase or other structure. The instrument selection table is used by loading a proper set of parameters into the various subsystems determined by subsystems B1, B37, B40, and B41 and, through a guided stochastic process illustrated in FIGS. 27JJ1 and 27JJ2, the subsystem B39 makes a determination(s) as to what value(s) and/or parameter(s) to select from the parameter table and use during the automated music composition and generation process of the present invention.

Specification of the Parameter Tables within the Orchestration Generation Subsystem (B31)

FIGS. 28R1, 28R2 and 28R3 show the probability-based parameter tables maintained in the Orchestration Generation Subsystem (B31) of the Automated Music Composition and Generation Engine of the present invention, illustrated in FIGS. 27KK1 through 27KK9. As shown in FIGS. 28R1, 28R2 and 28R3, for each emotion-type musical experience descriptor supported by the system and selected by the system user, probability measures are provided for each instrument supported by the system, and these parameter tables are used during the automated music composition and generation process of the present invention.

The primary function of the instrument orchestration prioritization table is to provide a framework to determine the order and/or process of orchestration in a musical piece, section, phrase, or other structure. The instrument orchestration prioritization table is used by loading a proper set of parameters into the various subsystems determined by subsystems B1 and B37 and, through a guided stochastic process illustrated in FIG. 27KK1, the subsystem B31 makes a determination(s) as to what value(s) and/or parameter(s) to select from the parameter table and use during the automated music composition and generation process of the present invention.

The primary function of the instrument function table is to provide a framework to determine the musical function of each instrument in a musical piece, section, phrase, or other structure. The instrument function table is used by loading a proper set of parameters as determined by B1 and B37 and, through a guided stochastic process illustrated in FIG. 27KK1, the subsystem B31 makes a determination(s) as to what value(s) and/or parameter(s) to select from the parameter table and use during the automated music composition and generation process of the present invention.

The primary function of the piano hand function table is to provide a framework to determine the musical function of each hand of the piano in a musical piece, section, phrase, or other structure. The piano hand function table is used by loading a proper set of parameters into the various subsystems determined by subsystems B1 and B37 and, through a guided stochastic process illustrated in FIGS. 27KK2 and 27KK3, the subsystem B31 makes a determination(s) as to what value(s) and/or parameter(s) to select from the parameter table and use during the automated music composition and generation process of the present invention.

The primary function of the piano voicing table is to provide a framework to determine the voicing of each note of each hand of the piano in a musical piece, section, phrase, or other structure. The piano voicing table is used by loading a proper set of parameters into the various subsystems determined by subsystems B1 and B37 and, through a guided stochastic process illustrated in FIG. 27KK3, the subsystem B31 makes a determination(s) as to what value(s) and/or parameter(s) to select from the parameter table and use during the automated music composition and generation process of the present invention.

The primary function of the piano rhythm table is to provide a framework to determine the arrangement in time of each event of the piano in a musical piece, section, phrase, or other structure. The piano rhythm table is used by loading a proper set of parameters into the various subsystems determined by subsystems B1, B37, B40, and B41 and, through a guided stochastic process illustrated in FIG. 27KK3, the subsystem B31 makes a determination(s) as to what value(s) and/or parameter(s) to select from the parameter table and use during the automated music composition and generation process of the present invention.

The primary function of the second note right hand table is to provide a framework to determine the arrangement in time of each non-initial event of the right hand of the piano in a musical piece, section, phrase, or other structure. The second note right hand table is used by loading a proper set of parameters into the various subsystems determined by subsystems B1, B37, B40, and B41 and, through a guided stochastic process illustrated in FIGS. 27KK3 and 27KK4, the subsystem B31 makes a determination(s) as to what value(s) and/or parameter(s) to select from the parameter table and use during the automated music composition and generation process of the present invention.

The primary function of the second note left hand table is to provide a framework to determine the arrangement in time of each non-initial event of the left hand of the piano in a musical piece, section, phrase, or other structure. The second note left hand table is used by loading a proper set of parameters into the various subsystems determined by subsystems B1, B37, B40, and B41 and, through a guided stochastic process illustrated in FIG. 27KK4, the subsystem B31 makes a determination(s) as to what value(s) and/or parameter(s) to select from the parameter table and use during the automated music composition and generation process of the present invention.

The primary function of the third note right hand length table provides a framework to determine the rhythmic length of the third note in the right hand of the piano within a musical piece, section, phrase, or other structure(s). The third note right hand length table is used by loading a proper set of parameters into the various subsystems determined by subsystems B1 and B37 and, through a guided stochastic process illustrated in FIGS. 27KK4 and 27KK5, the subsystem B31 makes a determination(s) as to what value(s) and/or parameter(s) to select from the parameter table and use during the automated music composition and generation process of the present invention.

The primary function of the piano dynamics table is to provide a framework to determine the musical expression of the piano in a musical piece, section, phrase, or other structure. The piano voicing table is used by loading a proper set of parameters into the various subsystems determined by subsystems B1 and B37 and, through a guided stochastic process illustrated in FIGS. 27KK6 and 27KK7, the subsystem B31 makes a determination(s) as to what value(s) and/or parameter(s) to select from the parameter table and use during the automated music composition and generation process of the present invention.

Specification of the Parameter Tables within the Controller Code Generation Subsystem (B32)

FIG. 28S shows the probability-based parameter tables maintained in the Controller Code Generation Subsystem (B32) of the Automated Music Composition and Generation Engine of the present invention, as illustrated in FIG. 27LL. As shown in FIG. 28S, for each emotion-type musical experience descriptor supported by the system and selected by the system user, probability measures are provided for each instrument supported by the system, and these parameter tables are used during the automated music composition and generation process of the present invention.

The primary function of the instrument controller code table is to provide a framework to determine the musical expression of an instrument in a musical piece, section, phrase, or other structure. The instrument controller code table is used by loading a proper set of parameters into the various subsystems determined by subsystems B1 and B37 and, through a process of guided stochastic process, making a determination(s) for the value(s) and/or parameter(s) to use.

The primary function of the instrument group controller code table is to provide a framework to determine the musical expression of an instrument group in a musical piece, section, phrase, or other structure. The instrument group controller code table is used by loading a proper set of parameters into the various subsystems determined by subsystems by B1 and B37 and, through a process of guided stochastic process, making a determination(s) for the value(s) and/or parameter(s) to use.

The primary function of the piece-wide controller code table is to provide a framework to determine the overall musical expression in a musical piece, section, phrase, or other structure. The piece-wide controller code table is used by loading a proper set of parameters into the various subsystems determined by subsystems B1 and B37 and, through a process of guided stochastic process illustrated in FIG. 27LL, making a determination(s) for the value(s) and/or parameter(s) to use.

Methods of Distributing Probability-Based System Operating Parameters (SOP) to the Subsystems within the Automated Music Composition and Generation System of the Present Invention There are different methods by which the probability-based music-theoretic parameters, generated by the Parameter Transformation Engine Subsystem B51, can be transported to and accessed within the respective subsystems of the automated music composition and generation system of the present invention during the automated music composition process supported thereby. Several different methods will be described in detail below.

According to a first preferred method, described throughout the illustrative embodiments of the present invention, the following operations occur in an organized manner:

(i) the system user provides a set of emotion and style type musical experience descriptors (e.g. HAPPY and POP) and timing/spatial parameters (t=32 seconds) to the system input subsystem B0, which are then transported to the Parameter Transformation Engine Subsystem B51;

(ii) the Parameter Transformation Engine Subsystem B51 automatically generates only those sets of probability-based parameter tables corresponding to HAPPY emotion descriptors, and POP style descriptors, and organizes these music-theoretic parameters in their respective emotion/style-specific parameter tables (or other data suitable structures, such as lists, arrays, etc.); and (iii) any one or more of the subsystems B1, B37 and B51 are used to transport the probability-based emotion/style-specific parameter tables from Subsystem B51, to their destination subsystems, where these emotion/style-specific parameter tables are loaded into the subsystem, for access and use at particular times/stages in the execution cycle of the automated music composition process of the present invention, according to the timing control process described in FIGS. 29A and 29B.

Using this first method, there is no need for the emotion and style type musical experience parameters to be transported to each of numerous subsystems employing probabilistic-based parameter tables. The reason is because the subsystems are loaded with emotion/style-specific parameter tables containing music-theoretic parameter values seeking to implement the musical experience desired by the system user and characterized by the emotion-type and style-type musical experience descriptors selected by the system user and supplied to the system interface. So in this method, the system user's musical experience descriptors need not be transmitted past the Parameter Transformation Engine Subsystem B51, because the music-theoretic parameter tables generated from this subsystem B51 inherently contain the emotion and style type musical experience descriptors selected by the system user. There will be a need to transmit timing/spatial parameters from the system user to particular subsystems by way of the Timing Parameter Capture Subsystem B40, as illustrated throughout the drawings.

According to a second preferred method, the following operations will occur in an organized manner:

(iii) during system configuration and set-up, the Parameter Transformation Engine Subsystem B51 is used to automatically generate all possible (i.e. allowable) sets of probability-based parameter tables corresponding to all of the emotion descriptors and style descriptors available for selection by the system user at the GUI-based Input Output Subsystem B0, and then organizes these music-theoretic parameters in their respective emotion/style parameter tables (or other data suitable structures, such as lists, arrays, etc.);

(ii) during system configuration and set-up, subsystems B1, B37 and B51) are used to transport all sets of generalized probability-based parameter tables across the system data buses to their respective destination subsystems where they are loaded in memory;

(iii) during system operation and use, the system user provides a particular set of emotion and style type musical experience descriptors (e.g. HAPPY and POP) and timing/spatial parameters (t=32 seconds) to the system input subsystem B0, which are then are received by the Parameter Capture Subsystems B1, B37 and B40;

(iv) during system operation and use, the Parameter Capture subsystems B1, B37 and B40 transport these emotion descriptors and style descriptors (selected by the system user) to the various subsystems in the system; and (v) during system operation and use, the emotion descriptors and style descriptors transmitted to the subsystems are then used by each subsystem to access specific parts of the generalized probabilistic-based parameter tables relating only to the selected emotion and style descriptors (e.g. HAPPY and POP) for access and use at particular times/stages in the execution cycle of the automated music composition process of the present invention, according to the timing control process described in FIGS. 29A and 29B.

Using this second method, there is a need for the emotion and style type musical experience parameters to be transported to each of numerous subsystems employing probabilistic-based parameter tables. The reason is because the subsystems need to have information on which emotion/style-specific parameter tables containing music-theoretic parameter values, should be accessed and used during the automated music composition process within the subsystem. So in this second method, the system user's emotion and style musical experience descriptors must be transmitted through Parameter Capture Subsystems B1 and B37 to the various subsystems in the system, because the generalized music-theoretic parameter tables do not contain the emotion and style type musical experience descriptors selected by the system user. Also when using this second method, there will be a need to transmit timing/spatial parameters from the system user to particular subsystems by way of the Timing Parameter Capture Subsystem B40, as illustrated throughout the drawings.

While the above-described methods are preferred, it is understood that other methods can be used to practice the automated system and method for automatically composing and generating music in accordance with the spirit of the present invention.

Figure 27V:
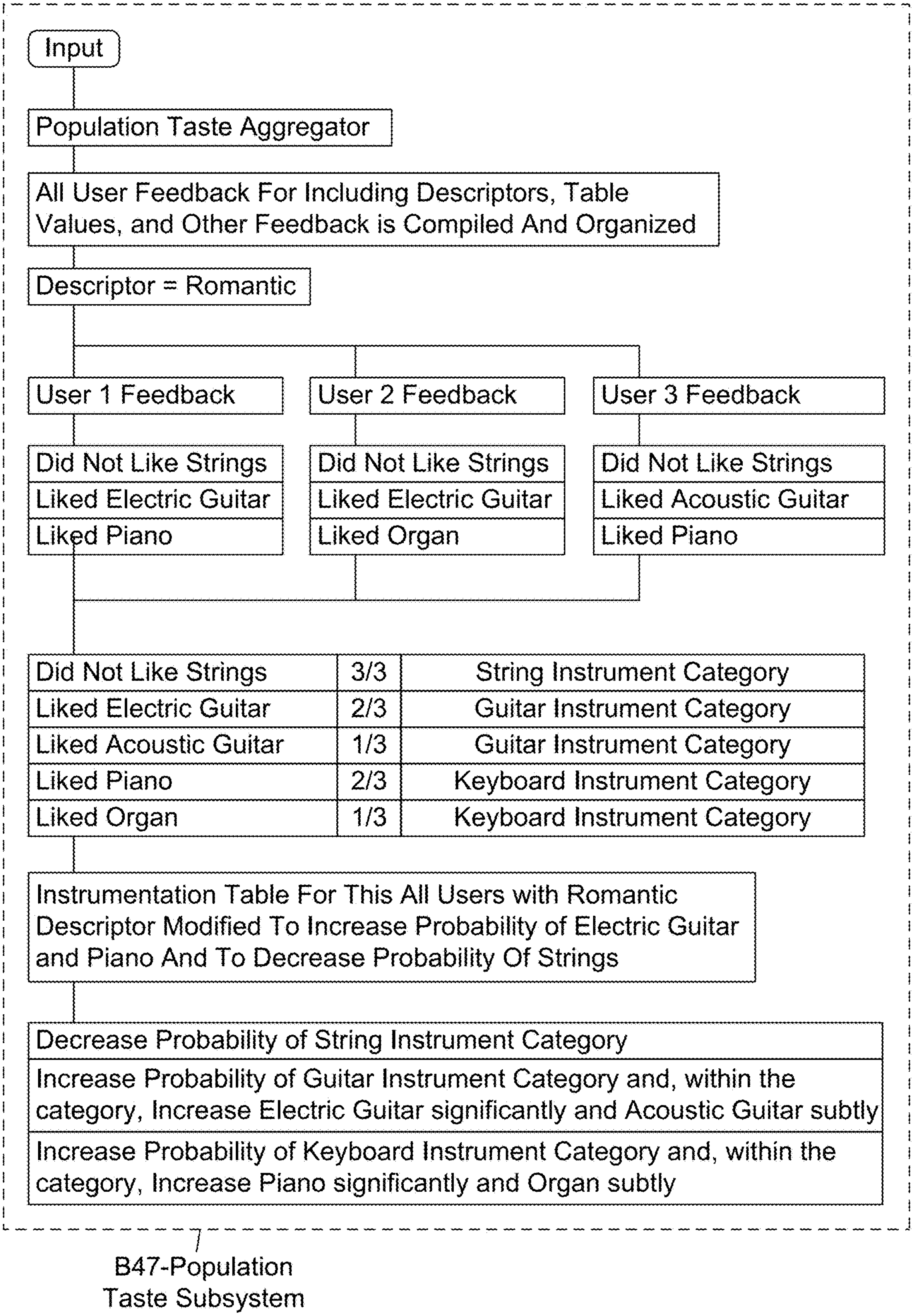
Figure 27W:
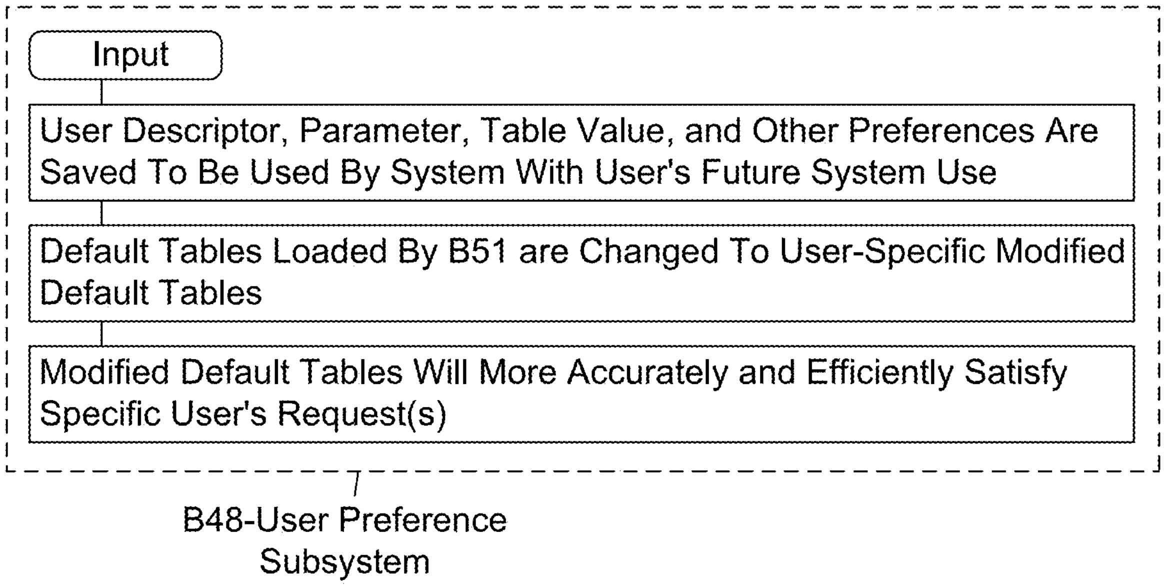
Figure 27X:
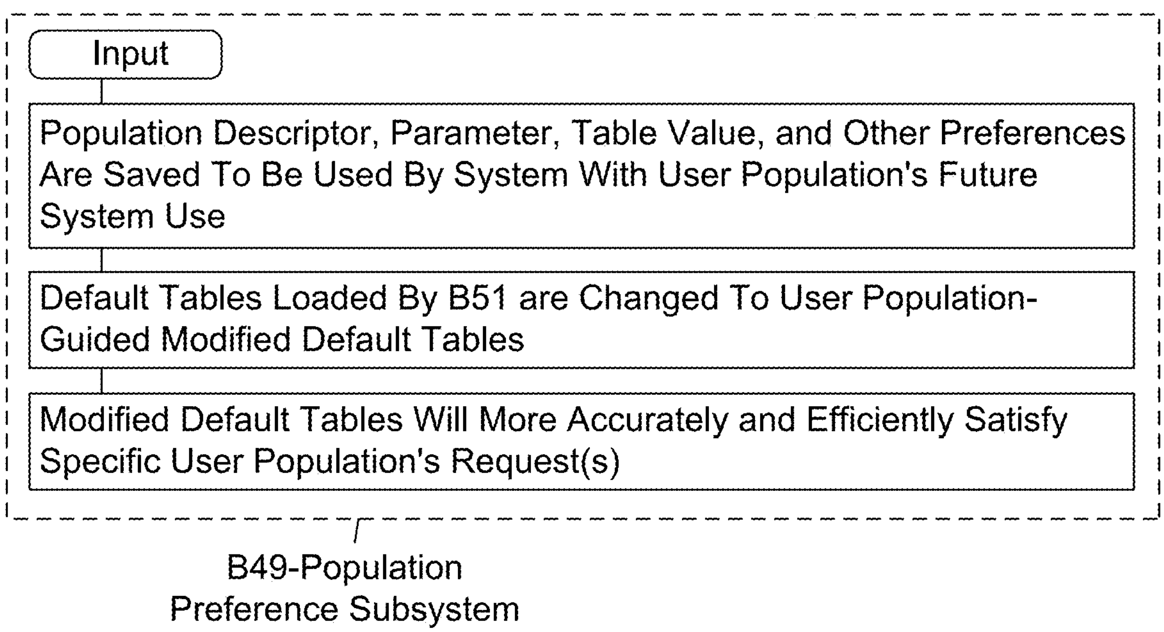

Specification of the B-Level Subsystems Employed in the Automated Music Composition System of the Present Invention, and the Specific Information Processing Operations Supported by and Performed within Each Subsystem During the Execution of the Automated Music Composition and Generation Process of the Present Invention A more detail technical specification of each B-level subsystem employed in the system (S) and its Engine (E1) of the present invention, and the specific information processing operations and functions supported by each subsystem during each full cycle of the automated music composition and generation process hereof, will now be described with reference to the schematic illustrations set forth in FIGS. 27A through 27XX.

Notably, the description of the each subsystem and the operations performed during the automated music composition process will be given by considering an example of where the system generates a complete piece of music, on a note-by-note, chord-by-chord basis, using the automated virtual-instrument music synthesis method, in response to the system user providing the following system inputs: (i) emotion-type music descriptor=HAPPY; (ii) style-type descriptor=POP; and (iii) the timing parameter t=32 seconds.

As shown in the Drawings, the exemplary automated music composition and generation process begins at the Length Generation Subsystem B2 shown in FIG. 27F, and proceeds through FIG. 27KK9 where the composition of the exemplary piece of music is completed, and resumes in FIG. 27LL where the Controller Code Generation Subsystem generates controller code information for the music composition, and Subsystem B33 shown in FIG. 27MM through Subsystem B36 in FIG. 27PP completes the generation of the composed piece of digital music for delivery to the system user. This entire process is controlled under the Subsystem Control Subsystem B60 (i.e. Subsystem Control Subsystem A9), where timing control data signals are generated and distributed as illustrated in FIGS. 29A and 29B in a clockwork manner.

Also, while Subsystems B1, B37, B40 and B41 do not contribute to generation of musical events during the automated musical composition process, these subsystems perform essential functions involving the collection, management and distribution of emotion, style and timing/spatial parameters captured from system users, and then supplied to the Parameter Transformation Engine Subsystem B51 in a user-transparent manner, where these supplied sets of musical experience and timing/spatial parameters are automatically transformed and mapped into corresponding sets of music-theoretic system operating parameters organized in tables, or other suitable data/information structures that are distributed and loaded into their respective subsystems, under the control of the Subsystem Control Subsystem B60, illustrated in FIG. 25A. The function of the Subsystem Control Subsystem B60 is to generate the timing control data signals as illustrated in FIGS. 29A and 29B which, in response to system user input to the Input Output Subsystem B0, is to enable each subsystem into operation at a particular moment in time, precisely coordinated with other subsystems, so that all of the data flow paths between the input and output data ports of the subsystems are enabled in the proper time order, so that each subsystem has the necessary data required to perform its operations and contribute to the automated music composition and generation process of the present invention. While control data flow lines are not shown at the B-level subsystem architecture illustrated in FIGS. 26A through 26P, such control data flow paths are illustrated in the corresponding model shown in FIG. 25A, where the output ports of the Input Subsystem A0 are connected to the input ports of the Subsystem Control Subsystem A9, and the output data ports of Subsystem A9 are provided to the input data ports of Subsystems A1 through A8. Corresponding data flow paths exist at the B-level schematic representation, but have not been shown for clarity of illustration.

Specification of the User GUI-Based Input Output Subsystem (B0)

FIG. 27A shows a schematic representation of the User GUI-Based Input Output Subsystem (BO) used in the Automated Music Composition and Generation Engine and Systems the present invention (E1). During operation, the system user interacts with the system's GUI, or other supported interface mechanism, to communicate his, her or its desired musical experience descriptor(s) (e.g. emotional descriptors and style descriptor(s)), and/or timing information. In the illustrative embodiment, and exemplary illustrations, (i) the emotion-type musical experience descriptor=HAPPY is provided to the input output system B0 of the Engine for distribution to the (Emotion) Descriptor Parameter Capture Subsystem B1, (ii) the style-type musical experience descriptor=POP is provided to the input output system B0 of the Engine for distribution to the Style Parameter Capture Subsystem B37, and (iii) the timing parameter t=32 seconds is provided to the Input Output System B0 of the Engine for distribution to the Timing Parameter Capture Subsystem B40. These subsystems, in turn, transport the supplied set of musical experience parameters and timing/spatial data to the input data ports of the Parameter Transformation Engine Subsystem B51 shown in FIGS. 27B3A, 27B3B and 27B3C, where the Parameter Transformation Engine Subsystem B51 then generates an appropriate set of probability-based parameter programming tables for subsequent distribution and loading into the various subsystems across the system, for use in the automated music composition and generation process being prepared for execution.

Specification of the Descriptor Parameter Capture Subsystem (B1)

FIGS. 27B1 and 27B2 show a schematic representation of the (Emotion-Type) Descriptor Parameter Capture Subsystem (B1) used in the Automated Music Composition and Generation Engine of the present invention. The Descriptor Parameter Capture Subsystem B1 serves as an input mechanism that allows the user to designate his or her preferred emotion, sentiment, and/or other descriptor for the music. It is an interactive subsystem of which the user has creative control, set within the boundaries of the subsystem.

In the illustrative example, the system user provides the exemplary "emotion-type" musical experience descriptor—HAPPY—to the descriptor parameter capture subsystem B1. These parameters are used by the parameter transformation engine B51 to generate probability-based parameter programming tables for subsequent distribution to the various subsystems therein, and also subsequent subsystem set up and use during the automated music composition and generation process of the present invention.

Once the parameters are inputted, the Parameter Transformation Engine Subsystem B51 generates the system operating parameter tables and then the subsystem 51 loads the relevant data tables, data sets, and other information into each of the other subsystems across the system. The emotion-type descriptor parameters can be inputted to subsystem B51 either manually or semi-automatically by a system user, or automatically by the subsystem itself. In processing the input parameters, the subsystem 51 may distill (i.e. parse and transform) the emotion descriptor parameters to any combination of descriptors as described in FIGS. 30 through 30J. Also, where text-based emotion descriptors are provided, say in a short narrative form, the Descriptor Parameter Capture Subsystem B1 can parse and analyze and translate the words in the supplied text narrative into emotion-type descriptor words that have entries in emotion descriptor library as illustrated in FIGS. 30 through 30J, so through translation processes, virtually any set of words can be used to express one or more emotion-type music descriptors registered in the emotion descriptor library of FIGS. 30 through 30J, and be used to describe the kind of music the system user wishes to be automatically composed by the system of the present invention.

Preferably, the number of distilled descriptors is between one and ten, but the number can and will vary from embodiment to embodiment, from application to application. If there are multiple distilled descriptors, and as necessary, the Parameter Transformation Engine Subsystem B51 can create new parameter data tables, data sets, and other information by combining previously existing data tables, data sets, and other information to accurately represent the inputted descriptor parameters. For example, the descriptor parameter "happy" might load parameter data sets related to a major key and an upbeat tempo. This transformation and mapping process will be described in greater detail with reference to the Parameter Transformation Engine Subsystem B51 described in greater detail hereinbelow.

In addition to performing the music-theoretic and information processing functions specified above, when necessary or helpful, System B1 can also assist the Parameter Transformation Engine System B51 in transporting probability-based music-theoretic system operating parameter (SOP) tables (or like data structures) to the various subsystems deployed throughout the automated music composition and generation system of the present invention.

Specification of the Style Parameter Capture Subsystem (B37)

FIGS. 27C1 and 27C2 show a schematic representation of the Style Parameter Capture Subsystem (B37) used in the Automated Music Composition and Generation Engine and System of the present invention. The Style Parameter Capture Subsystem B37 serves as an input mechanism that allows the user to designate his or her preferred style parameter(s) of the musical piece. It is an interactive subsystem of which the user has creative control, set within the boundaries of the subsystem. This information is based on either user inputs (if given), computationally-determined value(s), or a combination of both. Style, or the characteristic manner of presentation of musical elements (melody, rhythm, harmony, dynamics, form, etc.), is a fundamental building block of any musical piece. In the illustrative example of FIGS. 27C1 and 27C2, the probability-based parameter programming table employed in the subsystem is set up for the exemplary "style-type" musical experience descriptor=POP and used during the automated music composition and generation process of the present invention.

The style descriptor parameters can be inputted manually or semi-automatically or by a system user, or automatically by the subsystem itself. Once the parameters are inputted, the Parameter Transformation Engine Subsystem B51 receives the user's musical style inputs from B37 and generates the relevant probability tables across the rest of the system, typically by analyzing the sets of tables that do exist and referring to the currently provided style descriptors. If multiple descriptors are requested, the Parameter Transformation Engine Subsystem B51 generates system operating parameter (SOP) tables that reflect the combination of style descriptors provided, and then subsystem B37 loads these parameter tables into their respective subsystems.

In processing the input parameters, the Parameter Transformation Engine Subsystem B51 may distill the input parameters to any combination of styles as described in FIG. 33A through 33E. The number of distilled styles may be between one and ten. If there are multiple distilled styles, and if necessary, the Parameter Transformation Subsystem B51 can create new data tables, data sets, and other information by combining previously existing data tables, data sets, and other information to generate system operating parameter tables that accurately represent the inputted descriptor parameters.

In addition to performing the music-theoretic and information processing functions specified above, when necessary or helpful, Subsystem B37 can also assist the Parameter Transformation Engine System B51 in transporting probability-based music-theoretic system operating parameter (SOP) tables (or like data structures) to the various subsystems deployed throughout the automated music composition and generation system of the present invention.

Specification of the Timing Parameter Capture Subsystem (B40)

FIG. 27D shows the Timing Parameter Capture Subsystem (B40) used in the Automated Music Composition and Generation Engine (E1) of the present invention. The Timing Parameter Capture Subsystem B40 locally decides whether the Timing Generation Subsystem B41 is loaded and used, or if the piece of music being created will be a specific pre-set length determined by processes within the system itself. The Timing Parameter Capture Subsystem B40 determines the manner in which timing parameters will be created for the musical piece. If the user elects to manually enter the timing parameters, then a certain user interface will be available to the user. If the user does not elect to manually enter the timing parameters, then a certain user interface might not be available to the user. As shown in FIGS. 27E1 and 27E2, the subsystem B41 allows for the specification of timing of for the length of the musical piece being composed, when music starts, when music stops, when music volume increases and decreases, and where music accents are to occur along the timeline represented for the music composition. During operation, the Timing Parameter Capture Subsystem (B40) provides timing parameters to the Timing Generation Subsystem (B41) for distribution to the various subsystems in the system, and subsequent subsystem set up and use during the automated music composition and generation process of the present invention.

In addition to performing the music-theoretic and information processing functions specified above, when necessary or helpful, Subsystem B40 can also assist the Parameter Transformation Engine System B51 in transporting probability-based music-theoretic system operating parameter (SOP) tables (or like data structures) to the various subsystems deployed throughout the automated music composition and generation system of the present invention.

Specification of the Parameter Transformation Engine (PTE) of the Present Invention (B51)

As illustrated in FIGS. 27B3A, 27B3B and 27B3C, the Parameter Transformation Engine Subsystem B51 is shown integrated with subsystems B1, B37 and B40 for handling emotion-type, style-type and timing-type parameters, respectively, supplied by the system user though subsystem B0. The Parameter Transformation Engine Subsystem B51 performs an essential function by accepting the system user input(s) descriptors and parameters from subsystems B1, B37 and B40, and transforming these parameters (e.g. input(s)) into the probability-based system operating parameter tables that the system will use during its operations to automatically compose and generate music using the virtual-instrument music synthesis technique disclosed herein. The programmed methods used by the parameter transformation engine subsystem (B51) to process any set of musical experience (e.g. emotion and style) descriptors and timing and/or spatial parameters, for use in creating a piece of unique music, will be described in great detail hereinafter with reference to FIGS. 27B3A through 27B3C, wherein the musical experience descriptors (e.g. emotion and style descriptors) and timing and spatial parameters that are selected from the available menus at the system user interface of input subsystem B0 are automatically transformed into corresponding sets of probabilistic-based system operating parameter (SOP) tables which are loaded into and used within respective subsystems in the system during the music composition and generation process.

As will be explained in greater detail below, this parameter transformation process supported within Subsystem B51 employs music theoretic concepts that are expressed and embodied within the probabilistic-based system operation parameter (SOP) tables maintained within the subsystems of the system, and controls the operation thereof during the execution of the time-sequential process controlled by the timing signals illustrated in timing control diagram set forth in FIGS. 29A and 29B. Various parameter transformation principles and practices for use in designing, constructing and operating the Parameter Transformation Engine Subsystem (B51) will be described in detail hereinafter.

In addition to performing the music-theoretic and information processing functions specified above, the Parameter Transformation Engine System B51 is fully capable of transporting probability-based music-theoretic system operating parameter (SOP) tables (or like data structures) to the various subsystems deployed throughout the automated music composition and generation system of the present invention.

Specification of the Parameter Table Handling and Processing Subsystem (B70)

In general, there is a need with the system to manage multiple emotion-type and style-type musical experience descriptors selected by the system user, to produce corresponding sets of probability-based music-theoretic parameters for use within the subsystems of the system of the present invention. The primary function of the Parameter Table Handling and Processing Subsystem B70 is to address this need at either a global or local level, as described in detail below.

FIG. 27B5 shows the Parameter Table Handling and Processing Subsystem (B70) used in connection with the Automated Music Composition and Generation Engine of the present invention. The primary function of the Parameter Table Handling and Processing Subsystem (B70) is to determine if any system parameter table transformation(s) are required in order to produce system parameter tables in a form that is more convenient and easier to process and use within the subsystems of the system of the present invention. The Parameter Table Handling and Processing Subsystem (B70) performs its functions by (i) receiving multiple (i.e. one or more) emotion/style-specific music-theoretic system operating parameter (SOP) tables from the data output port of the Parameter Transformation Engine Subsystem B51, (ii) processing these parameter tables using one or parameter table processing methods M1, M2 or M3, described below, and (iii) generating system operating parameter tables in a form that is more convenient and easier to process and use within the subsystems of the system of the present invention.

In general, there are two different ways in which to practice this aspect of the present invention: (i) performing parameter table handing and transformation processing operations in a global manner, as shown with the Parameter Table Handling and Processing Subsystem B70 configured with the Parameter Transformation Engine Subsystem B51, as shown in FIGS. 26A through 26J; or (ii) performing parameter table handing and transformation processing operations in a local manner, within each subsystem, as shown with the Parameter Table Handling and Processing Subsystem B70 configured with the input data port of each subsystem supporting probability-based system operating parameter tables, as shown in FIGS. 28A through 28S. Both approaches are shown herein for purposes of illustration. However, the details of the Parameter Table Handling and Processing Subsystem B70 will be described below with reference to the global implementation shown and illustrated in FIGS. 26A through 26J.

As shown in FIGS. 26A through 26J, the data input ports of the Parameter Table Handling and Processing Subsystem (B70) are connected to the output data ports of the Parameter Table Handling and Processing Subsystem B70, whereas the data output ports of Subsystem B70 are connected to (i) the input data port of the Parameter Table Archive Database Subsystem B80, and also (ii) the input data ports of parameter table employing Subsystems B2, B3, B4, B5, B7, B9, B15, B11, B17, B19, B20, B25, B26, B24, B27, B29, B30, B38, B39, B31, B32 and B41, illustrated in FIGS. 28A through 28S and other figure drawings disclosed herein.

As shown in FIG. 27B5, the Parameter Table Handling and Processing Subsystem B70 receives one or more emotion/style-indexed system operating parameter tables and determines whether or not system input (i.e. parameter table) transformation is required, or not required, as the case may be. In the event only a single emotion/style-indexed system parameter table is received, it is unlikely transformation will be required and therefore the system parameter table is typically transmitted to the data output port of the subsystem B70 in a pass-through manner. In the event that two or more emotion/style-indexed system parameter tables are received, then it is likely that these parameter tables will require or benefit from transformation processing, so the subsystem B70 supports three different methods M1, M2 and M3 for operating on the system parameter tables received at its data input ports, to transform these parameter tables into parameter table that are in a form that is more suitable for optimal use within the subsystems.

There are three case scenarios to consider and accompanying rules to use in situations where multiple emotion/style musical experience descriptors are provided to the input subsystem B0, and multiple emotion/style-indexed system parameter tables are automatically generated by the Parameter Transformation Engine Subsystem B51.

Considering the first case scenario, where Method M1 is employed, the subsystem B70 makes a determination among the multiple emotion/style-indexed system parameter tables, and decides to use only one of the emotion/style-indexed system parameter tables. In scenario Method 1, the subsystem B70 recognizes that, either in a specific instance or as an overall trend, that among the multiple parameter tables generated in response to multiple musical experience descriptors inputted into the subsystem B0, a single one of these descriptors-indexed parameter tables might be best utilized.

As an example, if HAPPY, EXHUBERANT, and POSITIVE were all inputted as emotion-type musical experience descriptors, then the system parameter table(s) generated for EXHUBERANT might likely provide the necessary musical framework to respond to all three inputs because EXUBERANT encompassed HAPPY and POSITIVE. Additionally, if CHRISTMAS, HOLIDAY, AND WINTER were all inputted as style-type musical experience descriptors, then the table(s) for CHRISTMAS might likely provide the necessary musical framework to respond to all three inputs.

Further, if EXCITING and NERVOUSNESS were both inputted as emotion-type musical experience descriptors and if the system user specified EXCITING: 9 out of 10, where 10 is maximum excitement and 0 is minimum excitement and NERVOUSNESS: 2 out of 10, where 10 is maximum NERVOUSNESS and 0 is minimum NERVOUSNESS (whereby the amount of each descriptor might be conveyed graphically by, but not limited to, moving a slider on a line or by entering in a percentage into a text field), then the system parameter table(s) for EXCITING might likely provide the necessary musical framework to respond to both inputs. In all three of these examples, the musical experience descriptor that is a subset and, thus, a more specific version of the additional descriptors, is selected as the musical experience descriptor whose table(s) might be used.

Considering the second case scenario, where Method M2 is employed, the subsystem B70 makes a determination among the multiple emotion/style-indexed system parameter tables, and decides to use a combination of the multiple emotion/style descriptor-indexed system parameter tables.

In scenario Method 2, the subsystem B70 recognizes that, either in a specific instance or as an overall trend, that among the multiple emotion/style descriptor indexed system parameter tables generated by subsystem B51 in response to multiple emotion/style descriptor inputted into the subsystem BO, a combination of some or all of these descriptor-indexed system parameter tables might best be utilized. According to Method M2, this combination of system parameter tables might be created by employing functions including, but not limited to, (weighted) average(s) and dominance of a specific descriptor's table(s) in a specific table only.

As an example, if HAPPY, EXUBERANT, AND POSITIVE were all inputted as emotional descriptors, the system parameter table(s) for all three descriptors might likely work well together to provide the necessary musical framework to respond to all three inputs by averaging the data in each subsystem table (with equal weighting). Additionally, IF CHRISTMAS, HOLIDAY, and WINTER were all inputted as style descriptors, the table(s) for all three might likely provide the necessary musical framework to respond to all three inputs by using the CHRISTMAS tables for the General Rhythm Generation Subsystem A1, the HOLIDAY tables for the General Pitch Generation Subsystem A2, and the a combination of the HOLIDAY and WINTER system parameter tables for the Controller Code and all other subsystems. Further, if EXCITING and NERVOUSNESS were both inputted as emotion-type musical experience descriptors and if the system user specified Exciting: 9 out of 10, where 10 is maximum excitement and 0 is minimum excitement and NERVOUSNESS: 2 out of 10, where 10 is maximum nervousness and 0 is minimum nervousness (whereby the amount of each descriptor might be conveyed graphically by, but not limited to, moving a slider on a line or by entering in a percentage into a text field), the weight in table(s) employing a weighted average might be influenced by the level of the user's specification. In all three of these examples, the descriptors are not categorized as solely a set(s) and subset(s), but also by their relationship within the overall emotional and/or style spectrum to each other.

Considering the third case scenario, where Method M3 is employed, the subsystem B70 makes a determination among the multiple emotion/style-indexed system parameter tables, and decides to use neither of multiple emotion/style descriptor-indexed system parameter tables. In scenario Method 3, the subsystem B70 recognizes that, either in a specific instance or as an overall trend, that among the multiple emotion/style-descriptor indexed system parameter tables generated by subsystem B51 in response to multiple emotion/style descriptor inputted into the subsystem BO, none of the emotion/style-indexed system parameter tables might best be utilized.

As an example, if HAPPY and SAD were both inputted as emotional descriptors, the system might determine that table(s) for a separate descriptor(s), such as BIPOLAR, might likely work well together to provide the necessary musical framework to respond to both inputs. Additionally, if ACOUSTIC, INDIE, and FOLK were all inputted as style descriptors, the system might determine that table(s) for separate descriptor(s), such as PIANO, GUITAR, VIOLIN, and BANJO, might likely work well together to provide the necessary musical framework, possibly following the avenues(s) described in Method 2 above, to respond to the inputs. Further, if EXCITING and NERVOUSNESS were both inputted as emotional descriptors and if the system user specified Exciting: 9 out of 10, where 10 is maximum excitement and 0 is minimum excitement and Nervousness: 8 out of 10, where 10 is maximum nervousness and 0 is minimum nervousness (whereby the amount of each descriptor might be conveyed graphically by, but not limited to, moving a slider on a line or by entering in a percentage into a text field), the system might determine that an appropriate description of these inputs is Panicked and, lacking a pre-existing set of system parameter tables for the descriptor PANICKED, might utilize (possibility similar) existing descriptors' system parameter tables to autonomously create a set of tables for the new descriptor, then using these new system parameter tables in the subsystem(s) process(es).

In all of these examples, the subsystem B70 recognizes that there are, or could be created, additional or alternative descriptor(s) whose corresponding system parameter tables might be used (together) to provide a framework that ultimately creates a musical piece that satisfies the intent(s) of the system user.

Specification of the Parameter Table Archive Database Subsystem (B80)

FIG. 27B6 shows the Parameter Table Archive Database Subsystem (B80) used in the Automated Music Composition and Generation System of the present invention. The primary function of this subsystem B80 is persistent storing and archiving user account profiles, tastes and preferences, as well as all emotion/style-indexed system operating parameter (SOP) tables generated for individual system users, and populations of system users, who have made music composition requests on the system, and have provided feedback on pieces of music composed by the system in response to emotion/style/timing parameters provided to the system.

As shown in FIG. 27B6, the Parameter Table Archive Database Subsystem B80, realized as a relational database management system (RBMS), non-relational database system or other database technology, stores data in table structures in the illustrative embodiment, according to database schemas, as illustrated in FIG. 27B6.

As shown, the output data port of the GUI-based Input Output Subsystem B0 is connected to the output data port of the Parameter Table Archive Database Subsystem B80 for receiving database requests from system users who use the system GUI interface. As shown, the output data ports of Subsystems B42 through B48 involved in feedback and learning operations, are operably connected to the data input port of the Parameter Table Archive Database Subsystem B80 for sending requests for archived parameter tables, accessing the database to modify database and parameter tables, and performing operations involved system feedback and learning operations. As shown, the data output port of the Parameter Table Archive Database Subsystem B80 is operably connected to the data input ports of the Systems B42 through B48 involved in feedback and learning operations. Also, as shown in FIGS. 26A through 26P, the output data port of the Parameter Table Handling and Processing Subsystem B7 is connected to data input port of the Parameter Table Archive Database Subsystem B80, for archiving copies of all parameter tables handled, processed and produced by this Subsystem B80, for future analysis, use and processing.

In general, while all parameter data sets, tables and like structures will be stored globally in the Parameter Table Archive Database Subsystem B80, it is understood that the system will also support local persistent data storage within subsystems, as required to support the specialized information processing operations performed therein in a high-speed and reliable manner during automated music composition and generation processes on the system of the present invention.

Specification of the Timing Generation Subsystem (B41)

FIGS. 27E1 and 27E2 shows the Timing Generation Subsystem (B41) used in the Automated Music Composition and Generation Engine of the present invention. In general, the Timing Generation Subsystem B41 determines the timing parameters for the musical piece. This information is based on either user inputs (if given), compute-determined value(s), or a combination of both. Timing parameters, including, but not limited to, or designations for the musical piece to start, stop, modulate, accent, change volume, change form, change melody, change chords, change instrumentation, change orchestration, change meter, change tempo, and/or change descriptor parameters, are a fundamental building block of any musical piece.

The Timing Parameter Capture Subsystem B40 can be viewed as creating a timing map for the piece of music being created, including, but not limited to, the piece's descriptor(s), style(s), descriptor changes, style changes, instrument changes, general timing information (start, pause, hit point, stop), meter (changes), tempo (changes), key (changes), tonality (changes) controller code information, and audio mix. This map can be created entirely by a user, entirely by the Subsystem, or in collaboration between the user and the subsystem.

More particularly, the Timing Parameter Capture Subsystem (B40) provides timing parameters (e.g. piece length) to the Timing Generation Subsystem (B41) for generating timing information relating to (i) the length of the piece to be composed, (ii) start of the music piece, (iii) the stop of the music piece, (iv) increases in volume of the music piece, and (v) any accents in the music piece that are to be created during the automated music composition and generation process of the present invention.

For example, a system user might request that a musical piece begin at a certain point, modulate a few seconds later, change tempo even later, pause, resume, and then end with a large accent. This information is transmitted to the rest of the system's subsystems to allow for accurate and successful implementation of the user requests. There might also be a combination of user and system inputs that allow the piece to be created as successfully as possible, including the scenario when a user might elect a start point for the music, but fail to input to stop point. Without any user input, the system would create a logical and musical stop point. Thirdly, without any user input, the system might create an entire set of timing parameters in an attempt to accurately deliver what it believes the user desires.

Specification of the Length Generation Subsystem (B2)

FIG. 27F shows the Length Generation Subsystem (B2) used in the Automated Music Composition and Generation Engine and System of the present invention. In general, the Length Generation Subsystem B2 determines the length of the musical piece that is being generated. Length is a fundamental building block of any musical piece. This information is based on either user inputs (if given), computationally-determined value(s), or a combination of both. The time length of the piece specified by the system user is provided to the Length Generation Subsystem (B2) and this subsystem generates the start and stop locations of the piece of music that is to be composed during the during the automated music composition and generation process of the present invention.

In the illustrative embodiment, the Length Generation Subsystem B2 obtains the timing map information from subsystem B41 and determines the length of the musical piece. By default, if the musical piece is being created to accompany any previously existing content, then the length of the musical piece will equal the length of the previously existing content. If a user wants to manually input the desired length, then the user can either insert the desired lengths in any time format, such as [hours: minutes: seconds] format, or can visually input the desired length by placing digital milestones, including, but not limited to, "music start" and "music stop" on a graphically displayed timeline. This process may be replicated or autonomously completed by the subsystem itself. For example, a user using the system interface of the system, may select a point along the graphically displayed timeline to request (i) the "music start," and (ii) that the music last for thirty seconds, and then request (through the system interface) the subsystem to automatically create the "music stop" milestone at the appropriate time.

As shown in FIG. 27F, the Length Generation Subsystem B2 receives, as input, the length selected by the system user (or otherwise specified by the system automatically), and using this information, determines the start point of musical piece along a musical score representation maintained in the memory structures of the system. As shown in FIG. 27F, the output from the Length Generation Subsystem B2 is shown as single point along the timeline of the musical piece under composition.

Specification of the Tempo Generation Subsystem (B3)

FIG. 27G shows the Tempo Generation Subsystem B3 used in the Automated Music Composition and Generation Engine of the present invention. In general, the Tempo Generation Subsystem B3 determines the tempo(s) that the musical piece will have when completed. This information is based on either user inputs (if given), compute-determined value(s), or a combination of both. Tempo, or the speed at which a piece of music is performed or played, is a fundamental building block of any musical piece. In principle, the tempo of the piece (i.e. measured in beats per minute or BPM) is computed based on the piece time length and musical experience parameters that are provided to this subsystem by the system user(s), and used during the automated music composition and generation process of the present invention.

As shown in FIG. 27G, the Tempo Generation Subsystem B3 is supported by the tempo parameter table shown in FIG. 28A and parameter selection mechanisms (e.g. random number generator, or lyrical-input based parameter selector). As shown in FIG. 28A, a different probability table (i.e. sub-table) is generated by subsystem B51 for each potential emotion-type musical experience descriptor which the system user may select during the musical experience specification stage of the process, using the GUI-based Input Output Subsystem B0, in the illustrative embodiments. For purposes of illustration only, while exemplary probabilistic (music-theoretic) system operating parameter (SOP) tables are shown in FIGS. 28A, 28B and 28C for a wide array of possible emotions, which the system user may have selected, it is understood that only the system operating parameter tables corresponding to the emotion-type and style-type descriptors actually selected by the system user will be actually generated by the Parameter Transformation Engine Subsystem B51, and then distributed to and loaded within their respective subsystems during the execution of the automated music composition process of the present invention.

The Parameter Transformation Engine Subsystem B51 generates probability-weighted tempo parameter tables for the various musical experience descriptors selected by the system user and provided to the Input Subsystem B0. In FIG. 27G, probability-based parameter tables employed in the subsystem B3 are set up for the exemplary "emotion-type" musical experience descriptor—HAPPY—and used during the automated music composition and generation process so as to generate a part of the piece of music being composed, as illustrated in the musical score representation illustrated at the bottom of FIG. 27G.

As illustrated in FIG. 27G, the tempo of the musical piece under composition is selected from the probability-based tonality parameter table loaded within the subsystem B3 using a random number generator which, in the illustrative embodiment, decides which parameter from the parameter table will be selected. In alternative embodiments, however, such as shown in FIGS. 37 through 49, where lyrical or language/speech/song/music input is supported by the system, the parameter selection mechanism within the subsystem can use more advanced methods. For example, in such cases, the parameter selection mechanism within each subsystem can make a selection of parameter values based on a criteria established within the subsystem that relates to the actual pitch, rhythm and/or harmonic features of the lyrical or other language/speech/song input received by the system from the system user. Such variations and modifications will effectively constrain the decision paths available within each subsystem during the automated music composition process, but at the same time, allow for music being composed to transition from commodity-type music to more artistic-type music, as may be required or desired in many applications.

Taking into consideration the output of the Length Generation Subsystem B2, the Tempo Generation Subsystem creates the tempo(s) of the piece. For example, a piece with an input emotion-type descriptor "Happy", and a length of thirty seconds, might have a one third probability of using a tempo of sixty beats per minute, a one third probability of using a tempo of eighty beats per minute, and a one third probability of using a tempo of one hundred beats per minute. If there are multiple sections and or starts and stops in the music, then music timing parameters, and/or multiple tempos might be selected, as well as the tempo curve that adjusts the tempo between sections. This curve can last a significant amount of time (for example, many measures) or can last no time at all (for example, an instant change of tempo).

As shown in FIG. 27G, the Tempo Generation Subsystem B3 is supported by the tempo tables shown in FIG. 28G and a parameter selection mechanism (e.g. a random number generator, or lyrical-input based parameter selector described above).

The Parameter Transformation Engine Subsystem B51 generates probability-weighted tempo parameter tables for the various musical experience descriptors selected by the system user using the input subsystem B0. In FIG. 27G, probability-based parameter tables employed in the subsystem B3 are set up for the exemplary "emotion-type" musical experience descriptor—HAPPY—and used during the automated music composition and generation process so as to generate a part of the piece of music being composed. The tempo of the piece is selected using the probability-based tempo parameter table setup within the subsystem B3. The output from the Tempos Generation Subsystem B3 is a full rest symbol, with an indication that there will be 60 beats per minute, in the exemplary piece of music, as shown in FIG. 27G. There is no meter assignment determined at this stage of the automated music composition process.

Specification of the Meter Generation Subsystem (B4)

FIG. 27H shows the Meter Generation Subsystem (B4) used in the Automated Music Composition and Generation Engine and System of the present invention. Meter, or the recurring pattern of stresses or accents that provide the pulse or beat of music, is a fundamental building block of any musical piece. In general, the Meter Generation Subsystem determines the meter(s) of the musical piece that is being generated. This information is based on either user inputs (if given), computationally-determined value(s), or a combination of both. In general, the meter of the musical piece being composed is computed based on the piece time length and musical experience parameters that are provided to this subsystem, wherein the resultant tempo is measured in beats per minute (BPM) and is used during the automated music composition and generation process of the present invention.

As shown in FIG. 27H, the Meter Generation Subsystem B4 is supported by meter parameter tables shown in FIG. 28C and also a parameter selection mechanism (e.g. a random number generator, or lyrical-input based parameter selector described above).

The Parameter Transformation Engine Subsystem B51 generates probability-weighted parameter tables for the various musical experience descriptors selected by the system user using the input subsystem B0. In FIG. 27H, probability-based parameter tables employed in the subsystem B11 are set up for the exemplary "emotion-type" musical experience descriptor—HAPPY—and used during the automated music composition and generation process so as to generate a part of the piece of music being composed, as illustrated in the musical score representation illustrated at the bottom of FIG. 27H. The meter of the piece is selected using the probability-based meter parameter table setup within the subsystem B4. The output from the Meter Generation Subsystem B4 is a full rest symbol, with an indication that there will be 60 quarter notes in the exemplary piece of music, and 4/4 timing, as indicated in FIG. 27H. Notably, 4/4 timing means that the piece of music being composed will call for four (4) quarter notes to be played during each measure of the piece.

Specification of the Key Generation Subsystem (B5)

FIG. 27I shows the Key Generation Subsystem (B5) used in the Automated Music Composition and Generation Engine of the present invention. Key, or a specific scale or series of notes that define a particular tonality, is a fundamental building block of any musical piece. In general, the Key Generation Subsystem B5 determines the keys of the musical piece that is being generated. The Key Generation Subsystem B5 determines what key(s) the musical piece will have. This information is based on either user inputs (if given), computationally-determined value(s), or a combination of both. Also, the key of the piece is computed based on musical experience parameters that are provided to the system by the system user(s). The resultant key is selected and used during the automated music composition and generation process of the present invention.

As shown in FIG. 27I, this subsystem is supported by the key parameter table shown in FIG. 28D, and also parameter selection mechanisms (e.g. a random number generator, or lyrical-input based parameter selector as described hereinabove).

The Parameter Transformation Engine Subsystem B51 generates probability-weighted key parameter tables for the various musical experience descriptors selected, from the input subsystem B0. In FIG. 27I, probability-based key parameter tables employed in the subsystem B5 are set up for the exemplary "emotion-type" musical experience descriptor—HAPPY—and used during the automated music composition and generation process so as to generate a part of the piece of music being composed. The key of the piece is selected using the probability-based key parameter table setup within the subsystem B5. The output from the Key Generation Subsystem B5 is indicated as a key signature applied to the musical score representation being managed by the system, as shown in FIG. 27I.

Specification of the Beat Calculator Subsystem (B6)

FIG. 27J shows the Beat Calculator Subsystem (B6) used in the Automated Music Composition and Generation Engine of the present invention. The Beat Calculator Subsystem determines the number of beats in the musical piece. This information is based on either user inputs (if given), compute-determined value(s), or a combination of both. Beat, or the regular pulse of music which may be dictated by the rise or fall of the hand or baton of a conductor, by a metronome, or by the accents in music, is a fundamental building block of any musical piece. The number of beats in the piece is computed based on the piece length provided to the system and tempo computed by the system, wherein the resultant number of beats is used during the automated music composition and generation process of the present invention.

As shown in FIG. 27J, the Beat Calculator Subsystem B6 is supported by a beat calculation mechanism that is schematically illustrated in FIG. 27J. This subsystem B6 calculates number of beats in the musical piece by multiplying the length of a piece by the inverse of the tempo of the piece, or by multiplying the length of each section of a piece by the inverse of the tempo of the corresponding section and adding the results. For example, a thirty second piece of music with a tempo of sixty beats per minute and a meter of 4/4 would have [30 seconds*1/60 beats per minute] thirty beats, where each beat represents a single quarter note in each measure. The output of the Beat Calculator Subsystem B6 is the calculated number of beats in the piece of music being composed. The case example, 32 beat have been calculated, as shown represented on the musical score representation being managed by the system, as shown in FIG. 27J.

Specification of the Measure Calculator Subsystem (B8)

FIG. 27K shows the Measure Calculator Subsystem (B8) used in the Automated Music Composition and Generation Engine and System of the present invention. The Measure Calculator Subsystem B8 determines the number of complete and incomplete measures in a musical piece. This information is based on either user inputs (if given), compute-determined value(s), or a combination of both. Measure, or a signifier of the smallest metrical divisions of a musical piece, containing a fixed number of beats, is a fundamental building block of any musical piece. The number of measures in the piece is computed based on the number of beats in the piece, and the computed meter of the piece, wherein the meters in the piece is used during the automated music composition and generation process of the present invention.

As shown in FIG. 27K, the Measure Calculator Subsystem B8 is supported by a beat calculation mechanism that is schematically illustrated in FIG. 27K. This subsystem, in a piece with only one meter, divides the number of beats in each piece of music by the numerator of the meter(s) of the piece to determine how many measures are in the piece of music. For example, a thirty second piece of music with a tempo of sixty beats per minute, a meter of 4/4, and thus thirty beats, where each beat represents a single quarter note in each measure, would have [30/4] seven and a half measures. The output of the Measure Calculator Subsystem B8 is the calculated number of meters in the piece of music being composed. In the example, 8 meters are shown represented on the musical score representation being managed by the system, as shown in FIG. 27K.

Specification of the Tonality Generation Subsystem (B7)

FIG. 27L shows the Tonality Generation Subsystem (B7) used in the Automated Music Composition and Generation Engine and System of the present invention. Tonality, or the principal organization of a musical piece around a tonic based upon a major, minor, or other scale, is a fundamental building block of any musical piece. The Tonality Generation Subsystem determines the tonality or tonalities of a musical piece. This information is based on either user inputs (if given), computationally-determined value(s), or a combination of both.

As shown in FIG. 27L, this subsystem B7 is supported by tonality parameter tables shown in FIG. 28E, and also a parameter selection mechanism (e.g. random number generator, or lyrical-input based parameter selector).

Each parameter table contains probabilities that sum to 1. Each specific probability contains a specific section of the 0-1 domain. If the random number is within the specific section of a probability, then it is selected. For example, if two parameters, A and B, each have a 50% chance of being selected, then if the random number falls between 0-0.5, it will select A, and if it falls between 0.5-1, it will select B.

The number of tonality of the piece is selected using the probability-based tonality parameter table setup within the subsystem B7. The Parameter Transformation Engine Subsystem B51 generates probability-weighted tonality parameter tables for the various musical experience descriptors selected by the system user and provided to the input subsystem B0. In FIG. 27L, probability-based parameter tables employed in the subsystem B7 are set up for the exemplary "emotion-type" musical experience descriptor—HAPPY—and used during the automated music composition and generation process so as to generate a part of the piece of music being composed, as illustrated in the musical score representation illustrated at the bottom of FIG. 27L.

Taking into consideration all system user inputs provided to subsystem B0, this system B7 creates the tonality(s) of the piece. For example, a piece with an input descriptor of "Happy," a length of thirty seconds, a tempo of sixty beats per minute, a meter of 4/4, and a key of C might have a two thirds probability of using a major tonality or a one third probability of using a minor tonality. If there are multiple sections, music timing parameters, and/or starts and stops in the music, then multiple tonalities might be selected. The output of the Tonality Generation Subsystem B7 is the selected tonality of the piece of music being composed. In the example, a "Major scale" tonality is selected in FIG. 27L.

Specification of the Song Form Generation Subsystem (B9)

FIGS. 27M1 and 27M2 show the Song Form Generation Subsystem (B9) used in the Automated Music Composition and Generation Engine of the present invention. Form, or the structure of a musical piece, is a fundamental building block of any musical piece. The Song Form Generation Subsystem determines the song form of a musical piece. This information is based on either user inputs (if given), computationally-determined value(s), or a combination of both.

As shown in FIGS. 27M1 and 27M2, this subsystem is supported by the song form parameter tables and song form sub-phrase tables illustrated in FIG. 28F, and a parameter selection mechanisms (e.g. random number generator, or lyrical-input based parameter selector).

In general, the song form is selected using the probability-based song form sub-phrase parameter table set up within the subsystem B9. The Parameter Transformation Engine Subsystem B51 generates a probability-weighted song form parameters for the various musical experience descriptors selected by the system user and provided to the Input Subsystem B0. In FIGS. 27M1 and 27M2, probability-based parameter tables employed in the subsystem B9 are set up for the exemplary "emotion-type" musical experience descriptor—HAPPY—and used during the automated music composition and generation process so as to generate a part of the piece of music being composed, as illustrated in the musical score representation illustrated at the bottom of the figure drawing.

Taking into consideration all system user inputs provided to subsystem B0, the subsystem B9 creates the song form of the piece. For example, a piece with an input descriptor of "Happy," a length of thirty seconds, a tempo of sixty beats per minute, and a meter of 4/4 might have a one third probability of a form of ABA (or alternatively described as Verse Chorus Verse), a one third probability of a form of AAB (or alternatively described as Verse Verse Chorus), or a one third probability of a form of AAA (or alternatively described as Verse Verse Verse). Further each section of the song form may have multiple sub-sections, so that the initial section, A, may be comprised of subsections "aba" (following the same possible probabilities and descriptions described previously). Even further, each sub-section may be have multiple motifs, so that the subsection "a" may be comprised of motifs "i, ii, iii" (following the same possible probabilities and descriptions described previously).

All music has a form, even if the form is empty, unorganized, or absent. Pop music traditionally has form elements including Intro, Verse, Chorus, Bridge, Solo, Outro, etc. Each form element can be represented with a letter to help communicate the overall piece's form in a concise manner, so that a song with form Verse Chorus Verse can also be represented as A B A. Song form phrases can also have sub-phrases that provide structure to a song within the phrase itself. If a verse, or A section, consists of two repeated stanzas, then the sub-phrases might be "aa."

As shown in FIGS. 27M1 and 27M2, the Song Form Generation Subsystem B9 receives and loads as input, song form tables from subsystem B51. While the song form is selected from the song form table using the random number generator, although it is understood that other lyrical-input based mechanisms might be used in other system embodiments as shown in FIGS. 37 through 49. Thereafter, the song form sub-phrase parameter tables are loaded and the random number generator selects, in a parallel manner, a sub-phrase is selected for the first and second sub-phrase sections of the phrase using a random number generator, although it is understood other selection mechanisms may be employed. The output from the Song Form Generation Subsystem B9 is the selected song form, and the selected sub-phrases.

Specification of the Sub-Phrase Length Generation Subsystem (B15)

FIG. 27N shows the Sub-Phrase Length (Rhythmic Length) Generation Subsystem (B15) used in the Automated Music Composition and Generation Engine and System of the present invention. Rhythm, or the subdivision of a space of time into a defined, repeatable pattern or the controlled movement of music in time, is a fundamental building block of any musical piece. The Sub-Phrase Length Generation Subsystem B15 determines the length or rhythmic length of each sub-phrase (alternatively described as a sub-section or motif) in the musical piece being composed. This information is based on either user inputs (if given), compute-determined value(s), or a combination of both.

As shown in FIG. 27N, the Sub-Phrase Length (Rhythmic Length) Generation Subsystem B15 is supported by the sub-phrase length (i.e. rhythmic length) parameter tables shown in FIG. 28G, and parameter selection mechanisms (e.g. random number generator, or lyrical-input based parameter selector).

The Parameter Transformation Engine Subsystem B51 generates a probability-weighted set of sub-phrase length parameter tables for the various musical experience descriptors selected by the system user and provided to the input subsystem B0. In FIG. 27N, probability-based parameter tables employed in the subsystem B11 are set up for the exemplary "emotion-type" musical experience descriptor—HAPPY—and used during the automated music composition and generation process so as to generate a part of the piece of music being composed, as illustrated in the musical score representation illustrated at the bottom of FIG. 27N.

The Sub-Phrase Length Generation Subsystem (B15) determines the length of the sub-phrases (i.e. rhythmic length) within each phrase of a piece of music being composed. These lengths are determined by (i) the overall length of the phrase (i.e. a phrase of 2 seconds will have many fewer sub-phrase options that a phrase of 200 seconds), (ii) the timing necessities of the piece, and (iii) the emotion-type and style-type musical experience descriptors.

Taking into consideration all system user inputs provided to the subsystem B0, this system B15 creates the sub-phrase lengths of the piece. For example, a 30 second piece of music might have four sub-subsections of 7.5 seconds each, three sub-sections of 10 seconds, or five subsections of 4, 5, 6, 7, and 8 seconds.

For example, as shown in the Sub-Phrase Length Generation Subsystem (B15), the sub-phrase length tables are loaded, and for each sub-phrase in the selected song form, the subsystem B15, in parallel manner, selects length measures for each sub-phrase and then creates a sub-phrase length (i.e. rhythmic length) table as output from the subsystem, as illustrated in the musical score representation set forth at the bottom of FIG. 27N.

Specification of the Chord Length Generation Subsystem (B11)

FIGS. 27O1, 27O2, 27O3 and 27O4 show the Chord Length Generation Subsystem (B11) used in the Automated Music Composition and Generation Engine and System of the present invention. Rhythm, or the subdivision of a space of time into a defined, repeatable pattern or the controlled movement of music in time, is a fundamental building block of any musical piece. The Chord Length Generation Subsystem B11 determines rhythm (i.e. default chord length(s)) of each chord in the musical piece. This information is based on either user inputs (if given), computationally-determined value(s), or a combination of both.

As shown in FIGS. 27O1 through 27O4, the Chord Length Generation Subsystem B11 is supported by the chord length parameter tables illustrated in FIG. 28H, and parameter selection mechanisms (e.g. random number generator, or lyrical-input based parameter selector) as described above.

In general, the chord length is selected using the probability-based chord length parameter table set up within the subsystem based on the musical experience descriptors provided to the system by the system user. The selected chord length is used during the automated music composition and generation process of the present invention so as to generate a part of the piece of music being composed, as illustrated in the musical score representation illustrated at the bottom of FIG. 27O4.

The Parameter Transformation Engine Subsystem B51 generates the probability-weighted set of chord length parameter tables for the various musical experience descriptors selected by the system user and provided to the input subsystem B0. In FIGS. 27O1 through 27O4, probability-based parameter tables employed in the subsystem B11 are set up for the exemplary "emotion-type" musical experience descriptor—HAPPY—and used during the automated music composition and generation process so as to generate a part of the piece of music being composed, as illustrated in the musical score representation illustrated at the bottom of the figure drawing.

The subsystem B11 uses system-user-supplied musical experience descriptors and timing parameters, and the parameter tables loaded to subsystem B11, to create the chord lengths throughout the piece (usually, though not necessarily, in terms of beats and measures). For example, a chord in a 4/4 measure might last for two beats, and based on this information the next chord might last for 1 beat, and based on this information the final chord in the measure might last for 1 beat. The first chord might also last for one beat, and based on this information the next chord might last for 3 beats.

As shown in FIGS. 27O1 through 27O4, the chord length tables shown in FIG. 28H are loaded from subsystem B51, and in a parallel manner, the initial chord length for the first sub-phrase a is determined using the initial chord length table, and the second chord length for the first sub-phrase a is determined using both the initial chord length table and the second chord length table, as shown. Likewise, the initial chord length for the second sub-phrase b is determined using the initial chord length table, and the second chord length for the second sub-phrase b is determined using both the initial chord length table and the second chord length table. This process is repeated for each phrase in the selected song form A B A in the case example. As shown, the output from the Chord Length Generation Subsystem B11 is the set of sub-phrase chord lengths, for the phrase A B A in the selected song form. These sub-phrase chord lengths are graphically represented on the musical score representation shown in FIG. 27O4.

Specification of the Unique Sub-Phrase Generation Subsystem (B14)

FIG. 27P shows the Unique Sub-Phrase Generation Subsystem (B14) used in the Automated Music Composition and Generation Engine and System of the present invention. The Unique Sub-Phrase Generation Subsystem B14 determines how many unique sub-phrases are in each phrase in the musical piece being composed. This information is based on either user inputs (if given), computationally-determined value(s), or a combination of both, and is a fundamental building block of any musical piece.

As shown in FIG. 27P, this subsystem B14 is supported by a Sub-Phrase Analyzer and a Chord Length Analyzer. The primary function of the Sub-Phrase Analyzer in the Unique Sub-Phrase Generation Subsystem B20 is to determine the functionality and possible derivations of a sub-phrase or sub-phrases. During operation, the Sub-Phrase Analyzer uses the tempo, meter, form, chord(s), harmony(s), and structure of a piece, section, phrase, or other length of a music piece to determine its output. The primary function of Chord Length Analyzer in the Unique Sub-Phrase Generation Subsystem B20 is to determine the length of a chord and/or sub-phrase. During operation, the Chord Length Analyzer uses the tempo, meter, form, chord(s), harmony(s), and structure of a piece, section, phrase, or other length of a music piece to determine its output.

As shown in FIG. 27P, the Unique Sub-Phrase Generation Subsystem B14 uses the Sub-Phrase Analyzer and the Chord Length Analyzer to automatically analyze the data output (i.e. set of sub-phrase length measures) produced from the Sub-Phrase Length (Rhythmic Length) Generation Subsystem B15 to generate a listing of the number of unique sub-phrases in the piece. For example, if a 30 second piece of music has four 7.5 second sub-phrases, then there might be four unique sub-phrases that each occur once, three unique sub-phrases (two of which occur once each and one of which occurs twice), two unique sub-phrases that occur twice each, or one unique sub-phrase that occurs four times, and the Unique Sub-Phrase Generation Subsystem B14 will automatically make such determinations during the automated music composition and generation process of the present invention.

Specification of the Number of Chords in Sub-Phrase Calculation Subsystem (B16)

FIG. 27Q shows the Number Of Chords In Sub-Phrase Calculation Subsystem (B16) used in the Automated Music Composition and Generation Engine and System of the present invention. The Number of Chords in Sub-Phrase Calculator determines how many chords are in each sub-phrase. This information is based on either user inputs (if given), computationally-determined value(s), or a combination of both and is a fundamental building block of any musical piece. The number of chords in a sub-phrase is calculated using the computed unique sub-phrases, and wherein the number of chords in the sub-phrase is used during the automated music composition and generation process of the present invention.

As shown in FIG. 27Q, this subsystem B16 is supported by a Chord Counter. During operation, subsystem B16 combines the outputs from subsystem B11, B14, and B15 to calculate how many chords are in each sub-phrase. For example, if every chord length in a two-measure sub-phrase is one measure long, then there are two chords in the sub-phrase, and this data will be produced as output from the Number Of Chords In Sub-Phrase Calculation Subsystem B16.

Specification of the Phrase Length Generation Subsystem (B12)

FIG. 27R shows a schematic representation of the Phrase Length Generation Subsystem (B12) used in the Automated Music Composition and Generation Engine and System of the present invention. Rhythm, or the subdivision of a space of time into a defined, repeatable pattern or the controlled movement of music in time, is a fundamental building block of any musical piece. The Phrase Length Generation Subsystem B12 determines the length or rhythm of each phrase in the musical piece. This information is based on either user inputs (if given), computationally-determined value(s), or a combination of both. The lengths of the phrases are measured using a phrase length analyzer, and the length of the phrases (in number of measures) are then used during the automated music composition and generation process of the present invention.

As shown in FIG. 27R, this subsystem B12 is supported by a Phrase Length Analyzer. The primary functionality of the Phrase length Analyzer is to determine the length and/or rhythmic value of a phrase. The Phrase Length Analyzer considers the length(s) and/or rhythmic value(s) of all sub-phrases and other structural elements of a musical piece, section, phrase, or additional segment(s) to determine its output.

Taking into consideration inputs received from subsystem B1, B31 and/or B40, the subsystem B12 creates the phrase lengths of the piece of music being automatically composed. For example, a one-minute second piece of music might have two phrases of thirty seconds or three phrases of twenty seconds. The lengths of the sub-sections previously created are used to inform the lengths of each phrase, as a combination of one or more sub-sections creates the length of the phrase. The output phrase lengths are graphically illustrated in the music score representation shown in FIG. 27R Specification of the Unique Phrase Generation Subsystem (B10)

FIG. 27S shows the Unique Phrase Generation Subsystem (B10) used in the Automated Music Composition and Generation Engine of the present invention. Phrase, or a musical unit often regarded as a dependent division of music, is a fundamental building block of any musical piece. The Unique Phrase Generation Subsystem B10 determines how many unique phrases will be included in the musical piece. This information is based on either user inputs (if given), computationally-determined value(s), or a combination of both. The number of unique phrases is determined using a phrase analyzer within subsystem B10, and number of unique phrases is then used during the automated music composition and generation process of the present invention.

As shown in FIG. 27S, the subsystem B10 is supported by a Phrase (Length) Analyzer. The primary functionality of the Phrase Length Analyzer is to determine the length and/or rhythmic value of a phrase. The Phrase Length Analyzer considers the length(s) and/or rhythmic value(s) of all sub-phrases and other structural elements of a musical piece, section, phrase, or additional segment(s) to determine its output.

Within the Unique Phrase Generation Subsystem (B10), the Phrase Analyzer analyzes the data supplied from subsystem B12 so as to generate a listing of the number of unique phrases or sections in the piece to be composed. If a one-minute piece of music has four 15 second phrases, then there might be four unique phrases that each occur once, three unique phrases (two of which occur once each and one of which occurs twice), two unique phrases that occur twice each, or one unique phrase that occurs four times, and this data will be produced as output from Subsystem B10.

Specification of the Number of Chords in Phrase Calculation Subsystem (B13)

FIG. 27T shows the Number Of Chords In Phrase Calculation Subsystem (B13) used in the Automated Music Composition and Generation Engine of the present invention. The Number of Chord in Phrase Calculator determines how many chords are in each phrase. This information is based on either user inputs (if given), computationally-determined value(s), or a combination of both and is a fundamental building block of any musical piece.

As shown in FIG. 27T, the subsystem B13 is supported by a Chord Counter. The primary functionality of the Chord Counter is to determine the number of chords in a phrase. Chord Counter within subsystem B13 determines the number of chords in each phrase by dividing the length of each phrase by the rhythms and/or lengths of the chords within the phrase. For example, a 30 second phrase having a tempo of 60 beats per minute in a 4/4 meter that has consistent chord lengths of one quarter note throughout, would have thirty chords in the phrase. The computed number of chords in a phrase is then provided as output from subsystem B13 and used during the automated music composition and generation process of the present invention.

Specification of the Initial General Rhythm Generation Subsystem (B17)

FIG. 27U shows the Initial General Rhythm Generation Subsystem (B17) used in the Automated Music Composition and Generation Engine and System of the present invention. A chord, or the sounding of two or more notes (usually at least three) simultaneously, is a fundamental building block of any musical piece. The Initial General Rhythm Generation Subsystem B17 determines the initial chord or note(s) of the musical piece being composed. This information is based on either user inputs (if given), computationally-determined value(s), or a combination of both.

As shown in FIG. 27U, the Initial General Rhythm Generation Subsystem B17 is supported by initial chord root note tables shown in FIG. 28I and chord function table shown in FIG. 28I, a Chord Tonality Analyzer and parameter selection mechanisms (e.g. random number generator, or lyrical-input based parameter selector) described above. The primary function of the Chord Function Tonality Analyzer is to determine the tonality of a chord or other harmonic material and thus determines the pitches included in the tonality. During operation, the Chord Function Tonality Analyzer considers the key(s), musical function(s), and root note(s) of a chord or harmony to determine its tonality.

The Parameter Transformation Engine Subsystem B51 generates the probability-weighted data set of root notes and chord function (i.e. parameter tables) for the various musical experience descriptors selected by the system user and supplied to the input subsystem B0. In FIG. 27U, probability-based parameter tables (i.e. the probability-based initial chord root tables and probability-based chord function table) employed in the subsystem 27U are set up for the exemplary "emotion-type" musical experience descriptor—HAPPY—and used during the automated music composition and generation process.

Subsystem B17 uses parameter tables generated and loaded by subsystem B51 so as to select the initial chord of the piece. For example, in a "Happy" piece of music in C major, there might be a one third probability that the initial chord is a C major triad, a one third probability that the initial chord is a G major triad, and a one third probability that the initial chord is an F major triad.

As shown in FIG. 27U, the subsystem B17 accesses the initial chord root note table and using a random number generator or other parameter selection mechanism, selects an initial root note (e.g. initial root note=7 in the case example). Thereafter, the subsystem B17 accesses the chord function table shown in FIG. 28I, and using a random number generator or other parameter selection mechanism, selects an initial chord function (e.g. initial chord function=1 in the case example). Then the subsystem B17 uses the Chord Function Analyzer to consider the key(s), musical function(s), and root note(s) of a chord or harmony to determine the tonality of the initial chord function. As shown, the Major Triad is identified as the initial chord function tonality, and the initial chord is identified as a G Major Triad, which are shown on the musical score representation shown in FIG. 27U.

Specification of the Sub-Phrase Chord Progression Generation Subsystem (B19)

FIGS. 27V1, 27V2 and 27V3 show the Sub-Phrase Chord Progression Generation Subsystem (B19) used in the Automated Music Composition and Generation Engine of the present invention. Chord, or the sounding of two or more notes (usually at least three) simultaneously, is a fundamental building block of any musical piece. The Sub-Phrase Chord Progression Generation Subsystem B19 determines what the chord progression will be for each sub-phrase of the musical piece. This information is based on either user inputs (if given), computationally-determined value(s), or a combination of both.

As shown in 27V1, 27V2 and 27V3, the Sub-Phrase Chord Progression Generation Subsystem B19 is supported by the chord root tables, chord function root modifier tables, the chord root modifier tables, the current function tables, and the beat root modifier table tables shown in FIGS. 28J1 and 28J2, a Beat Analyzer, and a parameter selection mechanism (e.g. random number generator, or lyrical-input based parameter selector). The primary function of the Beat Analyzer is to determine the position in time of a current or future musical event(s). The beat analyze uses the tempo, meter, and form of a piece, section, phrase, or other structure to determine its output.

The Parameter Transformation Engine Subsystem B51 generates the probability-weighted set of sub-phrase chord progression parameter tables for the various musical experience descriptors selected by the system user and supplied to the input subsystem B0. The probability-based parameter tables (i.e. chord root table, chord function root modifier table, and beat root modifier table) employed in the subsystem is set up for the exemplary "emotion-type" musical experience descriptor—HAPPY—and used during the automated music composition and generation process of the present invention.

As shown in FIGS. 27V1 and 27V2, the Subsystem B19 accessed the chord root tables generated and loaded by subsystem B51, and uses a random number generator or suitable parameter selection mechanism to select the initial chord of the piece. For example, in a "Happy" piece of music in C major, with an initial sub-phrase chord of C major, there might be a one third probability that the next chord is a C major triad, a one third probability that the next chord is a G major triad, and a one third probability that the next chord is an F major triad. This model takes into account every possible preceding outcome, and all possible future outcomes, to determine the probabilities of each chord being selected. This process repeats from the beginning of each sub-phrase to the end of each sub-phrase.

As indicated in FIGS. 27V2 and 27V3, the subsystem B19 accesses the chord function modifier table loaded into the subsystem, and adds or subtracts values to the original root note column values in the chord root table.

Then as indicated in FIGS. 27V2 and 27V3, the subsystem B19 accesses the beat root modifier table loaded into the subsystem B19, as shown, and uses the Beat Analyzer to determine the position in time of a current or future musical event(s), by considering the tempo, meter, and form of a piece, section, phrase, or other structure, and then selects a beat root modifier. In the case example, the upcoming beat in the measure equals 2.

The subsystem B19 then adds the beat root modifier table values to or subtracted from the original root note column values in the chord root table.

As shown in FIG. 27V3, using a random number generator, or other parameter selection mechanism, the subsystem B19 selects the next chord root.

Beginning with the chord function root modifier table, the process described above is repeated until all chords have been selected.

As shown in FIG. 27V3, the chords which have been automatically selected by the Sub-Phrase Chord Progression Generation Subsystem B19 are graphically shown on the musical score representation for the piece of music being composed.

Specification of the Phrase Chord Progression Generation Subsystem (B18)

FIG. 27W shows the Phrase Chord Progression Generation Subsystem (B18) used in the Automated Music Composition and Generation Engine and System of the present invention. A chord, or the sounding of two or more notes (usually at least three) simultaneously, is a fundamental building block of any musical piece. The Phrase Chord Progression Generation Subsystem B18 determines, except for the initial chord or note(s), the chords of each phrase in the musical piece. This information is based on either user inputs (if given), computationally-determined value(s), or a combination of both. In general, phrase chord progression is determined using the sub-phrase analyzer, and wherein improved phrases are used during the automated music composition and generation process of the present invention so as to generate a part of the piece of music being composed, as illustrated in the musical score representation illustrated at the bottom of the figure.

As shown in FIG. 27W, the Phrase Chord Progression Generation Subsystem B18 is supported by a Sub-Phrase (Length) Analyzer. The primary function of the Sub-Phrase (Length) Analyzer is to determine the position in time of a current or future musical event(s). The beat analyze uses the tempo, meter, and form of a piece, section, phrase, or other structure to determine its output.

During operation, Phrase Chord Progression Generation Subsystem B18 receives the output from Initial Chord Generation Subsystem B17 and modifies, changes, adds, and deletes chords from each sub-phrase to generate the chords of each phrase. For example, if a phrase consists of two sub-phrases that each contain an identical chord progression, there might be a one half probability that the first chord in the second sub-phrase is altered to create a more musical chord progression (following a data set or parameter table created and loaded by subsystem B51) for the phrase and a one half probability that the sub-phrase chord progressions remain unchanged.

Specification of the Chord Inversion Generation Subsystem (B20)

FIGS. 27X1, 27X2 and 27X3 show the Chord Inversion Generation Subsystem (B20) used in the Automated Music Composition and Generation Engine of the present invention. The Chord Inversion Generation Subsystem B20 determines the inversion of each chord in the musical piece. This information is based on either user inputs (if given), computationally-determined value(s), or a combination of both. Inversion, or the position of notes a chord, is a fundamental building block of any musical piece. Chord inversion is determined using the initial chord inversion table and the chord inversion table.

As shown in FIGS. 27X1 and 27X2, this Subsystem B20 is supported by the initial chord inversion table and the chord inversion table shown in FIG. 28K, and parameter selection mechanisms (e.g. random number generator or lyrical-input based parameter selector).

The Parameter Transformation Engine Subsystem B51 generates the probability-weighted set of chord inversion parameter tables for the various musical experience descriptors selected by the system user and provided to the input subsystem B0. In FIGS. 27X1 through 27X3, the probability-based parameter tables (i.e. initial chord inversion table, and chord inversion table) employed in the subsystem are set up for the exemplary "emotion-type" musical experience descriptor—HAPPY.

As shown in FIGS. 27X1 and 27X2, the Subsystem B20 receives, as input, the output from the Subsystem B19, and accesses the initial chord inversion tables and chord inversion tables shown in FIG. 28K and loaded by subsystem B51. The subsystem B20 determines an initial inversion for each chord in the piece, using the random number generator or other parameter selection mechanism.

For example, if a C Major triad is in root position (C, E, G) and the next chord is a G Major triad, there might be a one third probability that the G Major triad is in root position, a one third probability that the G Major triad is in the first inversion (E, G, C), or a one third probability that the G Major triad is in the second inversion (G, C, E).

As shown in FIG. 27X3, after the inversion of an initial chord has been determined, the chord inversion selection process is repeated until all chord inversions have been selected. All previous inversion determinations affect all future ones. An upcoming chord inversion in the piece of music, phrase, sub-phrase, and measure affects the default landscape of what chord inversions might be selected in the future.

As shown in FIG. 27X3, the final list of inverted chords are shown graphically displayed in the musical score representation located at the bottom of FIG. 27X3.

Specification of the Melody Sub-Phrase Length Generation Subsystem (B25)

FIG. 27Y shows the Melody Sub-Phrase Length Generation Subsystem (B25) used in the Automated Music Composition and Generation Engine of the present invention. Rhythm, or the subdivision of a space of time into a defined, repeatable pattern or the controlled movement of music in time, is a fundamental building block of any musical piece. The Melody Sub-Phrase Length Generation Subsystem B25 determines the length or rhythm of each melodic sub-phrase in the musical piece. This information is based on either user inputs (if given), computationally-determined value(s), or a combination of both.

As shown in FIG. 27Y, this subsystem B25 is supported by the melody length table shown in FIG. 28L1, and a parameter selection mechanism (e.g. random number generator, or lyrical-input based parameter selector).

The Parameter Transformation Engine Subsystem B51 generates the probability-weighted data set of sub-phrase lengths (i.e. parameter tables) for the various musical experience descriptors selected by the system user and provided to the input subsystem B0. In FIG. 27Y, the probability-based parameter programming tables employed in the subsystem is set up for the exemplary "emotion-type" musical experience descriptor—HAPPY—and used during the automated music composition and generation process of the present invention.

During operation, subsystem B25 uses, as inputs, all previous unique sub-phrase length outputs, in combination with the melody length parameter tables loaded by subsystem B51 to determine the length of each sub-phrase melody.

As indicated in FIG. 27Y, the subsystem B25 uses a random number generator or other parameter selection mechanism to select a melody length for each sub-phrase in the musical piece being composed. For example, in a sub-phrase of 5 seconds, there might be a one half probability that a melody occurs with this sub-phrase throughout the entire sub-phrase and a one half probability that a melody does not occur with this sub-phrase at all. As shown, the melody length selection process is carried out in process for each sub-phrase a, b and c.

As shown in the case example, the output of subsystem B25 is a set of melody length assignments to the musical being composed, namely: the a sub-phrase is assigned a "d" length equal to 6/4; the b sub-phrase is assigned an "e" length equal to 7/4; and the c sub-phrase is assigned an "f" length equal to 6/4.

Specification of the Melody Sub-Phrase Generation Subsystem (B24)

FIGS. 27Z1 and 27Z2 show the Melody Sub-Phrase Generation Subsystem (B24) used in the Automated Music Composition and Generation Engine of the present invention. Melody, or a succession of tones comprised of mode, rhythm, and pitches so arranged as to achieve musical shape, is a fundamental building block of any musical piece. The Melody Sub-Phrase Generation Subsystem determines how many melodic sub-phrases are in the melody in the musical piece. This information is based on either user inputs (if given), computationally-determined value(s), or a combination of both.

As shown in FIGS. 27Z1 and 27Z2, the Melody Sub-Phrase Generation Subsystem B24 is supported by the sub-phrase melody placement tables shown in FIG. 28L2, and parameter selection mechanisms (e.g. random number generator, or lyrical-input based parameter selector) described hereinabove.

The Parameter Transformation Engine Subsystem B51 generates the probability-weighted set of melodic sub-phrase length parameter tables for the various musical experience descriptors selected by the system user and provided to the input subsystem B0. In FIG. 27Z1, the probability-based parameter tables employed in the subsystem B24 are set up for the exemplary "emotion-type" musical experience descriptor—HAPPY—and used during the automated music composition and generation process of the present invention.

As shown in FIGS. 27Z1 and 27Z2, for each sub-phrase melody d, e and f, the Melody Sub-Phrase Generation Subsystem B24 accesses the sub-phrase melody placement table, and selects a sub-phrase melody placement using a random number generator, or other parameter selection mechanism, discussed hereinabove.

As shown in the case example, the subsystem B24 might select a table parameter having one half probability that, in a piece 30 seconds in length with 2 phrases consisting of three 5 second sub-phrases each, each of which could contain a melody of a certain length as determined in B25. This is instance, there is a one half probability that all three sub-phrases' melodic lengths might be included in the first phrase's melodic length and a one half probability that only one of the three sub-phrases' total melodic lengths might be included in the first phrase's total melodic length.

As shown in FIGS. 27Z1 and 27Z2, the subsystem B24 make selections from the parameter tables such that the sub-phrase melody length d shall start 3 quarter notes into the sub-phrase, that that the sub-phrase melody length e shall start 2 quarter notes into the sub-phrase, and that the sub-phrase melody length f shall start 3 quarter notes into the sub-phrase. These starting positions for the sub-phrases are the outputs of the Melody Sub-Phrase Generation Subsystem B24, and are illustrated in the first stave in the musical score representation set forth on the bottom of FIG. 27Z2 for the piece of music being composed by the automated music composition process of the present invention.

Specification of the Melody Phrase Length Generation Subsystem (B23)

FIG. 27AA shows the Melody Phrase Length Generation Subsystem (B23) used in the Automated Music Composition and Generation Engine (E1) and System of the present invention. Melody, or a succession of tones comprised of mode, rhythm, and pitches so arranged as to achieve musical shape, is a fundamental building block of any musical piece. The Melody Phrase Length Generation Subsystem B23 determines the length or rhythm of each melodic phrase in the musical piece. This information is based on either user inputs (if given), computationally-determined value(s), or a combination of both. The resulting phrase length of the melody is used during the automated music composition and generation process of the present invention.

As illustrated in FIG. 27AA, the Melody Phrase Length Generation Subsystem B23 is supported a Sub-Phrase Melody Analyzer. The primary function of the Sub-Phrase Melody Analyzer is to determine a modified sub-phrase structure(s) in order to change an important component of a musical piece to improve the phrase melodies. The Sub-Phrase Melody Analyzer considers the melodic, harmonic, and time-based structure(s) of a musical piece, section, phrase, or additional segment(s) to determine its output. The phase melodies are modified by examining the rhythmic, harmonic, and overall musical context in which they exist, and altering or adjusting them to better fit their context.

As shown in FIG. 27AA, the Melody Phrase Length Generation Subsystem B23 transforms the output of subsystem B24 to the larger phrase-level melodic material. Using the inputs all previous phrase and sub-phrase outputs, in combination with data sets and tables loaded by subsystem B51, this subsystem B23 has the capacity to create a melodic piece having 30 seconds in length with three 10 second phrases, each of which could contain a melody of a certain length as determined in Subsystem B24. All three melodic lengths of all three phrases might be included in the piece's melodic length, or only one of the total melodic lengths of the three phrases might be included in the piece's total melodic length. There are many possible variations in melodic phrase structure, only constrained by the grammar used to generate the phrase and sub-phrase structures of the musical piece being composed by the system (i.e. automated music composition and generation machine) of the present invention.

As shown in FIG. 27AA, the Melody Phrase Length Generation Subsystem B23 outputs, for the case example, (i) the melody phrase length and (ii) the number of quarter notes into the sub-phrase when the melody starts, for each of the melody sub-phrases d, e and f, to form a larger piece of phrase-level melodic material for the musical piece being composed by the automated system of the present invention.

The resulting melody phrase lengths are then used during the automated music composition and generation process to generate the piece of music being composed, as illustrated in the first stave of the musical score representation illustrated at the bottom of the process diagram in FIG. 27AA.

Specification of the Melody Unique Phrase Generation Subsystem (B22)

FIG. 27BB shows the Melody Unique Phrase Generation Subsystem (B22) used in the Automated Music Composition and Generation Engine of the present invention. Melody, or a succession of tones comprised of mode, rhythm, and pitches so arranged as to achieve musical shape, is a fundamental building block of any musical piece. The Melody Unique Phrase Generation Subsystem determines how many unique melodic phrases will be included in the musical piece. This information is based on either user inputs (if given), compute-determined value(s), or a combination of both. The unique melody phrase is determined using the unique melody phrase analyzer. This process takes the outputs of all previous phrase and sub-phrase subsystems and, in determining how many unique melodic phrases need to be created for the piece, creates the musical and non-musical data that subsystem B21 needs in order to operate.

As shown in FIG. 27BB, the Melody Unique Phrase Generation Subsystem B22 is supported by a Unique Melody Phrase Analyzer which uses the melody(s) and other musical events in a musical piece to determine and identify the "unique" instances of a melody or other musical event in a piece, section, phrase, or other musical structure. A unique melody phrase is one that is different from the other melody phrases.

The unique melody phrase analyzer compares all of the melodic and other musical events of a piece, section, phrase, or other structure of a music piece to determine unique melody phrases for its data output.

As shown in FIG. 27BB, the subsystem B22 uses the Unique Melody Phrase Analyzer to determine and identify the unique instances of a melody or other musical event in the melody phrases d, e and f supplied to the input ports of the subsystem B22.

As shown in FIG. 27BB, the output from the Melody Unique Phrase Generation Subsystem B22 is two (2) unique melody phrases.

The resulting unique melody phrases are then used during the subsequent stages of the automated music composition and generation process of the present invention.

Specification of the Melody Length Generation Subsystem (B21)

FIG. 27CC shows the Melody Length Generation Subsystem (B21) used in the Automated Music Composition and Generation Engine of the present invention. Melody, or a succession of tones comprised of mode, rhythm, and pitches so arranged as to achieve musical shape, is a fundamental building block of any musical piece. The Melody Length Generation Subsystem determines the length of the melody in the musical piece. This information is based on either user inputs (if given), compute-determined value(s), or a combination of both. The melody length is determined using the phrase melody analyzer.

As shown in FIG. 27CC, the Melody Length Generation Subsystem B21 is supported by a Phrase Melody Analyzer to determine a modified phrase structure(s) in order to change an important component of a musical piece to improve piece melodies. In general, all phrases can be modified to create improved piece melodies. The Phrase Melody Analyzer considers the melodic, harmonic (chord), and time-based structure(s) (the tempo, meter) of a musical piece, section, phrase, or additional segment(s) to determine its output. For example, the Phrase Melody Analyzer might determine that a 30 second piece of music has six 5-second sub-phrases and three 10-second phrases consisting of two sub-phrases each. Alternatively, the Phrase Melody Analyzer might determine that the melody is 30 seconds and does occur more than once.

As shown in FIG. 27CC, the subsystem B21 uses the Phrase Melody Analyzer to determine and identify phrase melodies having a modified phrase structure in melody phrase d and e, to form new phrase melodies d, d+e, and e, as shown in the musical score representation shown in FIG. 27CC.

The resulting phrase melody is then used during the automated music composition and generation process to generate a larger part of the piece of music being composed, as illustrated in the first stave of the musical score representation illustrated at the bottom of the process diagram in FIG. 27CC.

Specification of the Melody Note Rhythm Generation Subsystem (B26)

FIGS. 27DD1, 27DD2 and 27DD3 show the Melody Note Rhythm Generation Subsystem (B26) used in the Automated Music Composition and Generation Engine of the present invention. Rhythm, or the subdivision of a space of time into a defined, repeatable pattern or the controlled movement of music in time, is a fundamental building block of any musical piece. The Melody Note Rhythm Generation Subsystem determines what the default melody note rhythm(s) will be for the musical piece. This information is based on either user inputs (if given), computationally-determined value(s), or a combination of both.

As shown in FIGS. 27DD1, 27DD2 and 27DD3. Melody Note Rhythm Generation Subsystem B26 is supported by the initial note length parameter tables, and the initial and second chord length parameter tables shown in FIG. 28M, and parameter selection mechanisms (e.g. random number generator, or lyrical-input based parameter selector) discussed hereinabove.

The Parameter Transformation Engine Subsystem B51 generates the probability-weighted set of parameter tables for the various musical experience descriptors selected by the system user and provided to the input subsystem B0. As shown in FIGS. 27DD1, 27DD2 and 27DD3, the probability-based parameter programming tables employed in the subsystem are set up for the exemplary "emotion-type" musical experience descriptor—HAPPY—and used during the automated music composition and generation process of the present invention.

As shown in FIGS. 27DD1 through 27DD3, Subsystem B26 uses parameter tables loaded by subsystem B51, B40 and B41 to select the initial rhythm for the melody and to create the entire rhythmic material for the melody (or melodies) in the piece. For example, in a melody that is one measure long in a 4/4 meter, there might be a one third probability that the initial rhythm might last for two beats, and based on this information the next chord might last for 1 beat, and based on this information the final chord in the measure might last for 1 beat. The first chord might also last for one beat, and based on this information the next chord might last for 3 beats. This process continues until the entire melodic material for the piece has been rhythmically created and is awaiting the pitch material to be assigned to each rhythm.

Notably, the rhythm of each melody note is dependent upon the rhythms of all previous melody notes; the rhythms of the other melody notes in the same measure, phrase, and sub-phrase; and the melody rhythms of the melody notes that might occur in the future. Each preceding melody notes rhythm determination factors into the decision for a certain melody note's rhythm, so that the second melody note's rhythm is influenced by the first melody note's rhythm, the third melody note's rhythm is influenced by the first and second melody notes' rhythms, and so on.

As shown in FIGS. 27DD1 through 27DD3, the subsystem B26 manages a multi-stage process that (i) selects the initial rhythm for the melody, and (ii) creates the entire rhythmic material for the melody (or melodies) in the piece being composed by the automated music composition machine.

As shown in FIGS. 27DD1 and 27DD2, this process involves selecting the initial note length (i.e. note rhythm) by employing a random number generator and mapping its result to the related probability table. During the first stage, the subsystem B26 uses the random number generator (as described hereinabove), or other parameter selection mechanism discussed hereinabove, to select an initial note length of melody phrase d from the initial note length table that has been loaded into the subsystem. Then, as shown in FIGS. 27DD2 and 27DD3, using the subsystem B26 selects a second note length and then the third chord note length for melody phrase d, using the same methods and the initial and second chord length parameter tables. The process continues until the melody phrase length d is filled with quarter notes. This process is described in greater detail below.

As shown in FIG. 27DD2, the second note length is selected by first selecting the column of the table that matches with the result of the initial note length process and then employing a random number generator and mapping its result to the related probability table. During the second stage, the subsystem B26 starts putting notes into the melody sub-phrase d-e until the melody starts, and the process continues until the melody phrase d-e is filled with notes.

As shown in FIG. 27DD3, the third note length is selected by first selecting the column of the table that matches with the results of the initial and second note length processes and then employing a random number generator and mapping its result to the related probability table. Once the melody phrase d-e is filled with notes, the subsystem B26 starts filling notes into the melody phrase e, during the final stage, and the process continues until the melody phrase e is filled with notes.

As shown in FIGS. 27DD1 through 27DD3, the subsystem B26 then selects piece melody rhythms from the filled phrase lengths, d, d-e and e. The resulting piece melody rhythms are then ready for use during the automated music composition and generation process of the present invention, and are illustrated in the first stave of the musical score representation illustrated at the bottom of FIG. 27DD3.

Specification of the Initial Pitch Generation Subsystem (B27)

FIG. 27EE shows the Initial Pitch Generation Subsystem (B27) used in the Automated Music Composition and Generation Engine of the present invention. Pitch, or specific quality of a sound that makes it a recognizable tone, is a fundamental building block of any musical piece. The Initial Pitch Generation Subsystem determines what the initial pitch of the melody will be for the musical piece. This information is based on either user inputs (if given), computationally-determined value(s), or a combination of both.

As shown in FIG. 27EE, the Initial Pitch Generation Subsystem B27 is supported by the initial melody parameter tables shown in FIG. 28N, and parameter selection mechanisms (e.g. random number generator, or lyrical-input based parameter selector) as discussed hereinabove.

The Parameter Transformation Engine Subsystem B51 generates the probability-weighted data set of initial pitches (i.e. parameter tables) for the various musical experience descriptors selected by the system user and provided to the input subsystem B0. In FIG. 27EE, the probability-based parameter programming tables (e.g. initial pitch table) employed in the subsystem are set up for the exemplary "emotion-type" musical experience descriptor—HAPPY—and used during the automated music composition and generation process of the present invention.

In general, the Initial Pitch Generation Subsystem B27 uses the data outputs from other subsystems B26 as well as parameter tables loaded by subsystem B51 to select the initial pitch for the melody (or melodies) in the piece. For example, in a "Happy" piece of music in C major, there might be a one third probability that the initial pitch is a "C", a one third probability that the initial pitch is a "G", and a one third probability that the initial pitch is an "F".

As indicated in FIG. 27EE, the subsystem B27 uses a random number generator or other parameter selection mechanism, as discussed above, to select the initial melody note from the initial melody table loaded within the subsystem. In the case example, the initial melody note=7 has been selected from the table by the subsystem B27.

As shown in FIG. 27EE, the selected initial pitch (i.e. initial melody note) for the melody is the used during the automated music composition and generation process to generate a part of the piece of music being composed, as illustrated in the first stave of the musical score representation illustrated at the bottom of the process diagram shown in FIG. 27EE.

Specification of the Sub-Phrase Pitch Generation Subsystem (B29)

FIGS. 27FF1, 27FF2 and 27FF3 show a schematic representation of the Sub-Phrase Pitch Generation Subsystem (B29) used in the Automated Music Composition and Generation Engine of the present invention. The Sub-Phrase Pitch Generation Subsystem B29 determines the sub-phrase pitches of the musical piece. This information is based on either user inputs (if given), computationally-determined value(s), or a combination of both. Pitch, or specific quality of a sound that makes it a recognizable tone, is a fundamental building block of any musical piece.

As shown in FIGS. 27FF1, 27FF2 and 27FF3, the Sub-Phrase Pitch Generation Subsystem (B29) is supported by the melody note table, chord modifier table, the leap reversal modifier table, and the leap incentive modifier tables shown in FIGS. 28O1, 28O2 and 28O3, and parameter selection mechanisms (e.g. random number generator, or lyrical-input based parameter selector) as discussed in detail hereinabove.

The Parameter Transformation Engine Subsystem B51 generates the probability-weighted data set of parameter tables for the various musical experience descriptors selected by the system user and provided to the input subsystem B0. As shown in FIG. 27FF1, the probability-based parameter programming tables employed in the subsystem B29 are set up for the exemplary "emotion-type" musical experience descriptor—HAPPY—and used during the automated music composition and generation process of the present invention.

This subsystem B29 uses previous subsystems as well as parameter tables loaded by subsystem B51 to create the pitch material for the melody (or melodies) in the sub-phrases of the piece.

For example, in a melody that is one measure long in a 4/4 meter with an initial pitch of "C" (for 1 beat), there might be a one third probability that the next pitch might be a "C" (for 1 beat), and based on this information the next pitch be a "D" (for 1 beat), and based on this information the final pitch in the measure might be an "E" (for 1 beat). Each pitch of a sub-phrase is dependent upon the pitches of all previous notes; the pitches of the other notes in the same measure, phrase, and sub-phrase; and the pitches of the notes that might occur in the future. Each preceding pitch determination factors into the decision for a certain note's pitch, so that the second note's pitch is influenced by the first note's pitch, the third note's pitch is influenced by the first and second notes' pitches, and so on. Additionally, the chord underlying the pitch being selected affects the landscape of possible pitch options. For example, during the time that a C Major chord occurs, consisting of notes C E G, the note pitch would be more likely to select a note from this chord than during the time that a different chord occurs. Also, the notes' pitches are encourage to change direction, from either ascending or descending paths, and leap from one note to another, rather than continuing in a step-wise manner. Subsystem B29 operates to perform such advanced pitch material generation functions.

As shown in FIGS. 27FF1, 27FF2 and 27FF3, the subsystem 29 uses a random number generator or other suitable parameter selection mechanisms, as discussed hereinabove, to select a note (i.e. pitch event) from the melody note parameter table, in each sub-phrase to generate sub-phrase melodies for the musical piece being composed.

As shown in FIGS. 27FF1 and 27FF2, the subsystem B29 uses the chord modifier table to change the probabilities in the melody note table, based on what chord is occurring at the same time as the melody note to be chosen. The top row of the melody note table represents the root note of the underlying chord, the three letter abbreviation on the left column represents the chord tonality, the intersecting cell of these two designations represents the pitch classes that will be modified, and the probability change column represents the amount by which the pitch classes will be modified in the melody note table.

As shown in FIGS. 27FF2 and 27FF3, the subsystem B29 uses the leap reversal modifier table to change the probabilities in the melody note table based on the distance (measured in half steps) between the previous note(s).

As shown in FIGS. 27FF2 and 27FF3, the subsystem B29 uses the leap incentive modifier table to change the probabilities in the melody note table based on the distance (measured in half steps) between the previous note(s) and the timeframe over which these distances occurred.

The resulting sub-phrase pitches (i.e. notes) for the musical piece are used during the automated music composition and generation process to generate a part of the piece of music being composed, as illustrated in the first stave of the musical score representation illustrated at the bottom of the process diagram set forth in FIG. 27FF3.

Specification of the Phrase Pitch Generation Subsystem (B28)

FIG. 27GG shows a schematic representation of the phrase pitch generation subsystem (B28) used in the Automated Music Composition and Generation Engine of the present invention. Pitch, or specific quality of a sound that makes it a recognizable tone, is a fundamental building block of any musical piece. The Phrase Pitch Generation Subsystem B28 determines the pitches of the melody in the musical piece, except for the initial pitch(es). This information is based on either user inputs (if given), compute-determined value(s), or a combination of both.

As shown in FIG. 27GG, this subsystem is supported by the Sub-Phrase Melody analyzer and parameter selection mechanisms (e.g. random number generator, or lyrical-input based parameter selector).

The primary function of the sub-phrase melody analyzer is to determine a modified sub-phrase structure(s) in order to change an important component of a musical piece. The sub-phrase melody analyzer considers the melodic, harmonic, and time-based structure(s) of a musical piece, section, phrase, or additional segment(s) to determine its output.

The Parameter Transformation Engine Subsystem B51 generates the probability-weighted set of melodic note rhythm parameter tables for the various musical experience descriptors selected by the system user and provided to the input subsystem B0. As shown in FIG. 27GG, the probability-based parameter tables employed in the subsystem B29 are set up for the exemplary "emotion-type" musical experience descriptor—HAPPY—and used during the automated music composition and generation process of the present invention.

The Phrase Pitch Generation Subsystem B28 transforms the output of B29 to the larger phrase-level pitch material using the Sub-Phrase Melody Analyzer. The primary function of the sub-phrase melody analyzer is to determine the functionality and possible derivations of a melody(s) or other melodic material. The Melody Sub-Phrase Analyzer uses the tempo, meter, form, chord(s), harmony(s), melody(s), and structure of a piece, section, phrase, or other length of a music piece to determine its output.

Using the inputs all previous phrase and sub-phrase outputs, in combination with data sets and parameter tables loaded by subsystem B51, this subsystem B28 might create a one half probability that, in a melody comprised of two identical sub-phrases, notes in the second occurrence of the sub-phrase melody might be changed to create a more musical phrase-level melody. The sub-phase melodies are modified by examining the rhythmic, harmonic, and overall musical context in which they exist, and altering or adjusting them to better fit their context.

This process continues until the pitch information (i.e. notes) for the entire melodic material has been created. The determined phrase pitch is used during the automated music composition and generation process of the present invention, so as to generate a part of the piece of music being composed, as illustrated in musical score representation set forth in the process diagram of FIG. 27GG.

The resulting phrase pitches for the musical piece are used during the automated music composition and generation process of the present invention so as to generate a part of the piece of music being composed, as illustrated in the first stave of the musical score representation illustrated at the bottom of the process diagram set forth in FIG. 27GG.

Specification of the Pitch Octave Generation Subsystem (B30)

FIGS. 27HH1 and 27HH2 show a schematic representation of the Pitch Octave Generation Subsystem (B30) used in the Automated Music Composition and Generation Engine of the present invention. Frequency, or the number of vibrations per second of a musical pitch, usually measured in Hertz (Hz), is a fundamental building block of any musical piece. The Pitch Octave Generation Subsystem B30 determines the octave, and hence the specific frequency of the pitch, of each note and/or chord in the musical piece. This information is based on either user inputs (if given), computationally-determined value(s), or a combination of both.

As shown in FIGS. 27HH1 and 27HH2, the Pitch Octave Generation Subsystem B30 is supported by the melody note octave table shown in FIG. 28P, and parameter selection mechanisms (e.g. random number generator, or lyrical-input based parameter selector) as described hereinabove.

The Parameter Transformation Engine Subsystem B51 generates the probability-weighted set of melody note octave parameter tables for the various musical experience descriptors selected by the system user and provided to the input subsystem B0. In FIGS. 27HH1 and 27HH2, the probability-based parameter tables employed in the subsystem is set up for the exemplary "emotion-type" musical experience descriptor—HAPPY—and used during the automated music composition and generation process of the present invention.

As shown in FIGS. 27HH1 and 27HH2, the melody note octave table is used in connection with the loaded set of notes to determines the frequency of each note based on its relationship to the other melodic notes and/or harmonic structures in a musical piece. In general, there can be anywhere from 0 to just-short-of infinite number of melody notes in a piece. The system automatically determines this number each music composition and generation cycle.

For example, for a note "C," there might be a one third probability that the C is equivalent to the fourth C on a piano keyboard, a one third probability that the C is equivalent to the fifth C on a piano keyboard, or a one third probability that the C is equivalent to the fifth C on a piano keyboard.

The resulting frequencies of the pitches of notes and chords in the musical piece are used during the automated music composition and generation process of the present invention so as to generate a part of the piece of music being composed, as illustrated in the first stave of the musical score representation illustrated at the bottom of the process diagram set forth in FIG. 27HH2.

Specification of the Instrumentation Subsystem (B38)

FIGS. 27II1 and 27II2 show the Instrumentation Subsystem (B38) used in the Automated Music Composition and Generation Engine of the present invention. The Instrumentation Subsystem B38 determines the instruments and other musical sounds and/or devices that may be utilized in the musical piece. This information is based on either user inputs (if given), compute-determined value(s), or a combination of both, and is a fundamental building block of any musical piece.

As shown in FIGS. 27II1 and 27II2, this subsystem B38 is supported by the instrument tables shown in FIGS. 29Q1A and 29Q1B which are not probabilistic-based, but rather plain tables indicating all possibilities of instruments (i.e. an inventory of possible instruments) separate from the instrument selection tables shown in FIGS. 28Q2A and 28Q2B, supporting probabilities of any of these instrument options being selected.

The Parameter Transformation Engine Subsystem B51 generates the data set of instruments (i.e. parameter tables) for the various "style-type" musical experience descriptors selectable from the GUI supported by input subsystem B0. In FIGS. 27II1 and 27II2, the parameter programming tables employed in the subsystem are set up for the exemplary "style-type" musical experience descriptor—POP—and used during the automated music composition and generation process of the present invention. For example, the style parameter "Pop" might load data sets including Piano, Acoustic Guitar, Electric Guitar, Drum Kit, Electric Bass, and/or Female Vocals.

The instruments and other musical sounds selected for the musical piece are used during the automated music composition and generation process of the present invention so as to generate a part of the piece of music being composed.

Specification of the Instrument Selector Subsystem (B39)

FIGS. 27JJ1 and 27JJ2 show a schematic representation of the Instrument Selector Subsystem (B39) used in the Automated Music Composition and Generation Engine of the present invention. The Instrument Selector Subsystem B39 determines the instruments and other musical sounds and/or devices that will be utilized in the musical piece. This information is based on either user inputs (if given), computationally-determined value(s), or a combination of both, and is a fundamental building block of any musical piece.

As shown in FIGS. 27JJ1 and 27JJ2, the Instrument Selector Subsystem B39 is supported by the instrument selection table shown in FIGS. 28Q2A and 28Q2B, and parameter selection mechanisms (e.g. random number generator, or lyrical-input based parameter selector). Using the Instrument Selector Subsystem B39, instruments are selected for each piece of music being composed, as follows. Each Instrument group in the instrument selection table has a specific probability of being selected to participate in the piece of music being composed, and these probabilities are independent from the other instrument groups. Within each instrument group, each style of instrument and each instrument has a specific probability of being selected to participate in the piece and these probabilities are independent from the other probabilities.

The Parameter Transformation Engine Subsystem B51 generates the probability-weighted data set of instrument selection (i.e. parameter) tables for the various musical experience descriptors selectable from the input subsystem B0. In FIGS. 27JJ1 and 27JJ12, the probability-based system parameter tables employed in the subsystem is set up for the exemplary "emotion-type" musical experience descriptor—HAPPY—and "style-type" musical experience descriptor—POP—and used during the automated music composition and generation process of the present invention.

For example, the style-type musical experience parameter "Pop" with a data set including Piano, Acoustic Guitar, Electric Guitar, Drum Kit, Electric Bass, and/or Female Vocals might have a two-thirds probability that each instrument is individually selected to be utilized in the musical piece.

There is a strong relationship between Emotion and style descriptors and the instruments that play the music. For example, a Rock piece of music might have guitars, drums, and keyboards, whereas a Classical piece of music might have strings, woodwinds, and brass. So when a system user selects ROCK music as a style, the instrument selection table will show such instruments as possible selections.

The instruments and other musical sounds selected by Instrument Selector Subsystem B39 for the musical piece are used during the automated music composition and generation process of the present invention so as to generate a part of the piece of music being composed.

Specification of the Orchestration Generation Subsystem (B31)

FIGS. 27KK1 through 27KK9, taken together, show the Orchestration Generation Subsystem (B31) used in the Automated Music Composition and Generation Engine B31 of the present invention. Orchestration, or the arrangement of a musical piece for performance by an instrumental ensemble, is a fundamental building block of any musical piece. From the composed piece of music, typically represented with a lead sheet (or similar) representation as shown by the musical score representation at the bottom of FIG. 27JJ1, and also at the top of FIG. 27KK6, the Orchestration Generation Subsystem B31 determines what music (i.e. set of notes or pitches) will be played by the selected instruments, derived from the piece of music that has been composed thus far automatically by the automated music composition process. This orchestrated or arranged music for each selected instrument shall determine the orchestration of the musical piece by the selected group of instruments.

As shown in FIGS. 27KK1 through 27KK9, the Orchestration Generation Subsystem (B31) is supported by the following components: (i) the instrument orchestration prioritization tables, the instrument function tables, the piano hand function table, piano voicing table, piano rhythm table, initial piano rhythm table, second note right hand table, second note left hand table, third note right hand length table, and piano dynamics table as shown in FIGS. 28R1, 28R2 and 28R3; (ii) the piano note analyzer illustrated in FIG. 27KK3, system analyzer illustrated in FIG. 27KK7, and master orchestration analyzer illustrated in FIG. 27KK9; and (iii) parameter selection mechanisms (e.g. random number generator, or lyrical-input based parameter selector) as described in detail above. It will be helpful to briefly describe the function of the music data analyzers employed in subsystem B31.

As will be explained in greater detail hereinafter, the primary function of the Piano Note Analyzer illustrated in FIG. 27KK3 is to analyze the pitch members of a chord and the function of each hand of the piano, and then determine what pitches on the piano are within the scope of possible playable notes by each hand, both in relation to any previous notes played by the piano and any possible future notes that might be played by the piano.

The primary function of the System Analyzer illustrated in FIG. 27KK7 is to analyze all rhythmic, harmonic, and timbre-related information of a piece, section, phrase, or other length of a composed music piece to determine and adjust the rhythms and pitches of an instrument's orchestration to avoid, improve, and/or resolve potential orchestrational conflicts.

Also, the primary function of the Master Orchestration Analyzer illustrated in FIG. 27KK9 is to analyze all rhythmic, harmonic, and timbre-related information of a piece, section, phrase, or other length of a music piece to determine and adjust the rhythms and pitches of a piece's orchestration to avoid, improve, and/or resolve potential orchestrational conflicts.

In general, there is a strong relationship between emotion and style descriptors and the instruments that play the music, and the music that selected instruments perform during the piece. For example, a piece of music orchestrated in a Rock style might have a sound completely different than the same piece of music orchestrated in a Classical style. However, the orchestration of the musical piece may be unrelated to the emotion and style descriptor inputs and solely in existence to effect timing requests. For example, if a piece of music needs to accent a certain moment, regardless of the orchestration thus far, a loud crashing percussion instrument such as a cymbal might successfully accomplish this timing request, lending itself to a more musical orchestration in line with the user requests.

As with all the subsystems, Parameter Transformation Engine Subsystem B51 generates the probability-weighted set of possible instrumentation parameter tables identified above for the various musical experience descriptors selected by the system user and provided to the Input Subsystem B0. In FIGS. 27KK1 through 27KK9, the probability-based parameter programming tables (i.e. instrument orchestration prioritization table, instrument energy tabled, piano energy table, instrument function table, piano hand function table, piano voicing table, piano rhythm table, second note right hand table, second note left hand table, piano dynamics table) employed in the Orchestration Generation Subsystem B51 is set up for the exemplary "emotion-type" descriptor—HAPPY—and "style-type" descriptor—POP—and used during the automated music composition and generation process of the present invention. This musical experience descriptor information is based on either user inputs (if given), computationally-determined value(s), or a combination of both.

As illustrated in FIGS. 27KK1 and 27KK2, based on the inputs from subsystems B37, B38, and B39, the Orchestration Generation Subsystem B51 might determine using a random number generation, or other parameter selection mechanism, that a certain number of instruments in a certain stylistic musical category are to be utilized in this piece, and specific order in which they should be orchestrated. For example, a piece of composed music in a Pop style might have a one half probability of 4 total instruments and a one half probability of 5 total instruments. If 4 instruments are selected, the piece might then have a instrument orchestration prioritization table containing a one half probability that the instruments are a piano, acoustic guitar, drum kit, and bass, and a one half probability that the instruments are a piano, acoustic guitar, electric guitar, and bass. In FIG. 27KK1, a different set of priorities are shown for six (6) exemplary instrument orchestrations. As shown, in the case example, the selected instrument orchestration order is made using a random number generator to provide: piano, electric bass 1 and violin.

The flow chart illustrated in FIGS. 27KK1 through 27KK7 describes the orchestration process for the piano—the first instrument to be orchestrated. As shown, the steps in the piano orchestration process include: piano/instrument function selection, piano voicing selection, piano rhythm length selection, and piano dynamics selection, for each note in the piece of music assigned to the piano. Details of these steps will be described below.

As illustrated in FIGS. 27KK1 and 27KK2, the Orchestration Generation Subsystem B51 accesses the preloaded instrument function table, and uses a random function generator (or other parameter selection mechanism) to select an instrument function for each part of the piece of music being composed (e.g. phrase melody, piece melody etc.). The results from this step of the orchestration process include the assignment of a function (e.g. primary melody, secondary melody, primary harmony, secondary harmony or accompaniment) to each part of the musical piece. These function codes or indices will be used in the subsequent stages of the orchestration process as described in detail below.

It is important in orchestration to create a clear hierarchy of each instrument and instrument groups' function in a piece or section of music, as the orchestration of an instrument functioning as the primary melodic instrument might be very different than if it is functioning as an accompaniment. Examples of "instrument function" are illustrated in the instrument function table shown in FIG. 27KK1, and include, for example: primary melody; secondary melody; primary harmony; secondary harmony; and accompaniment. It is understood, however, that there are many more instrument functions that might be supported by the instruments used to orchestrate a particular piece of composed music. For example, in a measure of a "Happy" C major piece of music with a piano, acoustic guitar, drum kit, and bass, the subsystem B31 might assign the melody to the piano, a supportive strumming pattern of the chord to the acoustic guitar, an upbeat rhythm to the drum kit, and the notes of the lowest inversion pattern of the chord progression to the bass. In general, the probabilities of each instrument's specific orchestration are directly affected by the preceding orchestration of the instrument as well as all other instruments in the piece.

Therefore, the Orchestration Generation Subsystem B31 orchestrates the musical material created previously including, but not limited to, the chord progressions and melodic material (i.e. illustrated in the first two staves of the "lead sheet" musical score representation shown in FIGS. 27KK5 and 27KK6) for the specific instruments selected for the piece. The orchestrated music for the instruments in the case example, i.e. violin (Vln.), piano (Pno.) and electric bass (E.B.) shall be represented on the third, fourth/fifth and six staves of the music score representation in FIGS. 27KK6, 27KK7 and 27KK8, respectively, generated and maintained for the musical orchestration during the automated music composition and generation process of the present invention. Notably, in the case example, illustrated in FIGS. 27KK1 through 27KK9, the subsystem B31 has automatically made the following instrument function assignments: (i) the primary melody function is assigned to the violin (Vln.), wherein the orchestrated music for this instrument function will be derived from the lead sheet music composition set forth on the first and second staves and then represented along the third stave of the music representation shown FIG. 27KK6; the secondary melody function is assigned to the right hand (RH) of the piano (Pno.) while the primary harmony function is assigned to the left hand (LH) of the piano, wherein its orchestrated music for these instrument functions will be derived from the lead sheet music composition set forth on the first and second staves and then represented along the fourth and fifth staves of the music representation shown in FIG. 27KK6; and the secondary harmony function is assigned to the electric bass (E.B.), wherein the orchestrated music for this instrument function will be derived from the lead sheet music composition set forth on the first and second staves and then represented along the sixth stave of the music representation shown in FIG. 27KK6.

For the case example at hand, the order of instrument orchestration has been selected to be: (1) the piano performing the secondary melody and primary harmony functions with the RH and LH instruments of the piano, respectively; (2) the violin performing the primary melody function; and (3) the electric base (E.B.) performing the primary harmony function. Therefore, the subsystem B31 will generate orchestrated music for the selected group of instruments in this named order, despite the fact that violin has been selected to perform the primary melody function of the orchestrated music. Also, it is pointed out that multiple instruments can perform the same instrument functions (i.e. both the piano and violin can perform the primary melody function) if and when the subsystem B31 should make this determination during the instrument function step of the orchestration sub-process, within the overall automated music composition process of the present invention. While subsystem B31 will make instrument function assignments un-front during the orchestration process, it is noted that the subsystem B31 will use its System and Master Analyzers discussed above to automatically analyze the entire orchestration of music when completed and determine whether or not if it makes sense to make new instrument function assignments and re-generate orchestrated music for certain instruments, based on the lead sheet music representation of the piece of music composed by the system of the present invention. Depending on how particular probabilistic or stochastic decisions are made by the subsystem B31, it may require several complete cycles through the process represented in FIGS. 27KK1 through 27KK9, before an acceptable music orchestration is produced for the piece of music composed by the automated music composition system of the present invention. This and other aspects of the present invention will become more readily apparent hereinafter.

As shown in the process diagram of FIGS. 27KK1 through 27KK9, once the function of each instrument is determined, then the Subsystem B31 proceeds to load instrument-function-specific function tables (e.g. piano hand function tables) to support (i) determining the manner in which the instrument plays or performs its function, based on the nature of each instrument and how it can be conventionally played, and (ii) generating music (e.g. single notes, diads, melodies and chords) derived from each note represented in the lead sheet musical score for the composed piece of music, so as to create an orchestrated piece of music for the instrument performing its selected instrument function. In the example shown in FIG. 27KK2, the probability-based piano hand function table is loaded for the selected instrument function in the case example, namely: secondary melody. While only the probability-based piano hand function (parameter) table is shown in FIG. 27KK2, for clarity of exposition, it is understood that the Instrument Orchestration Subsystem B31 will have access to probability-based piano hand function table for each of the other instrument functions, namely: primary melody; primary harmony; secondary harmony; and accompaniment. Also, it is understood that the Instrument Orchestration Subsystem B31 will have access to a set of probability-based instrument function tables programmed for each possible instrument function selectable by the Subsystem B31 for each instrument involved in the orchestration process.

Consider, for example, a piano instrument typically played with a left hand and a right hand. In this case, a piano accompaniment in a Waltz (in a ¾ time signature) might have the Left Hand play every downbeat and the Right Hand play every second and third beat of a piece of music orchestrated for the piano. Such instrument-specific function assignment for the piano is carried out by the Instrument Orchestration Subsystem B31 (i) processing each note in the lead sheet of the piece of composed music (represented on the first and staves of the music score representation in FIG. 27KK6), and (ii) generating orchestrated music for both the right hand (RH) and left hand (LH) instruments of the piano, and representing this orchestrated music in the piano hand function table shown in FIGS. 27KK1 and 27KK3. Using the piano hand function table, and a random number generator as described hereinabove, the Subsystem B31 processes each note in the lead sheet musical score and generates music for the right hand and left hand instruments of the piano.

For the piano instrument, the orchestrated music generation process that occurs is carried out by subsystem B31 as follows. For the first note in the lead sheet musical score, the subsystem B31 (i) refers to the probabilities indicated in the RH part of the piano hand function table and, using a random number generator (or other parameter selection mechanism) selects either a melody, single note or chord from the RH function table, to be generated and added to the stave of the RH instrument of the piano, as indicated as the fourth stave shown in FIG. 27KK6; and immediately thereafter (ii) refers to the probabilities indicated in the LH part of the piano hand function table and, using a random number generator (or other parameter selection mechanism) selects from the selected column in the RH function table, either a melody, single note (non-melodic), a diad, or chord, to be generated and added to the stave of the LH instrument of the piano, as indicated as the fifth stave shown in FIG. 27KK6. Notably, a dyad (or diad) is a set of two notes or pitches, whereas a chord has three or more notes, but in certain contexts a musician might consider a dyad a chord—or as acting in place of a chord. A very common two-note "chord" is the interval of a perfect fifth. Since an interval is the distance between two pitches, a dyad can be classified by the interval it represents. When the pitches of a dyad occur in succession, they form a melodic interval. When they occur simultaneously, they form a harmonic interval.

As shown in FIGS. 27KK1 and 27KK2, the Instrument Orchestration Subsystem 31 determines which of the previously generated notes are possible notes for the right hand and left hand parts of the piano, based on the piece of music composed thus far. This function is achieved the subsystem B31 using the Piano Note Analyzer to analyze the pitch members (notes) of a chord, and the selected function of each hand of the piano, and then determines what pitches on the piano (i.e. notes associated with the piano keys) are within the scope of possible playable notes by each hand (i.e. left hand has access to lower frequency notes on the piano, whereas the right hand has access to higher frequency notes on the piano) both in relation to any previous notes played by the piano and any possible future notes that might be played by the piano. Those notes that are not typically playable by a particular human hand (RH or LH) on the piano, are filtered out or removed from the piece music orchestrated for the piano, while notes that are playable should remain in the data structures associated with the piano music orchestration.

Once the notes are generated for each piano hand, as shown in FIGS. 27KK3 and 27KK4, the subsystem B31 then performs piano voicing which is a process that influences the vertical spacing and ordering of the notes (i.e. pitches) in the orchestrated piece of music for the piano. For example, the instrument voicing influences which notes are on the top or in the middle of a chord, which notes are doubled, and which octave each note is in. Piano voicing is achieved by the Subsystem B31 accessing a piano voicing table, schematically illustrated in FIGS. 27KK1 and 27KK2 as a simplistic two column table, when in reality, it will be a complex table involving many columns and rows holding parameters representing the various ways in which a piano can play each musical event (e.g. single note (non-melodic), chord, diad or melody) present in the orchestrated music for the piano at this stage of the instrument orchestration process. As shown in the piano, voicing table, following conventional, each of the twelve notes or pitches on the musical scale is represented as a number from 0 through 11, where musical note C is assigned number 0, C sharp is assigned 1, and so forth. While the exemplary piano voicing table of FIG. 27KK3 only shows the possible LH and RH combination for single-note (non-melodic) events that might occur within a piece of orchestrated music, it is understood that this piano voicing table in practice will contain voicing parameters for many other possible musical events (e.g. chords, diads, and melodies) that are likely to occur within the orchestrated music for the piano, as is well known in the art.

Once the manner in which an instrument is going to play generated notes in the piano orchestrated music has been determined as described above, the subsystem B31 determines the specifics, including the note lengths or duration (i.e. note rhythms) using the piano rhythm tables shown in FIGS. 27KK4 and 27KK5, and continues to specify the note durations for the orchestrated piece of music until piano orchestration is filled. As shown in FIG. 27KK5, the piano note rhythm (i.e. note length) specification process is carried out using as many stages as memory and data processing will allow within the system of the present invention. In the illustrative embodiment, three stages are supported within subsystem B31 for sequentially processing an initial (first) note, a second (sequential) note and a third (sequential) note using (i) the probabilistic-based initial piano rhythm (note length) table having left hand and right hand components, (ii) the second piano rhythm (note length) table having left hand and right hand components, and (iii) the third piano rhythm (note length) table having left hand and right hand components, as shown in FIGS. 27KK4 and 27KK5. Notably, for this 3$^{rd}$-order stochastic model, the probability values contained in the right-hand second piano rhythm (note length) table are dependent upon the initial notes that might be played by the right hand instrument of the piano and observed by the subsystem B31, and the probability values the probability values contained in the right-hand third piano rhythm (note length) table are dependent in the initial notes that might be played by the right hand instrument of the piano and observed by the subsystem B31. Likewise, the probability values contained in the left-hand second piano rhythm (note length) table are dependent upon the initial notes that might be played by the left hand instrument of the piano and observed by the subsystem B31, and the probability values the probability values contained in the left-hand third piano rhythm (note length) table are dependent in the initial notes that might be played by the left hand instrument of the piano and observed by the subsystem B31.

If a higher order stochastic model where used for piano note rhythm (i.e. note length) control, then a fourth order and perhaps higher order piano (note) rhythm (note length) tables will be used to carry out the orchestration process supported within the subsystem B31. The result from this stage of note processing are notes of specified note length or duration in the orchestrated piece of music for the piano, as illustrated in musical score representation shown in FIG. 27KK6.

Regardless of the order of the stochastic model used, the Instrument Orchestration Subsystem B31 will need to determine the proper note lengths (i.e. note rhythms) in each piece of orchestrated music for a given instrument. So, for example, continuing the previous example, if the left hand instrument of the piano plays a few notes on the downbeat, it might play some notes for an eighth note or a half note duration. Each note length is dependent upon the note lengths of all previous notes; the note lengths of the other notes in the same measure, phrase, and sub-phrase; and the note lengths of the notes that might occur in the future. Each preceding note length determination factors into the decision for a certain note's length, so that the second note's length is influenced by the first note's length, the third note's length is influenced by the first and second notes' lengths, and so on.

Having determined the note lengths for the piano orchestration, the next step performed by the subsystem B31 is to determine the "dynamics" for the piano instrument as represented by the piano dynamics table indicated in the process diagram shown in FIG. 27KK6. In general, the dynamics refers to the loudness or softness of a musical composition, and piano or instrument dynamics relates to how the piano or instrument is played to impart particular dynamic characteristics to the intensity of sound generated by the instrument while playing a piece of orchestrated music. Such dynamic characteristic will include loudness and softness, and the rate at which sound volume from the instrument increases or decreases over time as the composition is being performed. As reflected in the piano dynamics table set forth in the process diagram of FIG. 27KK7, several traditional classes of "dynamics" have been developed for the piano over the past several hundred years or so, namely: (i) piano (soft); mezzo piano; mezzo forte. In each case, instrument dynamics relates to how the instrument is played or performed by the automated music composition and generation system of the present invention, or any resultant system, in which the system may be integrated and requested to compose, generate and perform music in accordance with the principles of the present invention.

As shown in FIG. 27KK6, dynamics for the piano instrument are determined using the piano dynamics table shown in FIGS. 28R1, 28R2 and 28R3 and the random number generator (or other parameter selection mechanism) to select a piano dynamic for the first note played by the right hand instrument of the piano, and then the left hand instrument of the piano. While the piano dynamics table shown in FIG. 27KK6 is shown as a first-order stochastic model for purposes of simplicity and clarity of exposition, it is understood that in practice the piano dynamics table (as well as most instrument dynamics tables) will be modeled and implemented as an n-th order stochastic process, where each note dynamics is dependent upon the note dynamic of all previous notes; the note dynamics of the other notes in the same measure, phrase, and sub-phrase; and the note dynamics of the notes that might occur in the future. Each preceding note dynamics determination factors into the decision for a certain note's dynamics, so that the second note's dynamics is influenced by the first note's dynamics, the third note's dynamics is influenced by the first and second notes' dynamics, and so on. In some cases, the piano dynamics table will be programmed so that there is a gradual increase or decrease in volume over a specific measure or measures, or melodic phrase or phrases, or sub-phrase or sub-phrase, or over an entire melodic piece, in some instances. In other instances, the piano dynamics table will be programmed so that the piano note dynamics will vary from one specific measure to another measure, or from melodic phrase to another melodic phrase, or from one sub-phrase or another sub-phrases, or over from one melodic piece to another melodic phrase, in other instances. In general, the dynamics of the instrument's performance will be ever changing, but are often determined by guiding indications that follow the classical music theory cannon. How such piano dynamics tables might be designed for any particular application at hand will occur to those skilled in the art having had the benefit of the teachings of the present invention disclosure.

This piano dynamics process repeats, operating on the next note in the orchestrated piano music represented in the fourth stave of the music score representation in FIG. 27KK7 for the right hand instrument of the piano, and on the next note in the orchestrated piano music represented in the fifth stave of the music score representation in FIG. 27KK7 for the left hand instrument of the piano. The dynamics process is repeated and operates on all notes in the piano orchestration until all piano dynamics have been selected and imparted for all piano notes in each part of the piece assigned to the piano. As shown, the resulting musical score representation, with dynamics markings (e.g. p, mf, f) for the piano is illustrated in the top of FIG. 27KK-7.

As indicated in FIG. 27KK7, the entire Subsystem B31 repeats the above instrument orchestration process for the next instrument (e.g. electric bass 1) so that orchestrated music for the electric bass is generated and stored within the memory of the system, as represented in the sixth stave of the musical score representation shown in FIG. 27KK8.

As shown in FIGS. 27KK7 and 27KK8, while orchestrating the electric bass instrument, the subsystem B31 uses the System Analyzer to automatically check for conflicts between previously orchestrated instruments. As shown, the System Analyzer adjusts probabilities in the various tables used in subsystem B31 so as to remove possible conflicts between orchestrated instruments. Examples of possible conflicts between orchestrated instrument might include, for example: when an instrument is orchestrated into a pitch range that conflicts with a previous instrument (i.e. an instrument plays the exact same pitch/frequency as another instrument that makes the orchestration of poor quality); where an instrument is orchestrated into a dynamic that conflicts with a previous instrument (i.e. all instruments are playing quietly and one instrument is now playing very loudly); and where an instrument is orchestrated to do something that is not physically possible by a real musician in light of previous orchestrations (i.e. a single percussionist cannot play 8 drum kits at once). FIG. 27KK8 shows the musical score representation for the corrected musical instrumentation played by the electric bass (E.B) instrument.

As shown at the bottom of FIG. 27KK8, the Subsystem B31 repeats the above orchestration process for next instrument (i.e. violin) in the instrument group of the music composition. The musical score representation for the orchestrated music played by the violin is set forth in the third stave shown in the topmost music score representation set froth in the process diagram of FIG. 27KK9.

As shown in FIG. 27KK9, once the orchestration is complete, the Orchestration Generation Subsystem B13 uses the Master Orchestration Analyzer to modify and improve the resulting orchestration and corrects any musical or non-musical errors and/or inefficiencies. In this example, the octave notes in the second and third base clef staves of the piano orchestration in FIG. 27KK9 have been removed, as shown in the final musical score representation set forth in the lower part of the process diagram set forth in FIG. 27KK9, produced at the end of this stage of the orchestration process.

The instruments and other musical sounds selected for the instrumentation of the musical piece are used during the automated music composition and generation process of the present invention so as to generate a part of the piece of music being composed, as illustrated in the musical score representation illustrated at the bottom of FIG. 27KK9.

Specification of the Controller Code Generation Subsystem (B32)

FIG. 27LL shows the Controller Code Generation Subsystem (B32) used in the Automated Music Composition and Generation Engine of the present invention. Controller Codes, or musical instructions including, but not limited to, modulation, breath, sustain, portamento, volume, pan position, expression, legato, reverb, tremolo, chorus, frequency cutoff, are a fundamental building block of any Digital Musical Piece. Notably, controller codes (CC) are used to control various properties and characteristics of an orchestrated musical composition that fall outside scope of control of the Instrument Orchestration Subsystem B31, over the notes and musical structures present in any given piece of orchestrated music. Therefore, while the Instrument Orchestration Subsystem B31 employs n-th order stochastic models (i.e. probabilistic parameter tables) to control performance functions such as, for example, instrument function, note length (i.e. note rhythm) and instrument voicing, for any piece of orchestrated music, the Controller Code Generation Subsystem B31 employs n-th order stochastic models (i.e. probabilistic parameter tables) to control other characteristics of a piece of orchestrated music, namely, modulation, breath, sustain, portamento, volume, pan position, expression, legato, reverb, tremolo, chorus, frequency cutoff, and other characteristics. In alternative embodiments, some of the control functions that are supported by the Controller Code Generation Subsystem B32 may be implemented in the Instrument Orchestration Subsystem B31, and vice versa. However, the illustrative embodiment disclosed herein is the preferred embodiment because of the elegant hierarchy of managed resources employed by the automated music composition and generation system of the present invention.

The Controller Code Generation Subsystem B32 determines the controller code and/or similar information of each note that will be used in the piece of music being composed and generated. This Subsystem B32 determines and generates the "controller code" information for the notes and chords of the musical being composed. This information is based on either system user inputs (if given), computationally-determined value(s), or a combination of both.

As shown in FIG. 27LL, the Controller Code Generation Subsystem B32 is supported by the controller code parameter tables shown in FIG. 28S, and parameter selection mechanisms (e.g. random number generator, or lyrical-input based parameter selector) described in detail hereinabove. The form of controller code data is typically given on a scale of 0-127. Volume (CC 7) of 0 means that there is minimum volume, whereas volume of 127 means that there is maximum volume. Pan (CC 10) of 0 means that the signal is panned hard left, 64 means center, and 127 means hard right.

Each instrument, instrument group, and piece has specific independent probabilities of different processing effects, controller code data, and/or other audio/midi manipulating tools being selected for use. With each of the selected manipulating tools, the subsystem B32 then determines in what manner the selected tools will affect and/or change the musical piece, section, phrase, or other structure(s); how the musical structures will affect each other; and how to create a manipulation landscape that improves the musical material that the controller code tools are manipulating.

The Parameter Transformation Engine Subsystem B51 generates the probability-weighted data set of possible controller code (i.e. parameter) tables for the various musical experience descriptors selected by the system user and provided to the input subsystem B0. In FIG. 27LL, the probability-based parameter programming tables (i.e. instrument, instrument group and piece wide controller code tables) employed in the subsystem are set up for the exemplary "emotion-type" musical experience descriptor—HAPPY—and "style-type" musical experience descriptor—POP—used during the automated music composition and generation process of the present invention.

The Controller Code Generation Subsystem B32 uses the instrument, instrument group and piece-wide controller code parameter tables and data sets loaded from subsystems B1, B37, B38, B39, B40, and/or B41. As shown in FIG. 27LL, the instrument and piece-wise controller code (CC) tables for the violin instrument has probability parameters for controlling parameters such as: reverb; delay; panning; tremolo, etc. While the controller code generation subsystem B31 is shown as a first-order stochastic model in FIG. 27LL, it is understood that in practice each instrument, instrument group, and piece-wide controller code table, generated by the Parameter Transformation Engine Subsystem B51, and loaded within the Subsystem B32, will be modeled and implemented as an n-th order stochastic process, wherein each the controller code table for application to a given note is dependent upon: the controller code tables for all previous notes; the controller code tables for the other notes in the same measure, phrase, and sub-phrase; and the controller code for the notes that might occur in the future.

In general, there is a strong relationship between emotion and style descriptors and the controller code information that informs how the music is played. For example, a piece of music orchestrated in a Rock style might have a heavy dose of delay and reverb, whereas a Vocalist might incorporate tremolo into the performance. However, the controller code information used to generate a musical piece may be unrelated to the emotion and style descriptor inputs and solely in existence to effect timing requests. For example, if a piece of music needs to accent a certain moment, regardless of the controller code information thus far, a change in the controller code information, such as moving from a consistent delay to no delay at all, might successfully accomplish this timing request, lending itself to a more musical orchestration in line with the user requests.

The controller code selected for the instrumentation of the musical piece will be used during the automated music composition and generation process of the present invention as described hereinbelow.

Specification of the Digital Audio Sample Producing Subsystem and its Use in Subsystems B33 and B34

The Automatic Music Composition And Generation (i.e. Production) System of the present invention described herein utilizes libraries of digitally-synthesized (i.e. virtual) musical instruments, or virtual-instruments, to produce digital audio samples of individual notes specified in the musical score representation for each piece of composed music.

These digitally-synthesized (i.e. virtual) instruments shall be referred to as the Digital Audio Sample Producing Subsystem, regardless of the actual techniques that might be used to produce each digital audio sample that represents an individual note in a composed piece of music.

In general, to generate music from any piece of music composed by the system, Subsystems B33 and B34 need musical instrument libraries for acoustically realizing the musical events (e.g. pitch events such as notes, and rhythm events) played by virtual instruments specified in the musical score representation of the piece of composed music. There are many different techniques available for creating, designing and maintaining music instrument libraries, and musical sound libraries, for use with the automated music composition and generation system of the present invention, namely: Digital Audio Sampling Synthesis Methods; Partial Timbre Synthesis Methods, Frequency Modulation (FM) Synthesis Methods; and other forms of Virtual Instrument Synthesis Technology.

The Digital Audio Sampling Synthesis Method involves recording a sound source (such as a real instrument or other audio event) and organizing these samples in an intelligent manner for use in the system of the present invention. In particular, each audio sample contains a single note, or a chord, or a predefined set of notes. Each note, chord and/or predefined set of notes is recorded at a wide range of different volumes, different velocities, different articulations, and different effects, etc. so that a natural recording of every possible use case is captured and available in the sampled instrument library. Each recording is manipulated into a specific audio file format and named and tagged with meta-data with identifying information. Each recording is then saved and stored, preferably, in a database system maintained within or accessible by the automatic music composition and generation system. For example, on an acoustical piano with 88 keys (i.e. notes), it is not unexpected to have over 10,000 separate digital audio samples which, taken together, constitute the fully digitally-sampled piano instrument. During music production, these digitally sampled notes are accessed in real-time to generate the music composed by the system. Within the system of the present invention, these digital audio samples function as the digital audio files that are retrieved and organized by subsystems B33 and B34, as described in detail below.

Using the Partial Timbre Synthesis Method, popularized by New England Digital's SYNCLAVIER Partial-Timbre Music Synthesizer System in the 1980's, each note along the musical scale that might be played by any given instrument being model (for partial timbre synthesis library) is sampled, and its partial timbre components are stored in digital memory. Then during music production/generation, when the note is played along in a given octave, each partial timbre component is automatically read out from its partial timbre channel and added together, in an analog circuit, with all other channels to synthesize the musical note. The rate at which the partial timbre channels are read out and combined determines the pitch of the produced note. Partial timbre-synthesis techniques are taught in U.S. Pat. Nos. 4,554,855; 4,345,500; and 4,726,067, incorporated by reference.

Using state-of-the-art Virtual Instrument Synthesis Methods, such as supported by MOTU's MachFive 3 Universal Sampler and Virtual Music Instrument Design Tools, musicians can create custom sound libraries for almost any virtual instrument, real or imaginable, to support music production (i.e. generation) in the system of the present invention.

There are other techniques that have been developed for musical note and instrument synthesis, such as FM synthesis, and these technologies can be found employed in various commercial products for virtual instrument design and music production.

Specification of the Digital Audio Retriever Subsystem (B33)

FIG. 27MM shows the Digital Audio Retriever Subsystem (B33) used in the Automated Music Composition and Generation Engine of the present invention. Digital audio samples, or discrete values (numbers) which represent the amplitude of an audio signal taken at different points in time, are a fundamental building block of any musical piece. The Digital Audio Sample Retriever Subsystem B33 retrieves the individual digital audio samples that are called for in the orchestrated piece of music that has been composed by the system. The Digital Audio Retriever Subsystem (B33) is used to locate and retrieve digital audio files containing the spectral energy of each instrument note generated during the automated music composition and generation process of the present invention. Various techniques known in the art can be used to implement this Subsystem B33 in the system of the present invention.

Specification of the Digital Audio Sample Organizer Subsystem (B34)

FIG. 27NN shows the Digital Audio Sample Organizer Subsystem (B34) used in the Automated Music Composition and Generation Engine of the present invention. The Digital Audio Sample Organizer Subsystem B34 organizes and arranges the digital audio samples—digital audio instrument note files—retrieved by the digital audio sample retriever subsystem B33, and organizes these files in the correct time and space order along a timeline according to the music piece, such that, when consolidated and performed or played from the beginning of the timeline, the entire musical piece is accurately and audibly transmitted and can be heard by others. In short, the digital audio sample organizer subsystem B34 determines the correct placement in time and space of each audio file in a musical piece. When viewed cumulatively, these audio files create an accurate audio representation of the musical piece that has been created or composed/generated. An analogy for this subsystem B34 is the process of following a very specific blueprint (for the musical piece) and creating the physical structure(s) that match the diagram(s) and figure(s) of the blueprint.

Specification of the Piece Consolidator Subsystem (B35)

FIG. 27OO shows the piece consolidator subsystem (B35) used in the Automated Music Composition and Generation Engine of the present invention. A digital audio file, or a record of captured sound that can be played back, is a fundamental building block of any recorded musical piece. The Piece Consolidator Subsystem B35 collects the digital audio samples from an organized collection of individual audio files obtained from subsystem B34, and consolidates or combines these digital audio files into one or more than one digital audio file(s) that contain the same or greater amount of information. This process involves examining and determining methods to match waveforms, controller code and/or other manipulation tool data, and additional features of audio files that must be smoothly connected to each other. This digital audio samples to be consolidated by the Piece Consolidator Subsystem B35 are based on either user inputs (if given), computationally-determined value(s), or a combination of both.

Specification of the Piece Format Translator Subsystem (B50)

FIG. 27OO1 shows the Piece Format Translator Subsystem (B50) used in the Automated Music Composition and Generation Engine (E1) of the present invention. The Piece Format Translator subsystem B50 analyzes the audio and text representation of the digital piece and creates new formats of the piece as requested by the system user or system including. Such new formats may include, but are not limited to, MIDI, Video, Alternate Audio, Image, and/or Alternate Text format. Subsystem B50 translates the completed music piece into desired alterative formats requested during the automated music composition and generation process of the present invention.

Specification of the Piece Deliver Subsystem (B36)

FIG. 27PP shows the Piece Deliver Subsystem (B36) used in the Automated Music Composition and Generation Engine of the present invention. The Piece Deliverer Subsystem B36 transmits the formatted digital audio file(s) from the system to the system user (either human or computer) requesting the information and/or file(s), typically through the system interface subsystem B0.

Specification of the Feedback Subsystem (B42)

FIGS. 27QQ1, 27QQ2 and 27QQ3 show the Feedback Subsystem (B42) used in the Automated Music Composition and Generation Engine of the present invention. As shown the input and output data ports of the Feedback Subsystem B42 is are configured with the data input and output ports shown in FIGS. 26A through 26P. The primary purpose of the Feedback Subsystem B42 is to accept user and/or computer feedback to improve, on a real-time or quasi-real-time basis, the quality, accuracy, musicality, and other elements of the musical pieces that are automatically created by the system using the music composition automation technology of the present invention.

In general, during system operation, the Feedback Subsystem B42 allows for inputs ranging from very specific to very vague and acts on this feedback accordingly. For example, a user might provide information, or the system might determine on its on accord, that the piece that was generated should, for example, be (i) faster (i.e. have increased tempo), (ii) greater emphasize on a certain musical experience descriptor, change timing parameters, and (iii) include a specific instrument. This feedback can be given through a previously populated list of feedback requests, or an open-ended feedback form, and can be accepted as any word, image, or other representation of the feedback.

As shown in FIGS. 27QQ1, 27QQ2 and 27QQ3, the Piece Feedback Subsystem B42 receives various kinds of data from its data input ports, and this data is autonomously analyzed by a Piece Feedback Analyzer supported within Subsystem B42. In general, the Piece Feedback Analyzer considers all available input, including, but not limited to, autonomous or artificially intelligent measures of quality and accuracy and human or human-assisted measures of quality and accuracy, and determines a suitable response to a analyzed piece of composed music. Data outputs from the Piece Feedback Analyzer can be limited to simple binary responses and can be complex, such as dynamic multi-variable and multi-state responses. The analyzer then determines how best to modify a musical piece's rhythmic, harmonic, and other values based on these inputs and analyses. Using the system-feedback architecture of the present invention, the data in any composed musical piece can be transformed after the creation of the entire piece of music, section, phrase, or other structure, or the piece of music can be transformed at the same time as the music is being created.

As shown in FIG. 27QQ1, the Feedback Subsystem B41 performs Autonomous Confirmation Analysis. Autonomous Confirmation Analysis is a quality assurance/self-checking process, whereby the system examines the piece of music that was created, compares it against the original system inputs, and confirms that all attributes of the piece that was requested have been successfully created and delivered and that the resultant piece is unique. For example, if a Happy piece of music ended up in a minor key, the analysis would output an unsuccessful confirmation and the piece would be recreated. This process is important to ensure that all musical pieces that are sent to a user are of sufficient quality and will match or surpass a user's expectations.

As shown in FIG. 27QQ1, the Feedback Subsystem B42 analyzes the digital audio file and additional piece formats to determine and confirm (i) that all attributes of the requested piece are accurately delivered, (ii) that digital audio file and additional piece formats are analyzed to determine and confirm "uniqueness" of the musical piece, and (iii) the system user analyzes the audio file and/or additional piece formats, during the automated music composition and generation process of the present invention. A unique piece is one that is different from all other pieces. Uniqueness can be measured by comparing all attributes of a musical piece to all attributes of all other musical pieces in search of an existing musical piece that nullifies the new piece's uniqueness.

As indicated in FIGS. 27QQ1, 27QQ2 and 27QQ3, if musical piece uniqueness is not successfully confirmed, then the feedback subsystem B42 modifies the inputted musical experience descriptors and/or subsystem music-theoretic parameters, and then restarts the automated music composition and generation process to recreate the piece of music. If musical piece uniqueness is successfully confirmed, then the feedback subsystem B42 performs User Confirmation Analysis. User confirmation analysis is a feedback and editing process, whereby a user receives the musical piece created by the system and determines what to do next: accept the current piece, request a new piece based on the same inputs, or request a new or modified piece based on modified inputs. This is the point in the system that allows for editability of a created piece, equal to providing feedback to a human composer and setting him off to enact the change requests.

Thereafter, as indicated in FIG. 27QQ2, the system user analyzes the audio file and/or additional piece formats and determines whether or not feedback is necessary. To perform this analysis, the system user can (i) listen to the piece(s) or music in part or in whole, (ii) view a score file (represented with standard MIDI conventions), or otherwise (iii) interact with the piece of music, where the music might be conveyed with color, taste, physical sensation, etc., all of which would allow the user to experience the piece of music.

In the event that feedback is not determined to be necessary, then the system user either (i) continues with the current music piece, or (ii) uses the exact same user-supplied input musical experience descriptors and timing/spatial parameters to create a new piece of music using the system. In the event that feedback is determined to be necessary, then the system user provides/supplied desired feedback to the system. Such system user feedback may take on the form of text, linguistics/language, images, speech, menus, audio, video, audio/video (AV), etc.

In the event the system users desires to provide feedback to the system via the GUI of the input output subsystem B0, then a number of feedback options will be made available to the system user through a system menu supporting, for example, five pull-down menus.

As shown in FIGS. 22QQ2 and 27QQ3, the first pull down menus provides the system user with the following menu options: (i) faster speed; (ii) change accent location; (iii) modify descriptor, etc. The system user can make any one of these selections and then request the system to regenerate a new piece of composed music with these new parameters.

As shown in FIGS. 27QQ2 and 27QQ3, the second pull down menu provides the system user with the following menu options: (i) replace a section of the piece with a new section; (ii) when the new section follows existing parameters, modify the input descriptors and/or subsystem parameter tables, then restart the system and recreate a piece or music; and (iii) when the new section follows modified and/or new parameters, modify the input descriptors and/or subsystem parameter tables, then restart the system and recreate a piece or music. The system user can make any one of these selections and then request the system to regenerate a new piece of composed music.

As shown in FIGS. 27QQ2 and 27QQ3, the third pull down menu provides the system user with the following options: (i) combine multiple pieces into fewer pieces; (ii) designate which pieces of music and which parts of each piece should be combined; (iii) system combines the designated sections; and (iv) use the transition point analyzer and recreate transitions between sections and/or pieces to create smoother transitions. The system user can make any one of these selections and then request the system to regenerate a new piece of composed music.

As shown in FIGS. 27QQ2 and 27QQ3, the fourth pull down menu provides the system user with the following options: (i) split piece into multiple pieces; (ii) within existing pieces designate the desired start and stop sections for each piece; (iii) each new piece automatically generated; and (iv) use split piece analyzer and recreate the beginning and end of each new piece so as to create smoother beginning and end. The system user can make any one of these selections and then request the system to regenerate a new piece of composed music.

As shown in FIGS. 27QQ2 and 27QQ3, the fourth pull down menu provides the system user with the following options: (i) compare multiple pieces at once; (ii) select pieces to be compared; (iii) select pieces to be compared; (iv) pieces are lined up in sync with each other; (v) each piece is compared, and (vi) preferred piece is selected. The system user can make any one of these selections and then request the system to regenerate a new piece of composed music.

Specification of the Music Editability Subsystem (B43)

FIG. 27RR shows the Music Editability Subsystem (B43) used in the Automated Music Composition and Generation Engine E1 of the present invention. The Music Editability Subsystem B43 allows the generated music to be edited and modified until the end user or computer is satisfied with the result. The subsystem B43 or user can change the inputs, and in response, input and output results and data from subsystem B43 can modify the piece of music. The Music Editability Subsystem B43 incorporates the information from subsystem B42, and also allows for separate, non-feedback related information to be included. For example, the system user might change the volume of each individual instrument and/or the entire piece of music, change the instrumentation and orchestration of the piece, modify the descriptors, style input, and/or timing parameters that generated the piece, and further tailor the piece of music as desired. The system user may also request to restart, rerun, modify and/or recreate the system during the automated music composition and generation process of the present invention.

Specification of the Preference Saver Subsystem (B44)

FIG. 27SS shows the Preference Saver Subsystem (B44) used in the Automated Music Composition and Generation Engine E1 of the present invention. The Preference Saver Subsystem B44 modifies and/or changes, and then saves the altered probability-based parameter tables, logic order, and/or other elements used within the system, and distributes this data to the subsystems of the system, in order or to better reflect the preferences of a system user. This allows the piece to be regenerated following the desired changes and to allow the subsystems to adjust the data sets, data tables, and other information to more accurately reflect the user's musical and non-musical preferences moving forward.

As shown in FIG. 27SS, Subsystem B44 is supported by the Feedback Analyzer, the tempo parameter table and modified tempo parameter table, and parameter selection mechanisms (e.g. random number generator, or lyrical-input based parameter selector) as described in detail hereinabove.

The primary functionality of the Feedback analyzer is to determine an avenue for analysis and improvement of a musical piece, section, phrase, or other structure(s). The Feedback Analyzer considers the melodic, harmonic, and time-based structure(s) as well as user or computer-based input (both musical and non-musical) to determine its output.

As shown in the example reflected in FIG. 27SS, the system user has provided feedback that the musical "piece should be faster". Responding to this system user feedback, the Subsystem B44 adjusts the probability-based tempo parameter tables so that the tempos are adjusted to better reflect the system user's desire(s).

As shown in FIG. 27SS, the subsystem B44 then selects a new tempo for the piece of music using the modified tempo parameter table and a random number generator, and it is thus faster than the original tempo (e.g. 85 BPM). These changes and preferences are then saved to a user's individual profile and will be recalled and reused and potentially re-modified as the user continues to use the system.

Specification of the Musical Kernel (DNA) Generation Subsystem (B45)

FIG. 27TT shows the Musical Kernel (DNA) Generation Subsystem (B45) used in the Automated Music Composition and Generation Engine of the present invention. The Musical Kernel (DNA) Subsystem B45 analyzes, extracts, and saves the elements of a piece of music that might distinguish it from any other piece of music. Musical Kernel (DNA) Generation Subsystem B45 performs its functions using a (musical) DNA Analyzer which accepts as inputs all elements of the musical piece and uses a music theoretic basis and filter to determine its output, which is an organizational set of all events deemed important to the DNA of a musical piece. Using this input data, the DNA Analyzer identifies and isolates specific rhythmic, harmonic, timbre-related, or other musical events that, either independently or in concert with other events, play a significant role in the musical piece. These events might also be highly identifying features of a musical piece, such as a melody or rhythmic motif.

In general, the subsystem B45 determines the musical "kernel" of a music piece in terms of (i) melody (sub-phrase melody note selection order), (ii) harmony (i.e. phrase chord progression), (iii) tempo, (iv) volume, and (v) orchestration, so that this music kernel can be used during future automated music composition and generation process of the present invention. This information may be used to replicate, either with complete or incomplete accuracy, the piece of music at a later time.

For example, the Subsystem B45 may save the melody and all related melodic and rhythmic material, of a musical piece so that a user may create a new piece with the saved melody at a later time. It may also analyze and save the information from B32 in order to replicate the production environment and data of the piece.

Specification of the User Taste Generation Subsystem (B46)

FIG. 27SUU shows the user taste generation subsystem (B46) used in the Automated Music Composition and Generation Engine of the present invention. The subsystem determines the system user's musical taste based on system user feedback and autonomous piece analysis, and this musical taste information is used to change or modify the musical experience descriptors, parameters and table values, logic order, and/or other elements of the system for a music composition in order or to better reflect the preferences of a user.

In general, the subsystem B46 analyzes the user's personal musical and non-musical taste and modifies the data sets, data tables, and other information used to create a musical piece in order to more accurately and quickly meet a user's request in the future. For example, this subsystem may recognize that a user's request for "Happy" music is most satisfied when sad music is generated, even though this is not what the system believes should be the case. In this case, the system would modify all relevant subsystems and data so that sad music is generated for this user when the "Happy" request is made. These changes and preferences are then saved to a user's individual profile and will be recalled and reused and potentially re-modified as the user continues to use the system.

As shown in FIG. 27UU, the subsystem B46 employs a User Taster Analyzer and various parameter tables across the system to carry out its functions.

As shown in FIG. 27UU, the User Taster Analyzer performs autonomous piece analysis, and using system user feedback, the subsystem B46 changes the system user's system descriptors, parameters and table values to better reflect the system user's preferences.

As shown in FIG. 27UU, for the case where the user provides feedback by requesting to review music pieces characterized by the descriptor ROMANTIC, the system might return songs of the system user characterized as ROMANIC. As shown, consider the case example where the first piece created by the system user contains strings and the system user provides feedback to subsystem B46: less sappy.

In response, the subsystem B46 performs its functions and the piece is recreated. The second piece created replaces the strings with an electric guitar. In response, the system user provides feedback to subsystem B46: more romantic. In response, the subsystem B46 performs its functions and the piece is recreated. The third piece created adds a piano to the electric guitar and the system user provides feedback to the subsystem B46: perfect. In response, the subsystem B46 modifies the instrumentation parameter table for this system user with the romantic descriptor so as to increase the probability of electric guitar and piano being used, and decreasing the probability of using strings during the instrumentation process.

Specification of the Population Taste Aggregator Subsystem (B47)

FIG. 27VV shows the Population Taste Aggregator Subsystem (B47) used in the Automated Music Composition and Generation Engine of the present invention. The Population Taste Subsystem B47 analyzes all users' personal musical and non-musical taste and modifies the data sets, data tables, and other information used to create a musical piece in order to more accurately and quickly meet all users requests in the future. In general, the subsystem B47 aggregates the music taste of a population and changes to musical experience descriptors, and table probabilities can be modified in response thereto during the automated music composition and generation process of the present invention.

For example, this subsystem may recognize that the entire user base's requests for "Happy" music are most satisfied when sad music is generated, even though this is not what the system believes should be the case. In this case, the system would modify all relevant subsystems and data so that sad music is generated for the entire user base when the "Happy" request is made by an individual user. These changes and preferences are then saved on a population level and will be recalled and reused and potentially re-modified as the system's users continue to use the system.

As shown in FIG. 27VV, population taste subsystem B47 employs a Population Taste Aggregator to assist compiling and organizing all user feedback and including descriptors, parameter table values, and other feedback.

In the process diagram of FIG. 27VV, a case example is consider for the musical experience descriptor: romantic. In this example shown in FIG. 27VV, the population has provided feedback about the instrumentation of a musical piece. Reacting to this feedback, the population taste Subsystem B47 adjusts the tempos in probability parameter tables within the instrumentation subsystem(s) in the system, to better reflect the user's desire(s). As shown, the feedback of user 1 is that s/he did not like strings, liked electric guitar and like piano. The feedback of user s is that s/he did not like strings, liked electric guitar and like organ. The feedback of user s is that s/he did not like strings, liked acoustic guitar and like piano. In response, the subsystem B47 modifies the probability parameters for tempos in the instrumentation tables for users who selected romantic musical experience descriptors so as to increase the probability of electric guitar and piano and decrease the probability of strings being selected during the instrumentation process.

As shown in FIG. 27VV, in this case example, the subsystem B47 makes the following modifications to the instrumentation parameter table for system users selecting ROMANTIC: (i) decreased the probability of selecting the string instrument category during instrumentation; (ii) increased the probability of selecting the guitar category, and within this category, strongly increased the probability of selecting electric guitar and subtly increased selecting acoustic guitar; and (iii) increased the probability of selecting the keyboard instrument category, and within that category, significantly increased the probability of selecting piano, and subtly increased the probability of selecting organ.

As shown, using subsystem B47, both system user and computer feedback are used confirm and/or modify the probability tables, logic order, and/or other elements of the system in order or to better reflect the preferences of a population of users.

Specification of the User Preference Subsystem (B48)

FIG. 27WW shows the User Preference Subsystem (B48) used in the Automated Music Composition and Generation Engine of the present invention. The User Preference Subsystem B48 saves each user's related data and preferences from all system components in order to accurately and quickly satisfy any of the user's requests in the future. These system user preferences (e.g. musical experience descriptors, table parameters) are then used during the automated music composition and generation process of the present invention.

As shown in FIG. 27WW, the subsystem B48 receives and saves as input, system user musical experience descriptors (selected from the GUI-based subsystem B0) parameters, parameter table values and other preferences for future use by the system in better meeting system user preferences.

As indicated in FIG. 27WW, during operation, the subsystem B48 changes default probability-based parameter tables loaded from subsystems B1, B37, B40 and/or B41, to user-specific modified default parameter tables so that the modified default tables will more accurately and efficiently satisfy specific system user requests.

Specification of the Population Preference Subsystem (B49)

FIG. 27XX shows the Population Preference Subsystem (B49) used in the Automated Music Composition and Generation Engine of the present invention. The Population Preference Subsystem B49 saves all users' related data and preferences from all system components in order to accurately and quickly satisfy any of the users' requests in the future. The Population Saver Subsystem modifies and/or changes probability tables, logic order, and/or other elements of the system in order or to better reflect the preferences of a population. These changes to population preferences (e.g. musical experience descriptors, table parameters) are then saved to a population's profile(s) and will be recalled and reused and potentially re-modified as the population continues to use the system.

As shown in FIG. 27XX, the subsystem B49 receives and saves as input, system user musical experience descriptors (selected from the GUI-based subsystem B0) parameters, parameter table values and other preferences for future use by the system in better meeting a population's preferences.

As indicated in FIG. 27XX, during operation, the subsystem B49 changes default probability-based parameter tables loaded from subsystems B1, B37, B40 and/or B41, to user population-guided modified default parameter tables so that the modified default tables will more accurately and efficiently satisfy specific user population requests.

Overview of the Parameter Transformation Principles Employed in the Parameter Transformation Engine Subsystem (B51) of the Present Invention When practicing the systems and methods of the present invention, system designers and engineers will make use of various principles described below when designing, constructing and operating the Parameter Transformation Engine Subsystem B51 in accordance with the principles of the present invention. The essence of the present invention is to enable or empower system users (e.g. human beings as well as advanced computing machines) to specify the emotional, stylistic and timing aspects of music to be composed without requiring any formal knowledge of music or music theory. However, to realize this goal, the systems of the present invention need to employ powerful and rich music theoretic concepts and principles which are practiced strongly within the parameter transformation engine B51, where system user inputs are transformed into probabilistic-weight music-theoretic parameters that are loaded into the system operating parameter (SOP) tables and distributed across and loaded within the various subsystems for which they are specifically intended and required for proper system operation.

Transforming Musical Experience Parameters into Probabilistic-Based System Operating Parameters Maintained in the Parameter Tables of Subsystem B2

If the user provides the piece length, then no length parameter tables are used. If the user does not provide the piece length, then the system parameter table determines the piece length. If the music is being created to accompany existing content, then the length is defaulted to be the length of the existing content. If the music is not being created to accompany existing content, the length is decided based on a probability table with lengths and probabilities based on the musical emotion and style descriptor inputs. For example, a Pop song may have a 50% chance of having a three minute length, 25% chance of a two minute length, and 25% chance of having a four minute length, whereas a Classical song may have a 50% chance of having a six minute length, 25% chance of a five minute length, and 25% chance of having a seven minute length.

Transforming Musical Experience Parameters into Probabilistic-Based System Operating Parameters Maintained in the Parameter Tables of Subsystem B3

In general, there is a strong relationship between Emotion and style descriptors and tempo. For example, music classified as Happy is often played at a moderate to fast tempo, whereas music classified as Sad is often played a slower tempo. The system's tempo tables are reflections of the cultural connection between a musical experience and/or style and the speed at which the material is delivered. Tempo is also agnostic to the medium of the content being delivered, as speech said in a fast manner is often perceived as rushed or frantic and speech said in a slow manner is often perceived as deliberate or calm.

Further, tempo(s) of the musical piece may be unrelated to the emotion and style descriptor inputs and solely in existence to line up the measures and/or beats of the music with certain timing requests. For example, if a piece of music a certain tempo needs to accent a moment in the piece that would otherwise occur somewhere between the fourth beat of a measure and the first beat of the next measure, an increase in the tempo of a measure preceding the desired accent might cause the accent to occur squarely on the first beat of the measure instead, which would then lend itself to a more musical accent in line with the downbeat of the measure.

Transforming Musical Experience Parameters into System Operating Parameter Tables Maintained in the Parameter Tables of Subsystem B4

There is a strong relationship between Emotion and style descriptors and meter. For example, a waltz is often played with a meter of ¾, whereas a march is often played with a meter of 2/4. The system's meter tables are reflections of the cultural connection between a musical experience and/or style and the meter in which the material is delivered.

Further, meter(s) of the musical piece may be unrelated to the emotion and style descriptor inputs and solely in existence to line up the measures and/or beats of the music with certain timing requests. For example, if a piece of music a certain tempo needs to accent a moment in the piece that would otherwise occur on halfway between the fourth beat of a 4/4 measure and the first beat of the next 4/4 measure, an change in the meter of a single measure preceding the desired accent to ⅞ would cause the accent to occur squarely on the first beat of the measure instead, which would then lend itself to a more musical accent in line with the downbeat of the measure.

The above principles and considerations will be used by the system designer(s) when defining or creating "transformational mappings" (i.e. statistical or theoretical relationships) between (i) certain allowable combinations of emotion, style and timing/spatial parameters supplied by the system user(s) to the input output subsystem B0 of the system, and (ii) certain music-theoretic parameters (i.e. values) stored in system operating parameter (SOP) tables that are loaded into subsystem B4 and used during the automated music composition and generation system of the present invention.

Transforming Musical Experience Parameters into Probabilistic-Based System Operating Parameters Maintained in the Parameter Tables of Subsystem B5

There is a strong relationship between Emotion and style descriptors and key. For example, Pop music is often played in keys with none or a few sharps (e.g. C, G, D, A, E), whereas Epic music is often played in keys with a few or more flats (e.g. F, Bb, Eb, Ab). The system's key tables are reflections of the cultural connection between a musical experience and/or style and the key in which the material is delivered.

Further, keys(s) of the musical piece may be unrelated to the emotion and style descriptor inputs and solely in existence to reflect timing requests. For example, if a moment needs to elevate the tension of a piece, modulating the key up a minor third might achieve this result. Additionally, certain instruments perform better in certain keys, and the determination of a key might take into consideration what instruments are likely to play in a certain style. For example, in a classical style where violins are likely to play, it would be much more preferable to create a piece of music in a key with none or few sharps than with any flats.

Taking into consideration all of the system user selected inputs through subsystem B0, the key generation subsystem B5 creates the key(s) of the piece. For example, a piece with an input descriptor of "Happy," a length of thirty seconds, a tempo of sixty beats per minute, and a meter of 4/4 might have a one third probability of using the key of C (or 1, on a 1-12 scale, or 0 on a 1-11 scale), a one third probability of using the key of G (or 8, on a 1-12 scale, or 7 on a 1-11 scale), or a one third probability of using the key of A (or 10, on a 1-12 scale, or 9 on a 1-11 scale). If there are multiple sections, music timing parameters, and/or starts and stops in the music, multiple keys might be selected.

The above principles and considerations will be used by the system designer(s) when defining or creating "transformational mappings" (i.e. statistical or theoretical relationships) between (i) certain allowable combinations of emotion, style and timing/spatial parameters supplied by the system user(s) to the input output subsystem B0 of the system, and (ii) certain music-theoretic parameters (i.e. values) stored in system operating parameter (SOP) tables that are loaded into subsystem B5 and used during the automated music composition and generation system of the present invention.

Transforming Musical Experience Parameters into Probabilistic-Based System Operating Parameters Maintained in the Parameter Tables of Subsystem B7

There is a strong relationship between Emotion and style descriptors and tonality. For example, Happy music is often played with a Major tonality, whereas Sad music is often played with a Minor tonality. The system's key tables are reflections of the cultural connection between a musical experience and/or style and the tonality in which the material is delivered.

Further, tonality(s) of the musical piece may be unrelated to the emotion and style descriptor inputs and solely in existence to reflect timing requests. For example, if a moment needs to transition from a tense period to a celebratory one, changing the tonality from minor to major might achieve this result.

A user is not required to know or select the tonality of the piece of music to be created. Tonality has a direct connection with the cultural canon, and the parameters and probabilities that populate this table are based on a deep knowledge and understanding of this history. For example, Happy music is often created in a Major tonality, Sad music is often created in a Minor tonality, and Playful music is often created in a Lydian tonality. The user musical emotion and style descriptor inputs are responsible for determining which tonalities are possible options for the piece of music and how likely each possibility will be.

The above principles and considerations will be used by the system designer(s) when defining or creating "transformational mappings" (i.e. statistical or theoretical relationships) between (i) certain allowable combinations of emotion, style and timing/spatial parameters supplied by the system user(s) to the input output subsystem B0 of the system, and (ii) certain music-theoretic parameters (i.e. values) stored in system operating parameter (SOP) tables that are loaded into subsystem B7 and used during the automated music composition and generation system of the present invention.

Transforming Musical Experience Parameters into Probabilistic-Based System Operating Parameters Maintained in the Parameter Tables of Subsystem B9

All music has a form, even if the form is empty, unorganized, or absent. Pop music traditionally has form elements including Intro, Verse, Chorus, Bridge, Solo, Outro, etc. Also, song form phrases can have sub-phrases that provide structure to a song within the phrase itself.

Each style of music has established form structures that are readily associated with the style. Outside of Pop music, a Classical sonata might have a form of Exposition Development Recapitulation (this is simplified, of course), where the Recapitulation is modified presentation of Exposition. This might be represented as ABA', where the signifies the modified presentation of the original "A" materials.

The song form is also determined by the length of the musical piece. The longer a piece of music, the greater flexibility and options that exist for the form of the piece. In contrast, a 5 second piece of music can only realistically have a few limited form options (often a single A form). Further, timing events might influence a song form. If it is necessary to signify a huge shift in a piece of music, including a chorus or B section might effectively create this shift.

Emotion can also influence song form as well. For example, songs described as a love song, might have a typical forms associated with them, following cultural cannons, whereas songs that are described as Celtic might have very different song forms.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B9 and used during the automated music composition and generation system of the present invention.

Transforming Musical Experience Parameters into Probabilistic-Based System Operating Parameters Maintained in the Parameter Tables of Subsystem B15

In general, the sub-phrase lengths are determined by (i) the overall length of the phrase (i.e. a phrase of 2 seconds will have many fewer sub-phrase options that a phrase of 200 seconds), (ii) the timing necessities (i.e. parameters) of the piece, and (iii) the style and emotion-type musical experience descriptors.

The amount, length, and probability of Sub-phrase lengths are dependent on the piece length and on the knowledge of which combinations of the previously mentioned characteristics best fit together when creating a piece of music.

Sub-phrase lengths are influenced by the Emotion and Style descriptors provided by the system user. For example, Happy types of music might call for shorter sub-phrase lengths whereas Sad types of music might call for longer sub-phrase lengths.

The greater amount of sub-phrases, the less likely each is to have a very large length. And the fewer amount of sub-phrases, the more likely each is to have a very large length.

Sub-phrases also have to fit within the length of a piece of music and a specific phrase, so as certain sub-phrases are decided, future sub-phrase decisions and related parameters might be modified to reflect the remaining length that is available.

Sub-phrases might also be structured around user-requested timing information, so that the music naturally fits the user's request. For example, if a user requests a change in the music that happens to be 2 measures into the piece, the first sub-phrase length might be two measures long, caused by a complete 100% probability of the sub-phrase length being two measures long.

This parameter transformation engine subsystem B51 analyzes all of the system user input parameters and then generates and loads a probability-weighted data set of rhythms and lengths in the SOP tables, based on the input all previous processes in the system. Taking into consideration these inputs, this system creates the sub-phrase lengths of the piece. For example, a 30 second piece of music might have four sub-subsections of 7.5 seconds each, three subsections of 10 seconds, or five subsections of 4, 5, 6, 7, and 8 seconds.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B15 and used during the automated music composition and generation system of the present invention.

Transforming Musical Experience Parameters into Probabilistic-Based System Operating Parameters Maintained in the Parameter Tables of Subsystem B11

There is a strong relationship between emotion and style descriptors and chord length. For example, Frantic music is might likely have very short chord lengths that change frequently, whereas Reflective music might have very long chord lengths that change much less frequently. The system's length tables are reflections of the cultural connection between a musical experience and/or style and the tonality in which the material is delivered.

Further, the length of each chord is dependent upon the lengths of all previous chords; the lengths of the other chords in the same measure, phrase, and sub-phrase; and the lengths of the chords that might occur in the future. Each preceding chord length determination factors into the decision for a certain chord's length, so that the second chord's length is influenced by the first chord's length, the third chord's length is influenced by the first and second chords' lengths, and so on.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B11 and used during the automated music composition and generation system of the present invention.

Transforming Musical Experience Parameters into Probabilistic-Based System Operating Parameters Maintained in the Parameter Tables of Subsystem B17

There is a strong relationship between Emotion and style descriptors and the initial chord. For example, a traditional piece of music might start with a Root Note equal to the key of the piece of music, whereas a piece of music that is more outside the box might start with a Root Note specifically not equal to the key of the piece.

Once a root note is selected, the function of the chord must be determined. Most often, the function of a chord is that which would occur if a triad was created in a diatonic scale of the key and tonality chosen. For example, a C chord in C Major would often function as a I chord and G chord in C Major would often function as a V chord. Once the function of a chord is determined, the specific chord notes are designated. For example, once a C chord is determined to function as a I chord, then the notes are determined to be C E G, and when a D chord is determined to function as a ii chord, then the notes are determined to be D F A.

The initial chord root note of a piece of music is based on the Emotion and style descriptor inputs to the system. Musical canon has created a cultural expectation for certain initial root notes to appear in different types of music. For example, Pop music often starts with a Root of 0, of in the key of C Major, a root of C. Once an initial root note is selected, the function of the chord that will contain the initial root note must be decided. In the key of C Major, a root note of C might reasonably have either a major or minor triad built upon the root. This would result in either a functionality of an "I" major chord or an "i" minor chord. Further, the "I" major chord might actually function as a "V/V" Major chord, in which, though it sounds identical to an "I" major chord, it functions differently and with different intent. Once this function is decided, the initial chord is now known, as the function of a chord informs the system of the notes that will make up the chord. For example, any "I" major triad will be comprised of the Root, Third, and Fifth notes of the scale, or in the key of C Major, a C major triad would be comprised of the notes C, E, and G.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B17 and used during the automated music composition and generation system of the present invention.

Transforming Musical Experience Parameters into Probabilistic-Based System Operating Parameters Maintained in the Parameter Tables of Subsystem B19

There is a strong relationship between Emotion and style descriptors and the chord progressions. For example, a Pop piece of music might have a sub-phrase chord progression of C A F G, whereas a Gospel piece of music might have a sub-phrase chord progression of C F C F.

Further, the chord root of the progression is dependent upon the chord roots of all previous chords; the chord roots of the other chords in the same measure, phrase, and sub-phrase; and the chord roots of the chords that might occur in the future. Each preceding chord root determination factors into the decision for a certain chord's root, so that the second chord's root is influenced by the first chord's root, the third chord's root is influenced by the first and second chords' roots, and so on.

Once a chord's root is determined, the function of the chord is determined as described above. The function of a chord will then directly affect the chord root table to alter the default landscape of what chord roots might be selected in the future. For example, a C major chord in the key of C major functioning as a I chord will follow the default landscape, whereas a C major chord in the key of C major functioning as a V/IV chord will follow an altered landscape that guides the next chord to likely be a IV chord (or reasonably substitution or alteration).

Additionally, an upcoming chord's position in the piece of music, phrase, sub-phrase, and measure affects the default landscape of what chord roots might be selected in the future. For example a chord previous to a downbeat at the end of a phrase might ensure that the subsequent chord be a I chord or other chord that accurately resolves the chord progression.

Based on the cultural canon of music heretofore, Emotion and style descriptors may suggest or be well represented by certain connections or progressions of chords in a piece of music. To decide what chord should be selected next, the subsequent chord root is first decided, in a manner similar to that of B17. For each possible originating chord root, probabilities have been established to each possible subsequent chord root, and these probabilities are specifically based on the Emotion and style descriptors selected by the user.

Next, and also in a similar manner to that of B17, the function of a chord is selected. The function of the chord will affect what chords are likely to follow, and so the Chord Function Root Modifier Table provides for changes to the probabilities of the Chord Root Table based on which function is selected. In this manner, the Chord Function will directly affect which Chord Root is selected next.

Next, the position in time and space of a chord is considered, as this factor has a strong relationship with which chord root notes are selected. Based on the upcoming beat in the measure for which a chord will be selected, the chord root note table parameters are further modified. This cycle replays again and again until all chords have been selected for a piece of music.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B19 and used during the automated music composition and generation system of the present invention.

There is a strong relationship between Emotion and style descriptors and the chord progressions. For example, a Pop piece of music might have a sub-phrase chord progression of C A F G, whereas a Gospel piece of music might have a sub-phrase chord progression of C F C F.

Further, the chord root of the progression is dependent upon the chord roots of all previous chords; the chord roots of the other chords in the same measure, phrase, and sub-phrase; and the chord roots of the chords that might occur in the future. Each preceding chord root determination factors into the decision for a certain chord's root, so that the second chord's root is influenced by the first chord's root, the third chord's root is influenced by the first and second chords' roots, and so on.

Once a chord's root is determined, the function of the chord is determined as described above. The function of a chord will then directly affect the chord root table to alter the default landscape of what chord roots might be selected in the future. For example, a C major chord in the key of C major functioning as a I chord will follow the default landscape, whereas a C major chord in the key of C major functioning as a V/IV chord will follow an altered landscape that guides the next chord to likely be a IV chord (or reasonably substitution or alteration).

Additionally, an upcoming chord's position in the piece of music, phrase, sub-phrase, and measure affects the default landscape of what chord roots might be selected in the future. For example a chord previous to a downbeat at the end of a phrase might ensure that the subsequent chord be a I chord or other chord that accurately resolves the chord progression.

Transforming Musical Experience Parameters into Probabilistic-Based System Operating Parameters Maintained in the Parameter Tables of Subsystem B20

There is a strong relationship between Experience (i.e. Emotion) and Style descriptors and the chord inversions. For example, a Rock piece of music might have chord inversions of predominantly tonics, whereas a Classical piece of music might have chord inversions consisting of much more diverse mix of tonics, first inversions, and second inversions.

The inversion of an initial chord is determined. Moving forward, all previous inversion determinations affect all future ones. An upcoming chord's inversion in the piece of music, phrase, sub-phrase, and measure affects the default landscape of what chord inversions might be selected in the future.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B20 and used during the automated music composition and generation system of the present invention.

Transforming Musical Experience Parameters into Probabilistic-Based System Operating Parameters Maintained in the Parameter Tables of Subsystem B25

There is a strong relationship between Emotion and style descriptors and melody length. For example, a Classical piece of music might have a long melody length (that is appropriate for the longer forms of classical music), whereas a Pop piece of music might have a shorter melody length (that is appropriate for the shorter forms of pop music). One important consideration for the melody length is determining where in a sub-phrase the melody starts. The later in a sub-phrase that the melody starts, the shorter it has the potential to be.

Further, melody sub-phrase length may be unrelated to the emotion and style descriptor inputs and solely in existence to line up the measures and/or beats of the music with certain timing requests. For example, if a piece of music needs to accent a moment in the piece that would otherwise occur somewhere in the middle of a sub-phrase, beginning the melody at this place might then create more musical accent that otherwise would require additional piece manipulation to create.

Melody Sub-phrase lengths are determined based on the Music Emotion and style descriptors provided by the user. The amount, length, and probability of Melody Sub-phrase lengths are dependent on the Piece length, unique sub-phrases, phrase lengths, and on the knowledge of which combinations of the previously mentioned characteristics best fit together when creating a piece of music.

The greater amount of melody sub-phrases, the less likely each is to have a very large length. And the fewer amount of melody sub-phrases, the more likely each is to have a very large length.

Melody Sub-phrases also have to fit within the length of a piece of music and a specific phrase, so as certain melody sub-phrases are decided, future melody sub-phrase decisions and related parameters might be modified to reflect the remaining length that is available.

Melody Sub-phrases might also be structured around user-requested timing information, so that the music naturally fits the user's request. For example, if a user requests a change in the music that happens to be 3 measures into the piece, the first melody sub-phrase length might be three measures long, caused by a complete 100% probability of the melody sub-phrase length being two measures long.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B25 and used during the automated music composition and generation system of the present invention.

Transforming Musical Experience Parameters into Probabilistic-Based System Operating Parameters Maintained in Subsystem B26

There is a strong relationship between Emotion and style descriptors and melody note rhythm. For example, Frantic music is likely to have very short melody note rhythms that change frequently, whereas Reflective music might have very long chord lengths that change much less frequently. The system's rhythm tables are reflections of the cultural connection between a musical experience and/or style and the tonality in which the material is delivered.

Further, the rhythm of each melody note is dependent upon the rhythms of all previous melody notes; the rhythms of the other melody notes in the same measure, phrase, and sub-phrase; and the melody rhythms of the melody notes that might occur in the future. Each preceding melody notes rhythm determination factors into the decision for a certain melody note's rhythm, so that the second melody note's rhythm is influenced by the first melody note's rhythm, the third melody note's rhythm is influenced by the first and second melody notes' rhythms, and so on.

Further, the length of each melody note is dependent upon the lengths of all previous melody notes; the lengths of the other melody notes in the same measure, phrase, and sub-phrase; and the lengths of the melody notes that might occur in the future. Each preceding melody note length determination factors into the decision for a certain melody note's length, so that the second melody note's length is influenced by the first melody note's length, the third melody note's length is influenced by the first and second melody notes' lengths, and so on.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B26 and used during the automated music composition and generation system of the present invention.

Transforming Musical Experience Parameters into Probabilistic-Based System Operating Parameters Maintained in the Parameter Tables of Subsystem B29

There is a strong relationship between Emotion and style descriptors and the pitch. For example, a Pop piece of music might have pitches that are largely diatonic, whereas an Avant-garde piece of music might have pitches that are agnostic to their relationship with the piece's key or even each other.

Each pitch of a sub-phrase is dependent upon the pitches of all previous notes; the pitches of the other notes in the same measure, phrase, and sub-phrase; and the pitches of the notes that might occur in the future. Each preceding pitch determination factors into the decision for a certain note's pitch, so that the second note's pitch is influenced by the first note's pitch, the third note's pitch is influenced by the first and second notes' pitches, and so on.

Additionally, the chord underlying the pitch being selected affects the landscape of possible pitch options. For example, during the time that a C Major chord occurs, consisting of notes C E G, the note pitch would be more likely to select a note from this chord than during the time that a different chord occurs.

Also, the notes' pitches are encourage to change direction, from either ascending or descending paths, and leap from one note to another, rather than continuing in a step-wise manner.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B29 and used during the automated music composition and generation system of the present invention.

Transforming Musical Experience Parameters into Probabilistic-Based System Operating Parameters Maintained in the Parameter Tables of Subsystem B30

There is a strong relationship between Emotion and style descriptors and the pitch frequency. For example, a Moody piece of music might have pitches that are lower in the frequency range, whereas an Energetic piece of music might have pitches that are higher in the frequency range.

Each pitch frequency of a sub-phrase is dependent upon the pitch frequencies of all previous notes; the pitch frequencies of the other notes in the same measure, phrase, and sub-phrase; and the pitch frequencies of the notes that might occur in the future. Each preceding pitch frequency determination factors into the decision for a certain note's pitch frequency, so that the second note's pitch frequency is influenced by the first note's pitch frequency, the third note's pitch frequency is influenced by the first and second notes' pitch frequencies, and so on.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B30 and used during the automated music composition and generation system of the present invention.

Transforming Musical Experience Parameters into Probabilistic-Based System Operating Parameters Maintained in the Parameter Tables of Subsystem B39

There is a strong relationship between Emotion and style descriptors and the instruments that play the music. For example, a Rock piece of music might have guitars, drums, and keyboards, whereas a Classical piece of music might have strings, woodwinds, and brass.

There is a strong relationship between Emotion and style descriptors and the instrumentation of a musical piece or a section of a musical piece. For example, Pop music might be likely have Guitars, Basses, Keyboards, and Percussion, whereas Classical music might have Strings, Brass, and Woodwinds. Further different types of Pop music or different Musical Emotion and style descriptors might have different types of instruments within each instrument category, so that Driving Pop music might have electric guitars, whereas Calm Pop music might have acoustic guitars.

Further, while the piece instrumentation will contain all instruments within the piece, all instruments might not always play together all of the time.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B39 and used during the automated music composition and generation system of the present invention.

Transforming Musical Experience Parameters that Populate System Operating Parameter Tables in the Parameter Tables of Subsystem B31

There is a strong relationship between Emotion and style descriptors and the instruments that play the music. For example, a piece of music orchestrated in a Rock style might have a sound completely different than the same piece of music orchestrated in a Classical style.

Further, the orchestration of the musical piece may be unrelated to the emotion and style descriptor inputs and solely in existence to effect timing requests. For example, if a piece of music needs to accent a certain moment, regardless of the orchestration thus far, a loud crashing percussion instrument such as a cymbal might successfully accomplish this timing request, lending itself to a more musical orchestration in line with the user requests.

It is important in orchestration to create a clear hierarchy of each instrument and instrument groups' function in a piece or section of music, as the orchestration of an instrument functioning as the primary melodic instrument might be very different than if it is functioning as an accompaniment. Once the function of an instrument is determined, the manner in which the instrument plays can be determined. For example, a piano accompaniment in a Waltz (in a ¾ time signature) might have the Left Hand play every downbeat and the Right Hand play every second and third beat. Once the manner in which an instrument is going to play is determined, the specifics, including the note lengths, can be determined. For example, continuing the previous example, if the Left Hand of the piano plays on the downbeat, it might play for an eighth note or a half note.

Each note length is dependent upon the note lengths of all previous notes; the note lengths of the other notes in the same measure, phrase, and sub-phrase; and the note lengths of the notes that might occur in the future. Each preceding note length determination factors into the decision for a certain note's length, so that the second note's length is influenced by the first note's length, the third note's length is influenced by the first and second notes' lengths, and so on.

The dynamics of each instrument should also be determined to create an effective orchestration. The dynamics of an instrument's performance will be ever changing, but are often determined by guiding indications that follow the classical music theory cannon.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B31 and used during the automated music composition and generation system of the present invention.

Transforming Musical Experience Parameters into Probabilistic-Based System Operating Parameters Maintained in the Parameter Tables of Subsystem B32

There is a strong relationship between Emotion and style descriptors and the controller code information that informs how the music is played. For example, a piece of music orchestrated in a Rock style might have a heavy dose of delay and reverb, whereas a Vocalist might incorporate tremolo into the performance.

Further, the controller code information of the musical piece may be unrelated to the emotion and style descriptor inputs and solely in existence to effect timing requests. For example, if a piece of music needs to accent a certain moment, regardless of the controller code information thus far, a change in the controller code information, such as moving from a consistent delay to no delay at all, might successfully accomplish this timing request, lending itself to a more musical orchestration in line with the user requests.

The above principles and considerations will be used by the system designer(s) when defining or creating transformational mappings between (i) certain allowable combinations of emotion, style and timing/spatial parameters supplied by the system user(s) to the input output subsystem B0 of the system, and (ii) certain music-theoretic parameters stored in system operating parameter tables that are loaded into subsystem B32 and used during the automated music composition and generation system of the present invention.

Controlling the Timing of Specific Parts of the Automated Music Composition and Generation System of the Present Invention FIGS. 29A and 29B set forth a schematic representation of a timing control diagram illustrating the time sequence that particular timing control pulse signals are sent to each subsystem block diagram in the system diagram shown in FIGS. 26A through 26P. Notably, this sequence of timing events occurs after the system has received its musical experience descriptor inputs from the system user, and the system has been automatically arranged and configured in its operating mode, wherein music is automatically composed and generated in accordance with the principles of the present invention.

The Nature and Various Possible Formats of the Input and Output Data Signals Supported by the Illustrative Embodiments of the Present Invention FIGS. 30 through 30J, when assembled together according to FIG. 30, set forth a schematic representation of a table describing the nature and various possible formats of the input and output data signals supported by each subsystem within the Automated Music Composition and Generation System of the illustrative embodiments of the present invention described herein, wherein each subsystem is identified in the table by its block name or identifier (e.g. B1).

FIG. 31 is a schematic representation of a table describing exemplary data formats that are supported by the various data input and output signals (e.g. text, chord, audio file, binary, command, meter, image, time, pitch, number, tonality, tempo, letter, linguistics, speech, MIDI, etc.) passing through the various specially configured information processing subsystems employed in the Automated Music Composition and Generation System of the present invention.

Specification of the Musical Experience Descriptors Supported by Automated Music Composition and Generation System of the Present Invention FIGS. 32A through 32F show a table describing an exemplary hierarchical set of "emotional" descriptors, arranged according to primary, secondary and tertiary emotions. Theses emotion-type descriptors are supported as "musical experience descriptors" for system users to provide as system user input to the Automated Music Composition and Generation System of the illustrative embodiments of the present invention.

FIGS. 33A, 33B, 33C, 33D and 33E, taken together, provides a table describing an exemplary set of "style" descriptors which are supported as musical experience descriptors for system users to provide as input to the Automated Music Composition and Generation System of the illustrative embodiments of the present invention.

System Network Tools for Creating and Managing Parameters Configurations within the Parameter Transformation Engine Subsystem B51 of the Automated Music Composition and Generation System of the Present Invention FIG. 34 shows the automated Music Composition And Generation System Network of the present invention, comprising (i) a plurality of remote system designer client workstations (DWS), operably connected to the Automated Music Composition And Generation Engine (E1) of the present invention. As shown in other figures, the Parameter Transformation Engine Subsystem B51 and its associated Parameter Table Archive Database Subsystem B80 are maintained in the Engine E1. Each workstation client system (DWS) supports a GUI-based work environment for creating and managing "parameter mapping configurations (PMC)" within the parameter transformation engine subsystem B51, of whatever illustrative embodiment is under design and manufacture. Using this system network, one or more system designers remotely situated anywhere around the globe can log into the system network and access the GUI-based work environment and create "parameter mapping configurations" between (i) different possible sets of emotion-type, style-type and timing/spatial parameters that might be selected by system users, and (ii) corresponding sets of probability-based music-theoretic system operating parameters, preferably maintained within parameter tables, for persistent storage within the Parameter Transformation Engine Subsystem B51 and its associated Parameter Table Archive Database Subsystem B80.

These parameter mapping configuration tools are used to configure the Parameter Transformation Engine Subsystem B52 during the system design stage, and thereby program define or set probability parameters in the sets of parameter tables of the system for various possible combinations of system user inputs described herein. More particularly, these system designer tools enable the system designer(s) to define probabilistic relationships between system user selected sets of emotion/style/timing parameters and the music-theoretic system operating parameters (SOP) in the parameter tables that are ultimately distributed to and loaded into the subsystems, prior to execution of the automated music composition and generation process. Such upfront parameter mapping configurations by the system designer imposes constraints on system operation, and the parameter selection mechanisms employed within each subsystem (e.g. random number generator, or user-supplied lyrical or melodic input data sets) used by each subsystem to make local decisions on how a particular parts of a piece of music will be ultimately composed and generated by the system during the automated music composition and generation process of the present invention.

As shown in FIG. 35A, the GUI-based work environment supported by the system network shown in FIG. 34 provides the system designer with the choice of (i) managing existing parameter mapping configurations, and (ii) creating a new parameter mapping configuration for loading and persistent storage in the Parameter Transformation Engine Subsystem B51. In turn, the Parameter Transformation Engine Subsystem B51 generates corresponding probability-based music-theoretic system operating parameter (SOP) table(s) represented in FIGS. 28A through 28S, and loads the same within the various subsystems employed in the deployed Automated Music Composition and Generation System of the present invention;

As shown in FIG. 35B, the system designer selects (i) managing existing parameter mapping configurations from the GUI shown in FIG. 35A, and is presented a list of currently created parameter mapping configurations that have been created and loaded into persistent storage in the Parameter Transformation Engine Subsystem B51 of the system of the present invention.

As shown in FIG. 36A, the system designer selects (i) creating a new parameter mapping configuration from the GUI screen shown in FIG. 35A.

As shown in FIG. 36B, the system designer is presented with a GUI-based worksheet for use in creating a parameter mapping configuration between (i) a set of possible system-user selectable emotion/style/timing parameters, and a set of corresponding probability-based music-theoretic system operating parameter (SOP) table(s) represented in FIGS. 28A through 28S, for loading within the various subsystems employed in the deployed Automated Music Composition and Generation System of the present invention. Using the exemplary GUI-based worksheet shown in FIG. 35B, the task of the system designer, or team thereof working together, is to create, for each possible set of emotion/style/timing parameters that might be selected by any given system user, a corresponding set the probability values for each music-theoretic SOP table in the master set of probability-based system operating parameter (SOP) tables illustrated in FIGS. 28A through 28S.

In general, the number of possible combinations of probability-based SOP tables that will need to be generated for configuring the Parameter Transformation Engine Subsystem B51 with parameter-transformational capacity, will be rather large, and will be dependent on the size of possible emotion-type and style-type musical experience descriptors that may be selected by system users for any given system design deployed in accordance with the principles of the present invention. The scale of such possible combinations has been discussed and modeled hereinabove.

These tools illustrated in FIGS. 34 through 36B are merely illustrative examples of how system design experts can add and embody their musical composition expertise, knowledge and know how within the Automated Musical Composition And Generation Systems of the present invention disclosed herein. Typically, such expertise, knowledge and/or know how will be transferred from the system designer(s) and engineer(s) to digital and/or analog circuitry supported with the music composition machine, using techniques adapted for manipulating the parameters and datasets maintained within in the various system operating parameter (SOP) tables associated with the various subsystems of the system, as described herein. Other techniques and methods will readily occur to those skilled in the art in view of the present invention disclosure set forth herein.

Using Lyrical and/or Musical Input to Influence the Configuration of the Probability-Based System Operating Parameter Tables Generated in the Parameter Transformation Engine Subsystem B51, and Alternative Methods of Selecting Parameter Values from Probability-Based System Operating Parameter Tables Employed in the Various Subsystems Employed in the System of the Present Invention Throughout the illustrative embodiments, a random number generator is shown being used to select parameter values from the various probability-based music-theoretic system operating parameter tables employed in the various subsystems of the automated music composition and generation system of the present invention. It is understood, however, that non-random parameter value selection mechanisms can be used during the automated music composition and generation process. Such mechanisms can be realized globally within the Parameter Transformation Engine Subsystem B51, or locally within each Subsystem employing probability-based parameter tables.

In the case of global methods, the Parameter Transformation Engine Subsystem B51 (or other dedicated subsystem) can automatically adjust the parameter value weights of certain parameter tables shown in FIGS. 27B3A through 27B3C in response to pitch information automatically extracted from system user supplied lyrical input or musical input (e.g. humming or whistling of a tune) by the pitch and rhythm extraction subsystem B2. In such global methods, a random number generator can be used to select parameter values from the lyrically/musically-skewed parameter tables, or alternative parameter mechanisms such as the lyrical/musical-responsive parameter value section mechanism described below in connection with local methods of implementation.

In the case of local methods, the Real-Time Pitch Event Analyzing Subsystem B52 employed in the system shown in FIG. 37 can be used to capture real-time pitch and rhythm information from system user supplied lyrics or music (alone or with selected musical experience and timing parameters) which is then provided to a lyrical/musical responsive parameter value selection mechanism supported in each subsystem (in lieu of a random number generator). The parameter value selection mechanism receives the pitch and rhythmic information extracted from the system user and can use it to form a decision criteria, as to which parameter values in probability-based parameter tables should be selected. Ideally, the selection will be made so that the resulting composed music will correspond to the pitch and rhythmic information extracted by the Real-Time Pitch Event Analyzing Subsystem B52.

In either method, global or local, from a set of lyrics and/or other input medium(s) (e.g. humming, whistling, tapping etc.), the system of the present invention may use, for example, the Real-Time Pitch Event Analyzing Subsystem B52 in FIGS. 37 through 49, distill the system user input to the motivic level of the input rhythm, pitch, and rhythm/pitch. In some case, this lyrical/musical input can serve as supplemental musical experience descriptors along with emotion-type and style-type musical experience descriptors; or in other cases, this lyrical/musical input might serve as primary musical experience descriptors, without emotion and/or style descriptors. The Real-Time Pitch Event Analyzing Subsystem B52 may then analyze the motivic content to identify patterns, tendencies, preferences, and/or other meaningful relationships in the material. The Parameter Transformation Engine Subsystem B51 may then transform these relationships into parameter value or value range preferences for the probability-based system operating parameter tables illustrated in FIGS. 28A through 28S. The system may then be more likely to select certain value(s) from the system operating tables (whose parameters have already been created and/or loaded) that reflect the analysis of the lyrical/musical input material so that the subsequently created piece of music reflects the analysis of the input material.

It will be helpful to discuss a few types of pitch and rhythmic information which, when extracted from lyrical/musical input by the system user, would typically influence the selection of parameter values in certain parameter tables using a lyrically, or musically, responsive parameter selection mechanism being proposed in this alternative embodiments of the present invention. These case examples will apply to both the global and local methods of implementation discussed above.

For example, in the event that the input material consists of a high frequency of short and fast rhythmic material, then the rhythmic-related subsystems (i.e. B2, B3, B4, B9, B15, B11, B25, and B26 illustrated in FIGS. 27B3A through 27BC) might be more likely to select 16th and 8th note rhythmic values or other values in the parameter tables that the input material might influence. Consider the following rhythm-related examples: (i) a system user singing a melody with fast and short rhythmic material might cause the probabilities in Subsystem B26 to change and heavily emphasize the sixteenth note and eighth note options; (ii) a system user singing a waltz with a repetitive pattern of 3 equal rhythms might cause the probabilities in Subsystem B4 to change and heavily emphasize the ¾ or 6/8 meter options; (iii) a system user singing a song that follows a Verse Chorus Verse form might cause the probabilities in Subsystem B9 to change and heavily emphasize the ABA form option; (iv) a system user singing a melody with a very fast cadence might cause the probabilities in Subsystem B3 to change and heavily emphasize the faster tempo options; and (v) a system user singing a melody with a slowly changing underlying implied harmonic progression might cause the probabilities in Subsystem B11 to change and heavily emphasize the longer chord length options.

In the event that the input material consists of pitches that comprise a minor key, then the pitch-related subsystems (i.e. B5, B7, B17, B19, B20, B27, B29 and B30 illustrated in FIGS. 27B3A, 27B3B and 27B3C) might be more likely to select a minor key(s) and related minor chords and chord progressions or other values that the inputted material might influence. Consider the following pitch-related examples: (i) a system user singing a melody that follows a minor tonality might cause the probabilities in Subsystem B7 to change and heavily emphasize the Minor tonality options; (ii) a system user singing a melody that centers around the pitch D might cause the probabilities in Subsystem B27 to change and heavily emphasize the D pitch option; (iii) a system user singing a melody that follows an underlying implied harmonic progression centered around E might cause the probabilities in Subsystem B17 to change and heavily emphasize the E root note options; (iv) a system user singing a melody that follows a low pitch range might cause the probabilities in the parameter tables in Subsystem B30 to change and heavily emphasize the lower pitch octave options; and (v) a system user singing a melody that follows an underlying implied harmonic progression centered around the pitches D F# and A might cause the probabilities in Subsystem B5 to change and heavily emphasize the key of D option.

In the event that the system user input material follows a particular style or employs particular the controller code options, then the instrumentation subsystems B38 and B39 and controller code subsystem B32 illustrated in FIGS. 27B3A, 27B3B and 27B3C, might be more likely to select certain instruments and/or particular controller code options, respectively. Consider the following examples: (i) a system user singing a melody that follows a Pop style might cause the probabilities in Subsystem B39 to change and heavily emphasize the pop instrument options; and (ii) a system user singing a melody that imitates a delay effect might cause the probabilities in Subsystem B32 to change and heavily emphasis the delay and related controller code options.

Also, in the event that the system user input material follows or imitates particular instruments, and/or methods of playing the same, then the orchestration subsystem B31 illustrated in FIGS. 27B3A, 27B3B and 27B3C might be more likely to select certain orchestration options. Consider the following orchestration-related examples: (i) a system user singing a melody with imitated musical performance(s) of an instrument(s) might cause the probabilities in Subsystem B31 to change and heavily emphasize the orchestration of the piece to reflect the user input; (ii) if a system user is singing an arpeggiated melody, the subsystem B31 might heavily emphasize an arpeggiated or similar orchestration of the piece; (iii) a system user singing a melody with imitated instruments performing different musical functions might cause the probabilities in Subsystem B31 to change and heavily emphasize the musical function selections related to each instrument as imitated by the system user; and (iv) if a system user is alternating between singing a melody in the style of violin and an accompaniment in the style of a guitar, then the Subsystem B31 might heavily emphasize these musical functions for the related or similar instrument(s) of the piece.

Specification of the Seventh Illustrative Embodiment of the Automated Music Composition and Generation System of the Present Invention FIG. 37 shows a seventh alternative embodiment of the Automated Music Composition And Generation Instrument System of the present invention supporting virtual-instrument music synthesis driven by linguistic-based or graphical-icon based musical experience descriptors, and optionally, lyrical (word string) expressions provided by the system user to the input output subsystem B0 in the form of typed text strings, spoken words or sung lyrics, as the case may be. As used herein, the term "virtual-instrument music synthesis" refers to the creation of a musical piece on a note-by-note and chord-by-chord basis, using digital-audio notes, chords and sequences of notes, that have been produced using one or more virtual instruments created using, for example, the various music and instrument synthesis techniques including digital audio sampling techniques, disclosed herein.

In this illustrative embodiment, shown in FIG. 37, this system user input can be produced using a text keyboard/keypad, audio microphone, a speech recognition interface and/or other suitable system user interface that allows the system user to communicate emotion, style and timing types of musical descriptors to the system. With this system configuration, system users can further apply, for example, typed, spoken and/or sung lyrics (e.g. one or more word phrases) to one or more scenes in a scored video, or photo slide show, that is to be scored with composed music in accordance with the principles of the present invention.

As will explained further detail herein, lyrics when applied to particular scenes by the system user will be processed in different ways, depending on whether the lyrics are typed, spoken or sung, so as to extract vowel formants that allow for the automated detection of pitch events, along a time-line, supporting an initial or starting melodic structure. Such pitch events can be used to inform and constrain the musical experience descriptor and timing/spatial parameters which the Parameter Transformation Engine Subsystem B51 uses to generate system operating parameters based on the complete set of the musical experience descriptors, including timing parameters and lyrics, that may be provided to the system interface subsystem B0 as input by the system user.

As illustrated in FIG. 38, the Automated Music Composition And Generation Instrument System supports virtual-instrument music synthesis driven by graphical-icon based musical experience descriptors selected using a keyboard interface, microphone, touchscreen interface, or speech-recognition interface.

In general, the automatic or automated music composition and generation system shown in FIG. 37, including all of its inter-cooperating subsystems shown in FIGS. 26A through 33E and specified above, can be implemented using digital electronic circuits, analog electronic circuits, or a mix of digital and analog electronic circuits specially configured and programmed to realize the functions and modes of operation to be supported by the automatic music composition and generation system. The digital integrated circuitry (IC) can include low-power and mixed (i.e. digital and analog) signal systems realized on a chip (i.e. system on a chip or SOC) implementation, fabricated in silicon, in a manner well known in the electronic circuitry as well as musical instrument manufacturing arts. Such implementations can also include the use of multi-CPUs and multi-GPUs, as may be required or desired for the particular product design based on the systems of the present invention. For details on such digital integrated circuit (IC) implementation, reference can be made to any number of companies and specialists in the field including Cadence Design Systems, Inc., Synopsis Inc., Mentor Graphics, Inc. and other electronic design automation firms.

For purpose of illustration, the digital circuitry implementation of the system is shown as an architecture of components configured around SOC or like digital integrated circuits. As shown, the system comprises the various components, comprising: a SOC sub-architecture including a multi-core CPU, a multi-core GPU, program memory (DRAM), and a video memory (VRAM); a hard drive (SATA); a LCD/touch-screen display panel; a microphone/speaker; a keyboard; WIFI/Bluetooth network adapters; pitch recognition module/board; and power supply and distribution circuitry; all being integrated around a system bus architecture and supporting controller chips, as shown.

The primary function of the multi-core CPU is to carry out program instructions loaded into program memory (e.g. micro-code), while the multi-core GPU will typically receive and execute graphics instructions from the multi-core CPU, although it is possible for both the multi-core CPU and GPU to be realized as a hybrid multi-core CPU/GPU chip where both program and graphics instructions can be implemented within a single IC device, wherein both computing and graphics pipelines are supported, as well as interface circuitry for the LCD/touch-screen display panel, microphone/speaker, keyboard or keypad device, as well as WIFI/Bluetooth (BT) network adapters and the pitch recognition module/circuitry. The purpose of the LCD/touch-screen display panel, microphone/speaker, keyboard or keypad device, as well as WIFI/Bluetooth (BT) network adapters and the pitch recognition module/circuitry will be to support and implement the functions supported by the system interface subsystem B0, but may be used for implementing other subsystems as well employed in the system shown in FIGS. 37 through 39.

In the Automated Music Composition and Generation System shown in FIG. 39, linguistic and/or graphics based musical experience descriptors, including lyrical input, and other media (e.g. a video recording, slide-show, audio recording, or event marker) are selected as input through the system user interface B0. The system user interface supported by subsystem B0 can be realized using a touch-screen keyboard supporting GUI screens similar to those shown in FIGS. 15A through 15V, but expectedly will differ in style and format, from embodiment to embodiment of the present invention. The musical experience descriptors and the media are supplied to the system user interface B0 and are then automatically analyzed by the system (e.g. using AI-based image and sound processing methods) to extract musical experience descriptors (e.g. based on scene imagery and/or emotional information content in supplied media content). Thereafter, the musical experience descriptors, as well as machine-extracted musical experience descriptors, provided to the system are used by the Automated Music Composition and Generation Engine (E1) within the system (S) to automatically generate musically-scored media that is then supplied back to the system user via the system user interface for subsequent access, distribution and use.

As shown in FIG. 39A, the system input output interface B0 allows the system user to transmit lyrical input to the system in the form of typed words, spoken words and/or sung speech, in any natural language supported by the system. Typically, all of the major languages of the world will be supported (e.g. English, Spanish, French, Chinese, Japanese, Russian, etc.). As shown, the system support three different modes of lyrical input processing, each being optimized to handle the form of the lyrical input supplied to the Real-Time Pitch Event Analyzing Subsystem B52 (e.g. graphical strings, acoustic signals representing spoken lyrics, and acoustical signals representing sung lyrics). The mode of lyrical input (e.g. 1—Typed Lyrics, 2—Spoken Lyrics, and 3—Sung Lyrics) can be selected by the system user from the GUI-based system input output subsystem B0. Such lyrical input is provided to a Real-Time Pitch Event Analyzing Subsystem B52, supporting a multiplexer with time coding, for transmission of the output from subsystem B52 to the Parameter Transformation Engine Subsystem B51. Within Real-Time Pitch Event Analyzing Subsystem B52, real-time pitch event, rhythmic and prosodic analysis is performed on the lyrical input supplied by the system user so as to generate three (3) different pitch-event streams for typed, spoken and sung lyrics, respectively. These outputs are subsequently used to modify system operating parameters in the system during the music composition and generation process of the present invention.

FIG. 39B shows the Real-Time Pitch Event Analyzing Subsystem B52 employed in the subsystem shown in FIG. 39A, as comprising subcomponents: a lyrical input handler for handling the different forms of lyrical input supplied by the system user; a pitch-event output handler for handling the different pitch event output streams generated by the subsystem B52; a lexical dictionary for storing linguistic information and models on each word in the language supported by the system; and a vowel-format analyzer for analyzing the vowel-formants contained in processed lyrical input; and a mode controller for controlling the lyrical input mode of the subsystem B52, configured about the programmed processor for processing the lyrical input using the various components employed within the subsystem B52.

In FIG. 40, there is described a method of composing and generating music in an automated manner using the Real-Time Pitch Event Analyzing Subsystem B52. As shown, the method comprises the following sequence of steps: (a) providing musical experience descriptors (e.g. including "emotion-type" musical experience descriptors as shown in FIGS. 32A through 32F, and "style-type" musical experience descriptors as shown in FIGS. 33A through 33E) to the system user interface of the automated music composition and generation system; (b) providing lyrical input (e.g. in typed, spoken or sung format) to the system-user interface of the system, for one or more scenes in a video or media object to be scored with music composed and generated by the system; (c) using the Real-Time Pitch Event Analyzing Subsystem B52 for processing the lyrical input provided to the system user interface, using real-time rhythmic, pitch event, and prosodic analysis of typed/spoken/sung lyrics or words (for certain frames of the scored media), based on time and/or frequency domain techniques; (d) using the Real-Time Pitch Event Analyzing Subsystem B52 to extract pitch events, rhythmic information and prosodic information on a high-resolution time line from the analyzed lyrical input, and code with timing information on when such detected events occurred; and (e) providing the extracted pitch event, rhythmic and prosodic information to the Automated Music Composition And Generation Engine E1 for use in constraining the probability-based system operating parameters (SOP) tables employed in the various subsystems of the automated system. It will be helpful to discuss each of these steps in greater details below.

In Step A of FIG. 40, musical experience descriptors (e.g. including "emotion-type" musical experience descriptors as shown in FIGS. 32A through 32F, and "style-type" musical experience descriptors as shown in FIGS. 33A through 33E) can be provided to the system user interface of an automated music composition and generation system in a variety of ways. Such information input can be provided by way of an LCD touch-screen display, using an appropriate GUI screen. Alternatively, musical experience descriptors can be supplied by a keyboard data entry, speech recognition, or other methods known in the data entry and handling arts.

In Step B of FIG. 40, lyrical input (e.g. in typed, spoken or sung format) can be supplied to the system-user interface of the system, in various ways, for one or more scenes in a video or media object to be scored with music composed and generated by the system. Such lyrical information can be provided by way of a microphone, speech recognition, typed keyboard data entry, or any other methods known in the data entry and handling arts where, preferably, the system user can speak or sing the lyrics for the intended media piece or section, for which the lyrics are intended, to sent a tone, rhythm and melody for at least a limited number of notes in the music to be composed and generated by the system of the present invention.

In Step C of FIG. 40, the lyrical input provided to the system user interface can be processed using various kinds of signal processing apparatus, preferably using (i) real-time rhythmic, pitch event, and prosodic analysis of typed/spoken/sung lyrics or words (for certain frames of the media), based on time and/or frequency domain techniques. In the case of spoken or sung lyrics or words, being scored to a piece or section of media, the corresponding speech signals will be digitalized and processed using a high-speed digital signal processing (DSP) chip programmed to carryout real-time rhythmic, pitch event, and prosodic analysis of typed/spoken/sung lyrics or words, typically employing vowel formant analysis and related techniques to ascertain the occurrence of vowels in lyrics, and the pitch characteristics thereof, which can be transformed into notes of corresponding pitch to obtain a sense of melody from the lyrical input.

In Step D of FIG. 40, extracting pitch events, rhythmic information and prosodic information on a high-resolution time line from the analyzed lyrical input, can be carried out using the programmed DSP chip described above, wherein such extracted pitch and rhythm information can be encoded with timing information to precisely indicate when such detected events occurred along a time line.

In Step E of FIG. 40, the extracted information is ultimately provided to the parameter transformation engine B51 within the Automated Music Composition And Generation Engine, and used within to constrain the probability-based parameters tables generated/updated by the parameter transformation engine B51.

The primary purpose of the analyzed lyrical input is to allow the Parameter Transformation Engine Subsystem B51 in the Automated Music Composition And Generation Engine E1 of the system shown in FIG. 37 to use this automatically extracted pitch event, rhythmic and prosodic information to constrain the probability-based system operating parameters (SOP) tables that have been configured for the set of emotion/style musical experience descriptors provided by the system user along with the lyrical input. The extracted pitch events can used in setting the probabilities for the pitch related parameter tables that serve to guide the generation of the melodic phrase structure of the musical piece to be composed by the system of the present invention, so that the composed music follows and supports the melodic structure of the supplied lyrics. The rhythmic and and/or prosodic information can be used in setting the probabilities for rhythm related parameter tables that serve to guide the generation of the rhythmic phrase structure of the musical piece to be composed by the system of the present invention so that the composed music follows and supports the rhythmic structure of the supplied lyrics.

FIG. 41 describes the primary steps involved in carrying out the automated music composition and generation process within the music composing and generation system of the seventh illustrative embodiment shown in FIG. 37 supporting virtual-instrument music synthesis driven by linguistic (including lyrical) musical experience descriptors. As indicated in FIG. 41, the method comprises the steps: (a) the system user accessing the Automated Music Composition and Generation System, and then selects media to be scored with music generated by its Automated Music Composition and Generation Engine; (b) the system user selecting musical experience descriptors (and optionally lyrics) provided to the Automated Music Composition and Generation Engine of the system for application to the selected media to be musically-scored; (c) the system user initiating the Automated Music Composition and Generation Engine to compose and generate music based on the provided musical descriptors scored on selected media; (d) system user reviewing the generated music that has been composed for the scored media piece or event marker, and either accepting the music and/or provides feedback to the system regarding user preferences in view of the resulting musical experience, and/or making modifications to the musical descriptors and parameters and requests the system to regenerate a modified piece of music; and (e) the system combining the composed piece of music to the selected video to create a new media file for distribution and display.

To illustrate the operation of the Real-Time Pitch Event Analyzing Subsystem B52, within the context of subsystem B1 in the system shown in FIGS. 37 and 38, it will be helpful to illustrate how two different sets of exemplary lyrics, each set being characterized by different emotional states (e.g. HAPPY and SAD), would be processed by the Real-Time Pitch Event Analyzing Subsystem B52 to generated different series of pitch events, for use in driving the Automated Music Composition And Generation System.

Referring now FIG. 42, the Real-Time Pitch Event Analyzing Subsystem B52 is shown processing a typed lyrical expression (set of words) characteristic of the emotion HAPPY (e.g. "Put On A Happy Face" by Charles Strouse), to derive corresponding pitch events (e.g. notes) abstracted from the typed lyrics based on the presence of vowel formants (assigned to the graphically represented vowels), and then these pitch events are provided as lyrical input to assist in the musical experience description of the music piece to be composed, typically along with emotion and style type of musical experience descriptors provided to the system.

More particularly, FIG. 42 describes the high level steps carried out within the system of FIG. 37 while practicing a method of processing a typed lyrical expression (set of words), characteristic of the emotion HAPPY (e.g. "Put On A Happy Face" by Charles Strouse) in the example, provided as typed lyrical input into the system by the system user.

As shown in Block A of FIG. 42, the Real-Time Pitch Event Analyzing Subsystem B52 receives the text-based lyrical input as a string of graphemes (or morphemes).

At Block B in FIG. 42, Subsystem B52 automatically transcribes the text string into a phonetic equivalent string, making use of the local dictionary.

At Block C in FIG. 42, based on these phonemes in the phonetic string, the Subsystem B52 automatically transforms the vowels present in the phoneme string generates, into a string of (default) vowel formants. Preferably, default vowel formants are listed in the Lexical Dictionary of FIG. 39B for text based representations, while vowel formants are automatically detected using the Vowel Formant Analyzer which can be based on real-time spectrographic and like techniques well known in the real-time speech processing and applied linguistic arts.

At Block D in FIG. 42, the Subsystem B52 then automatically transforms the detected vowel formants into a string of musical notes (e.g. pitch events without rhythm information in this case).

At Block E in FIG. 42, the Subsystem B52 generates a string of notes (e.g. pitch event data) from the string of vowel formants.

At Block F in FIG. 42, the Subsystem B52 transmits the pitch event data (e.g. relating to detected pitch events) to the Parameter Transformation Engine (B51) so as to assist in generating probabilistic-based system operating parameters for the musical experience descriptors and specifications, in view of the emotion and style type of musical experience descriptors that have been provided to the system. The aim here is to assist in the musical experience description of the music piece to be composed, and help drive the system during the automated music composition process of the present invention. Such pitch event information is then used within the Parameter Transformation Engine Subsystem B51 to generate the SOP tables prior to distribution and loading across the system, and ultimate execution of the music composition and generation process of the present invention.

Referring now FIG. 43, the Real-Time Pitch Event Analyzing Subsystem B52 is shown processing spoken lyrical expression (set of words) characteristic of the emotion HAPPY (e.g. "Put On A Happy Face" by Charles Strouse), to derive corresponding pitch events (e.g. notes) abstracted from the spoken lyrics based on the presence of vowel formants (assigned to the graphically represented vowels), and then these pitch events are provided as lyrical input to assist in the musical experience description of the music piece to be composed, typically along with emotion and style type of musical experience descriptors provided to the system.

More particularly, FIG. 43 describes the high level steps carried out within the system of FIG. 37 while practicing a method of processing spoken lyrical expression (set of words), characteristic of the emotion HAPPY (e.g. "Put On A Happy Face" by Charles Strouse) in the example, provided as typed lyrical input into the system by the system user.

As shown in Block A of FIG. 43, the Real-Time Pitch Event Analyzing Subsystem B52 receives the spoken lyrical input as a acoustical signal.

At Block B in FIG. 43, Subsystem B52 automatically processes the acoustical signal using A/D and digital signal processing techniques to generate a phonetic equivalent string, making use of the local dictionary and speech recognition methods well known in the art.

At Block C in FIG. 43, based on these phonemes in the phonetic string, the Subsystem B52 automatically transforms the vowels present in the phoneme string, into a string of (default) vowel formants. Preferably, default vowel formants are listed in the Lexical Dictionary of FIG. 39B for text based representations, while vowel formants are automatically detected using the Vowel Formant Analyzer which can be based on real-time spectrographic and like techniques well known in the real-time speech processing and applied linguistic arts.

At Block D in FIG. 43, the Subsystem B52 then automatically transforms the detected vowel formants into a string of musical notes (e.g. pitch events with rhythm information in this case).

At Block E in FIG. 43, the Subsystem B52 generates a string of notes (e.g. pitch events with rhythm data) from the string of vowel formants.

At Block F in FIG. 43, the Subsystem B52 transmits the pitch event and rhythm data (e.g. relating to detected pitch events and rhythm characteristics of the spoken voice signal) to the Parameter Transformation Engine (B51) so as to assist in generating probabilistic-based system operating parameters for the musical experience descriptors and specifications, in view of the emotion and style type of musical experience descriptors that have been provided to the system. The aim here is to assist in the musical experience description of the music piece to be composed, and help drive the system during the automated music composition process of the present invention. Such pitch event and captured rhythm data is then used within the Parameter Transformation Engine Subsystem B51 to generate the SOP tables prior to distribution and loading across the system, and ultimate execution of the music composition and generation process of the present invention.

Referring now FIG. 44, the Real-Time Pitch Event Analyzing Subsystem B52 is shown processing a sung lyrical expression (set of words) characteristic of the emotion HAPPY (e.g. "Put On A Happy Face" by Charles Strouse), to derive corresponding pitch events (e.g. notes) abstracted from the sung lyrics based on the presence of vowel formants (assigned to the graphically represented vowels), and then these pitch events are provided as lyrical input to assist in the musical experience description of the music piece to be composed, typically along with emotion and style type of musical experience descriptors provided to the system.

More particularly, FIG. 44 describes the high level steps carried out within the system of FIG. 37 while practicing a method of processing a sung lyrical expression (set of words), characteristic of the emotion HAPPY (e.g. "Put On A Happy Face" by Charles Strouse) in the example, provided as sung lyrical input into the system by the system user.

As shown in Block A of FIG. 44, the Real-Time Pitch Event Analyzing Subsystem B52 receives the sung lyrical input as an acoustical signal that is continuously buffered and processed.

At Block B in FIG. 44, Subsystem B52 automatically processes the acoustical signal, using A/D and other digital signal processing techniques, so as to produce a phonetic equivalent string, making use of the local dictionary.

At Block C in FIG. 44, based on these phonemes in the phonetic string, the Subsystem B52 automatically transforms the vowels present in the phoneme string, into a string of (default) vowel formants. The vowel formants are automatically detected using the Vowel Formant Analyzer which can be based on real-time spectrographic and like techniques well known in the real-time speech processing and applied linguistic arts.

At Block D in FIG. 44, the Subsystem B52 then automatically transforms the detected vowel formants into a string of musical notes (e.g. pitch events with rhythm information in this case).

At Block E in FIG. 44, the Subsystem B52 then automatically generates a string of musical notes (e.g. pitch events with rhythm information in this case) from the detected vowel formants.

At Block F in FIG. 44, the Subsystem B52 transmits the pitch event and rhythm data (e.g. relating to detected pitch events and rhythm characteristics of the sung lyrics) to the Parameter Transformation Engine (B51) so as to assist in generating probabilistic-based system operating parameters for the musical experience descriptors and specifications, in view of the emotion and style type of musical experience descriptors that have been provided to the system. The aim here is to assist in the musical experience description of the music piece to be composed, and help drive the system during the automated music composition process of the present invention. Such pitch event and captured rhythm data is then used within the Parameter Transformation Engine Subsystem B51 to automatically generate sets of probability-based SOP tables for the system user inputs that are constrained by the pitch event, rhythmic and prosodic information captured by Subsystem B52, as described hereinabove.

FIG. 45 shows a score of musical notes automatically recognized within the sung lyrical expression at Block E in FIG. 44 using automated vowel format analysis and other methods of the present invention. As shown, each note has a pitch within an interval that corresponds to the ratio of the first and second formants in the corresponding vowel.

Referring now FIG. 46, the Real-Time Pitch Event Analyzing Subsystem B52 is shown processing a typed lyrical expression (set of words) characteristic of the emotion SAD or MELONCHOLY (e.g. "Somewhere Over The Rainbow" by E. Yip Harburg and Harold Arlen), to derive corresponding pitch events (e.g. notes) abstracted from the typed lyrics based on the presence of vowel formants (assigned to the graphically represented vowels), and then these pitch events are provided as lyrical input to assist in the musical experience description of the music piece to be composed, typically along with emotion and style type of musical experience descriptors provided to the system.

More particularly, FIG. 46 describes the high level steps carried out within the system of FIG. 37 while practicing a method of processing a typed lyrical expression (set of words), characteristic of the emotion SAD or MELONCHOLY (e.g. "Somewhere Over The Rainbow" by E. Yip Harburg and Harold Arlen) in the example, provided as typed lyrical input into the system by the system user.

As shown in Block A of FIG. 46, the Real-Time Pitch Event Analyzing Subsystem B52 receives the text-based lyrical input as a string of graphemes (or morphemes).

At Block B in FIG. 46, Subsystem B52 automatically transcribes the text string into a phonetic equivalent string, making use of the local dictionary.

At Block C in FIG. 46, based on these phonemes in the phonetic string, the Subsystem B52 automatically transforms the vowels present in the phoneme string generates, into a string of (default) vowel formants. Preferably, default vowel formants are listed in the Lexical Dictionary of FIG. 39B for text based representations, while vowel formants are automatically detected using the Vowel Formant Analyzer which can be based on real-time spectrographic and like techniques well known in the real-time speech processing and applied linguistic arts.

At Block D in FIG. 46, the Subsystem B52 then automatically transforms the detected vowel formants into a string of musical notes (e.g. pitch events without rhythm information in this case).

At Block E in FIG. 46, the Subsystem B52 generates a string of notes (e.g. pitch event data) from the string of vowel formants.

At Block F in FIG. 46, the Subsystem B52 transmits the pitch event data (e.g. relating to detected pitch events) to the Parameter Transformation Engine (B51) so as to assist in generating probabilistic-based system operating parameters for the musical experience descriptors and specifications, in view of the emotion and style type of musical experience descriptors that have been provided to the system. The aim here is to assist in the musical experience description of the music piece to be composed, and help drive the system during the automated music composition process of the present invention. Such pitch event and captured rhythm data is then used within the Parameter Transformation Engine Subsystem B51 to automatically generate sets of probability-based SOP tables for the system user inputs that are constrained by the pitch event, rhythmic and prosodic information captured by Subsystem B52, as described hereinabove.

Referring now FIG. 47, the Real-Time Pitch Event Analyzing Subsystem B52 is shown processing spoken lyrical expression (set of words) characteristic of the emotion SAD or MELONCHOLY (e.g. "Somewhere Over The Rainbow" by E. Yip Harburg and Harold Arlen) to derive corresponding pitch events (e.g. notes) abstracted from the spoken lyrics based on the presence of vowel formants (assigned to the graphically represented vowels), and then these pitch events are provided as lyrical input to assist in the musical experience description of the music piece to be composed, typically along with emotion and style type of musical experience descriptors provided to the system.

More particularly, FIG. 47 describes the high level steps carried out within the system of FIG. 37 while practicing a method of processing spoken lyrical expression (set of words), characteristic of the emotion SAD or MELONCHOLY (e.g. "Somewhere Over The Rainbow" by E. Yip Harburg and Harold Arlen) in the example, provided as typed lyrical input into the system by the system user.

As shown in Block A of FIG. 47, the Real-Time Pitch Event Analyzing Subsystem B52 receives the spoken lyrical input as a acoustical signal.

At Block B in FIG. 47, Subsystem B52 automatically processes the acoustical signal using A/D and digital signal processing techniques to generate a phonetic equivalent string, making use of the local dictionary and speech recognition methods well known in the art.

At Block C in FIG. 47, based on these phonemes in the phonetic string, the Subsystem B52 automatically transforms the vowels present in the phoneme string generates, into a string of (default) vowel formants. Preferably, default vowel formants are listed in the Lexical Dictionary of FIG. 39B for text based representations, while vowel formants are automatically detected using the Vowel Formant Analyzer which can be based on real-time spectrographic and like techniques well known in the real-time speech processing and applied linguistic arts.

At Block D in FIG. 47, the Subsystem B52 then automatically transforms the detected vowel formants into a string of musical notes (e.g. pitch events with rhythm data in this case).

At Block E in FIG. 47, the Subsystem B52 generates a string of notes (e.g. pitch events with rhythm data) from the string of vowel formants.

At Block F in FIG. 47, the Subsystem B52 transmits the pitch event data (e.g. relating to detected pitch events and rhythm characteristics) to the Parameter Transformation Engine (B51) so as to assist in generating probabilistic-based system operating parameters for the musical experience descriptors and specifications, in view of the emotion and style type of musical experience descriptors that have been provided to the system. The aim here is to assist in the musical experience description of the music piece to be composed, and help drive the system during the automated music composition process of the present invention. Such pitch event and captured rhythm data is then used within the Parameter Transformation Engine Subsystem B51 to automatically generate sets of probability-based SOP tables for the system user inputs that are constrained by the pitch event, rhythmic and prosodic information captured by Subsystem B52, as described hereinabove.

Referring now FIG. 48, the Real-Time Pitch Event Analyzing Subsystem B52 is shown processing a sung lyrical expression (set of words) characteristic of the emotion SAD or MELONCHOLY (e.g. "Somewhere Over The Rainbow" by E. Yip Harburg and Harold Arlen) to derive corresponding pitch events (e.g. notes) abstracted from the sung lyrics based on the presence of vowel formants (assigned to the graphically represented vowels), and then these pitch events are provided as lyrical input to assist in the musical experience description of the music piece to be composed, typically along with emotion and style type of musical experience descriptors provided to the system.

More particularly, FIG. 48 describes the high level steps carried out within the system of FIG. 37 while practicing a method of processing a sung lyrical expression (set of words), characteristic of the emotion SAD or MELONCHOLY (e.g. "Somewhere Over The Rainbow" by E. Yip Harburg and Harold Arlen) in the example, provided as sung lyrical input into the system by the system user.

As shown in Block A of FIG. 48, the Real-Time Pitch Event Analyzing Subsystem B52 receives the sung lyrical input as an acoustical signal that is continuously buffered and processed.

At Block B in FIG. 48, Subsystem B52 automatically processes the acoustical signal, using A/D and other digital signal processing techniques, so as to produce a phonetic equivalent string, making use of the local dictionary.

At Block C in FIG. 48, based on the phonemes in the phonetic string, the Subsystem B52 automatically generates, a string of (default) vowel formants from the vowels present in the phoneme string. The vowel formants are automatically detected using the Vowel Formant Analyzer (VFA) within Subsystem B52 realizable using real-time spectrographic and like techniques well known in the real-time speech processing and applied linguistic arts.

At Block E in FIG. 48, the Subsystem B52 then automatically generates a string of musical notes (e.g. pitch events with rhythm data in this case) from detected vowel formants.

At Block F in FIG. 48, the Subsystem B52 transmits the pitch event and rhythm data (e.g. relating to detected pitch events and rhythm characteristics of the sung lyrics) to the Parameter Transformation Engine (B51) so as to assist in generating probabilistic-based system operating parameters for the musical experience descriptors and specifications, in view of the emotion and style type of musical experience descriptors that have been provided to the system. The aim here is to assist in the musical experience description of the music piece to be composed, and help drive the system during the automated music composition process of the present invention. Such pitch event and captured rhythm data is then used within the Parameter Transformation Engine Subsystem B51 to automatically generate sets of probability-based SOP tables for the system user inputs that are constrained by the pitch event, rhythmic and prosodic information captured by Subsystem B52, as described hereinabove.

FIG. 49 shows a score of musical notes automatically recognized within the sung lyrical expression at Block E in FIG. 49 using automated vowel format analysis and other methods of the present invention. As shown, each note has a pitch within an interval on the musical scale that corresponds to the ratio of the first and second formants in the corresponding vowel.

Employing the Automated Music Composition and Generation Engine of the Present Invention in Other Applications The Automated Music Composition and Generation Engine of the present invention will have use in many application beyond those described this invention disclosure.

For example, consider the use case where the system is used to provide indefinitely lasting music or hold music (i.e. streaming music). In this application, the system will be used to create unique music of definite or indefinite length. The system can be configured to convey a set of musical experiences and styles and can react to real-time audio, visual, or textual inputs to modify the music and, by changing the music, work to bring the audio, visual, or textual inputs in line with the desired programmed musical experiences and styles. For example, the system might be used in Hold Music to calm a customer, in a retail store to induce feelings of urgency and need (to further drive sales), or in contextual advertising to better align the music of the advertising with each individual consumer of the content.

Another use case would be where the system is used to provide live scored music in virtual reality or other social environments, real or imaginary. Here, the system can be configured to convey a set of musical experiences and styles and can react to real-time audio, visual, or textual inputs. In this manner, the system will be able to "live score" content experiences that do well with a certain level of flexibility in the experience constraints. For example, in a video game, where there are often many different manners in which to play the game and courses by which to advance, the system would be able to accurately create music for the game as it is played, instead of (the traditional method of) relying on pre-created music that loops until certain trigger points are met. The system would also serve well in virtual reality and mixed reality simulations and experiences.

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present invention disclosure.

In alternative embodiments, the automatic music composition and generation system of the present invention can be modified to support the input of conventionally notated musical information such as, for example, notes, chords, pitch, melodies, rhythm, tempo and other qualifies of music, into the system input interface for processing and use in conjunction with other musical experience descriptors provided the system user, in accordance with the principles of the present invention.

For example, in alternative embodiments of the present invention described hereinabove, the system can be realized a stand-alone appliances, instruments, embedded systems, enterprise-level systems, distributed systems, and as an application embedded within a social communication network, email communication network, SMS messaging network, telecommunication system, and the like. Such alternative system configurations will depend on particular end-user applications and target markets for products and services using the principles and technologies of the present invention.

While the preferred embodiments disclosed herein have taught the use of virtual-instrument music synthesis to generate acoustically-realized notes, chords, rhythms and other events specified in automated music compositions, in stark contrast with stringing together music loops in a manner characteristic of prior art systems, it is understood that the automated music composition and generation system of the present invention can be modified to adapt the musical score representations generated by the system, and convert this level of system output into MIDI control signals to drive and control one or more groups of MIDI-based musical instruments to produce the automatically composed music for the enjoyment of others. Such automated music composition and generation systems could drive entire groups of MIDI-controlled instruments such as displayed during Pat Metheny's 2010 Orchestrion Project. Such automated music composition and generation systems could be made available in homes and commercial environments as an alternative to commercially available PIANODISC® and YAMAHA® MIDI-based music generation systems. Such alternative embodiments of the present inventions are embraced by the systems and models disclosed herein and fall within the scope and spirit of the present invention.

These and all other such modifications and variations are deemed to be within the scope and spirit of the present invention as defined by the accompanying Claims to Invention.

What is claimed is:

1. An automated music composition and generation system for spotting a digital media object or event marker with one or more musical experience descriptors during a scoring process using musical experience descriptors to characterize one or more pieces of digital music to be automatically composed and generated by an automated music composition and generation engine, for use in scoring said digital media object or event marker, said automated music composition and generation system comprising:

an automated music composition and generation engine configured for receiving, as inputs, musical experience descriptors being selected by a system user while spotting a digital media object or event marker during a scoring process, and producing, as output, one or more pieces of digital music automatically composed and generated by said automated music composition and generation engine based on said selected musical experience descriptors supplied to said automated music composition and generation engine; and a system user interface, operably connected to said automated music composition and generation engine, and configured for (i) selecting a digital media object or event marker to be scored with pieces of digital music automatically composed and generated by said automated music composition and generation engine, (ii) selecting said musical experience descriptors from a group consisting of emotion-type musical experience descriptors, style-type musical experience descriptors, timing-type musical experience descriptors, and accent-type musical experience descriptors, (iii) applying the selected musical experience descriptors to said selected digital media object or event marker, and (iv) providing the selected musical experience descriptors to said automated music composition and generation engine and automatically composing and generating one or more pieces of digital music characterized by said selected musical experience descriptors, and for musically scoring said selected digital media object or event marker to produce a musically-scored digital media object or event marker;

wherein after selecting said digital media object or event marker, and during spotting of said selected digital media object or event marker, (i) selecting and applying one or more of said musical experience descriptors to said selected digital media object or event marker to indicate when and how particular musical events should occur in said one or more pieces of digital music automatically composed and generated by said automated music composition and generation engine, for musically scoring said selected digital media object or event marker;

(ii) providing said selected and applied musical experience descriptors to said automated music composition and generation engine, and (iii) said automated music composition and generation engine automatically composing and generating one or more pieces of digital music characterized by said selected and applied musical experience descriptors.

2. The automated music composition and generation system of claim 1, wherein said system user interface, operably connected to said automated music composition and generation engine, is provided and configured for selecting and applying said musical experience descriptors to said selected digital media object or event marker during spotting.

3. The automated music composition and generation system of claim 1, wherein said digital media object is selected from the group consisting of a video, a podcast, an audio-recording, a digital image, a photograph, a slideshow, an event-marker, and other events.

4. The automated music composition and generation system of claim 1, wherein said timing-type musical experience descriptors and said accent-type musical experience descriptors indicate when musical events occur in the pieces of digital music, and include one or more parameters, commands and/or markers selected from the group consisting of (i) a parameter indicating the length of the piece of digital music, (ii) a marker indicating the timing location of a start in the piece of digital music, (iii) a marker indicating the timing location of a stop in the piece of digital music, (iv) a marker indicating the timing location of an instrument hit in the piece of digital music, (v) a marker indicating the timing location of a fade in the piece of digital music, (vi) a marker indicating the timing location of a fade out in the piece of digital music, (vii) a marker indicating the timing location of a modulation in the piece of digital music, (viii) a marker indicating the timing location of an increase in volume in the piece of digital music, and (ix) a marker indicating the timing location of a particular accent in the piece of digital music, (x) a marker indicating the timing location of a new emotion or mood to be conveyed by the piece of digital music, (xi) a marker indicating the timing location of a change in style in the piece of digital music, (xii) a marker indicating the timing location of a change in instrumentation in the piece of digital music, and (xiii) a marker indicating the timing location of a change in the structure of the piece of digital music.

5. The automated music composition and generation system of claim 1, wherein said musical experience descriptors have a graphical-icon format and/or linguistic format.

6. The automated music composition and generation system of claim 1, wherein said system user interface is an interface selected from the group consisting of a text keyboard, a manual data entry device, a speech recognition interface, a graphical user interface (GUI), and a touch-screen graphical user interface (GUI).

7. An automated music composition and generation process supported within an automated music composition and generation system for spotting a digital media object or event marker with one or more musical experience descriptors during a scoring process using musical experience descriptors to characterize one or more pieces of digital music to be automatically composed and generated by an automated music composition and generation engine, for use in musically scoring said digital media object or event marker, said automated music composition and generation process comprising the steps of:

(a) selecting a digital media object or event marker to be spotted by a system user with musical experience descriptors, and scored with one or more pieces of digital music automatically generated by an automated music composition and generation system;

(b) during spotting of the selected digital media object or event marker, selecting one or more musical experience descriptors to be applied to said selected digital media object or event marker, and applying the selected musical experience descriptors to said selected digital media object or event marker to indicate when and how particular musical events should occur in said one or more pieces of digital music automatically composed and generated by said automated music composition and generation engine, for musically scoring said selected digital media object or event marker; and (c) providing said selected and applied musical experience descriptors to said automated music composition and generation engine and automatically composing and generating the one or more pieces of digital music characterized by said selected and applied musical experience descriptors, for use in scoring said selected digital media object or event marker with said one or more pieces of digital music.

8. The automated music composition and generation process of claim 7, wherein step (a) comprises providing a system user interface, operably connected to said automated music composition and generation engine, and configured for (i) selecting said digital media object or event marker to be scored with pieces of digital music automatically composed and generated by said automated music composition and generation engine.

9. The automated music composition and generation process of claim 7, wherein step (b) comprises providing a system user interface, operably connected to said automated music composition and generation engine, and configured for selecting and applying said musical experience descriptors to said selected digital media object or event marker during spotting.

10. The automated music composition and generation process of claim 7, wherein step (b) comprises selecting said musical experience descriptors selected from a group consisting of emotion-type musical experience descriptors, style-type musical experience descriptors, timing-type musical experience descriptors, and accent-type musical experience descriptors.

11. The automated music composition and generation process of claim 10, wherein said timing-type musical experience descriptors and said accent-type musical experience descriptors indicate when musical events occur in the pieces of digital music, and include one or more parameters, commands and/or markers selected from the group consisting of (i) a parameter indicating the length of the piece of digital music, (ii) a marker indicating the timing location of a start in the piece of digital music, (iii) a marker indicating the timing location of a stop in the piece of digital music, (iv) a marker indicating the timing location of an instrument hit in the piece of digital music, (v) a marker indicating the timing location of a fade in the piece of digital music, (vi) a marker indicating the timing location of a fade out in the piece of music, (vii) a marker indicating the timing location of a modulation in the piece of digital music, (viii) a marker indicating the timing location of an increase in volume in the piece of digital music, and (ix) a marker indicating the timing location of a particular accent in the piece of digital music, (x) a marker indicating the timing location of a new emotion or mood to be conveyed by the piece of digital music, (xi) a marker indicating the timing location of a change in style in the piece of digital music, (xii) a marker indicating the timing location of a change in instrumentation in the piece of digital music, and (xiii) a marker indicating the timing location of a change in the structure of the piece of digital music.

12. The automated music composition and generation process of claim 7, which further comprises step (d) combining said one or more pieces of digital music with said selected digital media object or event marker, so as to produce a musically-scored digital media object or event marker.

13. The automated music composition and generation process of claim 7, wherein said system user interface is an interface selected from the group consisting of a text keyboard, a manual data entry device, a speech recognition interface, a graphical user interface (GUI), and a touch-screen graphical user interface (GUI).

14. An automated music composition and generation process for spotting a digital media object or event marker with one or more musical experience descriptors during a scoring process using musical experience descriptors to characterize one or more pieces of digital music to be automatically composed and generated by an automated music composition and generation engine, for use in musically scoring said digital media object or event marker, said automated music composition and generation process comprising the steps of:

(a) a system user accessing a system user interface, and selecting a digital media object or event marker to be scored with one or more pieces of digital music automatically composed and generated by said automated music composition and generation engine;

(b) during spotting of said digital media object or event marker, the system user selecting and applying one or more of said musical experience descriptors to said selected digital media object or event marker to indicate when and how particular musical events should occur in said one or more pieces of digital music automatically composed and generated by said automated music composition and generation engine, for musically scoring said selected digital media object or event marker;

(c) providing said selected and applied musical experience descriptors to said automated music composition and generation engine, and said automated music composition and generation engine automatically composing and generating said one or more pieces of digital music characterized by said selected and applied musical experience descriptors, and for use in musically scoring said selected digital media object or event marker; and (d) combining said one or more pieces of digital music with said selected digital media object or event marker so as to create a digital file representing a musically-scored digital media object or event marker, for display and review by said system user.

15. The automated music composition and generation process of claim 14, which further comprises:

(e) reviewing and assessing said digital file and making modifications to one or more selected musical experience descriptors;

(f) providing the modified musical experience descriptors to said automated music composition and generation engine; and (g) initiating said automated music composition and generation engine to compose and generate a new digital file for display and review.

16. The automated music composition and generation process of claim 14, wherein said digital media object is selected from the group consisting of a video, a podcast, an audio-recording, a digital image, a photograph, a slideshow, an event-marker, and other events.

17. The automated music composition and generation process of claim 14, wherein said timing-type musical experience descriptors and said accent-type musical experience descriptors indicate when musical events occur in the pieces of digital music, and include one or more parameters, commands and/or markers selected from the group consisting of (i) a parameter indicating the length of the piece of digital music, (ii) a marker indicating the timing location of a start in the piece of digital music, (iii) a marker indicating the timing location of a stop in the piece of digital music, (iv) a marker indicating the timing location of an instrument hit in the piece of digital music, (v) a marker indicating the timing location of a fade in the piece of digital music, (vi) a marker indicating the timing location of a fade out in the piece of digital music, (vii) a marker indicating the timing location of a modulation in the piece of digital music, (viii) a marker indicating the timing location of an increase in volume in the piece of digital piece, and (ix) a marker indicating the timing location of a particular accent in the piece of digital music, (x) a marker indicating the timing location of a new emotion or mood to be conveyed by the piece of digital music, (xi) a marker indicating the timing location of a change in style in the piece of digital music, (xii) a marker indicating the timing location of a change in instrumentation in the piece of digital music, and (xiii) a marker indicating the timing location of a change in the structure of the piece of digital music.

18. The automated music composition and generation process of claim 14, wherein said musical experience descriptors have a graphical-icon and/or linguistic format.

19. The automated music composition and generation process of claim 14, wherein said system user interface is an interface selected from the group consisting of a text keyboard, a manual data entry device, a speech recognition interface, a graphical user interface (GUI), and a touch-screen graphical user interface (GUI).

20. The automated music composition and generation process of claim 14, wherein said digital media object is a video, and wherein the system user (i) selects a video from a video library maintained within a storage device, (ii) selects and applies one or more musical experience descriptors to the selected video, and (iii) provides the musical experience descriptors to said automated music composition and generation engine, for use in automatically composing and generating pieces of digital music for scoring said selected video.

* * * * *